US010531333B1

(12) United States Patent
Kim et al.

(10) Patent No.: US 10,531,333 B1
(45) Date of Patent: Jan. 7, 2020

(54) STRUCTURE OF MAC SUB-HEADER FOR SUPPORTING NEXT GENERATION MOBILE COMMUNICATION SYSTEM AND METHOD AND APPARATUS USING THE SAME

(71) Applicant: Samsung Electronics Co., Ltd., Suwon-si, Gyeonggi-do (KR)

(72) Inventors: Donggun Kim, Seoul (KR); Soenghun Kim, Suwon-si (KR); Seungri Jin, Suwon-si (KR); Sangbum Kim, Suwon-si (KR); Gert-Jan Van Lieshout, Staines (GB); Alexander Sayenko, Seoul (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/566,152

(22) Filed: Sep. 10, 2019

Related U.S. Application Data

(63) Continuation of application No. 16/287,584, filed on Feb. 27, 2019, now Pat. No. 10,419,973, which is a continuation of application No. 15/802,051, filed on Nov. 2, 2017, now Pat. No. 10,257,747.

(30) Foreign Application Priority Data

Nov. 4, 2016 (KR) ........................ 10-2016-0146353
Nov. 14, 2016 (KR) ........................ 10-2016-0150848
(Continued)

(51) Int. Cl.
*H04W 28/06* (2009.01)
*H04W 80/02* (2009.01)
(Continued)

(52) U.S. Cl.
CPC ..... *H04W 28/065* (2013.01); *H04W 72/0406* (2013.01); *H04W 80/02* (2013.01);
(Continued)

(58) Field of Classification Search
CPC ........... H04W 28/065; H04W 72/0406; H04W 80/02; H04W 88/02; H04W 88/08; H04W 84/042
See application file for complete search history.

(56) References Cited

U.S. PATENT DOCUMENTS

2009/0003283 A1 1/2009 Meylan
2009/0207831 A1 8/2009 Ihm et al.
(Continued)

FOREIGN PATENT DOCUMENTS

WO 2016/164109 A1 10/2016

OTHER PUBLICATIONS

Samsung, 'Extended L field in MAC subheader', R2-154328, 3GPP TSG-RAN WG2 Meeting #91bis, Sep. 25, 2015.
(Continued)

*Primary Examiner* — Wayne H Cai
(74) *Attorney, Agent, or Firm* — Jefferson IP Law, LLP

(57) ABSTRACT

A communication technique of fusing a fifth generation (5G) communication system for supporting higher data transmission rate beyond a fourth generation (4G) system with an Internet of things (IoT) technology and a system thereof are provided. The communication technique may be used for an intelligent service (for example, a smart home, a smart building, a smart city, a smart car or a connected car, health care, digital education, a retail business, a security and safety related service, or the like) based on the 5G communication technology and the IoT related technology. A method for defining media access control (MAC) sub-header structures suitable for a next generation mobile communication system and applying the MAC sub-header structures to provide a high data transmission rate and a low latency in the next generation mobile communication system is provided.

16 Claims, 153 Drawing Sheets

(30) Foreign Application Priority Data

Dec. 26, 2016 (KR) ........................ 10-2016-0179455
Feb. 28, 2017 (KR) ........................ 10-2017-0026682

(51) Int. Cl.
*H04W 72/04* (2009.01)
*H04W 88/02* (2009.01)
*H04W 84/04* (2009.01)
*H04W 88/08* (2009.01)

(52) U.S. Cl.
CPC .......... *H04W 84/042* (2013.01); *H04W 88/02* (2013.01); *H04W 88/08* (2013.01)

(56) References Cited

U.S. PATENT DOCUMENTS

2011/0164664 A1 7/2011 Torsner et al.
2011/0261836 A1 10/2011 Yang et al.
2015/0163695 A1 6/2015 Li et al.
2016/0128093 A1 5/2016 Lee et al.
2017/0041933 A1* 2/2017 Sammour ............... H04L 47/10
2017/0099660 A1 4/2017 Oh
2017/0289845 A1 10/2017 Chiu et al.
2018/0132304 A1 5/2018 Lee et al.
2019/0297641 A1* 9/2019 Agiwal ............. H04W 72/1289

OTHER PUBLICATIONS

Dongyao Wang et al., 'MAC PDU definition in IEEE 802.16m', IEEE 802.16 Broadband Wireless Access Working Group, Sep. 5, 2008.
LG Electronics Inc. 'Placement of MAC CEs in the MAC PDU', R2-1701458, 3GPP TSG-RAN WG2 #97, Feb. 3, 2017.
Extended European Search Report dated Jul. 3, 2019, issued in a counterpart European application No. 17868117.7-1215/3504899.

* cited by examiner 5-bits LCID and 11-bits L-field without R-field 4-bits LCID and 11-bits L-field with R-field FIG. 1H
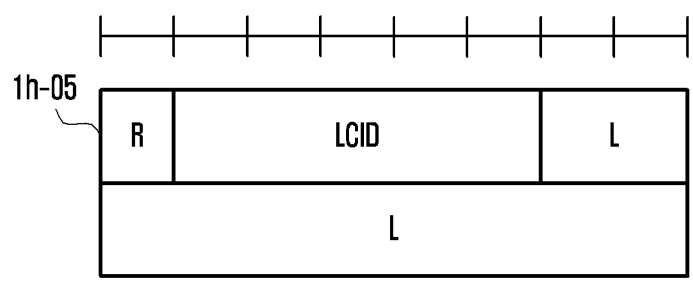
5-bits LCID and 10-bits L-field with R-field
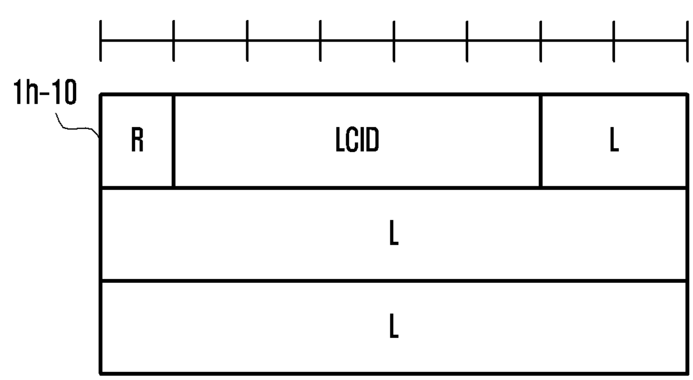
5-bits LCID and 18-bits L-field with R-field FIG. 2FBA
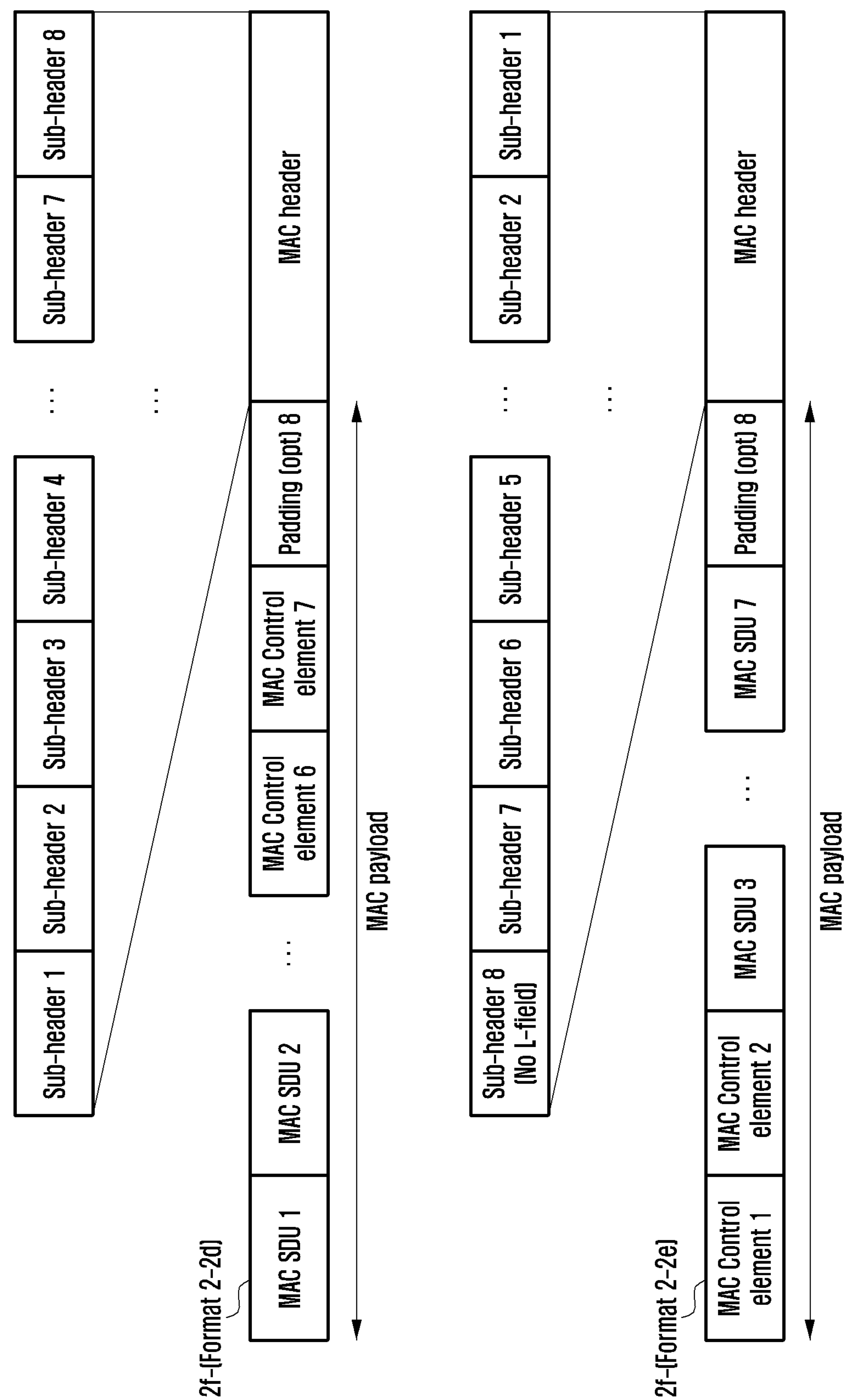

FIG. 2FBB
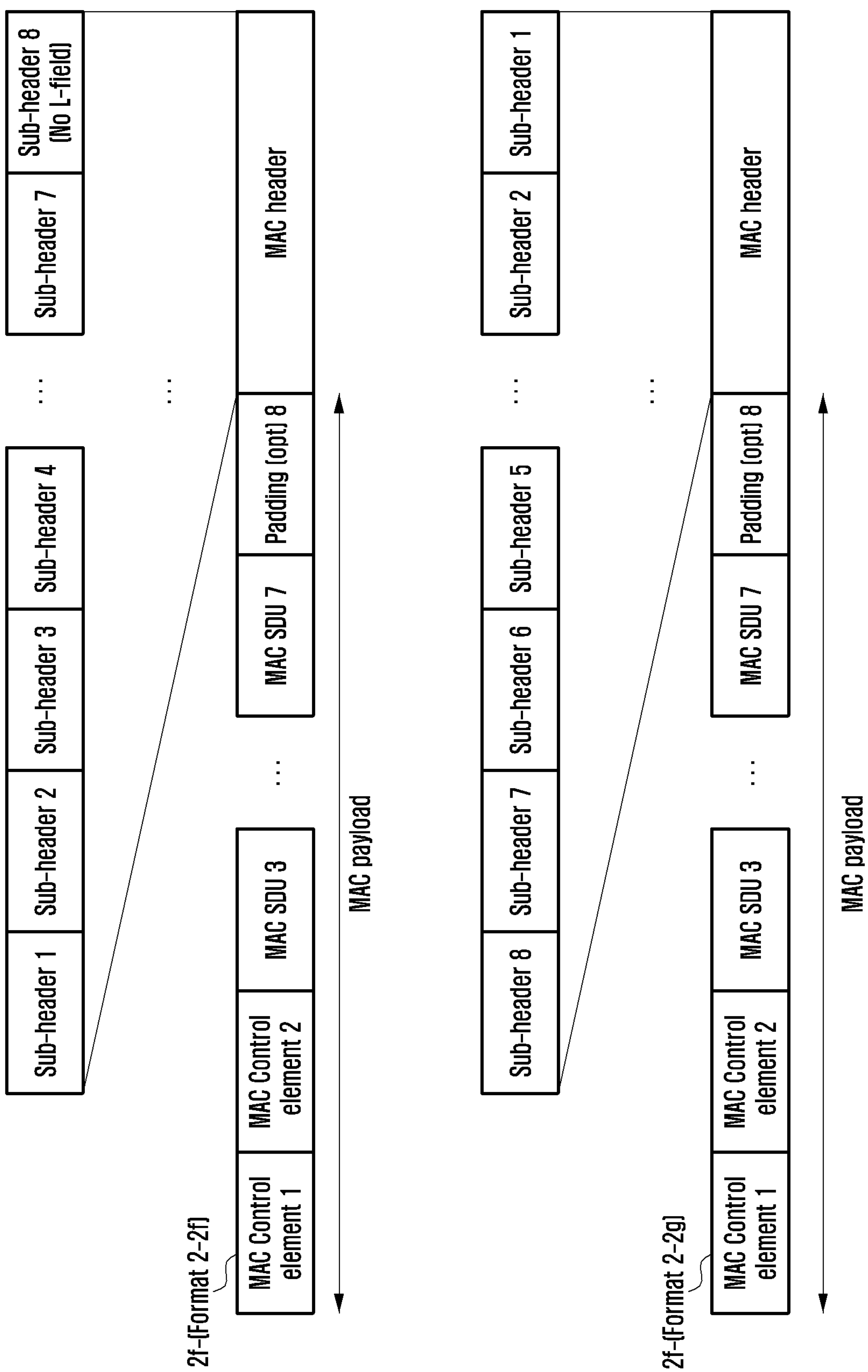

FIG. 2FCA
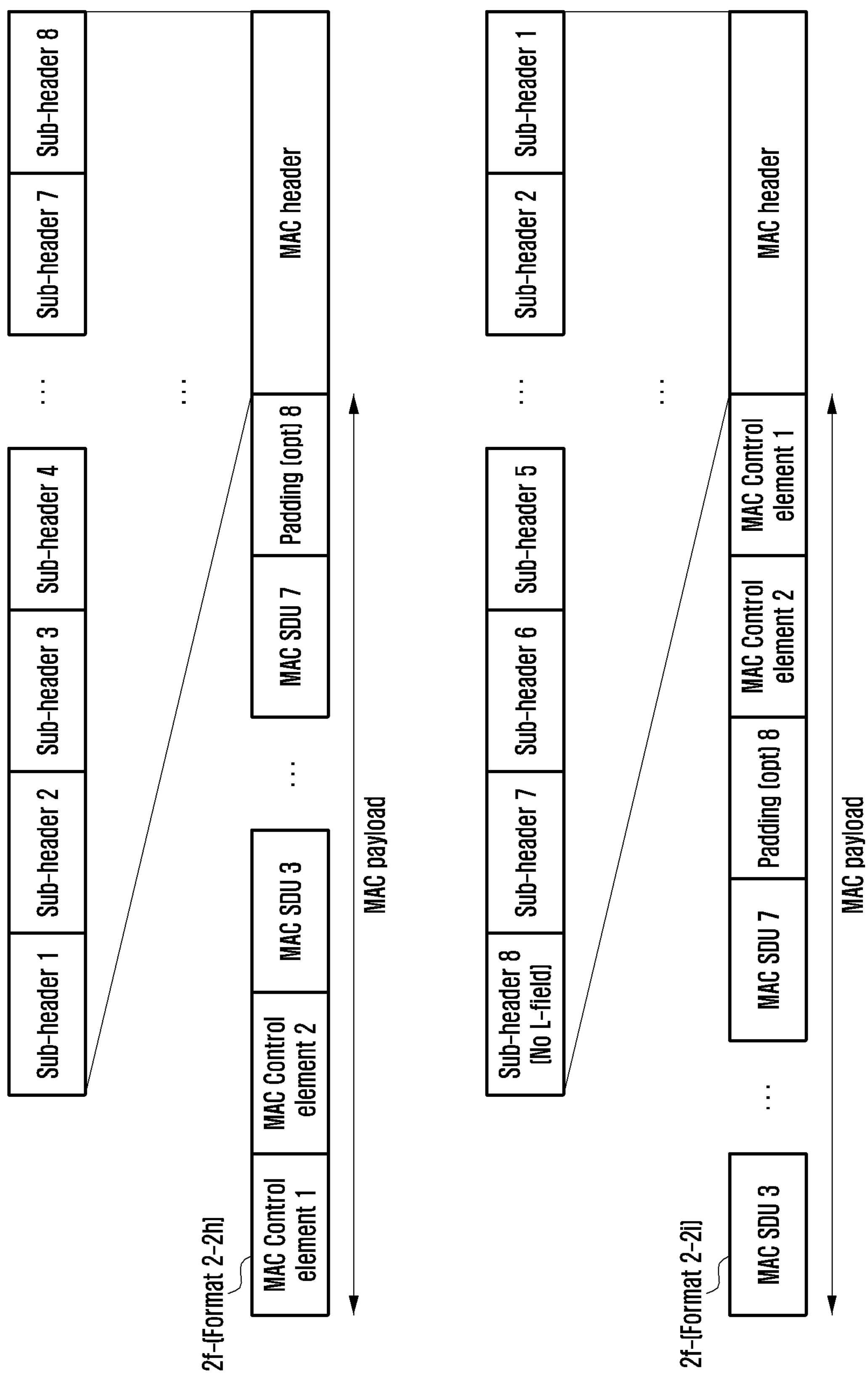

FIG. 2FCB
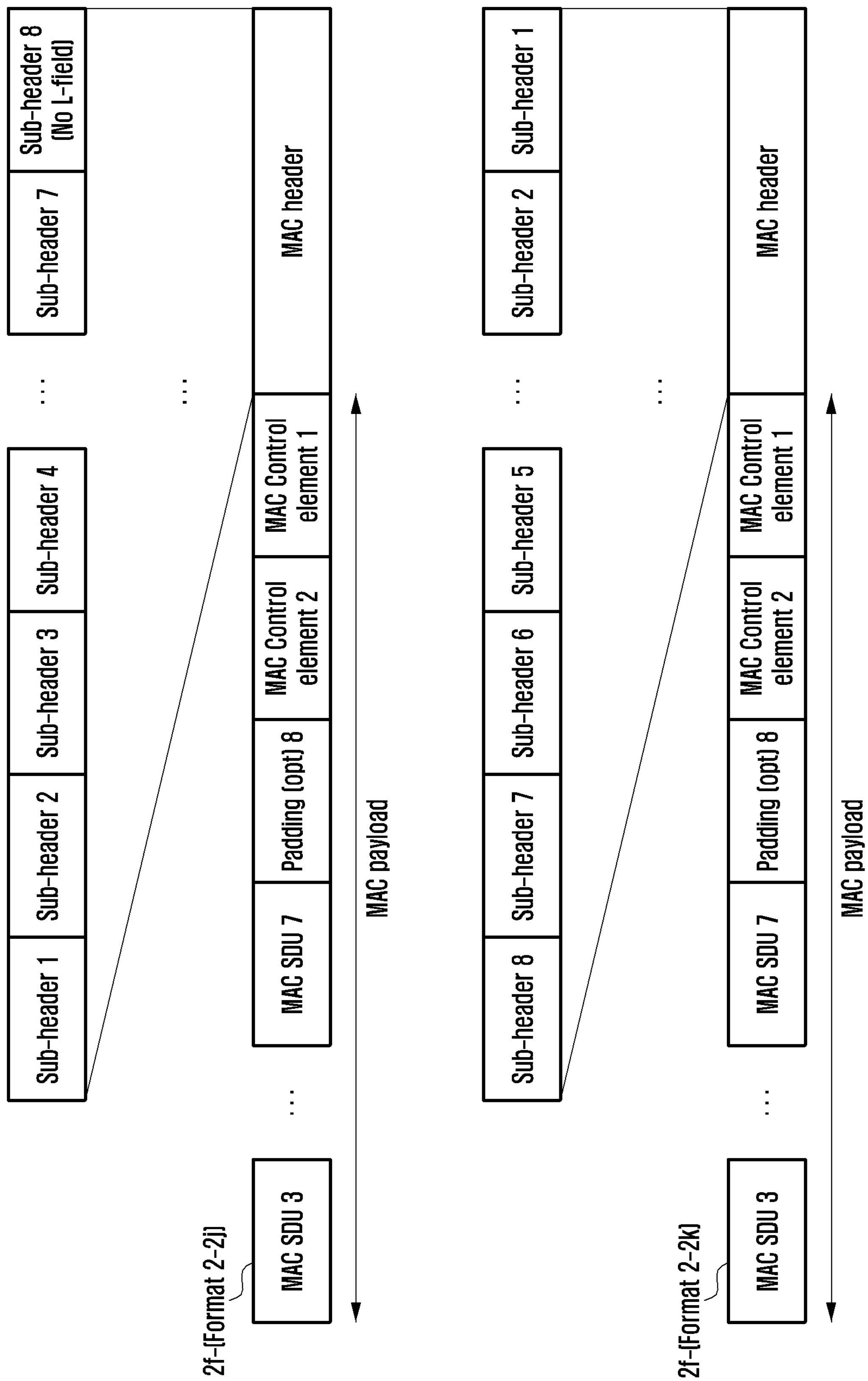

FIG. 2FDA
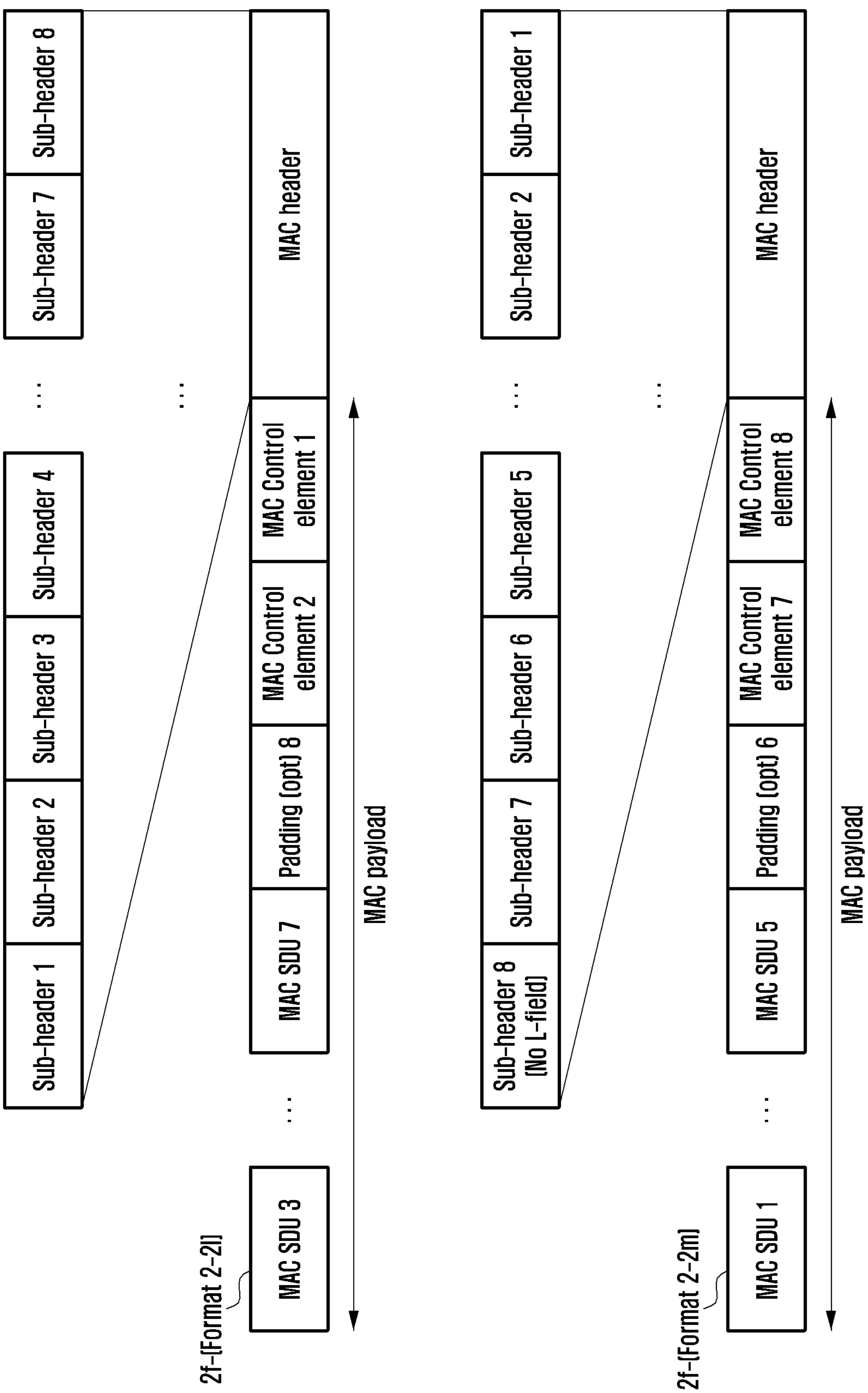

FIG. 2FDB
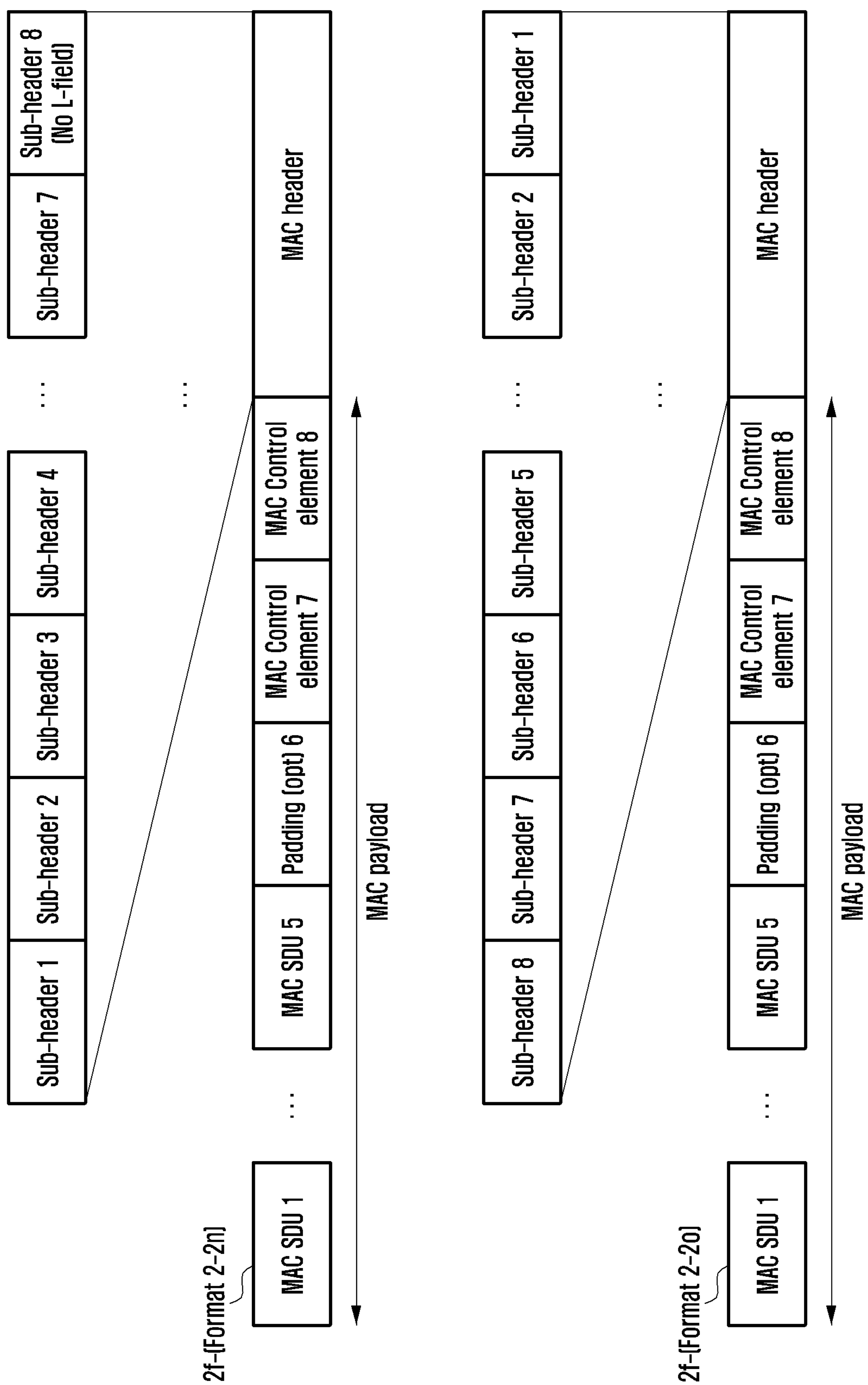

FIG. 2FEA
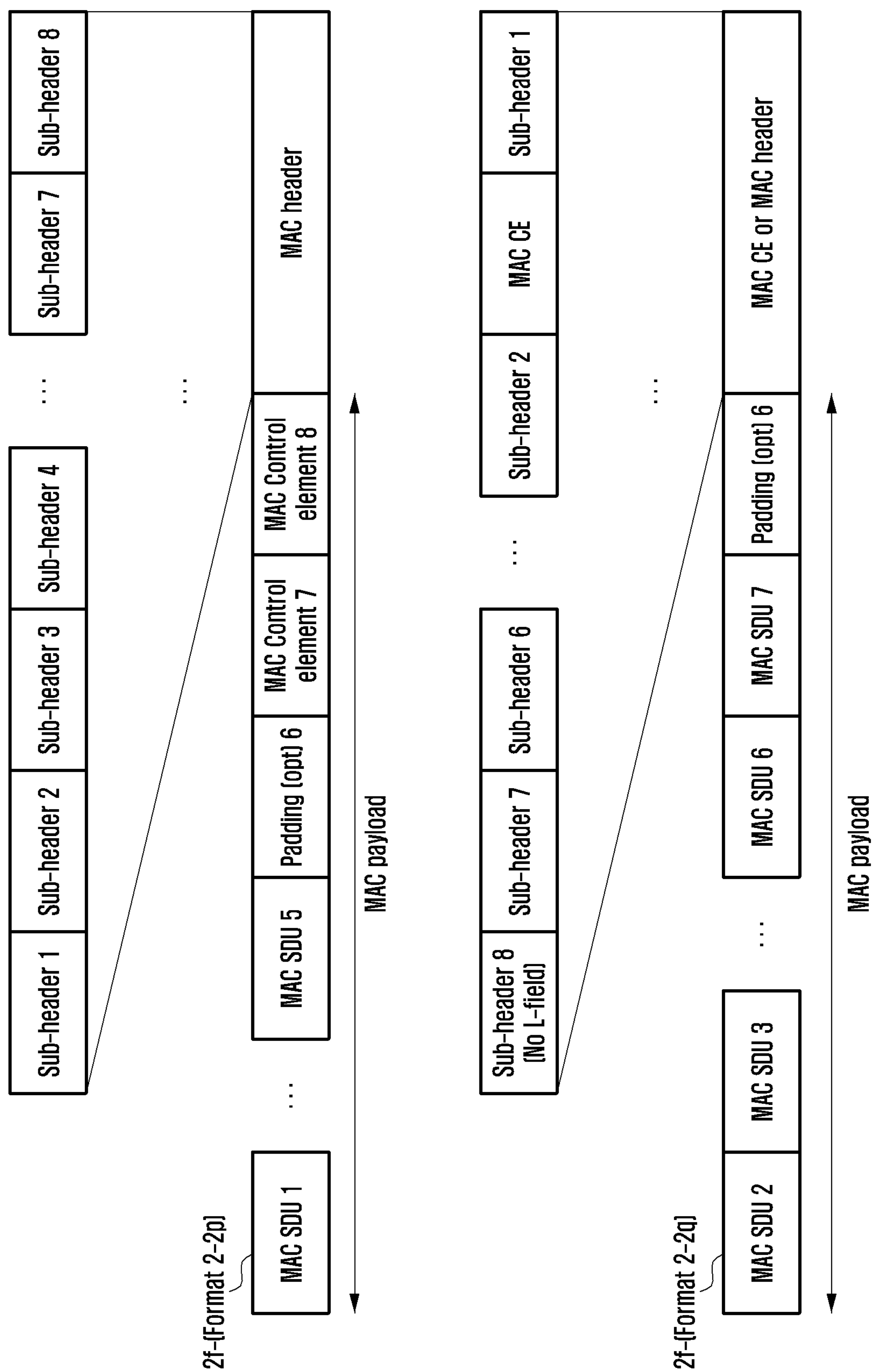

FIG. 2FEB
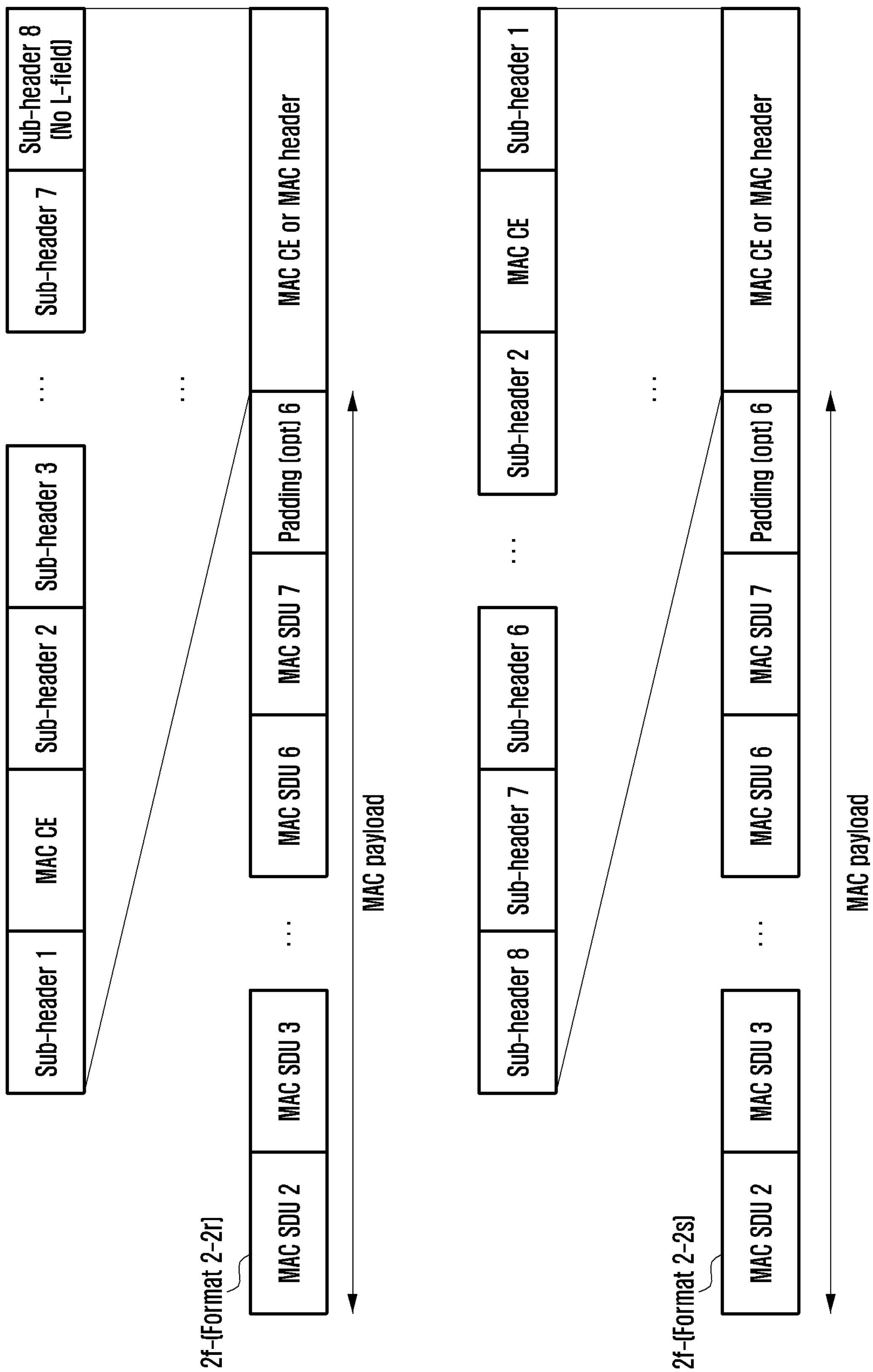

FIG. 3FBA
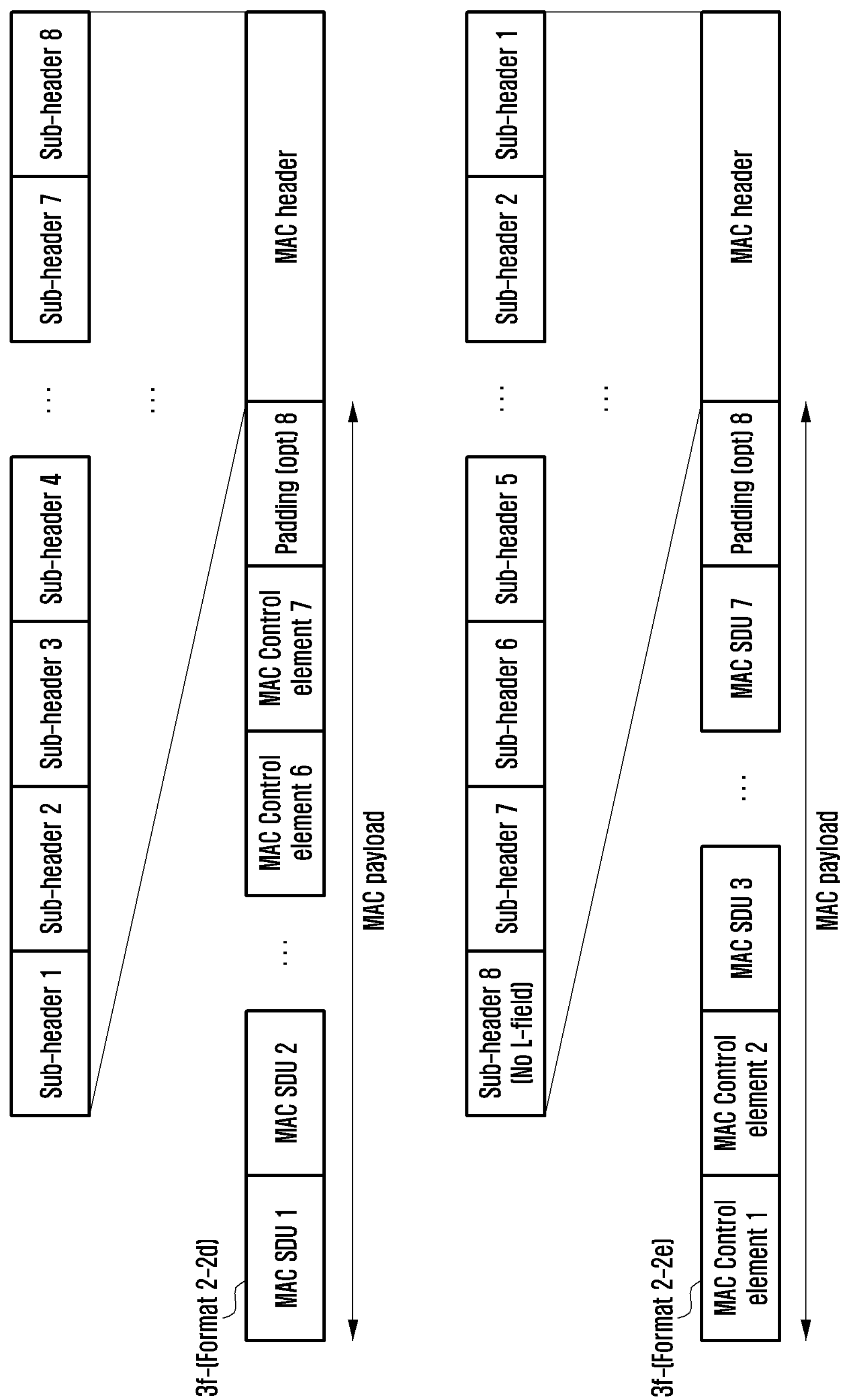

FIG. 3FBB
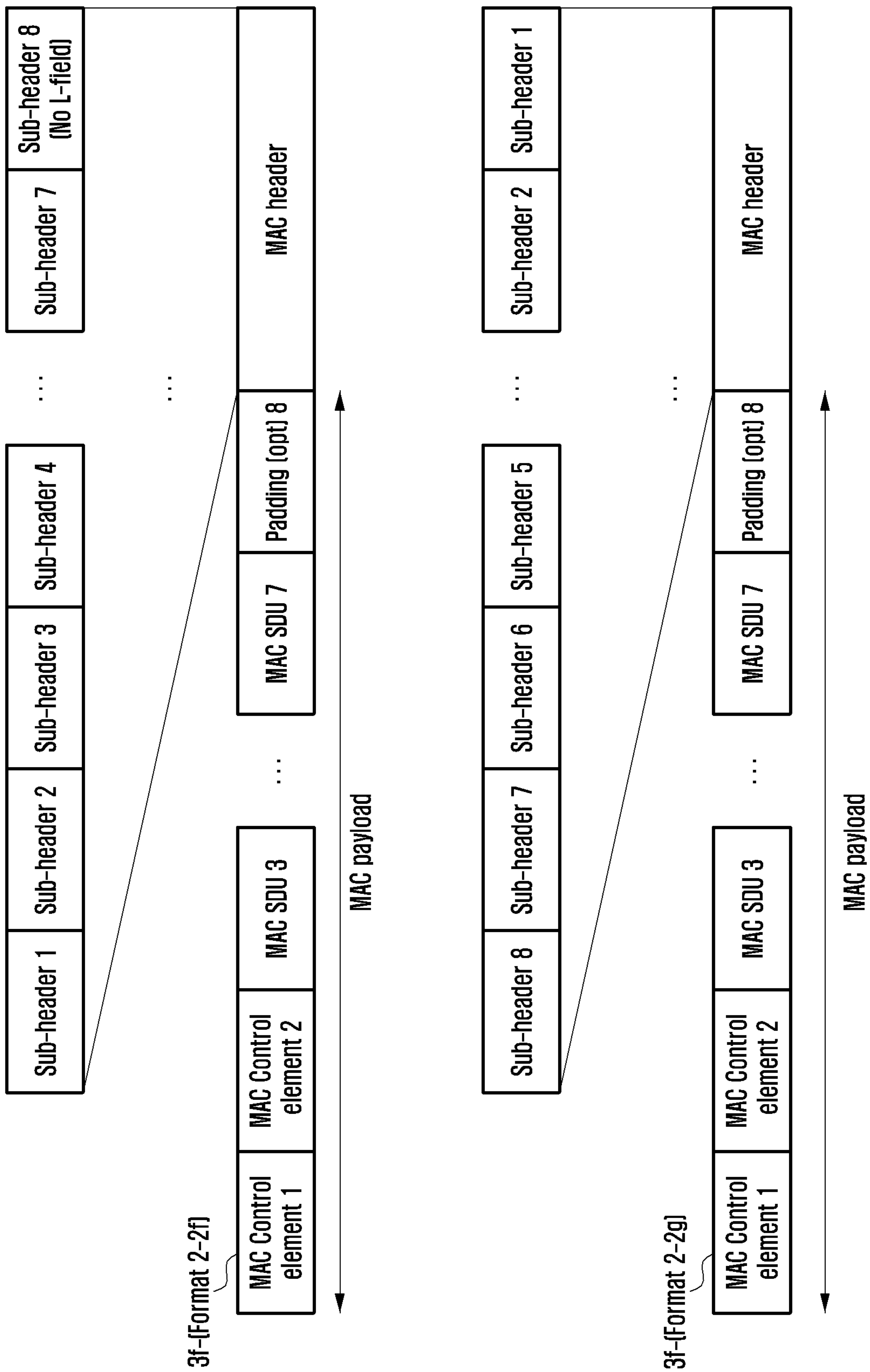

FIG. 3FCA
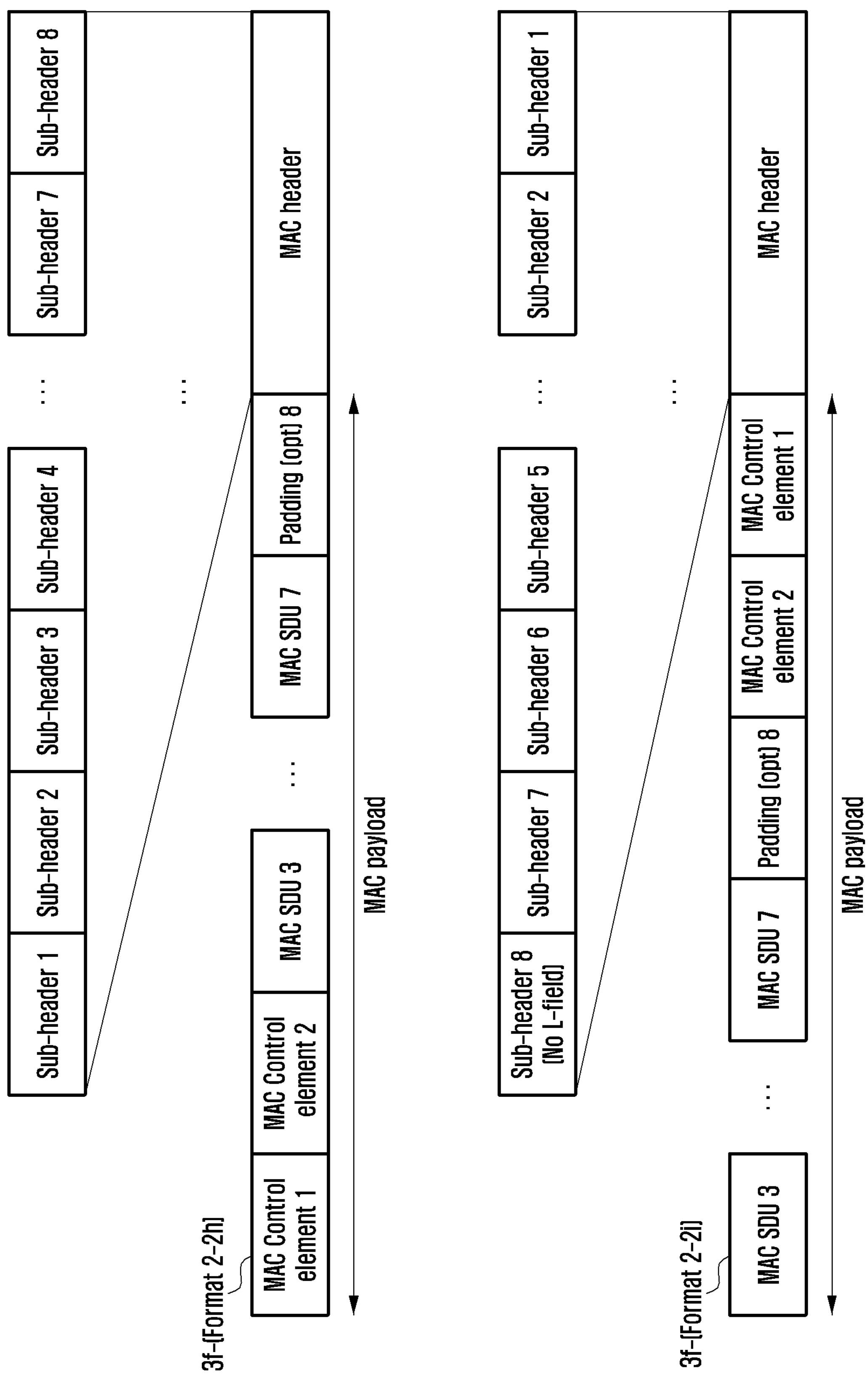

FIG. 3FCB
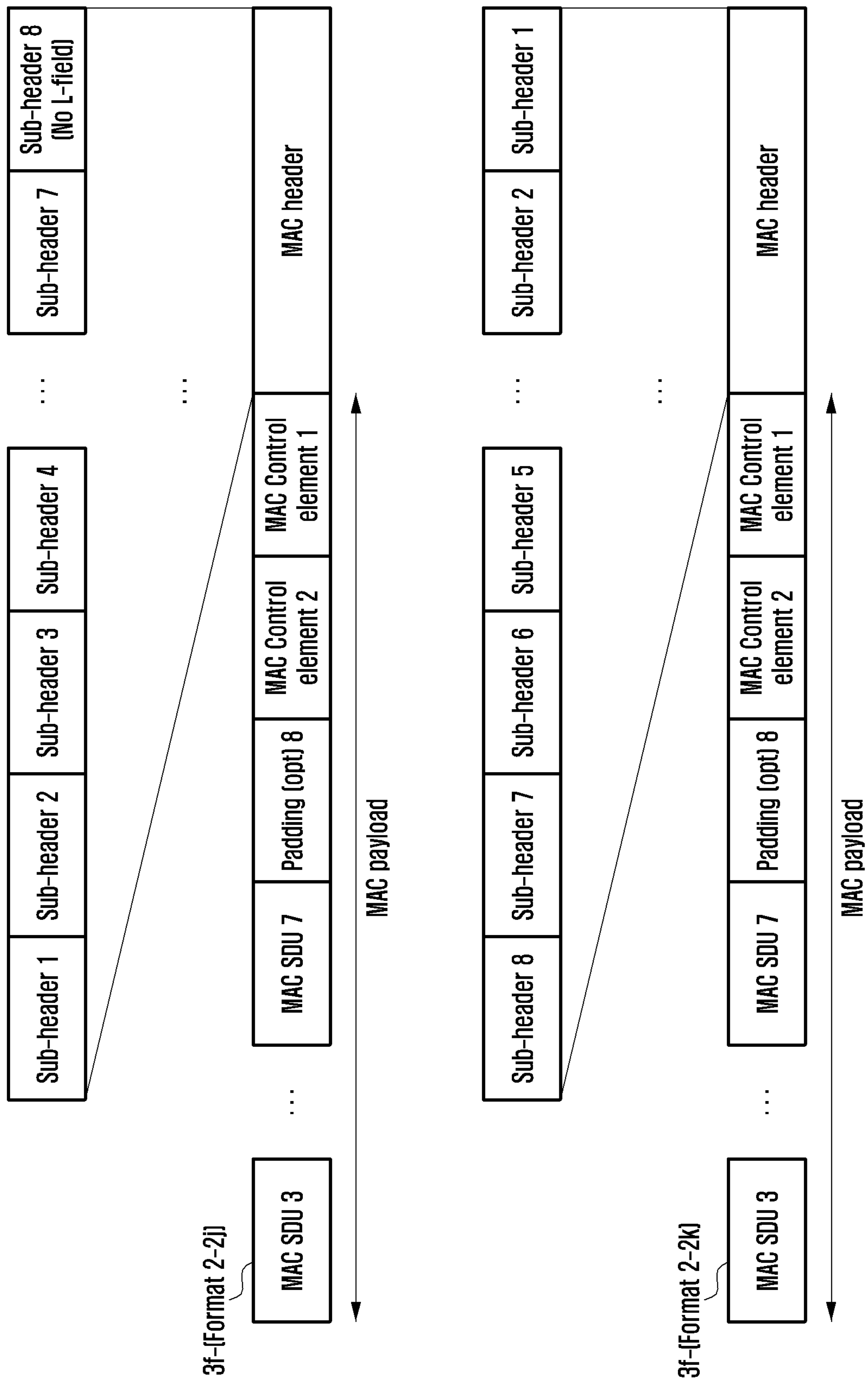

FIG. 3FDA
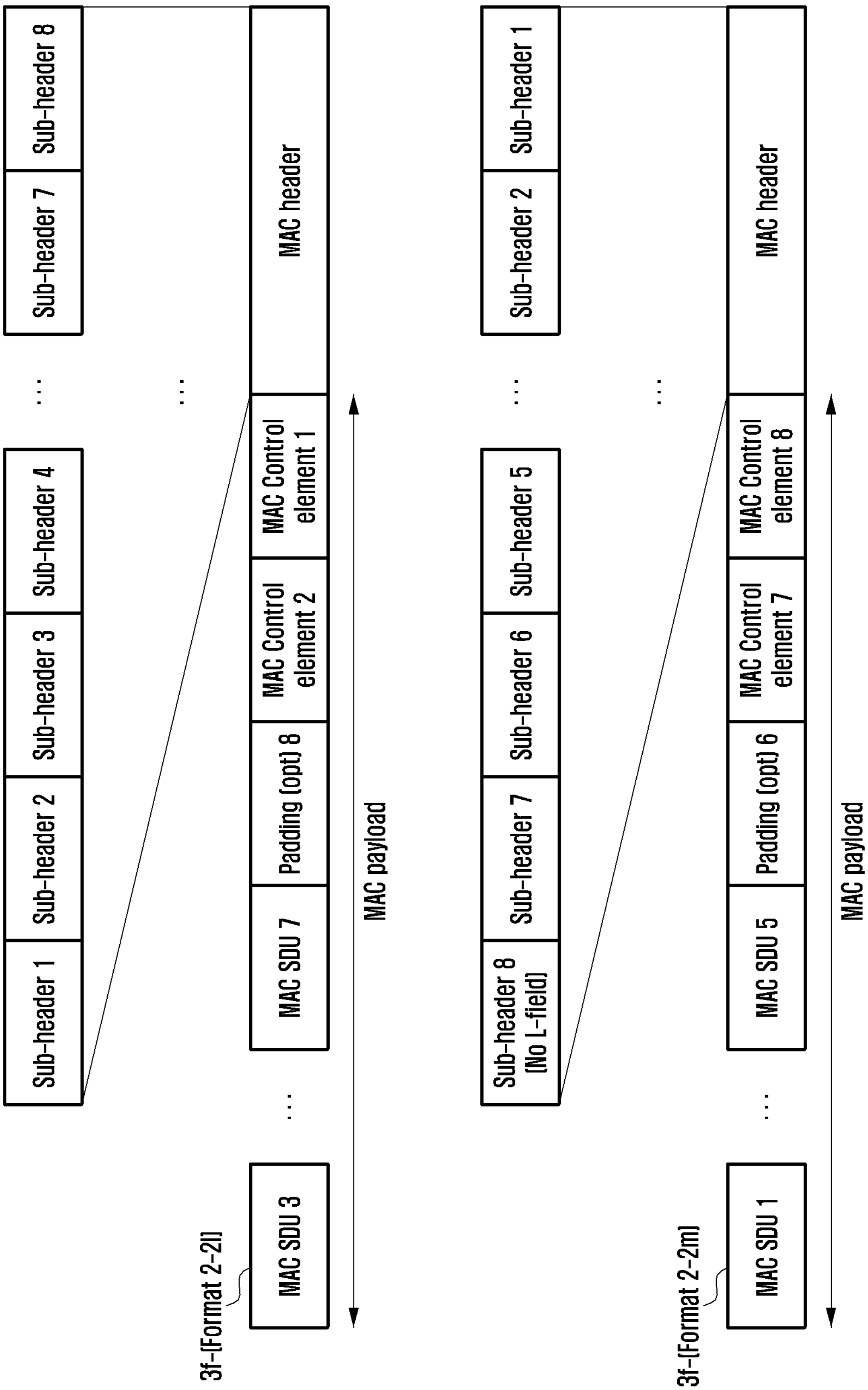

FIG. 3FDB
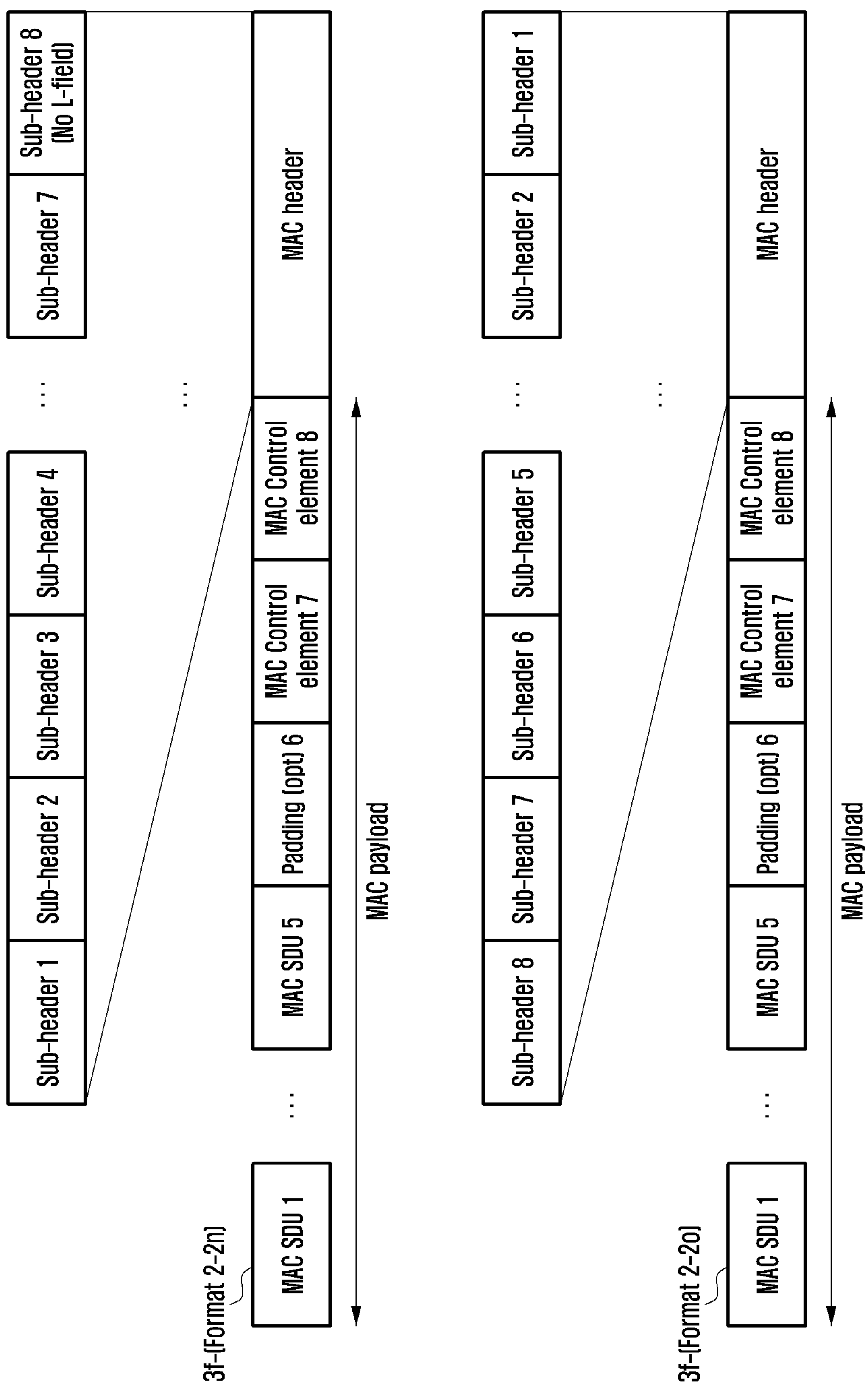

FIG. 3FEA
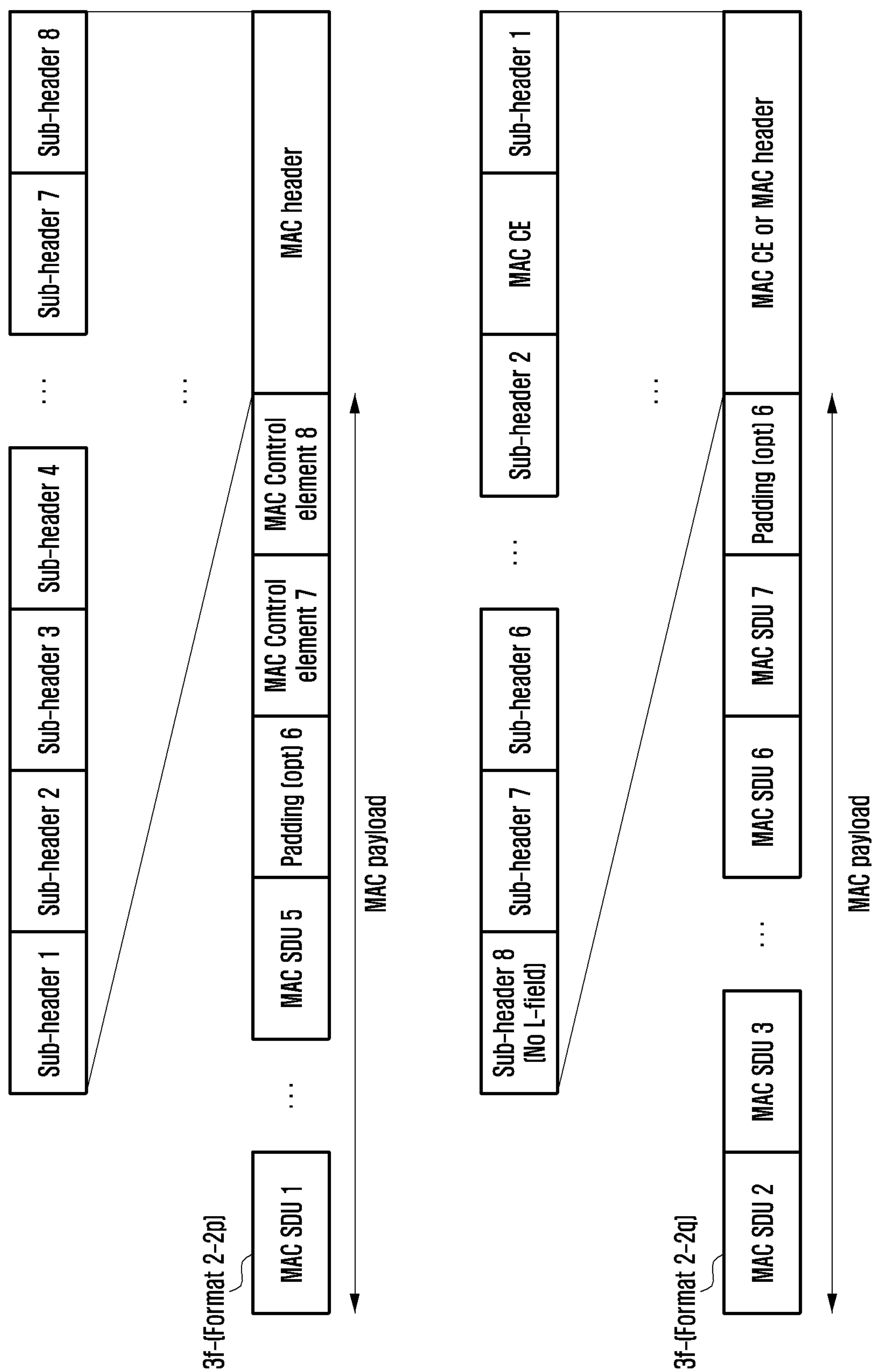

FIG. 3FEB
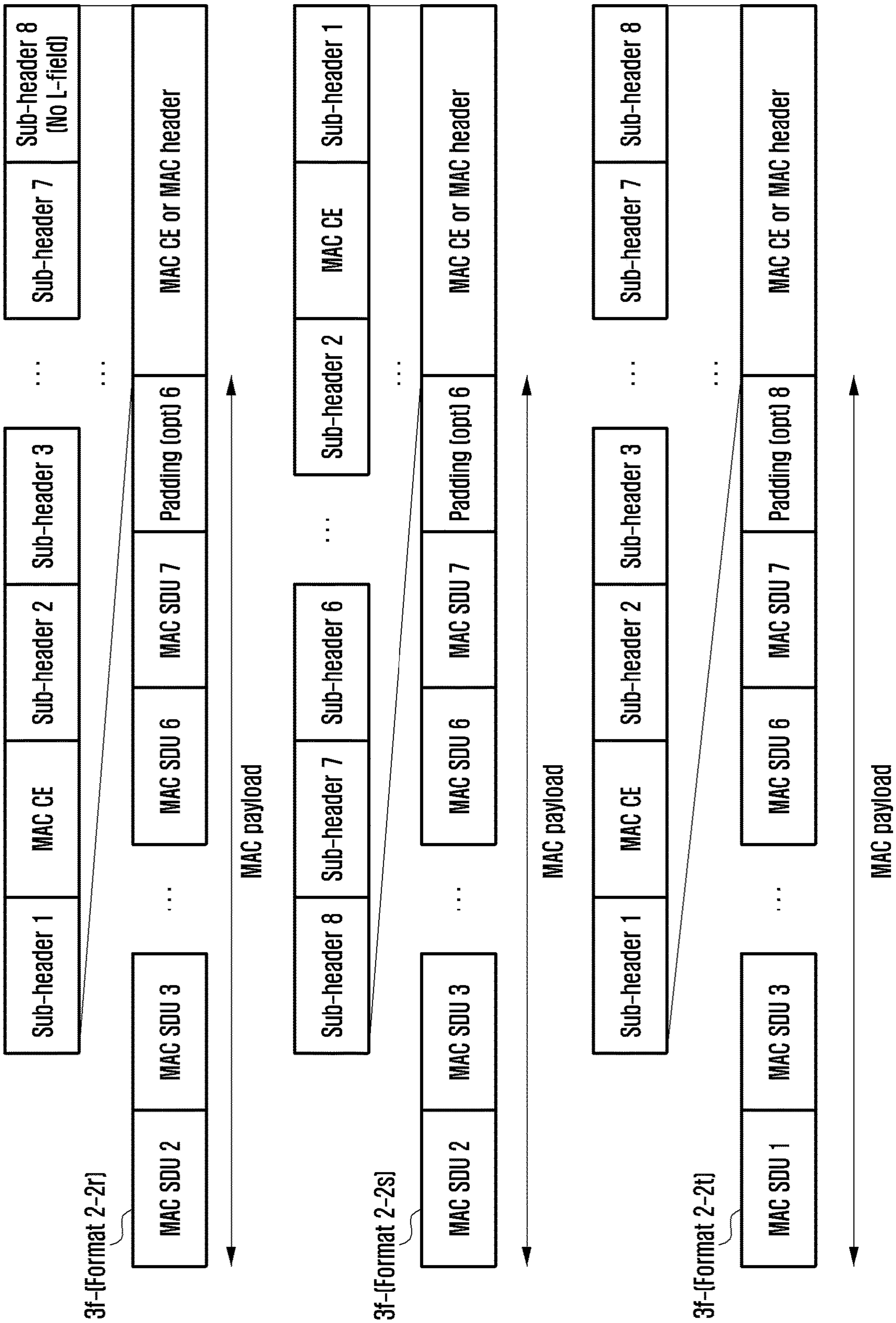

STRUCTURE OF MAC SUB-HEADER FOR SUPPORTING NEXT GENERATION MOBILE COMMUNICATION SYSTEM AND METHOD AND APPARATUS USING THE SAME

CROSS-REFERENCE TO RELATED APPLICATION(S)

This application is a continuation application of prior application Ser. No. 16/287,584, filed on Feb. 27, 2019, which has issued as U.S. Pat. No. 10,410,973 on Sep. 17, 2019; which is a continuation application of prior application Ser. No. 15/802,051, filed on Nov. 2, 2017, which has issued as U.S. Pat. No. 10,257,747 on Apr. 9, 2019; and which was based on and claimed priority under 35 U.S.C. § 119(a) of a Korean patent application number 10-2016-0146353, filed on Nov. 4, 2016, in the Korean Intellectual Property Office, of a Korean patent application number 10-2016-0150848, filed on Nov. 14, 2016, in the Korean Intellectual Property Office, of a Korean patent application number 10-2016-0179455, filed on Dec. 26, 2016, in the Korean Intellectual Property Office, and of a Korean patent application number 10-2017-0026682, filed on Feb. 28, 2017, in the Korean Intellectual Property Office, the disclosure of each of which is incorporated by reference herein in its entirety.

TECHNICAL FIELD

The present disclosure relates to an operation of a terminal and a base station in a next generation mobile communication system. More specifically, the present disclosure relates to a structure of a media access control (MAC) sub-header for supporting a next generation mobile communication system and a method and an apparatus using the same.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency millimeter wave (mmWave) band (e.g., like 60 GHz band). To relieve a path loss of a radio wave and increase a transfer distance of a radio wave in the super high frequency band, in the 5G communication system, technologies, such as beamforming, massive multi-input multi-output (massive MIMO), full dimensional MIMO (FD-MIMO), an array antenna, analog beamforming, and a large scale antenna have been discussed. Further, to improve a network of the system, in the 5G communication system, technologies, such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

The Internet is being evolved from a human-centered connection network through which a human being generates and consumes information to the Internet of Things (IoT) network having information between distributed components like things transmitted and received therethrough and processing the information. The Internet of Everything (IoE) technology in which the big data processing technology, and the like, is combined with the IoT technology by connection with a cloud server, and the like, has also emerged. To implement the IoT, technology elements, such as a sensing technology, wired and wireless communication and network infrastructure, a service interface technology, and a security technology, have been required. Recently, technologies, such as a sensor network, machine to machine (M2M), and machine type communication (MTC) for connecting between things have been researched. In the Internet of things (IoT) environment, an intelligent Internet technology (IT) service that generates anew value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the M2M, and the MTC, have been implemented by techniques, such as the beamforming, the MIMO, and the array antenna. The application of the cloud RAN as the big data processing technology described above may also be considered as an example of the fusing of the 5G communication technology with the IoT technology.

The next generation mobile communication systems aim at a higher data rate and a lower latency. Therefore, a need exists for a more efficient data transport format.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide structures of a media access control (MAC) sub-header suitable for a next generation mobile communication system and a method and an apparatus using the same, MAC packet data unit (PDU) structures suitable for a next generation mobile communication system and a method and an apparatus for selecting the same, and a method and an apparatus for applying padding in the MAC PDU structures suitable for a next generation mobile communication system.

Another aspect of the present disclosure is to provide a method for reducing power consumption of a terminal upon transmitting/receiving data in an inactive state or receiving a paging signal in a next generation mobile communication system.

Another aspect of the present disclosure is to provide a next generation mobile communication system which provides a flow-based quality of service (QoS) but does not have an interface (Uu interface) for supporting the flow-based QoS, unlike the long-term evolution (LTE) of the related art.

Another aspect of the present disclosure is to provide a method and an apparatus for performing a dual-registered operation in a next generation mobile communication system. Another aspect of the present disclosure is to provide a method for operating an new radio (NR) radio link control (RLC) apparatus and an NR packet data convergence protocol (PDCP) apparatus in a next generation mobile communication system since an efficient data transport format is required to provide a service having a high data rate and a low latency in the next generation mobile communication system.

Another aspect of the present disclosure is to provide a method and an apparatus for proposing and selecting MAC PDU structures suitable for a next generation mobile communication system.

Another aspect of the present disclosure is to provide a definition of a condition and a procedure of selecting resource pools if terminals supporting communication between a vehicle and a pedestrian terminal receive a resource pool for a random resource selection and a resource pool for a partial sensing operation from a base station.

In accordance with an aspect of the present disclosure, it is possible to increase the data processing efficiency by defining the structures of the MAC sub-header suitable for the next generation mobile communication system and proposing the method and apparatus using the same.

In accordance with another aspect of the present disclosure, it is possible to provide the service having the high data rate and the low latency by proposing the MAC PDU structures suitable for the next generation mobile communication system and proposing the method and apparatus for selecting the same.

In accordance with another aspect of the present disclosure, it is possible to increase the data processing efficiency by proposing the method and apparatus for applying the padding in the MAC PDU structures suitable for the next generation mobile communication system.

In accordance with another aspect of the present disclosure, it is possible to reduce the power consumption of the terminal in the inactive state and make the data transmission/reception and the reception of the paging signal efficient by proposing the method for setting a discontinuous reception period of an inactive state in a next generation mobile communication system.

In accordance with another aspect of the present disclosure, it is possible to support the flow-based QoS in the Uu interface by allowing the radio interface to support the flow-based QoS and including the conditional or simplified QoS flow identifier (ID) in the next generation mobile communication system.

In accordance with another aspect of the present disclosure, it is possible to apply the method and an apparatus for performing a dual-registered operation in a next generation mobile communication system to the inter-system handover or the inter-heterogeneous system carrier aggregation technology or the like.

In accordance with another aspect of the present disclosure, it is possible to correctly set the operations of the NR RLC apparatus and the NR PDCP apparatus in the next generation mobile communication system to link the apparatuses with the RLC apparatus and the PDCP apparatus of the LTE system without any problem, thereby providing services.

In accordance with another aspect of the present disclosure, it is possible to provide the service having the high data rate and the low latency by proposing the MAC PDU structures suitable for the next generation mobile communication system and proposing the method and apparatus for selecting the same.

In accordance with another aspect of the present disclosure, it is possible to efficiently manage the power consumption of the pedestrian terminal and increase the transmission success rate of the packet having the high priority, by proposing the conditions and procedures for selecting the resource pools of the terminals supporting the communication between the vehicle and the pedestrian terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1H is a diagram illustrating a third MAC sub-header structure suitable for the first MAC PDU structures for a next generation mobile communication system according to an embodiment of the present disclosure;

FIGS. 31A and 31B illustrate a second method for applying padding according to an embodiment of the present disclosure;

FIG. 8O is a diagram illustrating a segmentation control information (SCI)-based segmentation procedure according to a 8-8-th embodiment of the present disclosure;

Throughout the drawings, it should be noted that like reference numbers are used to depict the same or similar elements, features, and structures.

DETAILED DESCRIPTION

Figure 1A:
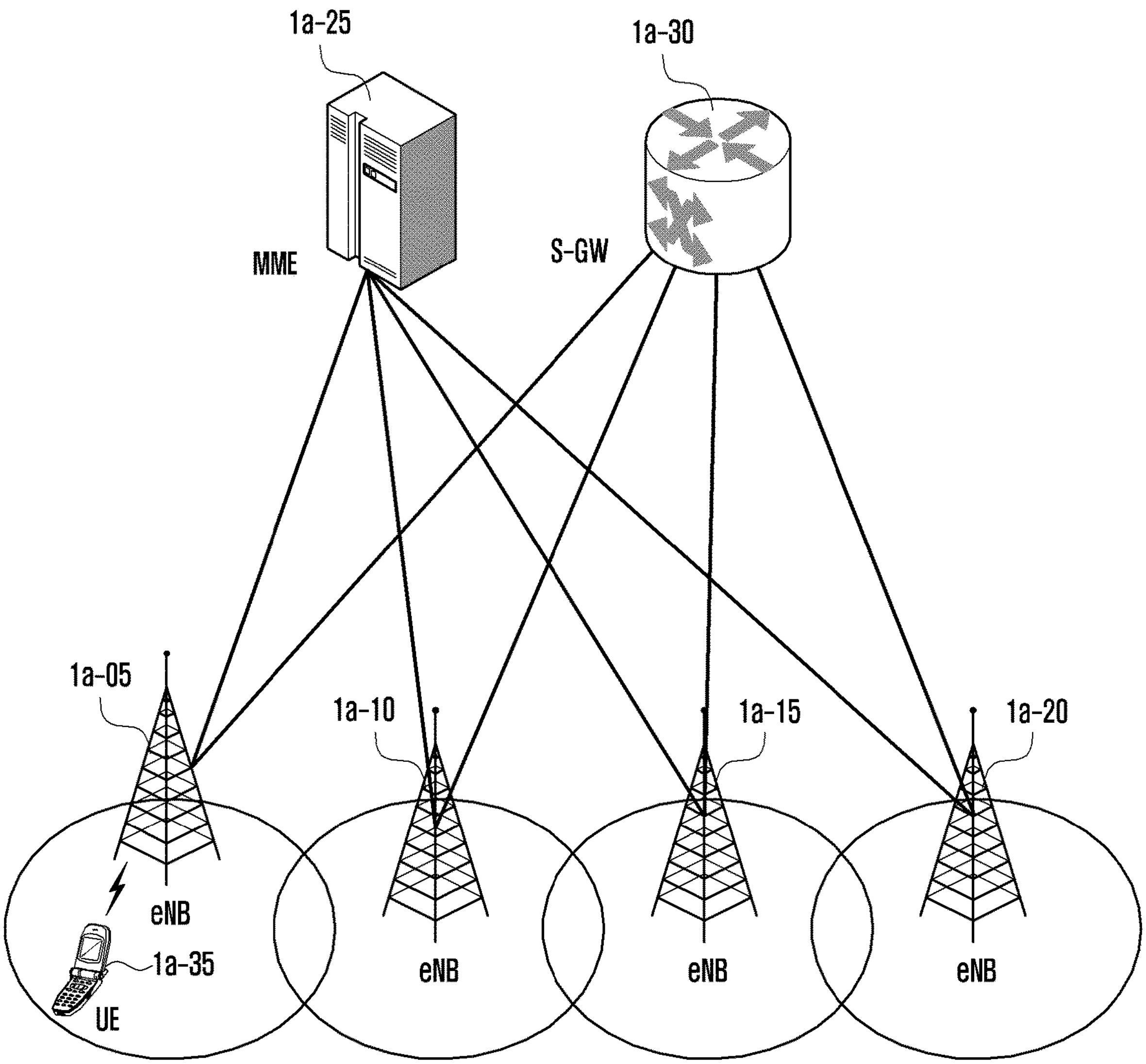
FIG. 1A is a diagram illustrating a structure of a long term evolution (LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Further, in an orthogonal frequency division multiplexing (OFDM)-based wireless communication system, in particular, a 3$^{rd}$ generation partnership project (3GPP) evolved universal terrestrial radio access (EUTRA) standard will be mainly described. However, a main subject of the present disclosure may be slightly changed to be applied to other communication systems having similar technical backgrounds and channel forms without greatly departing the scope of the present disclosure, which may be determined by those skilled in the art to which the present disclosure pertains. For example, a main subject may also be applied to a multicarrier HSPA supplying the carrier aggregation.

In describing the various embodiments of the present disclosure, a description of technical contents which are well known to the art to which the present disclosure belongs and are not directly connected with the present disclosure will be omitted. The reason why an unnecessary description is omitted is to make the gist of the present disclosure clear.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art may easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses generate means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operations on the computer or the other programmable data processing apparatuses to generate processes executed by the computer to thereby execute the computer or the other programmable data processing apparatuses may also provide operations for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments of the present disclosure. For example, two blocks that are consecutively illustrated may be simultaneously performed in fact or be performed in a reverse sequence depending on corresponding functions sometimes.

Here, the term '~unit' used in the present embodiment means software or hardware components, such as a field programmable gate array (FPGA) and application specific integrated circuits (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components, such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may further be separated into additional components and '~units'. In addition, the components and the '~units' may also be implemented to reproduce one or more central processing units (CPUs) within a device or a security multimedia card.

First Embodiment

FIG. 1A is a diagram illustrating a structure of a long term evolution (LTE) system according to an embodiment of the present disclosure.

Referring to FIG. 1A, a radio access network of an LTE system is configured to include next generation base stations (evolved node B, hereinafter, eNB, Node B, or base station) 1*a*-05, 1*a*-10, 1*a*-15, and 1*a*-20, a mobility management entity (MME) 1*a*-25, and a serving-gateway (S-GW) 1*a*-30. User equipment (hereinafter, UE or terminal) 1*a*-35 accesses an external network through the eNBs 1*a*-05 to 1*a*-20 and the S-GW 1*a*-30.

A user equipment (hereinafter, UE or terminal) 1*a*-35 accesses an external network through the eNBs 1*a*-05 to 1*a*-20 and the S-GW 1*a*-30. The eNB is connected to the UE 1*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmit power status, and a channel state of the terminals is required. Here, the eNBs 1*a*-05 to 1*a*-20 take charge of the collecting and scheduling. One eNB generally controls a plurality of cells. For example, to implement a transmission rate of 100 Mbps, the LTE system uses, as a radio access technology, OFDM in, for example, a bandwidth of 20 MHz. Further, an adaptive modulation & coding (hereinafter, called AMC) determining a modulation scheme and a channel coding rate depending on a channel status of the terminal is applied. The S-GW 1*a*-30 is an apparatus for providing a data bearer and generates or removes the data bearer according to the control of the MME 1*a*-25. The MME is an apparatus for performing a mobility management function for the terminal and various control functions and is connected to a plurality of base stations.

Figure 1B:
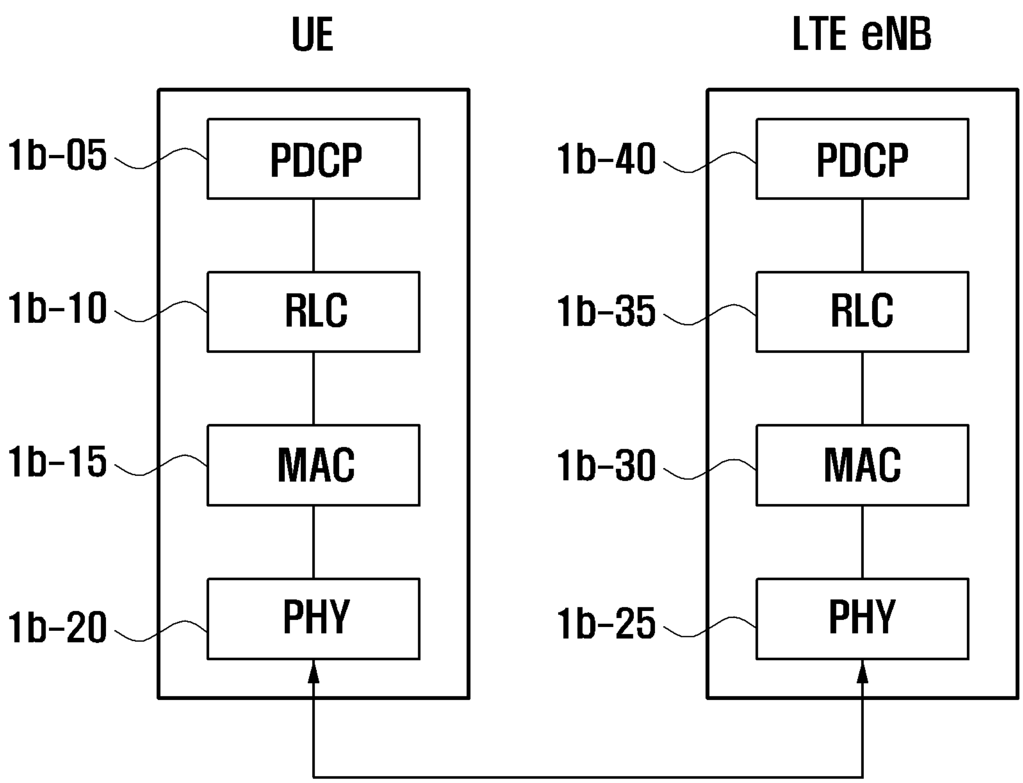
FIG. 1B is a diagram illustrating a radio protocol structure in an LTE system according to an embodiment of the present disclosure.

FIG. 1B is a diagram illustrating a radio protocol structure in an LTE system according to an embodiment of the present disclosure.

Referring to FIG. 1B, the radio protocol of the LTE system is configured to include packet data convergence protocols (PDCPs) 1*b*-05 and 1*b*-40, radio link controls (RLCs) 1*b*-10 and 1*b*-35, and medium access controls (MMCs) 1*b*-15 and 1*b*-30 in the terminal and the eNB, respectively. The PDCPs 1*b*-05 and 1*b*-40 are in charge of operations, such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer power distribution units (PDU)s at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer subscriber data units (SDUs) at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 1*b*-10 and 1*b*-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The media access controls (MACs) 1*b*-15 and 1*b*-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between Logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 1*b*-20 and 1*b*-25 perform an operation of channel-coding and modulating upper layer data, making the upper layer data as an OFDM symbol and transmitting the symbol to a radio channel, or demodulating and channel-decoding the OFDM symbol received through the radio channel and transmitting the demodulated and channel-decoded OFDM symbol to the upper layer.

Figure 1C:
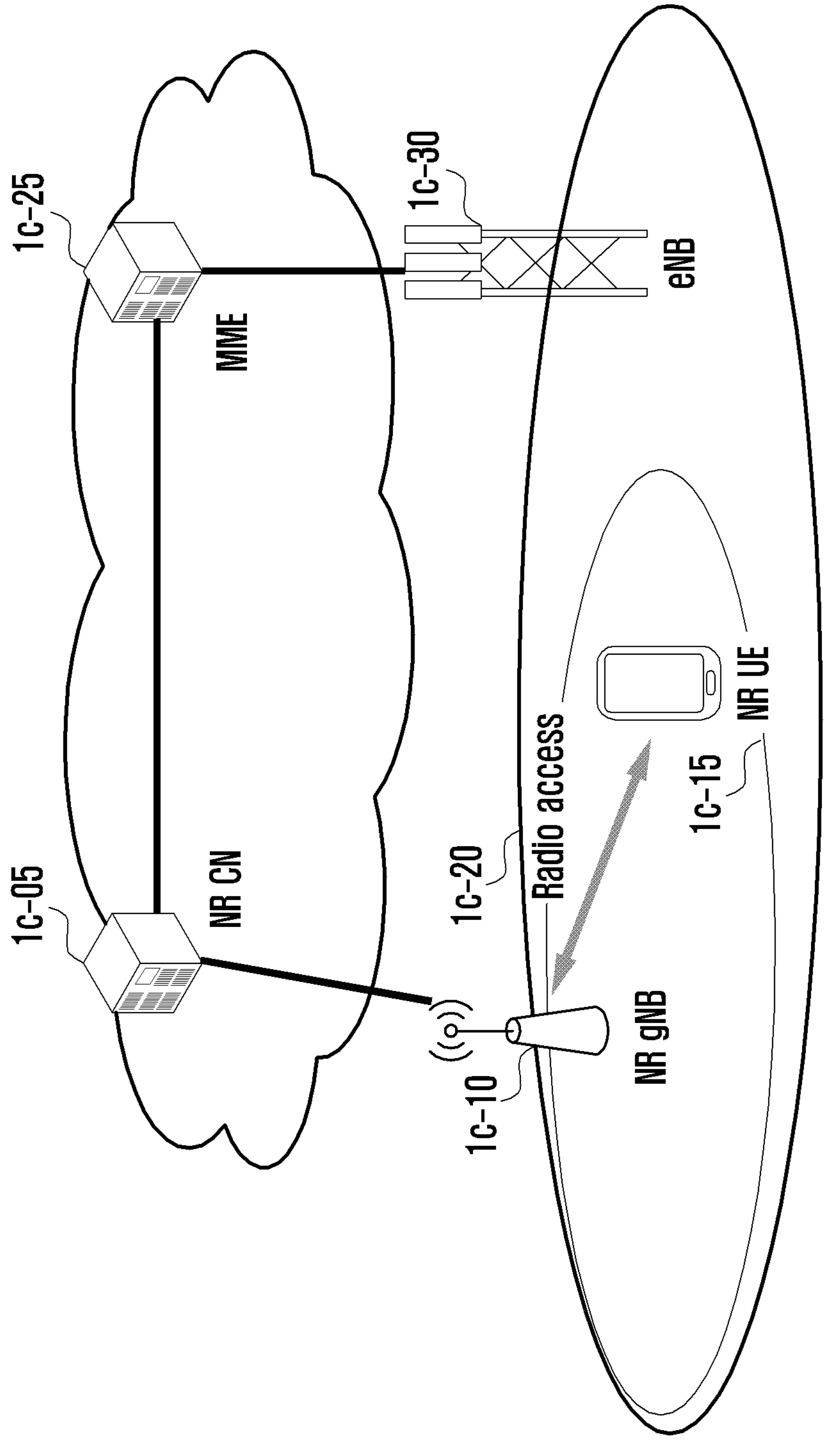
FIG. 1C is a diagram illustrating a structure of a next generation mobile communication system according to an embodiment of the present disclosure.

FIG. 1C is a diagram illustrating a structure of a next generation mobile communication system according to an embodiment of the present disclosure.

Referring to FIG. 1C, a radio access network of a next generation mobile communication system (hereinafter referred to as NR or 5G) is configured to include a next generation base station (New radio node B, hereinafter NR gNB or NR base station) 1*c*-10 and a new radio core network (NR CN) 1*c*-05. The user terminal (new radio user equipment, hereinafter, NR UE or UE) 1*c*-15 accesses the external network through the NR gNB 1*c*-10 and the NR CN 1*c*-05.

In FIG. 1C, the NR gNB 1*c*-10 corresponds to an evolved node B (eNB) of the existing LTE system. The NR gNB is connected to the NR UE 1*c*-15 via a radio channel and may provide a service superior to the existing node B. In the next generation mobile communication system, since all user traffics are served through a shared channel, an apparatus for collecting state information, such as a buffer state, an available transmit power state, and a channel state of the UEs to perform scheduling is required. The NR NB 1*c*-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a radio access technology 1*c*-20. Further, an adaptive modulation & coding (hereinafter, called AMC) determining a modulation scheme and a channel coding rate depending on the channel status of the terminal is applied. The NR CN 1*c*-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 1*c*-25 through the network interface. The MME 1 is connected to the eNB 1*c*-30 which is the existing base station.

Figure 1D:
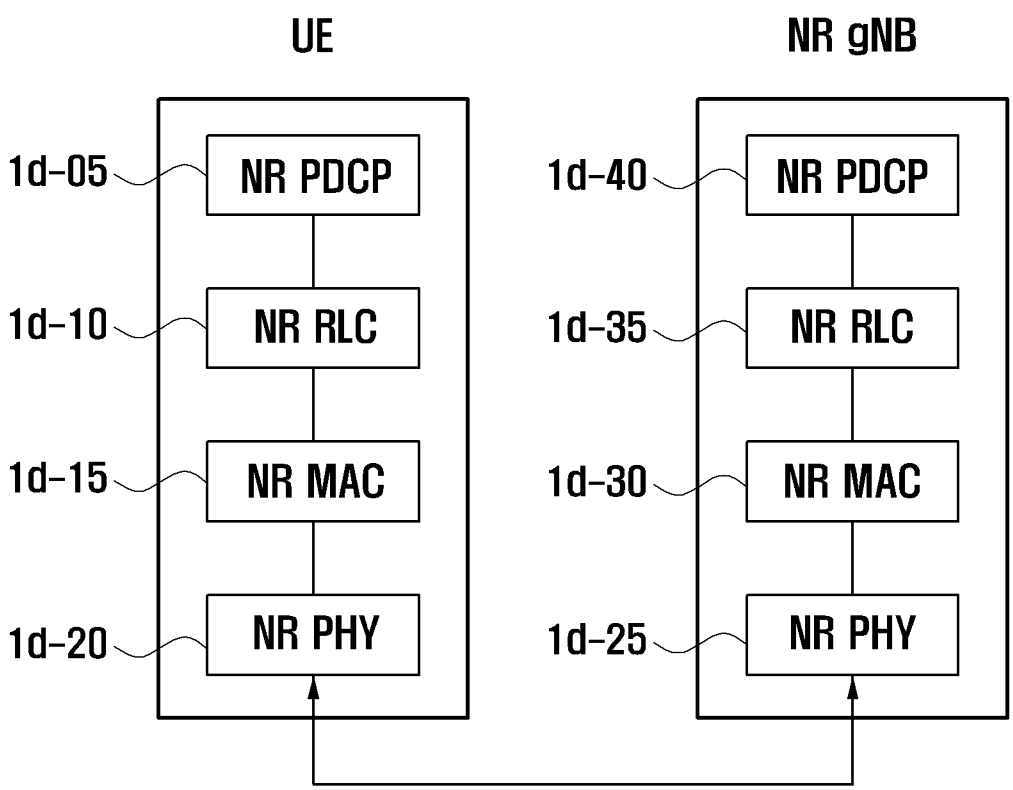
FIG. 1D is a diagram illustrating a radio protocol structure of a next generation mobile communication system according to an embodiment of the present disclosure.

FIG. 1D is a diagram illustrating a radio protocol structure of a next generation mobile communication system according to an embodiment of the present disclosure.

Referring to FIG. 1D, the radio protocol of the next generation mobile communication system is configured to include NR PDCPs 1*d*-05 and 1*d*-40, NR RLCs 1*d*-10 and 1*d*-35, and NR MACs 1*d*-15 and 1*d*-30 in the terminal and the NR base station. The main functions of the NR PDCPs 1*d*-05 and 1*d*-40 may include some of the following functions.

Header compression and decompression function (Header compression and decompression: ROHC only)

Transfer function of user data (Transfer of user data)

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink.)

In this case, the reordering function of the NR PDCP apparatus refers to a function of rearranging PDCP PDUs received in a lower layer in order based on a PDCP sequence number (SN) and may include a function of transferring data to an upper layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 1*d*-10 and 1*d*-35 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error correction through HARQ)

Concatenation, segmentation, reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

In this case, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the upper layer in order when there is the lost RLC SDU, a function of transferring all the received RLC SDUs to the upper layer before a predetermined timer starts if the timer expires even if there is the lost RLC SDU, or a function of transferring all the RLC SDUs received until now to the upper layer in order if the predetermined timer expires even if there is the lost RLC SDU. In this case, the out-of-sequence delivery function of the NR RLC apparatus refers to a function of directly delivering the RLC SDUs received from the lower layer to the upper layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 1*d*-15 and 1*d*-30 may be connected to several NR RLC layer apparatus configured in one terminal, and the main functions of the NR MAC may include some of the following functions.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

The NR PHY layers 1*d*-20 and 1*d*-25 may perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

The following Table 1 describes the information that may be included in the MAC header.

TABLE 1

Variables in MAC Header

| Variable | Usage |
|---|---|
| LCID | The LCID may indicate the identifier of the RLC entity that generates the RLC PDU (or MAC SDU) received from the upper layer. Alternatively, the LCID may indicate the MAC control element (CE) or the padding. Further, the LCID may be defined differently depending on the channel to be transmitted. For example, the LCID may be defined differently according to DL-SCH, UL-SCH, and MCH. |
| L | The L may indicate a length of the MAC SDU, and may indicate a length of the MAC CE having a variable length. In the case of the MAC CE having a fixed length, the L-field may be omitted. The L-field may be omitted for predetermined reasons. The predetermined reasons are the case where the size of the MAC SDU is fixed, the size of the MAC PDU is informed from the transmitting side to the receiving side, or the length may be calculated by calculation at the receiving side. |
| F | The F indicates the size of the L-field. If there is no L-field, the F may be omitted, and if there is the F-field, the size of the L-field can be limited to a predetermined size. |
| F2 | The F2 indicates the size of the L-field. If there is no L-field, the F2 may be omitted, and if there is the F2-field, the size of the L-field may be limited to a predetermined size and the L-field may be limited to a size different from the F-field. For example, the F2-field may indicate a larger size than the F-field. |
| E | E indicates other headers in the MAC heater. For example, if the E has a value of 1, variables of another MAC header may be come. However, if the E has a value of 0, the MAC SDU, the MAC CE, or the Padding may be come. |
| R | Reserved bit. |

Figure 1E:
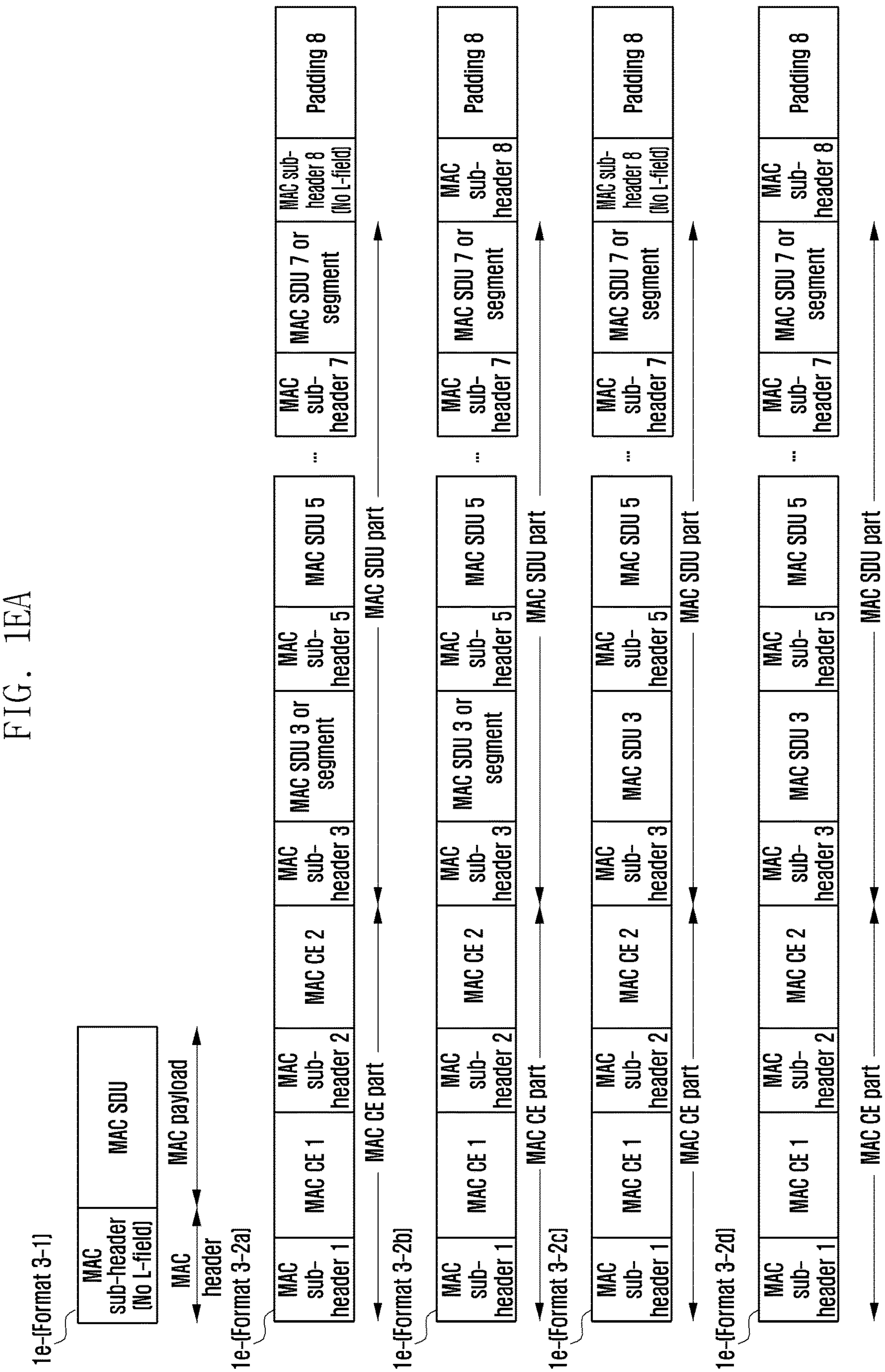
FIGS. 1EA, 1EB, and 1EC are diagrams illustrating a first media access control (MAC) packet data unit (PDU) structure for a next generation mobile communication system according to an embodiment of the present disclosure.
Figure 1E:
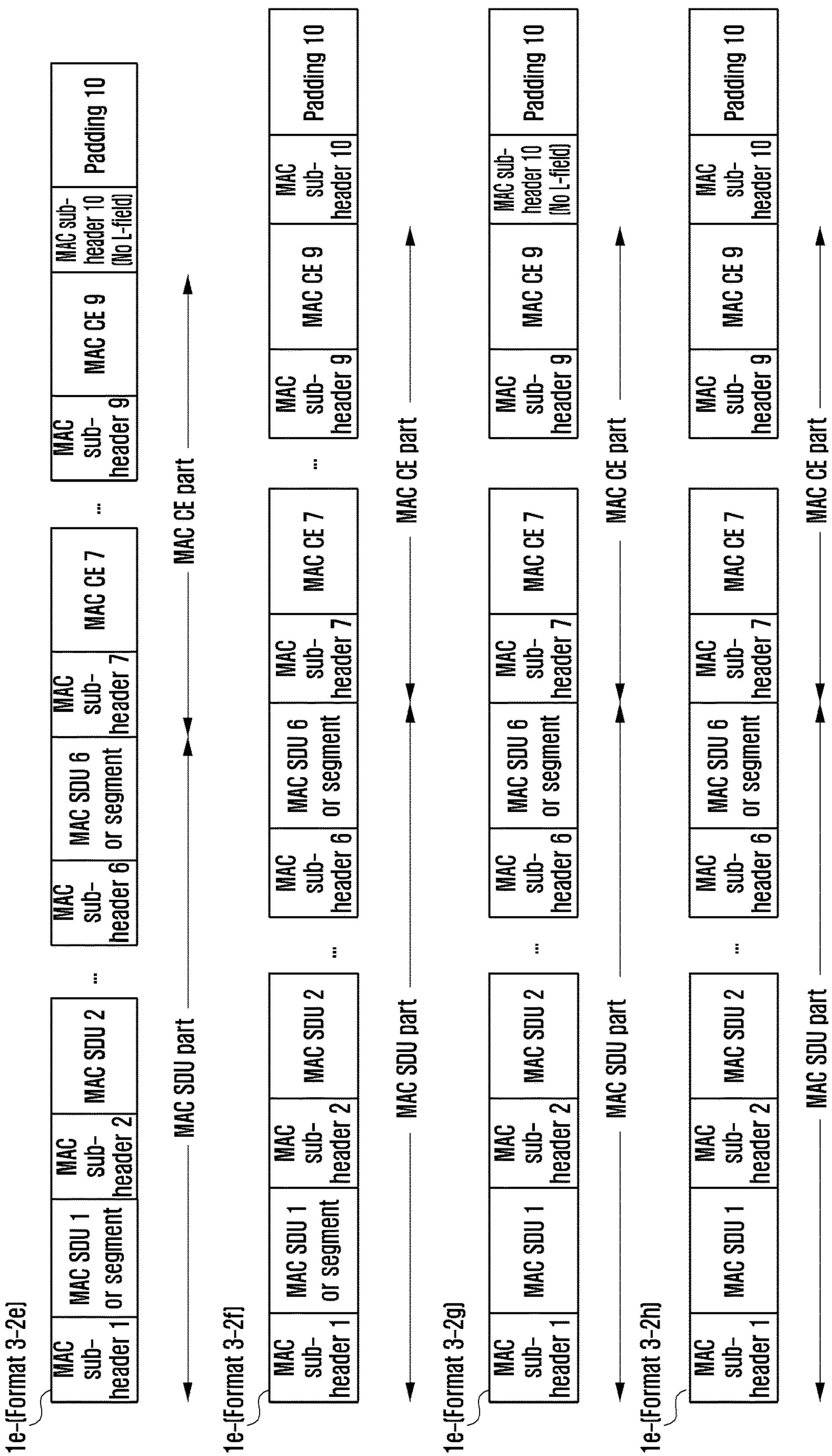
Figure 1E:
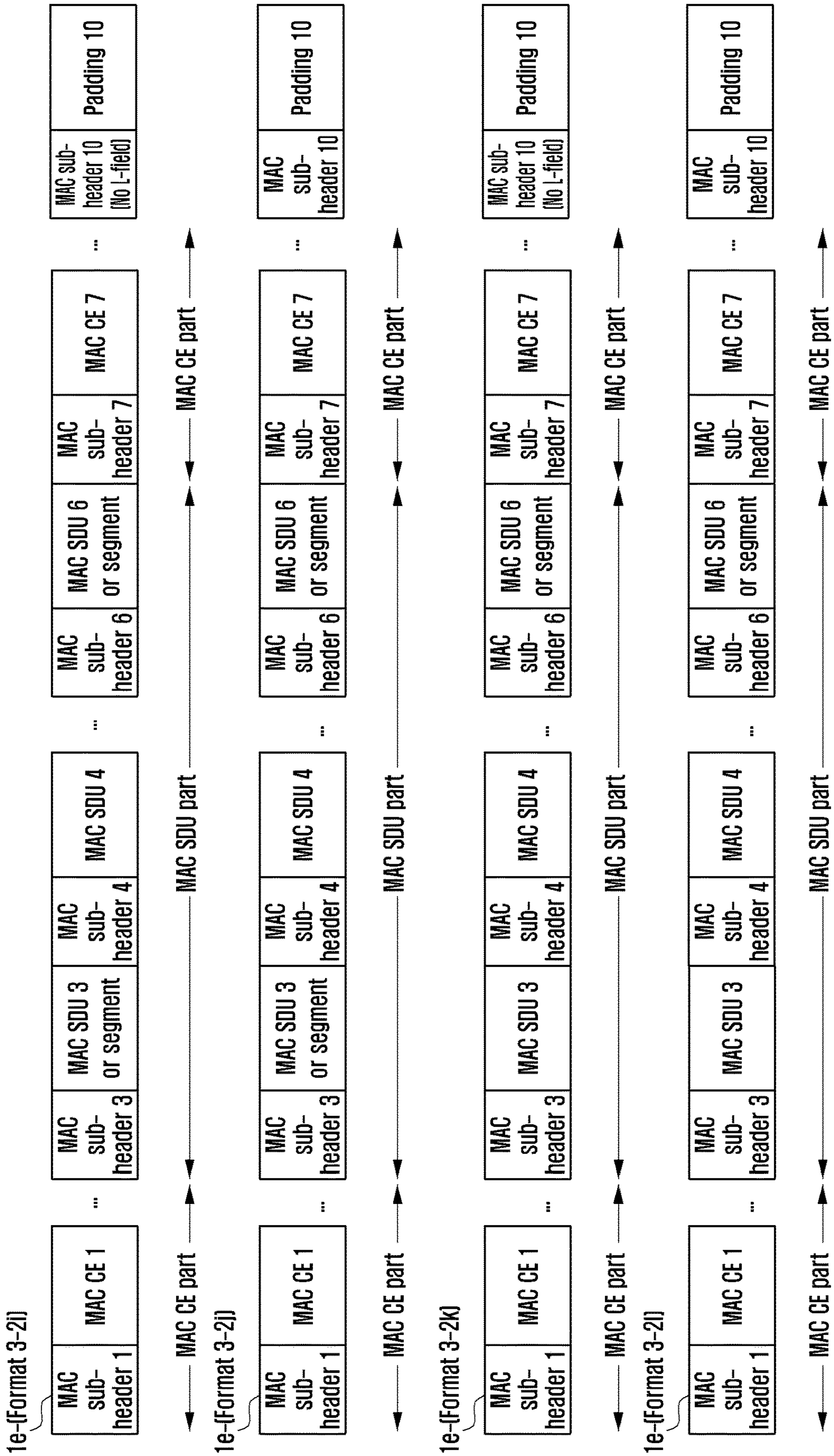

FIGS. 1EA to 1EC are diagrams illustrating a first MAC PDU structure for a next generation mobile communication system according to an embodiment of the present disclosure.

Meanwhile, the embodiment of the configuration and transmission of the MAC PDU of the terminal or the base station described below may be interpreted as an operation between the transmitting end and the receiving end. In other words, the process of transmitting the uplink MAC PDU configured by the terminal which is the transmitting end to the base station which is the receiving end may be applied to the process of transmitting the downlink MAC PDU configured by the base station which is the transmitting end to the terminal which is the receiving end.

Referring to FIGS. 1EA to 1EC, a repeating structure is illustrated in which the MAC sub-header and the MAC SDU are arranged and is advantageous to allow a terminal to previously configure and prepare data before being allocated an uplink transmission resource (UL grant). For example, the terminal may receive several RLC PDUs from the RLC layer before being allocated the uplink transmission resource, and the MAC layer may immediately generate the MAC SDU together with the MAC sub-header from the received RLC PDU. Therefore, the first MAC PDU structure is advantageous to sequentially manage the MAC sub-header and the MAC SDUs generated in advance, and is advantageous since after the uplink transmission resource is received, the MAC PDUs are sequentially configured with the MAC sub-header and the MAC SDUs generated in advance. In addition, the structure is a repeating structure in which the MAC sub-header and the MAC SDU are arranged, and is a structure suitable to reduce a terminal processing time using a hardware accelerator at transmitting/receiving ends in a hardware manner since the MAC sub-header is a header having a fixed size and in most cases, the size of the RLC header and the PDCP header may also have a fixed size. In addition, the transmitting end may transmit the MAC sub-header and the MAC SDU to the PHY layer in units of the MAC sub-header and the MAC SDU processed from the head in the MAC layer to accelerate a processing rate, and the receiving end may transmit the MAC sub-header and the MAC SDU to the RLC layer in units of the MAC sub-header and the MAC SDU processed from the head in the MAC layer to accelerate the processing rate.

Referring to FIGS. 1EA to 1EC, 1E-(Format 3-1) may store one MAC SDU or MAC CE. In the above structure, the MAC header is located at a front part and the payload is located at a rear part. The header may include the variables described in Table 1 except for the L-field, and information other than the variables described in Table 1. In the 1*e*-(Format 3-1), since only one MAC CE or MAC SDU is included, the L-field may be omitted. Because the size of the MAC sub-header is known as well as the size of the MAC PDU is known at the reception side by indicating a size of a transport block (TB) by an L1 control signal, that is, PDCCH, the size of the MAC SDU may be known immediately. Therefore, it is not necessary to separately indicate the size of the MAC SDU by the L field

1*e*-(Format 3-2*a*) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1*e*-(Format 3-2*a*) structure is largely divided into a MAC CE part and a MAC SDU part. The MAC CEs may be located at a front part in the order in which they are first generated. In the MAC SDU part, a last segment of one MAC SDU (or RLC PDU or RLC SDU) may be located at a head thereof and a first segment of one MAC SDU (or RLC PDU or RLC SDU) may be located at a tail thereof. In this case, the MAC CE may be a MAC CE associated with scheduling information, such as a buffer status report (BSR) and a power headroom report (PHR), and locating the generated MAC CEs at the head thereof as in the 1*e*-(Format 3-2*a*) may be very advantageous in the scheduling of the base station. For example, if the base station receives the MAC PDU from the terminal and first reads the MAC CEs associated with the scheduling information, the scheduling information may be directly provided to a base station scheduler to quickly schedule several terminals.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

The sub-header may include some of the variables described in Table 1, and information other than the variables described in Table 1. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 1*e*-(Format 3-2*a*). For example, the header of the front part becomes the information indicating the payload of the rear part. The 1*e*-(Format 3-2*a*) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In this case, if segmentation is generated when the MAC PDU is transmitted in the previous uplink transmission resource and thus a predetermined segment remains, the remaining segments may be processed by being put in the front part of the MAC SDU part. Therefore, the receiving side may first receive and re-assemble the data of the RLC PDU with the lowest RLC sequence number.

The 1*e*-(Format 3-2*b*) structure is the same as the 1*e*-(Format 3-2*a*) structure and may include L-fields in all the sub-headers. If in the 1*e*-(Format 3-2*a*) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1*e*-(Format 3-2*b*) structure is characterized in that an L field is added to the last sub-header in order to lessen the processing burden of the terminal.

1*e*-(Format 3-2*c*) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1*e*-(Format 3-2*c*) structure is largely divided into a MAC CE part and a MAC SDU part. The MAC CEs may be located at the front part in the order in which they are first generated, and in the MAC SDU part, segments of a MAC SDU (or RLC PDU or RLC SDU) may be located at the tail part of the MAC SDU part. In this case, the MAC CE may be a MAC CE associated with scheduling information, such as a buffer status report (BSR) and a power headroom report (PHR), and locating the generated MAC CEs at the head thereof as in the 1*e*-(Format 3-2*a*) may be very advantageous in the scheduling of the base station. For example, if the base station receives the MAC PDU from the terminal and first reads the MAC CEs associated with the scheduling information, the scheduling information may be directly provided to a base station scheduler to quickly schedule several terminals.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

The sub-header may include some of the variables described in Table 1, and information other than the variables described in Table 1. The padding is stored only when necessary for predetermined reasons. The predetermined reasons refer to a case where it is necessary to set the MAC PDU in byte units. In this case, each MAC sub-head indicates information corresponding to each MAC CE, MAC SDU, and padding, in the order numbered on the sub-headers and the payloads of the 1*e*-(Format 3-2*c*). For example, the header of the front part becomes the information indicating the payload of the rear part. The 1*e*-(Format 3-2*c*) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In addition, in this case, if no segmentation occurs when the MAC PDU is transmitted from the previous uplink transmission resource and thus no predetermined segment remains, a full MAC SDU is put from the front part and if there is a MAC SDU larger than the uplink transmission resource at the rear part, the segmentation may be performed and the segment may be processed by being put in the rear part of the MAC SDU part. By doing so, the receiving side can receive the RLC sequence number in order.

The 1*e*-(Format 3-2*d*) structure is the same as the 1*e*-(Format 3-2*c*) structure and may include L-fields in all the sub-headers. If in the 1*e*-(Format 3-2*c*) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1*e*-(Format 3-2*d*) structure is characterized in that an L field is added to the last sub-header in order to lessen the processing burden of the terminal.

1*e*-(Format 3-2*e*) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1*e*-(Format 3-2*e*) structure is largely divided into a MAC CE part and a MAC SDU part. The MAC CEs may be located at a front part of the MAC SDU part in the order in which they are first generated, and even the MAC CEs may be located at a rear part of the MAC CE part in the order in which they are first generated. In this case, the MAC CE may be dynamically generated for predetermined reasons when the uplink transmission resource is allocated. For example, the case where after the uplink transmission resource is allocated and the amount of data that may be currently transmitted is calculated, the amount of data that may be transmitted as the uplink transmission resource is subtracted and the remaining amount of data to be transmitted at the next opportunity is reported to the buffer status report (BSR) may be considered as the example. A power head room (PHR) is one of other examples. For example, the PHR should be calculated and transmitted at the time of receiving the uplink transmission resource. On the other hand, the MAC SDUs, that is, data are transmitted to a PDCP layer, an RLC layer, and an MAC layer, and may be generated as an MAC SDU together with the MAC sub-header.

Therefore, if the terminal is allocated the uplink transmission resource, the MAC PDU is configured by first generated the MAC sub-header and MAC SDUs generated in advance, and the MAC CE may be generated simultaneously with constructing the MAC PDU. The configuration of the MAC PDU may be completed by attaching the MAC CE to the end of the MAC PDU. In this way, the operation of constructing the MAC PDU with the pre-generated MAC SDUs simultaneously with dynamically generating the MAC CE is performed in parallel, thereby reducing the processing time of the terminal. For example, locating the MAC CE at the rear part of the MAC PDU is advantageous in the processing time of the terminal.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

In the MAC SDU part, a last segment of one MAC SDU (or RLC PDU or RLC SDU) may be located at a head thereof and a first segment of one MAC SDU (or RLC PDU or RLC SDU) may be located at a tail thereof. The sub-header may include some of the variables described in Table 1, and information other than the variables described in Table 1. The padding is stored only when necessary for predetermined reasons. The predetermined reasons refer to a case where it is necessary to set the MAC PDU in byte units. In this case, each MAC sub-head indicates information corresponding to each MAC SDU, MAC CE, and padding, in the order numbered on the sub-headers and the payloads of the 1*e*-(Format 3-2*e*). For example, the header of the front part becomes the information indicating the payload of the rear part. The 1*e*-(Format 3-2*e*) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In this case, if segmentation is generated when the MAC PDU is transmitted in the previous uplink transmission resource and thus a predetermined segment remains, the remaining segments may be processed by being put in the front part of the MAC SDU part. Therefore, the receiving side may first receive and re-assemble the data of the RLC PDU with the lowest RLC sequence number.

The 1*e*-(Format 3-20 structure is the same as the 1*e*-(Format 3-2*e*) structure and may include L-fields in all the sub-headers. If in the 1*e*-(Format 3-2*e*) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1*e*-(Format 3-20 structure is characterized in that an L field is added to the last sub-header in order to lessen the processing burden of the terminal.

1*e*-(Format 3-2*g*) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1*e*-(Format 3-2*g*) structure is largely divided into a MAC CE part and a MAC SDU part. The MAC CEs may be located at a front part of the MAC SDU part in the order in which they are first generated, and even the MAC CEs may be located at a rear part of the MAC CE part in the order in which they are first generated.

In this case, the MAC CE may be dynamically generated for predetermined reasons when the uplink transmission resource is allocated. For example, the case where after the uplink transmission resource is allocated and the amount of data that may be currently transmitted is calculated, the amount of data that may be transmitted as the uplink transmission resource is subtracted and the remaining amount of data to be transmitted at the next opportunity is reported to the buffer status report (BSR) may be considered as the example. A power head room (PHR) is one of other examples. For example, the PHR should be calculated and transmitted at the time of receiving the uplink transmission resource. On the other hand, the MAC SDUs, that is, data are transmitted to a PDCP layer, an RLC layer, and an MAC layer, and may be generated as an MAC SDU together with the MAC sub-header.

Therefore, if the terminal is allocated the uplink transmission resource, the MAC PDU is configured by first generated the MAC sub-header and MAC SDUs generated in advance, and the MAC CE may be generated simultaneously with constructing the MAC PDU. The configuration of the MAC PDU may be completed by attaching the MAC CE to the end of the MAC PDU. In this way, the operation of constructing the MAC PDU with the pre-generated MAC SDUs simultaneously with dynamically generating the MAC CE is performed in parallel, thereby reducing the processing time of the terminal. For example, locating the MAC CE at the rear part of the MAC PDU is advantageous in the processing time of the terminal.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

In the MAC SDU part, the segments of one MAC SDU (or RLC PDU or RLC SDU) may be located at the tail. The sub-header may include some of the variables described in Table 1, and information other than the variables described in Table 1. The padding is stored only when necessary for predetermined reasons. The predetermined reasons refer to a case where it is necessary to set the MAC PDU in byte units. In this case, each MAC sub-head indicates information corresponding to each MAC SDU, MAC CE, and padding, in the order numbered on the sub-headers and the payloads of the 1*e*-(Format 3-2*g*). For example, the header of the front part becomes the information indicating the payload of the rear part. The 1*e*-(Format 3-2*g*) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In addition, in this case, if no segmentation occurs when the MAC PDU is transmitted from the previous uplink transmission resource and thus no predetermined segment remains, a full MAC SDU is put from the front part and if there is a MAC SDU larger than the uplink transmission resource at the rear, the segmentation may be performed and the segment may be processed by being put in the rear part of the MAC SDU part. By doing so, the receiving side can receive the RLC sequence number in order.

The 1*e*-(Format 3-2*h*) structure is the same as the 1*e*-(Format 3-2*g*) structure and may include L-fields in all the sub-headers. If in the 1*e*-(Format 3-2*g*) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1*e*-(Format 3-2*h*) structure is characterized in that an L field is added to the last sub-header in order to lessen the processing burden of the terminal.

1*e*-(Format 3-2*i*) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1*e*-(Format 3-2*i*) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU.

In this case, the MAC CE may be a MAC CE associated with scheduling information, such as a buffer status report (BSR) and a power headroom report (PHR), and locating the generated MAC CEs at the head thereof may be very advantageous in the scheduling of the base station. For example, if the base station receives the MAC PDU from the terminal and first reads the MAC CEs associated with the scheduling information, the scheduling information may be directly provided to a base station scheduler to quickly schedule several terminals.

In addition, the MAC CE may be dynamically generated for predetermined reasons when the uplink transmission resource is allocated. For example, the case where after the uplink transmission resource is allocated and the amount of data that may be currently transmitted is calculated, the amount of data that may be transmitted as the uplink transmission resource is subtracted and the remaining amount of data to be transmitted at the next opportunity is reported to the buffer status report (BSR) may be considered as the example. The power head room (PHR) is one of other examples. For example, the PHR should be calculated and transmitted at the time of receiving the uplink transmission resource. On the other hand, the MAC SDUs, that is, data are transmitted to a PDCP layer, an RLC layer, and an MAC layer, and may be generated as an MAC SDU together with the MAC sub-header. Therefore, if the terminal is allocated the uplink transmission resource, the MAC PDU is configured by first generated the MAC sub-header and MAC SDUs generated in advance, and the MAC CE may be generated simultaneously with constructing the MAC PDU. The configuration of the MAC PDU may be completed by attaching the MAC CE to the end of the MAC PDU. In this way, the operation of constructing the MAC PDU with the pre-generated MAC SDUs simultaneously with dynamically generating the MAC CE is performed in parallel, thereby reducing the processing time of the terminal. For example, locating the MAC CE at the rear part of the MAC PDU is advantageous in the processing time of the terminal.

As described above, locating the MAC CE at the front part of the MAC PDU is advantageous in the scheduling of the base station, and locating the MAC CE at the rear part of the MAC PDU is advantageous in shortening the processing time of the terminal. Therefore, depending on the implementation and if necessary, the MAC CE may be located before the MAC PDU or located after the MAC PDU.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

In the MAC SDU part, the last segment of one MAC SDU (or RLC PDU or RLC SDU) may be located at the head of the MAC SDU part and the first segment of one MAC SDU (or RLC PDU or RLC SDU) may be located at the tail of the MAC SDU part. The sub-header may include some of the variables described in Table 1, and information other than the variables described in Table 1. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 1_e_-(Format 3-2_i_). For example, the header of the front part becomes the information indicating the payload of the rear part. The 1_e_-(Format 3-2_i_) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In this case, if segmentation is generated when the MAC PDU is transmitted in the previous uplink transmission resource and thus a predetermined segment remains, the remaining segments may be processed by being put in the front part of the MAC SDU part. Therefore, the receiving side may first receive and re-assemble the data of the RLC PDU with the lowest RLC sequence number.

The 1_e_-(Format 3-2_j_) structure is the same as the 1_e_-(Format 3-2_i_) structure and may include L-fields in all the sub-headers. If in the 1_e_-(Format 3-2_i_) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1_e_-(Format 3-2_j_) structure is characterized in that an L field is added in order to lessen the processing burden of the terminal.

1_e_-(Format 3-2_k_) has a structure, such as a sub-header, a MAC CE, a sub-header, a MAC SDU, a sub-header, and a padding and the first MAC PDU structure has a repeating structure, such as a sub-header, a payload, a sub-header, and a payload. The 1_e_-(Format 3-2_k_) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU.

In this case, the MAC CE may be a MAC CE associated with scheduling information, such as a buffer status report (BSR) and a power headroom report (PHR), and locating the generated MAC CEs at the head thereof may be very advantageous in the scheduling of the base station. For example, if the base station receives the MAC PDU from the terminal and first reads the MAC CEs associated with the scheduling information, the scheduling information may be directly provided to a base station scheduler to quickly schedule several terminals.

In addition, the MAC CE may be dynamically generated for predetermined reasons when the uplink transmission resource is allocated. For example, the case where after the uplink transmission resource is allocated and the amount of data that may be currently transmitted is calculated, the amount of data that may be transmitted as the uplink transmission resource is subtracted and the remaining amount of data to be transmitted at the next opportunity is reported to the buffer status report (BSR) may be considered as the example. The power head room (PHR) is one of other examples. For example, the PHR should be calculated and transmitted at the time of receiving the uplink transmission resource. On the other hand, the MAC SDUs, that is, data are transmitted to a PDCP layer, an RLC layer, and an MAC layer, and may be generated as an MAC SDU together with the MAC sub-header. Therefore, if the terminal is allocated the uplink transmission resource, the MAC PDU is configured by first generated the MAC sub-header and MAC SDUs generated in advance, and the MAC CE may be generated simultaneously with constructing the MAC PDU. The configuration of the MAC PDU may be completed by attaching the MAC CE to the end of the MAC PDU. In this way, the operation of constructing the MAC PDU with the pre-generated MAC SDUs simultaneously with dynamically generating the MAC CE is performed in parallel, thereby reducing the processing time of the terminal. For example, locating the MAC CE at the rear part of the MAC PDU is advantageous in the processing time of the terminal.

As described above, locating the MAC CE at the front part of the MAC PDU is advantageous in the scheduling of the base station, and locating the MAC CE at the rear part of the MAC PDU is advantageous in shortening the processing time of the terminal. Therefore, depending on the implementation and if necessary, the MAC CE may be located before the MAC PDU or located after the MAC PDU.

In addition, in this case, the MAC CEs may indicate various information. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

In the MAC SDU part, the segments of one MAC SDU (or RLC PDU or RLC SDU) may be located at the tail of the MAC SDU part. The sub-header may include some of the variables described in Table 1, and information other than the variables described in Table 1. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 1*e*-(Format 3-2*k*). For example, the header of the front part becomes the information indicating the payload of the rear part. The 1*e*-(Format 3-2*k*) structure is characterized in that an L-field is not included in the last sub-header. Since the size of the transport block (TB) is indicated by the L1 control signal, that is, the PDCCH, the size of the MAC PDU may be already known at the receiving side, and L-field values of the rest sub-headers may be confirmed at the receiving side and subtracted from the entire length of the MAC PDU to estimate the length of the last MAC SDU. In addition, in this case, if no segmentation occurs when the MAC PDU is transmitted from the previous uplink transmission resource and thus no predetermined segment remains, a full MAC SDU is put from the front part and if there is a MAC SDU larger than the uplink transmission resource at the rear part, the segmentation may be performed and the segment may be processed by being put in the rear part of the MAC SDU part. By doing so, the receiving side can receive the RLC sequence number in order.

The 1*e*-(Format 3-21) structure is the same as the 1*e*-(Format 3-2*k*) structure and may include L-fields in all the sub-headers. If in the 1*e*-(Format 3-2*k*) structure, the size of the transport block (TB) is indicated by the L1 control signal, that is, the PDCCH even if the L field is not included in the last MAC sub-header as described above, the size of the MAC PDU may be already known at the receiving side, and L-field values of the rest sub-headers may be confirmed at the receiving side and subtracted from the entire length of the MAC PDU to estimate the length of the last MAC SDU. However, the above procedure is a procedure that should receive the MAC PDU every time the terminal receives the MAC PD. Therefore, the processing burden of the terminal may be increased. Therefore, it may be advantageous to add the L field even to the last MAC sub-header to reduce the processing burden of the terminal. As described above, the 1*e*-(Format 3-21) structure is characterized in that an L field is added in order to lessen the processing burden of the terminal.

Figure 1F:
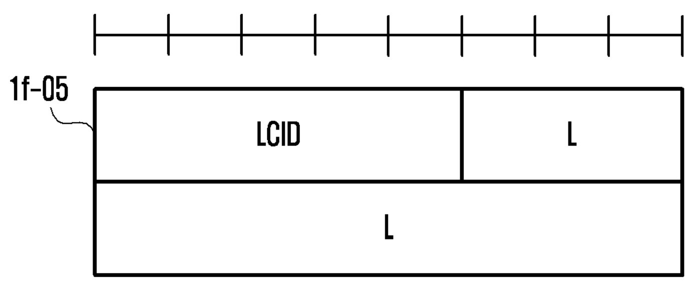
FIG. 1F is a diagram illustrating a first MAC sub-header structure suitable for the first MAC PDU structures for a next generation mobile communication system according to an embodiment of the present disclosure.

FIG. 1F is a diagram illustrating a first MAC sub-header structure suitable for a first MAC PDU structures for a next generation mobile communication system according to an embodiment of the present disclosure.

Referring to FIG. 1F, the first MAC sub-header structure includes a 5-bit logical channel identity (LCID) field and an 11-bit length (L) field as in 1*f*-05. The LCID field is used to identify logical channels from different RLC apparatus, and the L field serves to indicate the size of the MAC SDU. In this case, since the L field has a size of 11 bits, the size of a MAC SDU (RLC PDU) may have a size from 1 byte to 2048 bytes. The reason why the length of the L field is 11 bits is that the size of the general IP packet is 1500 bytes. To support this, the 11-bit length is required (10 bits may indicate up to 1024 bytes, and therefore may not indicate 1500 bytes). Therefore, the maximum size of the RLC SDU of each logical channel is the size of 2048—RLC header, and the maximum size of the PDCP SDU of each logical channel is 2048—RLC header size—PDCP header size. Since the maximum size of each RLC PDU that may be supported by the 11-bit L field of the first MAC sub-header is 2048 bytes, if the size of the RLC PDU is larger than 2048 bytes, the segmentation is performed in the RLC layer to segment the RLC PDU into a size smaller than 2048 bytes. For example, the segmentation may be first performed according to the size of the RLC PDU (or IP packet) before the transmission resource is allocated. The MAC sub-header structure may be characterized in that there is no E field described in the above Table 1. Since the structure of the MAC PDU described in FIGS. 1EA to 1EC is the structure in which the MAC SDU is always present after the MAC sub-header, the E field is not required.

Figure 1G:
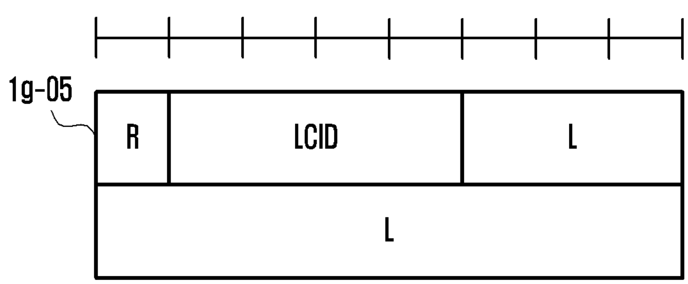
FIG. 1G is a diagram illustrating a second MAC sub-header structure suitable for the first MAC PDU structures for a next generation mobile communication system according to an embodiment of the present disclosure.

FIG. 1G is a diagram illustrating a second MAC sub-header structure suitable for a first MAC PDU structures for a next generation mobile communication system according to an embodiment of the present disclosure.

Referring to FIG. 1G, the second MAC sub-header structure includes a 1-bit reserved (R) field, a 4-bit logical channel identity (LCID) field, and an 11-bit length (L) field as in 1*g*-05. The R field is a reserved field, the LCID field used to identify logical channels from different RLC apparatus, and the L field serves to indicate the size of the MAC SDU. In this case, all the MAC CEs can be indicated by one LCID, and a CE type field indicating each MAC CE can be separately provided in the MAC SDU. For example, when the LCID indicates the MAC CE, predetermined bits (CE type field) at the head of the MAC SDU may be used to indicate different MAC CEs. If the predetermined bits (CE type field) are 3 bits, they may indicate 2^3=8 different MAC CEs. In this case, since the L field has a size of 11 bits, the size of a MAC SDU (RLC PDU) may have a size from 1 byte to 2048 bytes. The reason why the length of the L field is 11 bits is that the size of the general IP packet is 1500 bytes. To support this, the 11-bit length is required (10 bits may indicate up to 1024 bytes, and therefore may not indicate 1500 bytes). Therefore, the maximum size of the RLC SDU of each logical channel is the size of 2048—RLC header, and the maximum size of the PDCP SDU of each logical channel is 2048—RLC header size—PDCP header size. Since the maximum size of each RLC PDU that may be supported by the 11-bit L field of the second MAC sub-header is 2048 bytes, if the size of the RLC PDU is larger than 2048 bytes, the segmentation is performed in the RLC layer to segment the RLC PDU into a size smaller than 2048 bytes. For example, the segmentation may be first performed according to the size of the RLC PDU (or IP packet) before the transmission resource is allocated. The MAC sub-header structure may be characterized in that there is no E field described in the above Table 1. Since the structure of the MAC PDU described in FIGS. 1EA, 1EB, and 1EC is the structure in which the MAC SDU is always present after the MAC sub-header, the E field is not required.

The second MAC sub-header structure may be useful when having various MAC CEs in the next generation mobile communication system. For example, if many types of MAC CEs need to be defined, they all may be difficult to be mapped to LCIDs. Therefore, the MAC CE type field may be defined in the payload part of the MAC CE to indicate many types of MAC CEs. Examples that may be defined as the useful MAC in the next generation mobile communication system are as follows.

In this case, the MAC CEs can be defined for various purposes. For example, there may be a kind of MAC CEs, such as a MAC CE indicating information for several antenna configurations (FD-MIMO), a MAC CE (MAC CE indicating how often or how many times the channel measurement is performed or at which time/frequency transmission resource the measurement and reporting are performed for the purpose of channel state information-reference signal (CSI-RS), a sounding reference signal (SRS), a demodulated reference signal (DMRS), or the like) for channel measurement, a MAC CE (MAC CE used for the purpose of indicating mobility of the terminal with L2 mobility, i.e., the MAC CE and indicating an inter-cell handover related instruction of the terminal) for quickly supporting the mobility of the terminal, a MAC CE (MAC CE indicating by which beam a service is received, the measurement is performed, and information on the number of beams, time/frequency resources of the beam, or the like) indicating beam-related information required when the terminal performs camp on, random access, or cell measurement, a MAC CE (MAC CE (MAC CE indicating whether to use Short TTI, whether to use general TTI (1 ms), or whether to use longer TTI, or the like) dynamically indicating TTI to be used by the terminal, a MAC CE (MAC CE indicating a dedicated transmission resource requesting SR to the terminal) indicating information on the scheduling request (SR), and a MAC CE indicating transmission resource information/configuration information or the like required for the terminal supporting an URLLC service.

FIG. 1H is a diagram illustrating a third MAC sub-header structure suitable for a first MAC PDU structures for a next generation mobile communication system according to an embodiment of the present disclosure.

Referring to FIG. 1H, the third MAC sub-header structure may have a structure of two MAC sub-headers, in as 1*h*-05 and 1*h*-10. The 1*h*-05 is a 3-1-th MAC sub-header structure and includes a 1-bit reserved R field, a 5-bit logical channel identity (LCID) field, and a 10-bit length (L) field. In the above field, the R field is a reserved field, the LCID field used to identify logical channels from different RLC apparatus, and the L field serves to indicate the size of the MAC SDU. In the structure for allocating the reserved bit (R field) to be used in the future as described above, the L field has naturally 10 bits. The reason is that the MAC sub-header structure is a byte-aligned structure. In other words, since the sub-header needs to be configured in units of bytes, the L field naturally has a 10-bit length except for a 1-bit R field and a 5-bit LCID field. The MAC sub-header structure may be characterized in that there is no E field described in the above Table 1. Since the structure of the MAC PDU described in FIGS. 1EA, 1EB, and 1EC is the structure in which the MAC SDU is always present after the MAC sub-header, the E field is not required.

The 1*h*-10 is a 3-2-th MAC sub-header structure and includes a 1-bit reserved R field, a 5-bit logical channel identity (LCID) field, and an 18-bit length (L) field. In the structure for allocating the reserved bit (R field) to be used in the future as described above, the L field has naturally 10 bits or 18 bits. The reason is that the MAC sub-header structure is a byte-aligned structure. In other words, since the sub-header needs to be configured in units of bytes, the L field naturally has a 10-bit length except for a 1-bit R field and a 5-bit LCID field. If a longer L field is intended to be defined, it naturally has an 18-bit L field. In this case, the reason why the longer L field is required is that in order to support a jumbo IP packet having a size of 9000 bytes or a super jumbo IP packet having a very large size of 36000/64000 bytes in addition to the general IP packet having a size of 1500 bytes, the L field having a long length like the 18-bit length is required. The MAC sub-header structure may be characterized in that there is no E field described in the above Table 1. Since the structure of the MAC PDU described in FIGS. 1EA, 1EB, and 1EC is the structure in which the MAC SDU is always present after the MAC sub-header, the E field is not required.

The third MAC sub-header structure may apply a 3-1-th MAC sub-header structure or a 3-2-th MAC sub-header structure depending on the size of the MAC SDU (RLC PDU). Since the 3-1-th MAC sub-header structure uses a 10-bit L field, it may indicate a size from 1 byte to 1024 bytes, and in the 3-2-th MAC sub-header structure, 18 bits may indicate a size from 1 byte to 262144 bytes.

In the third MAC sub-header structure, which of the 3-1-th a 3-2-th MAC sub-header structures is used may be determined by being promised in advance for each LCID. Alternatively, it may be defined for each size of the MAC PDUs (because the size of the transport block is indicated by the control signal in the physical layer, it may appreciate the size of the MAC PDU) or a 1 bit (in-band field) may be defined in the MAC SDU to indicate the 3-1-th or 3-2-th MAC sub-header structure. Alternatively, the R field of the MAC sub-header may be newly defined to indicate the 3-1-th or 3-2-th MAC sub-header structure. Unlike the first and second MAC sub-header structures, the third MAC sub-header structure may support a size up to 262144 bytes, and therefore, the segmentation may not be first performed in the RLC layer before being allocated the transmission resource.

Figure 1I:
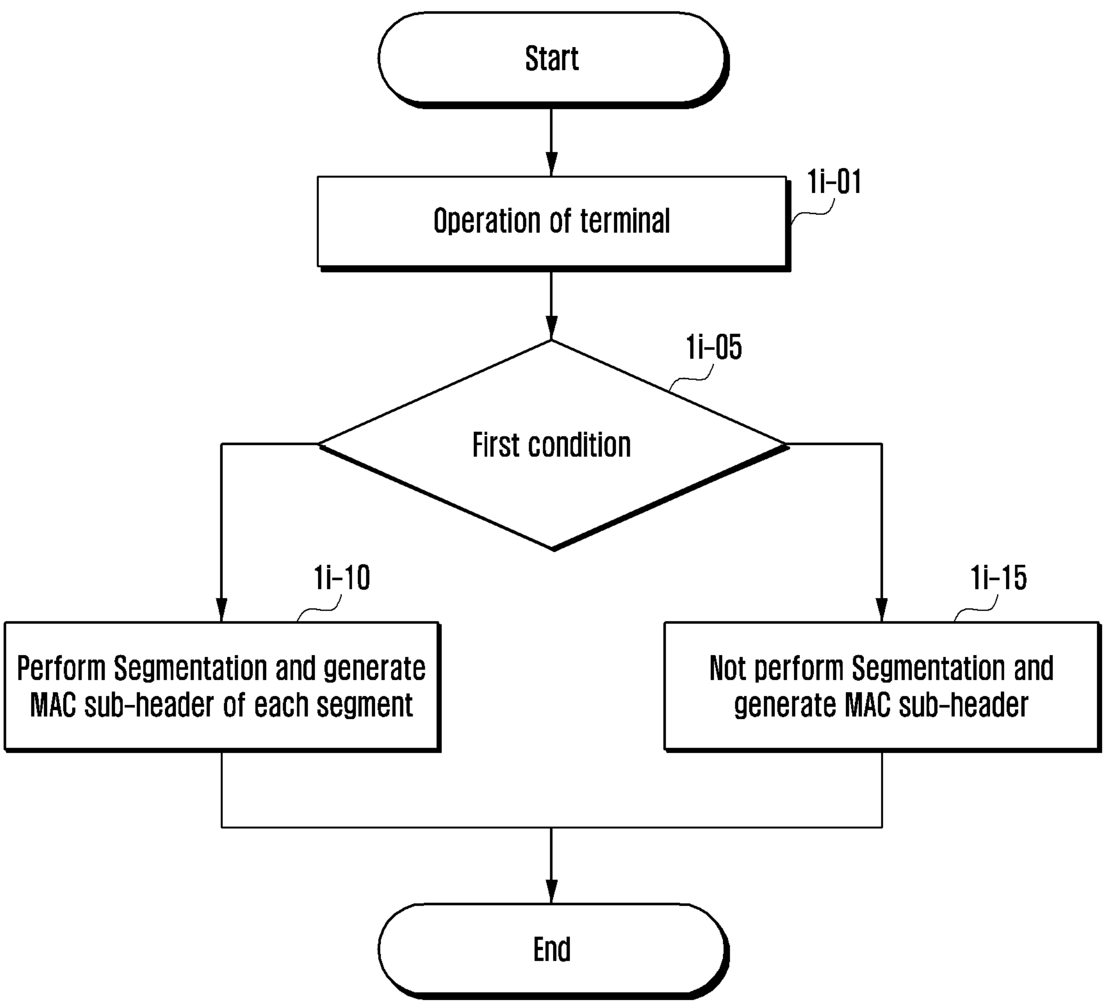
FIG. 1I is a diagram illustrating an operation of a terminal related to a method for applying an MAC sub-header according to an embodiment of the present disclosure.

FIG. 1I is a diagram illustrating an operation of a terminal related to a method for applying a MAC sub-header according to an embodiment of the present disclosure.

Referring to FIG. 1I, if the terminal 1*i*-01 satisfies the first condition in operation 1*i*-05, the operation of the terminal proceeds to operation 1*i*-10 and thus the segmentation is performed in the RLC layer, and each segment is transferred to the MAC layer to generate the MAC sub-headers of each segment. If the first condition is not satisfied in operation 1*i*-05, the operation of the terminal proceeds to operation 1*i*-15 to transfer the corresponding RLC PDU to the MAC layer and generate the MAC sub-header. In this case, the first condition may be a condition that the size of the RLC PDU (or RLC SDU) is larger than a predetermined size. For example, it may be a condition for confirming that the size of the RLC PDU is larger than 2048 bytes.

Figure 1J:
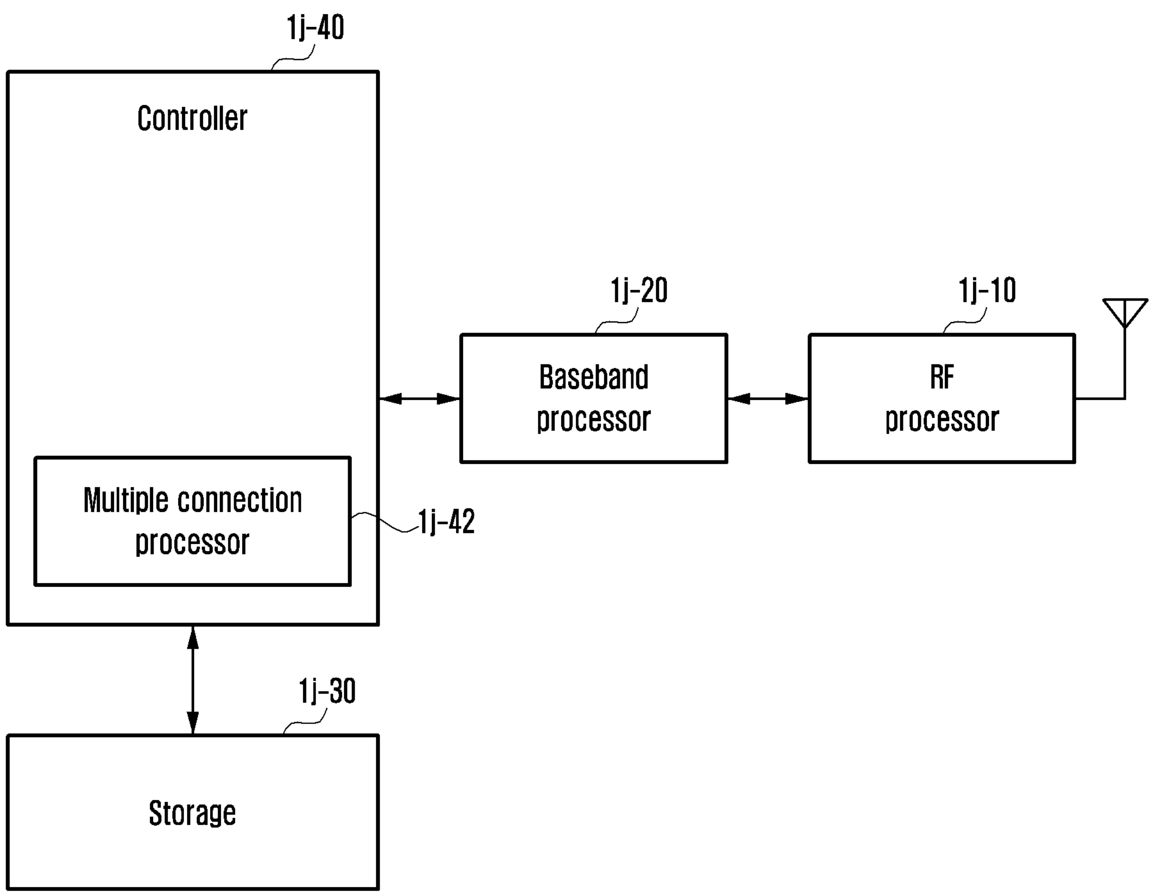
FIG. 1J is a block diagram illustrating an internal structure of a terminal according to an embodiment of the present disclosure.

FIG. 1J is a block diagram illustrating an internal structure of a terminal according to an embodiment of the present disclosure.

Referring to FIG. 1J, the terminal includes a radio frequency (RF) processor 1*j*-10, a baseband processor 1*j*-20, a storage 1*j*-30, and a controller 1*j*-40.

The RF processor 1*j*-10 serves to transmit and receive a signal through a radio channel, such as band conversion and amplification of a signal. For example, the RF processor 1*j*-10 up-converts a baseband signal provided from the baseband processor 1*j*-20 into an RF band signal and then transmits the RF band signal through an antenna and down-converts the RF band signal received through the antenna into the baseband signal. For example, the RF processor 1*j*-10 may include a transmitting filter, a receiving filter, an amplifier, a mixer, an oscillator, a digital to analog converter (DAC), an analog to digital converter (ADC), or the like. FIG. 1J illustrates only one antenna but the terminal may include a plurality of antennas. Further, the RF processor 1*j*-10 may include a plurality of RF chains. Further, the RF processor 1*j*-10 may perform beamforming. For the beamforming, the RF processor 1*j*-10 may adjust a phase and a size of each of the signals transmitted and received through a plurality of antennas or antenna elements. In addition, the RF processor 1210 may perform MIMO and may receive a plurality of layers when performing the MIMO operation. The RF processor 1*j*-10 may perform reception beam sweeping by appropriately configuring a plurality of antennas or antenna elements under the control of the controller or adjust a direction and a beam width of the reception beam so that the reception beam is resonated with the transmission beam.

The baseband processor 1*j*-20 performs a conversion function between a baseband signal and a bit string according to a physical layer standard of a system. For example, when data are transmitted, the baseband processor 1*j*-20 generates complex symbols by coding and modulating a transmitted bit string. Further, when data are received, the baseband processor 1*j*-20 recovers the received bit string by demodulating and decoding the baseband signal provided from the RF processor 1*j*-10. For example, according to the OFDM scheme, when data are transmitted, the baseband processor 1*j*-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 1*j*-20 divides the baseband signal provided from the RF processor 1*j*-10 in an OFDM symbol unit and recovers the signals mapped to the sub-carriers by a fast Fourier transform (FFT) operation and then recovers the received bit string by the modulation and decoding.

The baseband processor 1*j*-20 and the RF processor 1*j*-10 transmit and receive a signal as described above. Therefore, the baseband processor 1*j*-20 and the RF processor 1*j*-10 may be called a transmitter, a receiver, a transceiver, or a communication unit. Further, at least one of the baseband processor 1*j*-20 and the RF processor 1*j*-10 may include a plurality of communication modules to support a plurality of different radio access technologies. Further, at least one of the baseband processor 1*j*-20 and the RF processor 1*j*-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The storage 1*j*-30 stores data, such as basic programs, application programs, and configuration information for the operation of the terminal. Further, the storage 1*j*-30 provides the stored data according to the request of the controller 1*j*-40.

The controller 1*j*-40 includes a multiple connection processor 1*j*-42 and controls the overall operations of the terminal. For example, the controller 1*j*-40 transmits and receives a signal through the baseband processor 1*j*-20 and the RF processor 1*j*-10. Further, the controller 1*j*-40 records and reads data in and from the storage 1*j*-30. For this purpose, the controller 1*j*-40 may include at least one processor. For example, the controller 1*j*-40 may include a communication processor (CP) performing a control for communication and an application processor (AP) controlling an upper layer, such as the application programs.

Figure 1K:
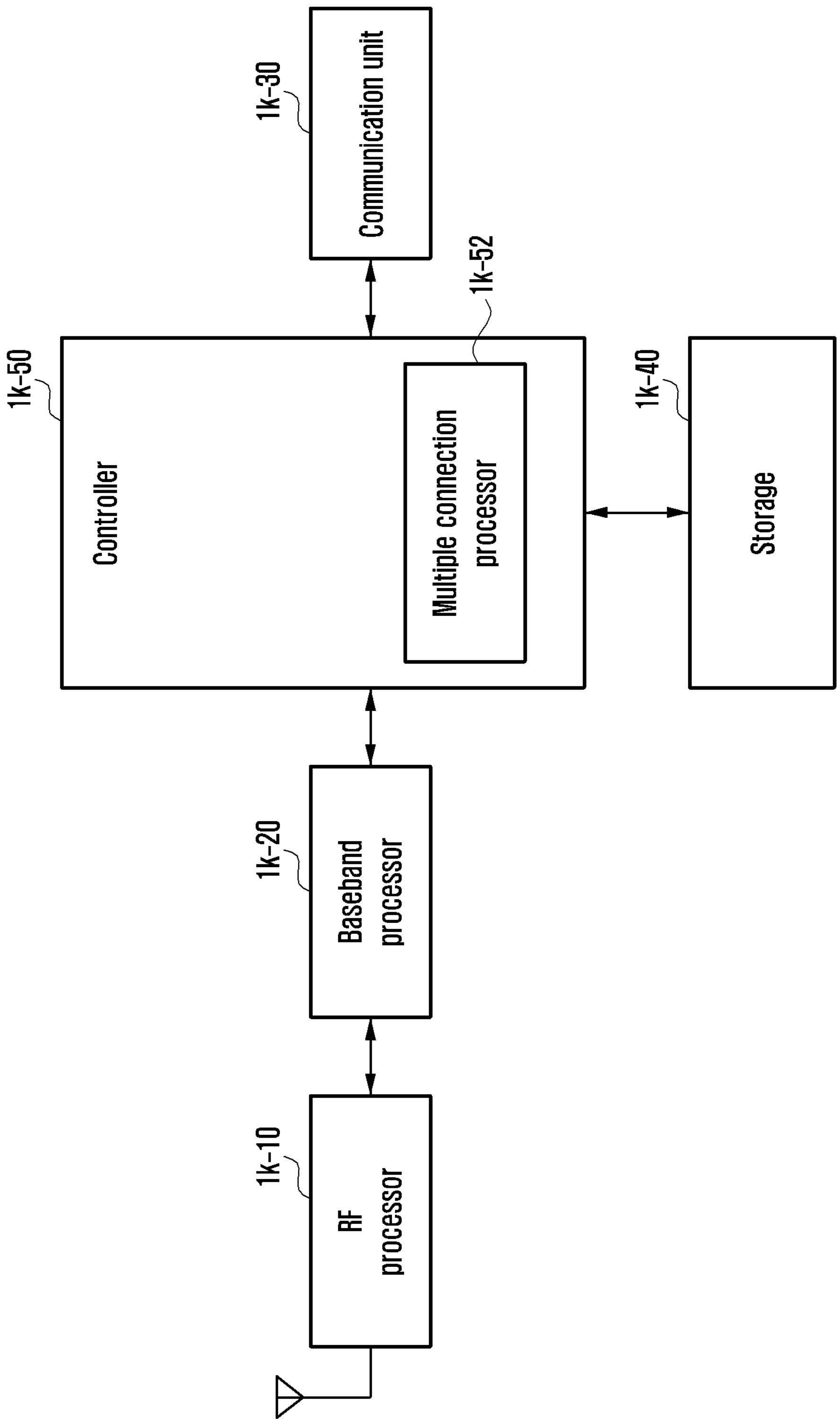
FIG. 1K is a block diagram illustrating a configuration of a base station transceiver according to an embodiment of the present disclosure.

FIG. 1K is a block configuration diagram of TRP in a wireless communication system according to an embodiment of the present disclosure.

Referring to FIG. 1K, the base station is configured to include an RF processor 1*k*-10, a baseband processor 1*k*-20, a communication unit 1*k*-30, a storage 1*k*-40, and a controller 1*k*-50.

The RF processor 1*k*-10 serves to transmit and receive a signal through a radio channel, such as band conversion and amplification of a signal. For example, the RF processor 1*k*-10 up-converts a baseband signal provided from the baseband processor 1*k*-20 into an RF band signal and then transmits the RF band signal through an antenna and down-converts the RF band signal received through the antenna into the baseband signal. For example, the RF processor 1*k*-10 may include a transmitting filter, a receiving filter, an amplifier, a mixer, an oscillator, a DAC, an ADC, or the like. FIG. 1K illustrates only one antenna but the first access node may include a plurality of antennas. Further, the RF processor 1*k*-10 may include a plurality of RF chains. Further, the RF processor 1*k*-10 may perform the beamforming. For the beamforming, the RF processor 1*k*-10 may adjust a phase and a size of each of the signals transmitted/received through a plurality of antennas or antenna elements. The RF processor may perform a downward MIMO operation by transmitting one or more layers.

The baseband processor 1*k*-20 performs a conversion function between the baseband signal and the bit string according to the physical layer standard of the first radio access technology. For example, when data are transmitted, the baseband processor 1*k*-20 generates complex symbols by coding and modulating a transmitted bit string. Further, when data are received, the baseband processor 1*k*-20 recovers the received bit string by demodulating and decoding the baseband signal provided from the RF processor 1*k*-10. For example, according to the OFDM scheme, when data are transmitted, the baseband processor 1*k*-20 generates the complex symbols by coding and modulating the transmitting bit string, maps the complex symbols to the sub-carriers, and then performs the IFFT operation and the CP insertion to construct the OFDM symbols. Further, when data are received, the baseband processor 1*k*-20 divides the baseband signal provided from the RF processor 1*k*-10 in the OFDM symbol unit and recovers the signals mapped to the sub-carriers by the FFT operation and then recovers the receiving bit string by the modulation and decoding. The baseband processor 1*k*-20 and the RF processor 1*k*-10 transmit and receive a signal as described above. Therefore, the baseband processor 1*j*-20 and the RF processor 1*j*-10 may be called a transmitter, a receiver, a transceiver, or a communication unit.

The communication unit 1*k*-30 provides an interface for performing communication with other nodes within the network.

The storage 1*k*-40 stores data, such as basic programs, application programs, and configuration information for the operation of the main base station. More particularly, the storage 1*k*-40 may store the information on the bearer allocated to the accessed terminal, the measured results reported from the accessed terminal, and the like. Further, the storage 1*k*-40 may store information that is a determination criterion on whether to provide a multiple connection to the terminal or stop the multiple connection to the terminal. Further, the storage 1*k*-40 provides the stored data according to the request of the controller 1*k*-50.

The controller 1*k*-50 includes a multiple connection processor 1*k*-52 and controls the general operations of the main base station. For example, the controller 1*k*-50 transmits/receives a signal through the baseband processor 1*k*-20 and the RF processor 1*k*-10 or the communication unit 1*k*-30. Further, the controller 1*k*-50 records and reads data in and from the storage 1*k*-40. For this purpose, the controller 1*k*-50 may include at least one processor.

Figure 1L:
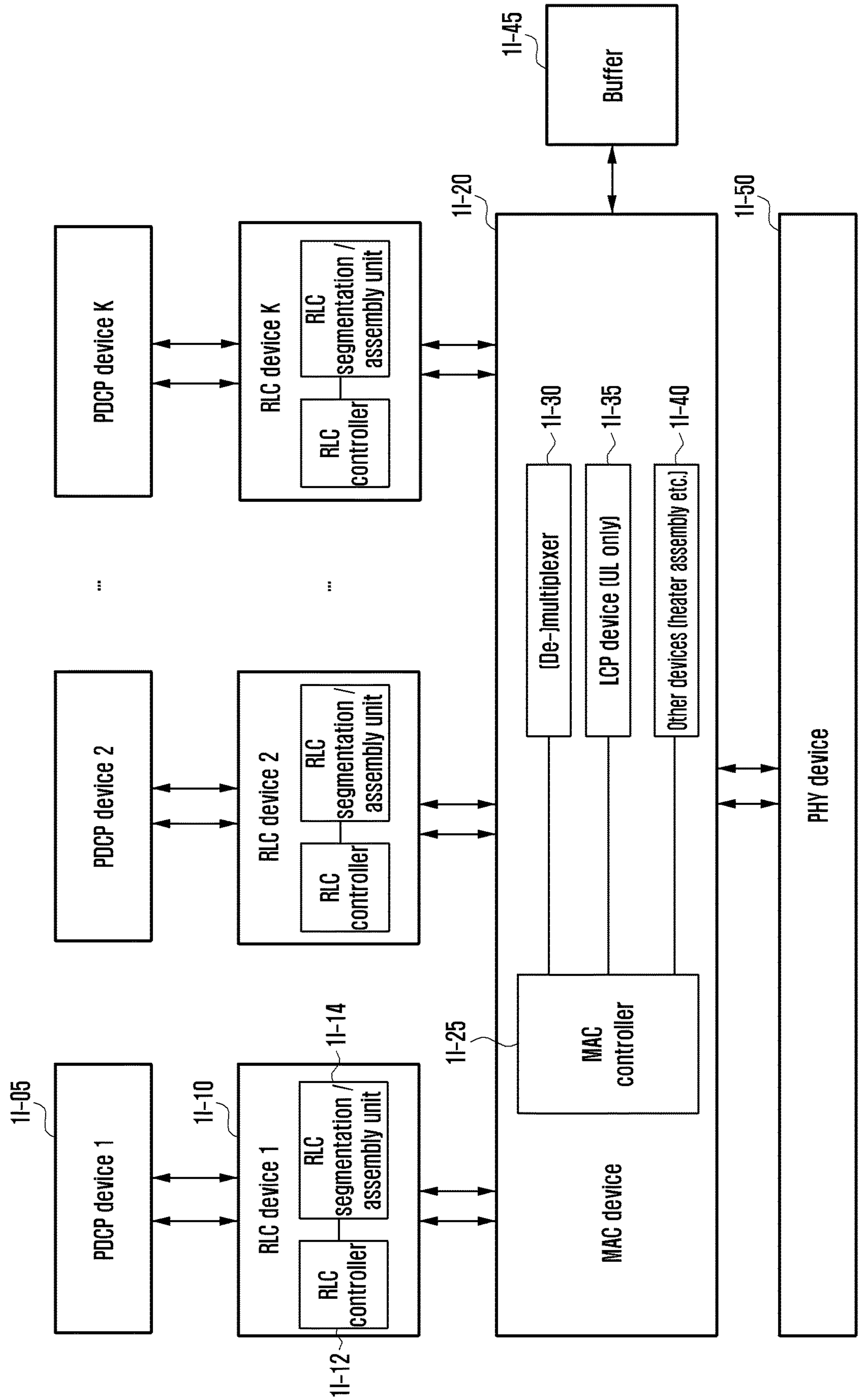
FIG. 1L is a diagram illustrating detailed devices of a terminal according to an embodiment of the present disclosure.

FIG. 1L is a diagram illustrating detailed devices of a terminal according to an embodiment of the present disclosure.

Referring to FIG. 1L, the terminal may have the PDCP apparatus 1*l*-05 and the RLC apparatus 1*l*-10 for each logical channel. If IP packets are input from an upper layer or the apparatus to the PDCP apparatus, the PDCP apparatus compresses and ciphers a header of the IP packet, attaches the PDCP heater to the compressed and ciphered header of the IP packet, and transfers the PDCP PDU to the RLC apparatus. In this case, the PDCP apparatus can process several IP packets at the same time and transfer a plurality of PDCP PDUs to the RLC apparatus in parallel. In an embodiment of the present disclosure, the RLC apparatus may process the PDCP PDU in advance and transmit the processed PDCP PDU to the MAC apparatus even if the terminal does not receive the uplink transmission resource (UL grant) (pre-processing). In this case, an RLC controller 1*l*-12 of the RLC apparatus determines the size of the PDCP PDU and may instruct an RLC segmentation and reassembly unit to perform the segmentation if it is determined that it is impossible to support the PDCP PDU by the length of the L field supported by the MAC apparatus. For example, if the L field supports 11 bits in the MAC apparatus, the size up to 2048 bytes may be indicated and therefore if the size of the RLC header and the RLC SDU (PDCP PDU) is 4000 bytes, the RLC controller 1*l*-12 instructs the RLC segmentation and assembly unit 1*l*-14 to perform the segmentation and may generate an RLC PDU having 2048 bytes and an RLC PDU having the rest bytes obtained by subtracting 2048 bytes from 4000 bytes and transfer the RLC PDUs to the MAC apparatus. In this case, the RLC apparatus can process several PDCP PDUs at the same time and transfer several RLC PDUs to the MAC apparatus in parallel. When the MAC apparatus 1*l*-20 receive the RLC PDUs from the RLC apparatus of different logical channels, the MAC controller 1*l*-20 of the MAC apparatus instructs a multiplexer 1*l*-30 or other devices 1*l*-40 to previously construct the MAC sub-headers and the MAC SDUs for each logical channel and pre-process the pre-configured MAC sub-headers and MAC SDUs in a buffer 1*l*-45. In this case, the sizes of MAC sub-headers and the MAC SDUs that may be configured in advance for each logical channel may be equal to the size of the maximum transport block (TB). In this case, the MAC apparatus requests scheduling to the base station, transmits the buffer status report (BSR), and receives the uplink transmission resources in order to transmit data. In this case, if the MAC apparatus of the terminal receives the uplink transmission resource, the MAC apparatus determines the size of the uplink transmission resource, and the MAC controller 1*l*-25 may instruct a logical channel prioritization (LCP) device 1*l*-35 to perform and LCP procedure and allocate the transmission resource to each logical channel. Then, the MAC controller 1*l*-25 instructs the multiplexer 1*l*-30 to multiplex the MAC sub-headers and the MAC SDUs previously configured for each logical channel in order according to the sizes of the transmission resources allocated for each logical channel. If the sizes of the MAC sub-headers and the MAC SDUs configured in advance are larger than the transmission resources allocated to a certain logical channel, the MAC controller 1*l*-25 may request the RLC controller 1*l*-2 to segment the corresponding RLC PDU. Then, the RLC controller 1*l*-12 requests the RLC segmentation and assembly unit 1*l*-14 to segment the corresponding RLC PDU and transfers the segmented and newly configured RLC PDUs to the MAC apparatus, and the MAC apparatus may again construct MAC sub-headers to construct MAC sub-headers and MAC SDUs according to the transmission resources of each logical channel, thereby completing the configuration of the MAC PDU The MAC apparatus first may transmit the MAC sub-header and the MAC SDU configured from the front of the MAC PDU to the PHY device 1*l*-50 and first perform the processing of the PHY device. The receiving end may first transmit the MAC sub-header and the MAC SDU first processed from the front of the MAC PDU by the MAC apparatus 1*l*-20 to the RLC apparatus 1*l*-10 to first perform the processing of the RLC apparatus. In this case, the MAC apparatus may simultaneously process several MAC sub-headers and MAC SDUs in parallel, and simultaneously transmit a plurality of MAC sub-headers and MAC SDUs to the PHY device or the RLC apparatus in parallel.

Figure 1M:
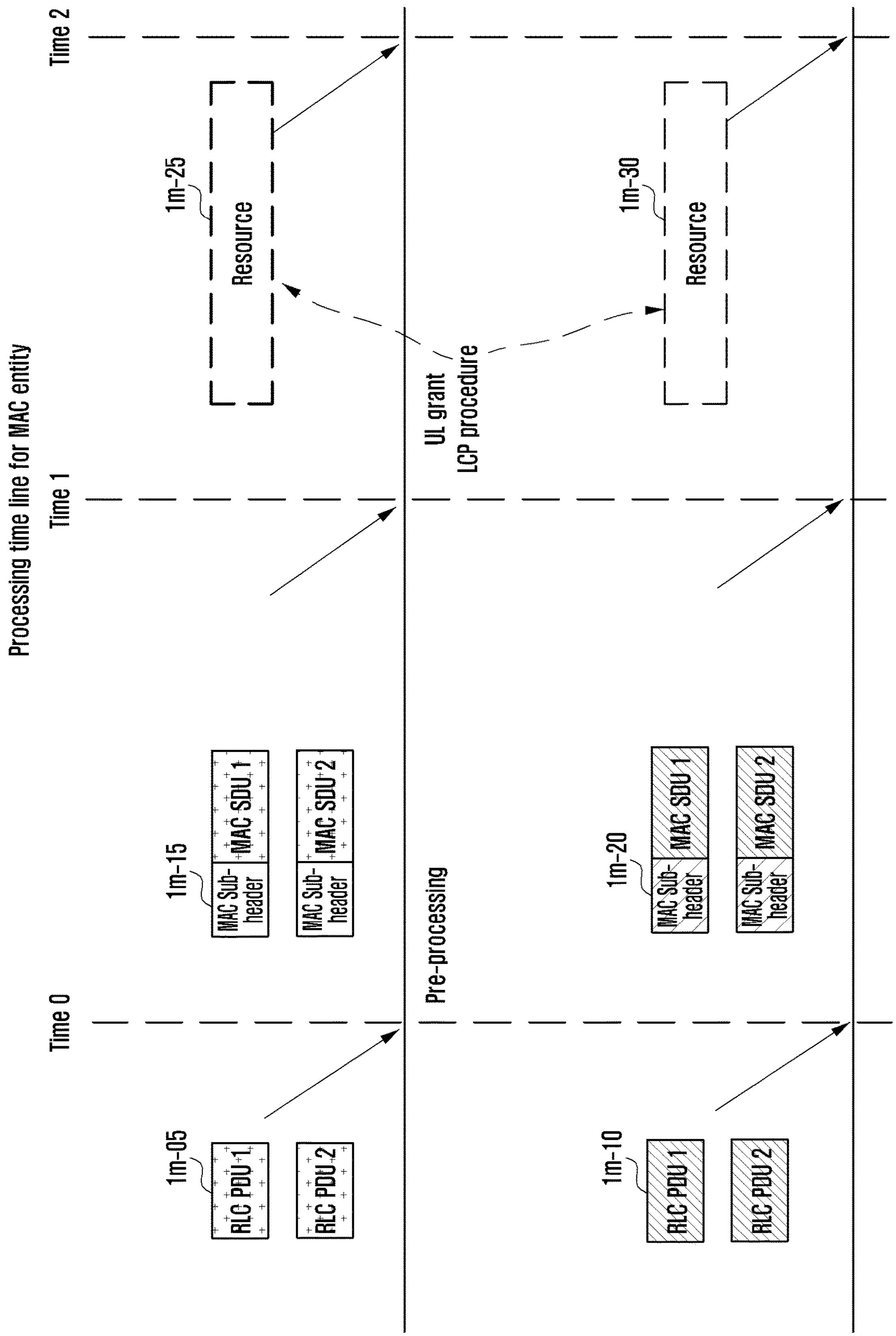
FIGS. 1MA and 1MB are diagrams illustrating in a time sequence a process of constructing MAC sub-headers and MAC subscriber data units (SDUs) in advance before a terminal is allocated a transmission resource, constructing an MAC PDU by generating an MAC control element (CE) simultaneously with constructing an MAC PDU consisting of the MAC sub-headers and MAC SDUs generated in advance if an uplink transmission resource is allocated, and locating the MAC CE at a tail of the MAC PDU according to embodiments of the present disclosure.
Figure 1M:
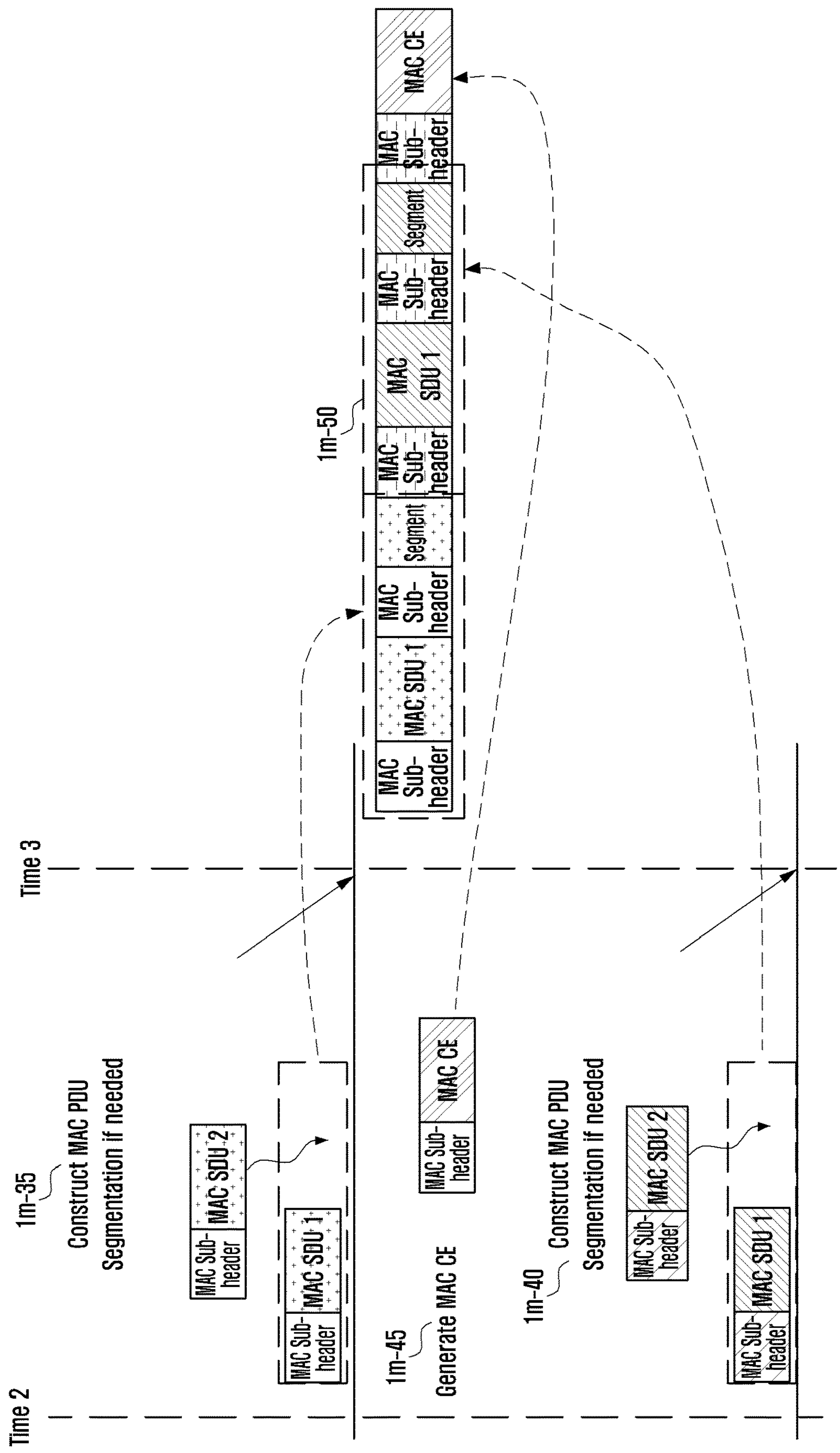

FIGS. 1MA and 1MB are diagrams illustrating in a time sequence a process of constructing MAC sub-headers and MAC SDUs in advance before a terminal is allocated a transmission resource, constructing an MAC PDU by generating an MAC CE simultaneously with constructing an MAC PDU consisting of the MAC sub-headers and MAC SDUs generated in advance if an uplink transmission resource is allocated, and locating the MAC CE at an end of the MAC PDU according to embodiments of the present disclosure.

Referring to FIGS. 1MA and 1MB, if the terminal inputs IP packets from the upper layer or the apparatus for each logical channel 1*m*-05 and 1*m*-10 to the PDCP apparatus, the PDCP apparatus compresses and ciphers the header of the IP packet and then attach the PDCP heater thereto and transfers the PDCP PDU to the RLC apparatus. In this case, the PDCP apparatus may process several IP packets at the same time and transfer a plurality of PDCP PDUs to the RLC apparatus in parallel. In an embodiment of the present disclosure, the RLC apparatus may process the PDCP PDU in advance and transmit the processed PDCP PDU to the MAC apparatus even if the terminal does not receive the uplink transmission resource (UL grant) (pre-processing). For example, the RLC PDU is creased immediately to be transferred to the MAC apparatus (Time 0). In this case, the RLC apparatus can process several PDCP PDUs at the same time and transfer several RLC PDUs to the MAC apparatus in parallel. If the MAC apparatus receives the RLC PDUs from the RLC apparatus of the different logical channels (Time 0), it can pre-construct the MAC sub-headers and the MAC SDUs for each logical channel and store them in a buffer (pre-processing, 1*m*-15, 1*m*-20). The MAC apparatus may request the scheduling to the base station, transmit the buffer status report (BSR), and may be allocated the uplink transmission resources in order to transmit data. In this case, if the MAC apparatus of the terminal receives the uplink transmission resource, it can determine its size, perform a logical channel prioritization (LCP) procedure, and allocate transmission resources for each logical channel (1*m*-25, 1*m*-30, Time 2). Then, the MAC apparatus may multiplex the MAC sub-headers and the MAC SDUs previously configured for each logical channel in order according to the size of the transmission resources allocated for each logical channel (1*m*-35, 40). If the sizes of the MAC sub-headers and the MAC SDUs configured in advance are larger than the transmission resources allocated to a certain logical channel, the MAC apparatus may request the RLC apparatus to segment the corresponding RLC PDU. Then, the RLC apparatus segments the corresponding RLC PDU and transfers the newly configured RLC PDUs to the MAC apparatus, and the MAC apparatus configures the MAC sub-headers again to construct the MAC sub-headers and the MAC SDUs according to the transmission resources of each logical channel, thereby completing the configuration of the MAC PDU (1*m*-35, 1*m*-40, and 1*m*-50). If there are predetermined reasons for the MAC CE to be generated (for example, if another MAC CE is to be transmitted according to the instruction of the BSR, PHR, or RRC layer), the MAC apparatus generate the MAC CEs in parallel simultaneously with constructing the MAC PDU by the MAC sub-headers and the MAC SDUs (1*m*-45 and 1*m*-40), thereby reducing the processing time (1*m*-45). If the preparation is completed at Time 3, the MAC sub-headers and the MAC SDUs are multiplexed in order, and the MAC CE is put in the end, thereby completing the MAC PDU (1*m*-45).

Figure 1N:
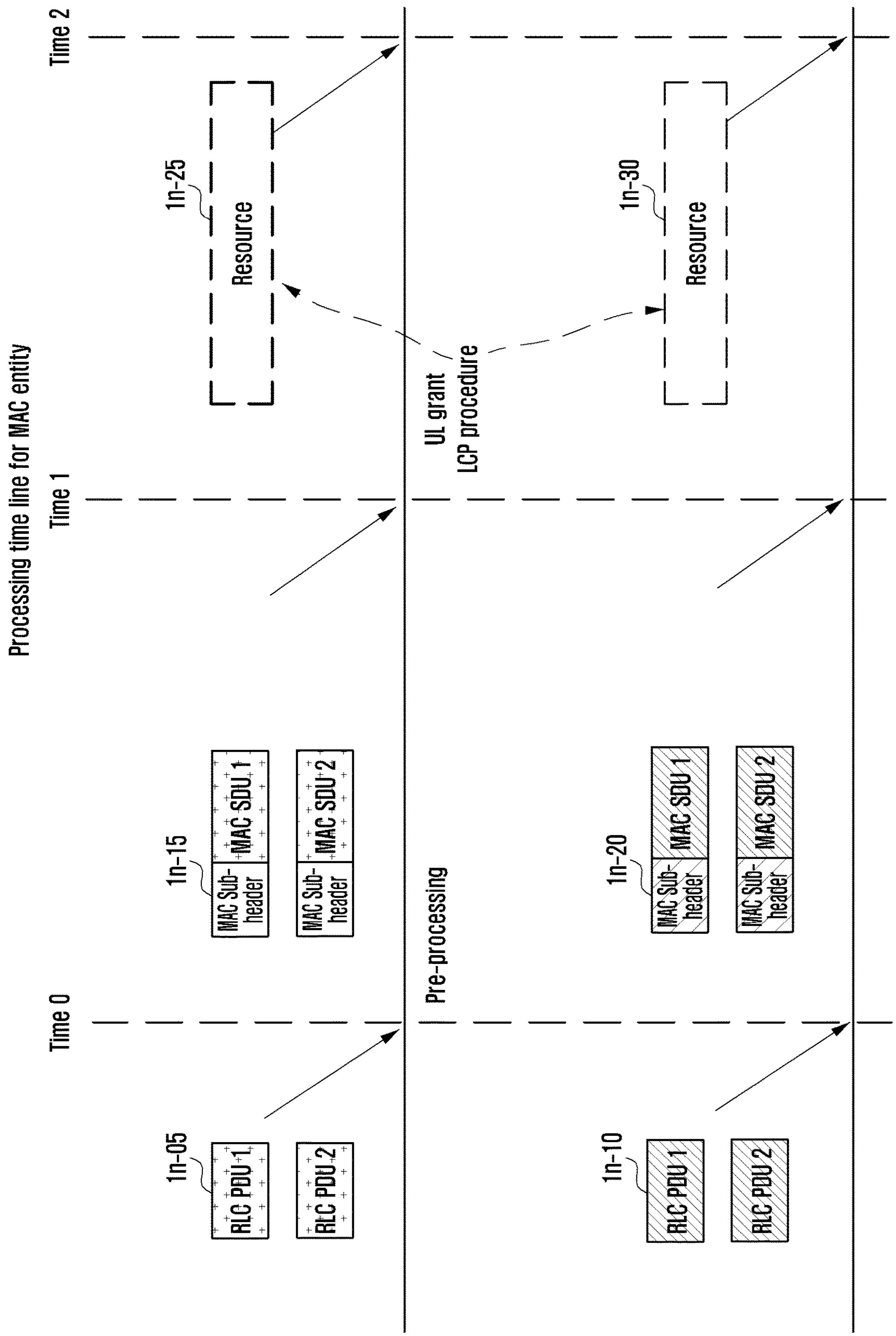
FIGS. 1NA and 1NB are diagrams illustrating in a time sequence a process of constructing MAC sub-headers and MAC SDUs in advance before a terminal is allocated a transmission resource, constructing an MAC PDU by generating an MAC CE simultaneously with constructing an MAC PDU consisting of the MAC sub-headers and MAC SDUs generated in advance if an uplink transmission resource is allocated, and locating the MAC CE at a head of the MAC PDU according to embodiments of the present disclosure.
Figure 1N:
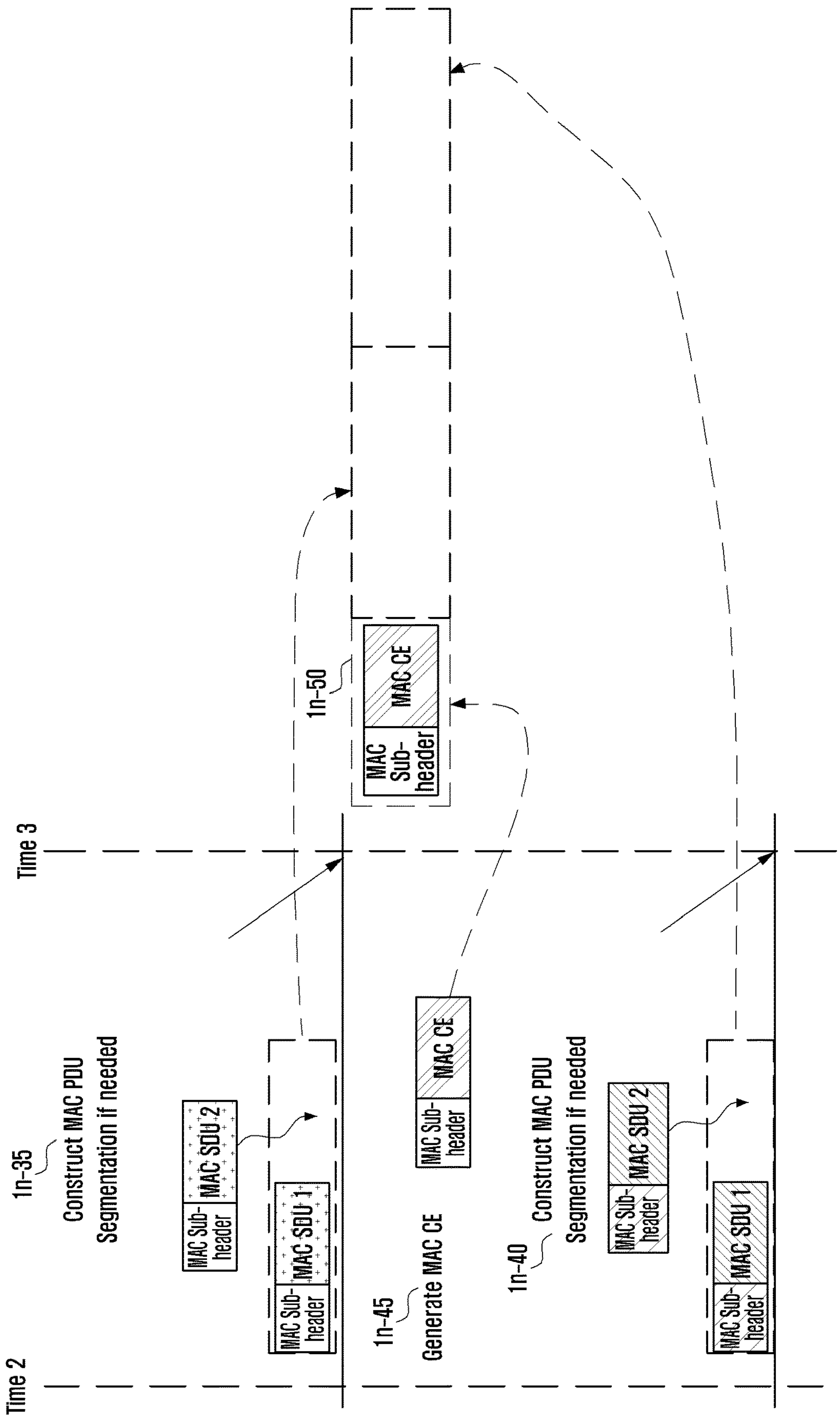

FIGS. 1NA and 1NB are diagrams illustrating in a time sequence a process of constructing MAC sub-headers and MAC SDUs in advance before a terminal is allocated a transmission resource, constructing an MAC PDU by generating an MAC CE simultaneously with constructing an MAC PDU consisting of the MAC sub-headers and MAC SDUs generated in advance if an uplink transmission resource is allocated, and locating the MAC CE at an end of the MAC PDU according to embodiments of the present disclosure.

Referring to FIGS. 1NA and 1NB, if the terminal inputs IP packets from the upper layer or the apparatus for each logical channel 1*n*-05 and 1*n*-10 to the PDCP apparatus, the PDCP apparatus compresses and ciphers the header of the IP packet and then attach the PDCP heater thereto and transfers the PDCP PDU to the RLC apparatus. In this case, the PDCP apparatus may process several IP packets at the same time and transfer a plurality of PDCP PDUs to the RLC apparatus in parallel. In an embodiment of the present disclosure, the RLC apparatus may process the PDCP PDU in advance and transmit the processed PDCP PDU to the MAC apparatus even if the terminal does not receive the uplink transmission resource (UL grant) (pre-processing). For example, the RLC PDU may be immediately generated to be transferred to the MAC apparatus (Time 0). In this case, the RLC apparatus can process several PDCP PDUs at the same time and transfer several RLC PDUs to the MAC apparatus in parallel. If the MAC apparatus receives the RLC PDUs from the RLC apparatus of the different logical channels (Time 0), it can pre-construct the MAC sub-headers and the MAC SDUs for each logical channel and store them in a buffer (pre-processing, 1*m*-15, 1*m*-20). The MAC apparatus may request the scheduling to the base station, transmit the buffer status report (BSR), and may be allocated the uplink transmission resources in order to transmit data. In this case, if the MAC apparatus of the terminal receives the uplink transmission resource, it can determine its size, perform a logical channel prioritization (LCP) procedure, and allocate transmission resources for each logical channel (1*n*-25, 1*n*-30, Time 2). Then, the MAC apparatus may multiplex the MAC sub-headers and the MAC SDUs previously configured for each logical channel in order according to the size of the transmission resources allocated for each logical channel (1*n*-35, 40). If the sizes of the MAC sub-headers and the MAC SDUs configured in advance are larger than the transmission resources allocated to a certain logical channel, the MAC apparatus may request the RLC apparatus to segment the corresponding RLC PDU. Then, the RLC apparatus segments the corresponding RLC PDU and transfers the newly configured RLC PDUs to the MAC apparatus, and the MAC apparatus configures the MAC sub-headers again to construct the MAC sub-headers and the MAC SDUs according to the transmission resources of each logical channel, thereby completing the configuration of the MAC PDU (1*n*-35, 1*n*-40, and 1*n*-50). If there is predetermined reasons for the MAC CE to be generated (for example, if another MAC CE is to be transmitted according to the instruction of the BSR, PHR, or RRC layer), the MAC apparatus generate the MAC CEs in parallel simultaneously with constructing the MAC PDU with the MAC sub-headers and the MAC SDUs (1*n*-35 and 1*n*-40), thereby reducing the processing time (1*n*-45). If the preparation is completed at time 3, the MAC CE is put in the head, and the base station first confirms the MAC CE and quickly obtains the scheduling information to quickly obtain the scheduling information of the terminals, and then multiplexes the MAC sub-headers and the MAC SDUs in order, thereby completing the MAC PDU (1*n*-50).

Figure 10A:
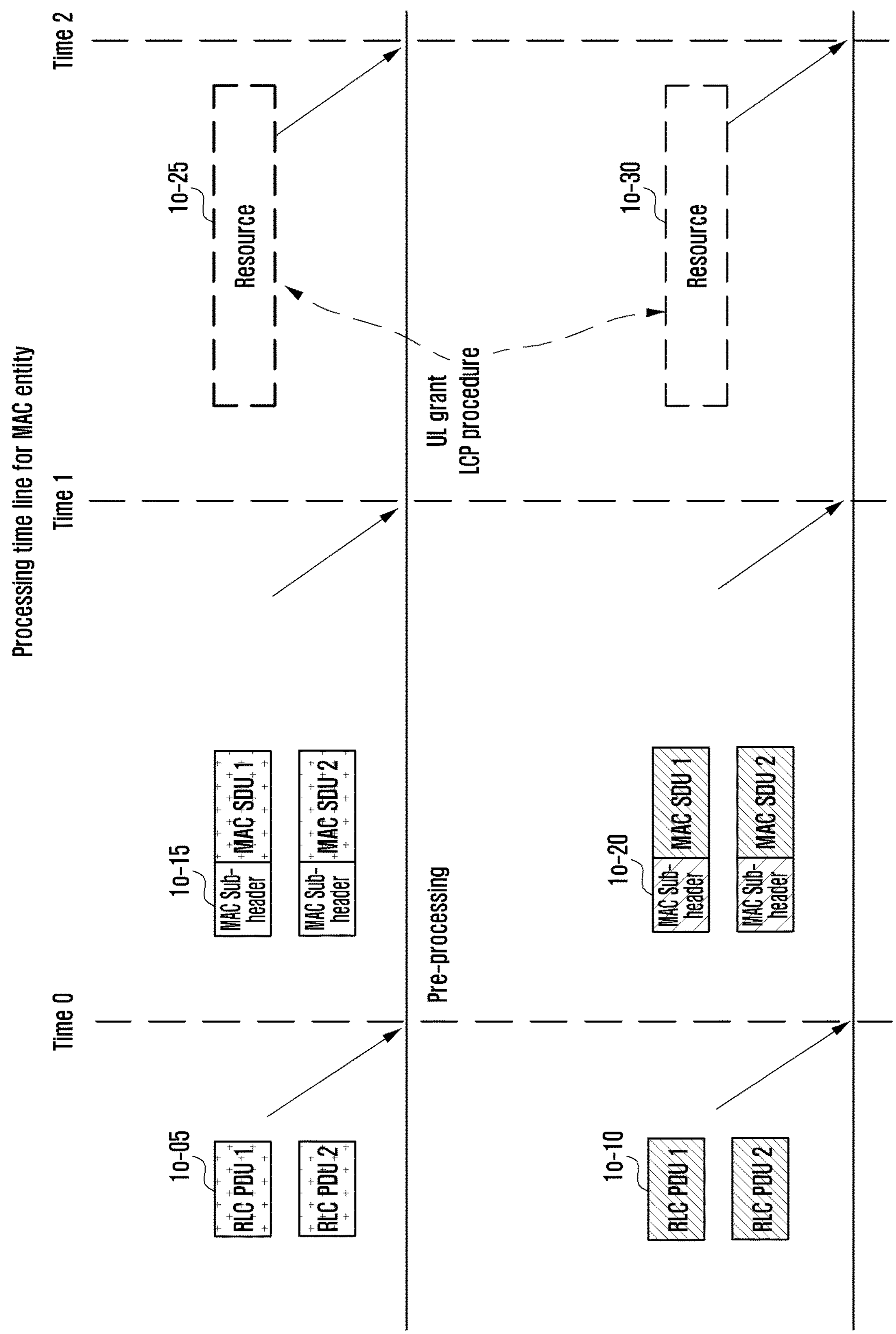
FIGS. 10A and 10B are diagrams illustrating in a time sequence a process of constructing MAC sub-headers and MAC SDUs in advance before a terminal is allocated a transmission resource, constructing an MAC PDU by generating an MAC CE simultaneously with constructing an MAC PDU consisting of the MAC sub-headers and MAC SDUs generated in advance if an uplink transmission resource is allocated, and locating the MAC CE at a head of the MAC PDU according to embodiments of the present disclosure.
Figure 10B:
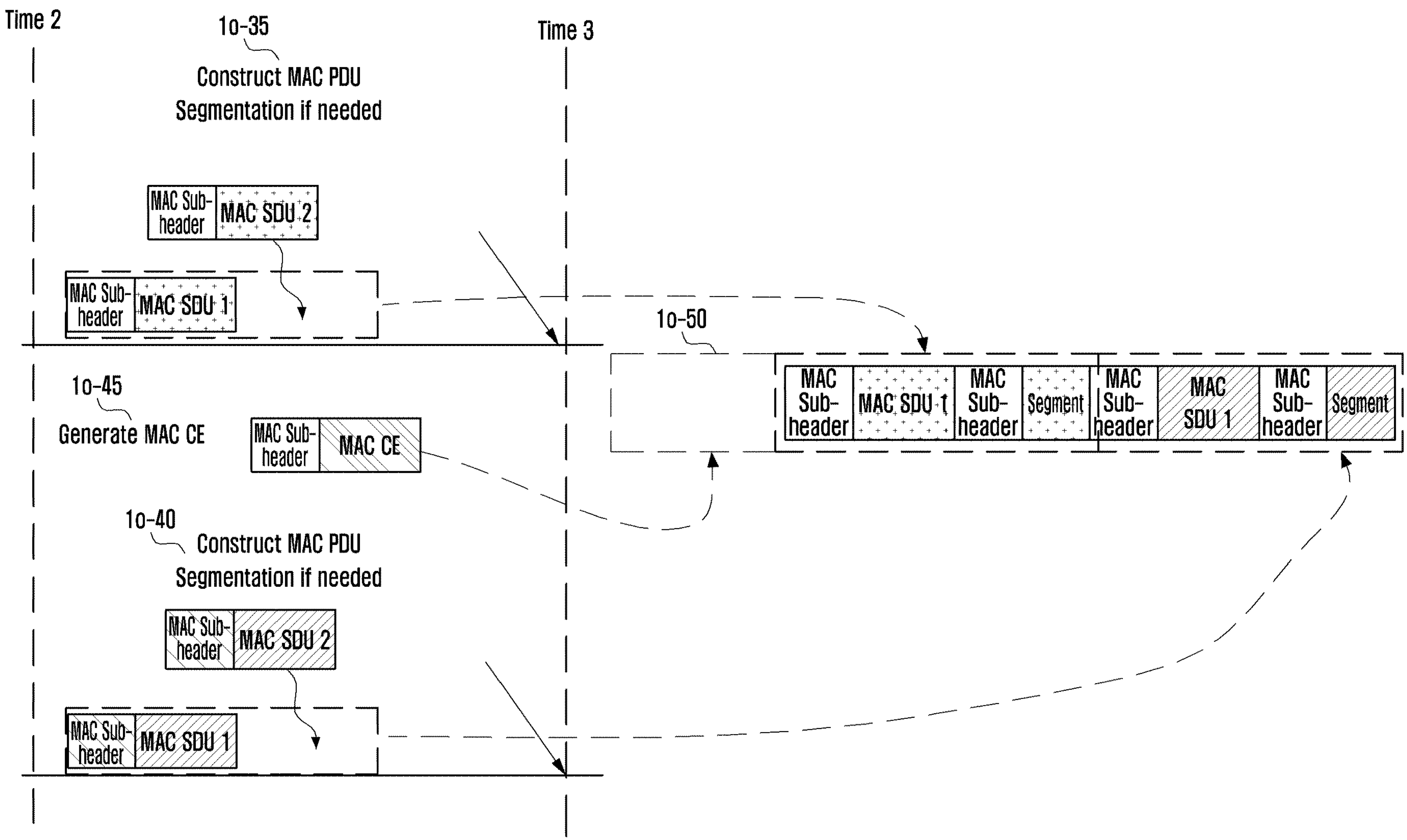

FIGS. 10A and 10B are diagrams illustrating in a time sequence a process of constructing MAC sub-headers and MAC SDUs in advance before a terminal is allocated a transmission resource, constructing an MAC PDU by generating an MAC CE simultaneously with constructing an MAC PDU consisting of the MAC sub-headers and MAC SDUs generated in advance if an uplink transmission resource is allocated, and locating the MAC CE at an end of the MAC PDU according to embodiments of the present disclosure.

FIGS. 10A and 10B may perform the same procedures as those of FIGS. 1NA and 1NB. However, if the MAC sub-headers and the MAC SDUs are prepared before the MAC CE is generated, the place where the MAC CE is to be configured is left at the head like 1*o*-50 (in practice, the memory whose the head part is filled with the MAC CE is reserved in advance) and the configuration of the MAC PDU may start with the prepared MAC sub-headers and the MAC SDUs from the back thereof. If the generation of the MAC CE is completed, the MAC CE may be located at the head of the MAC PDU that was previously left or reserved.

Second Embodiment

Figure 2A:
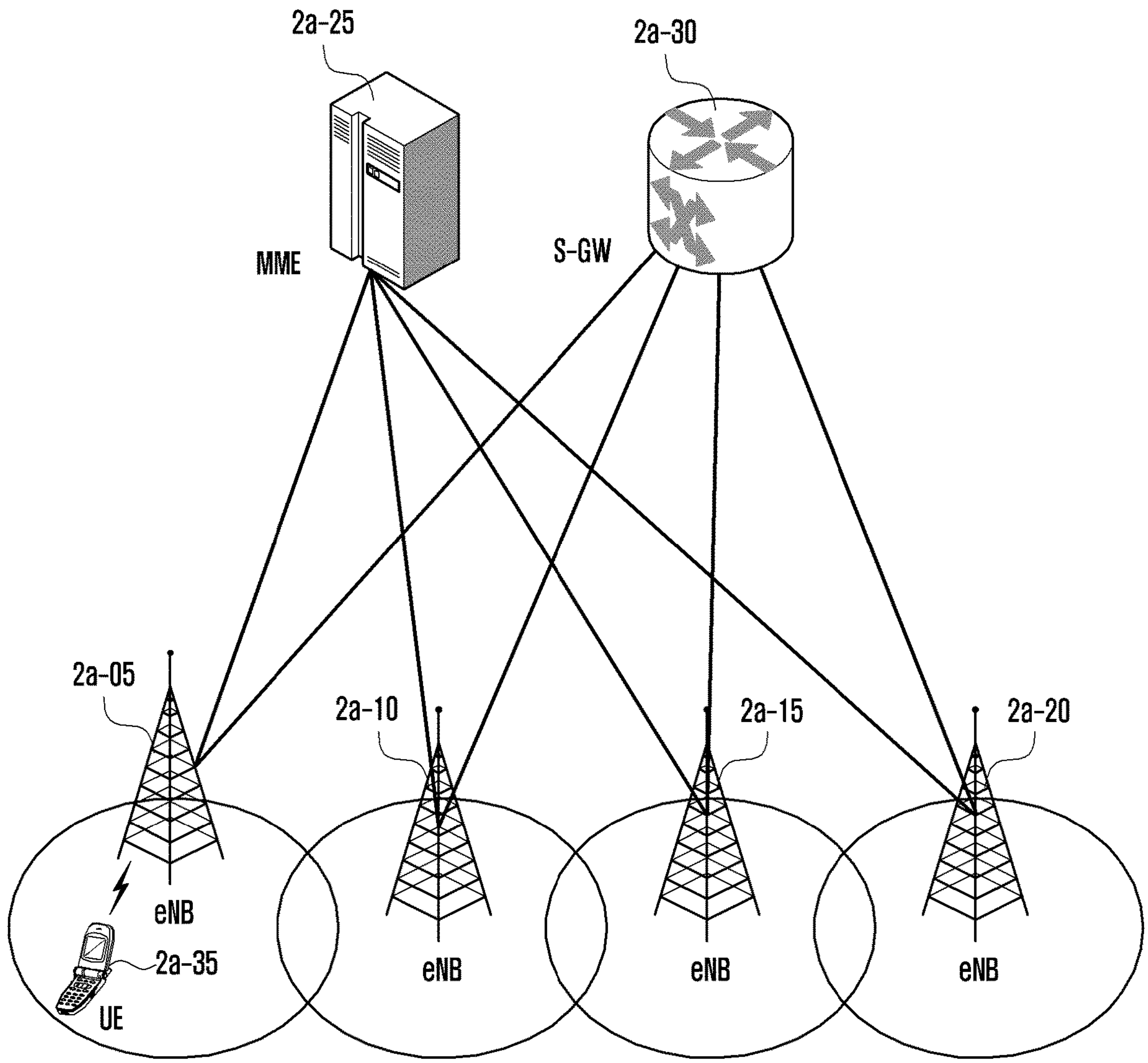
FIG. 2A is a diagram illustrating a structure of an LTE system according to an embodiment of the present disclosure.

FIG. 2A is a diagram illustrating a structure of an LTE system according to an embodiment of the present disclosure.

Referring to FIG. 2A, a radio access network of an LTE system is configured to include next generation base stations (evolved node B, hereinafter, eNB, Node B, or base station) 2*a*-05, 2*a*-10, 2*a*-15, and 2*a*-20, a mobility management entity (MME) 2*a*-25, and a serving-gateway (S-GW) 2*a*-30. User equipment (hereinafter, UE or terminal) 2*a*-35 accesses an external network through the eNBs 2*a*-05 to 2*a*-20 and the S-GW 2*a*-30.

Referring to FIG. 2A, the eNB 2*a*-05 to 2*a*-20 correspond to the existing node B of the UMTS system. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmit power status, and a channel state of the terminals is required. Here, the eNBs 2*a*-05 to 2*a*-20 take charge of the collecting and scheduling. The eNB is connected to the UE 2*a*-35 through a radio channel and performs more complicated role than the existing node B. For example, to implement a transmission rate of 100 Mbps, the LTE system uses, as a radio access technology, OFDM, for example, in a bandwidth of 20 MHz. Further, an adaptive modulation & coding (hereinafter, called AMC) determining a modulation scheme and a channel coding rate depending on the channel status of the terminal is applied. The S-GW 2*a*-30 is an apparatus for providing a data bearer and generates or removes the data bearer according to the control of the MME 2*a*-25. The MME is an apparatus for performing a mobility management function for the terminal and various control functions and is connected to a plurality of base stations.

Figure 2B:
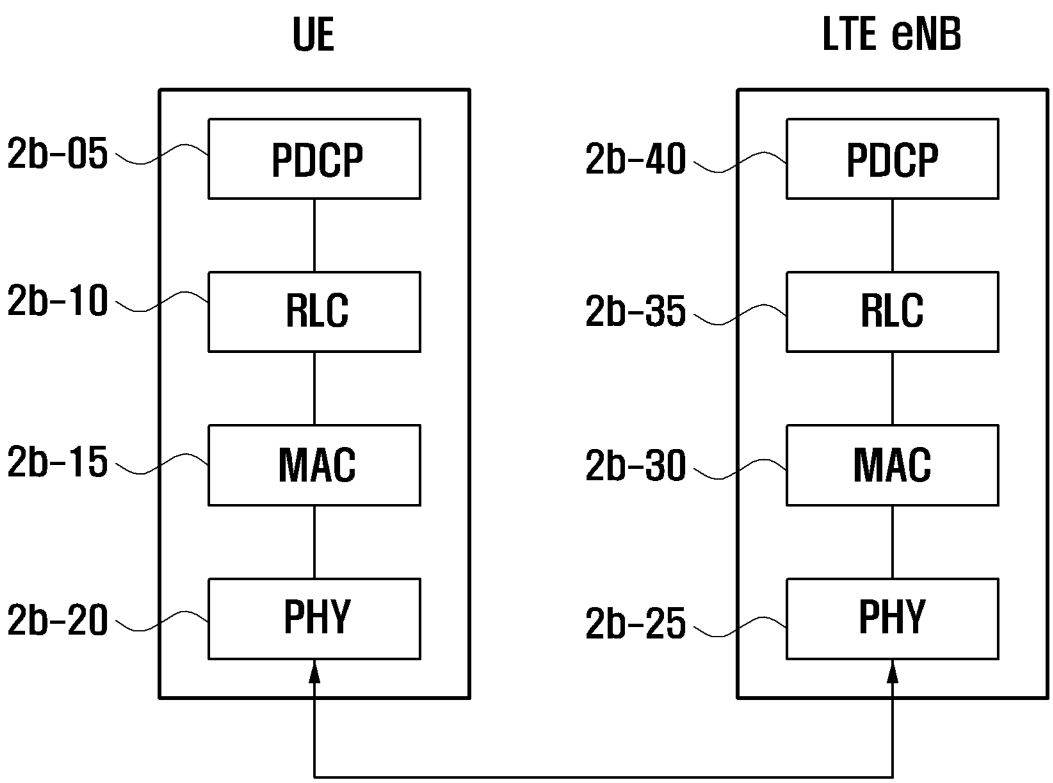
FIG. 2B is a diagram illustrating a radio protocol structure in an LTE system according to an embodiment of the present disclosure.

FIG. 2B is a diagram illustrating a radio protocol structure in an LTE system according to an embodiment of the present disclosure.

Referring to FIG. 2B, the radio protocol of the LTE system is configured to include PDCPs 2*b*-05 and 2*b*-40, RLCs 2*b*-10 and 2*b*-35, and medium access controls (MMCs) 2*b*-15 and 2*b*-30 in the terminal and the eNB, respectively. The PDCPs 2*b*-05 and 2*b*-40 are in charge of operations, such as IP header compression/decompression. The main functions of the PDCP are summarized as follows.

- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink.)

The RLCs 2*b*-10 and 2*b*-35 reconfigures the PDCP PDU to an appropriate size to perform the ARQ operation or the like. The main functions of the RLC are summarized as follows.

- Data transfer function (Transfer of upper layer PDUs)
- ARQ function (Error Correction through ARQ (only for AM data transfer))
- Concatenation, segmentation, reassembly functions (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplicate detection function (Duplicate detection (only for UM and AM data transfer))
- Error detection function (Protocol error detection (only for AM data transfer))
- RLC SDU discard function (RLC SDU discard (only for UM and AM data transfer))
- RLC re-establishment function (RLC re-establishment)

The MACs 2*b*-15 and 2*b*-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

- Mapping function (Mapping between logical channels and transport channels)
- Multiplexing/demultiplexing function (Multiplexing/demultiplexing of MAC SDUs belonging to one or different logical channels into/from transport blocks (TB) delivered to/from the physical layer on transport channels)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

Physical layers 2*b*-20 and 2*b*-25 perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2C:
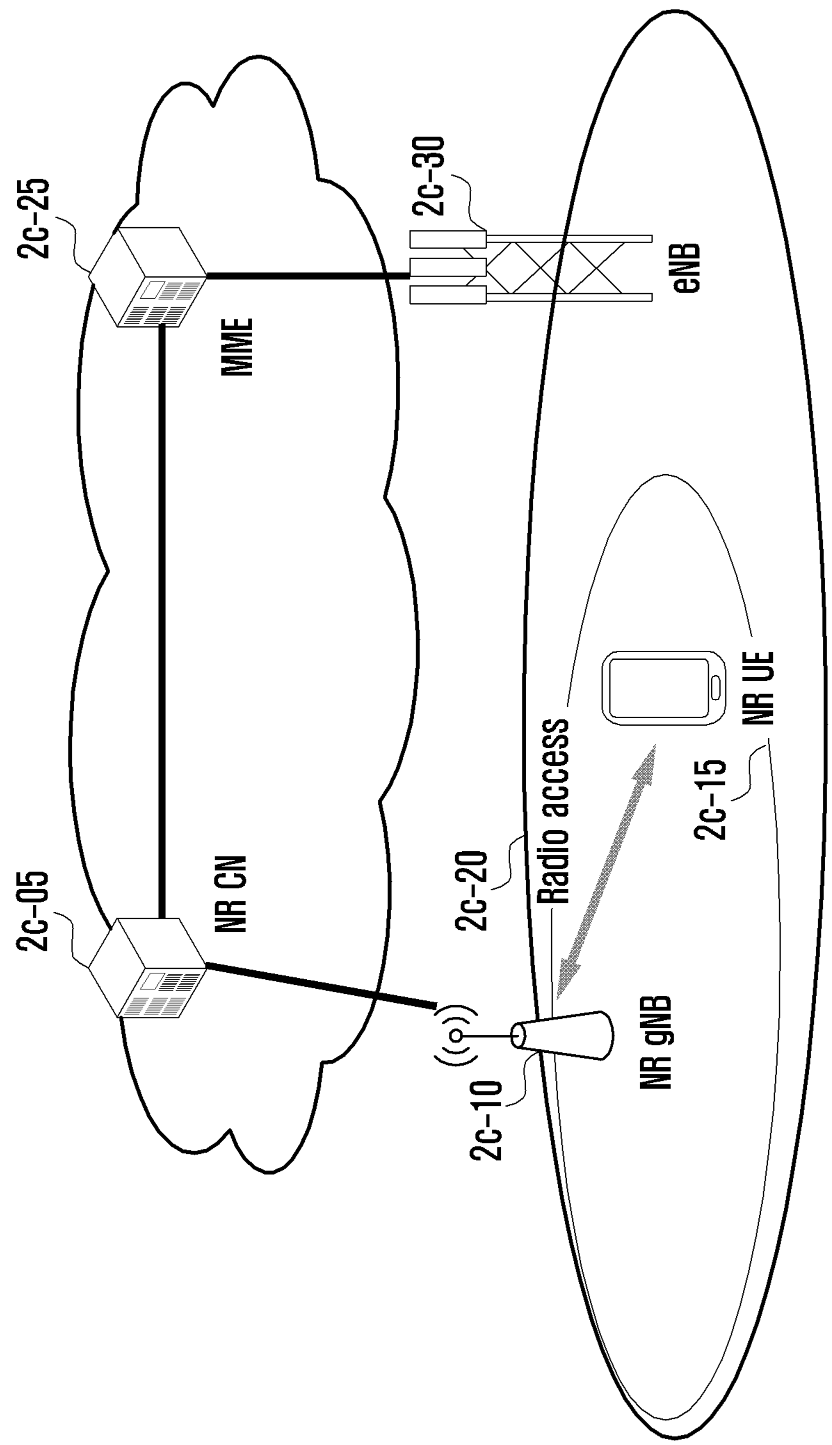
FIG. 2C is a diagram illustrating a structure of a next generation mobile communication system according to an embodiment of the present disclosure.

FIG. 2C is a diagram illustrating a structure of a next generation mobile communication system according to an embodiment of the present disclosure.

Referring to FIG. 2C, a radio access network of a next generation mobile communication system (hereinafter referred to as NR or 5G) is configured to include a next generation base station (New radio node B, hereinafter NR gNB or NR base station) 2*c*-10 and a new radio core network (NR CN) 2*c*-05. The user terminal (new radio user equipment, hereinafter, NR UE or UE) 2*c*-15 accesses the external network through the NR gNB 2*c*-10 and the NR CN 2*c*-05.

In FIG. 2C, the NR gNB 2*c*-10 corresponds to an evolved node B (eNB) of the existing LTE system. The NR gNB is connected to the NR UE 2*c*-15 via a radio channel and may provide a service superior to the existing node B. In the next generation mobile communication system, since all user traffics are served through a shared channel, an apparatus for collecting state information, such as a buffer state, an available transmit power state, and a channel state of the UEs to perform scheduling is required. The NR NB 2*c*-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a radio access technology 2*c*-20. Further, an adaptive modulation & coding (hereinafter, called AMC) determining a modulation scheme and a channel coding rate depending on the channel status of the terminal is applied. The NR CN 1*c*-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 2*c*-25 through the network interface. The MME 2 is connected to the eNB 2*c*-30 which is the existing base station.

Figure 2D:
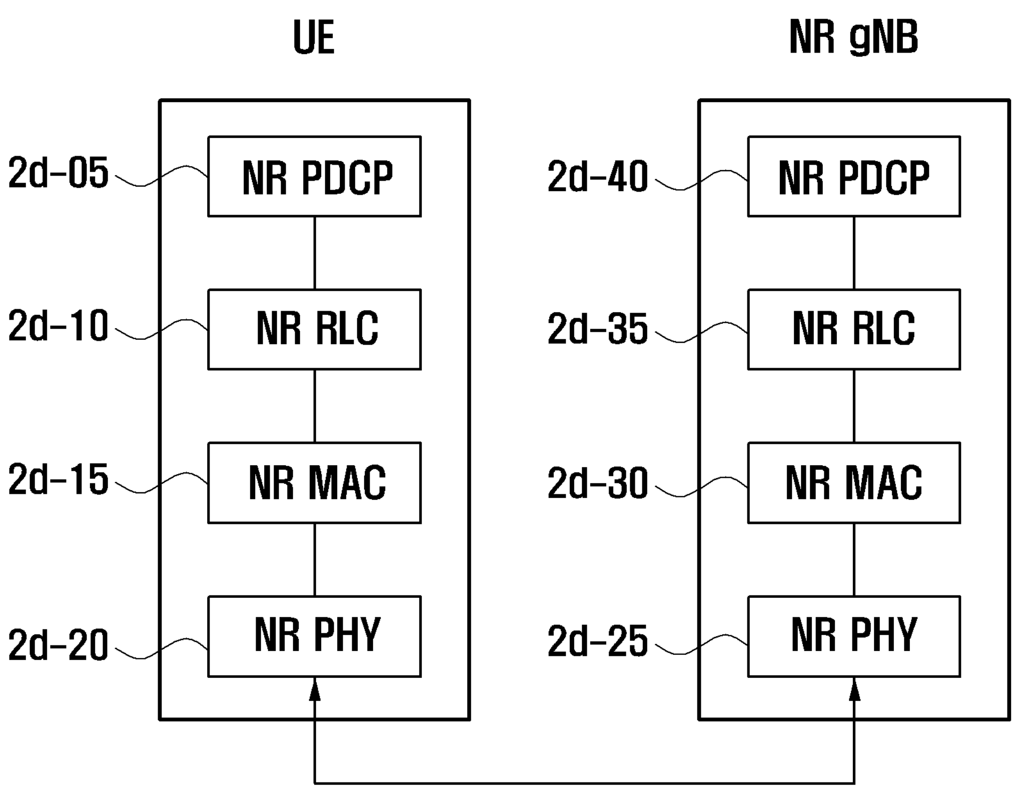
FIG. 2D is a diagram illustrating a radio protocol structure of a next generation mobile communication system according to an embodiment of the present disclosure.

FIG. 2D is a diagram illustrating a radio protocol structure of a next generation mobile communication system according to an embodiment of the present disclosure.

Referring to FIG. 2D, the radio protocol of the next generation mobile communication system is configured to include NR PDCPs 2*d*-05 and 2*d*-40, NR RLCs 2*d*-10 and 2*d*-35, and NR MACs 2*d*-15 and 2*d*-30 in the terminal and the NR base station. The main functions of the NR PDCPs 2*d*-05 and 2*d*-40 may include some of the following functions.

- Header compression and decompression function (Header compression and decompression: ROHC only)
- Transfer function of user data (Transfer of user data)
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink)

In this case, the reordering function of the NR PDCP apparatus refers to a function of rearranging PDCP PDUs received in a lower layer in order based on a PDCP sequence number (SN) and may include a function of transferring data to an upper layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 2*d*-10 and 2*d*-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In this case, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the upper layer in order when there is the lost RLC SDU, a function of transferring all the received RLC SDUs to the upper layer before a predetermined timer starts if the timer expires even if there is the lost RLC SDU, or a function of transferring all the RLC SDUs received until now to the upper layer in order if the predetermined timer expires even if there is the lost RLC SDU. In this case, the out-of-sequence delivery function of the NR RLC apparatus refers to a function of directly delivering the RLC SDUs received from the lower layer to the upper layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 2*d*-15 and 3*d*-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)

Transport format selection function (Transport format selection)

Padding function (Padding)

The NR PHY layers 2*d*-20 and 2*d*-25 may perform an operation of channel-coding and modulating upper layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 2E:
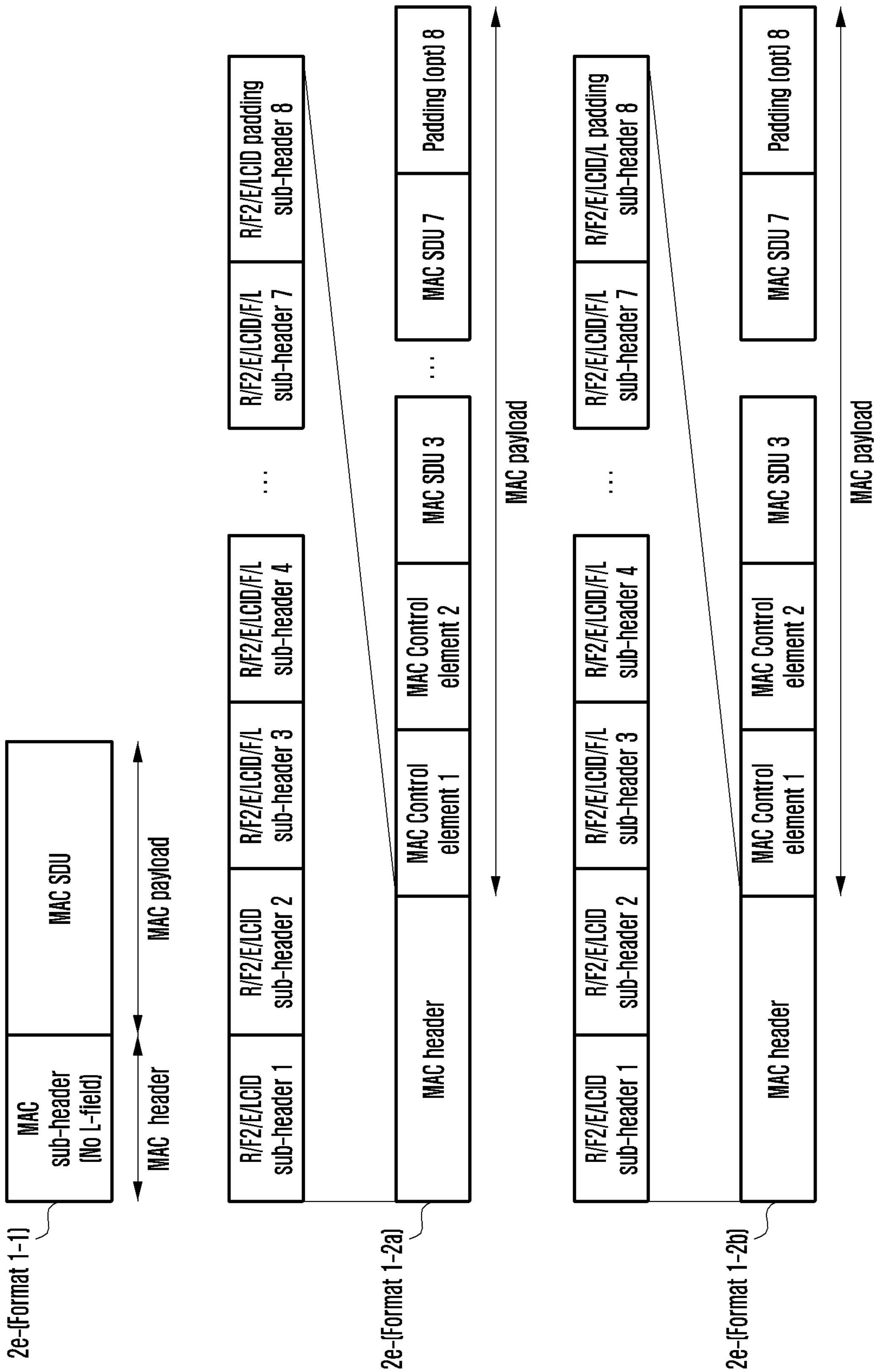
FIGS. 2EA and 2EB are diagrams illustrating a first MAC PDU structure for a next generation mobile communication system according to embodiments of the present disclosure.
Figure 2E:
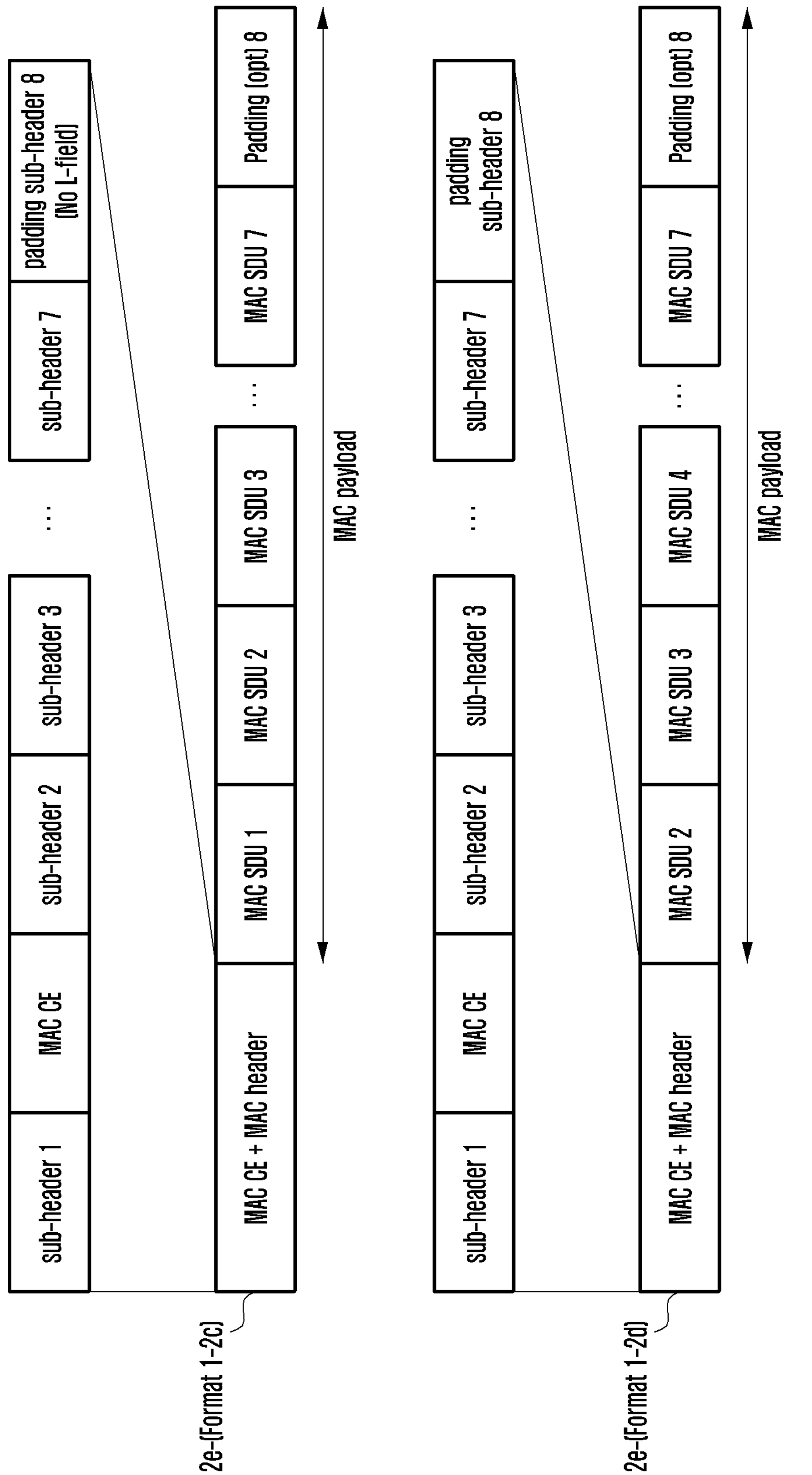

FIGS. 2EA and 2EB are diagrams illustrating a first MAC PDU structure for a next generation mobile communication system according to an embodiment of the present disclosure.

Meanwhile, the embodiment of the configuration and transmission of the MAC PDU of the terminal or the base station described below may be interpreted as an operation between the transmitting end and the receiving end. In other words, the process of transmitting the uplink MAC PDU configured by the terminal which is the transmitting end to the base station which is the receiving end may be applied to the process of transmitting the downlink MAC PDU configured by the base station which is the transmitting end to the terminal which is the receiving end.

Referring to FIGS. 2EA and 2EB, if the MAC transmitting side receives the RLC PDU (or MAC SDU) from the RLC layer, the MAC transmitting side inserts an identifier (local channel identity, hereinafter, referred to as LCID) of RLC entity generated by the RLC PDU (or MAC SDU) and a size (length, hereinafter, referred to as an L-field) of the RLC PDU into the MAC header. The LCID and the L-field are inserted one by one per RLC PDU, and therefore if the plurality of RLC PDUs are multiplexed into the MAC PDU, the LCID and the L-field may also be inserted by the number of RLC PDUs.

Since the information of the MAC header is usually located at the front part of the MAC PDU, the LCID and the L-fields are matched with the RLC PDU (or MAC SDU) within the header in order. In other words, MAC sub-header 1 indicates information on MAC SDU 1, and MAC sub-header 2 indicates information on MAC SDU 2.

For the operation of the physical layer, a total size of the MAC PDU is given to the receiving side as separate control information. Since the total size of the MAC PDU is a quantized value according to a predetermined criterion, padding may be used in some cases. The padding means certain bits (usually ‘0’) that are filled in the remaining part of the packet so that when the packet is generated with data, the size of the packet is byte-aligned.

Since the total size of the MAC PDU is given, an L-field value indicating the size of the RLC PDU (or MAC SDU) may be unnecessary information in some cases. For example, if only one RLC PDU is stored in the MAC PDU, the size of the RLC PDU has the possibility that the size of the MAC header is equal to a limited value in the size of the MAC PDU.

Meanwhile, the VoIP packet consists of an IP/UDP/RTP header and a VoIP frame, and the IP/UDP/RTP header is compressed to about 1 to 15 bytes through a header compression protocol called a robust header compression (ROHC) and the size of the VoIP frame always has a constant value within a given codec rate. Therefore, the size of the VoIP packet does not deviate from a certain range, and it is effective to use a predetermined value rather than informing a value each time like the L-field.

The following Table 2 describes the information that may be included in the MAC header.

TABLE 2

Variables in MAC Header

| Variable | Usage |
|---|---|
| LCID | The LCID may indicate the identifier of the RLC entity that generates the RLC PDU (or MAC SDU) received from the upper layer. Alternatively, the LCID may indicate the MAC control element (CE) or the padding. Further, the LCID may be defined differently depending on the channel to be transmitted. For example, the LCID may be defined differently according to DL-SCH, UL-SCH, and MCH. |
| L | The L may indicate a length of the MAC SDU, and may indicate a length of the MAC CE having a variable length. In the case of the MAC CE having a fixed length, the L-field may be omitted. The L-field may be omitted for predetermined reasons. The predetermined reasons are the case where the size of the MAC SDU is fixed, the size of the MAC PDU is informed from the transmitting side to the receiving side, or the length may be calculated by calculation at the receiving side. |
| F | The F indicates the size of the L-field. If there is no L-field, the F may be omitted, and if there is the F-field, the size of the L-field can be limited to a predetermined size. |
| F2 | The F2 indicates the size of the L-field. If there is no L-field, the F2 may be omitted, and if there is the F2-field, the size of the L-field may be limited to a predetermined size and the L-field may be limited to a size different from the F-field. For example, the F2-field may indicate a larger size than the F-field. |
| E | E indicates other headers in the MAC heater. For example, if the E has a value of 1, variables of another MAC header may be come. However, if the E has a value of 0, the MAC SDU, the MAC CE, or the Padding may be come. |
| R | Reserved bit. |

Referring to FIGS. 2EA and 2EB, 2*e*-(Format 1-1) may store one MAC SDU or MAC CE. In the above structure, the MAC header is located at a front part and the payload is located at a rear part. The header may include the variables described in Table 2 except for the L-field, and information other than the variables described in Table 2.

2*e*-(Format 1-2*a*) has a structure in which the MAC header is located at the front part of the MAC PDU, followed by the MAC CE, the MAC SDU, and the padding. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 1*e*-(Format 1-2*a*). The 2*e*-(Format 1-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

2*e*-(Format 1-2*b*) has a structure in which the MAC header is located at the front part of the MAC PDU, followed by the MAC CE, the MAC SDU, and the padding. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2e-(Format 1-2b). In the 2e-(Format 1-2b) structure, the L-field may be included in all the sub-headers.

2e-(Format 1-2c) has a structure in which the MAC header is located at the front part of the MAC PDU, followed by the MAC SDU and the padding. If the MAC CE is generated, the MAC CE may be included in the head of the MAC PDU together with the MAC sub-header of the MAC CE. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2e-(Format 1-2c). The 2e-(Format 1-2c) structure is characterized in that an L-field is not included in the last sub-header. The receiving side may confirm the L-field value of the remaining sub-headers and subtract the L-field value from the entire length of the MAC PDU to estimate the length of the MAC SDU.

2e-(Format 1-2d) has a structure in which the MAC header is located at the front part of the MAC PDU, followed by the MAC SDU and the padding. If the MAC CE is generated, the MAC CE may be included in the head of the MAC PDU together with the MAC sub-header of the MAC CE. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2e-(Format 1-2d). In the 2e-(Format 1-2d) structure, the L-field may be included in all the sub-headers.

Figure 2F:
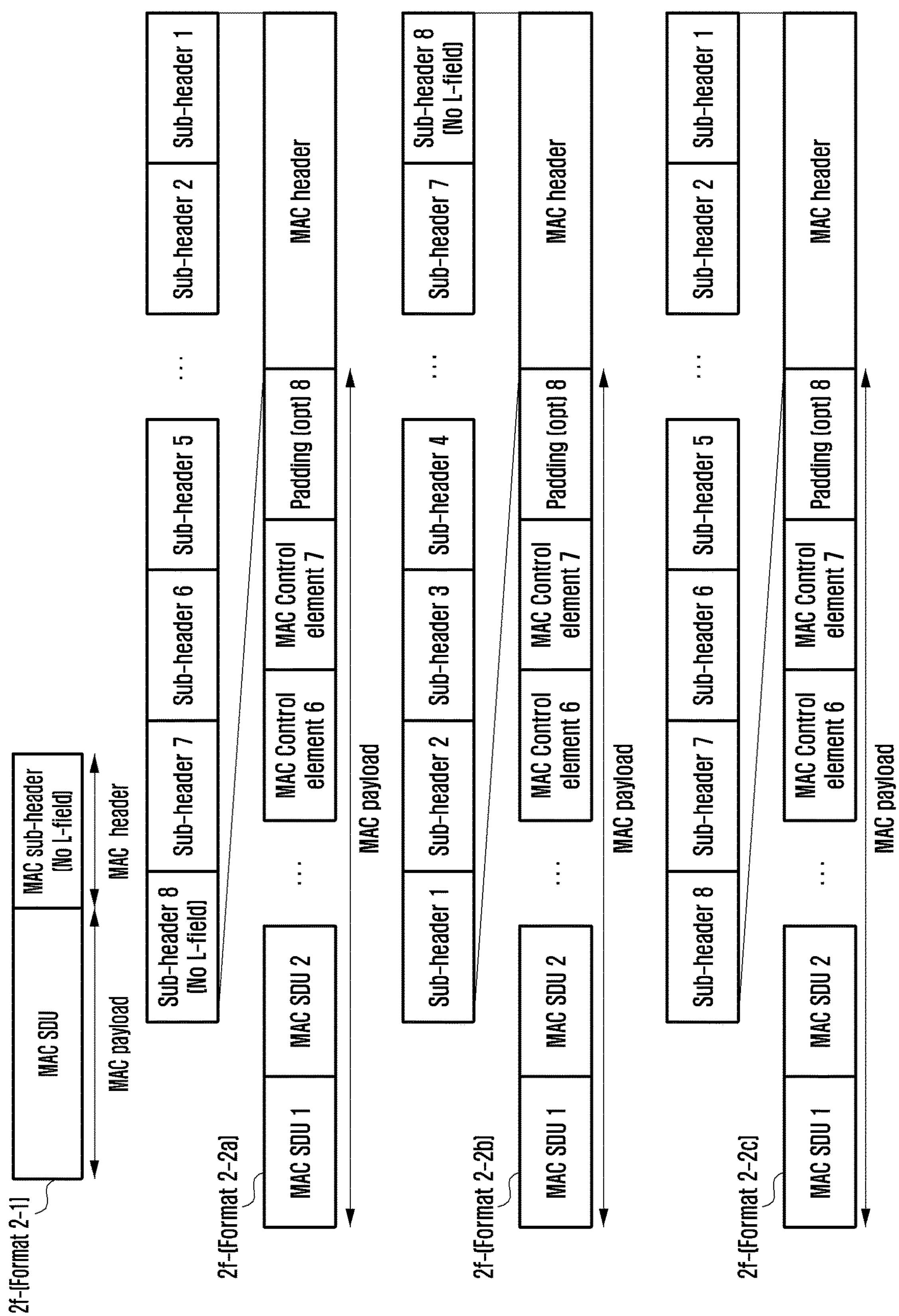
FIGS. 2FA, 2FBA, 2FBB, 2FCA, 2FCB, 2FDA, 2FDB, 2FEA, 2FEB, and 2FF are diagrams illustrating a second MAC PDU structure for a next generation mobile communication system according to embodiments of the present disclosure.
Figure 2F:
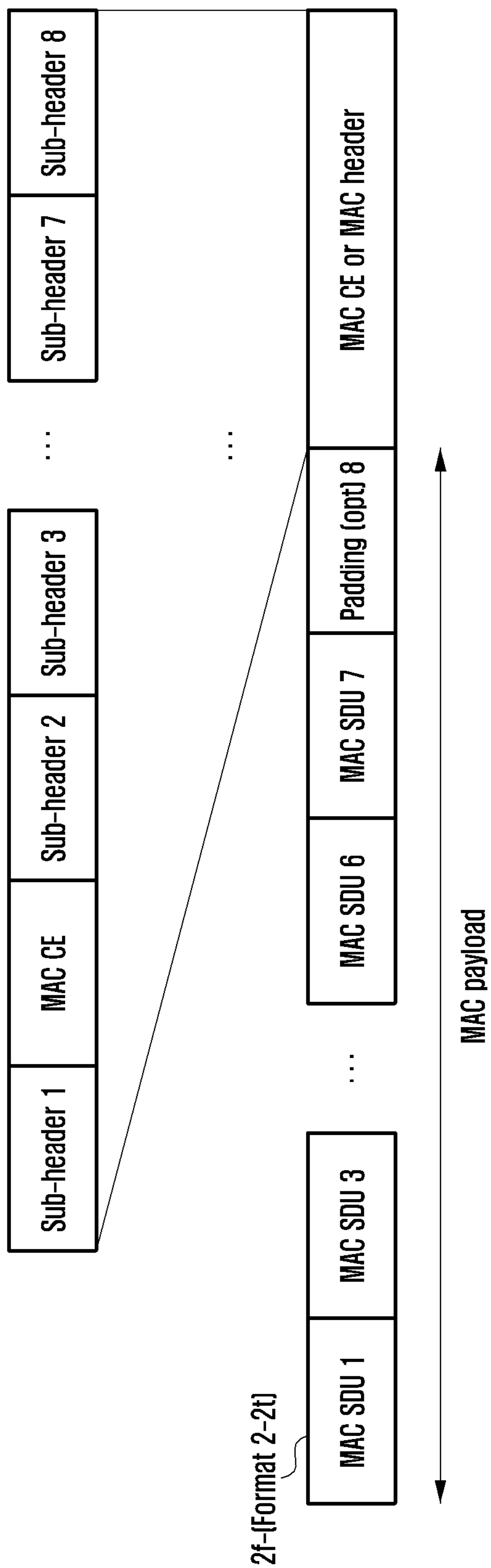

FIGS. 2FA to 2FF are diagrams illustrating a second MAC PDU structure for a next generation mobile communication system according to an embodiment of the present disclosure.

Referring to FIGS. 1EA and 1EB, 1e-(Format 2-1) may store one MAC SDU or MAC CE. In the above structure, the payload is located at a front part and the MAC header is located at a rear part. The header may include the variables described in Table 2 except for the L-field, and information other than the variables described in Table 2.

2f-(Format 2-2a) has a structure in which the MAC SDU, the MAC CE, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2f-(Format 2-2a). The 2f-(Format 2-2a) structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2a) has a structure in which the MAC SDU, the MAC CE, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2f-(Format 2-2b). The 2f-(Format 2-2b) structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2c) has a structure in which the MAC SDU, the MAC CE, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2f-(Format 2-2b). In the 2e-(Format 2-2d) structure, the L-field may be included in all the sub-headers.

2f-(Format 2-2d) has a structure in which the MAC SDU, the MAC CE, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2f-(Format 2-2d). In the 2f-(Format 2-2d) structure, the L-field may be included in all the sub-headers.

2f-(Format 2-2e) has a structure in which the MAC CE, the MAC SDU, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2f-(Format 2-2e). The 2f-(Format 2-2e) structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-20 has a structure in which the MAC CE, the MAC SDU, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2f-(Format 2-20. The 2f-(Format 2-20 structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2g) has a structure in which the MAC CE, the MAC SDU, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2f-(Format 2-2g). In the 2f-(Format 2-2g) structure, the L-field may be included in all the sub-headers.

2f-(Format 2-2h) has a structure in which the MAC CE, the MAC SDU, and the padding are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2f-(Format 2-2h). In the 2f-(Format 2-2h) structure, the L-field may be included in all the sub-headers.

2f-(Format 2-2i) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2f-(Format 2-2i). The 2f-(Format 2-20 structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2j) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2f-(Format 2-2i). The 2f-(Format 2-2j) structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2k) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2f-(Format 2-2k). In the 2f-(Format 2-2k) structure, the L-field may be included in all the sub-headers.

2f-(Format 2-2l) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2f-(Format 2-2l). In the 2f-(Format 2-2l) structure, the L-field may be included in all the sub-headers.

2f-(Format 2-2m) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2f-(Format 2-2m). The 2f-(Format 2-2m) structure is characterized in that an L-field is not included in the last sub-header. The receiving side may confirm the L-field value of the remaining sub-headers and subtract the L-field value from the entire length of the MAC PDU to estimate the length of the MAC SDU.

2f-(Format 2-2n) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2.

The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*n*). The 2*f*-(Format 2-2*n*) structure is characterized in that an L-field is not included in the last sub-header. The receiving side may confirm the L-field value of the remaining sub-headers and subtract the L-field value from the entire length of the MAC PDU to estimate the length of the MAC SDU.

2*f*-(Format 2-2*o*) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*o*). In the 2*f*-(Format 2-2*o*) structure, the L-field may be included in all the sub-headers.

2*f*-(Format 2-2*p*) has a structure in which the MAC SDU, the padding, and the MAC CE are located at the front part of the MAC PDU, followed by the MAC header. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*p*). In the 2*f*-(Format 2-2*p*) structure, the L-field may be included in all the sub-headers.

2*f*-(Format 2-2*q*) has a structure in which the MAC SDU, the MAC CE, and the padding are located at the front part of the MAC PDU, followed by the MAC header. If the MAC CE is generated, a MAC CE may be located at the tail part of the MAC PDU together with a sub-header of the MAC CE. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*q*). The 2*f*-(Format 2-2*q*) structure is characterized in that an L-field is not included in the last sub-header. The receiving side may confirm the L-field value of the remaining sub-headers and subtract the L-field value from the entire length of the MAC PDU to estimate the length of the MAC SDU.

2*f*-(Format 2-2*r*) has a structure in which the MAC SDU, the MAC CE, and the padding are located at the front part of the MAC PDU, followed by the MAC header. If the MAC CE is generated, together with the sub-header of the MAC CE, the MAC CE may be located in the middle part of the MAC PDU, that is, between the MAC payload and the MAC header, more specifically, at the head of the MAC sub-headers. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*r*). The 2*f*-(Format 2-2*r*) structure is characterized in that an L-field is not included in the last sub-header. The receiving side may confirm the L-field value of the remaining sub-headers and subtract the L-field value from the entire length of the MAC PDU to estimate the length of the MAC SDU.

2*f*-(Format 2-2*s*) has a structure in which the MAC SDU, the MAC CE, and the padding are located at the front part of the MAC PDU, followed by the MAC header. If the MAC CE is generated, a MAC CE may be located at the tail part of the MAC PDU together with a sub-header of the MAC CE. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*s*). In the 2*f*-(Format 2-2*s*) structure, the L-field may be included in all the sub-headers.

2*f*-(Format 2-2*t*) has a structure in which the MAC SDU, the MAC CE, and the padding are located at the front part of the MAC PDU, followed by the MAC header. If the MAC CE is generated, together with the sub-header of the MAC CE, the MAC CE may be located in the middle part of the MAC PDU, that is, between the MAC payload and the MAC header, more specifically, at the head of the MAC sub-headers. The MAC header consists of several sub-heads. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 2-2*t*). In the 2*f*-(Format 2-2*t*) structure, the L-field may be included in all the sub-headers.

Figure 2G:
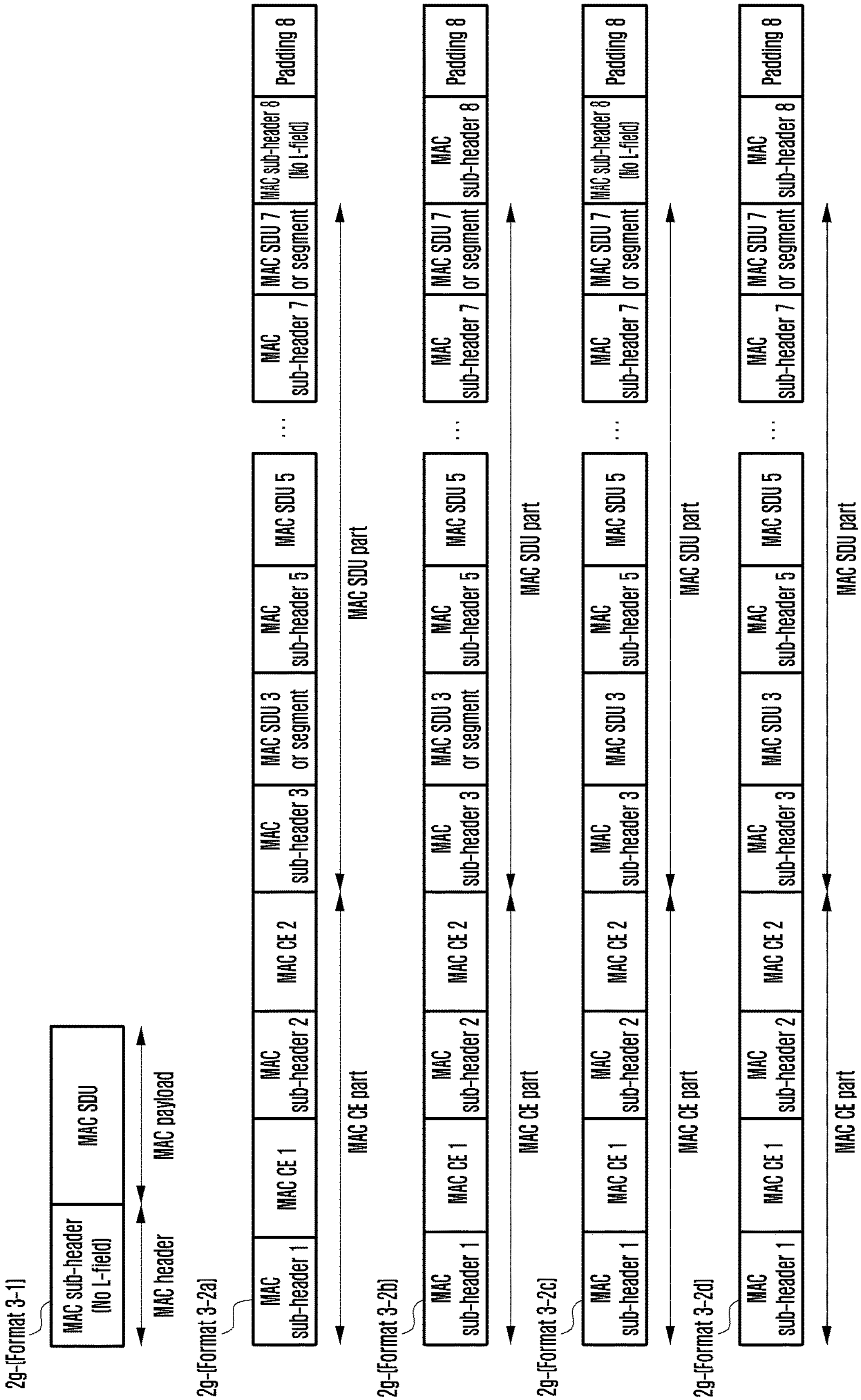
FIGS. 2GA, 2GB, and 2GC are diagrams illustrating a third MAC PDU structure for a next generation mobile communication system according to embodiments of the present disclosure.
Figure 2G:
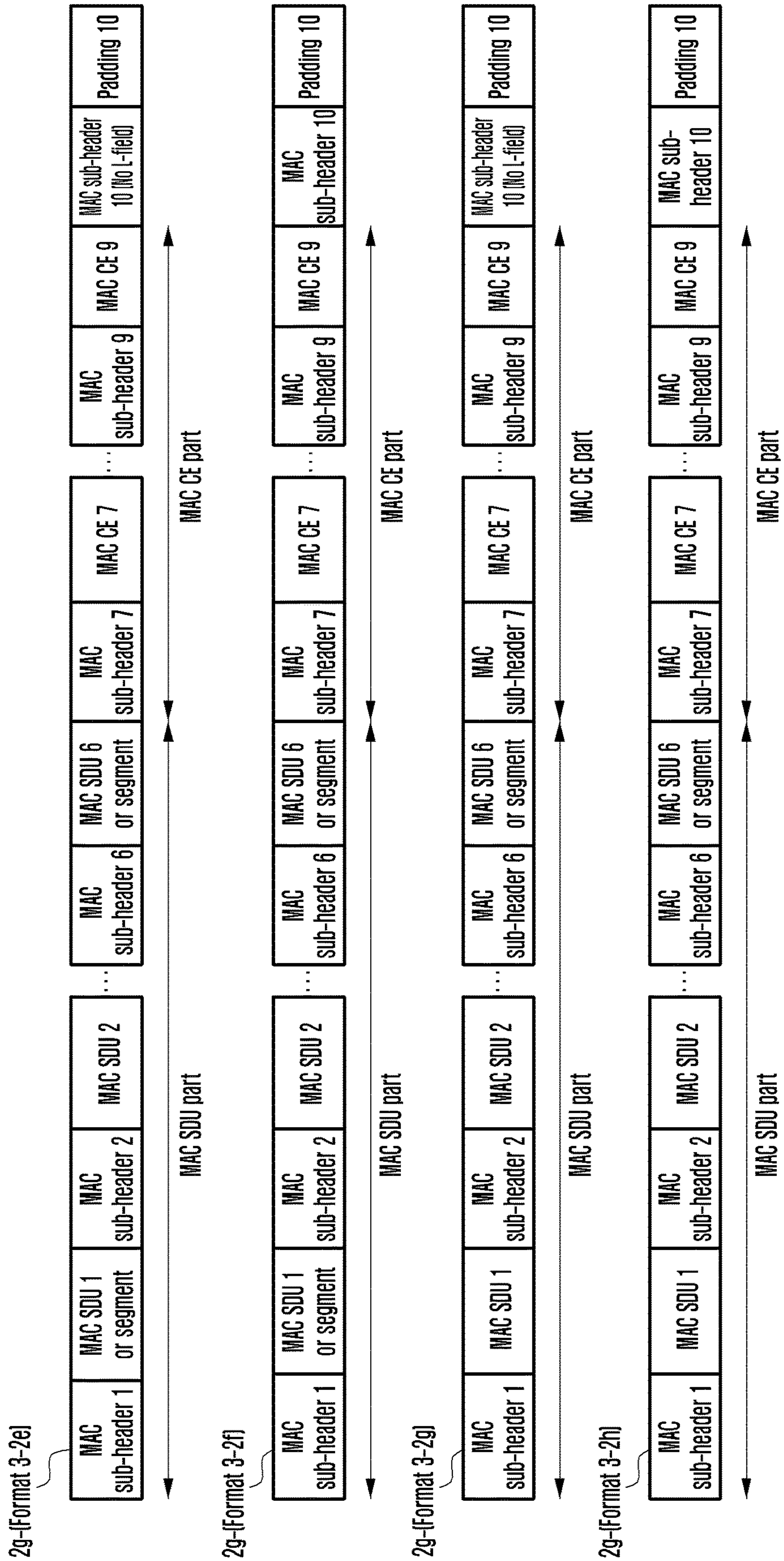
Figure 2G:
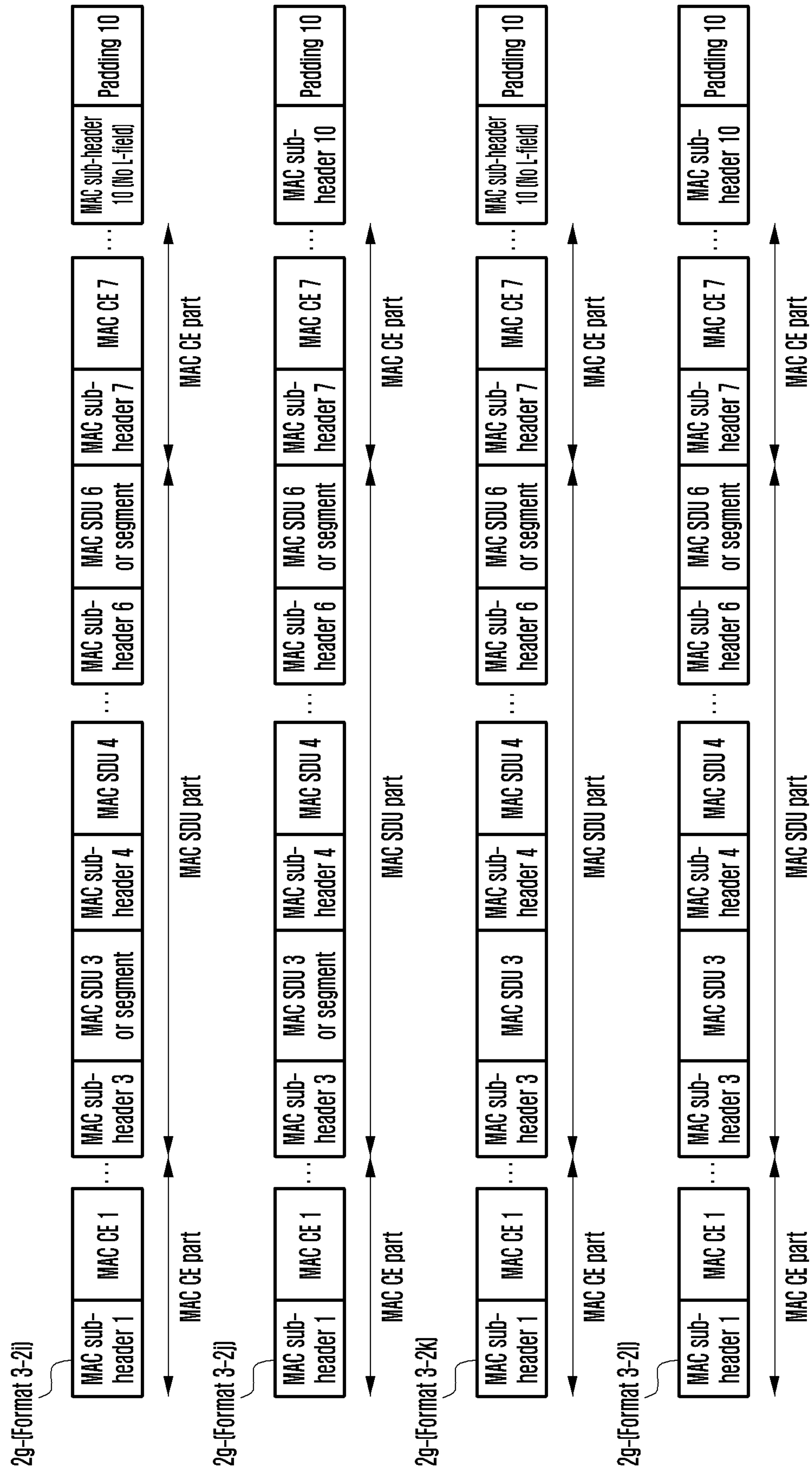

FIGS. 2GA to 2GC are diagrams illustrating a third MAC PDU structure for a next generation mobile communication system according to an embodiment of the present disclosure.

Referring to FIGS. 2GA to 2GC, 2*g*-(Format 3-1) may store one MAC SDU or MAC CE. In the above structure, the MAC header is located at a front part and the payload is located at a rear part. The header may include the variables described in Table 2 except for the L-field, and information other than the variables described in Table 2.

2*g*-(Format 3-2*a*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*a*) structure is largely divided into the MAC CE part and the MAC SDU part. The MAC CEs may be located at a front part in the order in which they are first generated. In the MAC SDU part, a last segment of one MAC SDU (or RLC PDU or RLC SDU) may be located at a head thereof and a first segment of one MAC SDU (or RLC PDU or RLC SDU) may be located at a tail thereof. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2*g*-(Format 3-2*a*). For example, the header of the front part becomes the information indicating the payload of the rear part. The 2*g*-(Format 3-2*a*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-2*b*) structure is the same as the 2*g*-(Format 3-2*a*) structure and may include L-fields in all the sub-headers.

2*g*-(Format 3-2*c*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*c*) structure is largely divided into the MAC CE part and the MAC SDU part. The MAC CEs may be located at the front part in the order in which they are first generated, and in the MAC SDU part, segments of a MAC SDU (or RLC PDU or RLC SDU) may be located at the tail part of the MAC SDU part. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2*g*-(Format 3-2*c*). For example, the header of the front part becomes the information indicating the payload of the rear part. The 2*g*-(Format 3-2*c*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-2*d*) structure is the same as the 2*g*-(Format 3-2*c*) structure and may include L-fields in all the sub-headers.

2*g*-(Format 3-2*e*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*e*) structure is largely divided into a MAC CE part and a MAC SDU part.

The MAC CEs may be located at a front part of the MAC SDU part in the order in which they are first generated, and even the MAC CEs may be located at a rear part of the MAC CE part in the order in which they are first generated. In the MAC SDU part, a last segment of one MAC SDU (or RLC PDU or RLC SDU) may be located at a head thereof and a first segment of one MAC SDU (or RLC PDU or RLC SDU) may be located at a tail thereof. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2*g*-(Format 3-2*e*). For example, the header of the front part becomes the information indicating the payload of the rear part. The 2*g*-(Format 3-2*e*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-20 structure is the same as the 2*g*-(Format 3-2*e*) structure and may include L-fields in all the sub-headers.

2*g*-(Format 3-2*g*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*g*) structure is largely divided into a MAC CE part and a MAC SDU part. The MAC CEs may be located at a front part of the MAC SDU part in the order in which they are first generated, and even the MAC CEs may be located at a rear part of the MAC CE part in the order in which they are first generated. In the MAC SDU part, the segments of one MAC SDU (or RLC PDU or RLC SDU) may be located at the tail. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2*g*-(Format 3-2*g*). For example, the header of the front part becomes the information indicating the payload of the rear part. The 2*g*-(Format 3-2*g*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-2*h*) structure is the same as the 2*g*-(Format 3-2*g*) structure and may include L-fields in all the sub-headers.

2*g*-(Format 3-2*i*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*i*) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU. In the MAC SDU part, the last segment of one MAC SDU (or RLC PDU or RLC SDU) may be located at the head of the MAC SDU part and the first segment of one MAC SDU (or RLC PDU or RLC SDU) may be located at the tail of the MAC SDU part. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2*g*-(Format 3-2*i*). For example, the header of the front part becomes the information indicating the payload of the rear part. The 2*g*-(Format 3-2*i*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-2*j*) structure is the same as the 2*g*-(Format 3-2*i*) structure and may include L-fields in all the sub-headers.

2*g*-(Format 3-2*k*) has a structure, such as the sub-header, the MAC CE, the sub-header, the MAC SDU, the sub-header, and the padding, and in FIGS. 2FA to 2FF, the second MAC PDU structure has the structure in which the sub-headers are collected at one part and the payload part is located separately, whereas the third MAC PDU structure has the repeating structure, such as the sub-header, the payload, the sub-header, and the payload. The 2*g*-(Format 3-2*k*) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU. In the MAC SDU part, the segments of one MAC SDU (or RLC PDU or RLC SDU) may be located at the tail of the MAC SDU part. The sub-header may include some of the variables described in Table 2, and information other than the variables described in Table 2. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2*g*-(Format 3-2*k*). For example, the header of the front part becomes the information indicating the payload of the rear part. The 2*g*-(Format 3-2*k*) structure is characterized in that an L-field is not included in the last sub-header. The receiving side may confirm the L-field value of the remaining sub-headers and subtract the L-field value from the entire length of the MAC PDU to estimate the length of the MAC SDU. The 2*g*-(Format 3-21) structure is the same as the 2*g*-(Format 3-2*k*) structure and may include L-fields in all the sub-headers.

Figure 2H:
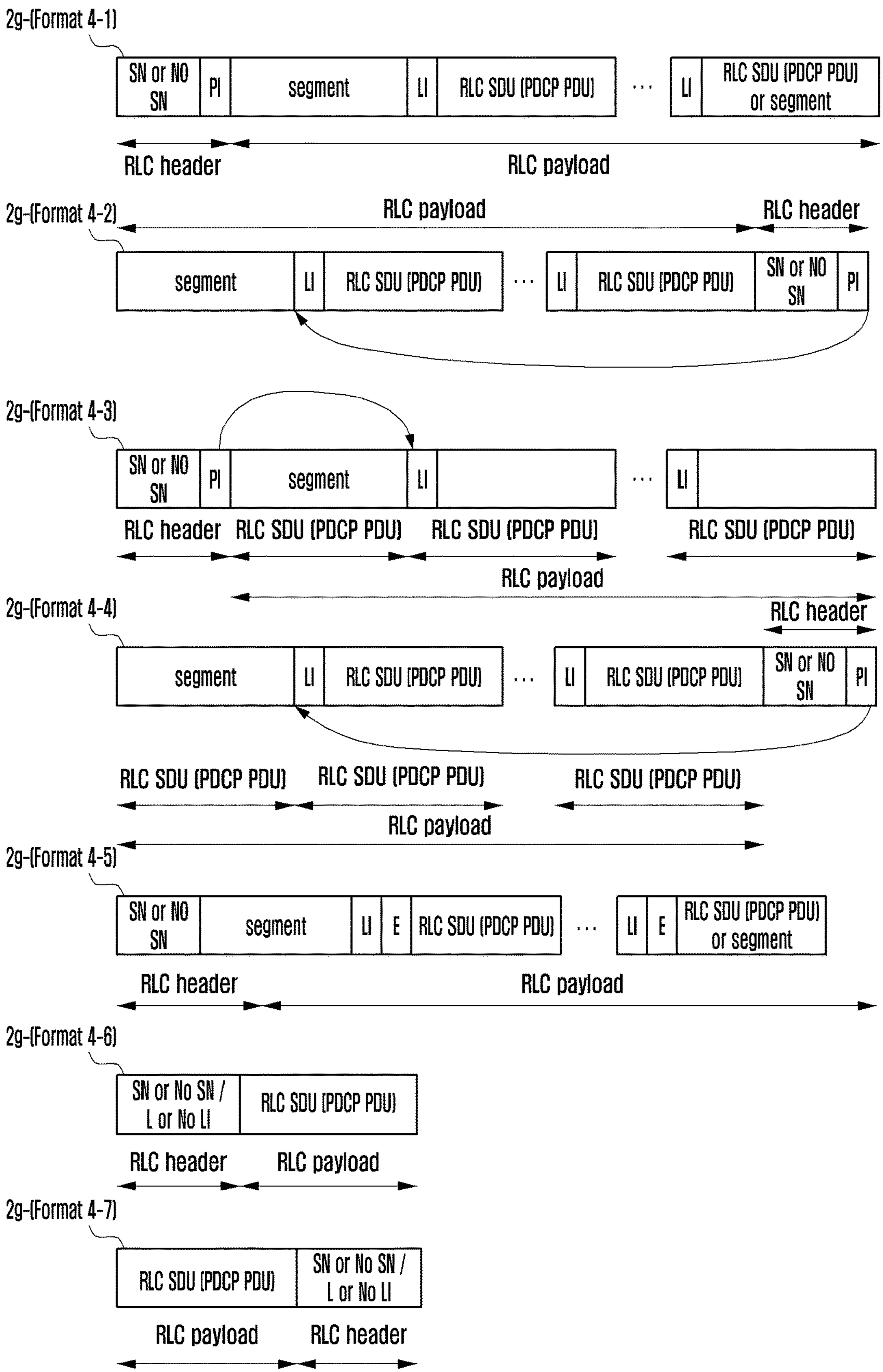
FIG. 2H is a diagram illustrating MAC SDU (or RLC PDU) structures for a next generation mobile communication system according to an embodiment of the present disclosure.

FIG. 2H is a diagram illustrating MAC SDU (or RLC PDU) structures for a next generation mobile communication system according to an embodiment of the present disclosure.

Referring to FIG. 2H, in the 2*h*-(Format 4-1) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may not have a placement indicator (PI) field. The PI field is a field indicating a location of the following L1 field. The L1 field is a field indicating a size of the immediately following RLC SDU (or PDCP PDU), and may be added in the RLC layer. The 2*h*-(Format 4-1) structure is a structure in which one L1 field and one RLC SDU may be consecutively arranged in a pair, and the segment may also be arranged alone and a header is disposed in the front. The last segment of one RLC SDU (or PDCP PDU) may be at the head of the RLC payload portion, and the first segment of the RLC SDU (or PDCP PDU) may be at the tail of the RLC payload portion.

In the 2*h*-(Format 4-2) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may not have the placement indicator (PI) field. The PI field is a field indicating the position of the L1 field at the front part and may be added in the RLC layer. The L1 field is a field indicating a size of the immediately preceding RLC SDU (or PDCP PDU). The 2*h*-(Format 4-2) structure is a structure in which one RLC field and one L1 field may be consecutively arranged in a pair, and the segment may also be arranged alone and a header is disposed at the rear part. The last segment of one RLC SDU (or PDCP PDU) may be at the head of the RLC payload portion, and the first segment of the RLC SDU (or PDCP PDU) may be at the tail of the RLC payload portion.

In the 2*h*-(Format 4-3) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may not have the placement indicator (PI) field. The PI field is a field indicating a location of the following L1 field. The L1 field is a field indicating a size of the immediately following RLC SDU (or PDCP PDU), and may be added to the PDCP header in the RLC layer. The 2*h*-(Format 4-3) structure is a structure in which one L1 field and one RLC SDU may be consecutively arranged in a pair, and the segment may also be arranged alone and a header is disposed in the front. The last segment of one RLC SDU (or PDCP PDU) may be at the head of the RLC payload portion, and the first segment of the RLC SDU (or PDCP PDU) may be at the tail of the RLC payload portion.

In the 2*h*-(Format 4-4) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may not have the placement indicator (PI) field. The PI field is a field indicating the position of the L1 field at the front part and may be added to the PDCP header in the PDCP layer. The L1 field is a field indicating a size of the immediately preceding RLC SDU (or PDCP PDU). The 2*h*-(Format 4-4) structure is a structure in which one RLC field and one LI field may be consecutively arranged in a pair, and the segment may also be arranged alone and a header is disposed at the rear part. The last segment of one RLC SDU (or PDCP PDU) may be at the head of the RLC payload portion, and the first segment of the RLC SDU (or PDCP PDU) may be at the tail of the RLC payload portion.

In the 2*h*-(Format 4-5) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may have the length indicator (LI) field and an E field. The L1 field is a field indicating the size of the immediately following RLC SDU (PDCP PDU), and the E field indicates whether another L1 or E field follows the immediately following RLC SDU. The 2*h*-(Format 4-5) structure is a structure in which one RLC field, one L1 field, and one E field may be consecutively arranged in a pair and the segment may also be arranged alone and the header is disposed in the front. The last segment of one RLC SDU (or PDCP PDU) may be at the head of the RLC payload portion, and the first segment of the RLC SDU (or PDCP PDU) may be at the tail of the RLC payload portion.

In the 2*h*-(Format 4-6) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may have or may not have an L1 field. The L1 field is a field indicating a size of the immediately following RLC SDU (or PDCP PDU). In the 2*h*-(Format 4-6) structure, one RLC SDU (or one PDCP PDU) is included in one RLC PDU, and corresponds to the case where the concatenation is not performed in the RLC layer. In addition, it is also a structure in which the header is disposed at the front part.

In the 2*h*-(Format 4-7) structure of FIG. 2H, the RLC SN allocated in the RLC layer may be included in the RLC header. However, if the PDCP SP is shared, the RLC SN is not allocated in the RLC layer and thus the RLC SN may not exist in the RLC header. The RLC header may have or may not have the L1 field. The L1 field is a field indicating a size of the immediately following RLC SDU (or PDCP PDU). In the 2*h*-(Format 4-6) structure, one RLC SDU (or one PDCP PDU) is included in one RLC PDU, and corresponds to the case where the concatenation is not performed in the RLC layer. In addition, it is also a structure in which the header is disposed at the rear part.

Figure 2I:
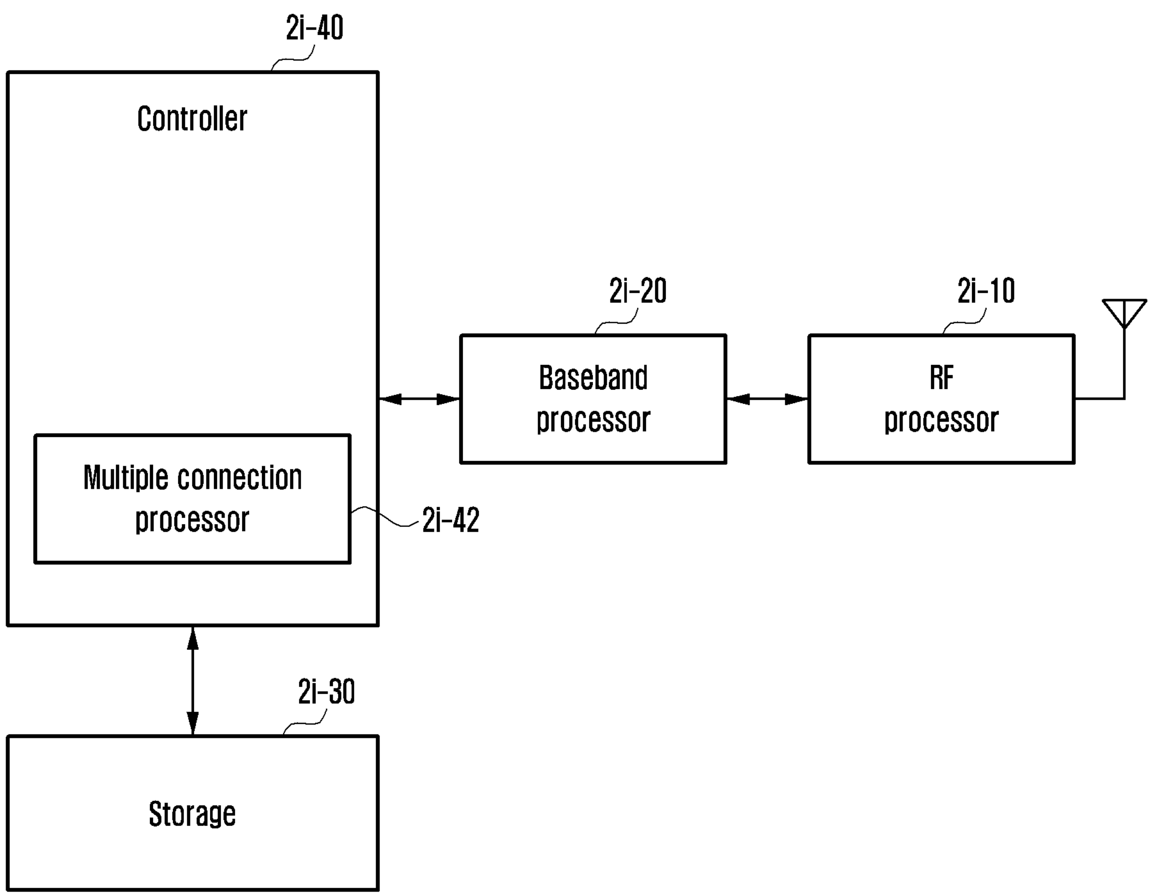
FIG. 2I is a block diagram illustrating an internal structure of a terminal according to an embodiment the present disclosure.

FIG. 2I is a block diagram illustrating an internal structure of a terminal according to an embodiment of the present disclosure.

Referring to FIG. 2I, the terminal includes a radio frequency (RF) processor 2*i*-10, a baseband processor 2*i*-20, a storage 2*i*-30, and a controller 2*i*-40.

The RF processor 2*i*-10 serves to transmit and receive a signal through a radio channel, such as band conversion and amplification of a signal. For example, the RF processor 2*i*-10 up-converts a baseband signal provided from the baseband processor 2*i*-20 into an RF band signal and then transmits the RF band signal through an antenna and down-converts the RF band signal received through the antenna into the baseband signal. For example, the RF processor 2*i*-10 may include a transmitting filter, a receiving filter, an amplifier, a mixer, an oscillator, a digital to analog converter (DAC), an analog to digital converter (ADC), or the like. FIG. 2I illustrates only one antenna but the terminal may include a plurality of antennas. Further, the RF processor 2*i*-10 may include a plurality of RF chains. Further, the RF processor 2*i*-10 may perform beamforming. For the beamforming, the RF processor 2*i*-10 may adjust a phase and a size of each of the signals transmitted and received through a plurality of antennas or antenna elements. In addition, the RF processor may perform MIMO and may receive a plurality of layers when performing the MIMO operation. The RF processor 2*i*-10 may perform reception beam sweeping by appropriately configuring a plurality of antennas or antenna elements under the control of the controller or adjust a direction and a beam width of the reception beam so that the reception beam is resonated with the transmission beam.

The baseband processor 2*i*-20 performs a conversion function between a baseband signal and a bit string according to a physical layer standard of a system. For example, when data are transmitted, the baseband processor 2*i*-20 generates complex symbols by coding and modulating a transmitted bit string. Further, when data are received, the baseband processor 2*i*-20 recovers the received bit string by demodulating and decoding the baseband signal provided from the RF processor 2*i*-10. For example, according to the OFDM scheme, when data are transmitted, the baseband processor 2*i*-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 2*i*-20 divides the baseband signal provided from the RF processor 2*i*-10 in an OFDM symbol unit and recovers the signals mapped to the sub-carriers by a fast Fourier transform (FFT) operation and then recovers the received bit string by the modulation and decoding.

The baseband processor 2*i*-20 and the RF processor 2*i*-10 transmit and receive a signal as described above. Therefore, the baseband processor 2*i*-20 and the RF processor 2*i*-10 may be called a transmitter, a receiver, a transceiver, or a communication unit. Further, at least one of the baseband processor 2*i*-20 and the RF processor 2*i*-10 may include a plurality of communication modules to support a plurality of different radio access technologies. Further, at least one of the baseband processor 2*i*-20 and the RF processor 2*i*-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The storage 2*i*-30 stores data, such as basic programs, application programs, and configuration information for the operation of the terminal. The storage 2*i*-30 provides the stored data according to the request of the controller 2*i*-40.

The controller 2*i*-40 includes a multiple connection processor 2*i*-42 and controls the overall operations of the terminal. For example, the controller 2*i*-40 transmits and receives a signal through the baseband processor 2*i*-20 and the RF processor 2*i*-10. Further, the controller 2*i*-40 records and reads data in and from the storage 2*i*-40. For this purpose, the controller 2*i*-40 may include at least one processor. For example, the controller 2*i*-40 may include a communication processor (CP) performing a control for communication and an application processor (AP) controlling an upper layer, such as the application programs.

Figure 2J:
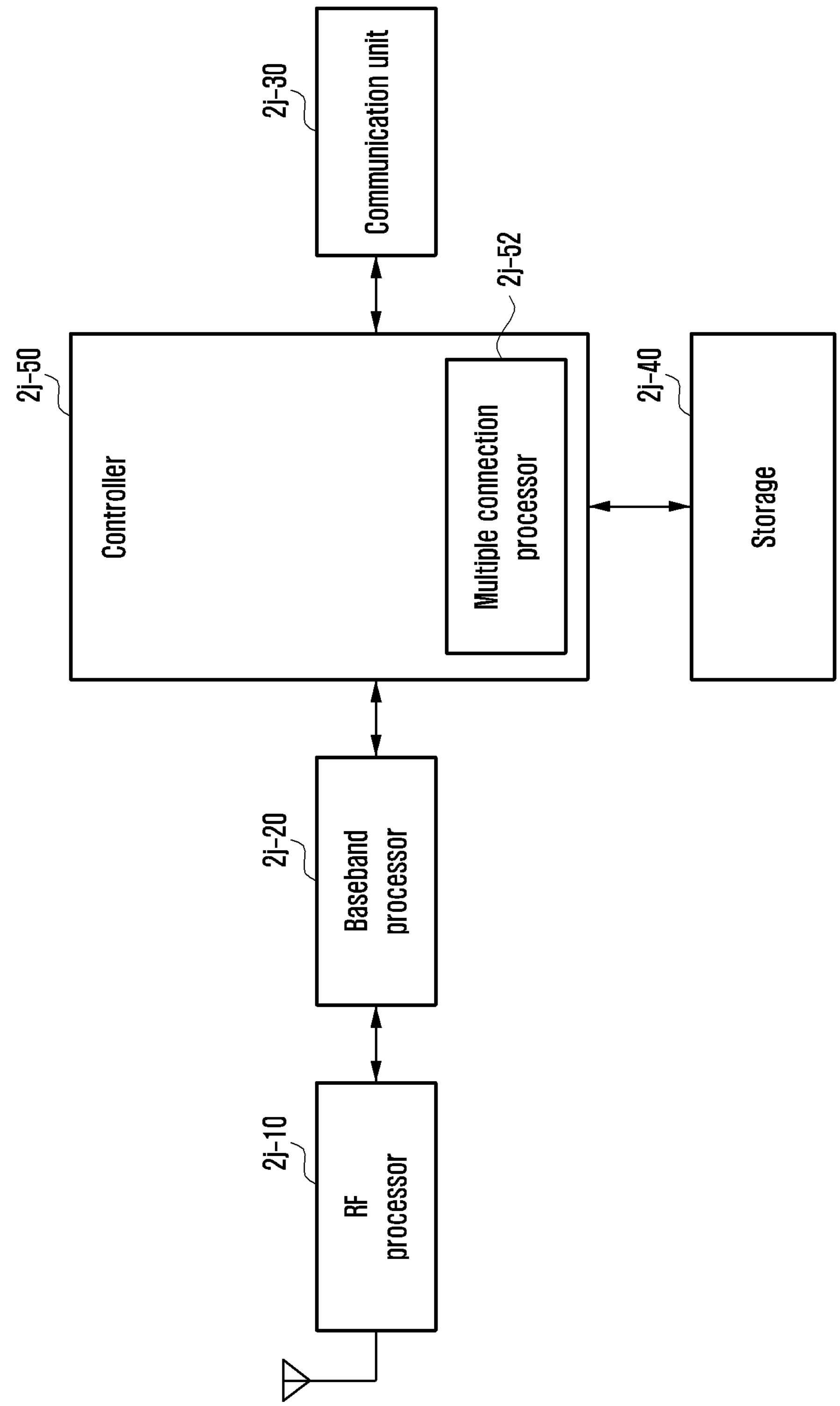
FIG. 2J is a block diagram illustrating a configuration of a base station transceiver according to an embodiment of the present disclosure.

FIG. 2J is a block configuration diagram of TRP in a wireless communication system according to an embodiment of the present disclosure.

Referring to FIG. 2J, the base station is configured to include an RF processor 2*j*-10, a baseband processor 2*j*-20, a communication unit 2*j*-30, a storage 2*j*-40, and a controller 2*j*-50.

The RF processor 2*j*-10 serves to transmit and receive a signal through a radio channel, such as band conversion and amplification of a signal. For example, the RF processor 2*j*-10 up-converts a baseband signal provided from the baseband processor 2*j*-20 into an RF band signal and then transmits the RF band signal through an antenna and down-converts the RF band signal received through the antenna into the baseband signal. For example, the RF processor 2*j*-10 may include a transmitting filter, a receiving filter, an amplifier, a mixer, an oscillator, a DAC, an ADC, or the like. FIG. 2J illustrates only one antenna but the first access node may include a plurality of antennas. Further, the RF processor 2*j*-10 may include a plurality of RF chains. Further, the RF processor 2*j*-10 may perform the beamforming. For the beamforming, the RF processor 2*j*-10 may adjust a phase and a size of each of the signals transmitted/received through a plurality of antennas or antenna elements. The RF processor may perform a downward MIMO operation by transmitting one or more layers.

The baseband processor 2*j*-20 performs a conversion function between the baseband signal and the bit string according to the physical layer standard of the first radio access technology. For example, when data are transmitted, the baseband processor 2*j*-20 generates complex symbols by coding and modulating a transmitted bit string. Further, when data are received, the baseband processor 2*j*-20 recovers the received bit string by demodulating and decoding the baseband signal provided from the RF processor 2*j*-10. For example, according to the OFDM scheme, when data are transmitted, the baseband processor 2*j*-20 generates the complex symbols by coding and modulating the transmitting bit string, maps the complex symbols to the sub-carriers, and then performs the IFFT operation and the CP insertion to construct the OFDM symbols. Further, when data are received, the baseband processor 2*j*-20 divides the baseband signal provided from the RF processor 2*j*-10 in the OFDM symbol unit and recovers the signals mapped to the sub-carriers by the FFT operation and then recovers the receiving bit string by the modulation and decoding. The baseband processor 1*j*-20 and the RF processor 1*j*-10 transmit and receive a signal as described above. Therefore, the baseband processor 2*j*-20 and the RF processor 2*j*-10 may be called a transmitter, a receiver, a transceiver, or a communication unit.

The communication unit 2*j*-30 provides an interface for performing communication with other nodes within the network.

The storage 2*j*-40 stores data, such as basic programs, application programs, and configuration information for the operation of the main base station. More particularly, the storage 2*j*-40 may store the information on the bearer allocated to the accessed terminal, the measured results reported from the accessed terminal, and the like. Further, the storage 2*j*-40 may store information that is a determination criterion on whether to provide a multiple connection to the terminal or stop the multiple connection to the terminal. Further, the storage 2*j*-40 provides the stored data according to the request of the controller 2*j*-50.

The controller 2*j*-50 includes a multiple connection processor 2*j*-52 and controls the general operations of the main base station. For example, the controller 2*j*-50 transmits/receives a signal through the baseband processor 2*j*-20 and the RF processor 2*j*-10 or the communication unit 2*j*-30. Further, the controller 2*j*-50 records and reads data in and from the storage 2*j*-40. For this purpose, the controller 2*j*-50 may include at least one processor.

Third Embodiment

Figure 3A:
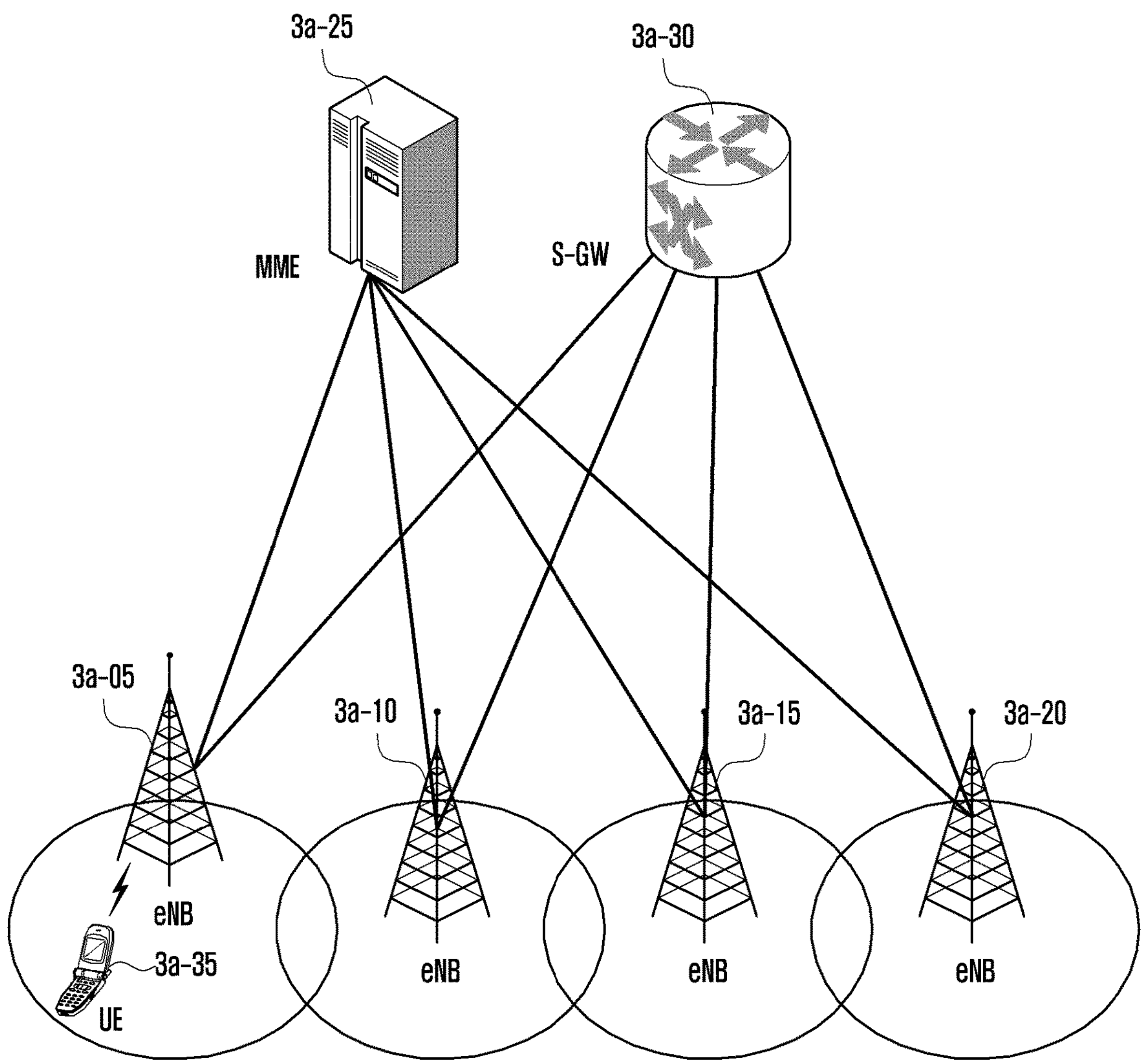
FIG. 3A is a diagram illustrating a structure of an LTE system according to an embodiment of the present disclosure.

FIG. 3A is a diagram illustrating a structure of an LTE system according to an embodiment of the present disclosure.

Referring to FIG. 3A, a radio access network of an LTE system is configured to include next generation base stations (evolved node B, hereinafter, eNB, Node B, or base station) 3*a*-05, 3*a*-10, 3*a*-15, and 3*a*-20, a mobility management entity (MME) 3*a*-25, and a serving-gateway (S-GW) 3*a*-30. User equipment (hereinafter, UE or terminal) 3*a*-35 accesses an external network through the eNBs 3*a*-05 to 3*a*-20 and the S-GW 3*a*-30.

In FIG. 3A, the eNB 3*a*-05 to 3*a*-20 correspond to the existing node B of the UMTS system. The eNB is connected to the UE 3*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmit power status, and a channel state of the terminals is required. Here, the eNBs 3*a*-05 to 3*a*-20 take charge of the collecting and scheduling. One eNB generally controls a plurality of cells. For example, to implement a transmission rate of 100 Mbps, the LTE system uses, as a radio access technology, OFDM in, for example, a bandwidth of 20 MHz. Further, an adaptive modulation & coding (hereinafter, referred to as AMC) determining a modulation scheme and a channel coding rate according to a channel status of the terminal is applied. The S-GW 3*a*-30 is an apparatus for providing a data bearer and generates or removes the data bearer according to the control of the MME 3*a*-25. The MME is an apparatus for performing a mobility management function for the terminal and various control functions and is connected to a plurality of base stations.

Figure 3B:
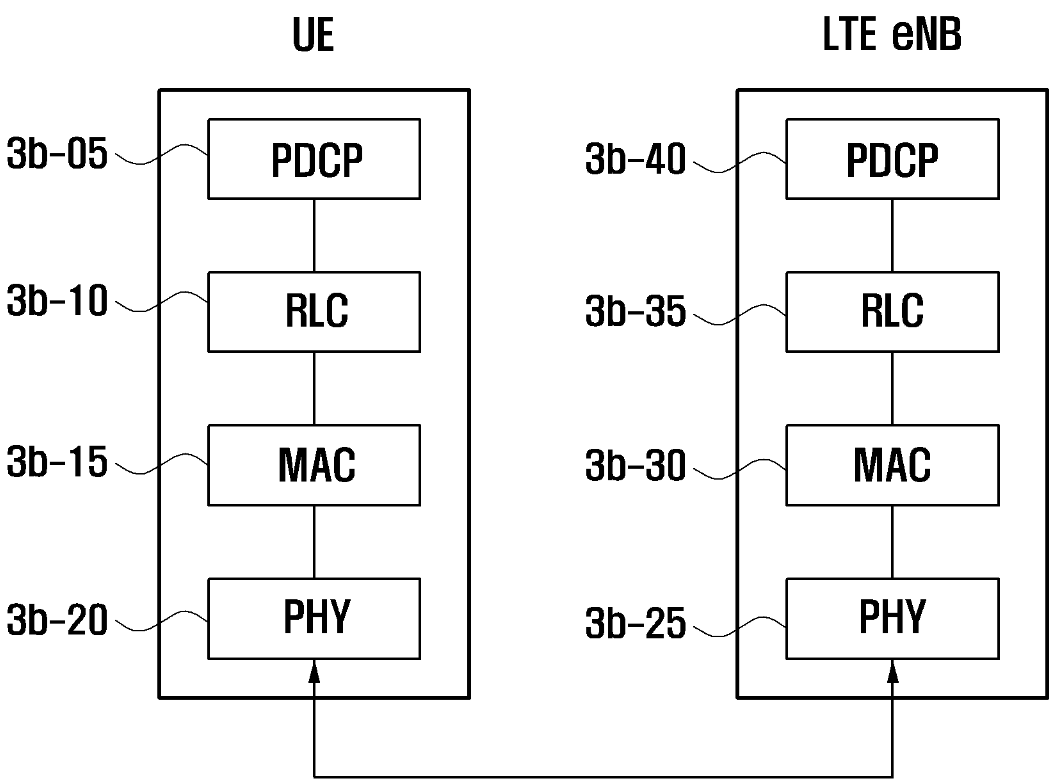
FIG. 3B is a diagram illustrating a radio protocol structure in an LTE system according to an embodiment of the present disclosure.

FIG. 3B is a diagram illustrating a radio protocol structure in an LTE system according to an embodiment of the present disclosure.

Referring to FIG. 3B, the radio protocol of the LTE system is configured to include PDCPs 3*b*-05 and 3*b*-40, RLCs 3*b*-10 and 3*b*-35, and medium access controls (MMCs) 3*b*-15 and 3*b*-30 in the terminal and the eNB, respectively. The PDCPs 3*b*-05 and 3*b*-40 are in charge of operations, such as IP header compression/decompression. The main functions of the PDCP are summarized as follows.

- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink.)

The RLCs 3_b_-10 and 3_b_-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 3_b_-15 and 3_b_-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 3_b_-20 and 3_b_-25 perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 3C:
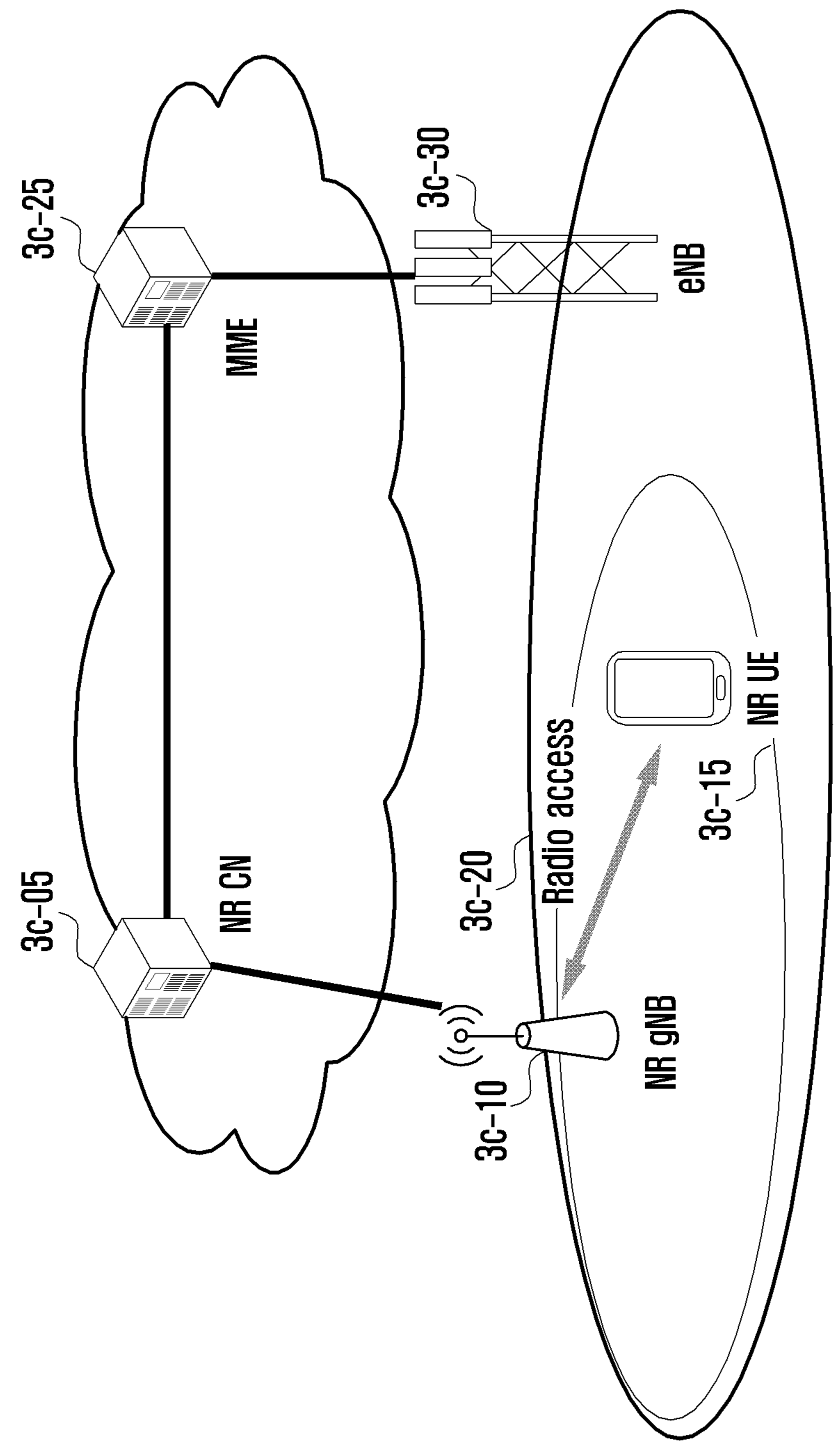
FIG. 3C is a diagram illustrating a structure of a next generation mobile communication system according to an embodiment of the present disclosure.

FIG. 3C is a diagram illustrating a structure of a next generation mobile communication system according to an embodiment of the present disclosure.

Referring to FIG. 3C, a radio access network of a next generation mobile communication system (hereinafter referred to as NR or 5G) is configured to include a next generation base station (New radio node B, hereinafter NR gNB or NR base station) 3_c_-10 and a new radio core network (NR CN) 3_c_-05. The user terminal (new radio user equipment, hereinafter, NR UE or UE) 3_c_-15 accesses the external network through the NR gNB 3_c_-10 and the NR CN 3_c_-05.

In FIG. 3C, the NR gNB 3_c_-10 corresponds to an evolved node B (eNB) of the existing LTE system. The NR gNB is connected to the NR UE 3_c_-15 via a radio channel and may provide a service superior to the existing node B. In the next generation mobile communication system, since all user traffics are served through a shared channel, an apparatus for collecting state information, such as a buffer state, an available transmit power state, and a channel state of the UEs to perform scheduling is required. The NR NB 3_c_-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a radio access technology 3_c_-20. Further, an adaptive modulation & coding (hereinafter, called AMC) determining a modulation scheme and a channel coding rate depending on a channel status of the terminal is applied. The NR CN 3_c_-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 3_c_-25 through the network interface. The MME is connected to the eNB 3_c_-30 which is the existing base station.

Figure 3D:
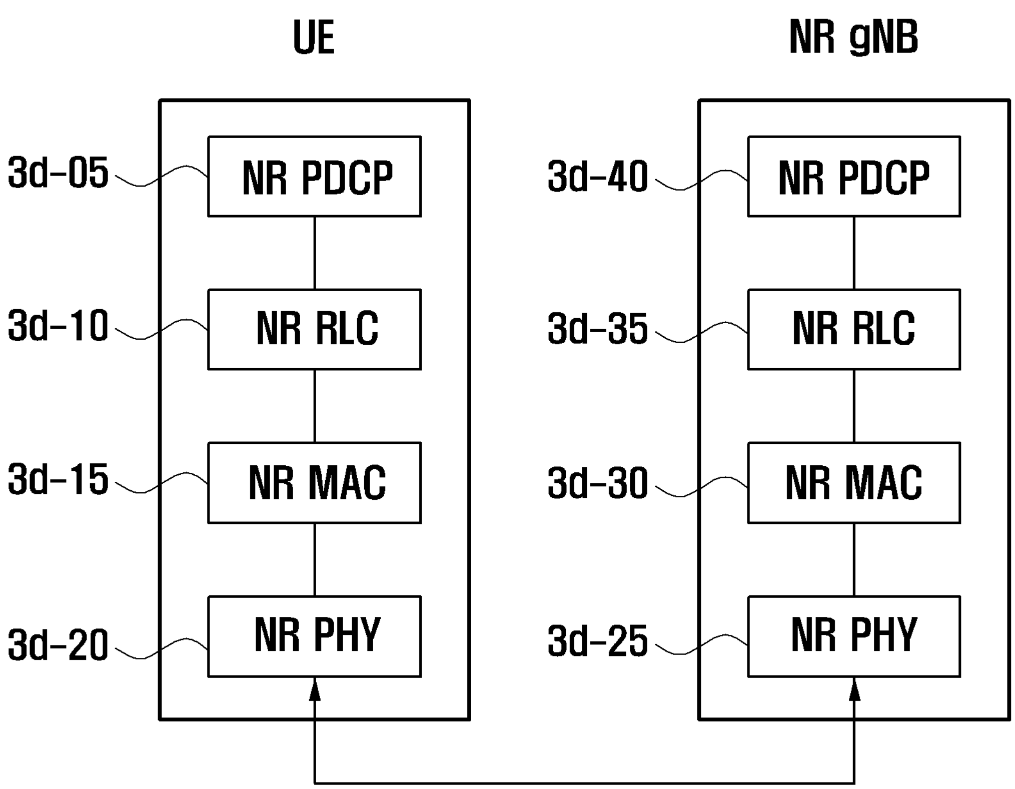
FIG. 3D is a diagram illustrating a radio protocol structure of a next generation mobile communication system according to an embodiment of the present disclosure.

FIG. 3D is a diagram illustrating a radio protocol structure of a next generation mobile communication system according to an embodiment of the present disclosure.

Referring to FIG. 3D, the radio protocol of the next generation mobile communication system is configured to include NR PDCPs 3_d_-05 and 3_d_-40, NR RLCs 3_d_-10 and 3_d_-35, and NR MACs 3_d_-15 and 3_d_-30 in the terminal and the NR base station. The main functions of the NR PDCPs 3_d_-05 and 3_d_-40 may include some of the following functions.

Header compression and decompression function (Header compression and decompression: ROHC only)

Transfer function of user data (Transfer of user data)

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

In this case, the reordering function of the NR PDCP apparatus refers to a function of rearranging PDCP PDUs received in a lower layer in order based on a PDCP sequence number (SN) and may include a function of transferring data to an upper layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 3d-10 and 3d-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In this case, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the upper layer in order when there is the lost RLC SDU, a function of transferring all the received RLC SDUs to the upper layer before a predetermined timer starts if the timer expires even if there is the lost RLC SDU, or a function of transferring all the RLC SDUs received until now to the upper layer in order if the predetermined timer expires even if there is the lost RLC SDU. In this case, the out-of-sequence delivery function of the NR RLC apparatus refers to a function of directly delivering the RLC SDUs received from the lower layer to the upper layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 3d-15 and 3d-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

The NR PHY layers 3d-20 and 3d-25 may perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 3E:
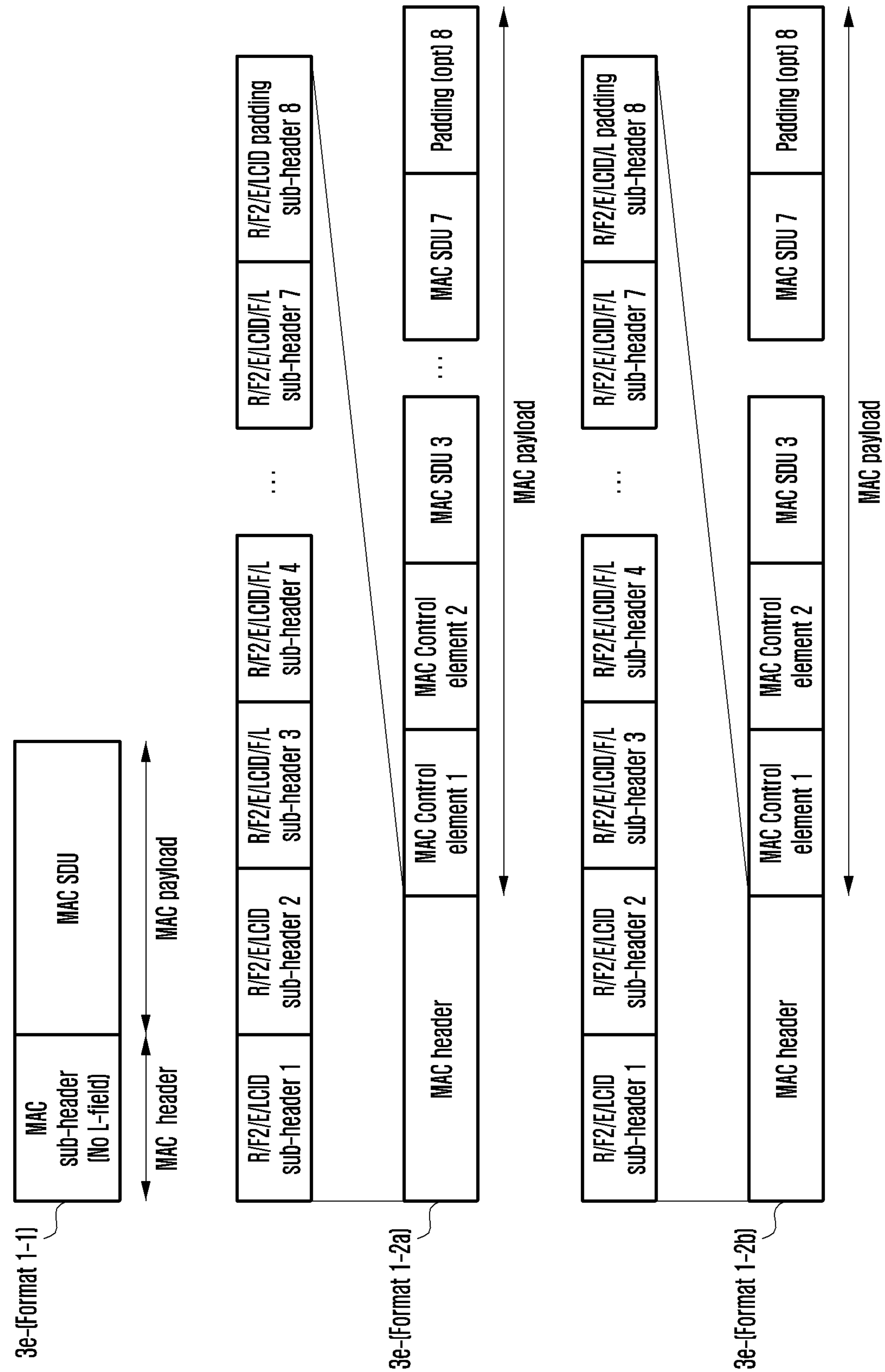
FIGS. 3EA and 3EB are diagrams illustrating a first MAC PDU structure for a next generation mobile communication system according to embodiments of the present disclosure.
Figure 3E:
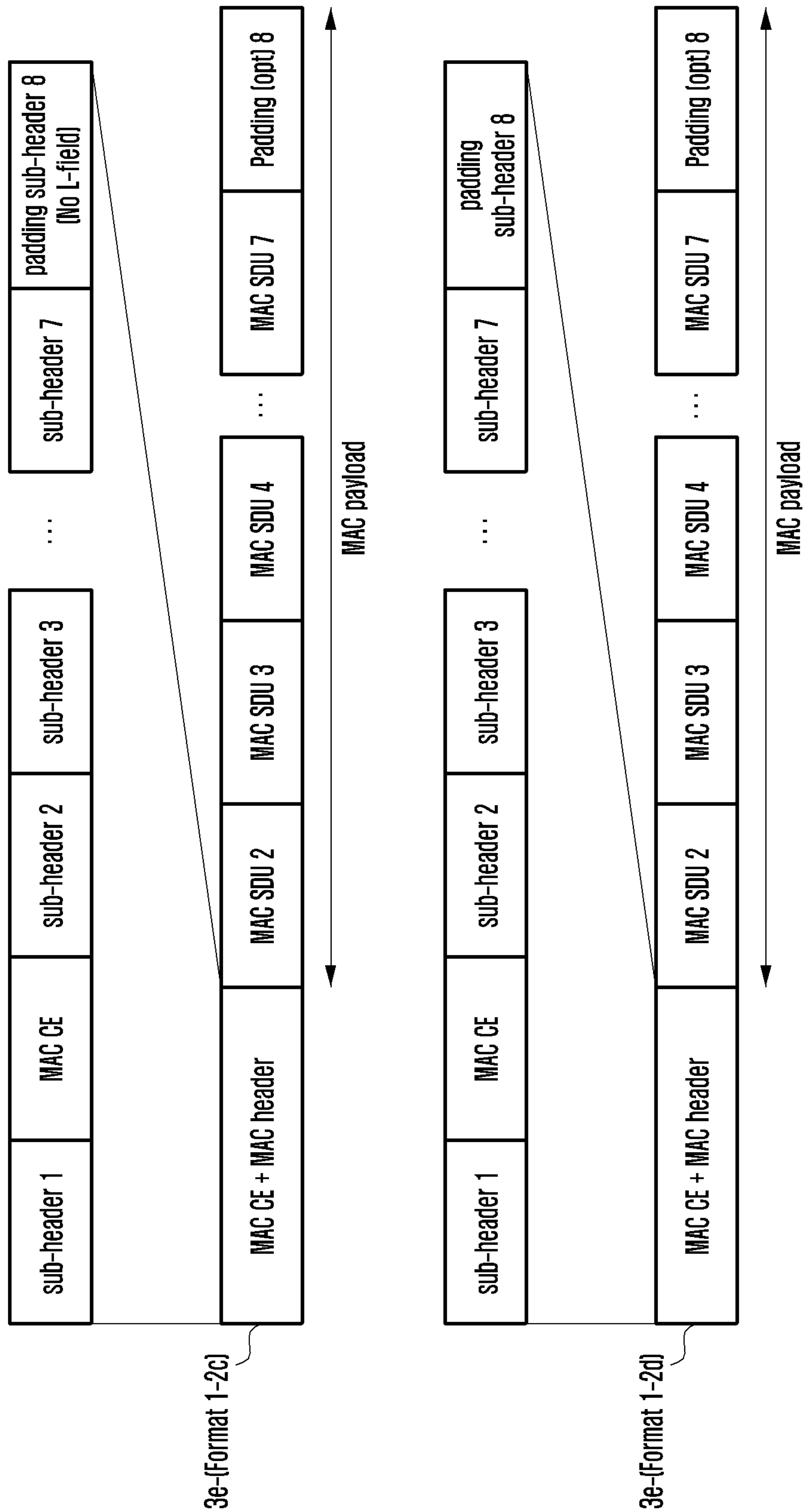

FIGS. 3EA and 3EB are diagrams illustrating a first MAC PDU structure for a next generation mobile communication system according to an embodiment of the present disclosure.

Meanwhile, the embodiment of the configuration and transmission of the MAC PDU of the terminal or the base station described below may be interpreted as an operation between the transmitting end and the receiving end. In other words, the process of transmitting the uplink MAC PDU configured by the terminal which is the transmitting end to the base station which is the receiving end may be applied to the process of transmitting the downlink MAC PDU configured by the base station which is the transmitting end to the terminal which is the receiving end.

Referring to FIGS. 3EA and 3EB, if the MAC transmitting side receives the RLC PDU (or MAC SDU) from the RLC layer, the MAC transmitting side inserts an identifier (local channel identity, hereinafter, referred to as LCID) of RLC entity generated by the RLC PDU (or MAC SDU) and a size (length, hereinafter, referred to as an L-field) of the RLC PDU into the MAC header. The LCID and the L-field are inserted one by one per RLC PDU, and therefore if the plurality of RLC PDUs are multiplexed into the MAC PDU, the LCID and the L-field may also be inserted by the number of RLC PDUs.

Since the information of the MAC header is usually located at the front part of the MAC PDU, the LCID and the L-fields are matched with the RLC PDU (or MAC SDU) within the header in order. In other words, MAC sub-header 1 indicates information on MAC SDU 1, and MAC sub-header 2 indicates information on MAC SDU 2.

For the operation of the physical layer, a total size of the MAC PDU is given to the receiving side as separate control information. Since the total size of the MAC PDU is a quantized value according to a predetermined criterion, padding may be used in some cases. The padding means certain bits (usually '0') that are filled in the remaining part of the packet so that when the packet is generated with data, the size of the packet is byte-aligned.

Since the total size of the MAC PDU is given, an L-field value indicating the size of the RLC PDU (or MAC SDU) may be unnecessary information in some cases. For example, if only one RLC PDU is stored in the MAC PDU, the size of the RLC PDU has the possibility that the size of the MAC header is equal to a limited value in the size of the MAC PDU.

Meanwhile, the VoIP packet consists of an IP/UDP/RTP header and a VoIP frame, and the IP/UDP/RTP header is compressed to about 1 to 15 bytes through a header compression protocol called a robust header compression (ROHC) and the size of the VoIP frame always has a constant value within a given code rate. Therefore, the size of the VoIP packet does not deviate from a certain range, and it is effective to use a predetermined value rather than informing a value each time like the L-field.

The following Table 3 describes the information that may be included in the MAC header.

TABLE 3

| Variables in MAC Header | |
|---|---|
| Variable | Usage |
| LCID | The LCID may indicate the identifier of the RLC entity that generates the RLC PDU (or MAC SDU) received from the upper layer. Alternatively, the LCID may indicate the MAC control element (CE) or the padding. Further, the LCID may be defined differently depending on the channel to be transmitted. For example, the LCID may be defined differently according to DL-SCH, UL-SCH, and MCH. |
| L | The L may indicate a length of the MAC SDU, and may indicate a length of the MAC CE having a variable length. In the case of the MAC CE having a fixed length, the L-field may be omitted. The L-field may be omitted for predetermined reasons. The predetermined reasons are the case where the size of the MAC SDU is fixed, the size of the MAC PDU is informed from the transmitting side to the receiving side, or the length may be calculated by calculation at the receiving side. |
| F | The F indicates the size of the L-field. If there is no L-field, the F may be omitted, and if there is the F-field, the size of the L-field can be limited to a predetermined size. |
| F2 | The F2 indicates the size of the L-field. If there is no L-field, the F2 may be omitted, and if there is the F2-field, the size of the L-field may be limited to a predetermined size and the L-field may be limited to a size different from the F-field. For example, the F2-field may indicate a larger size than the F-field. |
| E | E indicates other headers in the MAC heater. For example, if the E has a value of 1, variables of another MAC header may be come. However, if the E has a value of 0, the MAC SDU, the MAC CE, or the Padding may be come. |
| R | Reserved bit. |

Referring to FIGS. 3EA and 3EB, 3*e*-(Format 1-1) may store one MAC SDU or MAC CE. In the above structure, the MAC header is located at a front part and the payload is located at a rear part. The header may include the variables described in Table 3 except for the L-field, and information other than the variables described in Table 3.

3*e*-(Format 1-2*a*) has a structure in which the MAC header is located at the front part of the MAC PDU, followed by the MAC CE, the MAC SDU, and the padding. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*e*-(Format 1-2*a*). The 3*e*-(Format 1-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

3*e*-(Format 1-2*b*) has a structure in which the MAC header is located at the front part of the MAC PDU, followed by the MAC CE, the MAC SDU, and the padding. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*e*-(Format 1-2*b*). In the 3*e*-(Format 1-2*b*) structure, the L-field may be included in all the sub-headers.

3*e*-(Format 1-2*c*) has a structure in which the MAC header is located at the front part of the MAC PDU, followed by the MAC SDU and the padding. If the MAC CE is generated, the MAC CE may be included in the head of the MAC PDU together with the MAC sub-header of the MAC CE. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*e*-(Format 1-2*c*). The 3*e*-(Format 1-2*c*) structure is characterized in that an L-field is not included in the last sub-header. The receiving side may confirm the L-field value of the remaining sub-headers and subtract the L-field value from the entire length of the MAC PDU to estimate the length of the MAC SDU.

3*e*-(Format 1-2*d*) has a structure in which the MAC header is located at the front part of the MAC PDU, followed by the MAC SDU and the padding. If the MAC CE is generated, the MAC CE may be included in the head of the MAC PDU together with the MAC sub-header of the MAC CE. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*e*-(Format 1-2*d*). In the 3*e*-(Format 1-2*d*) structure, the L-field may be included in all the sub-headers.

Figure 3F:
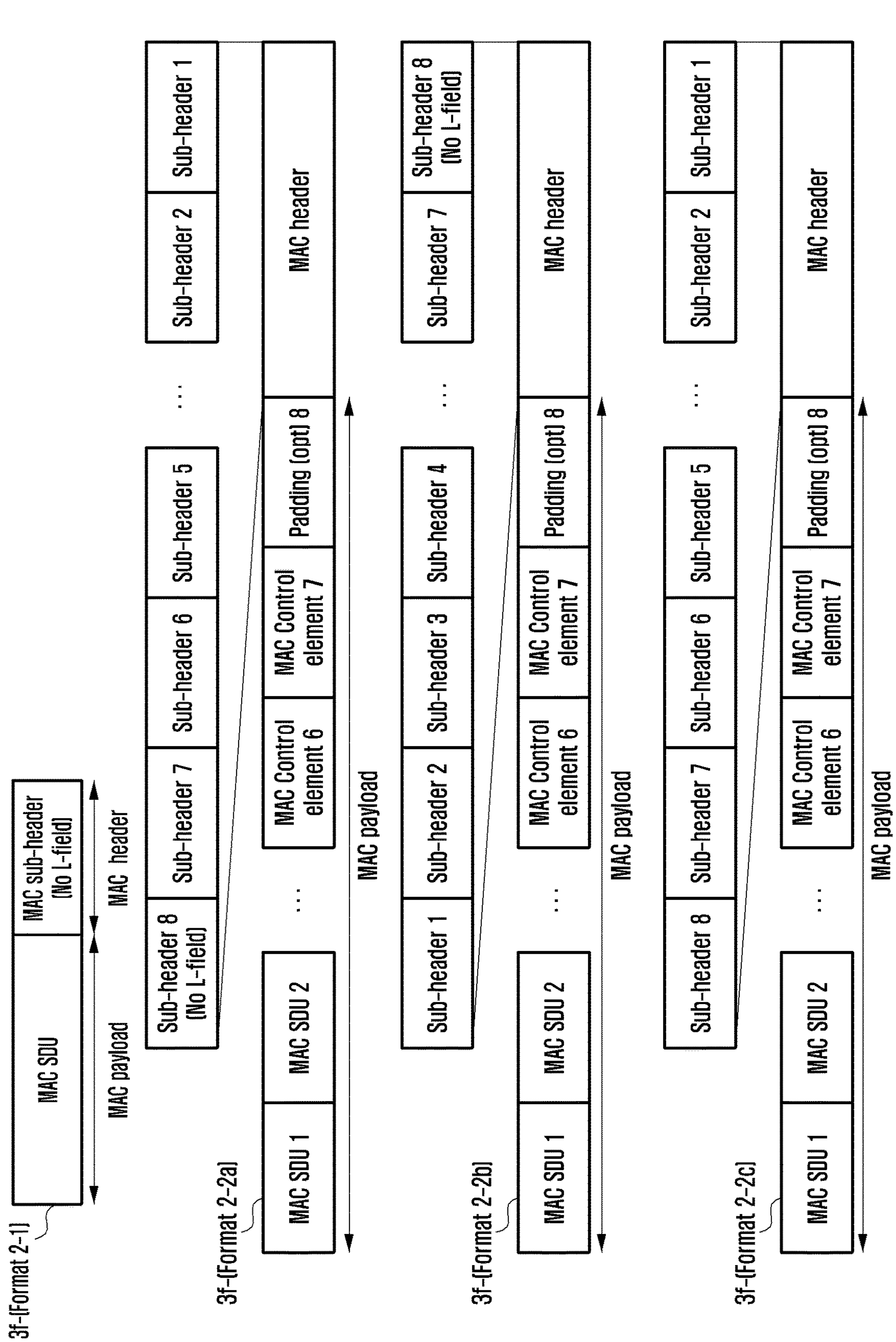
FIGS. 3FA, 3FBA, 3FBB, 3FCA, 3FCB, 3FDA, 3FDB, 3FEA, and 3FEB are diagrams illustrating a second MAC PDU structure for a next generation mobile communication system according to embodiments of the present disclosure.

FIGS. 3FA to 3FE are diagrams illustrating a second MAC PDU structure for a next generation mobile communication system according to an embodiment of the present disclosure.

Referring to FIGS. 3FA to 3FE, 3*f*-(Format 2-1) may store one MAC SDU or MAC CE. In the above structure, the payload is located at a front part and the MAC header is located at a rear part. The header may include the variables described in Table 3 except for the L-field, and information other than the variables described in Table 3.

3*f*-(Format 2-1) has a structure in which the MAC SDU, the MAC CE, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3*f*-(Format 2-2*a*). The 3*f*-(Format 2-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2b) has a structure in which the MAC SDU, the MAC CE, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3f-(Format 2-2b). The 3f-(Format 2-2b) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2c) has a structure in which the MAC SDU, the MAC CE, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3f-(Format 2-2c). In the 3f-(Format 2-2c) structure, the L-field may be included in all the sub-headers.

3f-(Format 2-2d) has a structure in which the MAC SDU, the MAC CE, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3f-(Format 2-2d). In the 3f-(Format 2-2d) structure, the L-field may be included in all the sub-headers.

3f-(Format 2-2e) has a structure in which the MAC CE, the MAC SDU, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3f-(Format 2-2e). The 3f-(Format 2-2e) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-20 has a structure in which the MAC CE, the MAC SDU, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3f-(Format 2-20. The 3f-(Format 2-20 structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2g) has a structure in which the MAC CE, the MAC SDU, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3f-(Format 2-2g). In the 3f-(Format 2-2g) structure, the L-field may be included in all the sub-headers.

3f-(Format 2-2h) has a structure in which the MAC CE, the MAC SDU, and the padding are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3f-(Format 2-2h). In the 3f-(Format 2-2h) structure, the L-field may be included in all the sub-headers.

3f-(Format 2-2i) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2i). The 3f-(Format 2-2i) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2j) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2j). The 3f-(Format 2-2j) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2k) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2k). In the 3f-(Format 2-2k) structure, the L-field may be included in all the sub-headers.

3f-(Format 2-2l) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2l). In the 3f-(Format 2-2l) structure, the L-field may be included in all the sub-headers.

3f-(Format 2-2m) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2m). The 3f-(Format 2-2m) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2n) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2n). The 3f-(Format 2-2n) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2o) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2o). In the 3f-(Format 2-2o) structure, the L-field may be included in all the sub-headers.

3f-(Format 2-2p) has a structure in which the MAC SDU, the padding, and the MAC CE are located at the front part of the MAC PDU, followed by the MAC header. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2p). In the 3f-(Format 2-2p) structure, the L-field may be included in all the sub-headers.

3f-(Format 2-2q) has a structure in which the MAC SDU, the MAC CE, and the padding are located at the front part of the MAC PDU, followed by the MAC header. If the MAC CE is generated, a MAC CE may be located at the tail part of the MAC PDU together with a sub-header of the MAC CE. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3f-(Format 2-2q). The 3f-(Format 2-2q) structure is characterized in that an L-field is not included in the last sub-header. The receiving side may confirm the L-field value of the remaining sub-headers and subtract the L-field value from the entire length of the MAC PDU to estimate the length of the MAC SDU.

3f-(Format 2-2r) has a structure in which the MAC SDU, the MAC CE, and the padding are located at the front part of the MAC PDU, followed by the MAC header. If the MAC CE is generated, together with the sub-header of the MAC CE, the MAC CE may be located in the middle part of the MAC PDU, that is, between the MAC payload and the MAC header, more specifically, at the head of the MAC sub-headers. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3*f*-(Format 2-2*r*). The 3*f*-(Format 2-2*r*) structure is characterized in that an L-field is not included in the last sub-header. The receiving side may confirm the L-field value of the remaining sub-headers and subtract the L-field value from the entire length of the MAC PDU to estimate the length of the MAC SDU.

3*f*-(Format 2-2*s*) has a structure in which the MAC SDU, the MAC CE, and the padding are located at the front part of the MAC PDU, followed by the MAC header. If the MAC CE is generated, a MAC CE may be located at the tail part of the MAC PDU together with a sub-header of the MAC CE. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3*f*-(Format 2-2*s*). In the 3*f*-(Format 2-2*s*) structure, the L-field may be included in all the sub-headers.

3*f*-(Format 2-2*t*) has a structure in which the MAC SDU, the MAC CE, and the padding are located at the front part of the MAC PDU, followed by the MAC header. If the MAC CE is generated, together with the sub-header of the MAC CE, the MAC CE may be located in the middle part of the MAC PDU, that is, between the MAC payload and the MAC header, more specifically, at the head of the MAC sub-headers. The MAC header consists of several sub-heads. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 3*f*-(Format 2-2*t*). In the 3*f*-(Format 2-2*t*) structure, the L-field may be included in all the sub-headers.

Figure 3G:
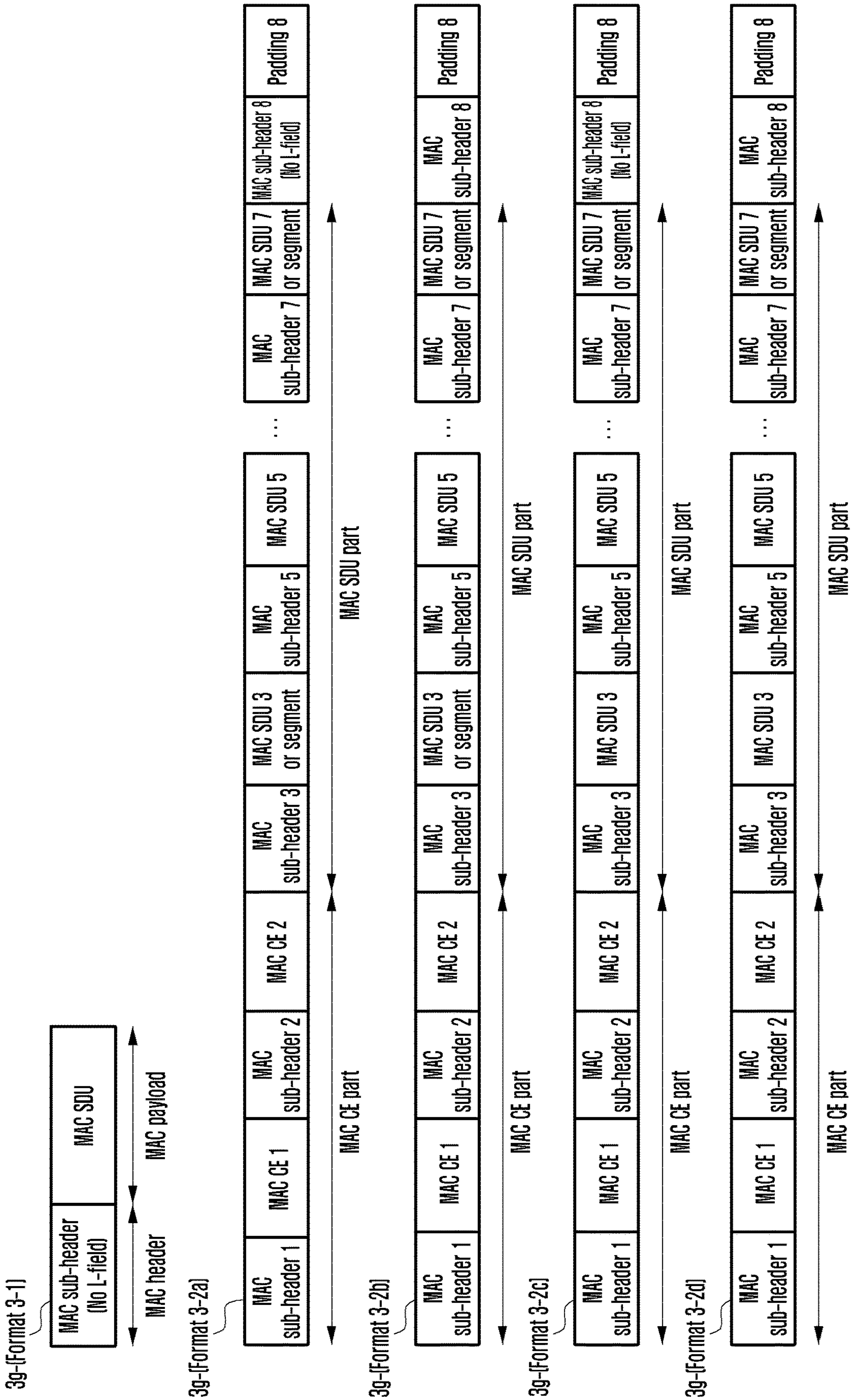
FIGS. 3GA, 3GB, and 3GC are diagrams illustrating a third MAC PDU structure for a next generation mobile communication system according to embodiments of the present disclosure.
Figure 3G:
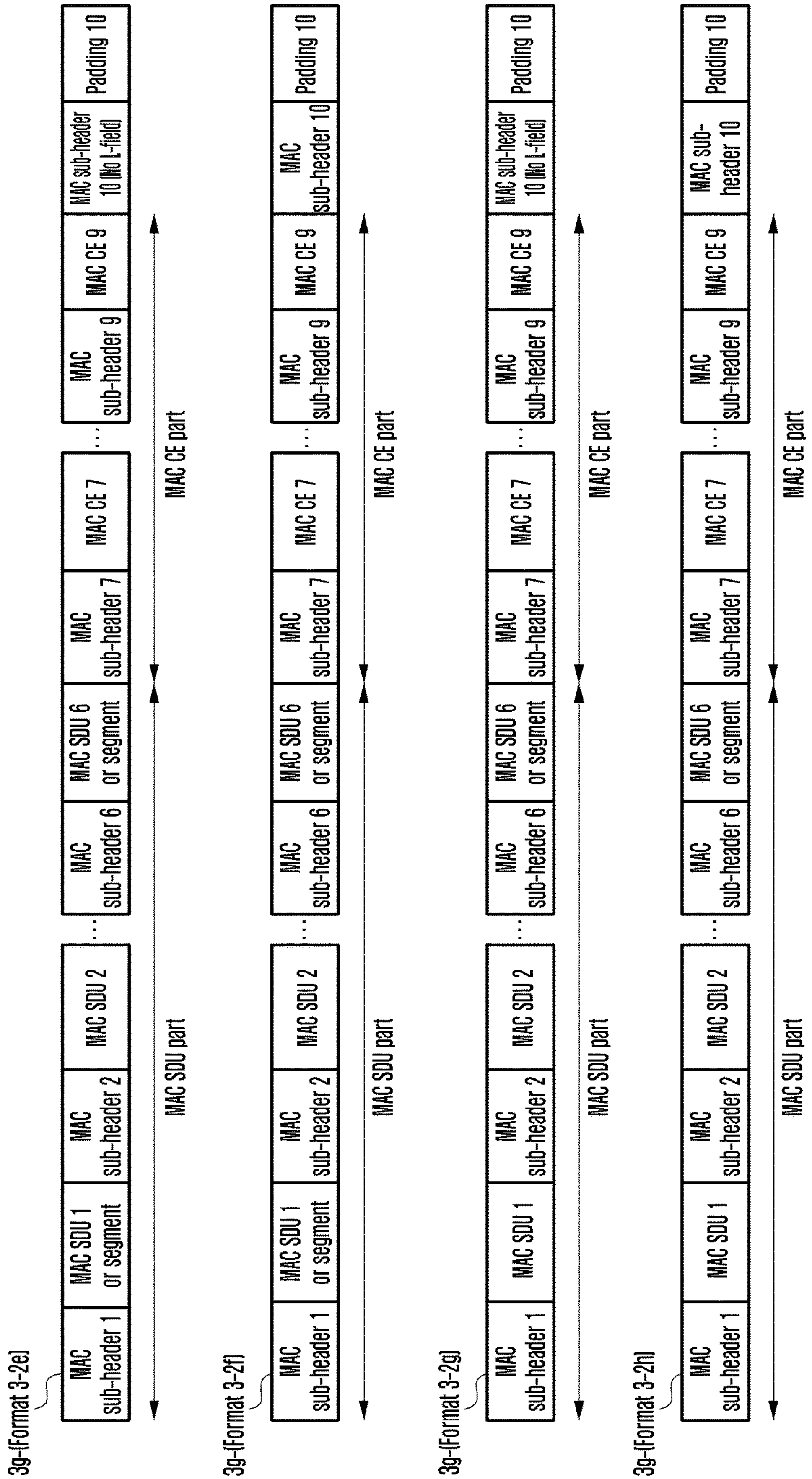
Figure 3G:
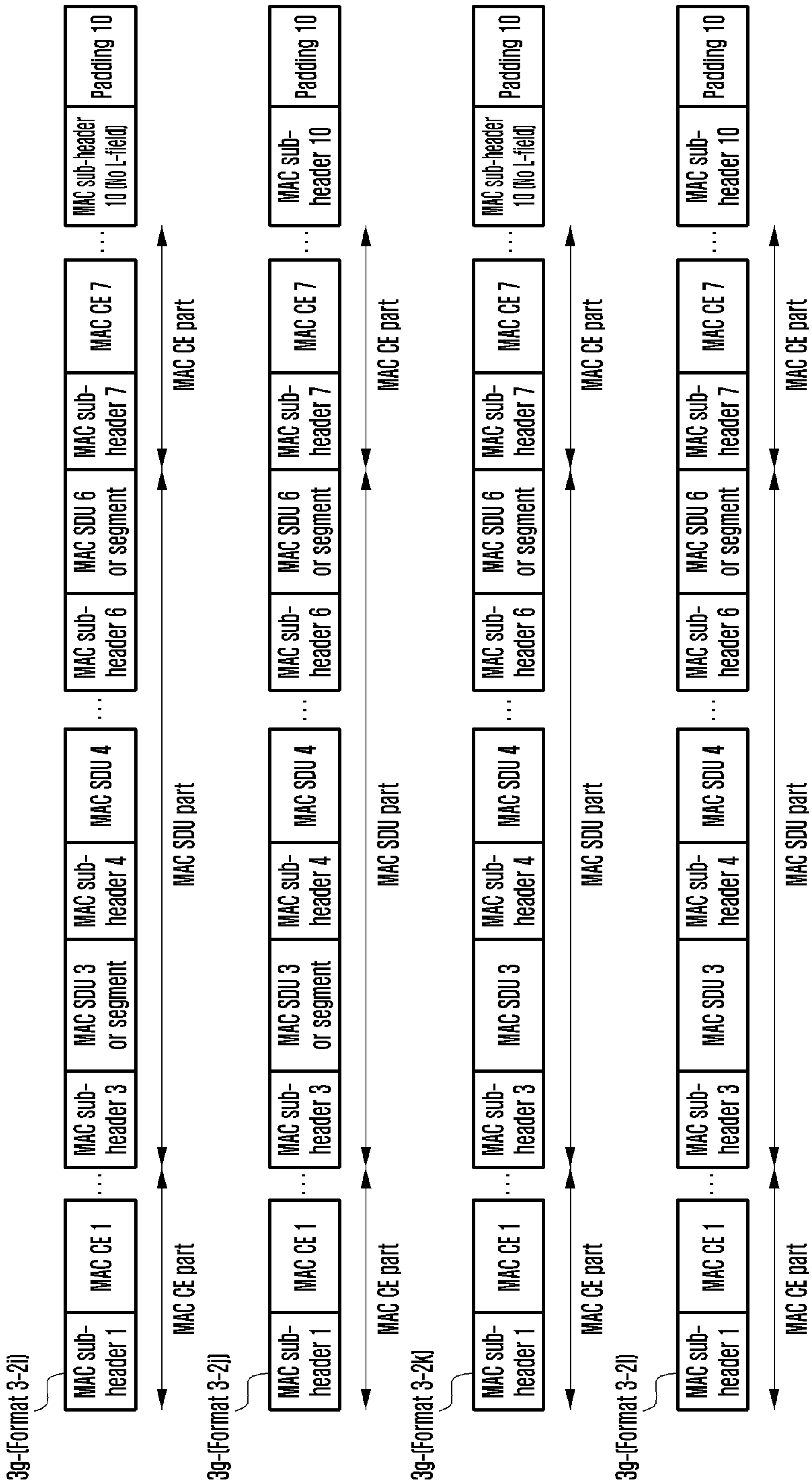

FIGS. 3GA to 3GC are diagrams illustrating a third MAC PDU structure for a next generation mobile communication system according to an embodiment of the present disclosure.

Referring to FIG. 3GA to 3GC, 3*g*-(Format 3-1) may store one MAC SDU or MAC CE. In the above structure, the MAC header is located at a front part and the payload is located at a rear part. The header may include the variables described in Table 3 except for the L-field, and information other than the variables described in Table 3.

3*g*-(Format 3-2*a*) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3*g*-(Format 3-2*a*) structure is largely divided into the MAC CE part and the MAC SDU part. The MAC CEs may be located at a front part in the order in which they are first generated. In the MAC SDU part, a last segment of one MAC SDU (or RLC PDU or RLC SDU) may be located at a head thereof and a first segment of one MAC SDU (or RLC PDU or RLC SDU) may be located at a tail thereof. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*g*-(Format 3-2*a*). For example, the header of the front part becomes the information indicating the payload of the rear part. The 3*g*-(Format 3-2*a*) structure is characterized in that an L-field is not included in the last sub-header. The receiving side may confirm the L-field value of the remaining sub-headers and subtract the L-field value from the entire length of the MAC PDU to estimate the length of the MAC SDU. The 3*g*-(Format 3-2*b*) structure is the same as the 3*g*-(Format 3-2*a*) structure and may include L-fields in all the sub-headers.

3*g*-(Format 3-2*c*) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3*g*-(Format 3-2*c*) structure is largely divided into the MAC CE part and the MAC SDU part. The MAC CEs may be located at the front part in the order in which they are first generated, and in the MAC SDU part, segments of a MAC SDU (or RLC PDU or RLC SDU) may be located at the tail part of the MAC SDU part. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3*g*-(Format 3-2*c*). For example, the header of the front part becomes the information indicating the payload of the rear part. The 3*g*-(Format 3-2*c*) structure is characterized in that an L-field is not included in the last sub-header. The receiving side may confirm the L-field value of the remaining sub-headers and subtract the L-field value from the entire length of the MAC PDU to estimate the length of the MAC SDU. The 3*g*-(Format 3-2*d*) structure is the same as the 3*g*-(Format 3-2*c*) structure and may include L-fields in all the sub-headers.

3*g*-(Format 3-2*e*) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3*g*-(Format 3-2*e*) structure is largely divided into a MAC CE part and a MAC SDU part. The MAC CEs may be located at a front part of the MAC SDU part in the order in which they are first generated, and even the MAC CEs may be located at a rear part of the MAC CE part in the order in which they are first generated. In the MAC SDU part, a last segment of one MAC SDU (or RLC PDU or RLC SDU) may be located at a head thereof and a first segment of one MAC SDU (or RLC PDU or RLC SDU) may be located at a tail thereof. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3g-(Format 3-2e). For example, the header of the front part becomes the information indicating the payload of the rear part. The 3g-(Format 3-2e) structure is characterized in that an L-field is not included in the last sub-header. The receiving side may confirm the L-field value of the remaining sub-headers and subtract the L-field value from the entire length of the MAC PDU to estimate the length of the MAC SDU. The 3g-(Format 3-20 structure is the same as the 3g-(Format 3-2e) structure and may include L-fields in all the sub-headers.

3g-(Format 3-2g) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3g-(Format 3-2g) structure is largely divided into a MAC CE part and a MAC SDU part. The MAC CEs may be located at a front part of the MAC SDU part in the order in which they are first generated, and even the MAC CEs may be located at a rear part of the MAC CE part in the order in which they are first generated. In the MAC SDU part, the segments of one MAC SDU (or RLC PDU or RLC SDU) may be located at the tail. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 3g-(Format 3-2g). For example, the header of the front part becomes the information indicating the payload of the rear part. The 3g-(Format 3-2g) structure is characterized in that an L-field is not included in the last sub-header. The receiving side may confirm the L-field value of the remaining sub-headers and subtract the L-field value from the entire length of the MAC PDU to estimate the length of the MAC SDU. The 3g-(Format 3-2h) structure is the same as the 3g-(Format 3-2g) structure and may include L-fields in all the sub-headers.

3g-(Format 3-2i) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3g-(Format 3-2i) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU. In the MAC SDU part, the last segment of one MAC SDU (or RLC PDU or RLC SDU) may be located at the head of the MAC SDU part and the first segment of one MAC SDU (or RLC PDU or RLC SDU) may be located at the tail of the MAC SDU part. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3g-(Format 3-2i). For example, the header of the front part becomes the information indicating the payload of the rear part. The 3g-(Format 3-2i) structure is characterized in that an L-field is not included in the last sub-header. The receiving side may confirm the L-field value of the remaining sub-headers and subtract the L-field value from the entire length of the MAC PDU to estimate the length of the MAC SDU. The 3g-(Format 3-2j) structure is the same as the 3g-(Format 3-2i) structure and may include L-fields in all the sub-headers.

3g-(Format 3-2k) has a structure, such as the sub-header, the MAC CE, the sub-header, the MAC SDU, the sub-header, and the padding, and in FIGS. 3FA to 3FEB, the second MAC PDU structure has the structure in which the sub-headers are collected at one part and the payload part is located separately, whereas the third MAC PDU structure has the repeating structure, such as the sub-header, the payload, the sub-header, and the payload. The 3g-(Format 3-2k) structure is divided into a MAC CE part that may be first generated, a MAC SDU part, and a MAC CE part that are generated later. The MAC CEs may be located at a front part of the MAC SDU part in the order in which they are first generated, and even the MAC CEs may be located at a rear part of the MAC CE part in the order in which they are first generated. However, a MAC CE (or the MAC CE determined to have the high priority, the MAC CE prior to the MAC SDU, or the MAC CE satisfying the predetermined criterion) that may be generated in advance before being allocated the uplink resource of the uplink is the MAC CE part that may be generated first and may be located at the head of the MAC PDU, and the remaining MAC CEs are the MAC CE part that may be generated later and may be located at the tail of the MAC PDU. In the MAC SDU part, the segments of one MAC SDU (or RLC PDU or RLC SDU) may be located at the tail of the MAC SDU part. The sub-header may include some of the variables described in Table 3, and information other than the variables described in Table 3. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 3g-(Format 3-2k). For example, the header of the front part becomes the information indicating the payload of the rear part. The 3g-(Format 3-2k) structure is characterized in that an L-field is not included in the last sub-header. The receiving side may confirm the L-field value of the remaining sub-headers and subtract the L-field value from the entire length of the MAC PDU to estimate the length of the MAC SDU. The 3g-(Format 3-21) structure is the same as the 3g-(Format 3-2k) structure and may include L-fields in all the sub-headers.

The first method for applying padding which can be applied to various cases of the first MAC PDU structure described in FIG. 3E of the present disclosure, the second MAC PDU structure described in FIGS. 3FA to 3FEB, and the third MAC PDU structures described in FIGS. 3GA to 3GC, The first padding application method is as follows.

Figure 3H:
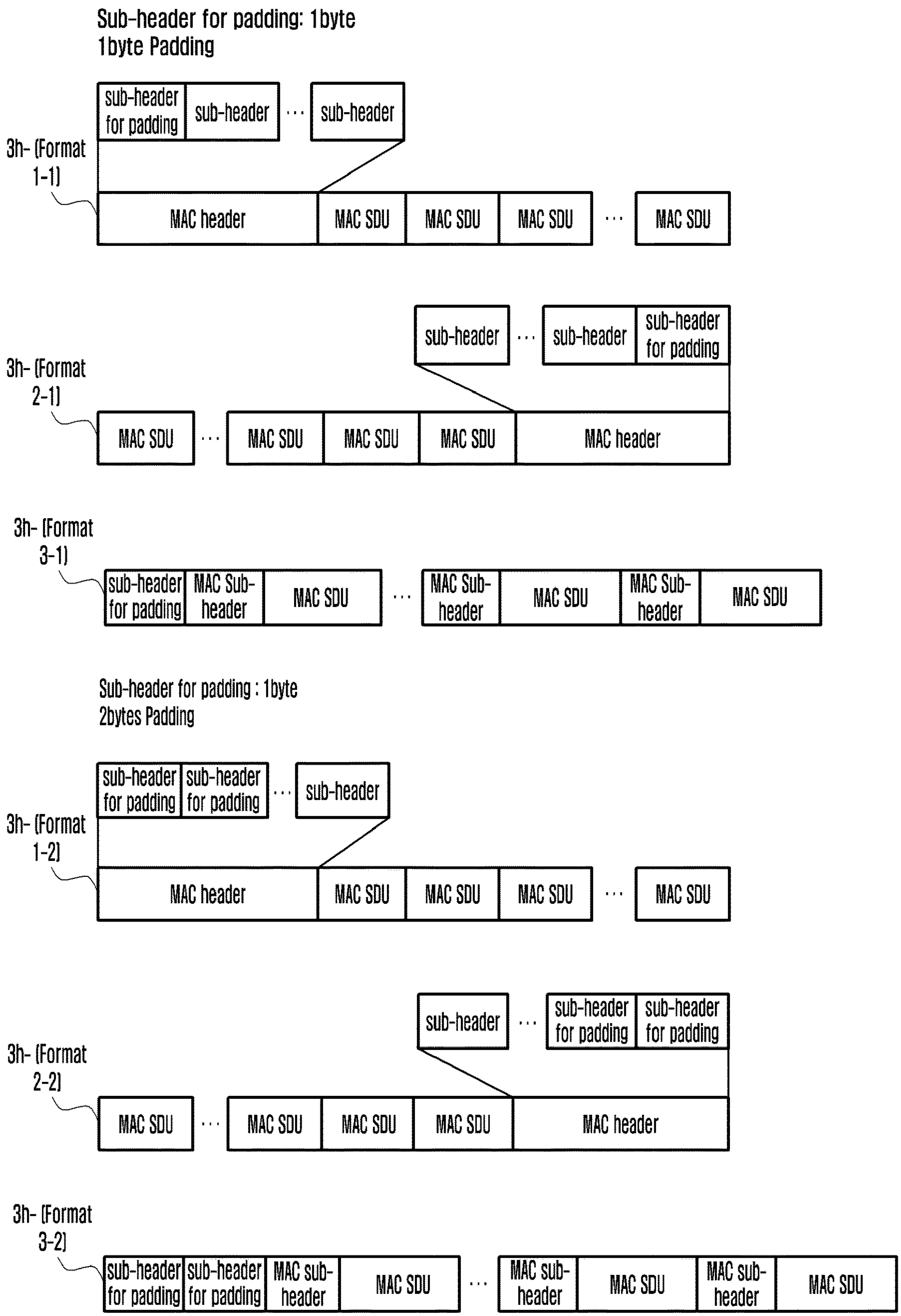
FIGS. 3HA and 3HB illustrate a first method for applying padding according to an embodiment of the present disclosure.
Figure 3H:
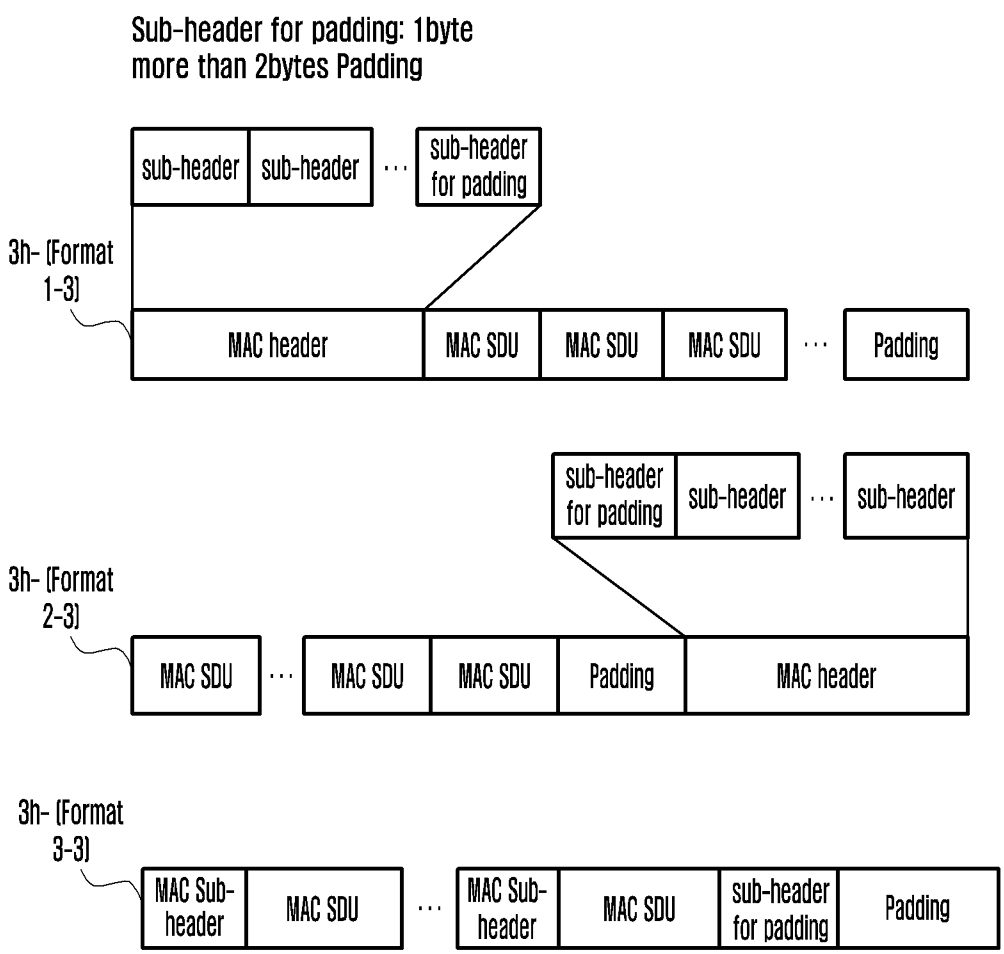

FIGS. 3HA and 3HB illustrate a first method for applying padding according to an embodiment of the present disclosure.

Referring to FIGS. 3HA and 3HB, it is assumed that the size of the MAC sub-header for padding is fixed to 1 byte.

The first method for applying padding of the present disclosure is as follows.

If a first condition is satisfied, the first method is applied to add padding.

If a second condition is satisfied, the second method is applied to add padding.

If a third condition is satisfied, the third method is applied to add padding.

In this case, if the first condition is that the required size of padding is 1 byte.

In this case, if the second condition is that the required size of padding is 2 bytes.

In this case, if the third condition is that the required size of padding is 3 bytes.

In the first method, one MAC sub-header for padding having a size of 1 byte is added to the head of the MAC header part. In the case of the third MAC PDU structure, one MAC sub-header for padding having a size of 1 byte is added to the head of the MAC PDU. The first method may be applied to various cases of the first MAC PDU structure described in FIG. 3E, such as 3h-(Format 1-1), 3h-(Format 2-1), and 3h-(Format 3-1), the second MAC PDU structure described in FIGS. 3FA to 3FEB, and the third MAC PDU structure described in FIGS. 3GA to 3GC.

In the second method, two MAC sub-headers for padding having a size of 1 byte are added to the head of the MAC header part. In the case of the third MAC PDU structure, two MAC sub-headers for padding having a size of 1 byte are added to the head of the MAC PDU. The second method may be applied to various cases of the first MAC PDU structure described in FIG. 3E, such as 3h-(Format 1-2), 3h-(Format 2-2), and 3h-(Format 3-2). The second MAC PDU structure described in FIGS. 3FA, to 3FEB, and the third MAC PDU structure described in FIGS. 3GA to 3GC.

In the third method, one MAC sub-header for padding having a size of 1 byte is added at the tail of the MAC header part, and the padding corresponding to the remaining size excluding 1 byte from the required size of padding is added to the tail of the MAC payload. In the case of the third MAC PDU structure, one MAC sub-header for padding having a size of 1 byte and the padding corresponding to the remaining size excluding 1 byte from the required size of padding are added to the tail of the MAC PDU. The third method may be applied to various cases of the first MAC PDU structure described in FIG. 3E, such as 3h-(Format 1-3), 3h-(Format 2-3), and 3h-(Format 3-3). The second MAC PDU structure described in FIGS. 3FA to 3FEB, and the third MAC PDU structure described in FIGS. 3GA to 3GC.

The second method for applying padding which can be applied to various cases of the first MAC PDU structure described in FIG. 3E of the present disclosure, the second MAC PDU structure described in FIGS. 3FE to 3FEB, and the third MAC PDU structure described in FIGS. 3GA to 3GC is as follows.

Figure 3I:
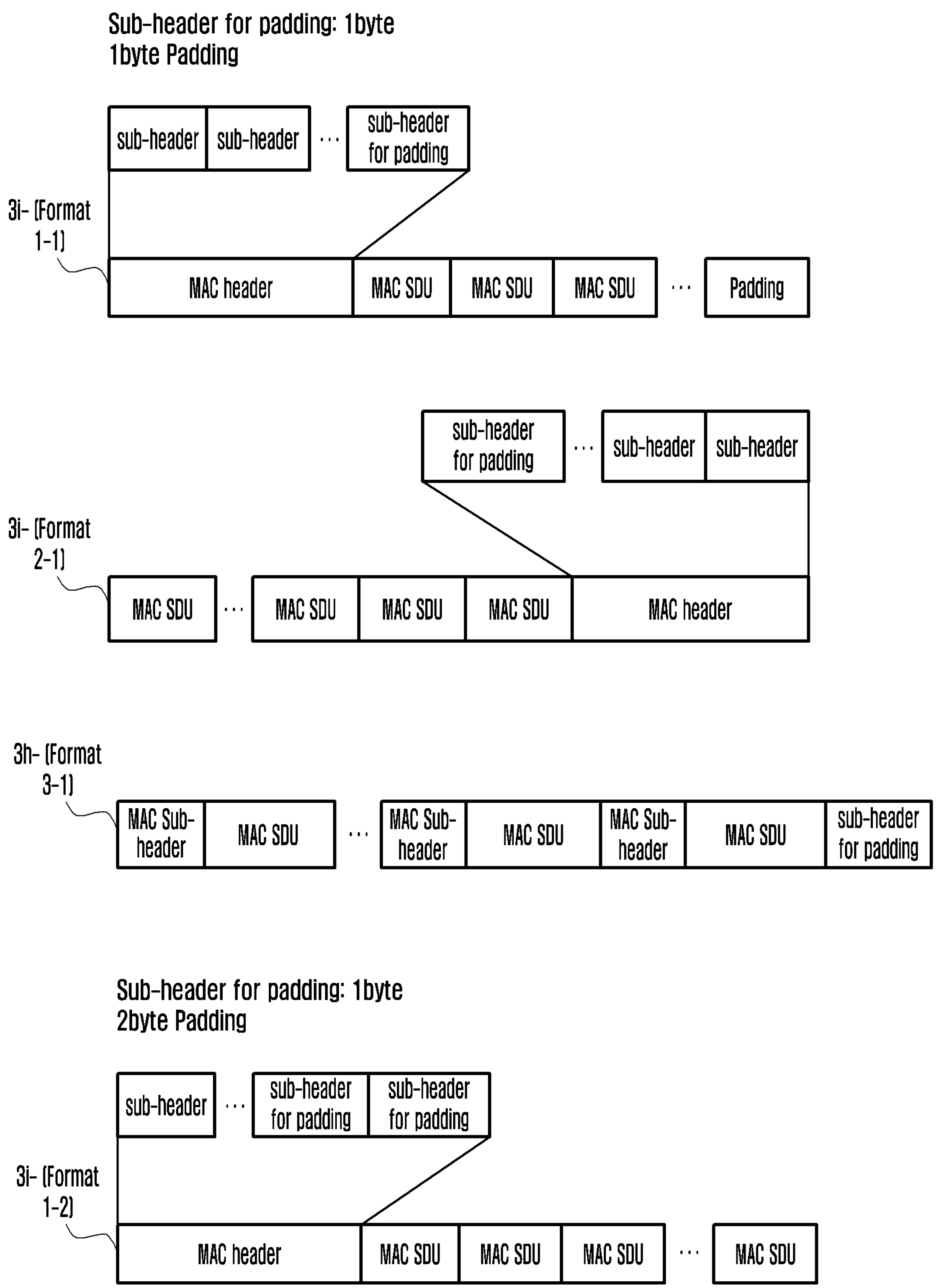
FIG. 3J is a diagram illustrating a third method for applying padding according to an embodiment of the present disclosure.
FIG. 3K is a diagram illustrating a fourth method for applying padding of according to an embodiment the present disclosure.
FIG. 3L is a diagram illustrating an operation of a terminal related to first, second, and fifth methods for applying padding according to an embodiment of the present disclosure.
FIG. 3M is a diagram illustrating an operation of a terminal related to third, fourth, sixth, and seventh methods for applying padding according to an embodiment of the present disclosure.
FIG. 3N is a block diagram illustrating an internal structure of a terminal according to an embodiment of the present disclosure.
FIG. 3O is a block diagram illustrating a configuration of a base station transceiver according to an embodiment of the present disclosure.
Figure 3I:
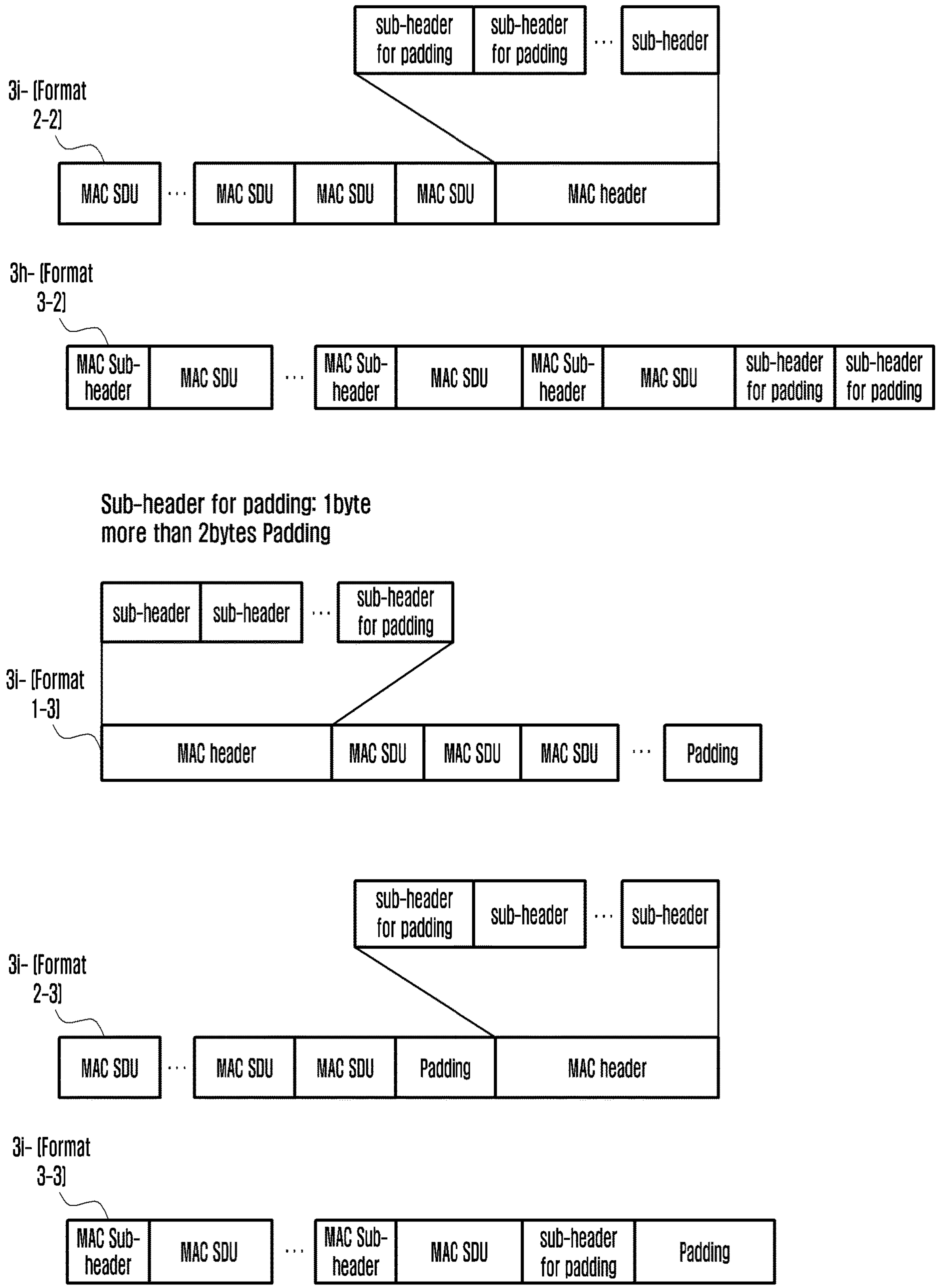

FIGS. 3IA and 3IB illustrate a second method for applying padding of according to an embodiment of the present disclosure.

Referring to FIGS. 3IA and 3IB, it is assumed that the size of the MAC sub-header for padding is fixed to 2 byte.

The second method for applying padding of the present disclosure is as follows.

If a first condition is satisfied, the first method is applied to add padding.

If a second condition is satisfied, the second method is applied to add padding.

If a third condition is satisfied, the third method is applied to add padding.

In this case, if the first condition is that the required size of padding is 1 byte.

In this case, if the second condition is that the required size of padding is 2 bytes.

In this case, if the third condition is that the required size of padding is 3 bytes.

In the first method, one MAC sub-header for padding having a size of 1 byte is added to the tail of the MAC header part. In the case of the third MAC PDU structure, one MAC sub-header for padding having a size of 1 byte is added to the head of the MAC PDU. The first method may be applied to various cases of the first MAC PDU structure described in FIG. 3E, such as 3i-(Format 1-1), 3i-(Format 2-1), and 3i-(Format 3-1), the second MAC PDU structure described in FIGS. 3FA to 3FEB, and the third MAC PDU structure described in FIGS. 3GA to 3GC.

In the second method, two MAC sub-headers for padding having a size of 2 bytes are added to the tail of the MAC header part. In the case of the third MAC PDU structure, two MAC sub-headers for padding having a size of 1 byte are added to the head of the MAC PDU. The second method may be applied to various cases of the first MAC PDU structure described in FIG. 3E, such as 3i-(Format 1-2), 3i-(Format 2-2), and 3i-(Format 3-2), the second MAC PDU structure described in FIGS. 3FA to 3FEB, and the third MAC PDU structure described in FIGS. 3GA to 3GC.

In the third method, one MAC sub-header for padding having a size of 1 byte is added at the tail of the MAC header part, and the padding corresponding to the remaining size excluding 1 byte from the required size of padding is added to the tail of the MAC payload. In the case of the third MAC PDU structure, one MAC sub-header for padding having a size of 1 byte and the padding corresponding to the remaining size excluding 1 byte from the required size of padding are added to the tail of the MAC PDU. The second method may be applied to various cases of the first MAC PDU structure described in FIG. 3E, such as 3i-(Format 1-3), 3i-(Format 2-3), and 3i-(Format 3-3), the second MAC PDU structure described in FIGS. 3FA to 3FEB, and the third MAC PDU structure described in FIGS. 3GA to 3GC.

The third method for applying padding which can be applied to various cases of the first MAC PDU structure described in FIG. 3E of the present disclosure, the second MAC PDU structure described in FIGS. 3FEA to 3FEB, and the third MAC PDU structure described in FIGS. 3GA to 3GC is as follows.

Figure 3J:
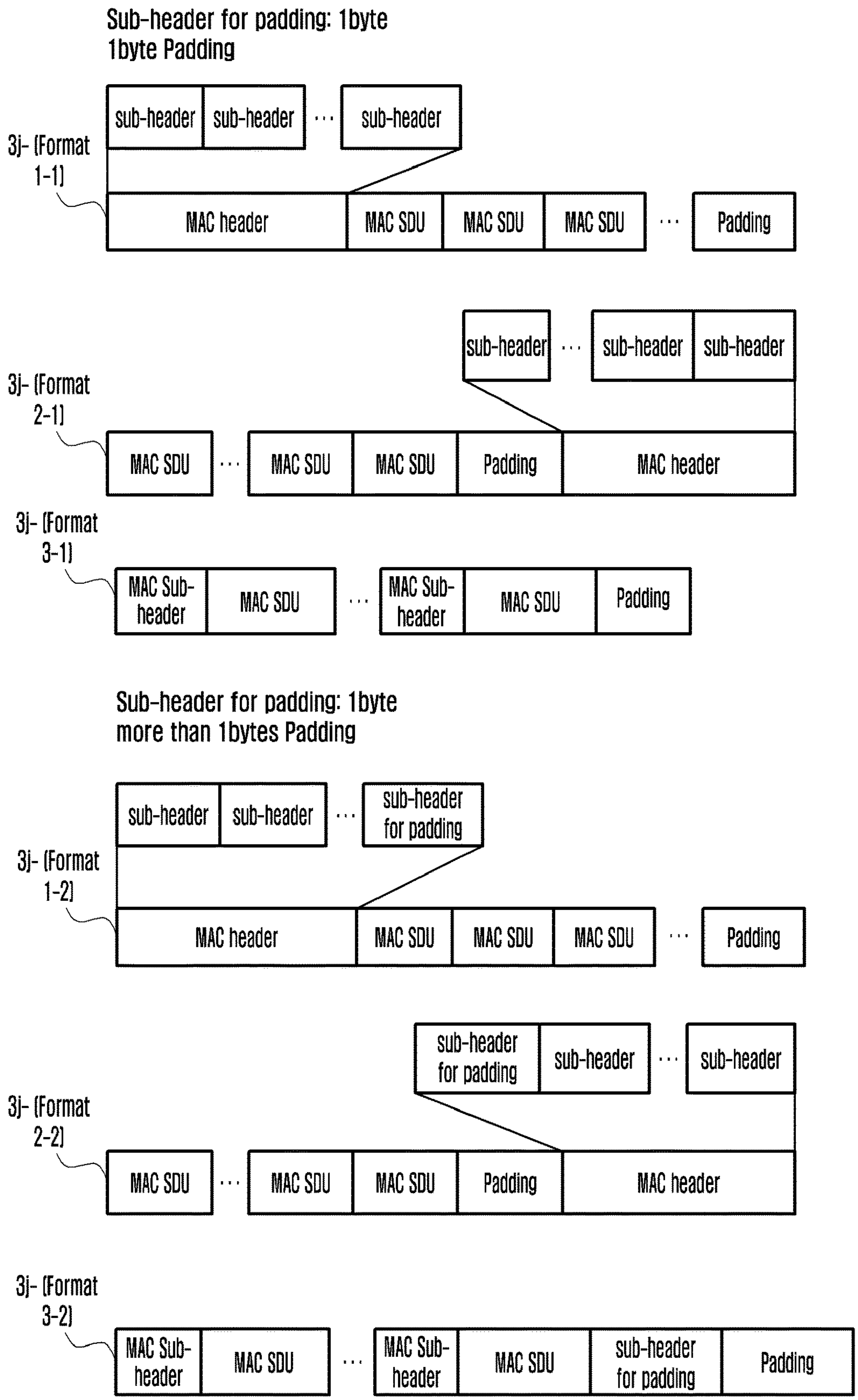

FIG. 3J is a diagram illustrating a third method for applying padding according to an embodiment of the present disclosure.

Referring to FIG. 3J, it is assumed that the size of the MAC sub-header for padding is fixed to 1 byte.

The third method for applying padding of the present disclosure is as follows.

If a first condition is satisfied, the first method is applied to add padding.

If a second condition is satisfied, the second method is applied to add padding.

In this case, if the first condition is that the required size of padding is 1 byte.

In this case, if the third condition is that the required size of padding is 2 bytes.

In the above, the first method adds padding having a size of 1 byte to the tail of the MAC PDU. In the case of the second MAC PDU structure, the padding having the size of 1 byte may be added to the tail of the MAC payload and thus the padding may be located in the middle of the MAC PDU. In the case of the third MAC PDU structure, the padding having a size of 1 byte is added to the tail of the MAC PDU. The first method may be applied to various cases of the first MAC PDU structure described in FIG. 3E, such as 3*j*-(Format 1-1), 3*j*-(Format 2-1), and 3*j*-(Format 3-1), the second MAC PDU structure described in FIGS. 3FA to 3FEB, and the third MAC PDU structure described in FIGS. 3GA to 3GC.

In the second method, one MAC sub-header for padding having a size of 1 byte is added at the tail of the MAC header part, and the padding corresponding to the remaining size excluding 1 byte from the required size of padding is added to the tail of the MAC payload. In the case of the third MAC PDU structure, one MAC sub-header for padding having a size of 1 byte and the padding corresponding to the remaining size excluding 1 byte from the required size of padding are added to the tail of the MAC PDU. The third method may be applied to various cases of the first MAC PDU structure described in FIG. 3E, such as 3*j*-(Format 1-2), 3*j*-(Format 2-2), and 3*j*-(Format 3-2), the second MAC PDU structure described in FIGS. 3FA to 3FEB, and the third MAC PDU structure described in FIGS. 3GA to 3GC.

The fourth method for applying padding which can be applied to various cases of the first MAC PDU structure described in FIG. 3E of the present disclosure, the second MAC PDU structure described in FIGS. 3FEA to 3FEB, and the third MAC PDU structure described in FIGS. 3GA to 3GC is as follows.

Figure 3K:
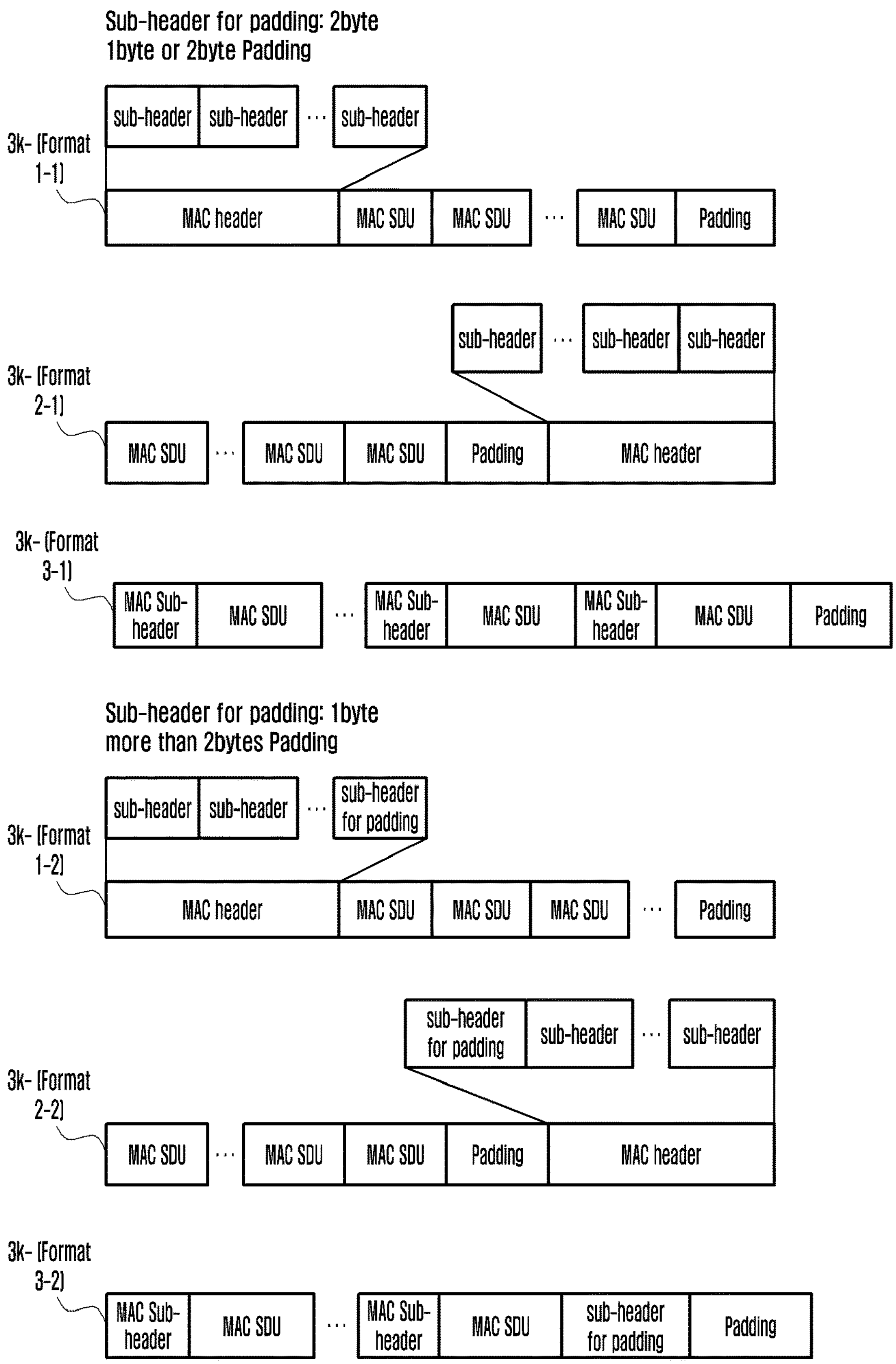

FIG. 3K is a diagram illustrating a fourth method for applying padding of according to an embodiment of the present disclosure.

Referring to FIG. 3K, it is assumed that the size of the MAC sub-header for padding is fixed to 2 bytes.

The fourth method for applying padding of the present disclosure is as follows.

If a first condition is satisfied, the first method is applied to add padding.

If a second condition is satisfied, the second method is applied to add padding.

In this case, if the first condition is that the required size of padding is 1 byte or 2 bytes.

In this case, if the second condition is that the required size of padding is 3 bytes or more.

In the above, the first method adds padding having a size of 1 byte or 2 bytes to the tail of the MAC PDU according to the required size of padding. In the case of the second MAC PDU structure, the padding having the size of 1 byte or 2 bytes may be added to the tail of the MAC payload according to the required size of padding and thus the padding may be located in the middle of the MAC PDU. In the case of the third MAC PDU structure, padding having a size of 1 byte or 2 bytes is added to the head of the MAC PDU according to the required size of padding. The first method may be applied to various cases of the first MAC PDU structure described in FIG. 3E, such as 3*k*-(Format 1-1), 3*k*-(Format 2-1), and 3*k*-(Format 3-1), the second MAC PDU structure described in FIGS. 3FA to 3FEB, and the third MAC PDU structure described in FIGS. 3GA to 3GC.

In the second method, one MAC sub-header for padding having a size of 2 bytes is added to the tail of the MAC header part, and the padding corresponding to the remaining size excluding 2 bytes from the required size of padding is added to the tail of the MAC payload. In the case of the third MAC PDU structure, one MAC sub-header for padding having a size of 2 bytes and the padding corresponding to the remaining size excluding 1 byte from the required size of padding are added to the tail of the MAC PDU. The third method may be applied to various cases of the first MAC PDU structure described in FIG. 3E, such as 3*k*-(Format 1-2), 3*k*-(Format 2-2), and 3*k*-(Format 3-2), the second MAC PDU structure described in FIGS. 3FA to 3FEB, and the third MAC PDU structure described in FIGS. 3GA to 3GC.

The second method for applying padding which can be applied to various cases of the first MAC PDU structure described in FIG. 3E of the present disclosure, the second MAC PDU structure described in FIGS. 3FEA and 3FEB, and the third MAC PDU structure described in FIGS. 3GA to 3GC is as follows.

In the fifth method for applying padding, it is assumed that the size of the MAC sub-header for padding is fixed to 1 byte.

The fifth method for applying padding of the present disclosure is as follows.

If a first condition is satisfied, the first method is applied to add padding.

If a second condition is satisfied, the second method is applied to add padding.

If a third condition is satisfied, the third method is applied to add padding.

In this case, if the first condition is that the required size of padding is 1 byte.

In this case, if the second condition is that the required size of padding is 2 bytes.

In this case, if the third condition is that the required size of padding is 3 bytes.

In the first method, one MAC sub-header for padding having a size of 1 byte is added to the head of the MAC header part. In the case of the third MAC PDU structure, one MAC sub-header for padding having a size of 1 byte is added to any location of the MAC PDU. The first method may be applied to various cases of the first MAC PDU structure described in FIG. 3E, such as 3*h*-(Format 1-1), 3*h*-(Format 2-1), and 3*h*-(Format 3-1), the second MAC PDU structure described in FIGS. 3FA to 3FEB, and the third MAC PDU structure described in FIGS. 3GA to 3GC.

In the second method, two MAC sub-header for padding having a size of 2 bytes are added to the head of the MAC header part. In the case of the third MAC PDU structure, two MAC sub-headers for padding having a size of 1 byte are added to any location of the MAC PDU. The second method may be applied to various cases of the first MAC PDU structure described in FIG. 3E, such as 3*h*-(Format 1-2), 3*h*-(Format 2-2), and 3*h*-(Format 3-2). The second MAC PDU structure described in FIGS. 3FA to 3FEB, and the third MAC PDU structure described in FIGS. 3GA to 3GC.

In the third method, one MAC sub-header for padding having a size of 1 byte is added at any location of the MAC header part, and the padding corresponding to the remaining size excluding 1 byte from the required size of padding is added to a location corresponding to the MAC sub-header of the MAC payload part. In the case of the third MAC PDU structure, one MAC sub-header for padding having a size of 1 byte and the padding corresponding to the remaining size excluding 1 byte from the required size of padding are added to any location of the MAC PDU. The third method may be applied to various cases of the first MAC PDU structure described in FIG. 3E, such as 3*h*-(Format 1-3), 3*h*-(Format 2-3), and 3*h*-(Format 3-3). The second MAC PDU structure described in FIGS. 3FA to 3FEB, and the third MAC PDU structure described in FIGS. 3GA to 3GC.

The sixth method for applying padding which can be applied to various cases of the first MAC PDU structure described in FIG. 3E of the present disclosure, the second MAC PDU structure described in FIGS. 3FA to 3FEB, and the third MAC PDU structure described in FIGS. 3GA to 3GC is as follows.

In the sixth method for applying padding, it is assumed that the size of the MAC sub-header for padding is fixed to 1 byte.

The sixth method for applying padding of the present disclosure is as follows.

If a first condition is satisfied, the first method is applied to add padding.

If a second condition is satisfied, the second method is applied to add padding.

In this case, if the first condition is that the required size of padding is 1 byte.

In this case, if the second condition is that the required size of padding is 2 bytes or more.

In the above, the first method adds padding having a size of 1 byte to any location of the MAC PDU. In the case of the second MAC PDU structure, padding having a size of 1 byte are added to any location of the MAC payload. In the case of the third MAC PDU structure, the padding having a size of 1 byte is added to any location of the MAC PDU. The first method may be applied to various cases of the first MAC PDU structure described in FIG. 3E, such as 3*j*-(Format 1-1), 3*j*-(Format 2-1), and 3*j*-(Format 3-1), the second MAC PDU structure described in FIGS. 3FA to 3FEB, and the third MAC PDU structure described in FIGS. 3GA to 3GC.

In the second method, one MAC sub-header for padding having a size of 1 byte is added at any location of the MAC header part, and the padding corresponding to the remaining size excluding 1 byte from the required size of padding is added to a location corresponding to the padding MAC sub-header of the MAC payload part. In the case of the third MAC PDU structure, one MAC sub-header for padding having a size of 1 byte and the padding corresponding to the remaining size excluding 1 byte from the required size of padding are added to any location of the MAC PDU. The third method may be applied to various cases of the first MAC PDU structure described in FIG. 3E, such as 3*j*-(Format 1-2), 3*j*-(Format 2-2), and 3*j*-(Format 3-2), the second MAC PDU structure described in FIGS. 3FA to 3FEB, and the third MAC PDU structure described in FIGS. 3GA to 3GC.

The seventh method for applying padding which can be applied to various cases of the first MAC PDU structure described in FIG. 3E of the present disclosure, the second MAC PDU structure described in FIGS. 3FEA to 3FEB, and the third MAC PDU structure described in FIGS. 3GA to 3GC is as follows.

In the seventh method for applying padding, it is assumed that the size of the MAC sub-header for padding is fixed to 2 bytes.

The seventh method for applying padding of the present disclosure is as follows.

If a first condition is satisfied, the first method is applied to add padding,

If a second condition is satisfied, the second method is applied to add padding.

In this case, if the first condition is that the required size of padding is 1 byte or 2 bytes.

In this case, if the second condition is that the required size of padding is 3 bytes or more.

In the above, the first method adds padding having a size of 1 byte or 2 bytes to any location of the MAC PDU according to the required size of padding. In the case of the second MAC PDU structure, padding having a size of 1 byte or 2 bytes is added to any location of the MAC payload according to the required size of padding. In the case of the third MAC PDU structure, padding having a size of 1 byte or 2 bytes is added to any location of the MAC PDU according to the required size of padding. The first method may be applied to various cases of the first MAC PDU structure described in FIG. 3E, such as 3*k*-(Format 1-1), 3*k*-(Format 2-1), and 3*k*-(Format 3-1), the second MAC PDU structure described in FIGS. 3FA to 3FEB, and the third MAC PDU structure described in FIGS. 3GA to 3GC.

In the second method, one MAC sub-header for padding having a size of 2 byte is added at any location of the MAC header part, and the padding corresponding to the remaining size excluding 2 bytes from the required size of padding is added to a location corresponding to the padding MAC sub-header of the MAC payload part. In the case of the third MAC PDU structure, one MAC sub-header for padding having a size of 2 byte and the padding corresponding to the remaining size excluding 1 byte from the required size of padding are added to any location of the MAC PDU. The third method may be applied to various cases of the first MAC PDU structure described in FIG. 3E, such as 3*k*-(Format 1-2), 3*k*-(Format 2-2), and 3*k*-(Format 3-2), the second MAC PDU structure described in FIGS. 3FA to 3FEB, and the third MAC PDU structure described in FIGS. 3GA to 3GC.

Figure 3L:
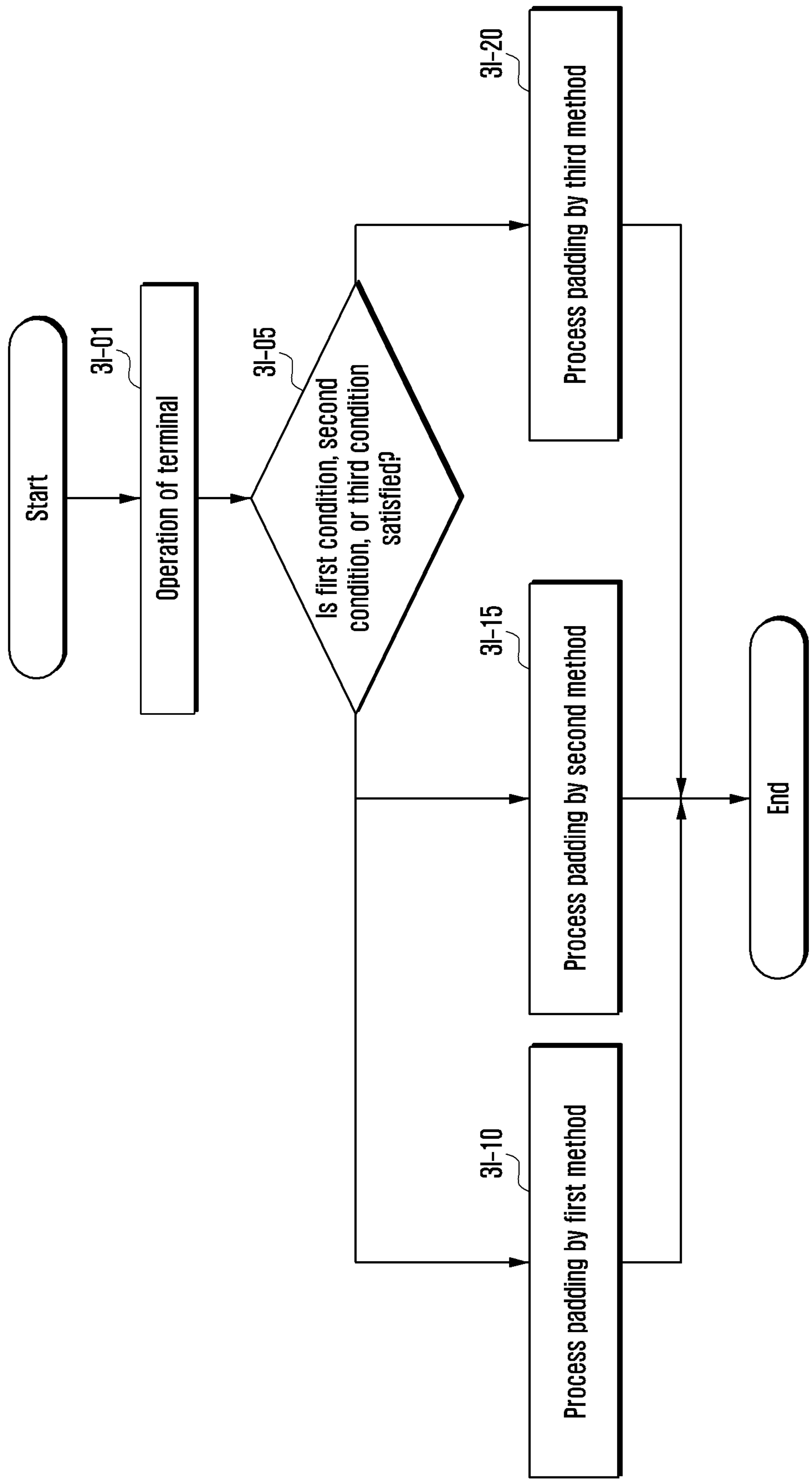

FIG. 3L is a diagram illustrating an operation of a terminal related to first, second, and fifth methods for applying padding according to an embodiment of the present disclosure.

Referring to FIG. 3L, if a terminal 3*l*-01 satisfies the first condition in operation 3*l*-05, the process proceeds to operation 3*l*-10 and thus the padding is processed by the first method. If the second condition is satisfied in operation 3*l*-05, the process proceeds to operation 3*l*-15 and thus the padding is processed by the second method. If the third condition is satisfied in operation 3*l*-05, the process proceeds to operation 3*l*-20 and thus the padding is processed by the third method.

Figure 3M:
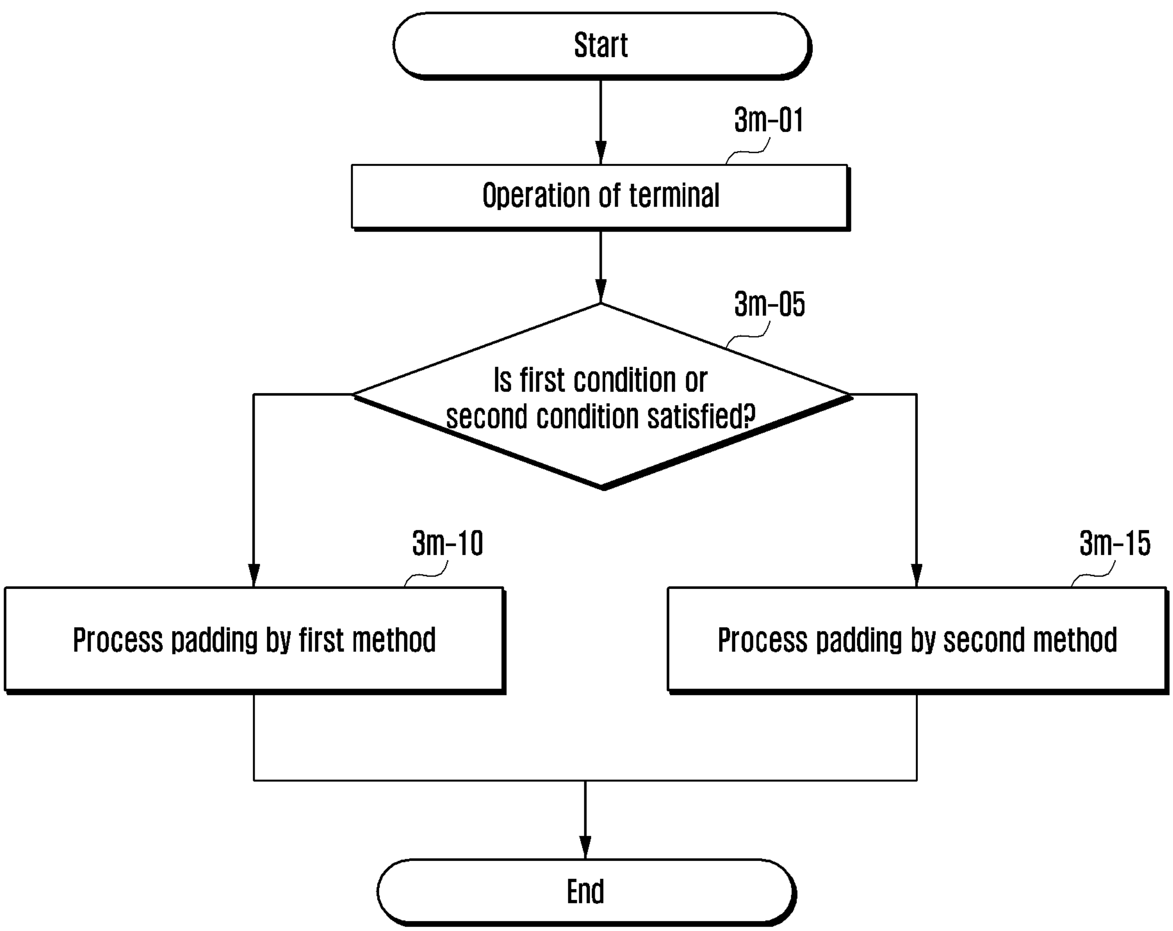

FIG. 3M is a diagram illustrating an operation of a terminal related to third, fourth, sixth, and seventh methods for applying padding according to an embodiment of the present disclosure.

Referring to FIG. 3M, if a terminal 3*m*-01 satisfies the first condition in operation 3*m*-05, the process proceeds to operation 3*m*-10 and thus the padding is processed by the first method. If the second condition is satisfied in operation **3*m*-05, the process proceeds to operation 3*m*-15** and thus the padding is processed by the second method.

Figure 3N:
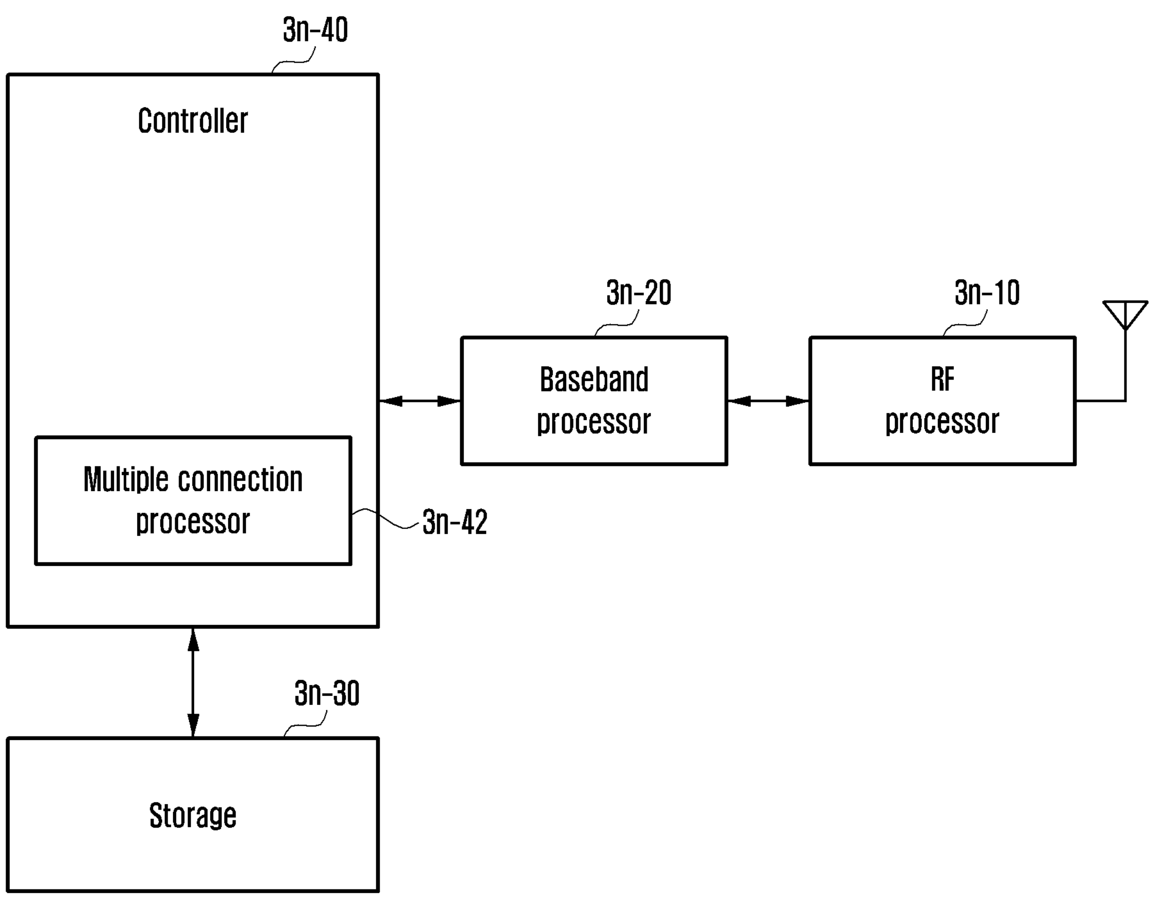
Figure 30:
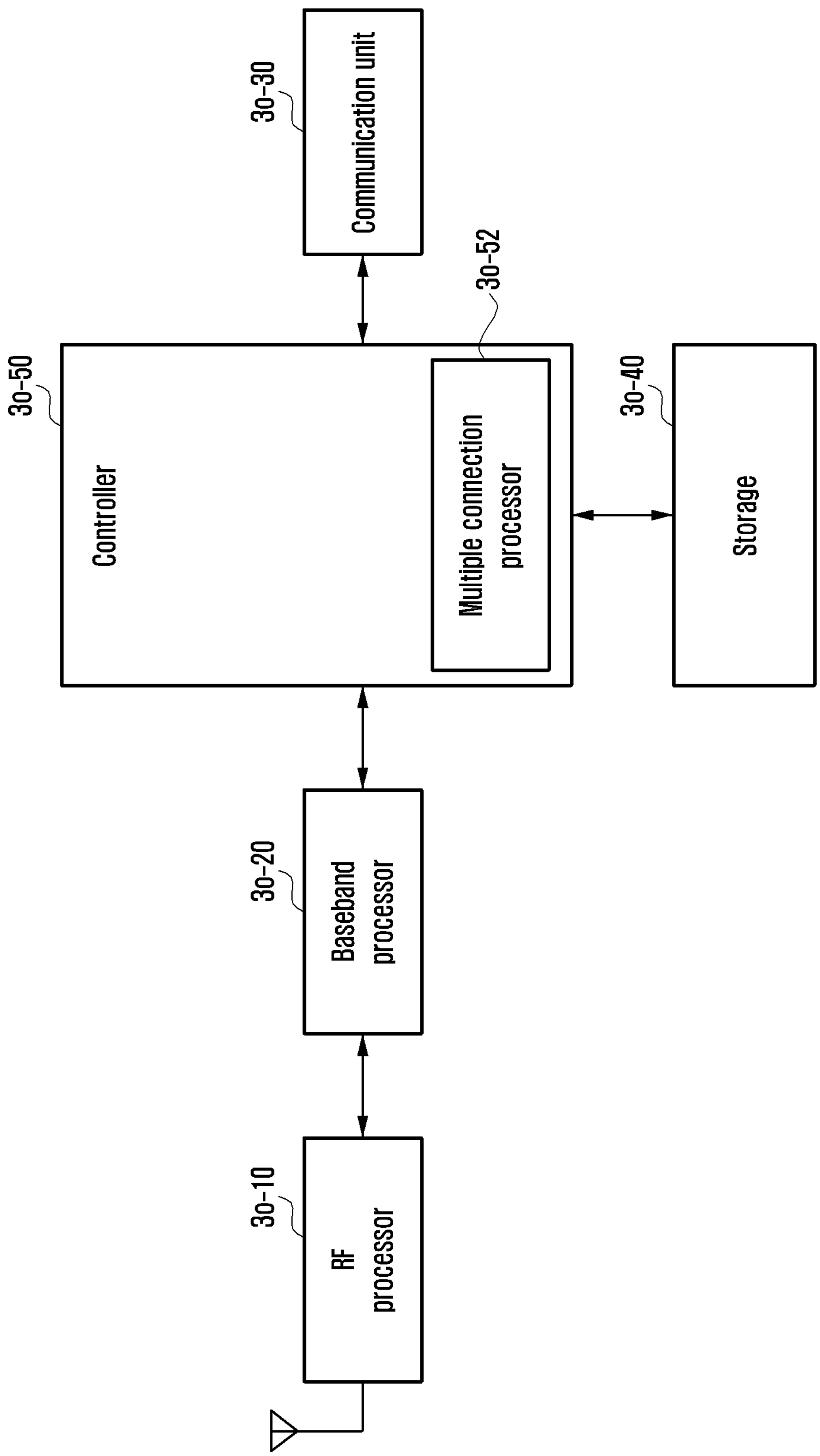

FIG. 3N is a block diagram illustrating an internal structure of a terminal according to an embodiment of the present disclosure.

Referring to FIG. 3N, the terminal includes a radio frequency (RF) processor **3*n*-10, a baseband processor 3*n*-20, a storage 3*n*-30, and a controller 3*n*-40**.

The RF processor **3*n*-10 serves to transmit and receive a signal through a radio channel, such as band conversion and amplification of a signal. For example, the RF processor 3*n*-10 up-converts a baseband signal provided from the baseband processor 3*n*-20 into an RF band signal and then transmits the RF band signal through an antenna and down-converts the RF band signal received through the antenna into the baseband signal. For example, the RF processor 3*n*-10 may include a transmitting filter, a receiving filter, an amplifier, a mixer, an oscillator, a digital to analog converter (DAC), an analog to digital converter (ADC), or the like. FIG. 3*n* illustrates only one antenna but the terminal may include a plurality of antennas. Further, the RF processor 3*n*-10 may include a plurality of RF chains. Further, the RF processor 3*n*-10 may perform beamforming. For the beamforming, the RF processor 3*n*-10 may adjust a phase and a size of each of the signals transmitted and received through a plurality of antennas or antenna elements. In addition, the RF processor may perform MIMO and may receive a plurality of layers when performing the MIMO operation. The RF processor 3*n*-10** may perform reception beam sweeping by appropriately configuring a plurality of antennas or antenna elements under the control of the controller or adjust a direction and a beam width of the reception beam so that the reception beam is resonated with the transmission beam.

The baseband processor **3*n*-20 performs a conversion function between a baseband signal and a bit string according to a physical layer standard of a system. For example, when data are transmitted, the baseband processor 3*n*-20 generates complex symbols by coding and modulating a transmitted bit string. Further, when data are received, the baseband processor 3*n*-20 recovers the received bit string by demodulating and decoding the baseband signal provided from the RF processor 3*n*-10. For example, according to the OFDM scheme, when data are transmitted, the baseband processor 3*n*-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 3*n*-20 divides the baseband signal provided from the RF processor 3*n*-10** in an OFDM symbol unit and recovers the signals mapped to the sub-carriers by a fast Fourier transform (FFT) operation and then recovers the received bit string by the modulation and decoding.

The baseband processor **3*n*-20 and the RF processor 3*n*-10 transmit and receive a signal as described above. Therefore, the baseband processor 3*n*-20 and the RF processor 3*n*-10 may be called a transmitter, a receiver, a transceiver, or a communication unit. Further, at least one of the baseband processor 3*n*-20 and the RF processor 3*n*-10 may include a plurality of communication modules to support a plurality of different radio access technologies. Further, at least one of the baseband processor 3*n*-20 and the RF processor 3*n*-10** may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The storage **3*n*-30 stores data, such as basic programs, application programs, and configuration information for the operation of the terminal. Further, the storage 3*n*-30 provides the stored data according to the request of the controller 3*n*-40**.

The controller **3*n*-40 includes a multiple connection processor 3*n*-42 and controls the overall operations of the terminal. For example, the controller 3*n*-40 transmits and receives a signal through the baseband processor 3*n*-20 and the RF processor 3*n*-10. Further, the controller 2*i*-40 records and reads data in and from the storage 2*i*-40. For this purpose, the controller 3*n*-40 may include at least one processor. For example, the controller 3*n*-40** may include a communication processor (CP) performing a control for communication and an application processor (AP) controlling an upper layer, such as the application programs.

FIG. 3O is a block configuration diagram of TRP in a wireless communication system according to an embodiment of the present disclosure.

Referring to FIG. 3O, the base station is configured to include an RF processor **3*o*-10, a baseband processor 3*o*-20, a communication unit 3*o*-30, a storage 3*o*-40, and a controller 3*o*-50**.

The RF processor **3*o*-10 serves to transmit and receive a signal through a radio channel, such as band conversion and amplification of a signal. For example, the RF processor 3*o*-10 up-converts a baseband signal provided from the baseband processor 3*o*-20 into an RF band signal and then transmits the RF band signal through an antenna and down-converts the RF band signal received through the antenna into the baseband signal. For example, the RF processor 3*o*-10 may include a transmitting filter, a receiving filter, an amplifier, a mixer, an oscillator, a DAC, an ADC, or the like. FIG. 3O illustrates only one antenna but the first access node may include a plurality of antennas. Further, the RF processor 3*o*-10 may include a plurality of RF chains. Further, the RF processor 3*o*-10 may perform the beamforming. For the beamforming, the RF processor 3*o*-10** may adjust a phase and a size of each of the signals transmitted/received through a plurality of antennas or antenna elements. The RF processor may perform a downward MIMO operation by transmitting one or more layers.

The baseband processor **3*o*-20 performs a conversion function between the baseband signal and the bit string according to the physical layer standard of the first radio access technology. For example, when data are transmitted, the baseband processor 3*o*-20 generates complex symbols by coding and modulating a transmitted bit string. Further, when data are received, the baseband processor 3*o*-20 recovers the received bit string by demodulating and decoding the baseband signal provided from the RF processor 3*o*-10. For example, according to the OFDM scheme, when data are transmitted, the baseband processor 3*o*-20 generates the complex symbols by coding and modulating the transmitting bit string, maps the complex symbols to the sub-carriers, and then performs the IFFT operation and the CP insertion to construct the OFDM symbols. Further, when data are received, the baseband processor 3*o*-20 divides the baseband signal provided from the RF processor 3*o*-10** in the OFDM symbol unit and recovers the signals mapped to the sub-carriers by the FFT operation and then recovers the receiving bit string by the modulation and decoding. The baseband processor 3*o*-20 and the RF processor 3*o*-10 transmit and receive a signal as described above. Therefore, the baseband processor 3*o*-20 and the RF processor 3*o*-10 may be called a transmitter, a receiver, a transceiver, or a communication unit.

The communication unit 3*o*-30 provides an interface for performing communication with other nodes within the network.

The storage 3*o*-40 stores data, such as basic programs, application programs, and configuration information for the operation of the main base station. More particularly, the storage 3*o*-40 may store the information on the bearer allocated to the accessed terminal, the measured results reported from the accessed terminal, and the like. Further, the storage 3*o*-40 may store information that is a determination criterion on whether to provide a multiple connection to the terminal or stop the multiple connection to the terminal. Further, the storage 3*o*-40 provides the stored data according to the request of the controller 3*o*-50.

The controller 3*o*-50 includes a multiple connection processor 3*o*-52 and controls the general operations of the main base station. For example, the controller 3*o*-50 transmits/receives a signal through the baseband processor 3*o*-20 and the RF processor 3*o*-10 or the communication unit 3*o*-30. Further, the controller 3*o*-50 records and reads data in and from the storage 3*o*-40. For this purpose, the controller 3*o*-50 may include at least one processor.

Fourth Embodiment

Figure 4A:
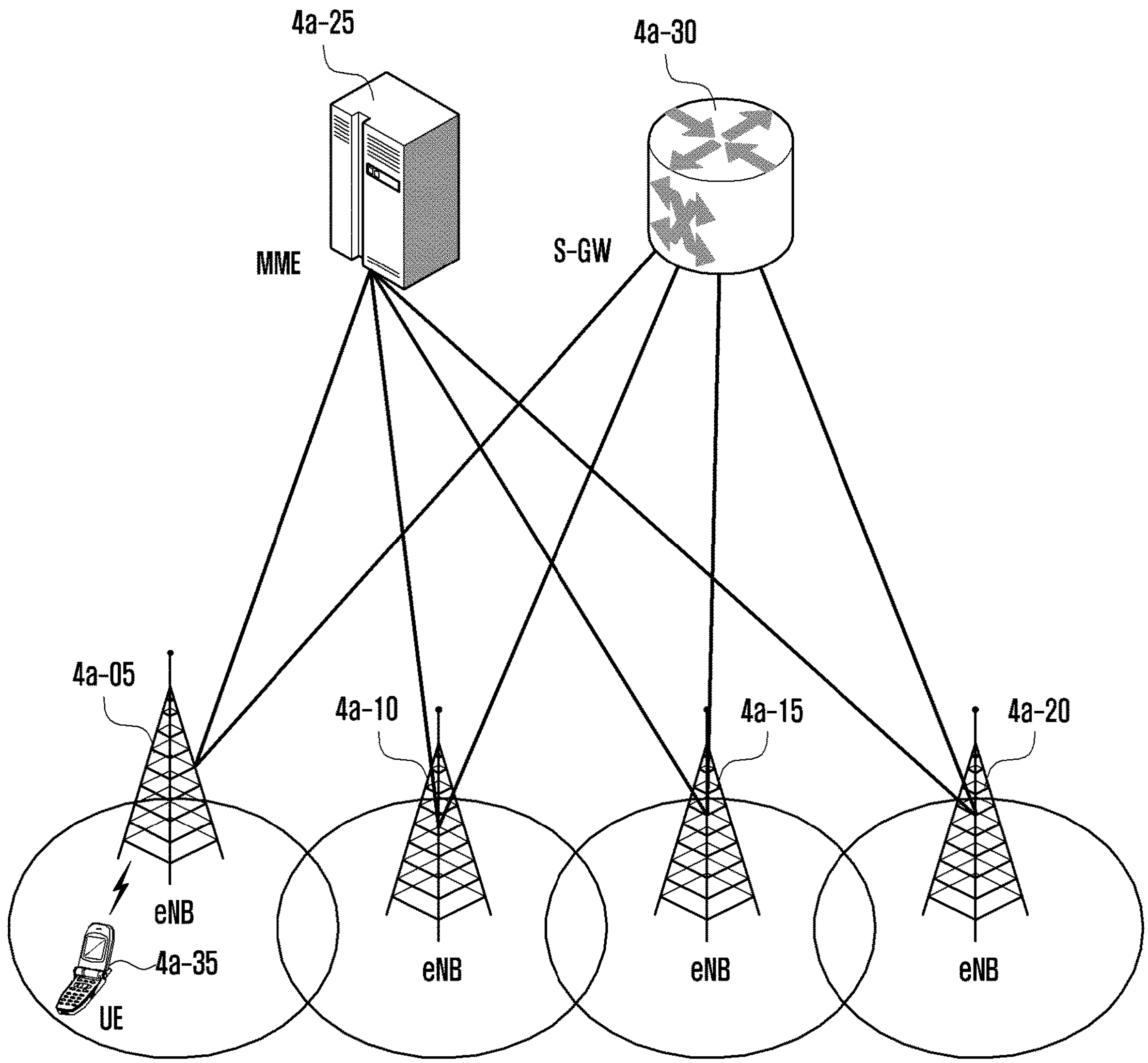
FIG. 4A is a diagram illustrating a structure of an LTE system according to an embodiment of the present disclosure.

FIG. 4A is a diagram illustrating a structure of an LTE system according to an embodiment of the present disclosure.

Referring to FIG. 4A, a radio access network of an LTE system is configured to include next generation base stations (evolved node B, hereinafter, eNB, Node B, or base station) 4*a*-05, 4*a*-10, 4*a*-15, and 4*a*-20, a mobility management entity (MME) 4*a*-25, and a serving-gateway (S-GW) 4*a*-30. User equipment (hereinafter, UE or terminal) 4*a*-35 accesses an external network through the eNBs 4*a*-05 to 4*a*-20 and the S-GW 4*a*-30.

Referring to FIG. 4A, the ENB 4*a*-05 to 4*a*-20 correspond to the existing node B of the UMTS system. The eNB is connected to the UE 4*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmit power status, and a channel state of the terminals is required. Here, the eNBs 4*a*-05 to 4*a*-20 take charge of the collecting and scheduling. One eNB generally controls a plurality of cells. For example, to implement a transmission rate of 100 Mbps, the LTE system uses, as a radio access technology, OFDM, for example, in a bandwidth of 20 MHz. Further, an adaptive modulation & coding (hereinafter, called AMC) determining a modulation scheme and a channel coding rate depending on the channel status of the terminal is applied. The S-GW 4*a*-30 is an apparatus for providing a data bearer and generates or removes the data bearer according to the control of the MME 4*a*-25. The MME is an apparatus for performing a mobility management function for the terminal and various control functions and is connected to a plurality of base stations.

Figure 4B:
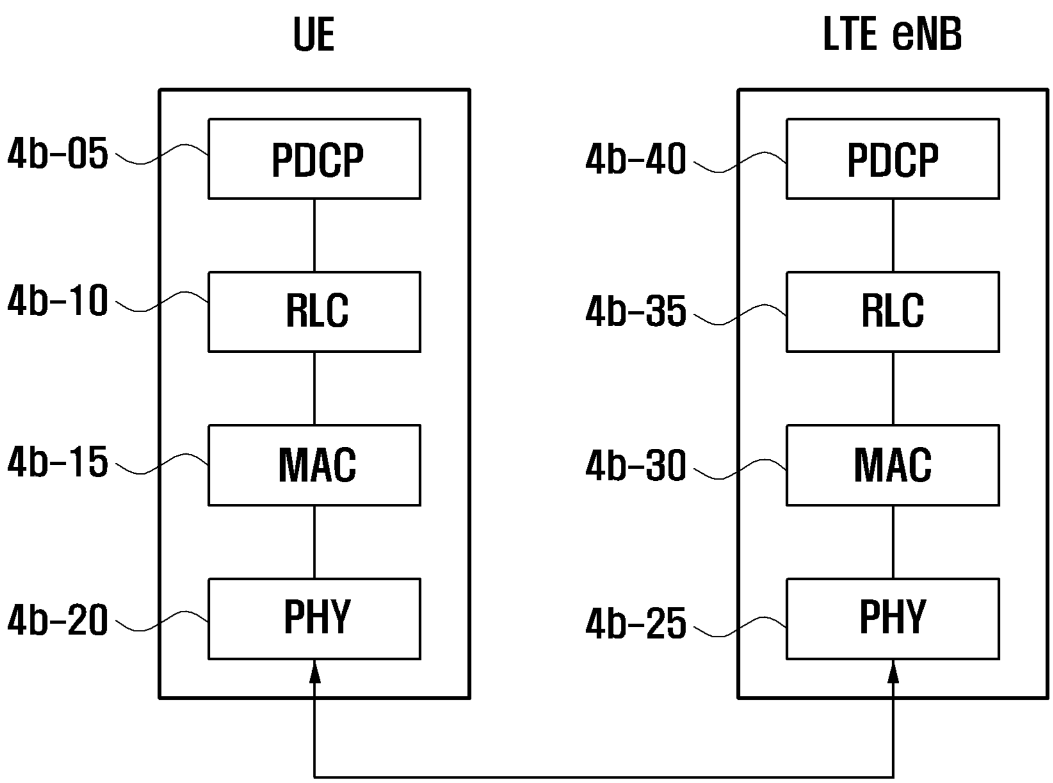
FIG. 4B is a diagram illustrating a radio protocol structure in an LTE system according to an embodiment of the present disclosure.

FIG. 4B is a diagram illustrating a radio protocol structure in an LTE system according to an embodiment of the present disclosure.

Referring to FIG. 4B, the radio protocol of the LTE system is configured to include PDCPs 4*b*-05 and 4*b*-40, RLCs 4*b*-10 and 4*b*-35, and medium access controls (MMCs) 4*b*-15 and 4*b*-30 in the terminal and the eNB, respectively. The PDCPs 4*b*-05 and 4*b*-40 are in charge of operations, such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink.)

The RLCs 4*b*-10 and 4*b*-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 4*b*-15 and 4*b*-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 4b-20 and 4b-25 perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 4C:
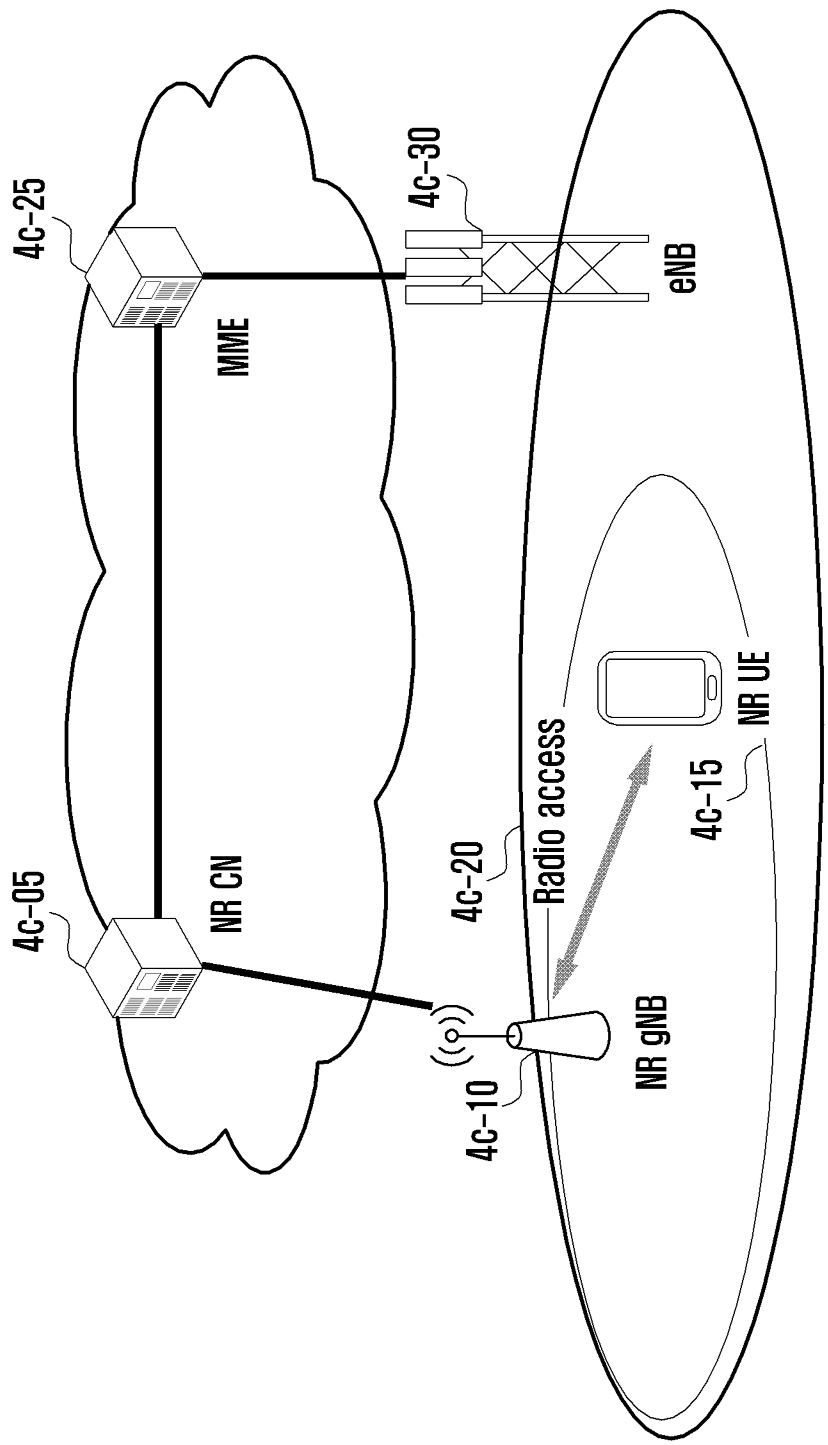
FIG. 4C is a diagram illustrating a structure of a next generation mobile communication system according to an embodiment of the present disclosure.

FIG. 4C is a diagram illustrating a structure of a next generation mobile communication system according to an embodiment of the present disclosure.

Referring to FIG. 4C, a radio access network of a next generation mobile communication system is configured to include a next generation base station (New radio node B, hereinafter NR gNB or NR base station) 4c-10 and a new radio core network (NR CN) 4c-05. The user terminal (new radio user equipment, hereinafter, NR UE or UE) 4c-15 accesses the external network through the NR gNB 4c-10 and the NR CN 4c-05.

Referring to FIG. 4C, the NR gNB 4c-10 corresponds to an evolved node B (eNB) of the existing LTE system. The NR gNB 4c-10 is connected to the NR UE 4c-15 via a radio channel and may provide a service superior to the existing node B. In the next generation mobile communication system, since all user traffics are served through a shared channel, an apparatus for collecting state information, such as a buffer state, an available transmit power state, and a channel state of the UEs to perform scheduling is required. The NR gNB 4c-10 may serve as the device. One NR gNB 4c-10 generally controls a plurality of cells. In order to realize high-speed data transmission compared with the existing LTE, the NR gNB may have an existing maximum bandwidth or more, and may be additionally incorporated into a beam-forming technology may be applied by using OFDM as a radio access technology 4c-20. Further, an adaptive modulation & coding (hereinafter, referred to as AMC) determining a modulation scheme and a channel coding rate according to a channel status of the terminal is applied. The NR CN 4c-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 4c-25 through the network interface. The MME is connected to the eNB 4c-30 which is the existing base station.

Figure 4D:
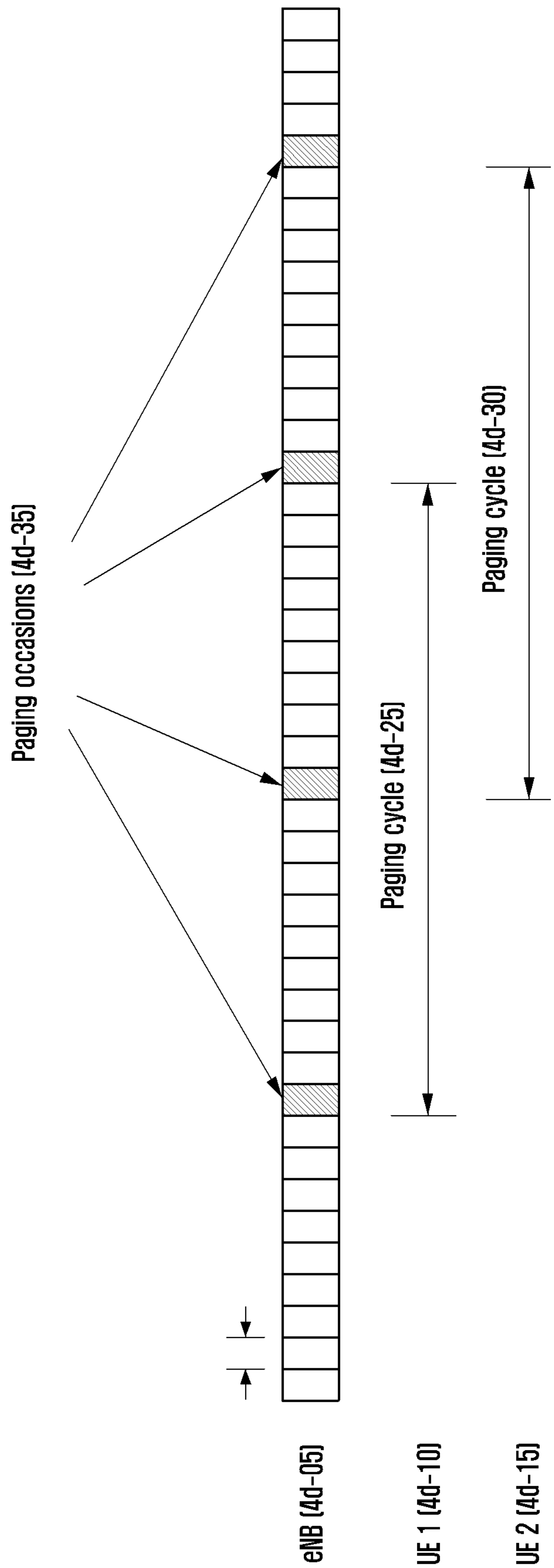
FIG. 4D is a diagram illustrating a DRX operation for an IDLE terminal in an LTE system according to an embodiment of the present disclosure.

FIG. 4D is a diagram illustrating a DRX operation for an IDLE terminal in an LTE system according to an embodiment of the present disclosure.

Referring to FIG. 4D, the terminals 4d-10 and 4d-15 monitor the PDCCH to receive paging from the network 4d-10 when being in the RRC IDLE state. In the LTE, a discontinuous reception (hereinafter, referred to as DRX) interval is set in each subframe 4d-20 unit by a method for efficiently reducing power consumption of a terminal, and the terminal awakes for a predetermined time interval and the receiver sleeps for most of the remaining time. For example, paging cycles 4d-25 and 4d-30, which is a predetermined time interval, is set to receive paging from the network 4d-10. If the terminal detects a P-RNTI used for paging, the terminals 4d-10 and 4d-15 process the corresponding downlink paging message. The paging message includes an ID of the terminal, and terminals not corresponding to the ID discard the received information and sleep according to the DRX cycle. Since the uplink timing is not known for the DRX cycle, HARQ is not used.

The network sets up a subframe 4d-20 in which the terminal should receive paging. For the setting, among a cycle Tue that the terminal requests and a cell-specific period Tc, a minimum value is used. In addition, 32, 64, 128, and 256 frames are set in the paging cycle. A subframe to be monitored for paging in the frame may be extracted from the international mobile subscriber identity (IMSI) of the terminal. Since each terminal has different IMSIs, it operates according to a paging instance belonging to each terminal at the entire paging occasion 4d-35.

The paging message may be transmitted only in some subframes, and shows possible settings in Table 4 below.

TABLE 4

| | | The number of paging subframes | | | | | | | |
|---|---|---|---|---|---|---|---|---|---|
| | | 1/32 | 1/16 | 1/8 | 1/4 | 1/2 | 1 | 2 | 4 |
| Paging sub-frame | FDD | 9 | 9 | 9 | 9 | 9 | 9 | 4, 9 | 0, 4, 5, 9 |
| | TDD | 0 | 0 | 0 | 0 | 0 | 0 | 0, 5 | 0, 1, 5, 6 |

Figure 4E:
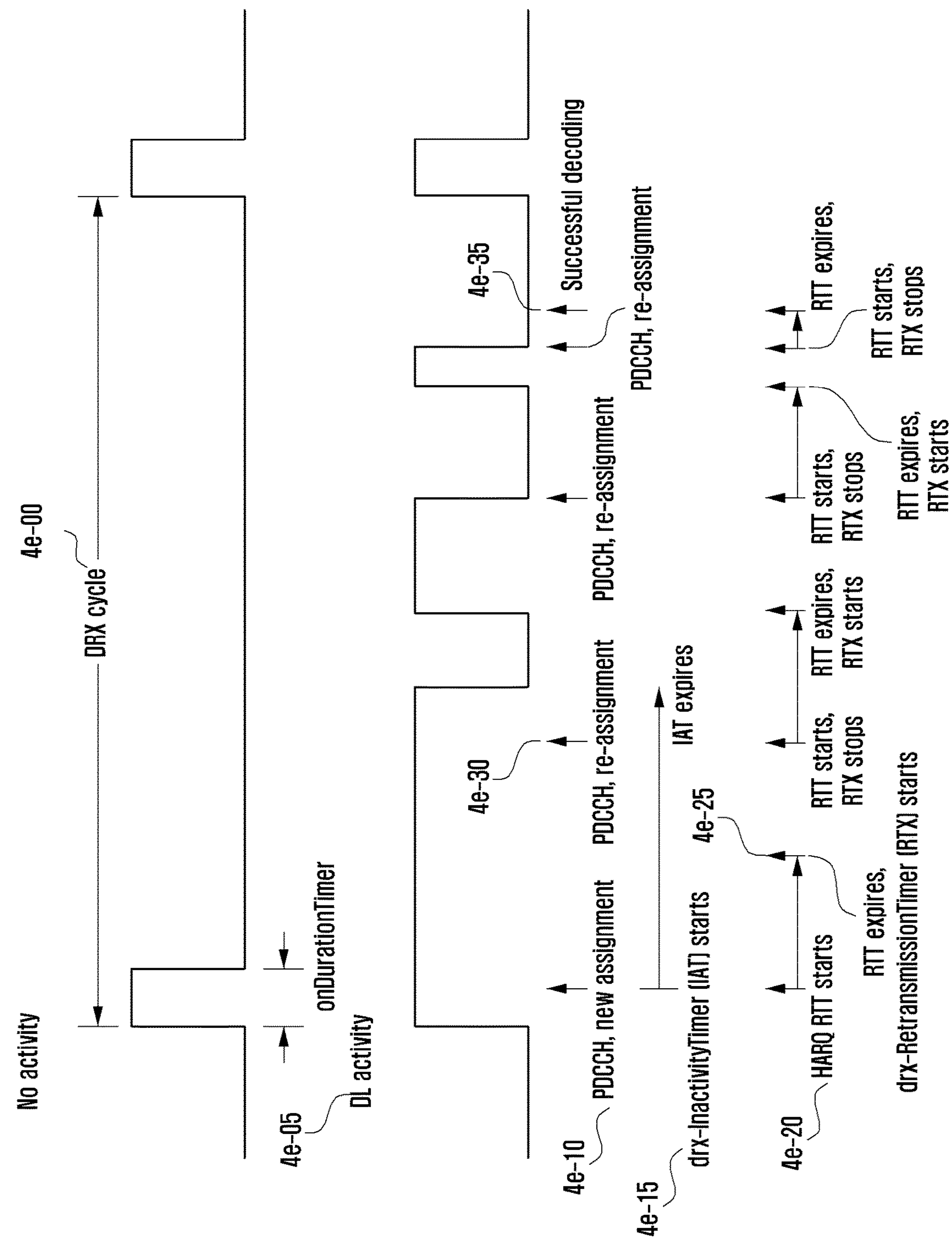
FIG. 4E is a diagram illustrating a DRX operation for a terminal in an RR connection state in an LTE system according to an embodiment of the present disclosure.

FIG. 4E is a diagram illustrating a DRX operation for a terminal in an RR connection state in an LTE system according to an embodiment of the present disclosure.

Referring to FIG. 4E, the DRX is defined even in the RRC connection state, and the operation method is different from the DRX in the IDLE state. As described above, in order for the terminal to acquire the scheduling information, continuously monitoring the PDCCH will cause large power consumption. The basic DRX operation has a DRX cycle 4e-00 and monitors the PDCCH only for an on-duration 4e-05 time. In the connection mode, the DRX cycle has two values, long DRX and short DRX. The long DRX cycle is applied in the general case. If necessary, the base station may use a MAC control element (CE) to trigger the short DRX cycle. After the predetermined time has expired, the terminal is changed from the short DRX cycle to the long DRX cycle. The initial scheduling information of the specific terminal is provided only in the predetermined PDCCH. Therefore, the terminal can periodically monitor only the PDCCH, thereby minimizing the power consumption. If scheduling information for a new packet is received by the PDCCH (4e-10) for the on-duration 4e-05, the terminal starts a DRX inactivity timer 4e-15. The terminal maintains an active state during the DRX inactivity timer. For example, the PDCCH monitoring is continued. In addition, the HARQ RTT timer 4e-20 also starts. The HARQ RTT timer is applied to prevent the terminal from unnecessarily monitoring the PDCCH during HARQ RTT (Round Trip Time), and the terminal does not need to perform the PDCCH monitoring during the timer operation time. However, while the DRX inactivity timer and the HARQ RTT timer are operated simultaneously, the terminal continues to monitor the PDCCH based on the DRX inactivity timer. If the HARQ RTT timer expires, the DRX retransmission timer 4e-25 starts. During the DRX retransmission timer operation, the terminal needs to perform the PDCCH monitoring. Generally, during the DRX retransmission timer operation, the scheduling information for HARQ retransmission is received (4*e*-30). Upon receiving the scheduling information, the terminal immediately stops the DRX retransmission timer and starts the HARQ RTT timer again. The above operation continues until the packet is successfully received (4*e*-35).

The configuration information related to the DRX operation in the connection mode is transmitted to the terminal through the RRCConnectionReconfiguration message. The on-duration timer, the DRX inactivity timer, and the DRX retransmission timer are defined by the number of PDCCH subframes. After the timer starts, if the subframe defined by the PDCCH subframe passes by the set number, the timer expires. In FDD, all downlink subframes belong to the PDCCH subframe, and in TDD, the downlink subframe and the special subframe correspond thereto. In the TDD, a downlink subframe, an uplink subframe, and a special subframe exist in the same frequency band. Among them, the downlink subframe and the special subframe are regarded as the PDCCH subframe.

The base station can set two states, longDRX and short-DRX. The base station will normally use one of the two states based on power preference indication information and terminal mobility recording information reported from the terminal, and set DRB characteristics. The transition between the two states is made by transmitting whether a specific timer expires or not or a specific MAC CE to the terminal.

Figure 4F:
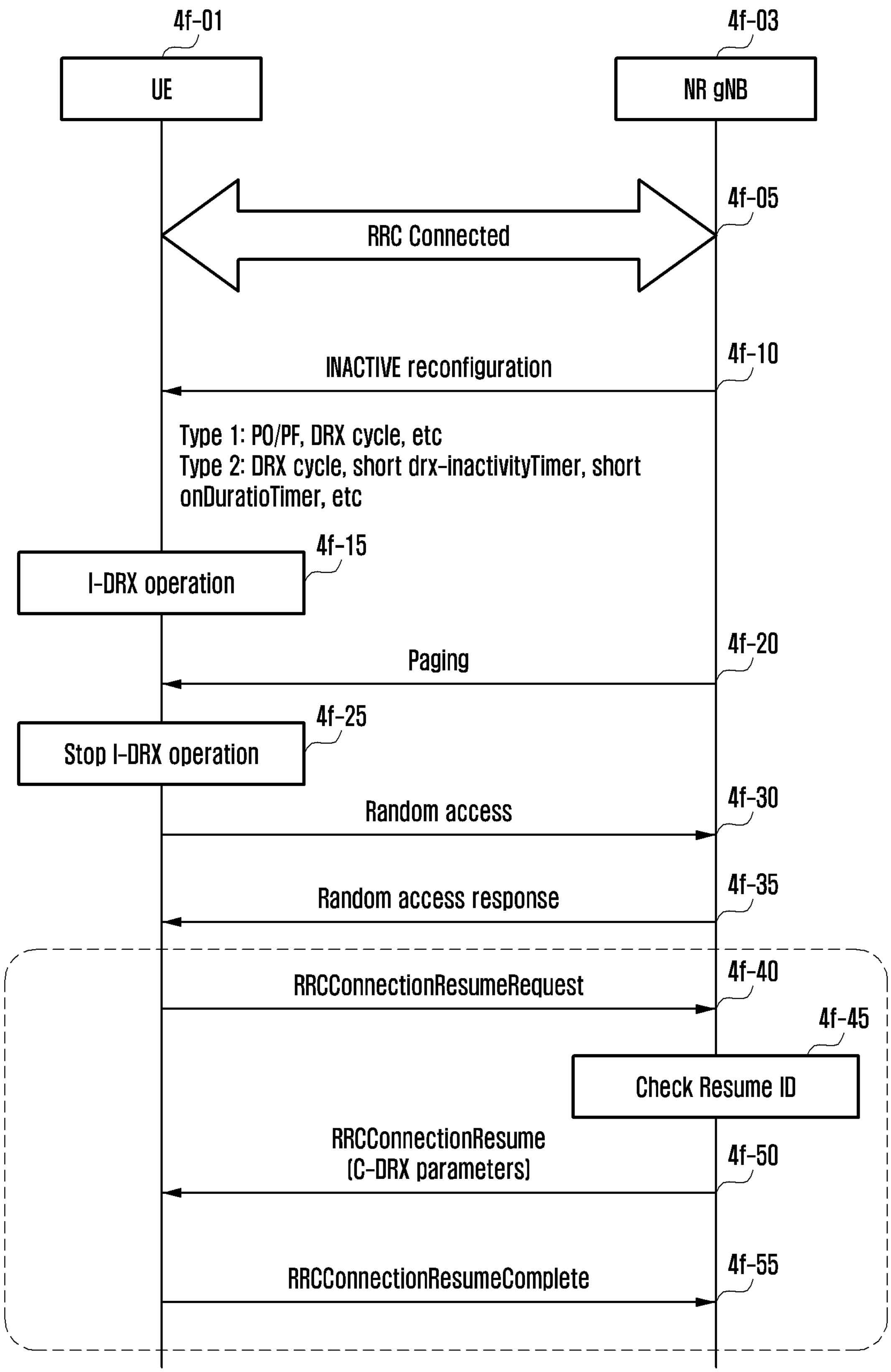
FIG. 4F is a diagram illustrating a DRX operation in an INACTIVE state according to an embodiment of the present disclosure.

FIG. 4F is a diagram illustrating a DRX operation in an INACTIVE state according to an embodiment of the present disclosure.

Referring to FIG. 4F, a terminal 4*f*-01 and a base station 4*f*-03 transmits and receives data in the RRC connected (or RRC ACTIVE) state, in operation 4*f*-05, and then the base station 4*f*-03 may instruct the transition to the inactive state of the terminal 4*f*-01. The transition condition to the INACTIVE state may generate an event, or the like according to the absence of a data packet and a measurement value of a radio link. In addition, in the RRC connected state, the terminal 4*f*-01 may be operated in a connected DRX (C-DRX) according to the setting of the base station 4*f*-03. In operation 4*f*-10, the base station 4*f*-03 instructs the transition from the RRC ACTIVE to the RRC INACTIVE state through an inactive reconfiguration message. The INACTIVE reconfiguration message includes the following information.

INACTIVE STATE information (RESUME ID, RAN Area info, . . . )

INACTIVE state DRX configuration parameter

More particularly, it may include configuration parameters for DRX operation in the RRC INACTIVE state, and two operations will be described in an embodiment of the present disclosure. A first DRX operation in the INACTIVE state is operated similar to the DRX operation in the RRC IDLE state in the existing LTE. To this end, the INACTIVE reconfiguration message requires signaling to enable calculation of a paging frame (PF) and a paging occasion (PO) for each terminal. To this end, it is possible to reuse a value (PCCH-config) set in the SIB2 or directly reconfigure the related parameters (paging cycle, the number nB of paging subframes per paging cycle). A second DRX operation in the INACTIVE state is operated similar to the connected DRX operation in the existing LTE. The connected DRX operation has a plurality of DRX cycles (long DRX cycle, short DRX cycle), and a number of DRX timers (onDuration timer, inactivityTimer, and the like) are defined. In addition, the timer may be flexibly set for each DRX cycle. However, in the INACTIVE state, the flexible setting from the base station 4*f*-03 is restrictive differently from the RRC connected state, and therefore there is a need to introduce the restrictive method. For example, one DRX cycle is set for the second DRX operation in the INACTIVE state (e.g., set only a long DRX cycle) and the short inactivity timer, the on-duration timer, or the like may be set as a predetermined value. For the case where the data transmission and reception is possible in the DRX operation in the INACTIVE state, the HARQ RTT timer, the DRX retransmission timer, or the like may also be set.

The terminal 4*f*-01 performs DRX (I-DRX) in the INACTIVE state according to the method established from the base station 4*f*-03 in operation 4*f*-15. If the terminal 4*f*-01 receives a paging signal from the base station 4*f*-03 in operation 4*f*-20), the terminal 4*f*-01 stops the I-DRX operation in operation 4*f*-25.

The terminal 4*f*-01 attempts a random access to the corresponding cell in operation 4*f*-30. The random access is to fit an uplink synchronization simultaneously with notifying a target cell that the terminal attempts a connection. After the preamble transmission in the random access process, a certain number of subframes have passed, and then the terminal 4*f*-01 monitors whether or not a random access response message (RAR) is transmitted from the cell. If the RAR is received for the specific time in operation 4*f*-35, the terminal 4*f*-01 transmits Resume ID and Resume cause by carrying the Resume ID and the Resume cause on RRCConnectionResumeRequest message in operation 4*f*-40. In operation 4*f*-45, the cell may confirm the Resume ID of the received message to know from which base station the corresponding terminal receives a service before. If the base station 4*f*-03 successfully receives and confirms the Resume ID, the UE context may be reused. (If the base station receives the Resume ID but does not successfully identify the terminal, instead of the operations 4*f*-40 to 4*f*-55, an RRCConnectionSetup message may be delivered to the terminal instead of in operations 4*f*-40 to 4*f*-55 and the operation may return to the existing legacy RRC connection establishment procedure.) The base station 4*f*-03 applies the security information of the UE context and confirms the integrity of the message using the MAC-I, the security key and the security counter stored in the context of the UE, or the like. The base station 4*f*-03 determines the configuration to be applied to the RRC connection of the terminal 4*f*-01 and transmits an RRConnectionResume message storing the configuration information to the terminal 4*f*-01 in operation 4*f*-50. The message may include C-DRX configuration information for the DRX operation in the connected state. The terminal configures the RRC connection by applying the updated UE context and the configuration information, and transmits the RRC connection resumption completion message to the base station 4*f*-03 and performs the connection in operation 4*f*-55.

Figure 4G:
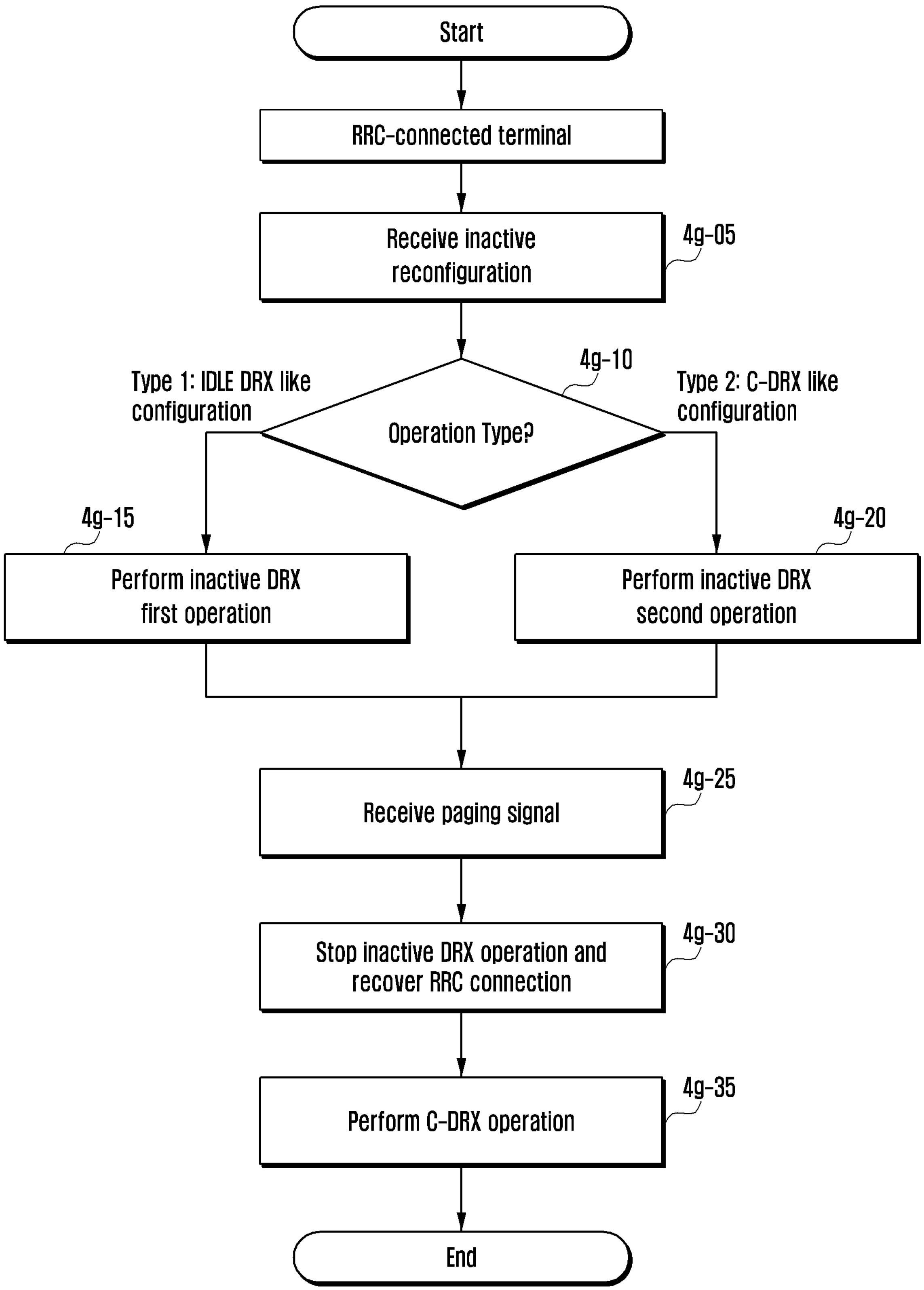
FIG. 4G is a diagram illustrating an operation of a terminal for performing a DRX in an INACTIVE state according to an embodiment of the present disclosure.

FIG. 4G is a diagram illustrating an operation of a terminal for performing a DRX in an INACTIVE state according to an embodiment of the present disclosure.

Referring to FIG. 4F, it is assumed that the terminal is already connected to the base station/cell in the connection mode and is transmitting/receiving data from the beam of the corresponding cell. As described above, the terminal in the connection mode may request the base station to transition to the INACTIVE state for a specific situation, and may be instructed to the transition to the INACTIVE state according to the determination of the base station in operation 4*g*-05. The example of the first case may include the case where the terminal may measure the quality of the radio link with the base station/cell and report a specific event, and in the second case, the base station may determine the case in which there is no the transmission/reception data packet with the terminal for a while. The INACTIVE reconfiguration message includes the following information.

INACTIVE STATE information (RESUME ID, RAN Area info, . . . )

INACTIVE state DRX configuration parameter

More particularly, it may include configuration parameters for the DRX operation in the RRC INACTIVE state, and may be divided into a first operation and a second operation according to an operation type and a parameter type set by the base station in operation 4g-10. The base station and the terminal may support only a predetermined operation, and may support both operations. The first DRX operation in operation 4g-15 in the INACTIVE state is operated similar to the DRX operation in the RRC IDLE state in the existing LTE. The terminal calculates a paging frame (PF) and a paging occasion (PO) for each terminal based on the DRX parameters received from the base station. The parameter may be PCCH-Config information transmitted in SIB2 or a value indicating the PCCH-Config information. The second DRX operation in operation 4g-20 in the INACTIVE state is operated similar to the connected DRX operation in the existing LTE. The terminal sets the DRX cycle received from the base station (set only one long DRX cycle) and sets the short inactivity timer, the on-duration timer or the like. The above parameters may be set to be predetermined fixed value unlike the C-DRX in LTE. For the case where the data transmission and reception is possible in the DRX operation in the INACTIVE state, the HARQ RTT timer, the DRX retransmission timer, or the like may also be set. Thereafter, the terminal performs the INACTIVE DRX operation until receiving the paging information from the base station. If the paging information is received in operation 4g-25 from the base station during the INACTIVE DRX operation, the terminal stops the INACTIVE DRX operation and performs the RRC connection recovery in operation 4g-30. The Resume procedure or the RRC connection reconfiguration procedure may be used to recover the RRC connection. The base station may include the parameters for the DRX (C-DRX) operation in the connection mode in the connection recovery permission message, and the terminal performs the C-DRX operation based on the received setting value in operation 4g-35.

Figure 4H:
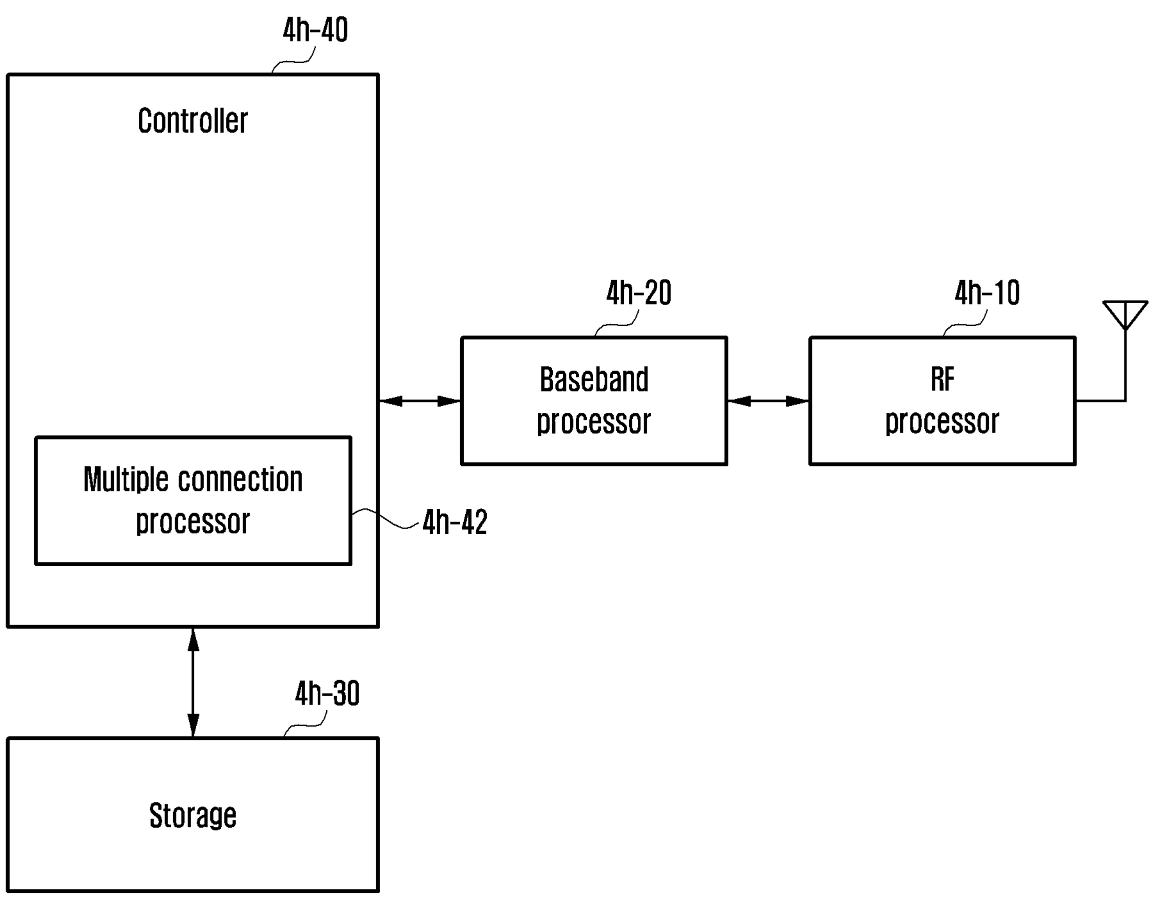
FIG. 4H is a block diagram illustrating an internal structure of a terminal according to an embodiment of the present disclosure.

FIG. 4H is a block diagram illustrating an internal structure of a terminal according to an embodiment of the present disclosure.

Referring to FIG. 4H, the terminal includes a radio frequency (RF) processor 4h-10, a baseband processor 4h-20, a storage 4h-30, and a controller 4h-40.

The RF processor 4h-10 serves to transmit and receive a signal through a radio channel, such as band conversion and amplification of a signal. For example, the RF processor 4h-10 up-converts a baseband signal provided from the baseband processor 4h-20 into an RF band signal and then transmits the RF band signal through an antenna and down-converts the RF band signal received through the antenna into the baseband signal. For example, the RF processor 4h-10 may include a transmitting filter, a receiving filter, an amplifier, a mixer, an oscillator, a digital to analog converter (DAC), an analog to digital converter (ADC), or the like. FIG. 4H illustrates only one antenna but the terminal may include a plurality of antennas. Further, the RF processor 4h-10 may include a plurality of RF chains. Further, the RF processor 4h-10 may perform beamforming. For the beamforming, the RF processor 4h-10 may adjust a phase and a size of each of the signals transmitted and received through a plurality of antennas or antenna elements. In addition, the RF processor may perform MIMO and may receive a plurality of layers when performing a MIMO operation.

The baseband processor 4h-20 performs a conversion function between a baseband signal and a bit string according to a physical layer standard of a system. For example, when data are transmitted, the baseband processor 4h-20 generates complex symbols by coding and modulating a transmitted bit string. Further, when data are received, the baseband processor 4h-20 recovers the received bit string by demodulating and decoding the baseband signal provided from the RF processor 4h-10. For example, according to the OFDM scheme, when data are transmitted, the baseband processor 4h-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 4h-20 divides the baseband signal provided from the RF processor 4h-10 in an OFDM symbol unit and recovers the signals mapped to the sub-carriers by a fast Fourier transform (FFT) operation and then recovers the received bit string by the modulation and decoding.

The baseband processor 1k-20 and the RF processor 1k-10 transmit and receive a signal as described above. Therefore, the baseband processor 4h-20 and the RF processor 4h-10 may be called a transmitter, a receiver, a transceiver, or a communication unit. Further, at least one of the baseband processor 4h-20 and the RF processor 4h-10 may include a plurality of communication modules to support a plurality of different radio access technologies. Further, at least one of the baseband processor 4h-20 and the RF processor 4h-10 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2 NRHz) band, a millimeter wave (for example: 60 GHz) band.

The storage 4h-30 stores data, such as basic programs, application programs, and configuration information for the operation of the terminal. More particularly, the storage 4h-30 may store information associated with a second access node performing wireless communication using a second access technology. Further, the storage 4h-30 provides the stored data according to the request of the controller 4h-40.

The controller 4h-40 includes a multiple connection processor 4h-42 and controls the overall operations of the terminal. For example, the controller 4h-40 transmits and receives a signal through the baseband processor 4h-20 and the RF processor 4h-10. Further, the controller 4h-40 records and reads data in and from the storage 4h-40. For this purpose, the controller 4h-40 may include at least one processor. For example, the controller 4h-40 may include a communication processor (CP) performing a control for communication and an application processor (AP) controlling an upper layer, such as the application programs.

Figure 4I:
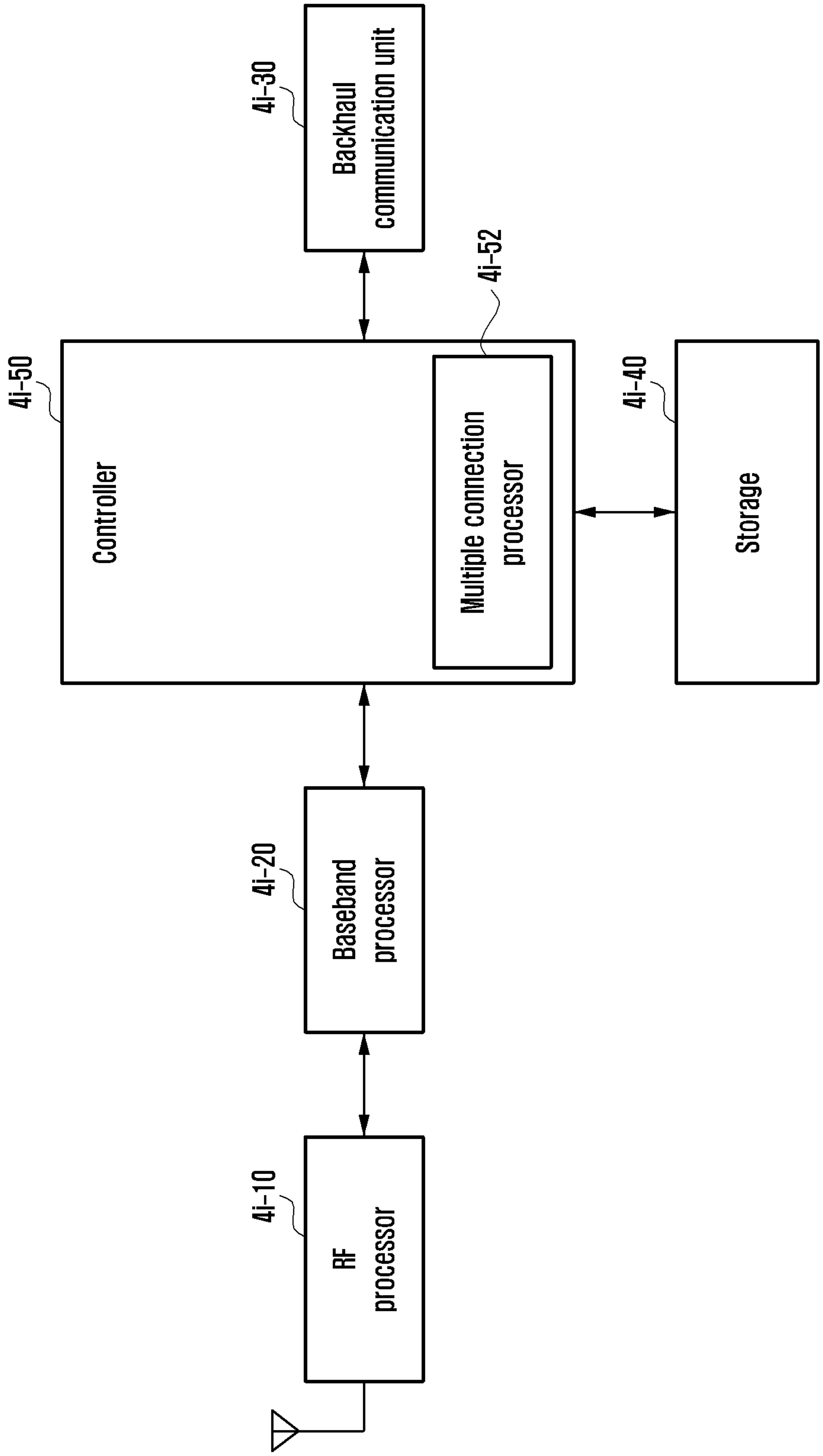
FIG. 4I is a block diagram illustrating a configuration of an NR base station according to an embodiment of the present disclosure.

FIG. 4I is a block diagram illustrating a configuration of an NR base station according to according to an embodiment of the present disclosure.

Referring to FIG. 4I, the base station is configured to include an RF processor 4i-10, a baseband processor 4i-20, a backhaul communication unit 4i-30, a storage 4i-40, and a controller 4i-50.

The RF processor **4*i*-10 serves to transmit and receive a signal through a radio channel, such as band conversion and amplification of a signal. For example, the RF processor 4*i*-10 up-converts a baseband signal provided from the baseband processor 4*i*-20 into an RF band signal and then transmits the RF band signal through an antenna and down-converts the RF band signal received through the antenna into the baseband signal. For example, the RF processor 4*i*-10 may include a transmitting filter, a receiving filter, an amplifier, a mixer, an oscillator, a DAC, an ADC, or the like. FIG. 4I illustrates only one antenna but the first access node may include a plurality of antennas. Further, the RF processor 4*i*-10 may include a plurality of RF chains. Further, the RF processor 4*i*-10 may perform the beamforming. For the beamforming, the RF processor 4*i*-10** may adjust a phase and a size of each of the signals transmitted/received through a plurality of antennas or antenna elements. The RF processor may perform a downward MIMO operation by transmitting one or more layers.

The baseband processor **4*i*-20 performs a conversion function between the baseband signal and the bit string according to the physical layer standard of the first radio access technology. For example, when data are transmitted, the baseband processor 4*i*-20 generates complex symbols by coding and modulating a transmitted bit string. Further, when data are received, the baseband processor 4*i*-20 recovers the received bit string by demodulating and decoding the baseband signal provided from the RF processor 4*i*-10. For example, according to the OFDM scheme, when data are transmitted, the baseband processor 4*i*-20 generates the complex symbols by coding and modulating the transmitting bit string, maps the complex symbols to the sub-carriers, and then performs the IFFT operation and the CP insertion to configure the OFDM symbols. Further, when data are received, the baseband processor 4*i*-20 divides the baseband signal provided from the RF processor 4*i*-10 in the OFDM symbol unit and recovers the signals mapped to the sub-carriers by the FFT operation and then recovers the receiving bit string by the modulation and decoding. The baseband processor 4*i*-20 and the RF processor 4*i*-10 transmit and receive a signal as described above. Therefore, the baseband processor 4*i*-20 and the RF processor 4*i*-10** may be called a transmitter, a receiver, a transceiver, or a communication unit.

The backhaul communication unit **4*i*-30 provides an interface for performing communication with other nodes within the network. For example, the backhaul communication unit 4*i*-30** converts bit strings transmitted from the main base station to other nodes, for example, an auxiliary base station, a core network, and the like, into physical signals and converts the physical signals received from other nodes into the bit strings.

The storage **4*i*-40 stores data, such as basic programs, application programs, and configuration information for the operation of the main base station. More particularly, the storage 4*i*-40 may store the information on the bearer allocated to the accessed terminal, the measured results reported from the accessed terminal, and the like. Further, the storage 4*i*-40 may store information that is a determination criterion on whether to provide a multiple connection to the terminal or stop the multiple connection to the terminal. Further, the storage 4*i*-40 provides the stored data according to the request of the controller 4*i*-50**.

The controller **4*i*-50 includes a multiple connection processor 4*i*-52 and controls the general operations of the main base station. For example, the controller 4*i*-50 transmits/receives a signal through the baseband processor 4*i*-20 and the RF processor 4*i*-10 or the backhaul communication unit 4*i*-30. Further, the controller 4*i*-50 records and reads data in and from the storage 4*i*-40. For this purpose, the controller 4*i*-50** may include at least one processor.

The present disclosure has the right of the following claims.

Method for performing, by a terminal, discontinuous reception in an inactive state.

1. An operation of receiving an inactive reconfiguration when the terminal is transited from an RRC ACTIVE state to an RRC INACTIVE state Method for including parameters required to perform a first DRX operation in the INACTIVE state in the message;

Method for including parameters required to perform a second DRX operation in the INACTIVE state in the message;

Method by which the first operation calculates PO/PF for each terminal similar to a DRX operation in an IDLE state and monitors PDCCH;

Method by which the second operation is similar to the DRX operation in the RRC ACTIVE state but uses limited parameters;

Method by which the parameter includes a predetermined one DRX cycle, short drx-inactivityTimer, short onDurationTimer, or the like.

2. Method for performing, by a terminal, an INACTIVE DRX operation based on a set value received from a base station 3. Method for stopping the INACTIVE DRX operation and performing transition to the ACTIVE state if the terminal receives paging.

4. Method for performing, by a terminal, a RESUME procedure and resuming an ACTIVE DRX operation;

Method for performing, by the above procedure, a random access and transmitting a resume request;

Method for including Resume ID and Resume cause in the Resume request;

Method for receiving a Resume permission message from a base station;

Method for including parameters for an ACTIVE DRX operation in the message;

Method for transmitting a Resume complete message to the base station;

Fifth Embodiment

Figure 5A:
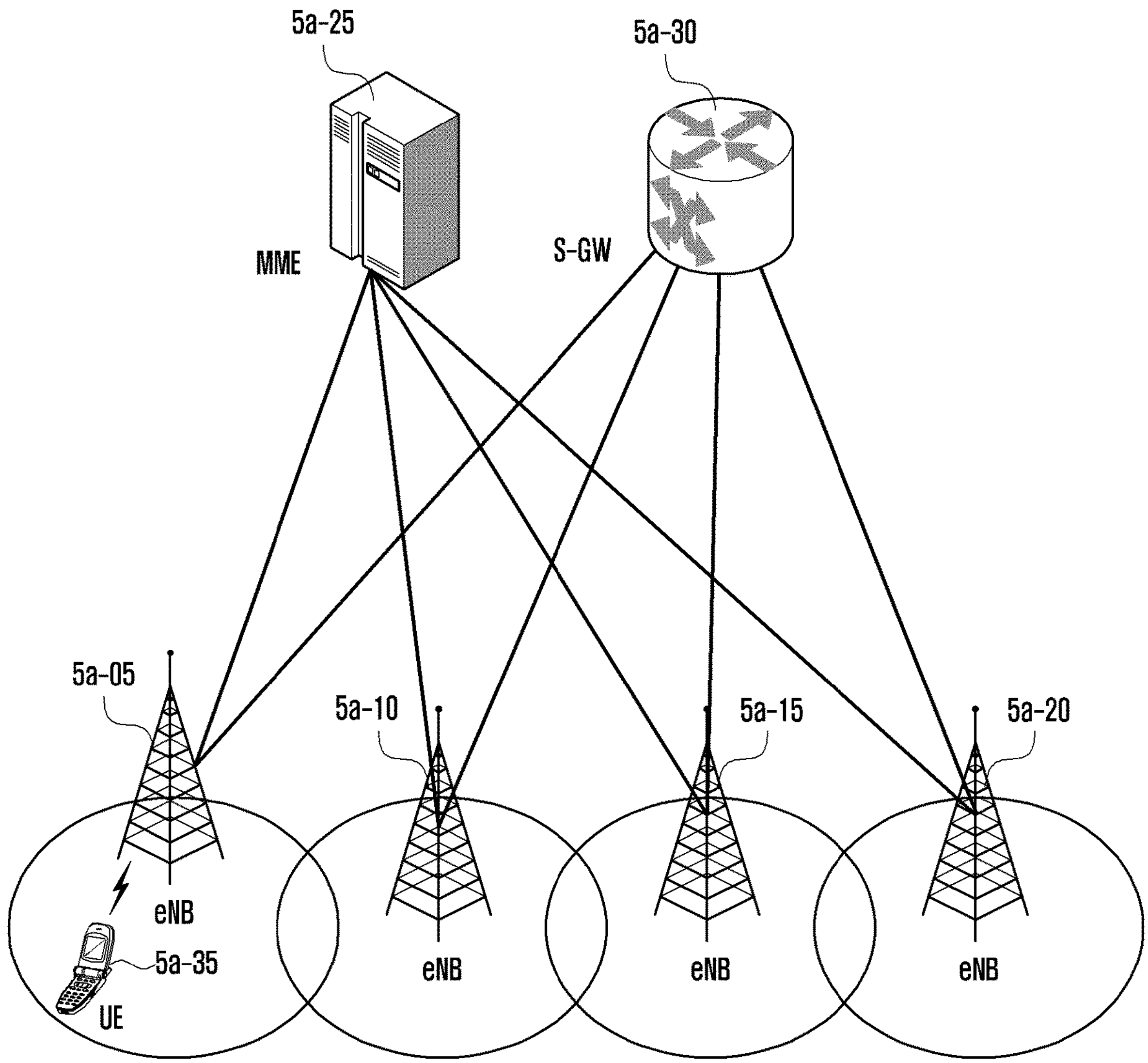
FIG. 5A is a diagram illustrating a structure of an LTE system according to an embodiment of the present disclosure.

FIG. 5A is a diagram illustrating a structure of an LTE system according to an embodiment of the present disclosure.

Referring to FIG. 5A, a radio access network of an LTE system is configured to include next generation base stations (evolved node B, hereinafter, eNB, Node B, or base station) **5*a*-05, 5*a*-10, 5*a*-15, and 5*a*-20, a mobility management entity (MME) 5*a*-25, and a serving-gateway (S-GW) 5*a*-30. A user equipment (hereinafter, UE or terminal) 5*a*-35 accesses an external network through the eNBs 5*a*-05 to 5*a*-20 and the S-GW 5*a*-30**.

Referring to FIG. 5A, the ENB **5*a*-05 to 5*a*-20 correspond to the existing node B of the UMTS system. The eNB is connected to the UE 5*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmit power status, and a channel state of the terminals is required. Here, the eNBs 5a-05 to 5a-20 take charge of the collecting and scheduling. One eNB generally controls a plurality of cells. For example, to implement a transmission rate of 100 Mbps, the LTE system uses, as a radio access technology, OFDM, for example, in a bandwidth of 20 MHz. Further, an adaptive modulation & coding (hereinafter, called AMC) determining a modulation scheme and a channel coding rate depending on the channel status of the terminal is applied. The S-GW 5a-30 is an apparatus for providing a data bearer and generates or removes the data bearer according to the control of the MME 5a-25**. The MME is an apparatus for performing a mobility management function for the terminal and various control functions and is connected to a plurality of base stations.

Figure 5B:
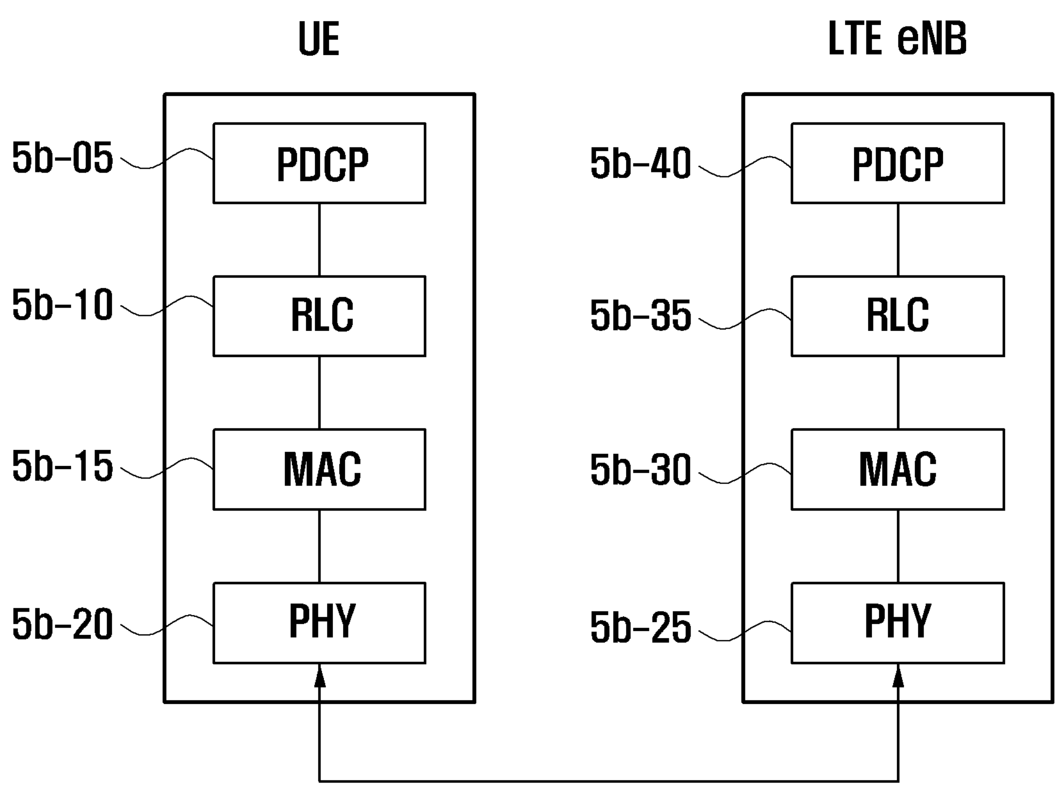
FIG. 5B is a diagram illustrating a radio protocol structure in an LTE system according to an embodiment of the present disclosure.

FIG. 5B is a diagram illustrating a radio protocol structure in an LTE system according to an embodiment of the present disclosure.

Referring to FIG. 5B, the radio protocol of the LTE system is configured to include PDCPs 5b-05 and 5b-40, RLCs 5b-10 and 5b-35, and medium access controls (MMCs) 5b-15 and 5b-30 in the terminal and the eNB, respectively. The PDCPs 5b-05 and 5b-40 are in charge of operations, such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 5b-10 and 5b-35 reconfigures the PDCP PDU to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 5b-15 and 5b-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between Logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 5b-20 and 5b-25 perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 5C:
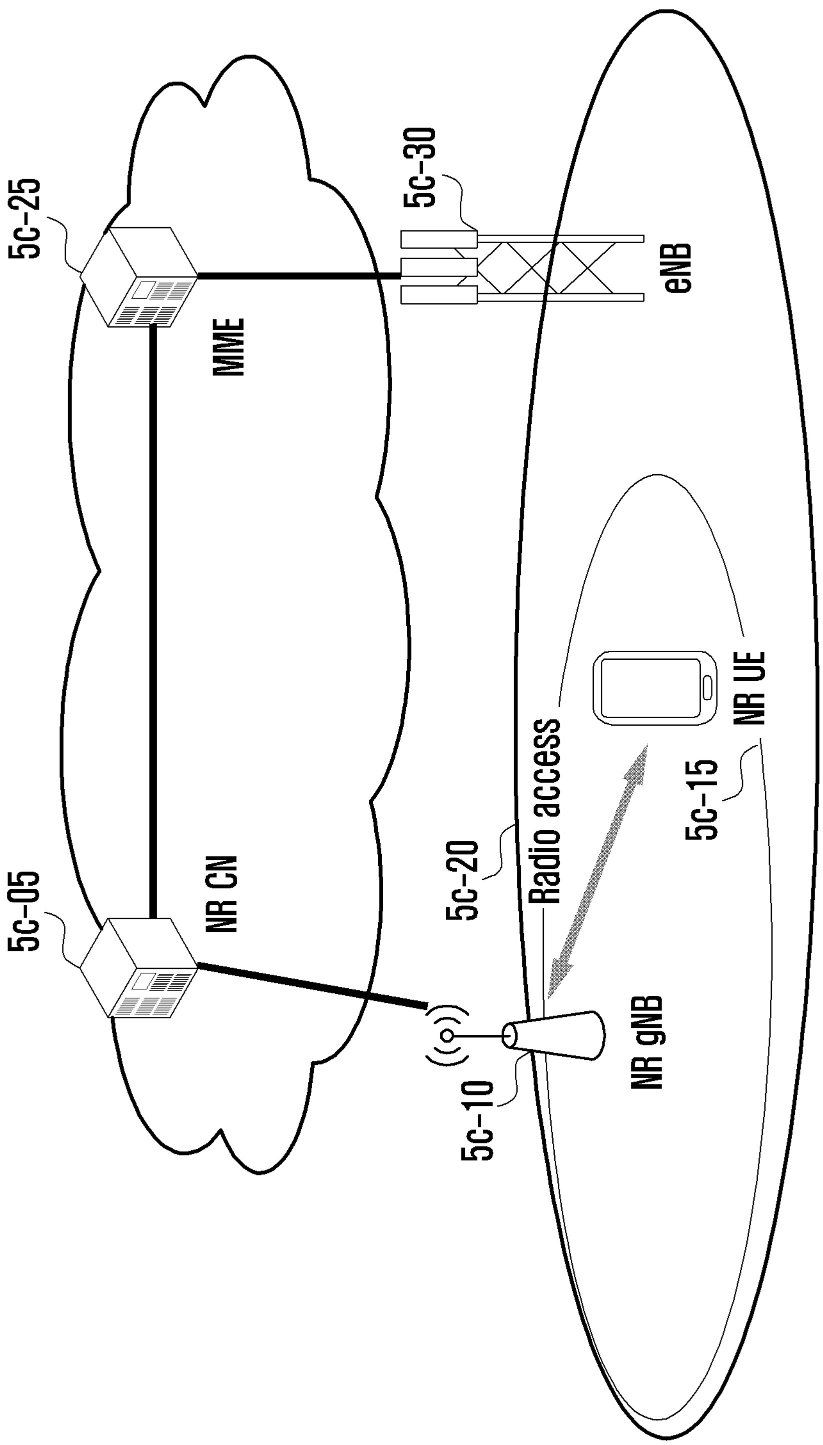
FIG. 5C is a diagram illustrating a structure of a next generation mobile communication system according to an embodiment of the present disclosure.

FIG. 5C is a diagram illustrating a structure of a next generation mobile communication system according to an embodiment of the present disclosure.

Referring to FIG. 5C, a radio access network of a next generation mobile communication system is configured to include a next generation base station (New radio node B, hereinafter NR gNB or NR base station) 5c-10 and a new radio core network (NR CN) 5c-05. The user terminal (new radio user equipment, hereinafter, NR UE or UE) 5c-15 accesses the external network through the NR gNB 5c-10 and the NR CN 5c-05.

Referring to FIG. 5C, the NR gNB 5c-10 corresponds to an evolved node B (eNB) of the existing LTE system. The NR gNB 5c-10 is connected to the NR UE 5c-15 via a radio channel and may provide a service superior to the existing node B. In the next generation mobile communication system, since all user traffics are served through a shared channel, an apparatus for collecting state information, such as a buffer state, an available transmit power state, and a channel state of the UEs to perform scheduling is required. The NR gNB 5c-10 may serve as the device. One NR gNB 5c-10 generally controls a plurality of cells. In order to realize high-speed data transmission compared with the existing LTE, the NR gNB may have an existing maximum bandwidth or more, and may be additionally incorporated into a beam-forming technology may be applied by using OFDM as a radio access technology 5c-20. Further, an adaptive modulation & coding (hereinafter, called AMC) determining a modulation scheme and a channel coding rate depending on a channel status of the terminal is applied. The NR CN 5c-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 5*c*-25 through the network interface. The MME is connected to the eNB 5*c*-30 which is the existing base station.

Figure 5D:
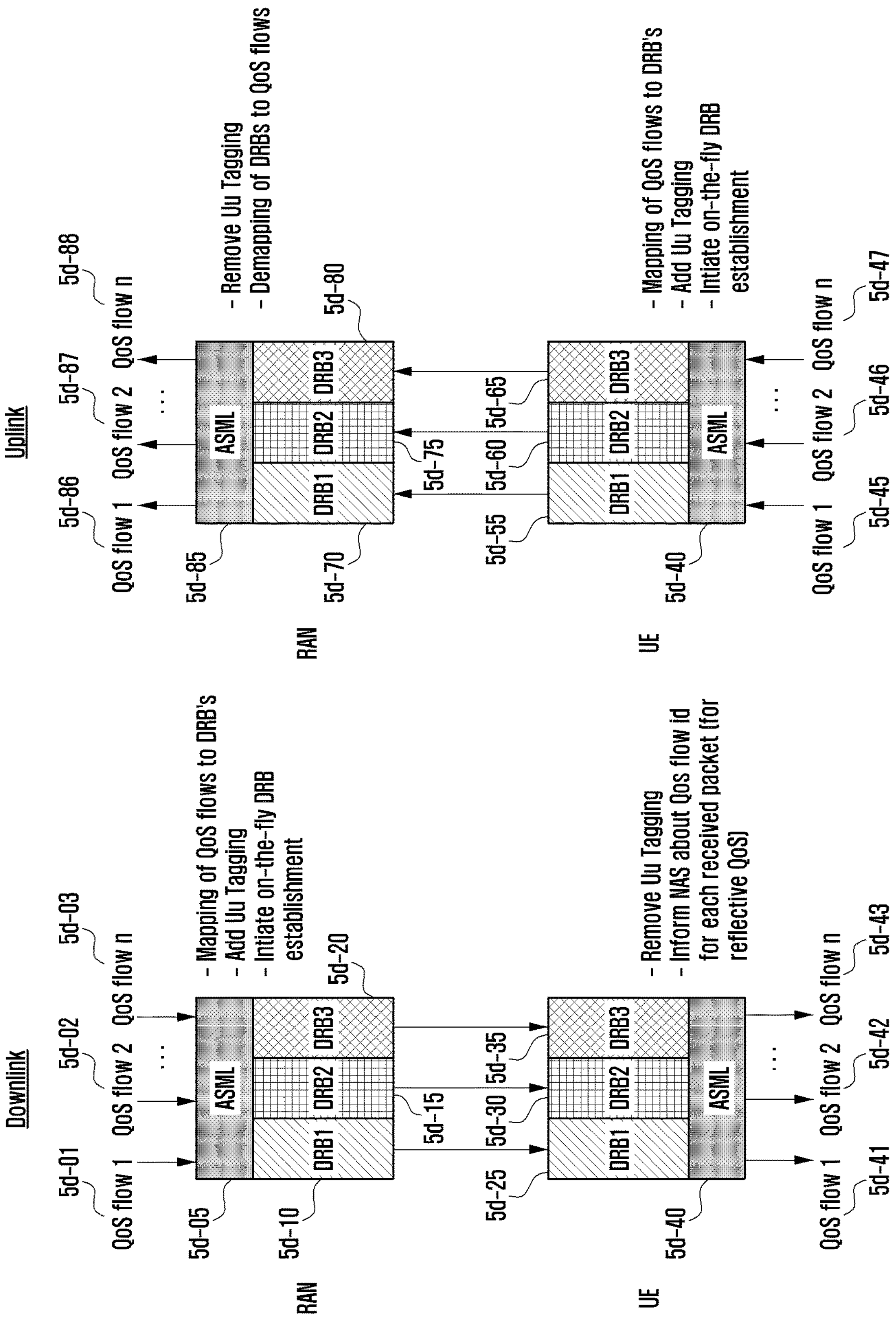
FIG. 5D is a diagram illustrating new functions handling quality of service (QoS) in an NR system according to an embodiment of the present disclosure.

FIG. 5D is a diagram illustrating new functions handling QoS in an NR system according to an embodiment of the present disclosure.

Referring to FIG. 5D, in the NR system, it is necessary to set a user traffic transmission path or control an IP flow for each service according to services requesting different quality of service (QoS), that is, according to QoS requirement. In the NR system, a plurality of QoS flows are mapped to a plurality of data radio bearers (DRBs) and may set the bearers simultaneously. For example, since a plurality of QoS flows **5*d*-01, 5*d*-02, and 5*d*-03 may be mapped to the same DRB or other DRBs 5*d*-10, 5*d*-15, and 5*d*-20 for the downlink, it is necessary to mark the QoS flow ID in the downlink packet to differentiate them. The above function is a function that does not exist in the existing LTE PDCP protocol and therefore a new protocol (AS Multiplexing Layer, hereinafter, ASML) 5*d*-05, 5*d*-40, 5*d*-50, and 5*d*-85** that is in charge of the function is introduced or a new function needs to be added to the PDCP. The above-mentioned ASML protocol may be referred to as a service data adaptation protocol (SDAP) layer protocol. In addition, the marking permits the terminal to implement the reflective QoS for the uplink. As described above, explicitly marking the QoS flow ID for the downlink packet is a simple method by which an access stratum (AS) of a terminal provides the information to the NAS of the terminal. A method for mapping IP flows to DRBs in a downlink may include the following two operations.

AS level mapping: IP flow→QoS flow

AS level mapping: QoS flow→DRB

It is possible to understand the QoS flow mapping information and presence/absence of the reflective QoS operation for each of the received DRBs **5*d*-25, 5*d*-30 in the downlink reception, and 5*d*-35 and to transmit the corresponding information to the NAS, wherein QoS flow 1 is 5*d*-41, QoS flow 2 is 5*d*-42, and QoS flow 3 is 5*d*-43**.

Similarly, the two-stage mapping may be used even for the uplink. First, the IP flows are mapped to the QoS flows through NAS signaling. For example, since a plurality of QoS flows **5*d*-86, 5*d*-87, and 5*d*-88 may be mapped to the same DRB or other DRBs 5*d*-70, 5*d*-75, and 5*d*-80 for the uplink, it is necessary to mark the QoS flow ID in the uplink packet to differentiate them. The QoS flows are then mapped to predetermined DRBs 5*d*-55, 5*d*-60, and 5*d*-65** in the AS. The terminal may mark the QoS flow ID for the uplink packet or may not mark the QoS flow ID for the uplink packet, and transmit the packet as it is. The function is performed in the ASML of the terminal. If the QoS flow ID is marked for the uplink packet, the base station may display the QoS flow ID for the packet delivering the information to the NG-U without the uplink traffic flow template (TFT) and deliver the QoS flow ID.

The present disclosure describes a method for supporting new functions handling QoS in an NR system and a method for designing ASML **5*d*-05, 5*d*-40, 5*d*-50, and 5*d*-85 for supporting the same. The above ASML 5*d*-05, 5*d*-40, 5*d*-50, and 5*d*-85 is not a DRB-based protocol and QoS flow 1 is 5*d*-45, QoS flow 2 is 5*d*-46, and QoS flow 3 is 5*d*-47**.

Figure 5E:
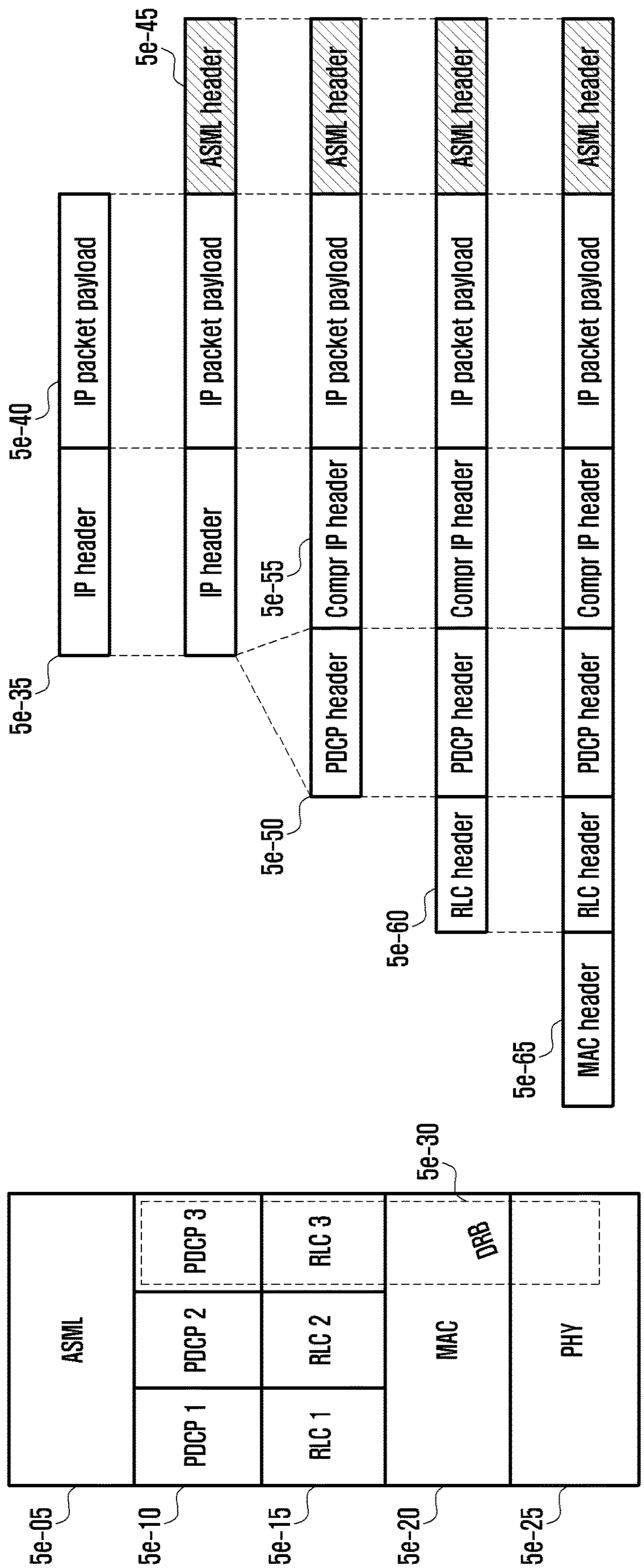
FIG. 5E is a diagram illustrating a first structure of an access stratum Multiplexing Layer (ASML) protocol according to an embodiment of the present disclosure.

FIG. 5E is a first structure of an ASML protocol according to an embodiment of the present disclosure.

Referring to FIG. 5E, to handle a new QoS function of an NR system, the following information needs to be delivered through a radio interface.

Downlink: QOS flow ID+ reflective QOS processing required indicator

Uplink: QOS flow ID

An interface for delivering the new information as described above to Uu is required, and the first structure defines a new protocol for performing the above function on the PDCP **5*e*-10 layer. The ASML 5*e*-05 is not the DRB-based protocol, but a packet is transferred based on a DRB (5*e*-30) mapping rule. For example, if IP traffic is generated, in the ASML 5*e*-05, the IP flow is mapped to the QoS flow ID and the QoS flow ID is mapped to the DRB. Here, the IP traffic consists of an IP header 5*e*-35 and a payload 5*e*-40, and an ASML header 5*e*-45 may be located after the IP packet and located before the IP packet. If the ASML header 5*e*-45 is located before the IP packet, length information of the ASML header 5*e*-45 is required when a header compression is performed in the PDCP 5*e*-10, and therefore an overhead occurs, but the ASML header 5*e*-45 may be located before the IP packet. In the PDCP 5*e*-10, an IP header 5*e*-55 is compressed and a PDCP header 5*e*-50 is added. Even in the RLC 5*e*-15 and the MAC 5*e*-20, the respective RLC header 5*e*-60 and the MAC header 5*e*-65 are sequentially added and the MAC PDU is transferred to the PHY 5*e*-25**.

Figure 5F:
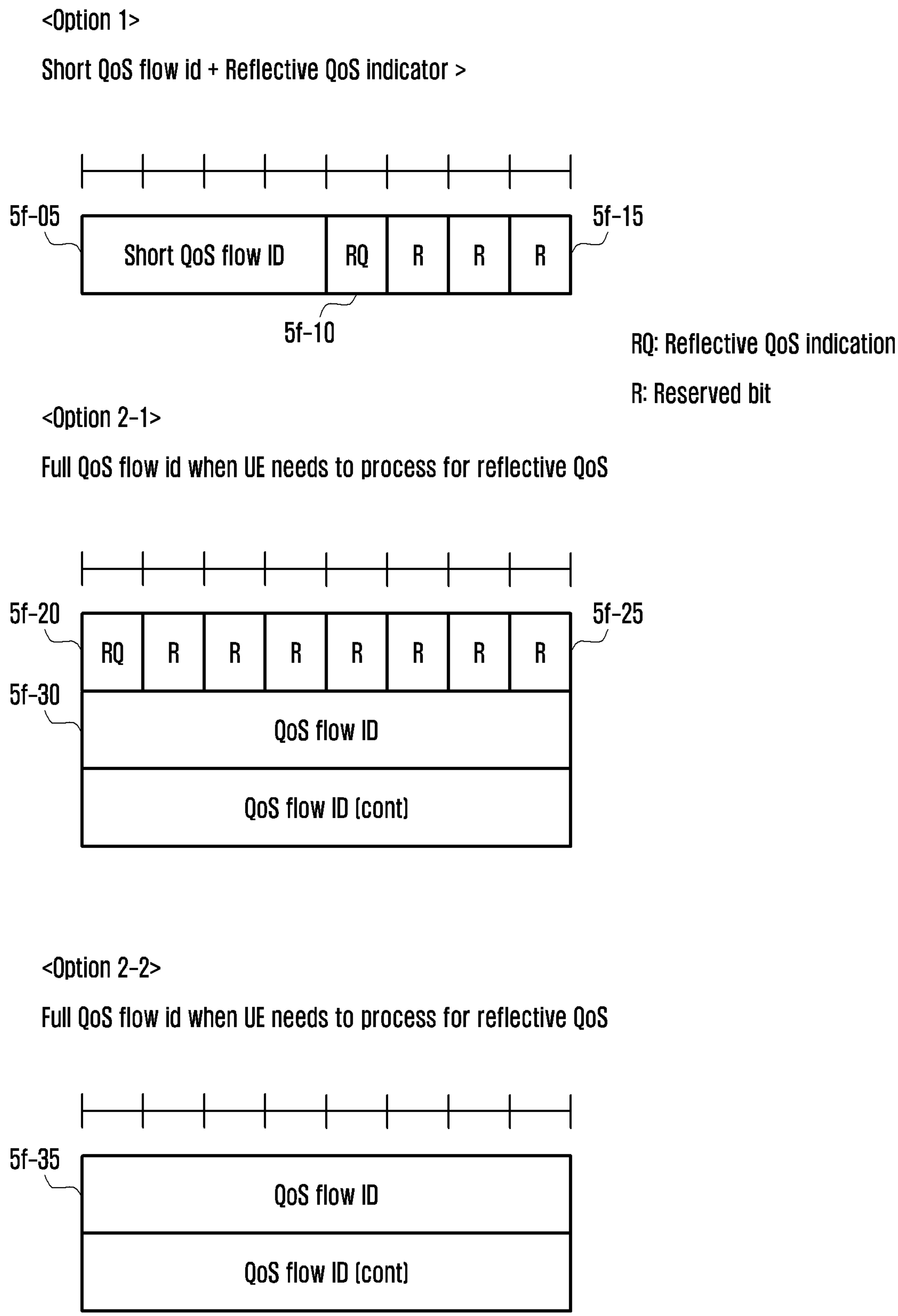
FIG. 5F is a diagram illustrating an ASML header in a first structure of an ASML according to an embodiment of the present disclosure.

FIG. 5F is a diagram illustrating an ASML header in a first structure of an ASML according to an embodiment of the present disclosure.

Referring to FIG. 5F, the first ASML structure is to introduce an independent protocol that performs new functions on the PDCP layer. As the method for designing the ASML header, it is conceivable to include a full QoS flow ID of 8 bits or 16 bits for all downlink packets. Since the QoS flow ID consists of bytes, it may have a length of 8 bits or 16 bits. However, in this case, it is necessary to perform the following reflective QoS update operation for all downlink packets.

Reflective QoS update operation 1 (AS)

Confirm whether the uplink QoS flow of the received downlink packet is mapped to the DRB that receives the packet If the above condition is not satisfied, update the uplink QoS flow to be mapped to the DRB receiving the downlink packet Reflective QoS update operation 2 (NAS)

Confirm whether the uplink QoS flow of the received downlink packet is mapped to the QoS flow that receives the packet If the above condition is not satisfied, update the uplink QoS flow to be mapped to the DRB receiving the downlink packet (uplink TFT update)

Performing the above operation every time all the downlink packets are received not only causes considerable processing consumption but also is unnecessary. Mapping for the IP flow or the QoS flow is only needed if the QoS requirements are different and this may not occur often. Therefore, we propose two ASML header configuration methods to reduce the above overhead.

Option 1 (consisting of 1-byte header)

Use short QoS flow ID **5*f*-05** (e.g., 4 bits) having a shorter length than Full QoS flow ID (8 or 16 bits)

The 1-bit reflective QoS indicator (RQ) **5*f*-10 is included in the downlink packet to instruct the terminal to perform the reflective QoS update operation Set the remaining bits of the header as reserved bits (R) 5*f*-15**

Option 2-1 (header length varies conditionally)

The QoS flow ID **5*f*-30** is included in the downlink packet only when the terminal needs to perform the reflective QoS update operation.

Include a 1-bit RQ indicator **5*f*-20 informing whether the packet includes the QoS flow ID Set the remaining bits of the header to reserved bits (R) 5*f*-25**

For the above option 1, the base station transmits the mapping information between the QoS flow ID and the short QoS flow ID to the terminal through the RRC message (included in the DRB configuration message). The mapping information includes the mapping information to the DRB.

In the option 2-2, the 1-bit RQ indicator may be included or may not be included or only the QoS flow ID **5*f*-35** may also be included.

Figure 5G:
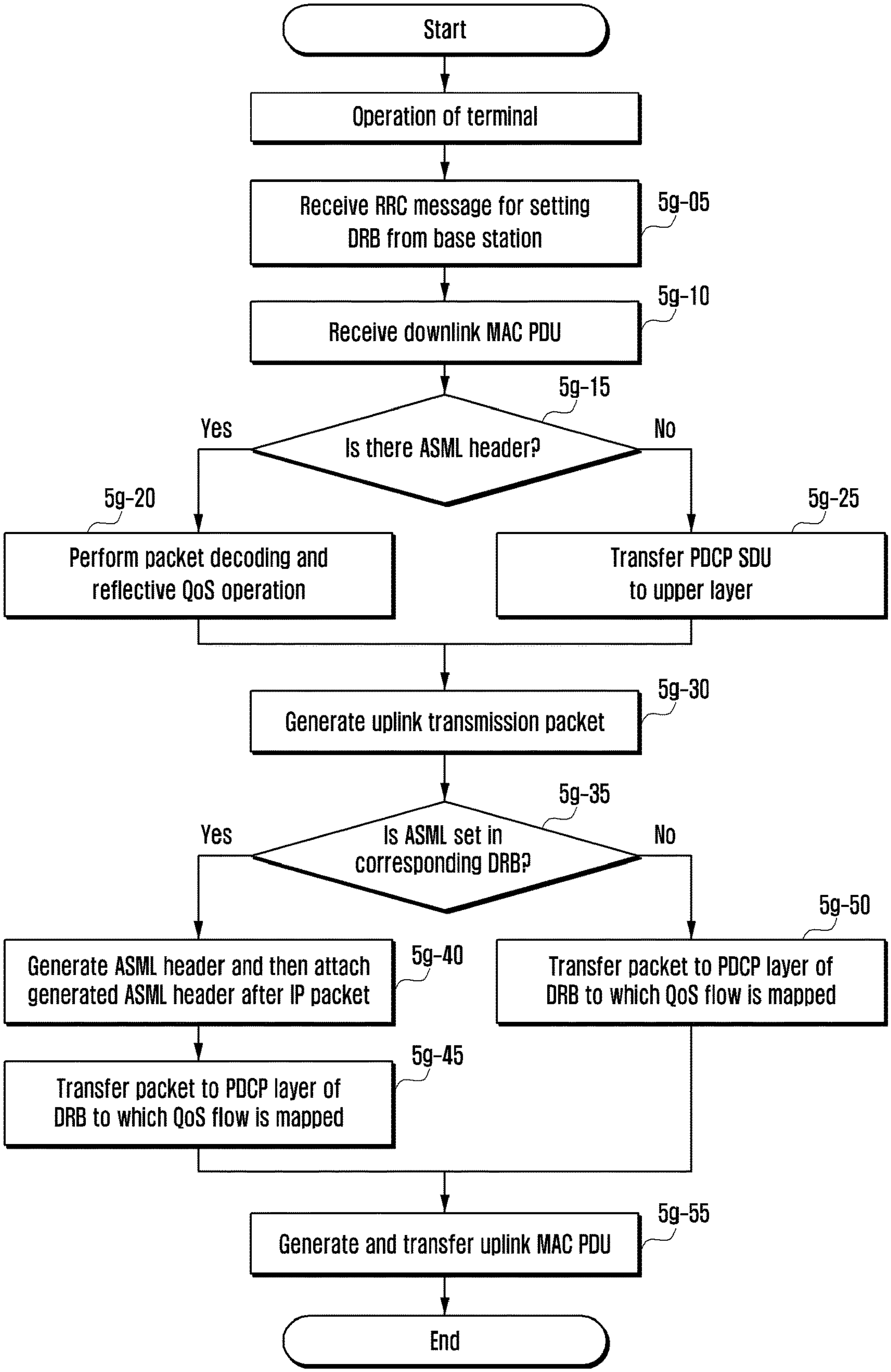
FIG. 5G is a diagram illustrating an operation of a terminal of a first structure of an ASML according to an embodiment of the present disclosure.

FIG. 5G is a diagram illustrating an operation of a terminal of a first structure of an ASML according to an embodiment of the present disclosure.

Referring to FIG. 5G, the first ASML structure is to introduce an independent protocol that performs new functions on the PDCP layer. The ASML is not the DRB-based protocol, and if the IP traffic is generated, the ASML marks the QoS flow ID and the reflective QoS indicator and transfers the packet to the PDCP layer.

The terminal receives the RRC message for setting the DRB from the base station in operation **5*g*-05**. As the RRC connection, RRC reconfiguration (re-) establishment and RRC reconfiguration are used. In addition, the message also includes the following configuration information.

PDCP, RLC, logical channel configuration information (PDCP configuration, RLC configuration, LCH configuration)

Downlink ASML configuration information (ASML for DL): QOS flow ID+ reflective QOS indicator Uplink ASML configuration information (ASML for UL): QOS flow ID The mapping information between the full QoS flow ID and the short QoS flow ID to be used for DRB mapping (Mapping info from QoS flow ID to short QoS flow ID)

The ASML exists as an independent layer and needs to be separately set for each data transmission direction and DRB. In addition, the short QoS flow ID mapping information is used as information for mapping the short QoS flow ID and the corresponding DRB when the first option is operated. The terminal receives the downlink MAC PDU from the base station in operation **5*g*-10, and transfers the RLC PDU demultiplexing the MAC PDU to the corresponding logical channel. The RLC PDU is processed as a PDCP PDU and delivered to the corresponding PDCP. The PDCP PDU is processed as a PDCP SDU. If the downlink ASML is set for the DRB, the ASML header attached to the tail of the PDCP SDU is searched in operation 5*g*-15**.

If the ASML is set, the short QoS ID and the reflective QoS indicator of the corresponding packet are decoded and the following reflective QoS operation is performed in operation **5*g*-20**.

Reflective QoS update operation 1 (AS)

Confirm whether the uplink QoS flow of the received downlink packet is mapped to the DRB that receives the packet If the above condition is not satisfied, update the uplink QoS flow to be mapped to the DRB receiving the downlink packet Reflective QoS update operation 2 (NAS)

Confirm whether the uplink QoS flow of the received downlink packet is mapped to the QoS flow that receives the packet If the above condition is not satisfied, update the uplink QoS flow to be mapped to the DRB receiving the downlink packet If the ASML is not set for the DRB or is not for the downlink although being set, the terminal transfers the PDCP SDU to the upper layer in operation **5*g*-25**.

In operation **5*g*-30, the terminal generates the IP packet for the uplink transmission. If the ASML is set for the DRB for the uplink in operation 5*g*-35, the terminal generates the ASML header, attaches the generated ASML header to the IP packet in operation 5*g*-40, and transfers the packet to the PDCP layer of the DRB mapped to the QoS flow in operation 5*g*-45**.

If ASML is not set for the DRB or the ASML is not set for the uplink although being set, DRB, the terminal transfers the packet to the PDCP layer of the DRB mapped to the QoS flow in operation **5*g*-50**.

In operation **5*g*-55, the terminal processes the PDCP PDU as the RLC PDU payload, attaches the RLC PDU header before the RLC payload, and transmits the RLC PDU header to the corresponding logical channel. The MAC PDU multiplexing the RLC PDU is generated and transmitted to the PHY in operation 5*g*-60**.

Figure 5H:
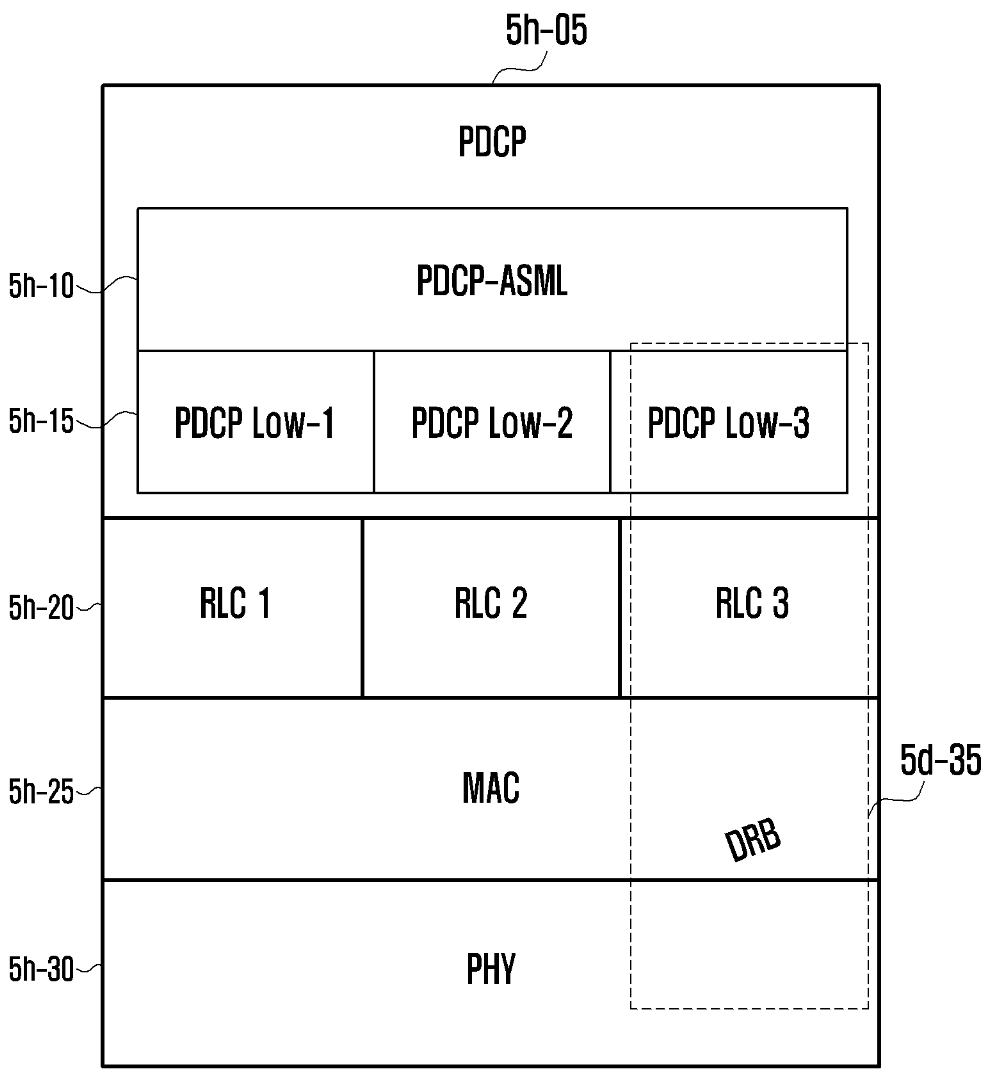
FIG. 5H is a second structure of an ASML protocol according to an embodiment of the present disclosure.

FIG. 5H is a second structure of an ASML protocol according to an embodiment of the present disclosure.

Referring to FIG. 5H, to handle a new QoS function of an NR system, the following information needs to be transferred through a radio interface.

Downlink: QOS flow ID+ reflective QOS processing required indicator

Uplink: QOS flow ID

An interface for transferring new information as described above to Uu is required, and a second structure introduces a PDCP-ASML **5*h*-10 sublayer which is in charge of the above function in the PDCP (5*h*-05) layer and a PDCP Low-1, a PDCP Low-2, a PDCP Low-3 sublayer 5*h*-15. For example, if the IP traffic is generated, the PDCP header including the QOS flow ID and the reflective QoS indicator is added to the IP packet in addition to the existing PDCP header in the PDCP 5*h*-05. Here, the IP packet consists of the IP header and the payload. In even the RLC 5*h*-20 and the MAC 5*h*-25, the RLC header and the MAC header are sequentially added and the MAC PDU is transferred to the PHY 5*h*-30. The packet is transferred based on a DRB (5*h*-35**) mapping rule set in the PDCP-ASML sublayer.

Figure 5I:
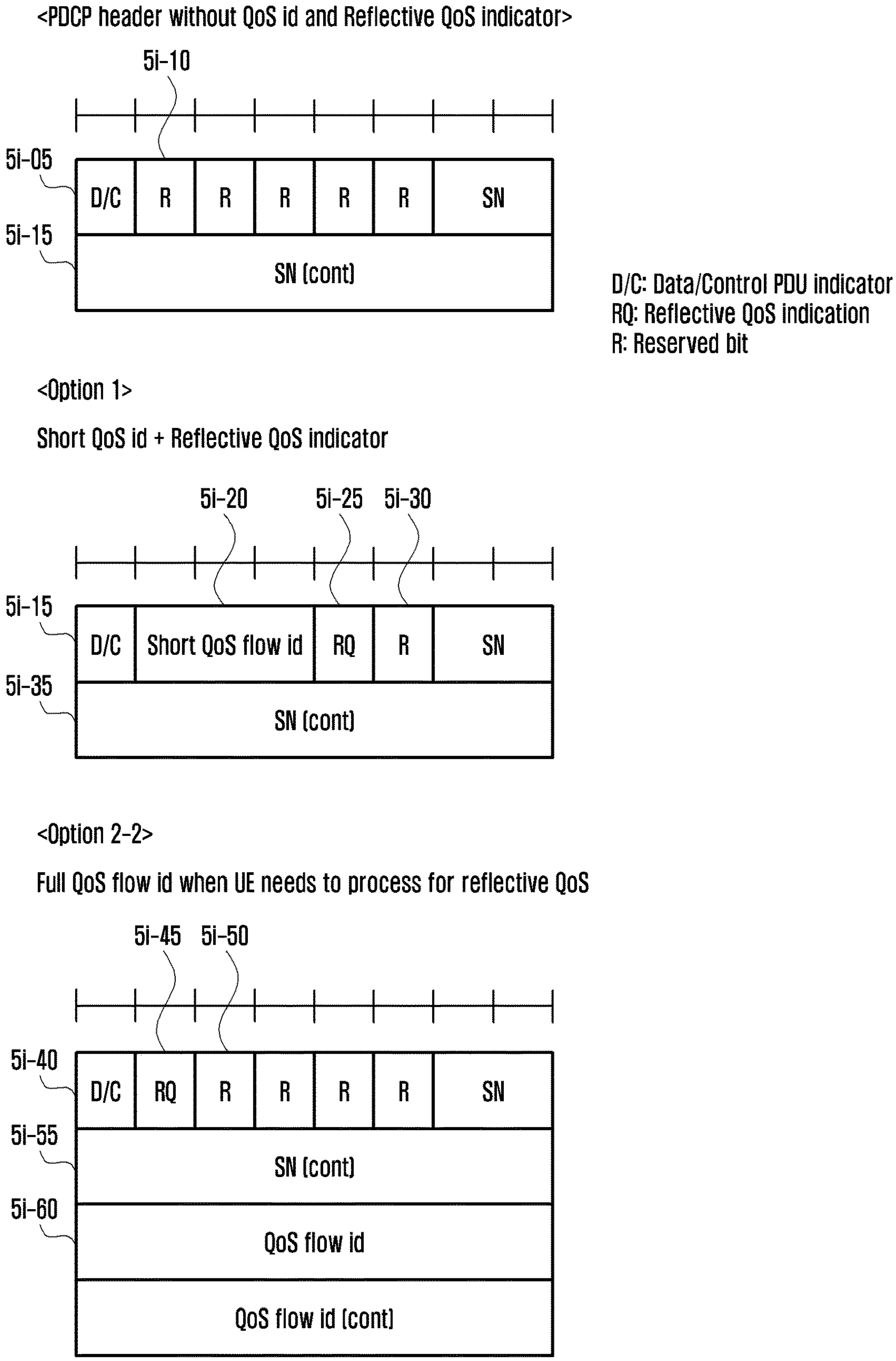
FIG. 5I is a diagram illustrating a packet data convergence protocol (PDCP) header in a second structure of an ASML according to an embodiment of the present disclosure.

FIG. 5I is a diagram illustrating a PDCP header in a second structure of an ASML according to an embodiment of the present disclosure.

Referring to FIG. 5I, the second ASML structure is to introduce a PDCP-ASML sublayer, which is in charge of new functions, into the PDCP. As the method for designing the PDCP header including the PDCP-ASML, in addition to the existing D/C bit (data or control signal indicator) **5*i*-05, sequence number (SN) 5*i*-15 bits, and the reserved bits 5*i*-10**, it can be considered to include the full QoS flow ID of 8 bits or 16 bits. Since the QoS flow ID consists of bytes, it may have a length of 8 bits or 16 bits. However, in this case, it is necessary to perform the following reflective QoS update operation for all downlink packets.

Reflective QoS update operation 1 (AS)

Confirm whether the uplink QoS flow of the received downlink packet is mapped to the DRB that receives the packet If the above condition is not satisfied, update the uplink QoS flow to be mapped to the DRB receiving the downlink packet Reflective QoS update operation 2 (NAS)

Confirm whether the uplink QoS flow of the received downlink packet is mapped to the QoS flow that receives the packet If the above condition is not satisfied, update the uplink QoS flow to be mapped to the DRB receiving the downlink packet (uplink TFT update)

Performing the above operation every time all the downlink packets are received not only causes considerable processing consumption but also is unnecessary. Mapping for the IP flow or the QoS flow is only needed if the QoS requirements are different and this may not occur often. Therefore, we propose two ASML header configuration methods to reduce the above overhead.

Option 1

Use short QoS flow ID 5*i*-20 (e.g., 3 and 4 bits) having a shorter length than Full QoS flow ID (8 or 16 bits)

The 1-bit reflective QoS indicator (RQ) 5*i*-25 is included in the downlink packet to instruct the terminal to perform the reflective QoS update operation Set SN bits (10 or 11 bits) 5*i*-35

Set the remaining bits of the header as reserved bits 5*i*-30

Option 2 (header length varies conditionally)

The QoS flow ID 5*i*-60 is included in the downlink packet only when the terminal needs to perform the reflective QoS update operation.

Include a 1-bit RQ indicator 5*i*-45 informing whether the packet includes the QoS flow ID Set SN bits (10 or 11 bits) 5*i*-55

Set the remaining bits of the header as reserved bits 5*i*-50

For the above option 1, the base station transmits the mapping information between the QoS flow ID and the short QoS flow ID to the terminal through the RRC message (included in the DRB configuration, specifically, PDCP configuration message). The mapping information includes the mapping information to the DRB.

In the option 2, the 1-bit RQ indicator may be included or may not be included and may be used as a reserved bit 5*g*-50.

In addition, under the certain conditions, the PDCP may be transmitted in the existing LTE structure (consisting of 5*i*-05, 5*i*-10, and 5*i*-15) rather than the option 1 and option 2. This corresponds to the case when the reflective QoS update operation is not required.

Figure 5J:
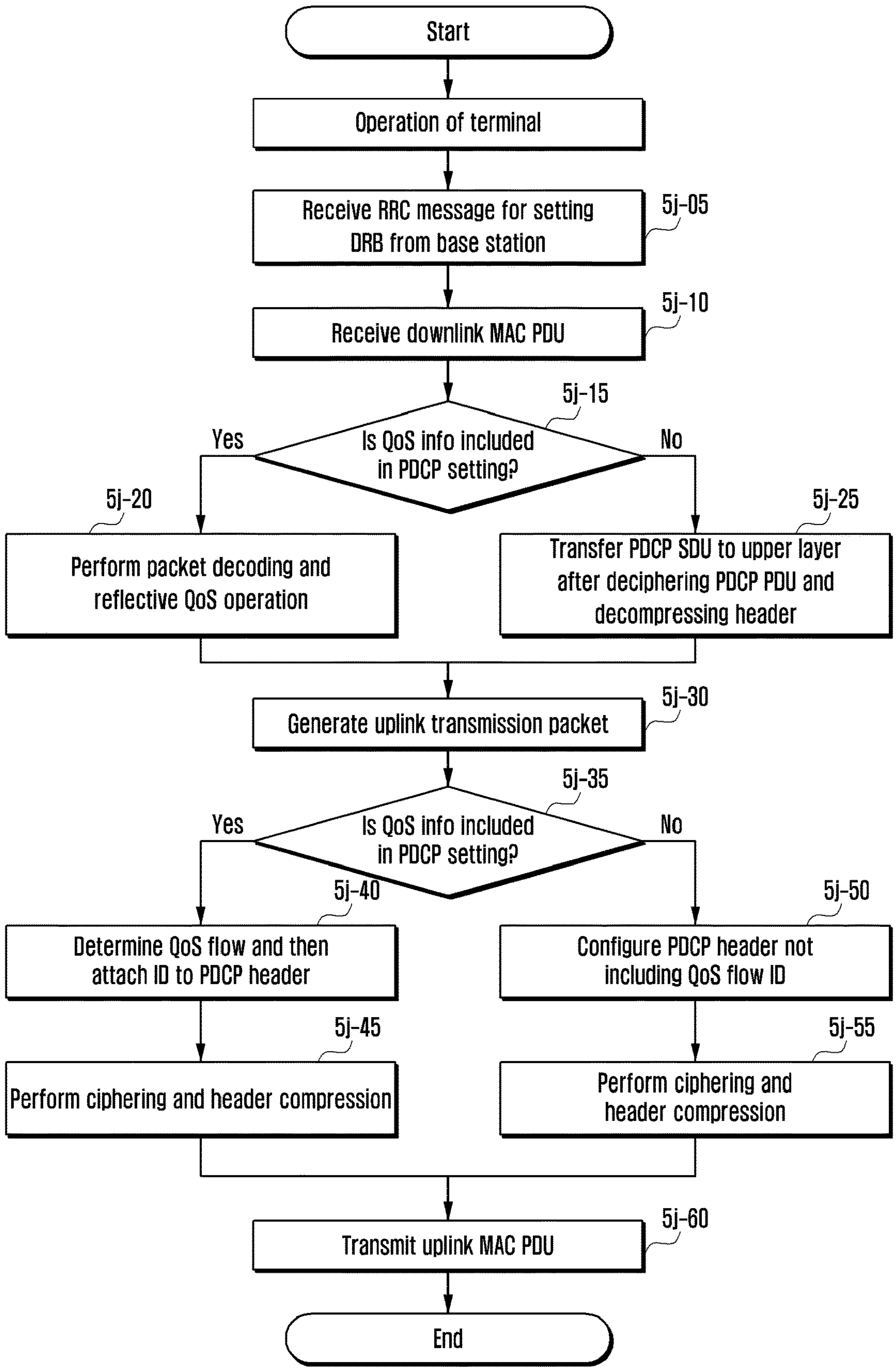
FIG. 5J is a diagram illustrating an operation of a terminal of a second structure of an ASML according to an embodiment of the present disclosure.

FIG. 5J is a diagram illustrating an operation of a terminal of a second ASML structure according to an embodiment of the present disclosure.

Referring to FIG. 5J, the second ASML structure is to introduce a PDCP-ASML sublayer, which is in charge of new functions, into the PDCP. The PDCP-ASML is not a DRB-based sublayer, but is performed prior to processing of the existing PDCP header.

The terminal receives the RRC message for setting the DRB from the base station in operation 5*j*-05. As the RRC connection, RRC reconfiguration (re-) establishment and RRC reconfiguration are used. In addition, the message also includes the following configuration information.

PDCP, RLC, logical channel configuration information (PDCP configuration, RLC configuration, LCH configuration)

The PDCP may include or may not include the following QoS related information.

Whether the QoS flow ID and the reflective QoS indicator are included

The mapping information between the full QoS flow ID and the short QoS flow ID to be used for DRB mapping (Mapping info from QoS flow ID to short QoS flow ID)

The ASML exists as an independent layer and needs to be separately set for each data transmission direction and DRB. In addition, the short QoS flow ID mapping information is used as information for mapping the short QoS flow ID and the corresponding DRB when the first option is operated. The terminal receives the downlink MAC PDU from the base station in operation 5*j*-10, and transfers the RLC PDU demultiplexing the MAC PDU to the corresponding logical channel. The RLC PDU is processed as a PDCP PDU and transferred to the corresponding PDCP.

In operation 5*j*-15, the terminal determines whether the QoS information for the DRB in the corresponding direction is included in the PDCP configuration, and decodes the QoS flow ID and the RQ if it is included, performs deciphering and header decompression, and then performs the following reflective QoS operation in operation 5*j*-20.

Reflective QoS update operation 1 (AS)

Confirm whether the uplink QoS flow of the received downlink packet is mapped to the DRB that receives the packet If the above condition is not satisfied, update the uplink QoS flow to be mapped to the DRB receiving the downlink packet Reflective QoS update operation 2 (NAS)

Confirm whether the uplink QoS flow of the received downlink packet is mapped to the QoS flow that receives the packet If the above condition is not satisfied, update the uplink QoS flow to be mapped to the DRB receiving the downlink packet (uplink TFT update)

If operated as the option 1 to decode the QoS flow ID and RQ, the terminal may decode b1 to b4 of the first byte of the PDCP header, and if operated as the option 2, the terminal decodes the QoS flow ID that is added after b1 and SN of the first byte of the PDCP header.

If no QoS information is included in the PDCP for the DRB in the corresponding direction, the terminal performs the deciphering and the header decompression on the PDCP PDU, and then processes the PDCP PDU as a PDCP SDU, which is then transmitted to the upper layer in operation 5*j*-25. If the terminal is operated as the option 1 in the above operation, b1 to b4 of the first byte of the PDCP header are replaced with 0 bits, and if the terminal is operated as the option 2, the PDCP header is transferred in the same form as the PDCP header in the existing LTE.

In operation 5*g*-30, the terminal generates the IP packet for the uplink transmission.

If the PDCP setting for the uplink DRB includes the QoS information in operation 5*j*-35, the terminal determines the QoS flow in operation 5*i*-40 and performs the header compression and the ciphering in operation 5*i*-45. In the above operation, when the terminal is operated as the option 1, the QoS ID and the RQ bit are added to b1 to b4 of the first byte of the PDCP header, and if the terminal is operated as the operation 2, the RQ bit is added to b1 of the first byte of the PDCP header and add the full QoS flow ID added after the SN.

If no QoS information is included in the PDCP for the DRB in the corresponding direction, the terminal performs the ciphering and the header decompression on the PDCP PDU in operation 5*i*-50, and then processes the PDCP PDU as a PDCP SDU, which is then transmitted to the upper layer in operation 5*i*-55.

In operation 5*j*-60, the terminal processes the PDCP PDU as the RLC PDU payload, attaches the RLC PDU header before the RLC payload, and transmits the RLC PDU header to the corresponding logical channel. The MAC PDU multiplexing the RLC PDU is generated and transmitted to the PHY (5*j*-60).

Figure 5K:
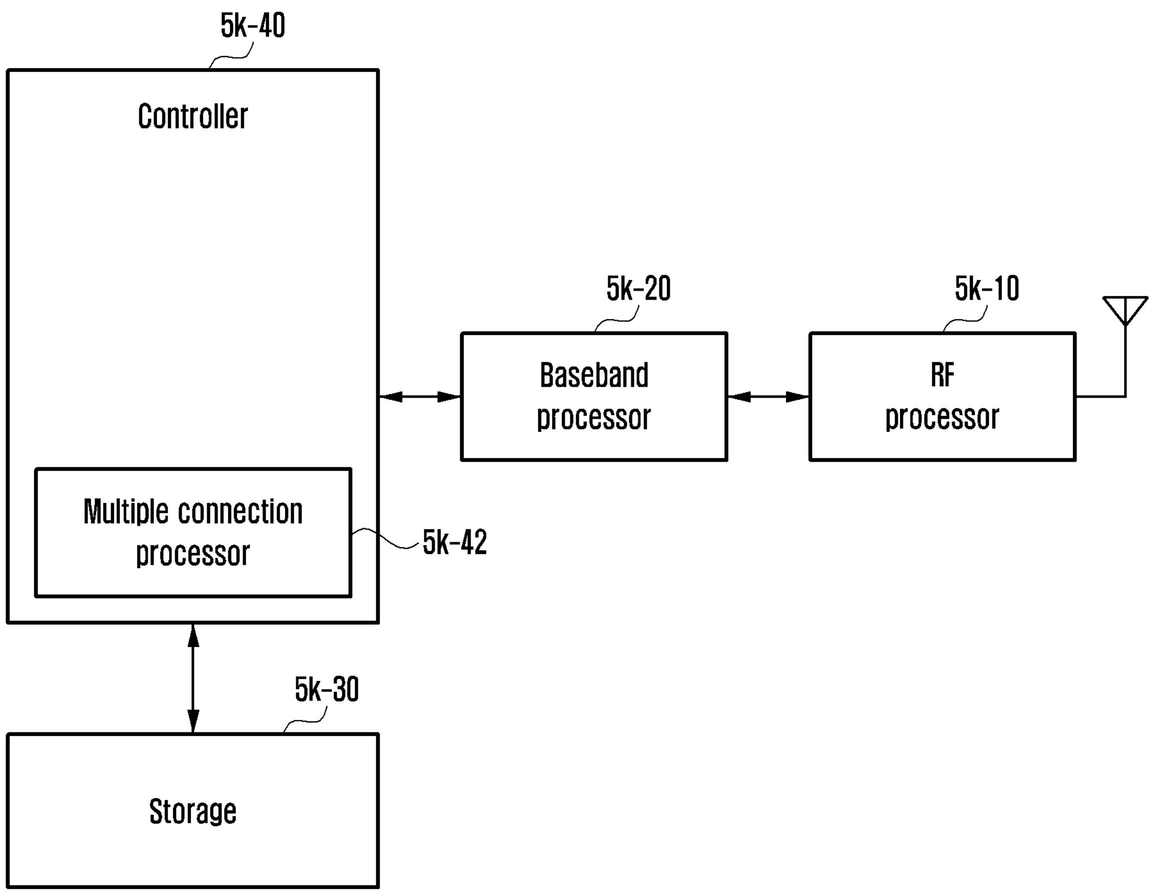
FIG. 5K is a block diagram illustrating an internal structure of a terminal according to an embodiment of the present disclosure.

FIG. 5K is a block diagram illustrating an internal structure of a terminal according to an embodiment of the present disclosure.

Referring to FIG. 5K, the terminal includes a radio frequency (RF) processor 5*k*-10, a baseband processor 5*k*-20, a storage 5*k*-30, and a controller 5*k*-40.

The RF processor 1*k*-10 serves to transmit and receive a signal through a radio channel, such as band conversion and amplification of a signal. For example, the RF processor 5*k*-10 up-converts a baseband signal provided from the baseband processor 5*k*-20 into an RF band signal and then transmits the RF band signal through an antenna and down-converts the RF band signal received through the antenna into the baseband signal. For example, the RF processor 5*k*-10 may include a transmitting filter, a receiving filter, an amplifier, a mixer, an oscillator, a digital to analog converter (DAC), an analog to digital converter (ADC), or the like. FIG. 5K illustrates only one antenna but the terminal may include a plurality of antennas. Further, the RF processor 5*k*-10 may include a plurality of RF chains. Further, the RF processor 5*k*-10 may perform beamforming. For the beamforming, the RF processor 5*k*-10 may adjust a phase and a size of each of the signals transmitted and received through a plurality of antennas or antenna elements. In addition, the RF processor may perform MIMO and may receive a plurality of layers when performing the MIMO operation.

The baseband processor 5*k*-20 performs a conversion function between a baseband signal and a bit string according to a physical layer standard of a system. For example, when data are transmitted, the baseband processor 5*k*-20 generates complex symbols by coding and modulating a transmitted bit string. Further, when data are received, the baseband processor 1*k*-20 recovers the received bit string by demodulating and decoding the baseband signal provided from the RF processor 1*k*-10. For example, according to the OFDM scheme, when data are transmitted, the baseband processor 2*i*-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 4*h*-20 divides the baseband signal provided from the RF processor 4*h*-10 in an OFDM symbol unit and recovers the signals mapped to the sub-carriers by a fast Fourier transform (FFT) operation and then recovers the received bit string by the modulation and decoding.

The baseband processor 5*k*-20 and the RF processor 5*k*-10 transmit and receive a signal as described above. Therefore, the baseband processor 4*h*-20 and the RF processor 4*h*-10 may be called a transmitter, a receiver, a transceiver, or a communication unit. Further, at least one of the baseband processor 5*k*-20 and the RF processor 5*k*-10 may include a plurality of communication modules to support a plurality of different radio access technologies. Further, at least one of the baseband processor 5*k*-20 and the RF processor 5*k*-10 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2 NRHz) band, a millimeter wave (for example: 60 GHz) band.

The storage 5*k*-30 stores data, such as basic programs, application programs, and configuration information for the operation of the terminal. More particularly, the storage 5*k*-30 may store information associated with a second access node performing wireless communication using a second access technology. Further, the storage 5*k*-30 provides the stored data according to the request of the controller 5*k*-40.

The controller 5*k*-40 includes a multiple connection processor 5*k*-42 and controls the overall operations of the terminal. For example, the controller 5*k*-40 transmits and receives a signal through the baseband processor 5*k*-20 and the RF processor 5*k*-10. Further, the controller 5*k*-40 records and reads data in and from the storage 5*k*-30. For this purpose, the controller 5*k*-40 may include at least one processor. For example, the controller 5*k*-40 may include a communication processor (CP) performing a control for communication and an application processor (AP) controlling an upper layer, such as the application programs.

FIG. 5I is a block diagram illustrating a configuration of an NR base station according to an embodiment of the present disclosure.

Referring to FIG. 5I, the base station is configured to include an RF processor 5I-10, a baseband processor 5I-20, a backhaul communication unit 5I-30, a storage 5I-40, and a controller 5I-50.

The RF processor 5I-10 serves to transmit/receive a signal through a radio channel, such as band conversion and amplification of a signal. For example, the RF processor 5I-10 up-converts a baseband signal provided from the baseband processor 5I-20 into an RF band signal and then transmits the baseband signal through an antenna and down-converts the RF band signal received through the antenna into the baseband signal. For example, the RF processor 5I-10 may include a transmitting filter, a receiving filter, an amplifier, a mixer, an oscillator, a DAC, an ADC, and the like. FIG. 5I illustrates only one antenna but the first access node may include a plurality of antennas. Further, the RF processor 5I-10 may include the plurality of RF chains. Further, the RF processor 5I-10 may perform the beamforming. For the beamforming, the RF processor 5I-10 may adjust a phase and a size of each of the signals transmitted and received through a plurality of antennas or antenna elements. The RF processor may perform a downward MIMO operation by transmitting one or more layers.

The baseband processor 5I-20 performs a conversion function between the baseband signal and the bit string according to the physical layer standard of the first radio access technology. For example, when data are transmitted, the baseband processor 5I-20 generates complex symbols by coding and modulating a transmitting bit string. Further, when data are received, the baseband processor 5I-20 recovers the receiving bit string by demodulating and decoding the baseband signal provided from the RF processor 5I-10. For example, according to the OFDM scheme, when data are transmitted, the baseband processor 5I-20 generates the complex symbols by coding and modulating the transmitting bit string, maps the complex symbols to the sub-carriers, and then performs the IFFT operation and the CP insertion to configure the OFDM symbols. Further, when data are received, the baseband processor 5I-20 divides the baseband signal provided from the RF processor 5I-10 in an OFDM symbol unit and recovers the signals mapped to the sub-carriers by an FFT operation and then recovers the receiving bit string by the modulation and decoding. The baseband processor 5I-20 and the RF processor 5I-10 transmit and receive a signal as described above. Therefore, the baseband processor 5I-20 and the RF processor 5I-10 may be called a transmitter, a receiver, a transceiver, a communication unit, or a wireless communication unit.

The backhaul communicator 5I-30 provides an interface for performing communication with other nodes within the network. For example, the backhaul communication unit 5I-30 converts bit strings transmitted from the main base station to other nodes, for example, an auxiliary base station, a core network, and the like, into physical signals and converts the physical signals received from other nodes into the bit strings.

Figure 5L:
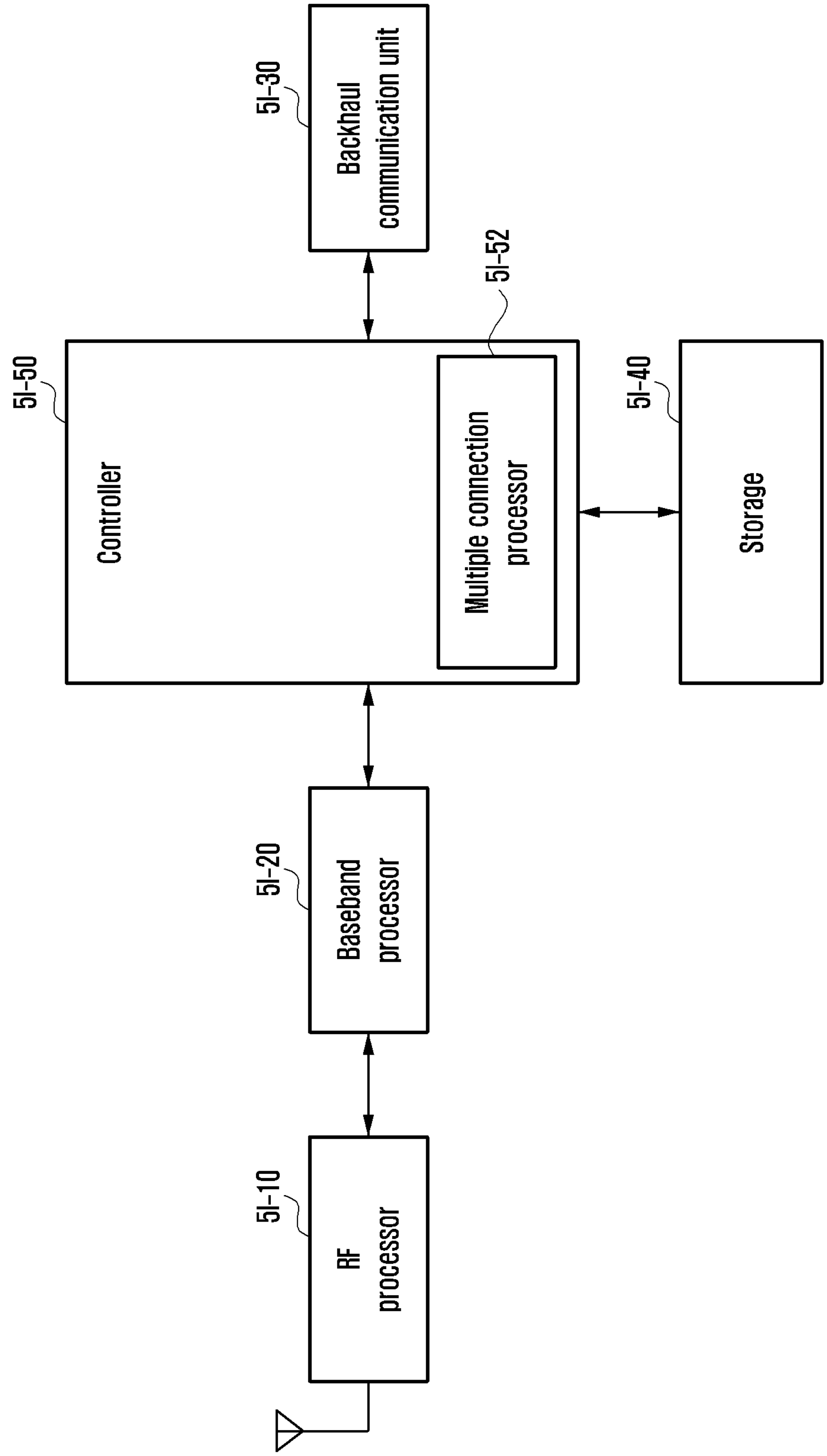
FIG. 5L is a block diagram illustrating a configuration of an NR base station according to an embodiment of the present disclosure.

FIG. 5L is a block diagram illustrating a configuration of an NR base station according to an embodiment of the present disclosure.

Referring to FIG. 5 L, the storage 5I-40 stores data, such as basic programs, application programs, and configuration information for the operation of the main base station. More particularly, the storage 5I-40 may store the information on the bearer allocated to the accessed terminal, the measured results reported from the accessed terminal, and the like. Further, the storage 5I-40 may store information that is a determination criterion on whether to provide a multiple connection to the terminal or stop the multiple connection to the terminal. Further, the storage 5I-40 provides the stored data according to the request of the controller 5I-50.

The controller 5I-50 includes a multiple connection processor 5I-52 and controls the general operations of the main base station. For example, the controller 5I-50 transmits/receives a signal through the baseband processor 5I-20 and the RF processor 5I-10 or the backhaul communicator 5I-30. Further, the controller 5I-50 records and reads data in and from the storage 5I-40. For this purpose, the controller 5I-50 may include at least one processor.

A user plane protocol structure and operation of a terminal for supporting flow-based service quality 1 Method for receiving an RRC message for setting a DRB from a base station The message includes PDCP, RLC, and logical channel;

The message includes AMSL setting values for each uplink and downlink;

The message includes mapping information between full QoS flow ID and short QoS flow ID for being used DRB mapping;

2. Method for receiving a downlink packet and performing a reflective QoS update operation The terminal receives a downlink MAC PDU and then configures a PDCP SDU;

The terminal differently performs reception and decoding according to an ASML protocol structure;

If the terminal is operated in the first ASML structure, the decoding is performed according to the QoS configuration information of the ASML;

The first ASML structure in which ASML exists on the PDCP as an independent layer and the QoS flow ID and the reflective QoS indicator information bit are included after the IP packet;

If the terminal is operated the second ASML structure, the decoding is performed according to the QoS configuration information of the PDCP;

The second ASML structure includes the ASML function in the PDCP, and includes the QoS flow ID and the reflective QoS indicator information bit in the PDCP header;

The information bit of the ASML and the PDCP header is designed to have different form according to the operation option;

The option 1 is designed to use the short QoS flow ID instead of the full QoS flow ID;

The mapping information between the full QoS flow ID and the short QoS flow ID is received from the base station through an RRC message;

The option 2 includes the QoS flow ID and the reflective QoS indicator information bits in the PDCP header only if the reflective QoS operation is required, and transfers the QoS flow ID and the reflective QoS indicator information bits in the PDCP header form of the existing LTE;

The terminal is requested to perform a reflective QoS update and performs the reflective QoS update operation on the AS and the NAS;

In the AS reflective QoS update operation, it is confirmed whether the uplink QoS flow of the received downlink packet is mapped to the DRB that receives the packet, and then if the condition is not satisfied, the uplink QoS flow is updated to be mapped to the DRB receiving the downlink packet;

In the NAS reflective QoS update operation, it is confirmed whether the uplink QoS flow of the received downlink packet is mapped to the QoS flow that receives the packet, and then if the condition is not satisfied, the uplink IP flow is updated to be mapped to the QoS flow receiving the downlink packet;

If no ASML configuration information exists in the DRB in the corresponding direction, the terminal transfers the PDCP SDU to the upper layer without further processing;

3. A method for generating and transmitting a data packet based on QoS configuration information if an uplink IP packet is generated The terminal constructs transmission packets differently according to the structure of the ASML protocol and transfers the transmission packets;

The uplink ASML includes only the QoS flow ID information;

If the terminal is operated in the first ASML structure, the decoding is performed according to the QoS configuration information of the ASML;

If the terminal is operated in the ASML first structure, the QoS flow ID for the corresponding DRB is attached after the IP packet by being added to the ASML header and then is transferred to the upper layer;

If the terminal is operated in the second ASML structure, the decoding is performed according to the QoS configuration information of the PDCP;

If the terminal is operated in the second ASML structure, the QoS flow ID for the corresponding DRB is attached after the IP packet by being added to the ASML header and then is transferred to the upper layer;

The information bit of the ASML and the PDCP header is designed to have different forms according to the operation option;

The option 1 is designed to use the short QoS flow ID instead of the full QoS flow ID;

The option 2 includes the QoS flow ID in the PDCP header only when the reflective QoS operation is performed and transfers the QoS flow ID in the PDCP header form of the existing LTE if the reflective QoS operation is not performed;

The PDCP PDU including the ASML header is constructed as the MAC PDU and is transferred;

Sixth Embodiment

In an embodiment of the present disclosure, dual-registered means that one terminal is simultaneously registered in two or more different mobile communication systems to receive a service. In the existing LTE system, the terminal may be in a standby mode or a connection mode at the RRC level in the registered state, i.e., the EMM-registered state. It is assumed that the present disclosure has a similar structure in the next generation mobile communication system. The dual-registered technology may be used for inter-system handover or direct carrier technology between heterogeneous systems.

Figure 6A:
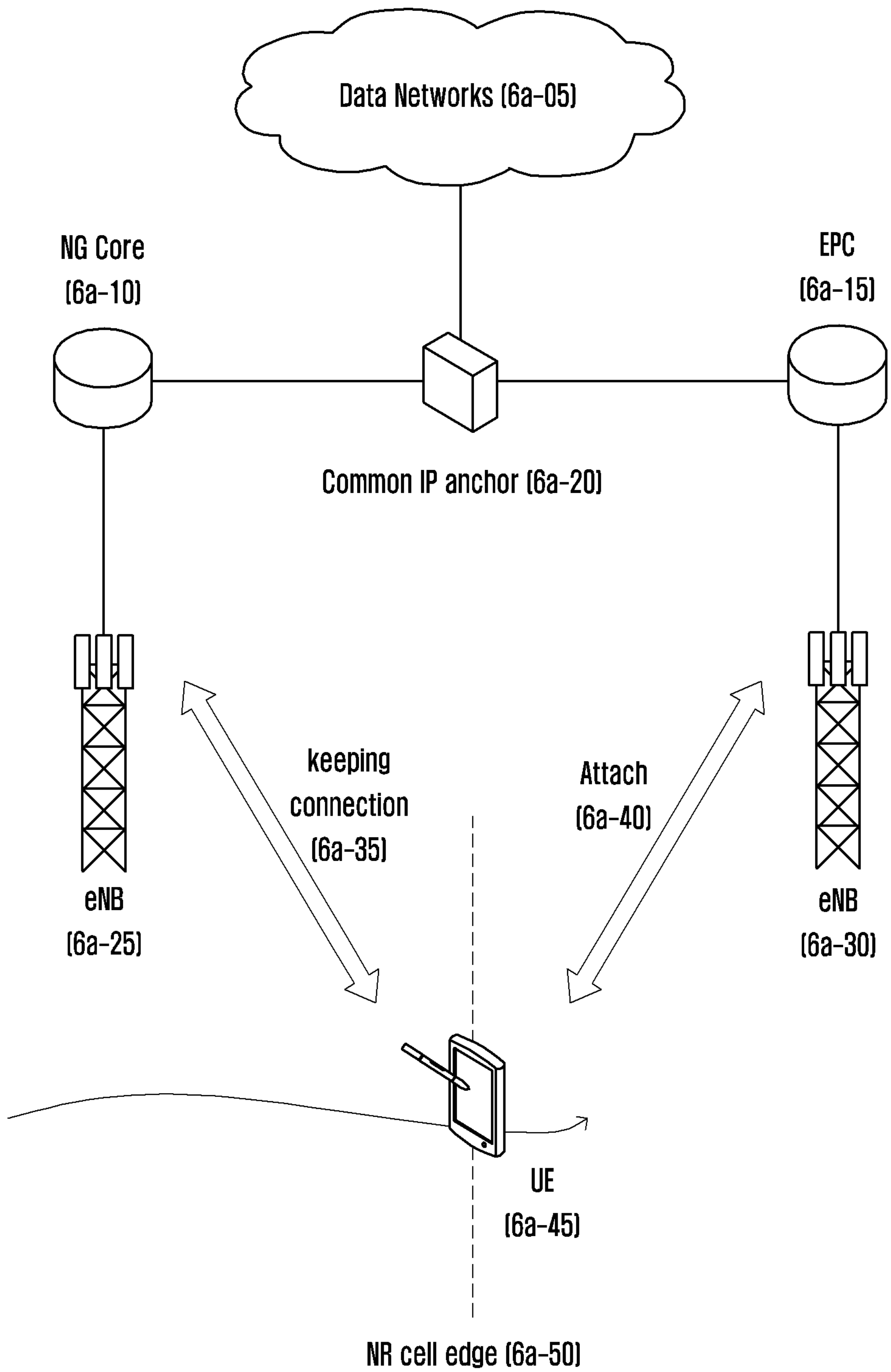
FIG. 6A is a diagram illustrating an inter-system handover by applying dual-registered in a next generation mobile communication system according to an embodiment of the present disclosure.

FIG. 6A is a diagram illustrating an inter-system handover by applying dual-registered in a next generation mobile communication system according to an embodiment of the present disclosure.

In an inter-system handover of the related art, the source system requests handover to the target system using the backhaul network. In response to this, if the target system approves the request, the target system prepares a radio resource for the handover terminal, and transmits the configuration information necessary for the handover to the source system. The source system provides configuration information necessary for the handover to a mobile station moving to the target system. If the dual-registered technology is applied to the inter-system handover, the terminal performs attach to the target system instead of performing a handover procedure when moving from a previously connected system to another system (6*a*-50) according to the related art.

Referring to FIG. 6A, in an embodiment of the present disclosure, the base station of the next generation mobile communication system is referred to as gNB 6*a*-25, and the base station of the LTE system is referred to as eNB 6*a*-30. The attach 6*a*-40 means a procedure for the terminal 6*a*-45 to register itself in the system. At this time, the terminal 6*a*-45 may maintain the connection to the existing source system as it is. The advantage of the dual-registered technology does not require interoperability which applied to the existing handover technology between the source system 6*a*-10 and the target system 6*a*-15. This can minimize the definition of interfaces between the systems, thereby minimizing the upgrade of the existing system, and also reducing the signaling overhead between the systems. In order to support the dual-registered technology, the network of the source system 6*a*-10 and the target system 6*a*-15 is connected to an NW entity called a common IP anchor 6*a*-20, and the common IP anchor 6*a*-20 serves to route data transmitted from the data network 6*a*-05 to one terminal 6*a*-45. Maintaining connection with an existing source system may vary depending on the capabilities of the terminal 6*a*-45. If the terminal 6*a*-45 has a plurality of radios, it is not necessary to disconnect the source system 6*a*-25 according to the limitation of the number of radios. Typically, in the existing LTE system, the attach operation requires several hundred milliseconds (ms). Therefore, if the necessary data is transmitted and received while maintaining the connection with the existing source system (6*a*-35), the service disconnection does not occur during the attach operation (6*a*-40) period. On the other hand, if the terminal has only one radio, the connection with the source system will be restricted. This is because the single radio should be applied to the target system in the middle of performing the attach operation 6*a*-40 with the target system 6*a*-15, so that the service may be restricted from the source system 6*a*-10. However, even in this case, the connection with the source system may still be maintained (6*a*-35) by the time division method (TDM). However, the service quality, such as the delay time and the transmission rate may be somewhat lowered.

Figure 6B:
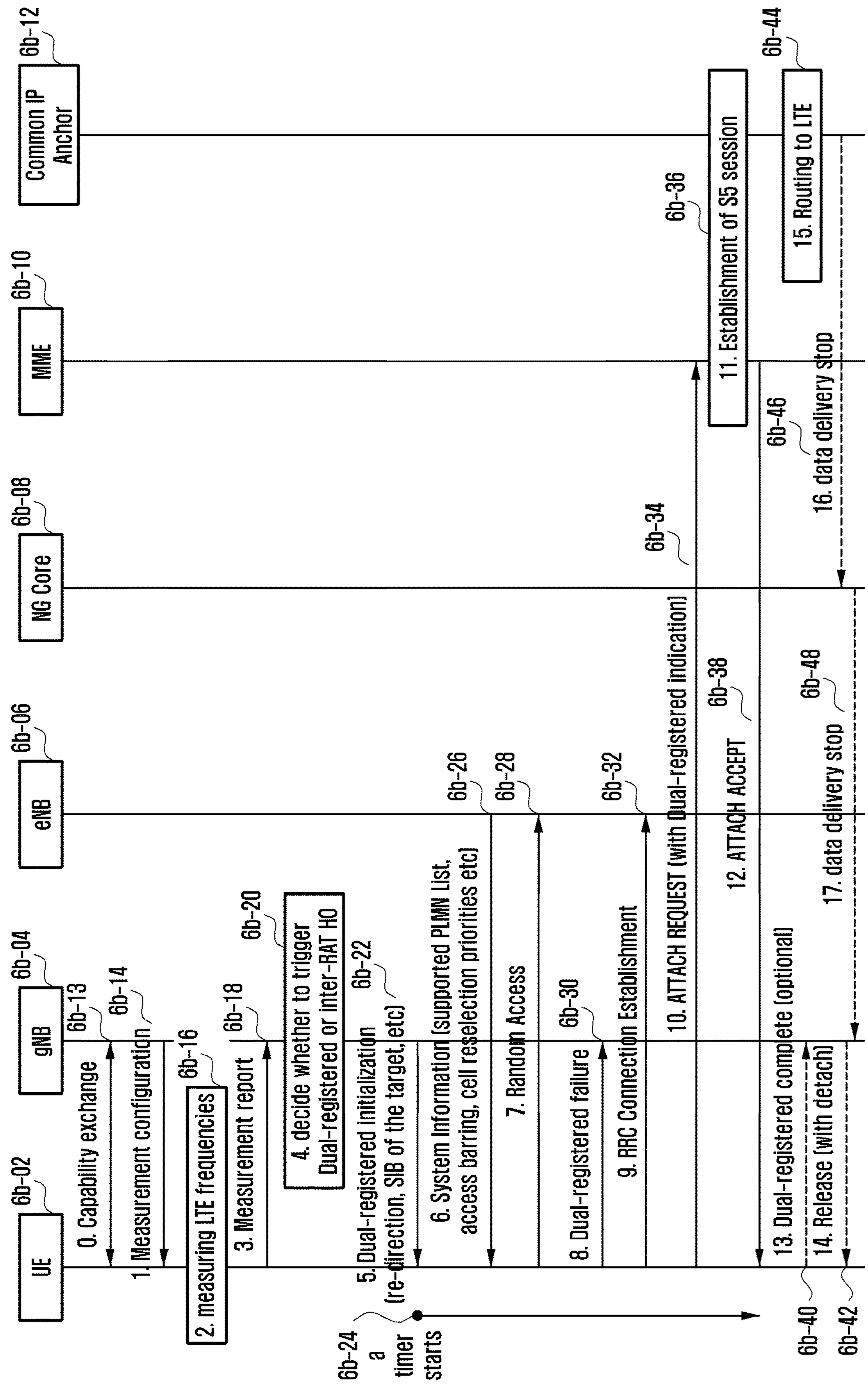
FIG. 6B is a diagram illustrating a signaling flow chart when a terminal moves to a service area of an LTE system of a next generation mobile communication system according to an embodiment of the present disclosure.

FIG. 6B is a diagram illustrating a signaling flow chart when a terminal moves to a service area of an LTE system of the related art in a next generation mobile communication system according to an embodiment of the present disclosure.

Referring to FIG. 6B, a terminal 6*b*-02 in a service area of a gNB 6*b*-04 exchanges capability of supporting dual-registered with each other in operation 6*b*-13. The gNB informs terminals within the service area whether the next generation mobile communication system supports dual-registered using system information to be broadcast. The terminal uses dedicated signaling to inform the gNB whether it supports dual-registered.

The gNB sets the LTE frequency measurement to the terminal supporting the dual-registered in operation 6*b*-14. The configuration information includes a period for which the LTE frequency is measured and a time period for which the LTE frequency for each measurement period is measured. The terminal receiving the configuration information may measure the LTE frequency during the predetermined time interval at each predetermined period in operation 6*b*-16. Alternatively, the LTE frequency may be measured at an appropriate time determined by the terminal itself. An example of the appropriate time is a time interval during which data is not transmitted to or received from the gNB. In order to measure the LTE frequency, the terminal turns-on an LTE modem. A terminal having a dual radio may keep the LTE modem, which is operated once, in an operation state and may turn-on the LTE modem every time the LTE frequency is measured and then turn-off the LTE modem when the measurement is completed. Alternatively, the terminal supporting the dual-registered may measure the LTE frequency without being set from the gNB. In this case, however, the LTE frequency may be measured only at an appropriate time determined by the terminal itself. The terminal reports the measured result to the gNB in operation 6*b*-18. The gNB determines whether to set dual-registered or inter-RAT handover based on the measurement result and other information in operation 6*b*-20. The gNB sets the dual-registered to the terminal in operation 6*b*-22. At this time, a dedicated control plane message (dual-registered initialization) is used. The terminal receiving the message performs the dual-registered. At this time, the message may indicate the frequency or cell of the LTE system to which the terminal should attempt to attach. Alternatively, a list of frequencies or cells may be provided, and the terminal may attempt attach by selecting one of the frequencies or cells belonging to the list. The frequency or the cell is represented by a frequency bandwidth, center frequency information, and a cell ID (Physical cell ID or ECGI). In addition, in order to reduce the time that the terminal attaches, the message may also include some system information of the LTE system cell. The some system information is information necessary for the terminal to access the target system. The essential system information is system information belonging to the MIB, SIB1, SIB2, SIB3, SIB4, and SIB5 broadcast by the LTE cell. More specifically, the essential system information may include a PLMN list supported by the LTE system cell, a tracking area code, a closed subscriber croup (CSG) cell ID, a frequency band list and spectrum emission information supported by the target system cell, access prohibit-related information (e.g., ACB, EAB, SSAC, ACDC), configuration information related to a random access to the LTE system cell, cell reselection prioritization, and the like. The essential system information of the LTE system cell is reported while the terminal reports the cell measurement according to the request of the gNB, or the gNB may always collect the system information on neighboring LTE system cells from specific terminals within the service area using the SON technology. The terminal receiving the dual-registered initialization starts a specific timer in operation 6*b*-24. If the terminal receiving the dual-registered initialization has the dual radio, the terminal can attach to the LTE system while maintaining the connection with the gNB. It means that the dual radio and two RF chains are included. If the terminal has a single radio, only one communication modem may transmit and receive data at a time. Therefore, if it is desired to maintain a connection with the gNB, it should be maintained in the time division scheme. The terminal having the single radio may disconnect the gNB when performing the attach operation to then LTE system. If the specific process (attach process to the target LTE system) is not completed until the timer expires, the dual-registered process is considered to have failed. The success of the attach to the target LTE system is determined by whether an RRC message including an attach accept message is received from an MME **6*b*-10. The terminal may acquire the system information broadcast directly from the target LTE cell (eNB 6*b*-06) in operation 6*b*-26. The terminal attempts the random access to the target LTE cell in operation 6*b*-28. If it fails to acquire the essential system information of the target LTE cell or fails to attempt the random access of the predetermined number of times, the failure may be reported to the gNB in operation 6*b*-30. The gNB receiving the failure report may trigger the inter-RAT handover or retry the dual-registered with another LTE frequency or cell. The failure report may include the frequency information or cell ID information that failed to the access and a cause of the failure. The possible causes of the failure may include system information acquisition failure, random access failure, the expiration of the specific timer, or the like. The terminal transmits an attach request message to the MME 6*b*-10 using the NAS container of the RRC connection setup complete message while performing the RRC connection establishment process in operation 6*b*-32 with the target LTE cell in operation 6*b*-34. At this time, the attach request message includes an indicator indicating that the terminal performs the dual-registered with the LTE system. In addition, it may further indicate whether the dual registration is for inter-RAT mobility support or for inter-RAT aggregation. The inter-RAT mobility support may support the movement of one terminal from one source system to a service area of another system. The inter-RAT aggregation provides services to a terminal connected to one system by being additionally connected to another system for the purpose of improvement in throughput performance. The MME 6*b*-10 receiving the attach request message including the indicator performs S5 session establishment and requests a common IP anchor 6*b*-12 to route the data to be transmitted to the next generation system to the LTE system in operation 6*b*-36. The inter-RAT mobility support transmits all data to the target system when the common IP anchor 6*b*-12 performs a routing change. On the other hand, in the case of the inter-RAT aggregation, when the common IP anchor 6*b*-12 performs the routing change, only a part of data is transmitted to the target system, and some data are still transmitted to the source system. The common IP anchor 6*b*-12 may change the entire data flow or some data flow transmitted to the LTE system to the next generation system in operation 6*b*-44) and inform an NG core 6*b*-08 that the data routing setting has been changed in operation 6*b*-46. The NG core 6*b*-08 may inform the gNB of the change and allow the gNB to instruct a connection release for the terminal in operation 6*b*-48. Alternatively, the data transmission stops, and thus it may implicitly inform the NG core 6*b*-08 that the data routing has changed. If data is no longer transmitted from the gateway to the gNB, the gNB will disconnect from the terminal after a certain time has elapsed. The MME 6*b*-10 successfully receiving the attach request message transmits an attach accept message to the terminal in operation 6*b*-38. The terminal receiving the message considers that the dual-registered operation is successfully completed. At this time, the terminal stops the timer. As one option, after receiving the attach accept message, the terminal may inform the gNB that the dual-registered is successfully completed using a specific message in operation 6*b*-40. The gNB receiving the message releases the connection with the terminal in operation 6*b*-42**. After the completion of the dual-registered process, the disconnection with the next generation system may have a terminal implementation aspect. If the terminal continuously wants to maintain the connection with the next generation system, the uplink data are generated. If a radio link failure (RLF) occurs as in the existing LTE in the connection with the next generation system after the dual-registered operation is successfully completed, the terminal instructs whether the terminal is being dual-registered in the report according to the RLF after RLF declaration or does not report the RLF to the next generation system.

Figure 6C:
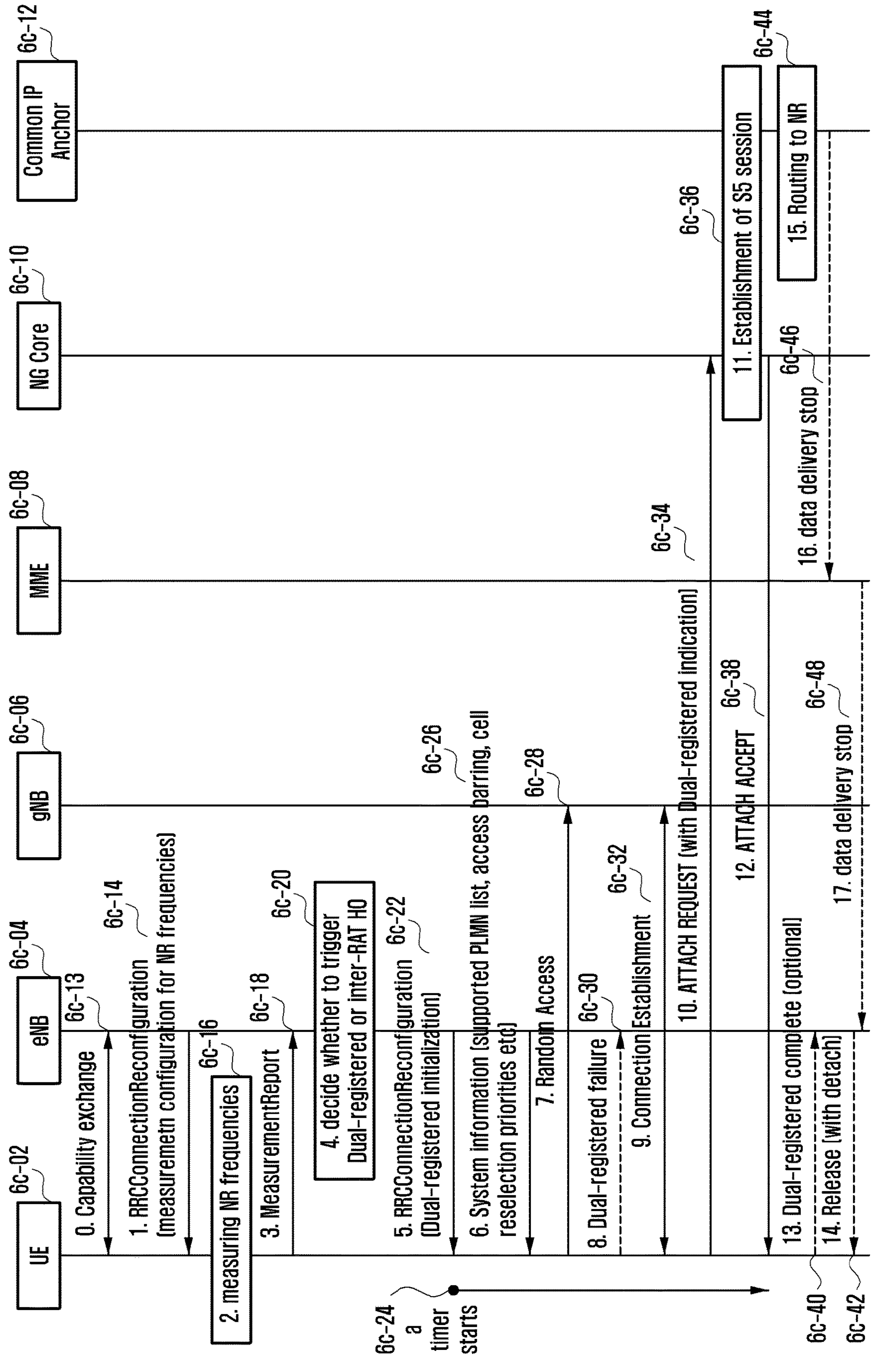
FIG. 6C is a diagram illustrating a signaling flow chart when a terminal moves to a service area of an LTE system of a next generation mobile communication system according to an embodiment of the present disclosure.

FIG. 6C is a diagram illustrating a signaling flow chart when a terminal moves to a service area of an LTE system of the related art in a next generation mobile communication system according to an embodiment of the present disclosure.

Referring to FIG. 6C, a terminal **6*c*-02 in a service area of an eNB 6*c*-04 exchanges capability of supporting dual-registered with each other in operation 6*c*-13**. The eNB informs terminals within the service area whether the LTE system supports dual-registered using system information to be broadcast. The terminal uses UECapabilityInformation, which is dedicated signaling, to inform the eNB whether it supports the dual-registered.

The eNB sets the measurement for the next generation mobile communication (new radio (NR)) frequency to the terminal supporting dual-registered in operation **6*c*-14. The configuration information includes a period for which the next generation mobile communication frequency is measured and a time period for which the next generation mobile communication frequency for each measurement period is measured. The terminal receiving the configuration information may measure the next generation mobile communication frequency during the predetermined time interval at each predetermined period in operation 6*c*-16. Alternatively, the next generation mobile communication frequency may be measured at an appropriate time determined by the terminal itself. An example of the appropriate time is a time interval during which data is not transmitted to or received from the gNB. In order to measure the next generation mobile communication frequency, the terminal turns-on a next generation mobile communication modem. A terminal having a dual radio may keep the next generation mobile communication modem, which is operated once, in an operation state and may turn-on the next generation mobile communication modem every time the next generation mobile communication frequency is measured and then turn-off the next generation mobile communication modem when the measurement is completed. Alternatively, the terminal supporting the dual-registered may measure the next generation mobile communication frequency without being set from the eNB. In this case, however, the next generation mobile communication frequency may be measured only at an appropriate time determined by the terminal itself. The terminal reports the measured result to the eNB in operation 6*c*-18. The gNB determines whether to set dual-registered or inter-RAT handover based on the measurement result and other information in operation 6*b*-20. The eNB sets the dual-registered to the terminal in operation 6c-22. At this time, the RRCConnectionReconfiguration or RRCConnectionRelease message is used. More particularly, since the terminal receiving the RRCConnectionRelease message releases the connection with the source cell, when the source cell is determined, the terminal performs the source cell only when it is determined that it is desirable to release the connection with the terminal. For example, if the terminal has a single radio and thus it is difficult to connect the terminal to both systems at the same time, and if it does not support the function of connecting both systems to each other by the time division scheme, the terminal transmits the RRCConnectionRelease message. The terminal receiving at least one of the messages performs the dual-registered. At this time, the messages may indicate the frequency or cell of the next generation mobile communication system of which the terminal should attempt the attach. Alternatively, a list of frequencies or cells may be provided, and the terminal may attempt attach by selecting one of the frequencies or cells belonging to the list. The frequency or the cell is represented by a frequency bandwidth, center frequency information, and a cell ID (Physical cell ID or ECGI). In addition, in order to reduce the time that the terminal attaches, the message may also include some system information of the next generation mobile communication system cell (gNB 6c-06). The some system information is information necessary for the terminal to access the target system. More specifically, the essential system information may include a PLMN list supported by the next generation mobile communication system cell, a tracking area code, a closed subscriber croup (CSG) cell ID, a frequency band list and spectrum emission information supported by the target system cell, access prohibit-related information (e.g., ACB, EAB, SSAC, ACDC), configuration information related to a random access to the LTE system cell, cell reselection prioritization, and the like. The essential next generation mobile system information of the LTE system cell is reported while the terminal reports the cell measurement according to the request of the eNB, or the eNB may always collect the system information on neighboring next generation mobile communication system cells from specific terminals within the service area using the SON technology. The terminal receiving the dual-registered initialization starts a specific timer in operation 6c-24. If the specific process (attach process to the target next generation mobile communication system) is not completed until the timer expires, the dual-registered process is considered to have failed. The success of the attach to the target next generation mobile communication system is determined by whether an RRC message including an attach accept message is received from the MME 6c-08. The terminal may acquire the system information broadcast directly from the target next generation mobile communication cell in operation 6c-26. The terminal attempts the random access to the target next generation mobile communication cell in operation 6c-28. If it fails to acquire the essential system information of the target next generation mobile communication cell or fails to attempt the random access of the predetermined number of times, the failure may be reported to the eNB in operation 6c-30. The eNB receiving the failure report may trigger the inter-RAT handover or retry the dual-registered with another next generation mobile communication frequency or cell. The failure report may include the frequency information or cell ID information that failed to the access and a cause of the failure. The possible causes of the failure may include system information acquisition failure, random access failure, the expiration of the specific timer, or the like. The terminal transmits the attach request message to an NG core 6c-10 using the NAS container of the specific control plane message while performing the connection establishment process in operation 6c-32 with the target next generation mobile communication cell in operation 6c-34. At this time, the attach request message includes an indicator indicating that the terminal performs the dual-registered with the next generation mobile communication system. The NG core 6c-10 receiving the attach request message including the indicator performs S5 session establishment and requests the common IP anchor 6c-12 to route the data to be transmitted to the LTE to the next generation mobile communication system in operation 6c-36. The common IP anchor 6c-12 requested may change the entire data flow or some data flow transmitted to the next generation mobile communication system to the LTE system in operation 6c-44 and inform the MME 6c-08 that the data routing setting has been changed in operation 6c-46. The MME 6c-08 may inform the eNB of the change and allow the eNB to instruct a connection release for the terminal in operation 6c-48. Alternatively, the data transmission stops, and thus it may implicitly inform the MME 6c-08 that the data routing has changed. If data is no longer transmitted from the gateway to the eNB, the eNB will disconnect from the terminal after a certain time has elapsed. The MME 6c-08 successfully receiving the attach request message transmits an attach accept message to the terminal in operation 6c-38. The terminal receiving the message considers that the dual-registered operation is successfully completed. At this time, the terminal stops the timer. As one option, after receiving the attach accept message, the terminal may inform the eNB that the dual-registered is successfully completed using a specific message in operation 6c-40. The gNB receiving the message releases the connection with the terminal in operation 6c-42**. After the completion of the dual-registered process, the disconnection with the LTE system may have a terminal implementation aspect. If the terminal continuously wants to maintain the connection with the LTE system, the uplink data are generated. If a radio link failure (RLF) occurs in the connection with the LTE system after the dual-registered operation is successfully completed, the terminal instructs whether the terminal is being dual-registered in the related RLF report after RLF declaration or does not report the RLF to the LTE system.

Figure 6D:
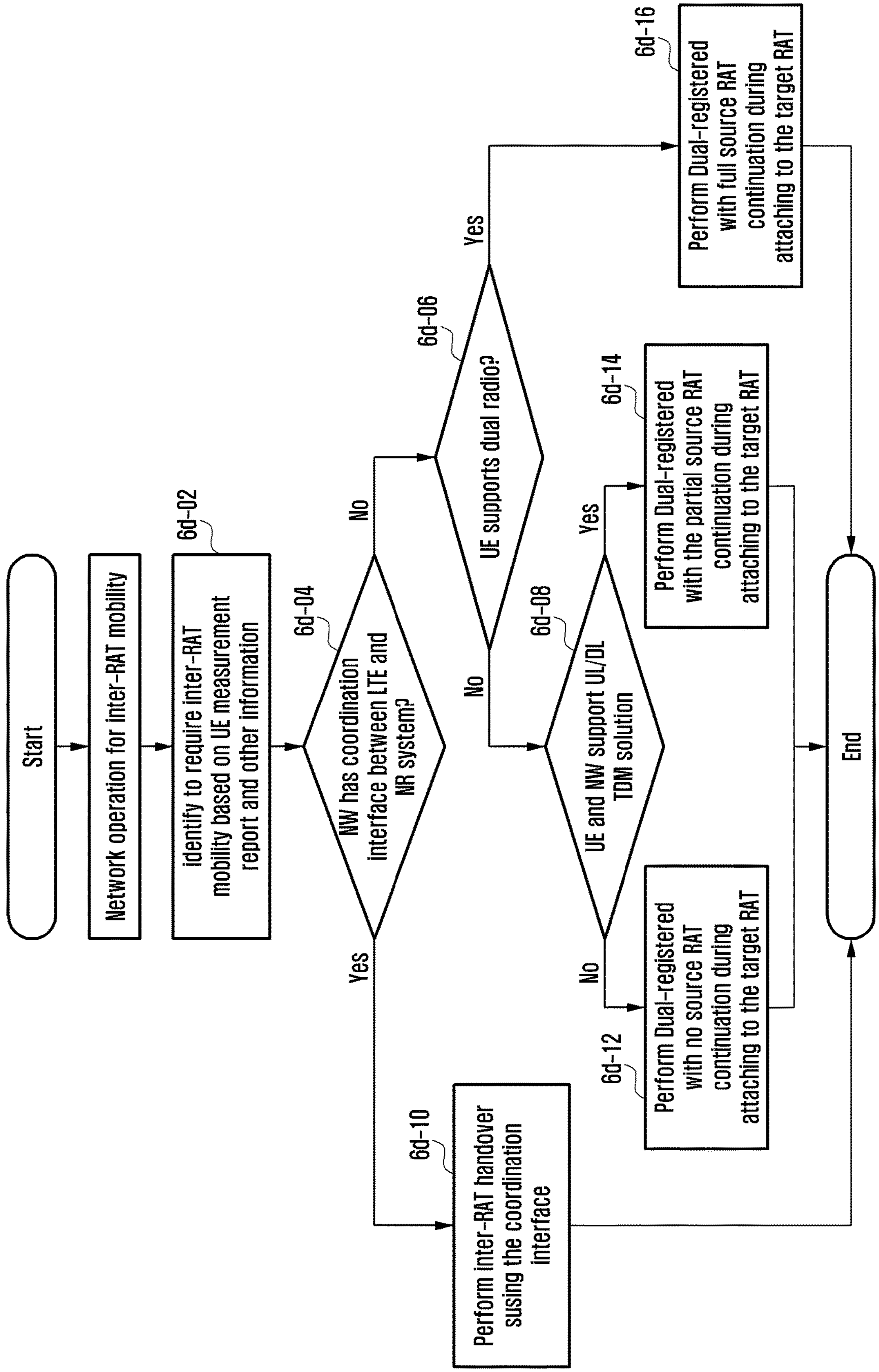
FIG. 6D is a diagram illustrating a process of determining initialization of a dual-registered operation according to an embodiment of the present disclosure.

FIG. 6D is a diagram illustrating a process of determining initialization of a dual-registered operation according to an embodiment of the present disclosure.

Referring to FIG. 6D, the source system determines that the terminal needs to be connected to another system based on the measurement information and various other information reported from the specific terminal in operation 6d-02. In operation 6d-04, the source system determines whether an interface for interworking with the other system is implemented. It is assumed that the interface is essential for supporting the inter-RAT handover, which means at least one interface between the NG Core and the MME, between the gNB and the MME, and between the NG Core and the eNB. If the interface is present, the inter-RAT handover may be supported, so that the handover may be set to the terminal in operation 6d-10. Otherwise, the dual-registered operation needs to be set. Even if the source system has the interface, it is possible to set the dual-registered operation for the purpose of reducing the signaling overhead. In operation 6d-06, it is determined whether the terminal supports the dual radio. The terminal reports the information to the source system in advance. If the terminal has the dual radio, in operation 6d-16, the terminal performs the attach to the target system while maintaining the connection with the current system as it is. The reason for maintaining the connection is to transmit/receive data even during the attach, thereby eliminating the service disconnection. If the terminal does not have the dual radio, in operation **6*d*-08, it determines whether the source system and the terminal support a time division solution. The time division solution is a technique of transmitting and receiving data with one system at a moment. It may be assumed that the terminal supporting the dual-registered have to also support the time division solution. If the time division solution is supported, in operation 6*d*-14, the connection with the source system is maintained and data is transmitted and received in the time division scheme. The timing of transmitting and receiving data between the source system and the target system may overlap. In this case, data transmission/reception with one system is performed according to a predetermined rule. If the time division solution is not supported, in operation 6*d*-12**, the connection with the source system is released and the attach operation is performed.

Figure 6E:
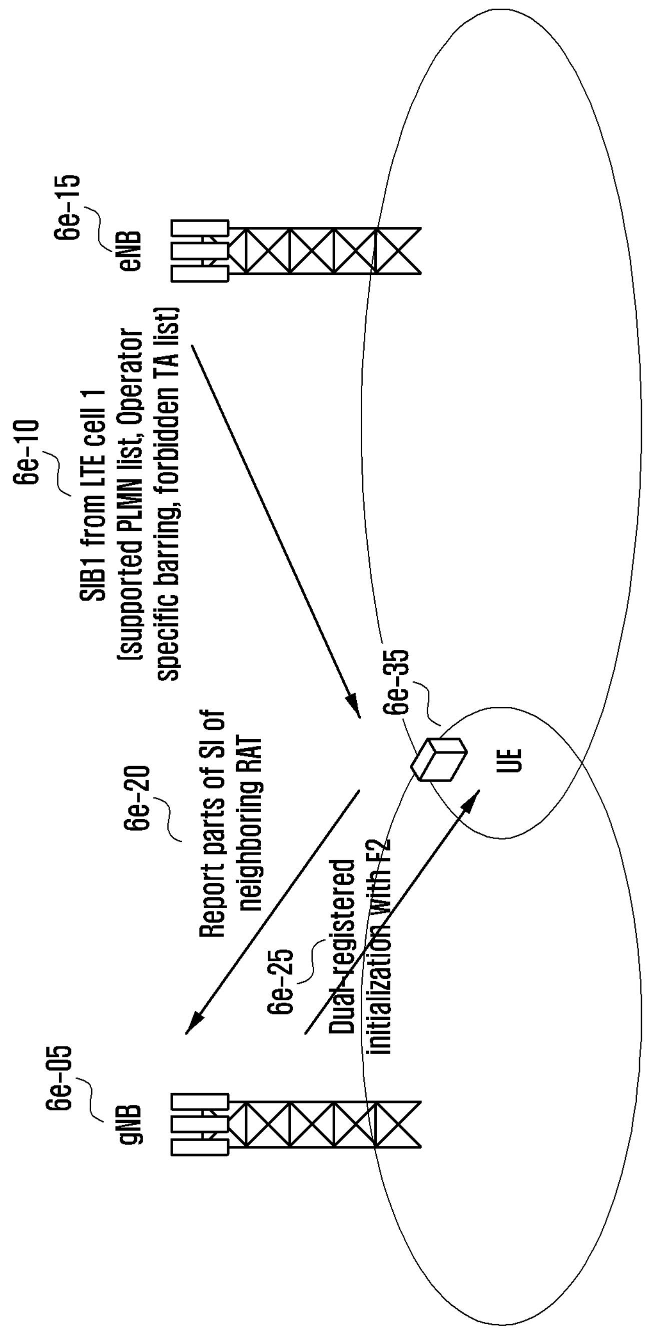
FIG. 6E is a diagram illustrating a process of providing, by a terminal, information necessary for a source system according to an embodiment of the present disclosure.

FIG. 6E is a diagram illustrating a process of providing, by a terminal, information used for a source system according to an embodiment of the present disclosure.

Referring to FIG. 6E, a relatively long time is required for the terminal with the dual-registered to complete the attach to the target system. This means the long service disconnection for the terminal that does not support dual radio. Therefore, a method for reducing time for performing an attach operation may be considered. Further, in order to access the cell, it is determined whether the cell is a suitable cell, and the access may be performed only if it is regarded as a suitable cell. Therefore, if the attach to a cell that is considered to be a suitable cell is attempted before triggering the dual-registered, the access failure probability and the attach time may be reduced. In order to determine whether the cell is suitable, several conditions should be satisfied as follows. The information necessary for confirming the above condition is provided to the terminal as the system information (for example, SIB1 in the LTE).

PLMN check

Operator specific barring

Forbidden TA (Tracking Area) check

Minimum radio condition (i.e., criterion S)

A method for attempting an attach to a cell which is regarded as a suitable cell in advance is as follows.

Option 1: The terminal **6*e*-35 collects (6*e*-10) the system information broadcast by the cell 6*e*-15 of the target system in advance and reports the collected system information to the cell 6*e*-05 of the source system (6*e*-20). The cell of the source system determines the cell to be regarded as the suitable cell of the UE using the information, and sets the cell to be dual-registered with the target cell (6*e*-25**).

Since the system information is not frequently changed information, the cell of the source system may collect the system information through the terminals in the service area using the SON technology.

Option 2: The terminal collects the system information broadcast by the cell of the target system in advance and reports the list of cells, which is regarded as the suitable cell, to the cells of the source system. The cell of the source system is set to be dual-registered with one cell or a plurality of cells in the list. The terminal performs the dual-registered with one of the one or more target cells.

The dual registration may also be used for inter-RAT aggregation purposes to improve throughput performance of the terminal. If the source system wishes to improve the throughput performance of a particular terminal through the simultaneous transmission and reception of data with another system, the source system triggers the dual registration. However, the target system may already be in a network congestion state by servicing many terminals. Therefore, if the dual registration is performed on such a target system, the above object will not be achieved. Accordingly, the terminal collects access barring information from the system information of the target system and reports the access barring information to the source system. This allows the source system to determine whether the target system is in the network congestion state. If a normal network congestion state occurs, the base station controls it through access barring. Alternatively, information that may accurately indicate the network congestion state in the target system may be broadcast by being included in the system information. The terminal collecting the information reports it to the source system so that the source system may use it to determine the trigger of the dual registration.

Figure 6F:
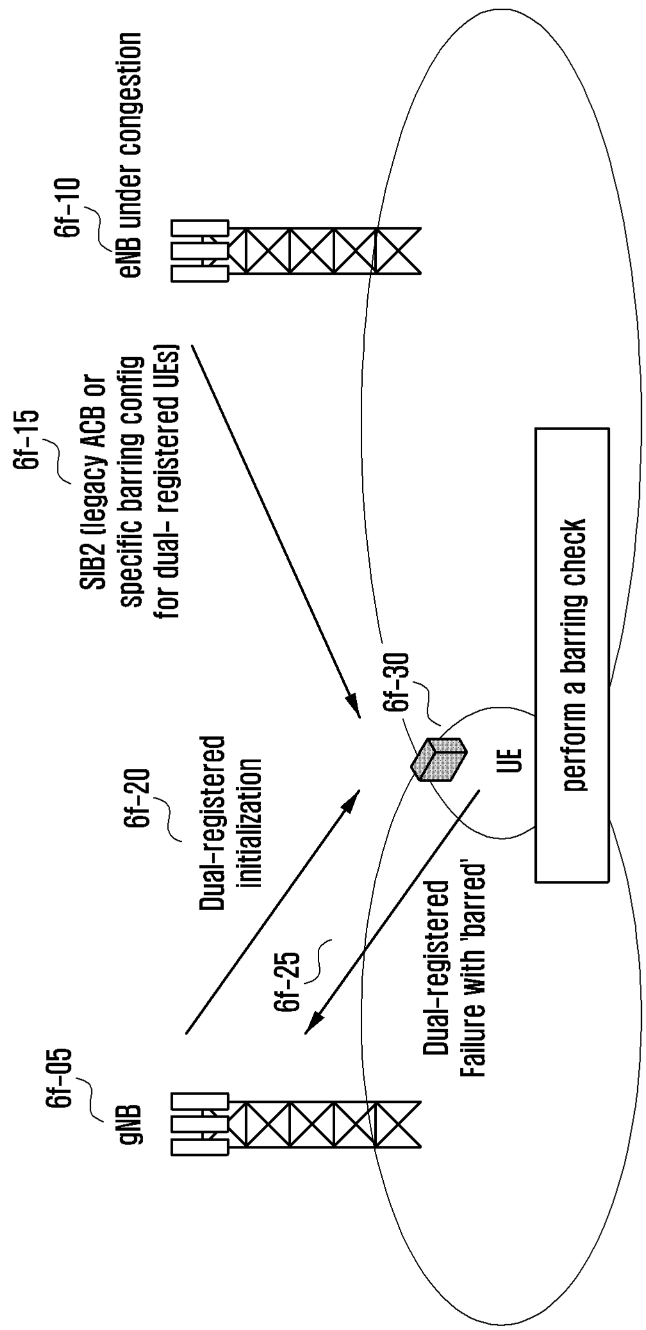
FIG. 6F is a diagram illustrating a process of confirming access barring before a terminal performs an attach operation to a target cell according to an embodiment of the present disclosure.

FIG. 6F is a diagram illustrating a process of confirming access barring before a terminal performs an attach operation to a target cell according to an embodiment of the present disclosure.

Referring to FIG. 6F, in the target system **6*f*-10, it may also be desirable to suppress the access connection to the terminal performing the dual-registration in order to control the congestion situation in the network. If the dual-registered is set in the LTE system (6*f*-20), the terminal may use the existing LTE access barring mechanism. For example, before the random access is attempted, it may be determined whether the cell is barring using the access barring configuration information 6*f*-15 broadcast by the cell of the target LTE system (6*f*-30). Alternatively, the access barring configuration information of the cell of the target LTE system collected in advance by the source cell may be received together with the dual-registered configuration information to determine whether the cell is barring. If the target cell 6*f*-05 is considered to be barred by the barring check, it reports that the dual-registered operation failed due to the access barring to the source cell (6*f*-25**). The existing LTE access barring mechanism refers to ACB, EAB, SSAC and ACDC, and at least one of them is applied. In addition to the existing barring mechanism, a separate barring mechanism may be considered for the terminal that performs the dual-registered.

The target system may also want to control inter-frequency loading for the terminal that performs the dual-registered. For this purpose, in the existing LTE system, frequency-cell reselection priority information is provided to the terminal, and the cell is reselected based on the information. The priority information may be broadcast by allowing a cell to use system information or may be set to a specific cell by dedicated signaling.

One method is to allow the cell performing the dual-registered to use cell reselection priority information applied in the target system. Option 1: The terminal collects cell reselection priority information that is broadcast from neighboring systems. The collected information is reported to the source system. The source system sets a target frequency at which the terminal performs the dual-registered based on the priority information.

Option 2: The terminal collects cell reselection priority information that is broadcast from neighboring systems. The source system provides a candidate list of neighboring target cells to the terminal irrespective of the priority information. The candidate list may be determined based on the cell measurement result. The terminal considers the collected priority information and selects one of the cells included in the list as the target cell. The target cell may be considered not only priority information but also cell measurement information.

If the terminal has both the cell reselection priority information broadcast and the priority information provided as the dedicated signaling, the terminal performs the above operation based on the priority information provided as the dedicated signaling.

Figure 6G:
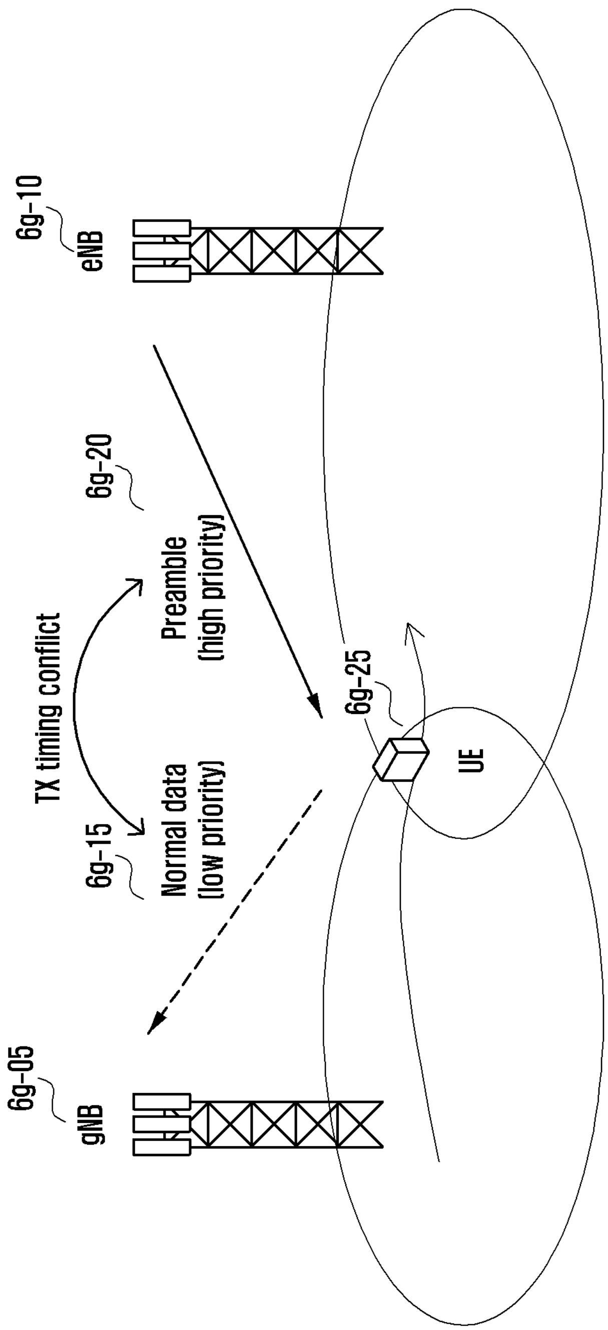
FIG. 6G is a diagram illustrating a method for performing, by a terminal, an uplink power control according to an embodiment of the present disclosure.

FIG. 6G is a diagram illustrating a method for performing, by a terminal, an uplink power control according to an embodiment of the present disclosure.

Referring to FIG. 6G, the terminal that performs the dual-registered may experience a phenomenon of transmit power shortage in the uplink. More particularly, since most of the area performed by the dual-registered is the boundary area of the cell, higher transmit power may be required in the uplink. In the case of the terminal having the dual radio, data can be transmitted and received between two cells at the same time during the dual-registered operation, and if the data transmission timings overlap in the uplink, the transmit power may be insufficient on the terminal side. A solution thereof is to concentrate the transmit power on the link to one cell by the time division scheme. However, since the dual-registered operation is a technology used in a scenario in which there is no information exchange between two systems, sharing of the time division pattern and the like in two systems will be excluded. Therefore, the terminal itself has to determine on which link the transmit power of the terminal should be concentrated.

The terminal assigns priority according to the type of data transmitted to both cells. It may assign a higher priority to data transmission that are important for successfully performing the dual-registered. For example, the higher priority is assigned to the random access to the target cell, the message associated with the attach operation, and the like. Alternatively, the higher priority may be always assigned to the uplink data transmission to the target cell. The terminal 6g-25 determines whether or not data transmission to both cells 6g-05 and 6g-10 overlap each other at each transmission timing, and if overlapped, the transmit power is concentrated on one of the both cells based on the priority information 6g-15 and 6g-20 assigned to each data transmission. The remaining links may be transmitted with the remaining small amount of transmit power, or may restrict the transmission itself. Data that can not be transmitted will be retransmitted at different time by the retransmission techniques, such as HARQ and ARQ.

Figure 6H:
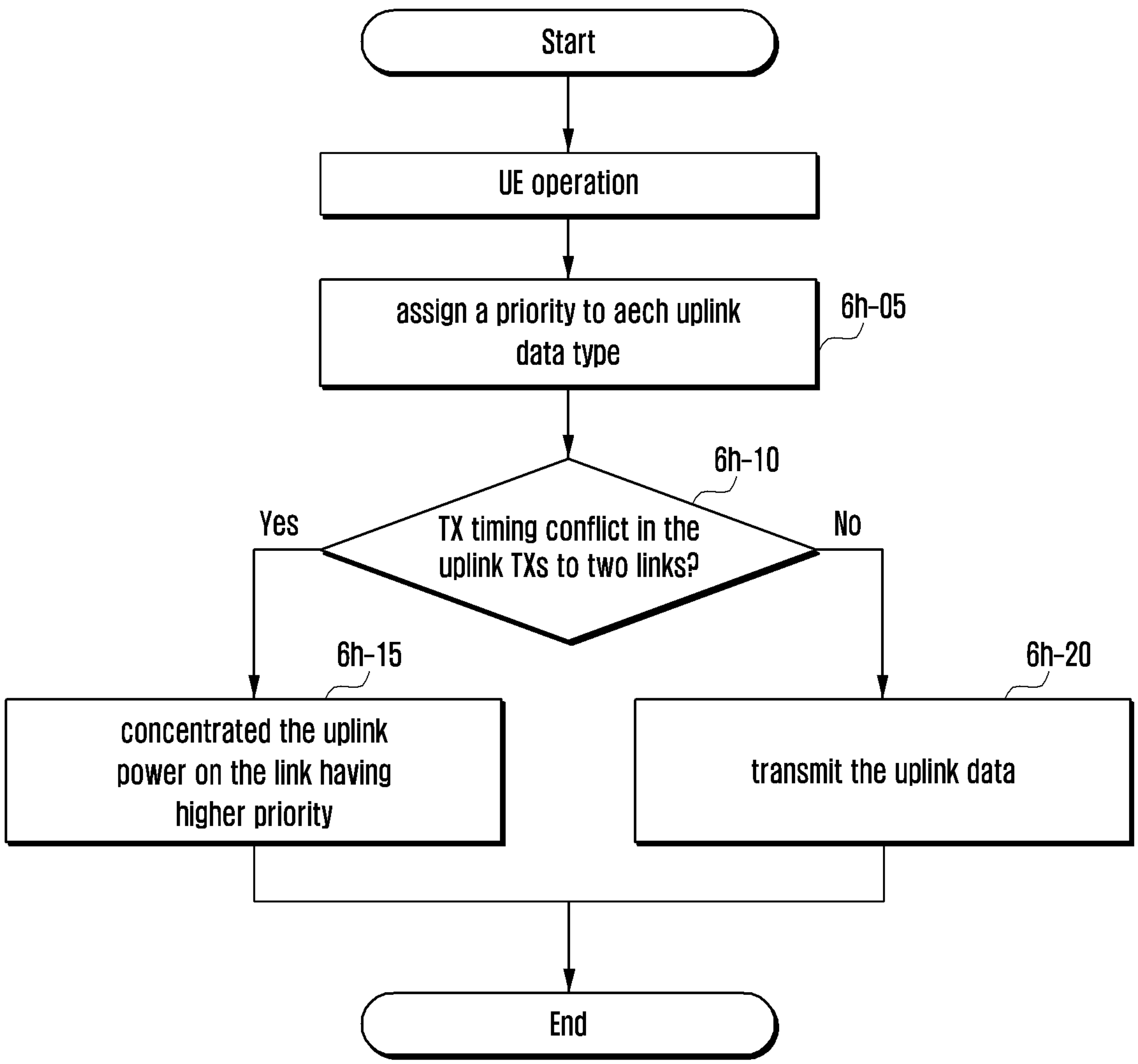
FIG. 6H is a diagram illustrating an operation flow block for performing, by a terminal, an uplink power control according to an embodiment of the present disclosure.

FIG. 6H is a diagram illustrating an operation flow block for performing, by a terminal, an uplink power control according to an embodiment of the present disclosure.

Referring to FIG. 6H, in operation 6h-05, the terminal assigns priority according to the type of data to be transmitted to one or both of the cells at every transmission timing. In operation 6h-10, it is determined whether the data transmission overlaps due to the generation of the data transmission to both cells is generated. If overlapped, the transmit power is concentrated on one of the links based on the assigned priority information in operation 6h-15. At this time, the concentration ratio is determined by the terminal implementation. If not overlapped, in operation 6h-20, the data to be transmitted at the corresponding timing is transmitted to the corresponding one cell.

Figure 6I:
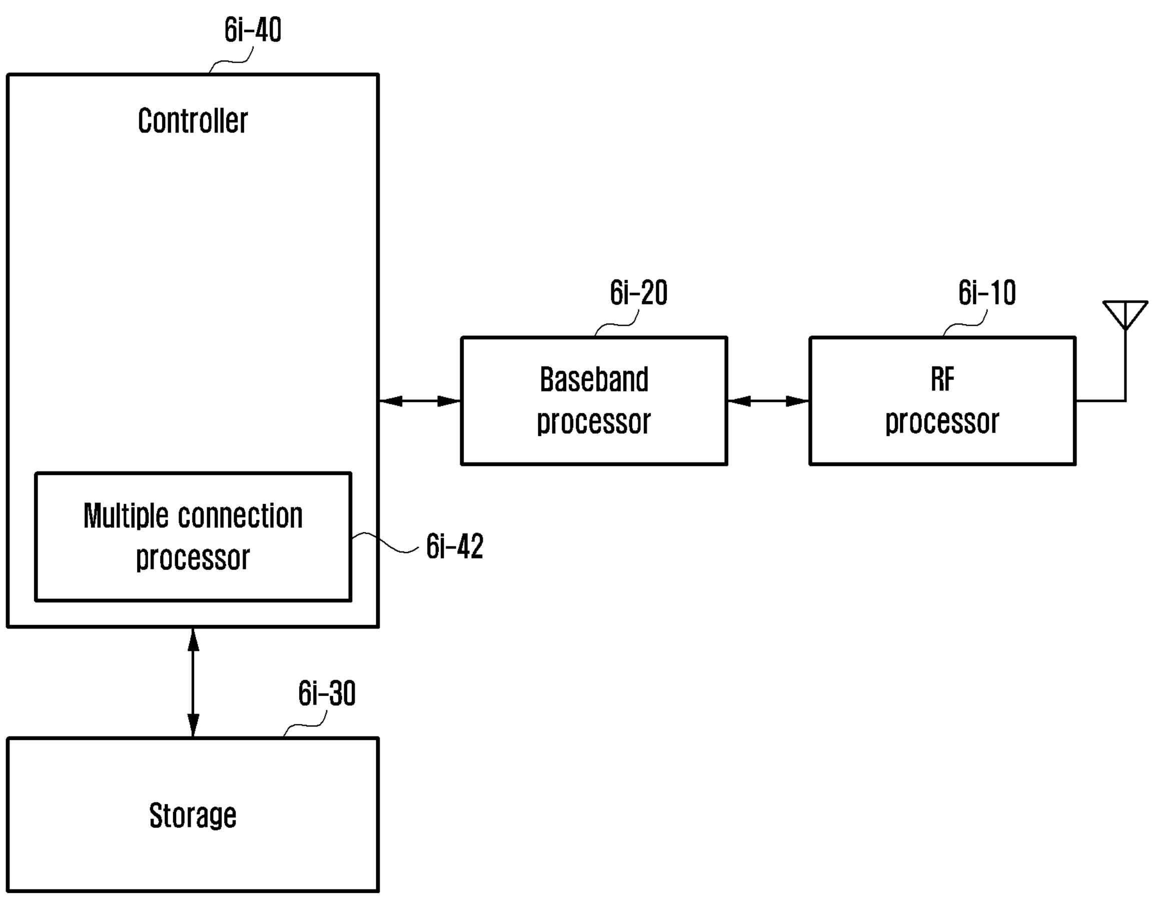
FIG. 6I is a block diagram illustrating an internal structure of a terminal according to an embodiment of the present disclosure.

FIG. 6I is a block diagram illustrating an internal structure of a terminal according to an embodiment of the present disclosure.

Referring to FIG. 6I, the terminal includes a radio frequency (RF) processor 6i-10, a baseband processor 6i-20, a storage 6i-30, and a controller 6i-40.

The RF processor 6i-10 serves to transmit and receive a signal through a radio channel, such as band conversion and amplification of a signal. For example, the RF processor 6i-10 up-converts a baseband signal provided from the baseband processor 6i-20 into an RF band signal and then transmits the RF band signal through an antenna and down-converts the RF band signal received through the antenna into the baseband signal. For example, the RF processor 6i-10 may include a transmitting filter, a receiving filter, an amplifier, a mixer, an oscillator, a digital to analog converter (DAC), an analog to digital converter (ADC), or the like. FIG. 6i illustrates only one antenna but the terminal may include a plurality of antennas. Further, the RF processor 6i-10 may include a plurality of RF chains. Further, the RF processor 6i-10 may perform beamforming. For the beamforming, the RF processor 6i-10 may adjust a phase and a size of each of the signals transmitted and received through a plurality of antennas or antenna elements. In addition, the RF processor may perform MIMO and may receive a plurality of layers when performing the MIMO operation.

The baseband processor 6i-20 performs a conversion function between a baseband signal and a bit string according to a physical layer standard of a system. For example, when data are transmitted, the baseband processor 6i-20 generates complex symbols by coding and modulating a transmitted bit string. Further, when data are received, the baseband processor 6i-20 recovers the received bit string by demodulating and decoding the baseband signal provided from the RF processor 6i-10. For example, according to the OFDM scheme, when data are transmitted, the baseband processor 6i-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 6i-20 divides the baseband signal provided from the RF processor 6i-10 in an OFDM symbol unit and recovers the signals mapped to the sub-carriers by a fast Fourier transform (FFT) operation and then recovers the received bit string by the modulation and decoding.

The baseband processor 6i-20 and the RF processor 6i-10 transmit and receive a signal as described above. Therefore, the baseband processor 6i-20 and the RF processor 6i-10 may be called a transmitter, a receiver, a transceiver, or a communication unit. Further, at least one of the baseband processor 6i-20 and the RF processor 6i-10 may include a plurality of communication modules to support a plurality of different radio access technologies. Further, at least one of the baseband processor 6i-20 and the RF processor 6i-10 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2 NRHz) band, a millimeter wave (for example: 60 GHz) band.

The storage 6i-30 stores data, such as basic programs, application programs, and configuration information for the operation of the terminal. More particularly, the storage 6i-30 may store information associated with a second access node performing wireless communication using a second access technology. Further, the storage 6*i*-30 provides the stored data according to the request of the controller 6*i*-40.

The controller 6*i*-40 includes a multiple connection processor 6*i*-42 and controls the overall operations of the terminal. For example, the controller 6*i*-40 transmits and receives a signal through the baseband processor 6*i*-20 and the RF processor 6*i*-10. Further, the controller 6*i*-40 records and reads data in and from the storage 6*i*-40. For this purpose, the controller 6*i*-40 may include at least one processor. For example, the controller 6*i*-40 may include a communication processor (CP) performing a control for communication and an application processor (AP) controlling an upper layer, such as the application programs.

Figure 6J:
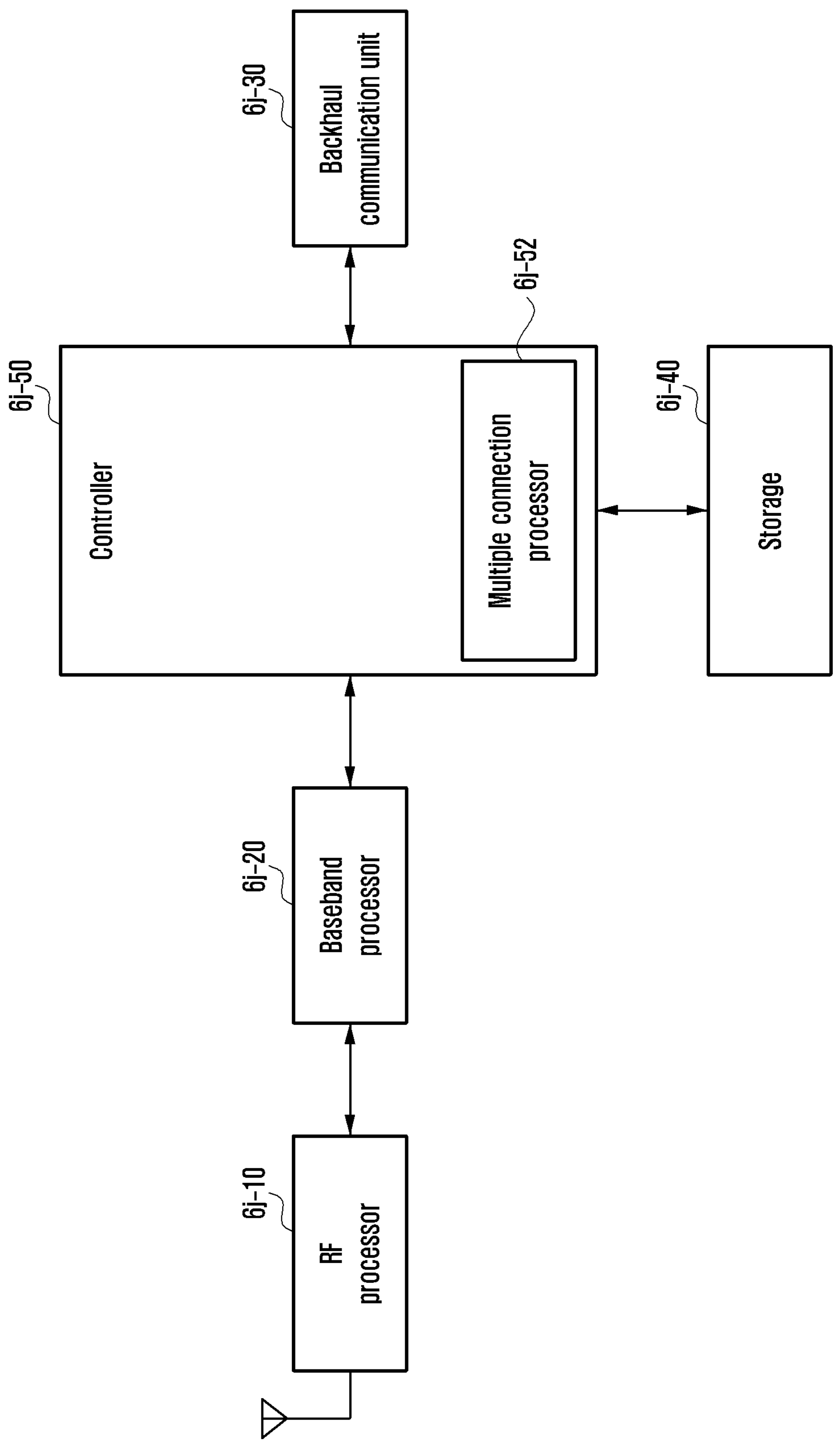
FIG. 6J is a block diagram illustrating a configuration of a base station transceiver according to an embodiment of the present disclosure.

FIG. 6J is a block diagram illustrating a configuration of a base station transceiver according to an embodiment of the present disclosure.

Referring to FIG. 6J, the base station is configured to include an RF processor 6*j*-10, a baseband processor 6*j*-20, a backhaul communication unit 6*j*-30, a storage 6*j*-40, and a controller 6*j*-50.

The RF processor 6*j*-10 serves to transmit and receive a signal through a radio channel, such as band conversion and amplification of a signal. For example, the RF processor 6*j*-10 up-converts a baseband signal provided from the baseband processor 6*j*-20 into an RF band signal and then transmits the RF band signal through an antenna and down-converts the RF band signal received through the antenna into the baseband signal. For example, the RF processor 6*j*-10 may include a transmitting filter, a receiving filter, an amplifier, a mixer, an oscillator, a DAC, an ADC, or the like. FIG. 6J illustrates only one antenna but the first access node may include a plurality of antennas. Further, the RF processor 6*j*-10 may include a plurality of RF chains. Further, the RF processor 6*j*-10 may perform the beamforming. For the beamforming, the RF processor 6*j*-10 may adjust a phase and a size of each of the signals transmitted/received through a plurality of antennas or antenna elements. The RF processor may perform a downward MIMO operation by transmitting one or more layers.

The baseband processor 6*j*-20 performs a conversion function between the baseband signal and the bit string according to the physical layer standard of the first radio access technology. For example, when data are transmitted, the baseband processor 6*j*-20 generates complex symbols by coding and modulating a transmitted bit string. Further, when data are received, the baseband processor 2*j*-20 recovers the received bit string by demodulating and decoding the baseband signal provided from the RF processor 2*j*-10. For example, according to the OFDM scheme, when data are transmitted, the baseband processor 6*j*-20 generates the complex symbols by coding and modulating the transmitting bit string, maps the complex symbols to the sub-carriers, and then performs the IFFT operation and the CP insertion to construct the OFDM symbols. Further, when data are received, the baseband processor 6*j*-20 divides the baseband signal provided from the RF processor 6*j*-10 in the OFDM symbol unit and recovers the signals mapped to the subcarriers by the FFT operation and then recovers the receiving bit string by the modulation and decoding. The baseband processor 6*j*-20 and the RF processor 6*j*-10 transmit and receive a signal as described above. Therefore, the baseband processor 6*j*-20 and the RF processor 6*j*-10 may be called a transmitter, a receiver, a transceiver, or a communication unit.

The backhaul communication unit 6*j*-30 provides an interface for performing communication with other nodes within the network. For example, the backhaul communication unit 6*j*-30 converts bit strings transmitted from the main base station to other nodes, for example, an auxiliary base station, a core network, and the like, into physical signals and converts the physical signals received from other nodes into the bit strings.

The storage 6*j*-40 stores data, such as basic programs, application programs, and configuration information for the operation of the main base station. More particularly, the storage 6*j*-40 may store the information on the bearer allocated to the accessed terminal, the measured results reported from the accessed terminal, and the like. Further, the storage 6*j*-40 may store information that is a determination criterion on whether to provide a multiple connection to the terminal or stop the multiple connection to the terminal. Further, the storage 6*j*-40 provides the stored data according to the request of the controller 6*j*-50.

The controller 6*j*-50 includes a multiple connection processor 6*j*-52 and controls the general operations of the main base station. For example, the controller 6*j*-50 transmits/receives a signal through the baseband processor 6*j*-20 and the RF processor 6*j*-10 or the backhaul communication unit 6*j*-30. Further, the controller 6*j*-50 records and reads data in and from the storage 6*j*-40. For this purpose, the controller 6*j*-50 may include at least one processor.

Hereinafter, the MAC PDU structures for supporting the next generation mobile communication system is proposed and the method and apparatus for selecting the structures will be described.

Seventh Embodiment

A term used for identifying a connection node used in the following description, a term referring to network entities, a term referring to messages, a term referring to an interface between network objects, a term referring to various identification information, or the like are illustrated for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3rd generation partnership project long term evolution (3GPP LTE). However, the present disclosure is not limited to the terms and names but may also be identically applied to the system according to other standards.

The RLC apparatus (entity, hereinafter, apparatus) and the PDCP apparatus (entity, hereinafter, apparatus) of the next generation mobile communication system may differ from the RLC entity and the PDCP entity of the current LTE system. Therefore, when the next generation mobile communication system and the LTE system interwork with each other to provide a service, the RLC entity and the PDCP entity of the next generation mobile communication system set the correct operation in order to interwork with the RLC entity and the PDCP entity of the LTE system well.

Figure 7A:
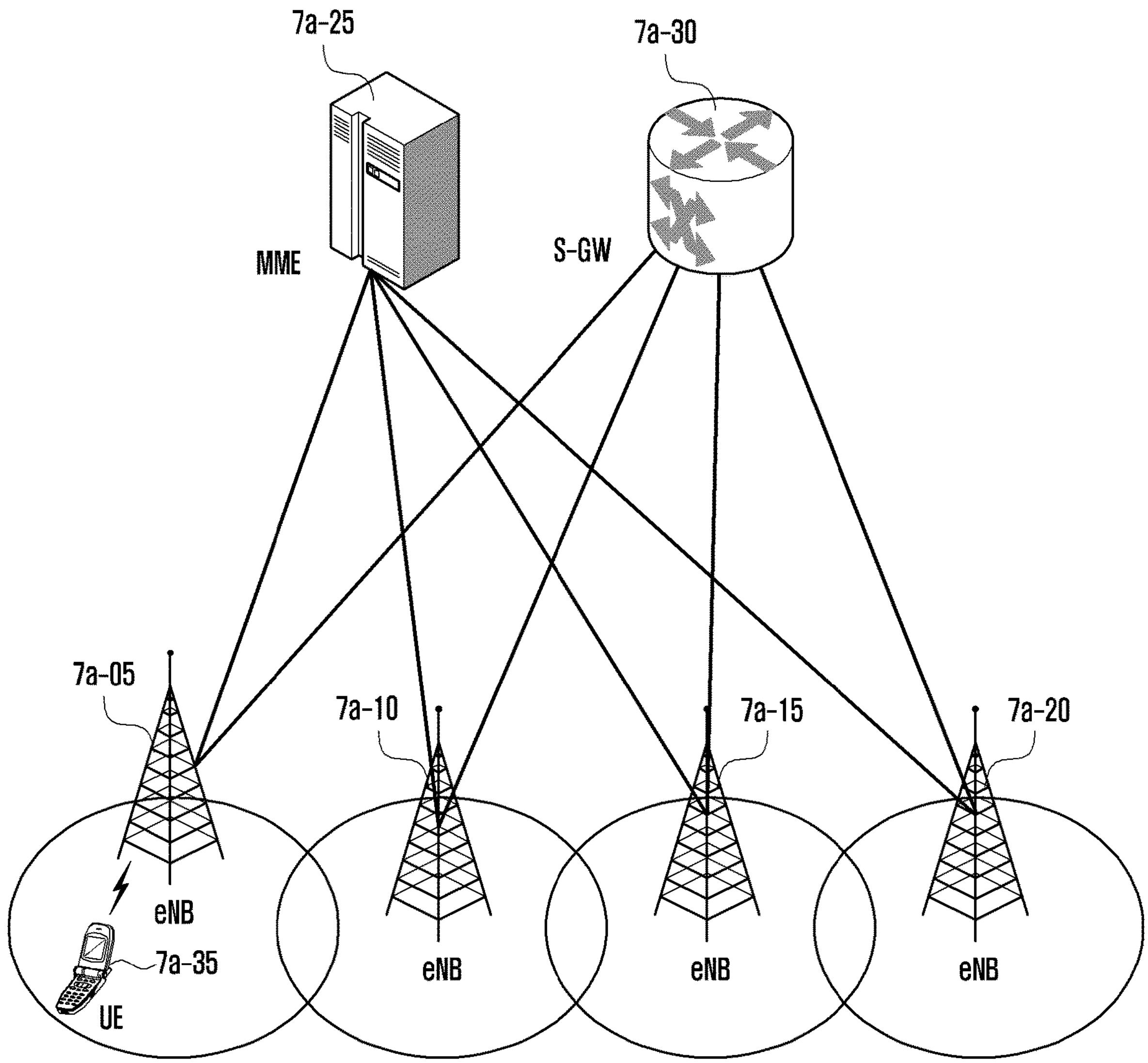
FIG. 7A is a diagram illustrating a structure of an LTE system according to an embodiment of the present disclosure.

FIG. 7A is a diagram illustrating a structure of an LTE system according to an embodiment of the present disclosure.

Referring to FIG. 7A, a radio access network of an LTE system is configured to include next generation base stations (evolved node B, hereinafter, eNB, Node B, or base station) 7*a*-05, 7*a*-10, 7*a*-15, and 7*a*-20, a mobility management entity (MME) 7*a*-25, and a serving-gateway (S-GW) 7*a*-30. User equipment (hereinafter, UE or terminal) 7*a*-35 accesses an external network through the eNBs 7*a*-05 to 7*a*-20 and the S-GW 7*a*-30.

In FIG. 7A, the eNBs 7*a*-05 to 7*a*-20 correspond to the existing node B of the UMTS system. The eNB is connected to the UE 7*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmission power status, and a channel state of the terminals is required. Here, the eNBs 7*a*-05 to 7*a*-20 take charge of the collecting and scheduling. One eNB generally controls a plurality of cells. For example, to implement a transmission rate of 100 Mbps, the LTE system uses, as a radio access technology, OFDM, for example, in a bandwidth of 20 MHz. Further, an adaptive modulation & coding (hereinafter, called AMC) determining a modulation scheme and a channel coding rate depending on the channel status of the terminal is applied. The S-GW 7*a*-30 is an apparatus for providing a data bearer and generates or removes the data bearer according to the control of the MME 7*a*-25. The MME is an apparatus for performing a mobility management function for the terminal and various control functions and is connected to a plurality of base stations.

Figure 7B:
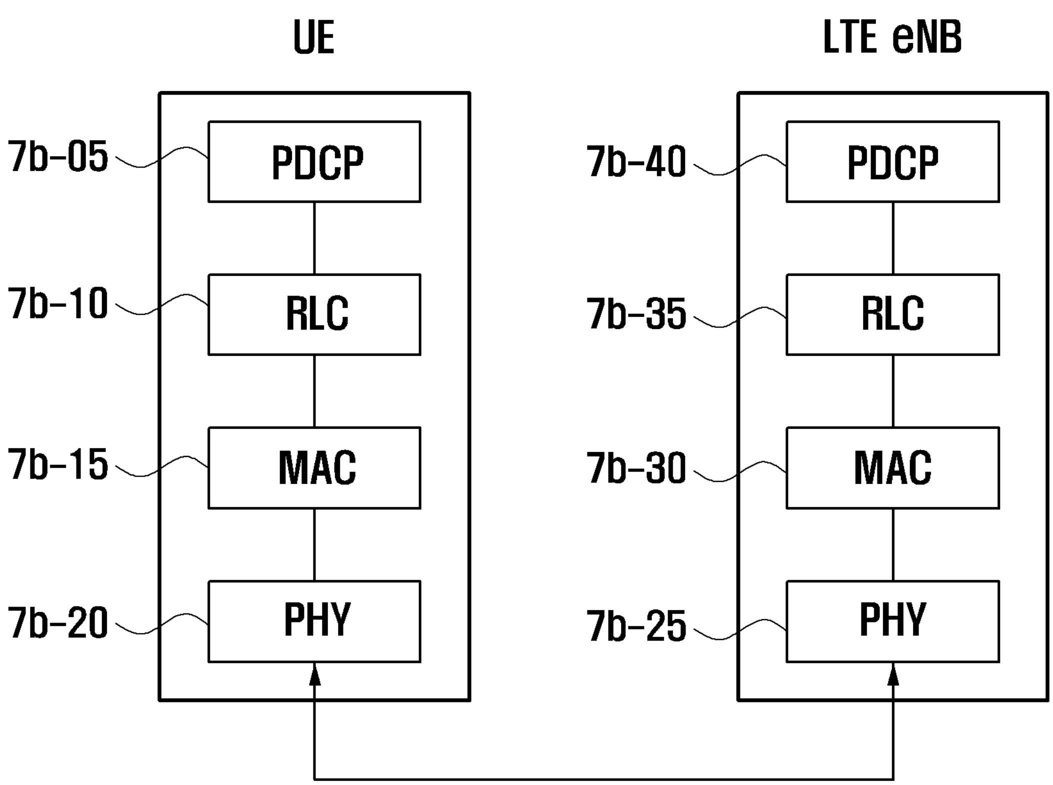
FIG. 7B is a diagram illustrating a radio protocol structure in an LTE system according to an embodiment of the present disclosure.

FIG. 7B is a diagram illustrating a radio protocol structure in an LTE system according to an embodiment of the present disclosure.

Referring to FIG. 7B, the radio protocol of the LTE system is configured to include PDCPs 7*b*-05 and 7*b*-40, RLCs 7*b*-10 and 7*b*-35, and medium access controls (MMCs) 7*b*-15 and 7*b*-30 in the terminal and the eNB, respectively. The PDCPs 7*b*-05 and 7*b*-40 are in charge of operations, such as IP header compression/decompression. The main functions of the PDCP are summarized as follows.

- Header compression and decompression function (Header compression and decompression: ROHC only)
- Transfer function of user data (Transfer of user data)
- In-sequence delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU discard function (Timer-based SDU discard in uplink)

The RLCs 7*b*-10 and 7*b*-35 reconfigures the PDCP PDU to an appropriate size to perform the ARQ operation or the like. The main functions of the RLC are summarized as follows.

- Data transfer function (Transfer of upper layer PDUs)
- ARQ function (Error Correction through ARQ (only for AM data transfer))
- Concatenation, segmentation, reassembly functions (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer))
- Duplicate detection function (Duplicate detection (only for UM and AM data transfer))
- Error detection function (Protocol error detection (only for AM data transfer))
- RLC SDU discard function (RLC SDU discard (only for UM and AM data transfer))
- RLC re-establishment function (RLC re-establishment)

The MACs 7*b*-15 and 7*b*-30 are connected to several RLC layer apparatus configured in one terminal and perform an operation of multiplexing RLC PDUs into an MAC PDU and demultiplexing the RLC PDUs from the MAC PDU. The main functions of the MAC are summarized as follows.

- Mapping function (Mapping between logical channels and transport channels)
- Multiplexing/demultiplexing function (Multiplexing/demultiplexing of MAC SDUs belonging to one or different logical channels into/from transport blocks (TB) transferred to/from the physical layer on transport channels)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

Physical layers 7*b*-20 and 7*b*-25 perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 7C:
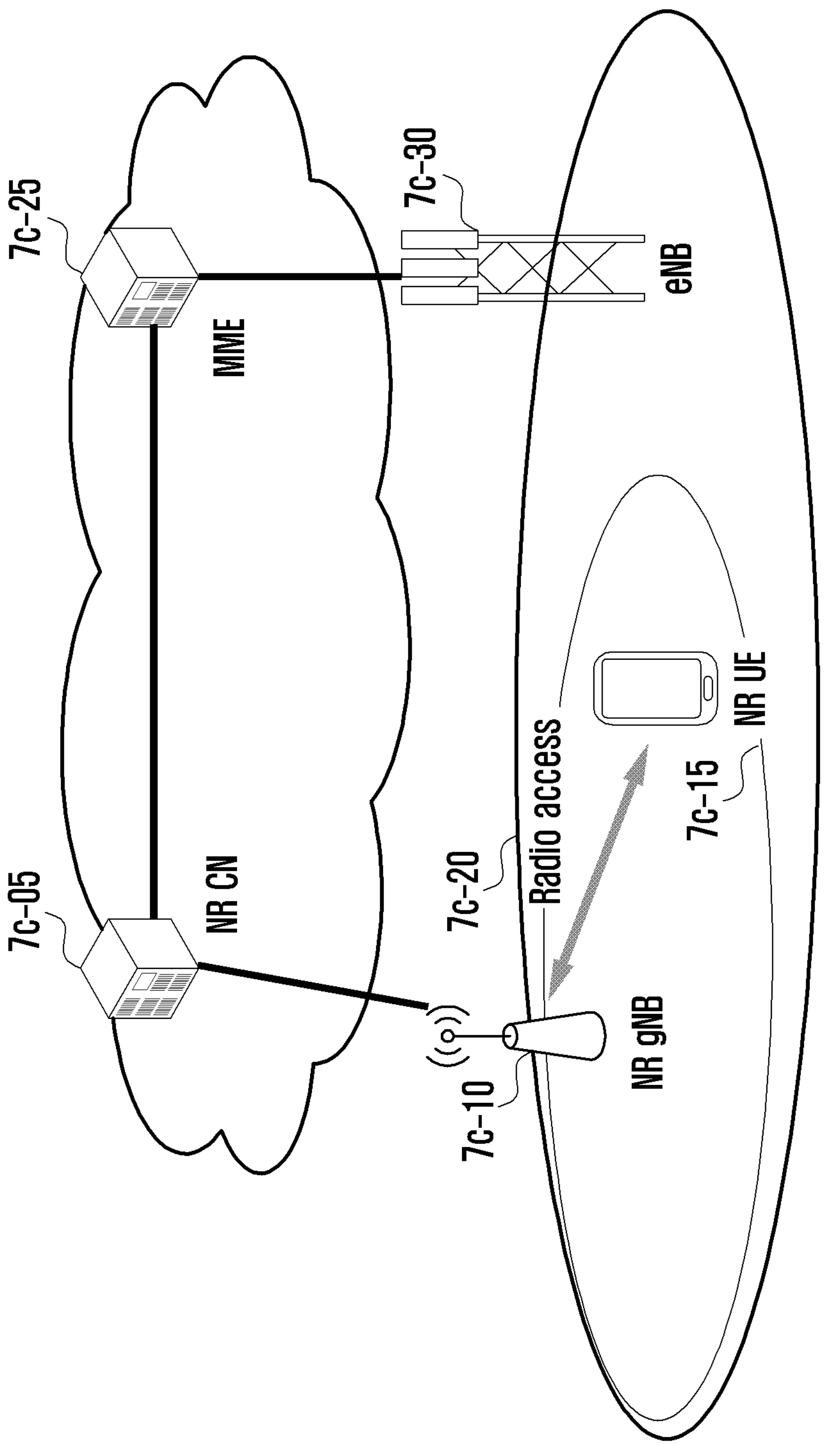
FIG. 7C is a diagram illustrating a structure of a next generation mobile communication system according to an embodiment of the present disclosure.

FIG. 7C is a diagram illustrating a structure of a next generation mobile communication system according to an embodiment of the present disclosure.

Referring to FIG. 7C, a radio access network of a next generation mobile communication system (hereinafter referred to as NR or 5G) is configured to include a next generation base station (New radio node B, hereinafter NR gNB or NR base station) 7*c*-10 and a new radio core network (NR CN) 7*c*-05. The user terminal (new radio user equipment, hereinafter, NR UE or UE) 7*c*-15 accesses the external network through the NR gNB 7*c*-10 and the NR CN 7*c*-05.

In FIG. 7C, the NR gNB 7*c*-10 corresponds to an evolved node B (eNB) of the existing LTE system. The NR gNB is connected to the NR UE 7*c*-15 via a radio channel and may provide a service superior to the existing node B. In the next generation mobile communication system, since all user traffics are served through a shared channel, an apparatus for collecting state information, such as a buffer state, an available transmission power state, and a channel state of the terminal to perform scheduling is required. The NR NB 7*c*-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a radio access technology 7*c*-20. Further, an adaptive modulation & coding (hereinafter, called AMC) determining a modulation scheme and a channel coding rate depending on the channel status of the terminal is applied. The NR CN 7*c*-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 7*c*-25 through the network interface. The MME is connected to the eNB 7*c*-30 which is the existing base station.

Figure 7D:
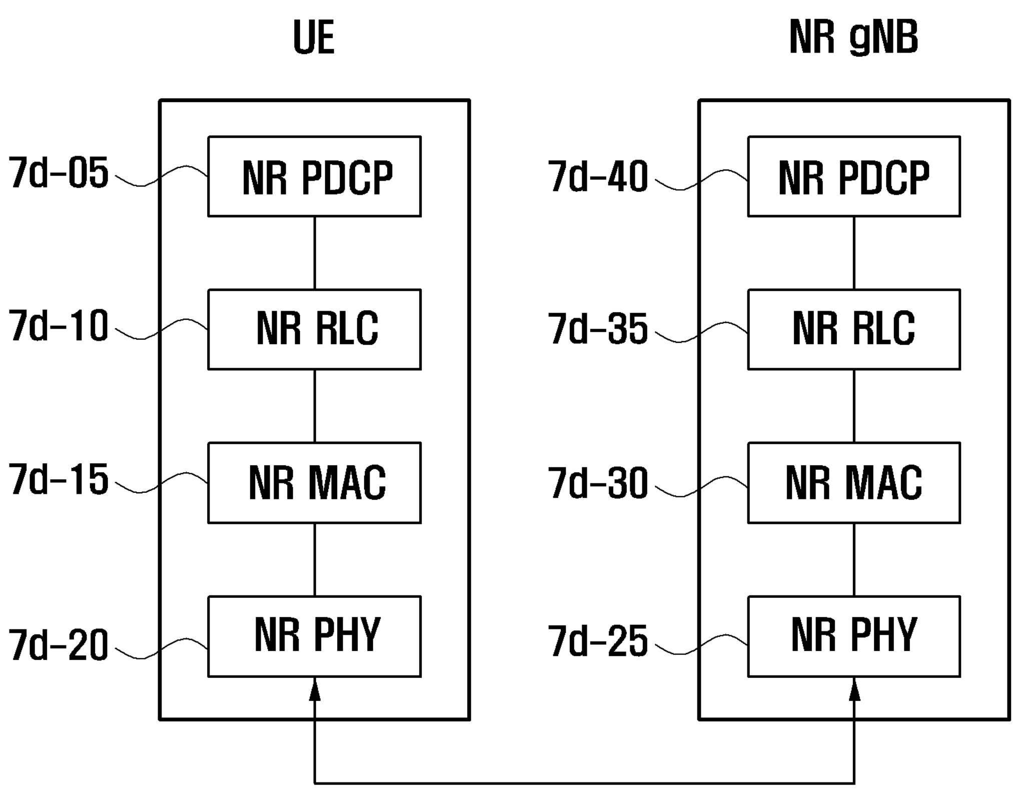
FIG. 7D is a diagram illustrating a radio protocol structure of a next generation mobile communication system according to an embodiment of the present disclosure.

FIG. 7D is a diagram illustrating a radio protocol structure of a next generation mobile communication system according to an embodiment of the present disclosure.

Referring to FIG. 7D, the radio protocol of the next generation mobile communication system is configured to include NR PDCPs 7*d*-05 and 7*d*-40, NR RLCs 7*d*-10 and 7*d*-35, and NR MACs 7*d*-15 and 7*d*-30 in the terminal and the NR base station. The main functions of the NR PDCPs 7*d*-05 and 7*d*-40 may include some of the following functions.

- Header compression and decompression function (Header compression and decompression: ROHC only)
- Transfer function of user data (Transfer of user data)
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink))

In this case, the reordering function of the NR PDCP apparatus refers to a function of rearranging PDCP PDUs received in a lower layer in order based on a PDCP sequence number (SN) and may include a function of transferring data to an upper layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 7*d*-10 and 7*d*-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)
- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above description, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the upper layer in order when there is the lost RLC SDU, a function of transferring all the received RLC SDUs to the upper layer before a predetermined timer starts if the timer expires even if there is the lost RLC SDU, or a function of transferring all the RLC SDUs received until now to the upper layer in order if the predetermined timer expires even if there is the lost RLC SDU.

In this case, the out-of-sequence delivery function of the NR RLC apparatus refers to a function of directly delivering the RLC SDUs received from the lower layer to the upper layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 2*d*-15 and 3*d*-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

The NR PHY layers 7*d*-20 and 7*d*-25 may perform an operation of channel-coding and modulating higher layer data, making the upper layer data as an OFDM symbol and transmitting them to a radio channel, or demodulating and channel-decoding the OFDM symbol received through the radio channel and transmitting the demodulated and channel-decoded OFDM symbol to the upper layer.

Figure 7E:
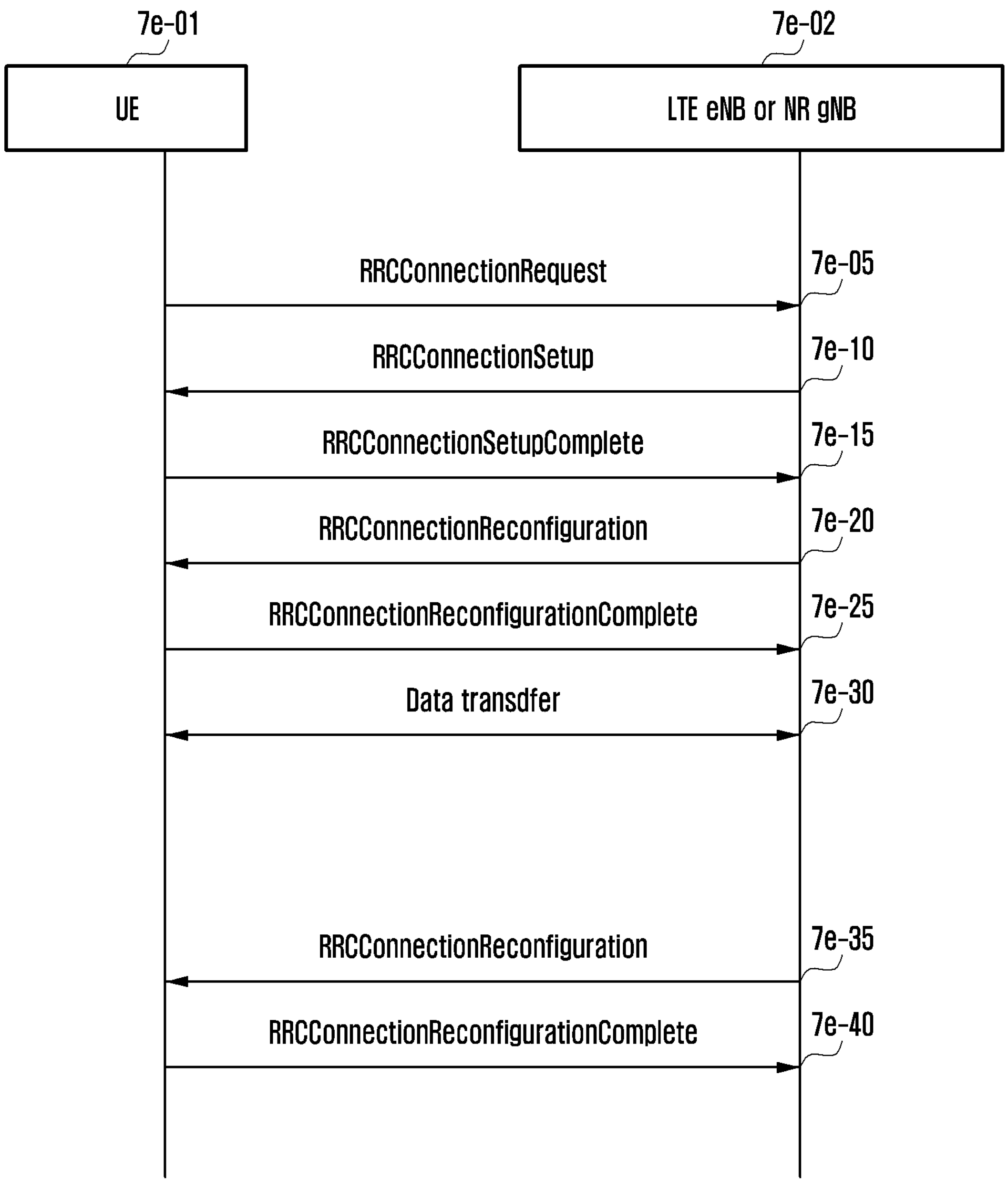
FIG. 7E is a diagram illustrating a procedure of setting, by a terminal, apparatuses of each layer in a next generation mobile communication system according to an embodiment of the present disclosure.

FIG. 7E is a diagram illustrating a procedure of setting, by a terminal, apparatuses (entity, hereinafter, apparatus) of each layer in a next generation mobile communication system according to an embodiment of the present disclosure.

Referring to FIG. 7E, a procedure is illustrated of setting a connection with a network via which a terminal transmits/receives data and setting apparatuses (entity, hereinafter, apparatuses) of each layer.

If there is data to be transmitted, a terminal 7*e*-01 (hereinafter, referred to as an idle mode UE) for which no connection is currently established performs an RRC connection establishment procedure with the LTE base station or the NR base station 7*e*-02. The terminal establishes uplink transmission synchronization with the base station through a random access procedure and transmits an RRCConnection-Request message to the base station (7e-05). The message includes an identifier of the terminal and a cause for setting up a connection. The base station transmits an RRCConnectionSetup message to allow the terminal to set the RRC connection (7e-10). The message may store RRC connection configuration information, configuration information of each layer, and the like. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 7B or 7D) supported by the layer apparatuses. The RRC connection is also called a signaling radio bearer (SRB) and is used for transmission and reception of the RRC message that is a control message between the terminal and the base station. The terminal establishing the RRC connection transmits an RRCConnetionSetupComplete message to the base station (7e-15). The base station transmits an RRCConnectionReconfiguration message to the terminal in order to set up a data radio bearer (DRB) (7e-20). The configuration information of each layer and the like may be stored in the message. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 7B or 7D) supported by the layer apparatuses. In addition, the message includes the configuration information of the DRB in which user data are processed, and the terminal applies the information to set the DRB and set the functions of each layer and transmits an RRCConnection-ReconfigurationComplete message to the base station (7e-25). If the above procedure is completed, the terminal transmits and receives data to and from the base station (7e-30). While transmitting and receiving data, the base station may again transmit the RRCConnectionReconfiguration message to the terminal (7e-35), if necessary, and again set the configuration information of each layer of the terminal. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 7B or 7D) supported by the layer apparatuses. In addition, the message may include the information for setting the interworking between the LTE base station and the NR base station. The information for setting the interworking between the LTE base station and the NR base station may include information indicating a 3C type or a 7a type, information on each layer device according to each type, and the like. Upon completion of the setting of apparatuses of each layer according to the message, the terminal transmits an RRC-ConnectionReconfigurationComplete message to the base station (7e-40).

Figure 7F:
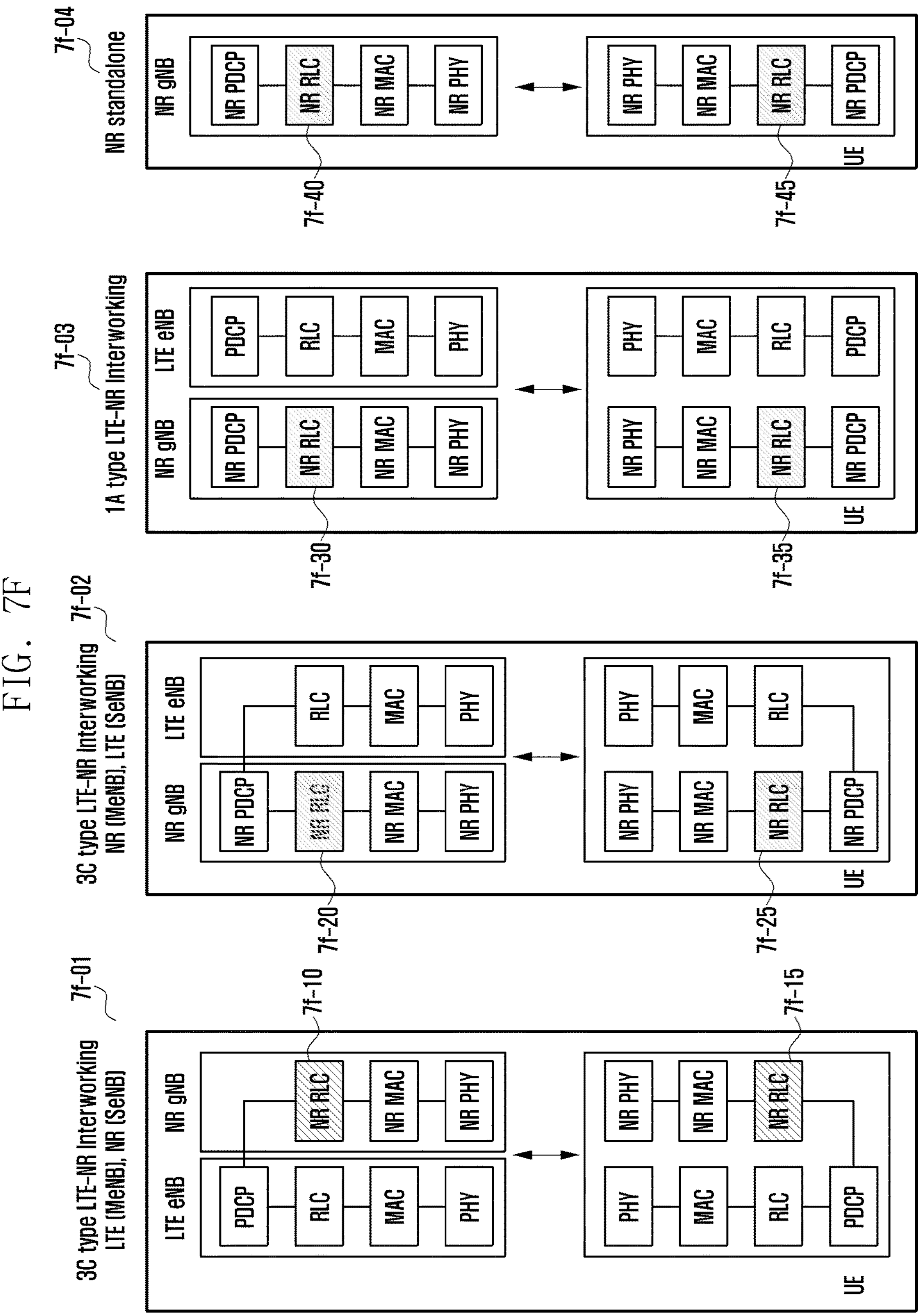
FIG. 7F is a diagram illustrating scenarios which allow a terminal to receive services through an LTE base station and an NR base station in a next generation mobile communication system according to an embodiment of the present disclosure.

FIG. 7F is a diagram illustrating scenarios which allow a terminal to receive services through an LTE base station and an NR base station in a next generation mobile communication system according to an embodiment of the present disclosure.

Referring to FIG. 7F, 7f-01 represents a scenario in which the LTE base station is a master in 3C type interworking of the LTE base station and the NR base station, 7f-02 represents a scenario in which the NR base station is the master in the 3C type interworking between the LTE base station and the NR base station, 7f-03 represents a 7a-type interworking scenario of the LTE base station and the NR base station, and 7f-04 represents a scenario in which a service is received only from the NR base station.

In a 7-1-th embodiment of the present disclosure, the NR RLC operation of the terminal is set as follows.

If the terminal receives an RRC control message (RRC-ConnectionSetup message 7e-10 or RRCConnectionReconfiguration message 7e-20, 7e-35 in FIG. 7E) for instructing the NR RLC apparatus setup for a predetermined radio bearer from the base station, the terminal confirms the information of the message, generates the NR RLC apparatus, is connected to the PDCP apparatus or the NR PDCP apparatus and the NR MAC apparatus, and receives data through the NR RLC apparatus, processes the data, and transfers the processed data to the upper layer apparatus (PDCP or NR PDCP apparatus). The method by which the NR RLC apparatus processes the data in the above procedure is as follows according to predetermined conditions.

If the first condition is satisfied, the first method is applied to process the data If the second condition is satisfied, the second method is applied to process the data The first condition refers to the case where the NR RLC apparatus is connected to the LTE PDCP apparatus and the NR MAC apparatus (7f-15 of 7f-01) or the case where a control message for setting up the NR RLC apparatus is received via the LTE.

The second condition refers to the case where the NR RLC apparatus is connected to the NR PDCP apparatus and the NR MAC apparatus (7f-25 of 7f-02, 7f-35 of 7f-03, 7f-45 of 7f-04) or the case where the control message for setting up the NR RLC apparatus is received via the NR.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

Figure 7G:
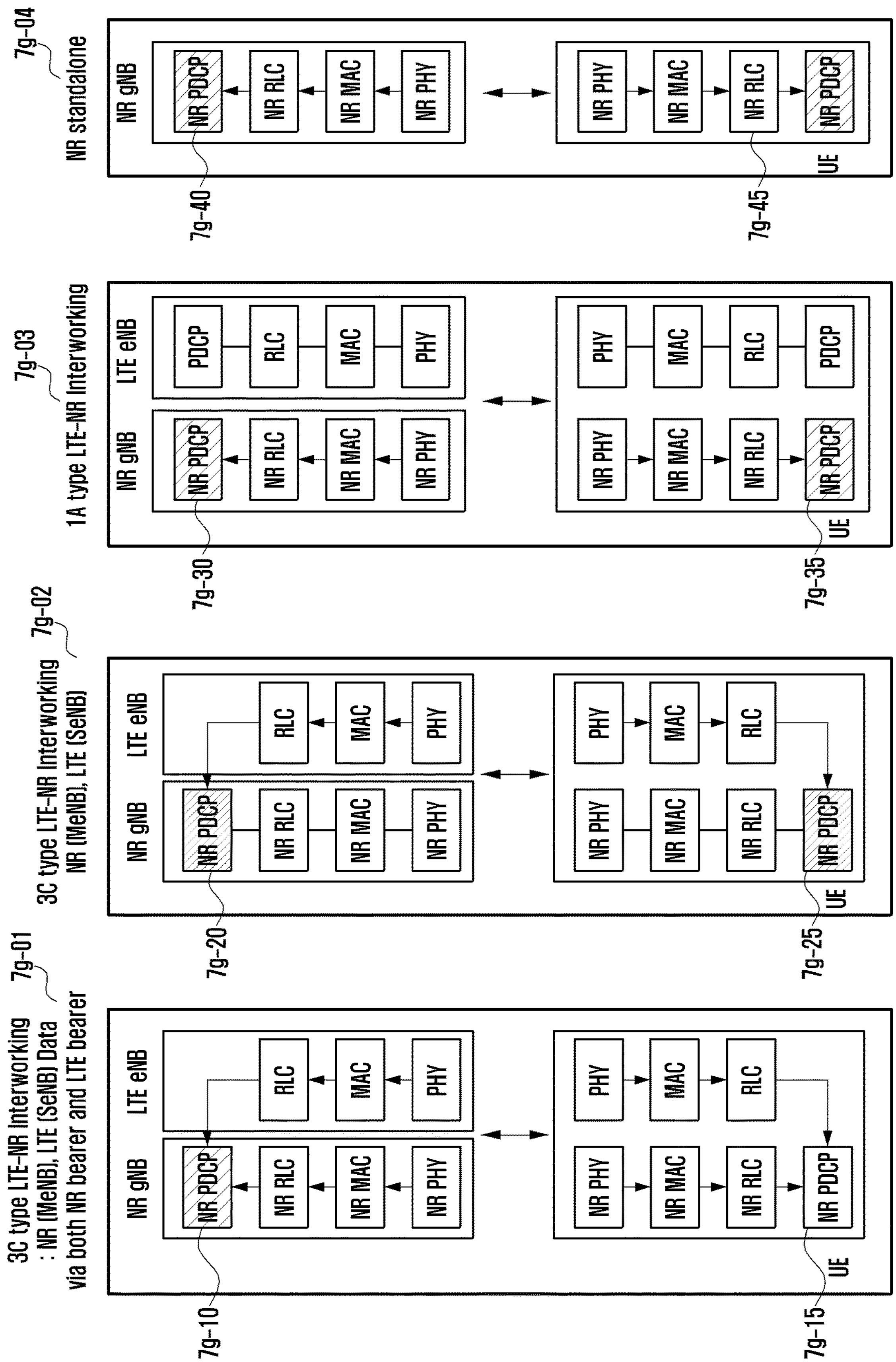
FIG. 7G is a diagram illustrating a scenario which allows a terminal to receive services through an LTE base station and an NR base station in a next generation mobile communication system according to an embodiment of the present disclosure.
Figure 7H:
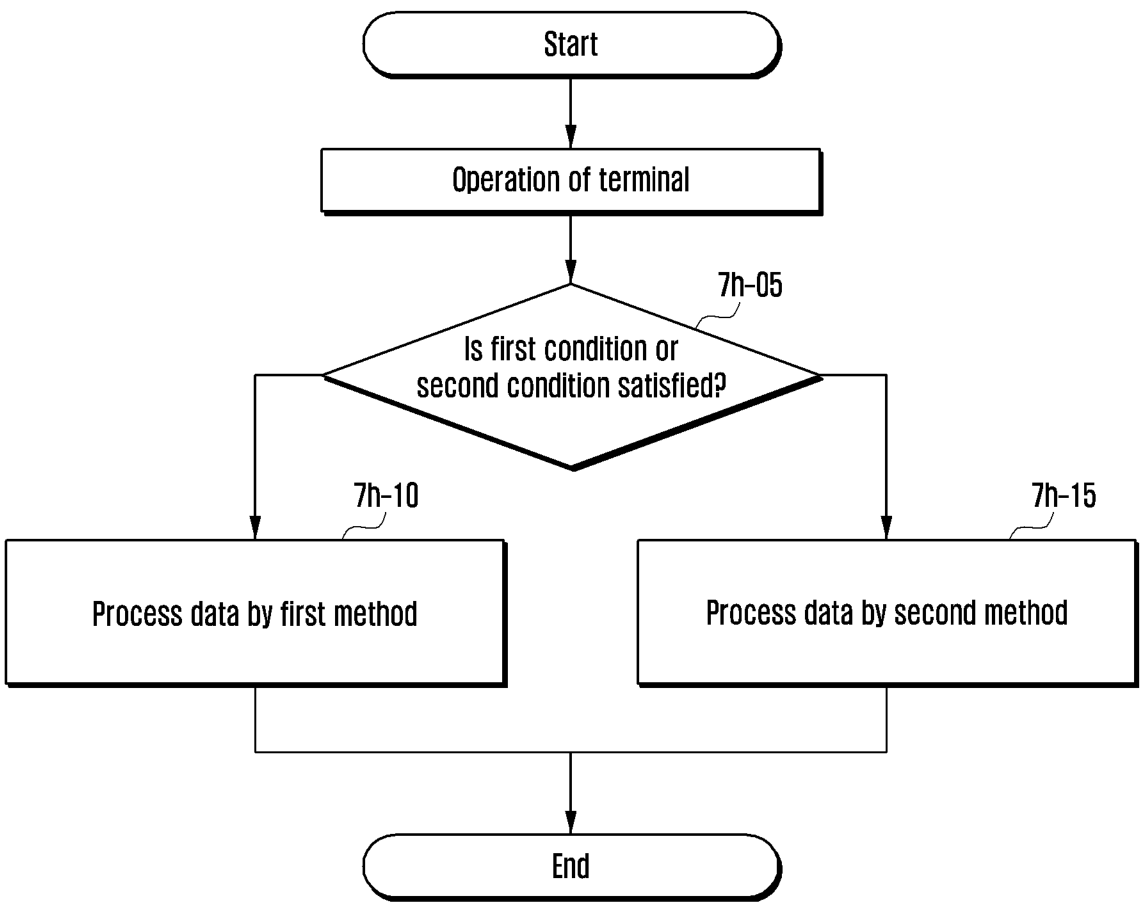
FIG. 7H is a diagram illustrating an operation of a terminal according to 7-1-th, 7-2-th, 7-3-th, and 7-7-th embodiments of the present disclosure.

The operation of the terminal in a 7-1-th embodiment of the present disclosure is the same as FIG. 7H. The terminal confirms the first condition or the second condition in operation 7*h*-05, and if the first condition is satisfied, proceeds to operation 7*h*-10 to process data by the first method and if the second condition is satisfied, proceeds to operation 7*h*-15 to process data by the second method.

In a 7-2-th embodiment of the present disclosure, the NR RLC operation of the terminal is set as follows.

If the terminal receives an RRC control message (RRCConnectionSetup message 7*e*-10 or RRCConnectionReconfiguration message 7*e*-20, 7*e*-35 in FIG. 7E) for instructing the NR RLC apparatus setup for a predetermined radio bearer from the base station, the terminal confirms the information of the message, generates the NR RLC apparatus, is connected to the NR PDCP apparatus and the NR MAC apparatus, receives data through the NR RLC apparatus, processes the data, and transfer the processed data to the upper layer apparatus (NR PDCP apparatus) (7*f*-45 of 7*f*-04). The method by which the NR RLC apparatus processes the data in the above procedure is as follows according to predetermined conditions.

If the first condition is satisfied, the first method is applied to process the data If the second condition is satisfied, the second method is applied to process the data The first condition is the case where the NR RLC apparatus is set in the SRB in the AM mode.

The second condition is the case where the NR RLC apparatus is set in the DRB in the AM mode.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The operation of the terminal in a 7-2-th embodiment of the present disclosure is the same as FIG. 7H. The terminal confirms the first condition or the second condition in operation 7*h*-05, and if the first condition is satisfied, proceeds to operation 7*h*-10 to process data by the first method and if the second condition is satisfied, proceeds to operation 7*h*-15 to process data by the second method.

In a 7-3-th embodiment of the present disclosure, the NR RLC operation of the terminal is set as follows.

If the terminal receives an RRC control message (RRCConnectionSetup message 7*e*-10 or RRCConnectionReconfiguration message 7*e*-20, 7*e*-35 in FIG. 7E) for instructing the NR RLC apparatus setup for a predetermined radio bearer from the base station, the terminal confirms the information of the message, generates the NR RLC apparatus, connects between the NR PDCP apparatus and the NR MAC apparatus, and receives data through the NR RLC apparatus, processes the data, and transfers the processed data to the upper layer apparatus (NR PDCP apparatus) (7*f*-45 of 7*f*-04). The method by which the NR RLC apparatus processes the data in the above procedure is as follows according to predetermined conditions.

If the first condition is satisfied, the first method is applied to process the data If the second condition is satisfied, the second method is applied to process the data The first condition is the case where the NR RLC apparatus is set in the SRB in the AM mode, the case where the NR RLC apparatus is set in the DRB in the AM mode and receives the information indicating that the first method should be applied from the RRC control message, or the case where the NR RLC apparatus is set in the UM mode.

The second condition is the case where the NR RLC apparatus is set to the DRB in the AM mode and does not receive the information indicating that the first method should be applied from the control message or receives the information indicating that the first method should be applied from the control message.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The operation of the terminal in a 7-3-th embodiment of the present disclosure is the same as FIG. 7H. The terminal confirms the first condition or the second condition in operation 7*h*-05, and if the first condition is satisfied, proceeds to operation 7*h*-10 to process data by the first method and if the second condition is satisfied, proceeds to operation 7*h*-15 to process data by the second method.

In a 7-4-th embodiment of the present disclosure, the NR RLC operation of the NR base station is set as follows.

The NR base station sets the NR RLC apparatus for a predetermined radio bearer. The NR base station generates the NR RLC apparatus, is connected to the PDCP apparatus, the NR PDCP apparatus and the NR MAC apparatus, receives data through the NR RLC apparatus, processes the data, and transfers the processed data to the upper layer apparatus (PDCP or NR PDCP apparatus). The method by which the NR RLC apparatus processes the data in the above procedure is as follows according to predetermined conditions.

If the first condition is satisfied, the first method is applied to process the data If the second condition is satisfied, the second method is applied to process the data The first condition refers to the case where the NR RLC apparatus is connected to the LTE PDCP apparatus and the NR MAC apparatus (7*f*-10 of 7*f*-01) or the case where a control message for setting up the NR RLC apparatus is received via the LTE.

The second condition refers to the case where the NR RLC apparatus is connected to the NR PDCP apparatus and the NR MAC apparatus (7*f*-20 of 7*f*-02, 7*f*-30 of 7*f*-03, 7*f*-40 of 7*f*-04) or the case where the control message for setting up the NR RLC apparatus is received via the NR.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

Figure 7I:
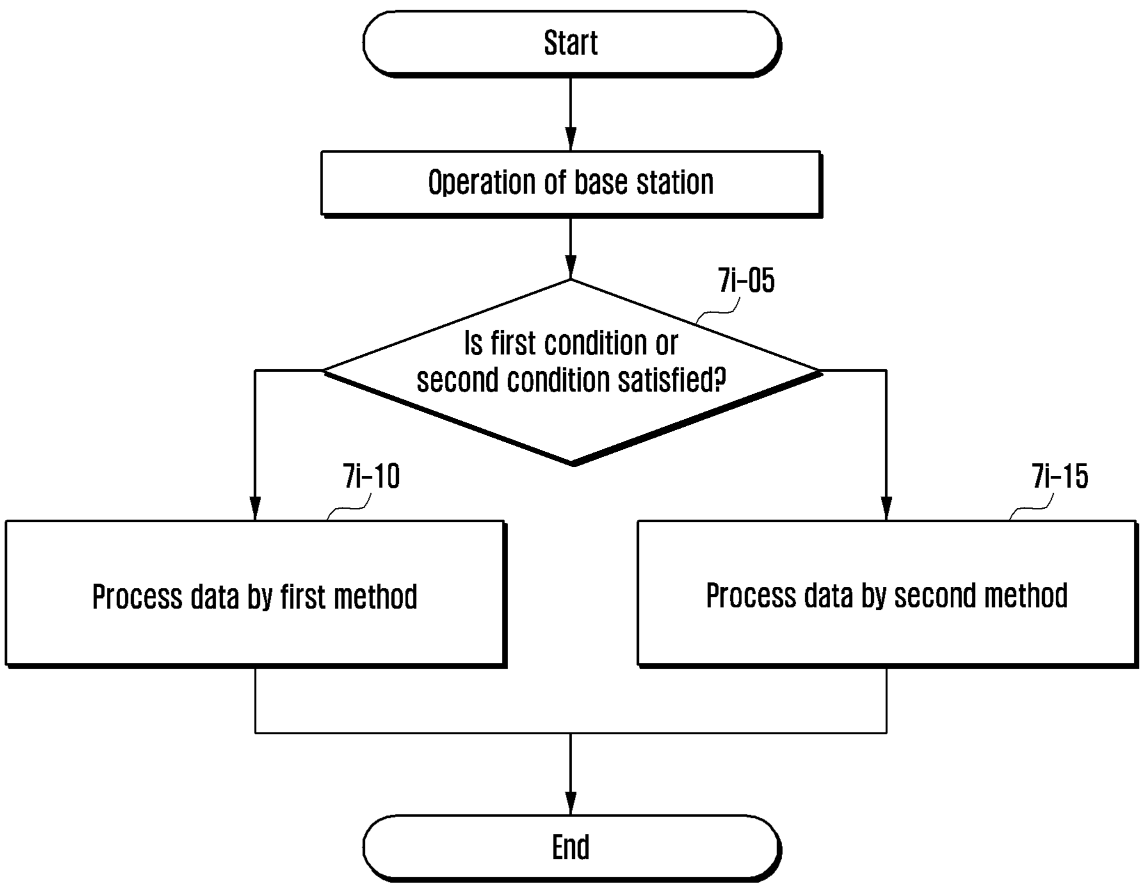
FIG. 7I is a diagram illustrating an operation of a base station according to 7-4-th, 7-5-th, 7-6-th, and 7-8-th embodiments of the present disclosure.

FIG. 7I is a diagram illustrating an operation of a base station according to 7-4-th, 7-5-th, 7-6-th, and 7-8-th embodiments of the present disclosure.

Referring to FIG. 7I, the terminal confirms the first condition or the second condition in operation 7*i*-05, and if the first condition is satisfied, proceeds to operation 7*i*-10 to process data by the first method and if the second condition is satisfied, proceeds to operation 7*i*-15 to process data by the second method.

In a 7-5-th embodiment of the present disclosure, the NR RLC operation of the NR base station is set as follows.

The NR base station sets the NR RLC apparatus for a predetermined radio bearer. The NR base station generates the NR RLC apparatus, is connected to the NR PDCP apparatus and the NR MAC apparatus, receives data through the NR RLC apparatus, processes the data, and transmits the processed data to the upper layer apparatus (NR PDCP apparatus) (7*f*-40 of 7*f*-04). The method by which the NR RLC apparatus processes the data in the above procedure is as follows according to predetermined conditions.

If the first condition is satisfied, the first method is applied to process the data If the second condition is satisfied, the second method is applied to process the data The first condition is the case where the NR RLC apparatus is set in the SRB in the AM mode.

The second condition is the case where the NR RLC apparatus is set in the DRB in the AM mode.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The operation of the base station in a 7-5-th embodiment of the present disclosure is the same as FIG. 7I. The terminal confirms the first condition or the second condition in operation 7*i*-05, and if the first condition is satisfied, proceeds to operation 7*i*-10 to process data by the first method and if the second condition is satisfied, proceeds to operation 7*i*-15 to process data by the second method.

In a 7-6-th embodiment of the present disclosure, the NR RLC operation of the NR base station is set as follows.

The NR base station sets the NR RLC apparatus for a predetermined radio bearer. The NR base station generates the NR RLC apparatus, is connected to the NR PDCP apparatus and the NR MAC apparatus, receives data through the NR RLC apparatus, processes the data, and transmits the processed data to the upper layer apparatus (NR PDCP apparatus) (7*f*-40 of 7*f*-04). The method by which the NR RLC apparatus processes the data in the above procedure is as follows according to predetermined conditions.

If the first condition is satisfied, the first method is applied to process the data If the second condition is satisfied, the second method is applied to process the data The first condition is the case where the NR RLC apparatus is set in the SRB in the AM mode, the case where the NR RLC apparatus is set in the DRB in the AM mode and receives the information indicating that the first method should be applied from the RRC control message, or the case where the NR RLC apparatus is set in the UM mode.

The second condition is the case where the NR RLC apparatus is set to the DRB in the AM mode and does not receive the information indicating that the first method should be applied from the control message or receives the information indicating that the first method should be applied from the control message.

The first method is to reassemble the received RLC PDU into an RLC SDU and transmit it to the PDCP apparatus if the predetermined condition is satisfied. For example, the in-sequence delivery function is set. The predetermined condition refers to the case where a predetermined time elapses after there is no non-received RLC PDU or a non-received RLC PDU is generated. In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU.

If the RLC SDU may be reassembled in the received RLC PDU, the second method immediately reassembles the RLC SDU and transfers the reassembled RLC SDU to the PDCP apparatus. For example, the out-of-sequence delivery function is set. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The operation of the base station in a 7-4-th embodiment of the present disclosure is the same as FIG. 7I. The terminal confirms the first condition or the second condition in operation 7*i*-05, and if the first condition is satisfied, proceeds to operation 7*i*-10 to process data by the first method and if the second condition is satisfied, proceeds to operation 7*i*-15 to process data by the second method.

FIG. 7G is a diagram illustrating a scenario which allows a terminal to receive services through an LTE base station and an NR base station in a next generation mobile communication system according to an embodiment of the present disclosure.

Referring to FIG. 7G, 7*g*-01 represents a split bearer scenario in which the NR base station is a master and data is transmitted through NR bearer and LTE bearer in 3C type interworking between the LTE base station and NR base station, 7*g*-02 represents a scenario in which the NR base station is a master and data is transmitted only through the LTE bearer in the in the 3C type interworking between the LTE base station and NR base station, 7*g*-03 represents a 7a-type interworking scenario of the LTE base station and the NR base station, and 7*g*-04 represents a scenario in which the service is received only from the NR base station.

In a 7-7-th embodiment of the present disclosure, the NR PDCP operation of the terminal is set as follows.

If the terminal receives an RRC control message (RRCConnectionSetup message 7*e*-10 or RRCConnectionReconfiguration message 7*e*-20, 7*e*-35 in FIG. 7E) for instructing the NR PDCP apparatus setup for a predetermined radio bearer from the base station, the terminal confirms the information of the message, generates the NR PDCP apparatus, is connected to the NR PDCP apparatus, and receives data through the NR PDCP apparatus, processes the data, and transfers the processed data to the upper layer apparatus (network layer or apparatus). The method by which the NR PDCP apparatus processes the data in the above procedure is as follows according to predetermined conditions.

If the first condition is satisfied, the first method is applied to process the data If the second condition is satisfied, the second method is applied to process the data.

The first condition is the case where the NR PDCP apparatus is connected to the NR RLC apparatus and the LTE RLC apparatus and data is set to be received through the NR RLC apparatus and the LTE RLC apparatus, the case where the control message setting the NR PDCP apparatus is received through the NR and data is set to be received through the NR RLC apparatus and the LTE RLC apparatus (7*g*-15 of 7*g*-01), the case where the NR PDCP apparatus is connected only to the NR RLC apparatus, or the case where the NR PDCP apparatus is not connected to the LTE base station but is connected to only the NR base station (7*g*-35 of 7*g*-03, 7*g*-45 of 7*g*-04).

The second condition is the case where the NR PDCP apparatus is connected to the NR RLC and the LTE RLC and data is set to be received only by the LTE RLC apparatus (7*g*-25 of 7*g*-02), or where the control message for setting the NR PDCP apparatus is received through the NR and data is set to be received only by the LTE RLC apparatus.

In the first method, if the predetermined condition is satisfied, the NR PDCP apparatus performs the predetermined processing on the received PDCP PDUs and transfers the processed PDCP PDUs to the upper layer or the apparatus. For example, the reordering function is set. The predetermined condition is the case where a predetermined time has elapsed after a non-received PDCP PDU does not exist or a non-received PDCP PDU is generated. The predetermined processing may include operations of removing the PDCP header from the PDCP PDU, decrypting it, verifying the integrity thereof if necessary, and decompressing the header of the packet. In this case, the reordering function of the NR PDCP apparatus refers to a function of rearranging PDCP PDUs received in a lower layer in order based on a PDCP sequence number (SN) and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The second method performs the predetermined processing on the received PDCP PDUs and transfers the processed PDCP PDUs to the upper layer or the apparatus. The predetermined processing may include the operations of removing the PDCP header from the PDCP PDU, decrypting it, verifying the integrity thereof if necessary, and decompressing the header of the packet. The process may be understood as the process in which the NR PDCP apparatus performs predetermined processing on the PDCP PDUs and then transmits the processed PDCP PDUs to the upper layer or apparatus without setting the reordering function, or may be understood the process in which the NR PDCP apparatus performs predetermined processing on the PDCP PDUs and immediately transmits the processed PDCP PDUs to the upper layer or apparatus.

FIG. 7H is a diagram illustrating an operation of a terminal according to 7-1-th, 7-2-th, 7-3-th, and 7-7-th embodiments of the present disclosure.

Referring to FIG. 7H, the terminal confirms the first condition or the second condition in operation 7*h*-05, and if the first condition is satisfied, proceeds to operation 7*h*-10 to process data by the first method and if the second condition is satisfied, proceeds to operation 7*h*-15 to process data by the second method.

In a 7-8-th embodiment of the present disclosure, the NR PDCP operation of the NR base station is set as follows.

The NR base station sets the NR PDCP apparatus for a predetermined radio bearer. For example, the NR PDCP apparatus is generated and connected to the NR RLC apparatus, receives data through the NR PDCP apparatus, processes the data, and transmits the processed data to the upper layer apparatus (network layer or apparatus). The method by which the NR PDCP apparatus processes the data in the above procedure is as follows according to predetermined conditions.

If the first condition is satisfied, the first method is applied to process the data If the second condition is satisfied, the second method is applied to process the data The first condition is the case where the NR PDCP apparatus is connected to the NR RLC apparatus and the LTE RLC apparatus and data is set to be received through the NR RLC apparatus and the LTE RLC apparatus, the case where the NR base station itself determines the setting of the NR PDCP apparatus is received through the NR and data is set to be received through the NR RLC apparatus and the LTE RLC apparatus (7*g*-10 of 7*g*-01), the case where the NR PDCP apparatus is connected only to the NR RLC apparatus, or the case where the NR PDCP apparatus is not connected to the LTE base station but is connected to only the NR base station (7*g*-30 of 7*g*-03, 7*g*-40 of 7*g*-04).

The second condition is the case where the NR PDCP apparatus is connected to the NR RLC and the LTE RLC and data is set to be transmitted to only by the LTE RLC apparatus, or where the NR base station itself determines the setting of the NR PDCP apparatus and the data is set to be received only by the LTE RLC apparatus (7*g*-20 of 7*g*-02).

In the first method, if the predetermined condition is satisfied, the NR PDCP apparatus performs the predetermined processing on the received PDCP PDUs and transfers the processed PDCP PDUs to the upper layer or the apparatus. For example, the reordering function is set. The predetermined condition is the case where a predetermined time has elapsed after a non-received PDCP PDU does not exist or a non-received PDCP PDU is generated. The predetermined processing may include operations of removing the PDCP header from the PDCP PDU, decrypting it, verifying the integrity thereof if necessary, and decompressing the header of the packet. In this case, the reordering function of the NR PDCP apparatus refers to a function of rearranging PDCP PDUs received in a lower layer in order based on a PDCP sequence number (SN) and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The second method performs the predetermined processing on the received PDCP PDUs and transfers the processed PDCP PDUs to the upper layer or the apparatus. The predetermined processing may include the operations of removing the PDCP header from the PDCP PDU, decrypting it, verifying the integrity thereof if necessary, and decompressing the header of the packet.

Figure 7J:
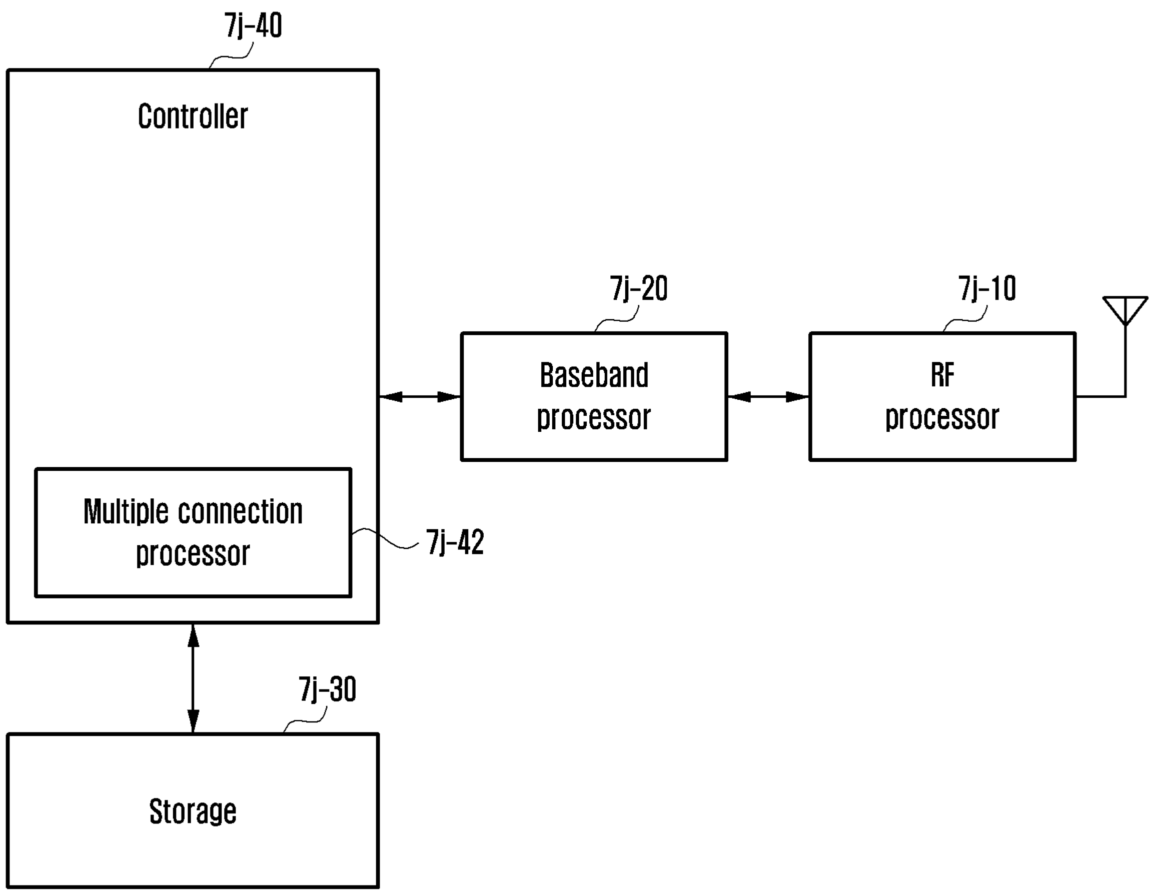
FIG. 7J is a block diagram illustrating an internal structure of a terminal according to an embodiment of the present disclosure.

FIG. 7J is a block diagram illustrating an internal structure of a terminal according to an embodiment of the present disclosure.

Referring to FIG. 7J, the terminal includes a radio frequency (RF) processor 7*j*-10, a baseband processor 7*j*-20, a storage 7*j*-30, and a controller 7*j*-40.

The RF processor 7*j*-10 serves to transmit and receive a signal through a radio channel, such as band conversion and amplification of a signal. For example, the RF processor 1*j*-10 up-converts a baseband signal provided from the baseband processor 1*j*-20 into an RF band signal and then transmits the RF band signal through an antenna and down-converts the RF band signal received through the antenna into the baseband signal. For example, the RF processor 7*j*-10 may include a transmitting filter, a receiving filter, an amplifier, a mixer, an oscillator, a digital to analog converter (DAC), an analog to digital converter (ADC), or the like. FIG. 4H illustrates only one antenna but the terminal may include a plurality of antennas. Further, the RF processor 7*j*-10 may include a plurality of RF chains. Further, the RF processor 7*j*-10 may perform beamforming. For the beamforming, the RF processor 7*j*-10 may adjust a phase and a size of each of the signals transmitted and received through a plurality of antennas or antenna elements. In addition, the RF processor may perform MIMO and may receive a plurality of layers when performing a MIMO operation. The RF processor 7*j*-10 may perform reception beam sweeping by appropriately configuring a plurality of antennas or antenna elements under the control of the controller or adjust a direction and a beam width of the reception beam so that the reception beam is resonated with the transmission beam.

The baseband processor 7*j*-20 performs a conversion function between a baseband signal and a bit string according to a physical layer standard of a system. For example, when data are transmitted, the baseband processor 7*j*-20 generates complex symbols by coding and modulating a transmitted bit string. Further, when data are received, the baseband processor 1*j*-20 recovers the received bit string by demodulating and decoding the baseband signal provided from the RF processor 1*j*-10. For example, according to the OFDM scheme, when data are transmitted, the baseband processor 7*j*-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 7*j*-20 divides the baseband signal provided from the RF processor 7*j*-10 in an OFDM symbol unit and recovers the signals mapped to the sub-carriers by a fast Fourier transform (FFT) operation and then recovers the received bit string by the modulation and decoding.

The baseband processor 1*j*-20 and the RF processor 1*j*-10 transmit and receive a signal as described above. Therefore, the baseband processor 7*j*-20 and the RF processor 7*j*-10 may be called a transmitter, a receiver, a transceiver, or a communication unit. Further, at least one of the baseband processor 1*j*-20 and the RF processor 1*j*-10 may include a plurality of communication modules to support a plurality of different radio access technologies. Further, at least one of the baseband processor 7*j*-20 and the RF processor 7*j*-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The storage 7*j*-30 stores data, such as basic programs, application programs, and configuration information for the operation of the terminal. Further, the storage 7*j*-30 provides the stored data according to the request of the controller 7*j*-40.

The controller 7*j*-40 includes a multiple connection processor 7*j*-42 and controls the overall operations of the terminal. For example, the controller 7*j*-40 transmits and receives a signal through the baseband processor 7*j*-20 and the RF processor 7*j*-10. Further, the controller 7*j*-40 records and reads data in and from the storage 7*j*-30. For this purpose, the controller 1*j*-40 may include at least one processor. For example, the controller 7*j*-40 may include a communication processor (CP) performing a control for communication and an application processor (AP) controlling a higher layer, such as the application programs.

Figure 7K:
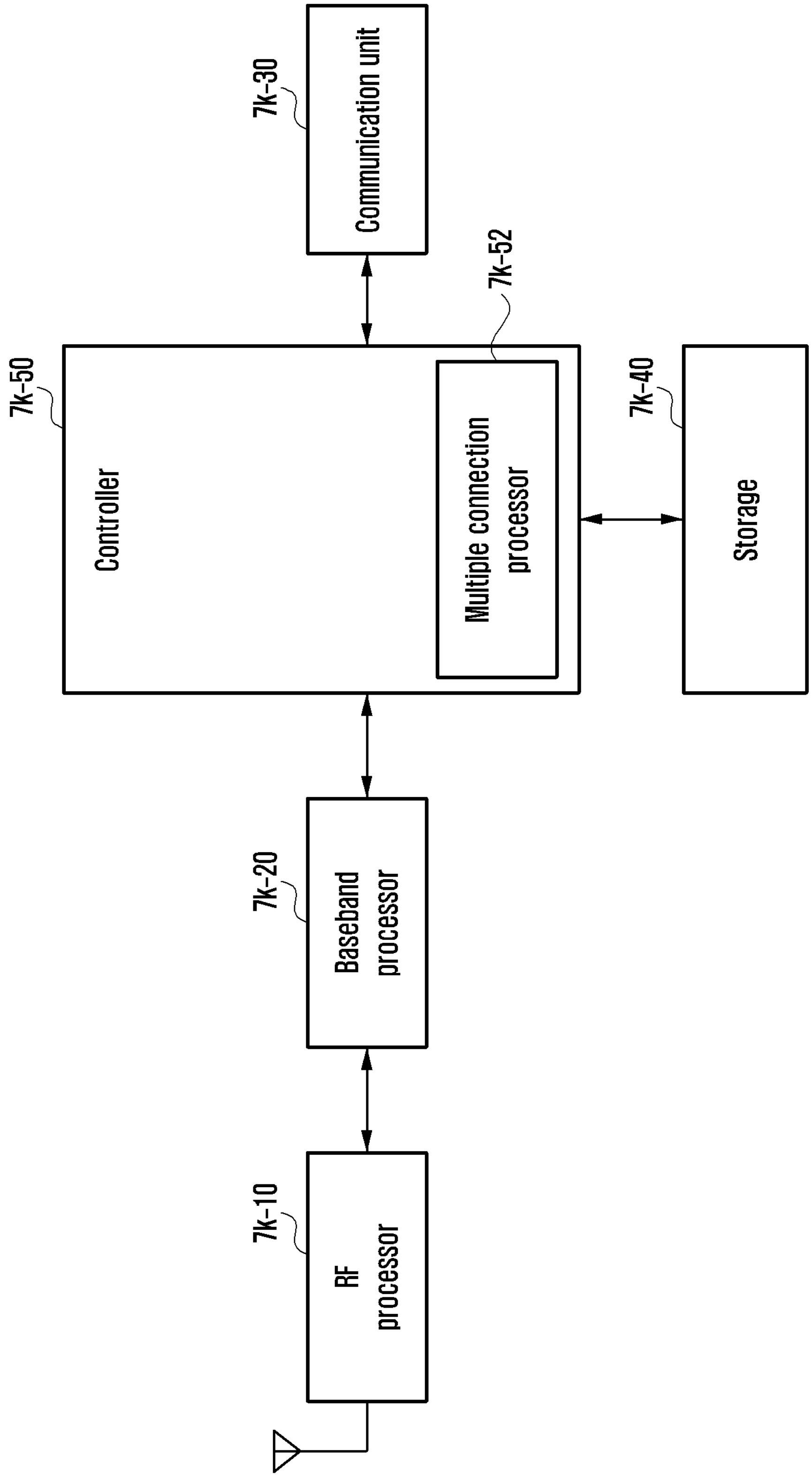
FIG. 7K is a block diagram illustrating a configuration of a base station transceiver according to an embodiment of the present disclosure.

FIG. 7K is a block diagram illustrating a configuration of a base station transceiver according to an embodiment of the present disclosure.

Referring to FIG. 7K, the base station is configured to include an RF processor 7*k*-10, a baseband processor 7*k*-20, a communication unit 7*k*-30, a storage 7*k*-40, and a controller 7*k*-50.

The RF processor 7*k*-10 serves to transmit and receive a signal through a radio channel, such as band conversion and amplification of a signal. For example, the RF processor 7*k*-10 up-converts a baseband signal provided from the baseband processor 7*k*-20 into an RF band signal and then transmits the RF band signal through an antenna and down-converts the RF band signal received through the antenna into the baseband signal. For example, the RF processor 7*k*-10 may include a transmitting filter, a receiving filter, an amplifier, a mixer, an oscillator, a DAC, an ADC, or the like. FIG. 7K illustrates only one antenna but the first access node may include a plurality of antennas. Further, the RF processor 7*k*-10 may include a plurality of RF chains. Further, the RF processor 7*k*-10 may perform the beamforming. For the beamforming, the RF processor 1*k*-10 may adjust a phase and a size of each of the signals transmitted/received through a plurality of antennas or antenna elements. The RF processor may perform a downward MIMO operation by transmitting one or more layers.

The baseband processor 7*k*-20 performs a conversion function between the baseband signal and the bit string according to the physical layer standard of the first radio access technology. For example, when data are transmitted, the baseband processor 5*k*-20 generates complex symbols by coding and modulating a transmitted bit string. Further, when data are received, the baseband processor 7*k*-20 recovers the received bit string by demodulating and decoding the baseband signal provided from the RF processor 7*k*-10. For example, according to the OFDM scheme, when data are transmitted, the baseband processor 7*k*-20 generates the complex symbols by coding and modulating the transmitting bit string, maps the complex symbols to the sub-carriers, and then performs the IFFT operation and the CP insertion to configure the OFDM symbols. Further, when data are received, the baseband processor 7*k*-20 divides the baseband signal provided from the RF processor 7*k*-10 in the OFDM symbol unit and recovers the signals mapped to the sub-carriers by the FFT operation and then recovers the receiving bit string by the modulation and decoding. The baseband processor 7*k*-20 and the RF processor 7*k*-10 transmit and receive a signal as described above. Therefore, the baseband processor **7*k*-20 and the RF processor 7*k*-10** may be called a transmitter, a receiver, a transceiver, or a communication unit.

The communication unit **7*k*-30** provides an interface for performing communication with other nodes within the network.

The storage **1*k*-40 stores data, such as basic programs, application programs, and configuration information for the operation of the main base station. More particularly, the storage 7*k*-40 may store the information on the bearer allocated to the accessed terminal, the measured results reported from the accessed terminal, and the like. Further, the storage 7*k*-40 may store information that is a determination criterion on whether to provide a multiple connection to the terminal or stop the multiple connection to the terminal. Further, the storage 7*k*-40 provides the stored data according to the request of the controller 7*k*-50**.

The controller **7*k*-50 includes a multiple connection processor 7*k*-52 and controls the general operations of the main base station. For example, the controller 7*k*-50 transmits/receives a signal through the baseband processor 7*k*-20 and the RF processor 7*k*-10 or the communication unit 7*k*-30. Further, the controller 7*k*-50 records and reads data in and from the storage 7*k*-40. For this purpose, the controller 1*k*-50** may include at least one processor.

The above-mentioned disclosures are summarized as follows. The present disclosure relates to a method and apparatus for an operation of an NR PDCP apparatus and an NR RLC apparatus in a next generation mobile communication system (hereinafter referred to as NR or 5G), and the present disclosure includes the following operations.

Embodiment 7-1 of Terminal NR RLC Operation: Interworking of LTE with NR

The terminal receives the RRC control message for instructing the NR RLC apparatus setup for the predetermined radio bearer from the base station NR RLC apparatus is generated and is connected to the PDCP apparatus and the NR MAC apparatus Data is received through the NR RLC apparatus The NR RLC processes the data and transfers the processed data to the PDCP apparatus If the first condition is satisfied, the first method is applied to process the data If the second condition is satisfied, the first method is applied to process the data First condition: the NR RLC apparatus is connected to the LTE PDCP and the NR MAC. Alternatively, the control message for setting up the NR RLC apparatus is received through the LTE.

Second condition: the NR RLC apparatus is connected to the NR PDCP and the NR MAC. Alternatively, the control message for setting up the NR RLC apparatus is received through the NR.

First method: The received RLC PDU is reassembled into an RLC SDU to be transferred to the PDCP apparatus if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-2 of Terminal NR RLC Operation: NR Standalone

The terminal receives the RRC control message for instructing the NR RLC apparatus setup for the predetermined radio bearer from the base station NR RLC apparatus is generated and is connected to the NR PDCP apparatus and the NR MAC apparatus Data is received through the NR RLC apparatus The NR RLC processes the data and transfers the processed data to the NR PDCP apparatus If the first condition is satisfied, the first method is applied to process the data If the second condition is satisfied, the first method is applied to process the data First condition: The case where the NR RLC apparatus is set in the SRB in the AM mode.

Second condition: The case where the NR RLC apparatus is set in the DRB in the AM mode.

First method: The received RLC PDU is reassembled into an RLC SDU to be transferred to the PDCP device if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-3 of Terminal NR RLC Operation: NR Standalone

The terminal receives the RRC control message for instructing the NR RLC apparatus setup for the predetermined radio bearer from the base station NR RLC apparatus is generated and is connected to the NR PDCP apparatus and the NR MAC apparatus Data is received through the NR RLC apparatus The NR RLC processes the data and transfers the processed data to the NR PDCP apparatus If the first condition is satisfied, the first method is applied to process the data If the second condition is satisfied, the first method is applied to process the data First condition: The case where the NR RLC apparatus is set in the SRB in the AM mode, the case where the NR RLC apparatus is set in the DRB in the AM mode and receives the information indicating that the first method should be applied from the control message, or the case where the NR RLC apparatus is set in the UM mode.

Second condition: The case where the NR RLC apparatus does not receive from the control message the information indicating that the NR RLC apparatus is set in the DRB in the AM mode and applies the first method First method: The received RLC PDU is reassembled into an RLC SDU to be transferred to the PDCP apparatus if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-4 of Base Station NR RLC Operation: Interworking of LTE with NR The NR base station sets the NR RLC apparatus for a predetermined radio bearer.

NR RLC apparatus is generated and is connected to the PDCP device and the NR MAC device Data is received through the NR RLC apparatus The NR RLC processes the data and transfers the processed data to the PDCP apparatus If the first condition is satisfied, the first method is applied to process the data If the second condition is satisfied, the first method is applied to process the data First condition: the NR RLC apparatus is connected to the LTE PDCP and the NR MAC. Alternatively, the control message for setting up the NR RLC apparatus is received through the LTE.

Second condition: the NR RLC apparatus is connected to the NR PDCP and the NR MAC. Alternatively, the NR base station itself determines the control message for setting up the NR RLC apparatus is received through the NR.

First method: The received RLC PDU is reassembled into an RLC SDU to be transferred to the PDCP apparatus if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-5 of Base Station NR RLC Operation: NR Standalone

The base station sets the NR RLC apparatus for a predetermined radio bearer

NR RLC apparatus is generated and is connected to the NR PDCP apparatus and the NR MAC apparatus Data is received through the NR RLC apparatus The NR RLC processes the data and transfers the processed data to the NR PDCP apparatus If the first condition is satisfied, the first method is applied to process the data If the second condition is satisfied, the first method is applied to process the data First condition: The case where the NR RLC apparatus is set in the SRB in the AM mode.

Second condition: The case where the NR RLC apparatus is set in the DRB in the AM mode.

First method: The received RLC PDU is reassembled into an RLC SDU to be transferred to the PDCP apparatus if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-6 of Base Station NR RLC Operation: NR Standalone

The base station sets the NR RLC apparatus for a predetermined radio bearer

NR RLC apparatus is generated and is connected to the NR PDCP apparatus and the NR MAC apparatus Data is received through the NR RLC apparatus The NR RLC processes the data and transfers the processed data to the NR PDCP apparatus If the first condition is satisfied, the first method is applied to process the data If the second condition is satisfied, the first method is applied to process the data First condition: The case where the NR RLC apparatus is set in the SRB in the AM mode, the case where the NR RLC apparatus is set in the DRB in the AM mode, the case where the first method should be applied, or the case where the NR RLC apparatus is set in the UM mode.

Second condition: The case where the NR RLC apparatus is set in DRB in AM mode and the case where it is determined that the first method is not applied but the second method is applied First method: The received RLC PDU is reassembled into an RLC SDU to be transferred to the PDCP apparatus if the predetermined condition is satisfied. The predetermined condition refers to the case where a predetermined time elapses after there is no non-received RLC PDU or a non-received RLC PDU is generated.

Second method: If the RLC SDU may be reassembled in the received RLC PDU, the RLC SDU is immediately reassembled and is then transferred to the PDCP apparatus.

Embodiment 7-7 of Terminal NR PDCP Operation: Interworking of LTE with NR

The terminal receives the RRC control message for instructing the NR PDCP apparatus setup for the predetermined radio bearer from the base station NR PDCP apparatus is generated and is connected to the RLC apparatus Data is received through the RLC apparatus The NR PDCP apparatus processes the data and transmits the processed data to the upper layer or the apparatus If the first condition is satisfied, the first method is applied to process the data If the second condition is satisfied, the first method is applied to process the data The first condition is the case where the NR PDCP apparatus is connected to the NR RLC apparatus and the LTE RLC apparatus and data is to be received through the NR RLC apparatus and the LTE RLC apparatus, the case where the control message setting the NR PDCP apparatus is received through the NR and data is set to be received through the NR RLC apparatus and the LTE RLC apparatus, the case where the NR PDCP device is connected only to the NR RLC apparatus, or the case where the NR PDCP apparatus is not connected to the LTE base station but is connected to only the NR base station.

Second condition: The case where the NR PDCP apparatus is connected to the NR RLC and the LTE RLC and data is set to be received only by the LTE RLC apparatus, or where the control message for setting the NR PDCP apparatus is received through the NR and data is set to be received only by the LTE RLC apparatus.

First method: If the predetermined condition is satisfied, the NR PDCP apparatus performs the predetermined processing on the received PDCP PDUs and transfers the processed PDCP PDUs to the upper layer or the apparatus. The predetermined condition is the case where a predetermined time has elapsed after a non-received PDCP PDU does not exist or a non-received PDCP PDU is generated. The predetermined processing may include operations of removing the PDCP header from the PDCP PDU, decrypting it, verifying the integrity thereof if necessary, and decompressing the header of the packet.

Second method: The received PDCP PDUs suffers from the predetermined processing and is transferred to the upper layer or the apparatus. The predetermined processing may include operations of removing the PDCP header from the PDCP PDU, decrypting it, verifying the integrity thereof if necessary, and decompressing the header of the packet.

Embodiment 7-8 of Base Station NR RLC Operation: Interworking of LTE with NR

The NR base station sets the NR RLC apparatus for a predetermined radio bearer.

NR PDCP apparatus is generated and is connected to the RLC apparatus

Data is received through the RLC apparatus

The NR PDCP apparatus processes the data and transmits the processed data to the upper layer or the apparatus If the first condition is satisfied, the first method is applied to process the data If the second condition is satisfied, the first method is applied to process the data First condition: the NR PDCP apparatus is connected to the NR RLC apparatus and the LTE RLC apparatus and is set to receive the data through the NR RLC apparatus and the LTE RLC apparatus. Alternatively, the NR base station itself determines the setting of the NR PDCP apparatus and set to receive the data through the NR RLC apparatus and the LTE RLC apparatus. Alternatively, the case where the NR PDCP apparatus is connected only to the NR RLC apparatus, or the case where there is no connection to the LTE base station and the connection to only the NR base station is set.

Second condition: The NR PDCP apparatus is connected to the NR RLC and the LTE RLC, and is set to transmit data only to the LTE RLC apparatus. Alternatively, the case where the NR base station itself determines the setting of the NR PDCP apparatus and data is set to be received only by the LTE RLC apparatus.

First method: If the predetermined condition is satisfied, the NR PDCP apparatus performs the predetermined processing on the received PDCP PDUs and transfers the processed PDCP PDUs to the upper layer or the device. The predetermined condition is the case where a predetermined time has elapsed after a non-received PDCP PDU does not exist or a non-received PDCP PDU is generated. The predetermined processing may include operations of removing the PDCP header from the PDCP PDU, decrypting it, verifying the integrity thereof if necessary, and decompressing the header of the packet.

Second method: The received PDCP PDUs suffers from the predetermined processing and is transferred to the upper layer or the apparatus. The predetermined processing may include operations of removing the PDCP header from the PDCP PDU, decrypting it, verifying the integrity thereof if necessary, and decompressing the header of the packet.

Eighth Embodiment

A term used for identifying a connection node used in the following description, a term referring to network entities, a term referring to messages, a term referring to an interface between network objects, a term referring to various identification information, or the like are illustrated for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3GPP LTE. However, the present disclosure is not limited to the terms and names but may also be identically applied to the system according to other standards.

Figure 8A:
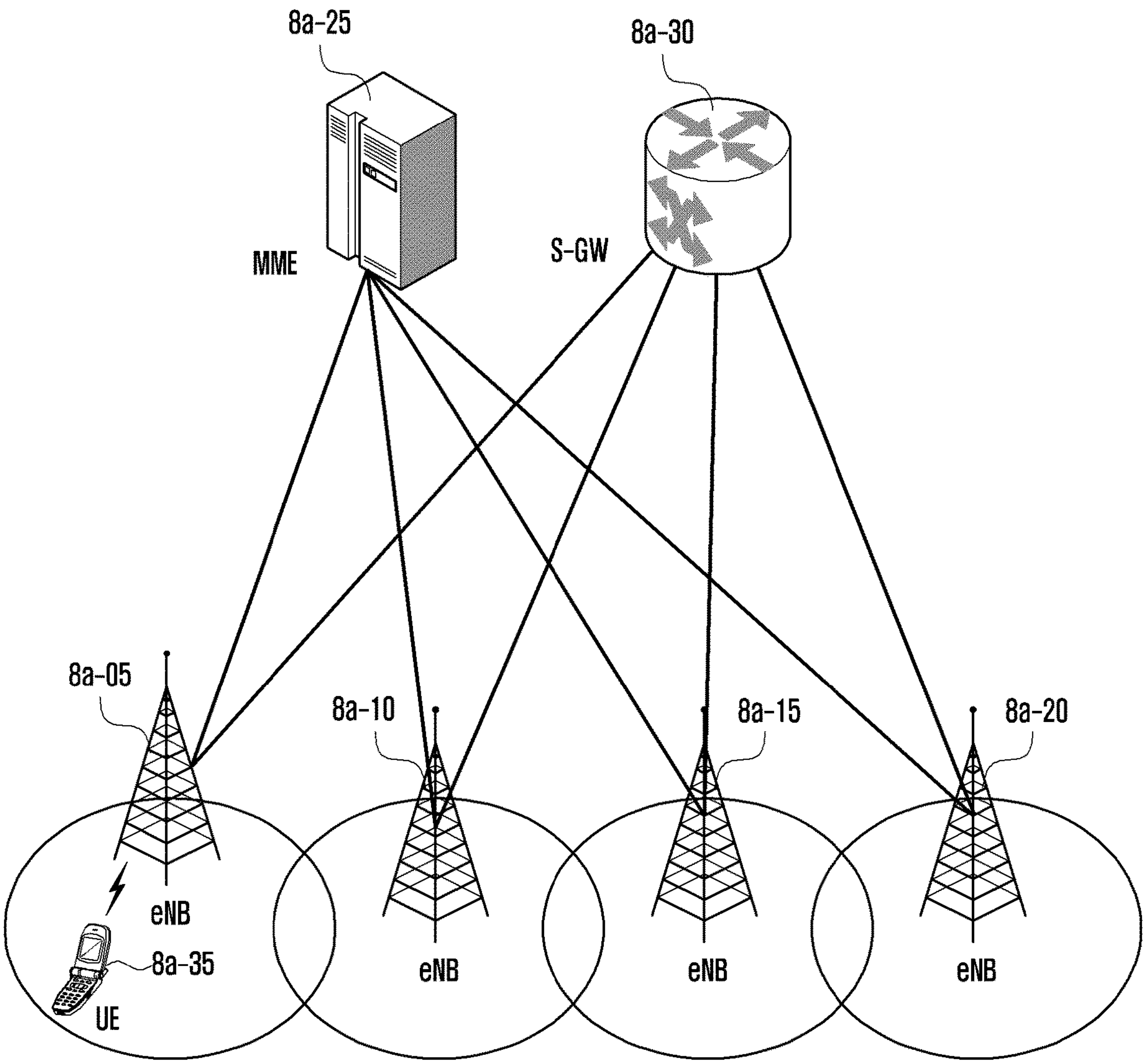
FIG. 8A is a diagram illustrating a structure of an LTE system according to an embodiment of the present disclosure.

FIG. 8A is a diagram illustrating a structure of an LTE system according to an embodiment of the present disclosure.

Referring to FIG. 8A, a radio access network of an LTE system is configured to include next generation base stations (evolved node B, hereinafter, eNB, Node B, or base station) 8*a*-05, 8*a*-10, 8*a*-15, and 8*a*-20, a mobility management entity (MME) 8*a*-25, and a serving-gateway (S-GW) 8*a*-30. User equipment (hereinafter, UE or terminal) 8*a*-35 accesses an external network through the eNBs 8*a*-05 to 8*a*-20 and the S-GW 8*a*-30.

Referring to FIG. 8A, the eNB 8*a*-05 to 8*a*-20 correspond to the existing node B of the UMTS system. The eNB is connected to the UE 8*a*-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information, such as a buffer status, an available transmission power status, and a channel state of the UEs is required. Here, the eNBs 8*a*-05 to 8*a*-20 take charge of the collecting and scheduling. One eNB generally controls a plurality of cells. For example, to implement a transmission rate of 100 Mbps, the LTE system uses, as a radio access technology, OFDM in, for example, a bandwidth of 20 MHz. Further, an adaptive modulation & coding (hereinafter, called AMC) determining a modulation scheme and a channel coding rate depending on a channel status of the terminal is applied. The S-GW-30 is an apparatus for providing a data bearer and generates or removes the data bearer according to the control of the MME 8*a*-25. The MME is an apparatus for performing a mobility management function for the terminal and various control functions and is connected to a plurality of base stations.

Figure 8B:
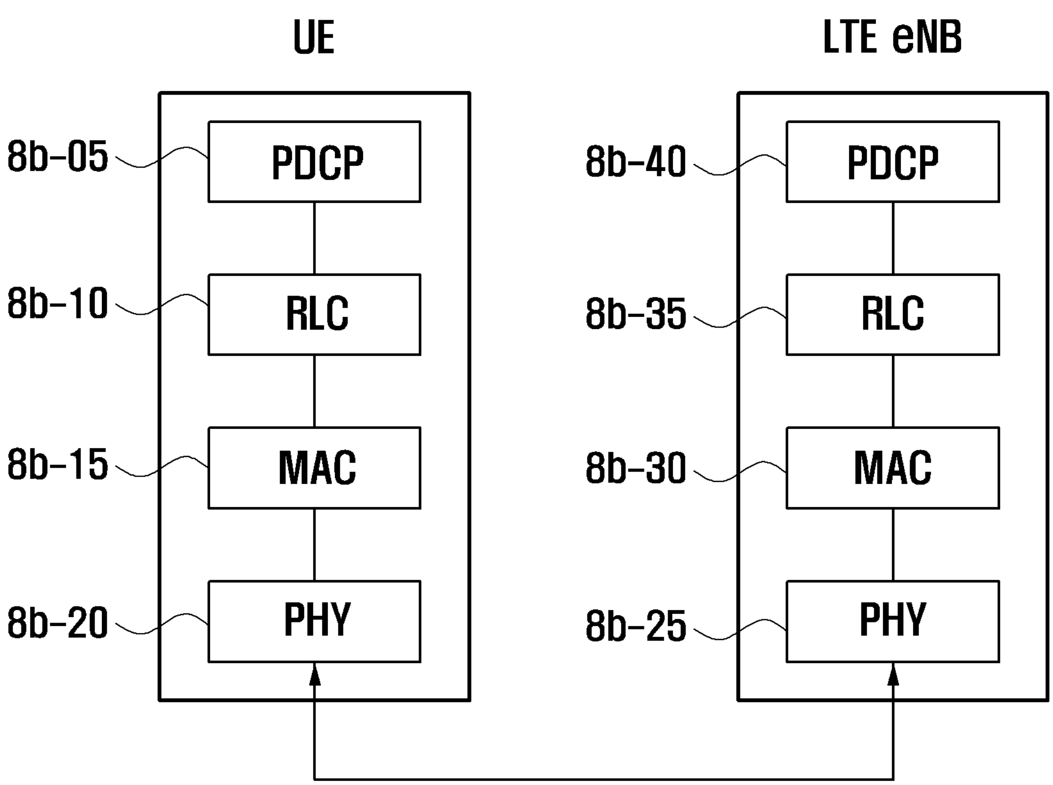
FIG. 8B is a diagram illustrating a radio protocol structure in an LTE system according to an embodiment of the present disclosure.

FIG. 8B is a diagram illustrating a radio protocol structure in an LTE system according to an embodiment of the present disclosure.

Referring to FIG. 8B, the radio protocol of the LTE system is configured to include PDCPs 8*b*-05 and 8*b*-40, RLCs 8*b*-10 and 8*b*-35, and medium access controls (MMCs) 8*b*-15 and 8*b*-30 in the terminal and the eNB, respectively. The PDCPs 8*b*-05 and 8*b*-40 are in charge of operations, such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The RLCs 8b-10 and 8b-35 reconfigures the PDCP PDU to an appropriate size to perform the ARQ operation or the like. The main functions of the RLC are summarized as follows.

- Data transfer function (Transfer of upper layer PDUs)
- ARQ function (Error Correction through ARQ (only for AM data transfer))
- Concatenation, segmentation, reassembly functions (Concatenation, segmentation and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer))
- Duplicate detection function (Duplicate detection (only for UM and AM data transfer))
- Error detection function (Protocol error detection (only for AM data transfer))
- RLC SDU discard function (RLC SDU discard (only for UM and AM data transfer))
- RLC re-establishment function (RLC re-establishment)

The MACs 8b-15 and 8b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

- Mapping function (Mapping between logical channels and transport channels)
- Multiplexing/demultiplexing function (Multiplexing/demultiplexing of MAC SDUs belonging to one or different logical channels into/from transport blocks (TB) delivered to/from the physical layer on transport channels)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

Physical layers 8b-20 and 8b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 8C:
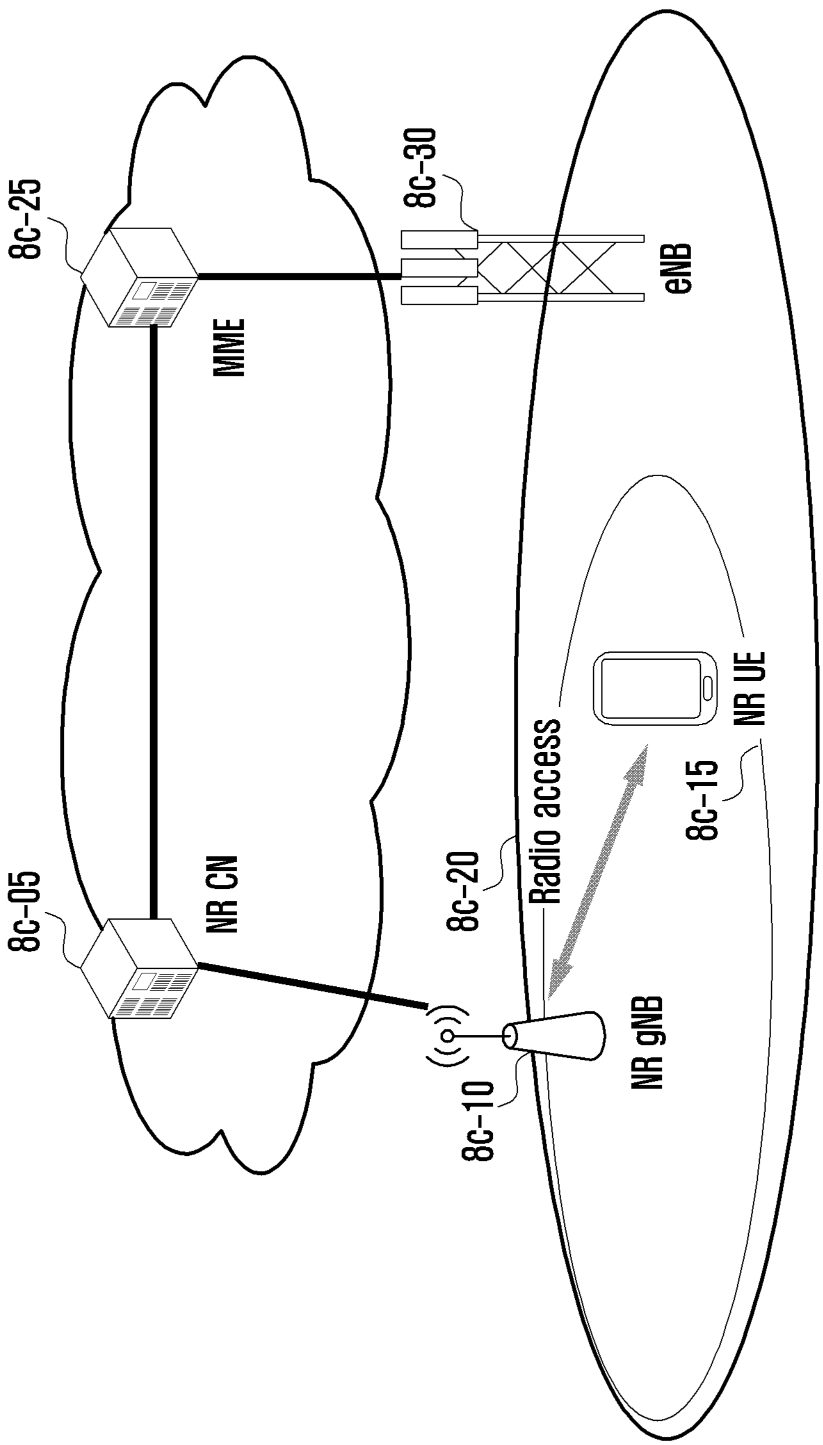
FIG. 8C is a diagram illustrating a structure of a next generation mobile communication system according to an embodiment of the present disclosure.

FIG. 8C is a diagram illustrating a structure of a next generation mobile communication system according to an embodiment of the present disclosure.

Referring to FIG. 8C, a radio access network of a next generation mobile communication system (hereinafter referred to as NR or 5G) is configured to include a next generation base station (New radio node B, hereinafter NR gNB or NR base station) 8c-10 and a new radio core network (NR CN) 8c-05. The user terminal (new radio user equipment, hereinafter, NR UE or UE) 8c-15 accesses the external network through the NR gNB 8c-10 and the NR CN 8c-05.

Referring to FIG. 8C, the NR gNB 8c-10 corresponds to an evolved node B (eNB) of the existing LTE system. The NR gNB is connected to the NR UE 8c-15 via a radio channel and may provide a service superior to the existing node B. In the next generation mobile communication system, since all user traffics are served through a shared channel, an apparatus for collecting state information, such as a buffer state, an available transmission power state, and a channel state of the UEs to perform scheduling is required. The NR NB 8c-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using OFDM as a radio access technology 8c-20. Further, an adaptive modulation & coding (hereinafter, called AMC) determining a modulation scheme and a channel coding rate depending on a channel status of the terminal is applied. The NR CN 8c-05 may perform functions, such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 8c-25 through the network interface. The MME is connected to the eNB 8c-30 which is the existing base station.

Figure 8D:
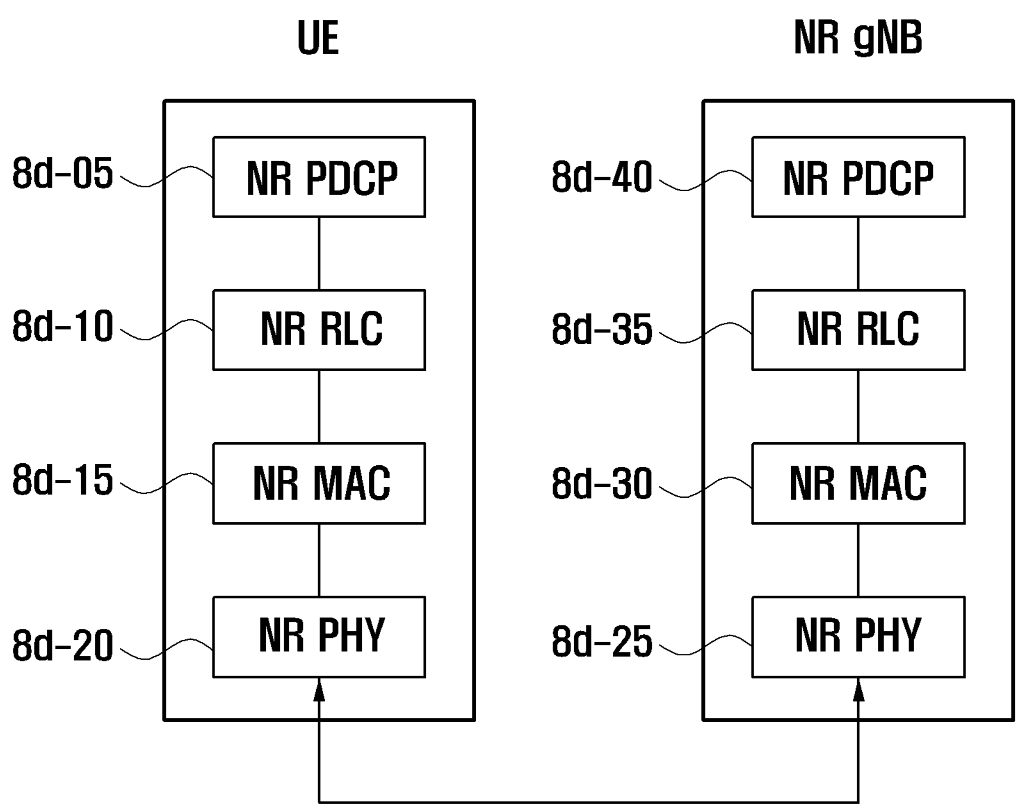
FIG. 8D is a diagram illustrating a radio protocol structure of a next generation mobile communication system according to an embodiment of the present disclosure.

FIG. 8D is a diagram illustrating a radio protocol structure of a next generation mobile communication system according to an embodiment of the present disclosure.

Referring to FIG. 8D, the radio protocol of the next generation mobile communication system is configured to include NR PDCPs 8d-05 and 8d-40, NR RLCs 8d-10 and 8d-35, and NR MACs 8d-15 and 8d-30 in the terminal and the NR base station. The main functions of the NR PDCPs 8d-05 and 8d-40 may include some of the following functions.

- Header compression and decompression function (Header compression and decompression: ROHC only)
- Transfer function of user data (Transfer of user data)
- In-sequence delivery function (In-sequence delivery of upper layer PDUs)
- Reordering function (PDCP PDU reordering for reception)
- Duplicate detection function (Duplicate detection of lower layer SDUs)
- Retransmission function (Retransmission of PDCP SDUs)
- Ciphering and deciphering function (Ciphering and deciphering)
- Timer-based SDU discard function (Timer-based SDU discard in uplink))

In this case, the reordering function of the NR PDCP apparatus refers to a function of rearranging PDCP PDUs received in a lower layer in order based on a PDCP sequence number (SN) and may include a function of transferring data to a higher layer in the rearranged order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 8d-10 and 8d-35 may include some of the following functions.

- Data transfer function (Transfer of upper layer PDUs)
- In-sequence delivery function (In-sequence delivery of upper layer PDUs)
- Out-of-sequence delivery function (Out-of-sequence delivery of upper layer PDUs)
- ARQ function (Error correction through HARQ)

- Concatenation, segmentation, reassembly function (Concatenation, segmentation and reassembly of RLC SDUs)
- Re-segmentation function (Re-segmentation of RLC data PDUs)
- Reordering function (Reordering of RLC data PDUs)
- Duplicate detection function (Duplicate detection)
- Error detection function (Protocol error detection)
- RLC SDU discard function (RLC SDU discard)
- RLC re-establishment function (RLC re-establishment)

In the above description, the in-sequence delivery function of the NR RLC apparatus refers to a function of delivering RLC SDUs received from a lower layer to a higher layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the higher layer in order when there is the lost RLC SDU, a function of transferring all the received RLC SDUs to the higher layer before a predetermined timer starts if the timer expires even if there is the lost RLC SDU, or a function of transferring all the RLC SDUs received until now to the higher layer in order if the predetermined timer expires even if there is the lost RLC SDU. In this case, the out-of-sequence delivery function of the NR RLC apparatus refers to a function of directly delivering the RLC SDUs received from the lower layer to the higher layer regardless of order, and may include a function of reassembling and transferring an original one RLC SDU which is divided into several RLC SDUs and received, and a function of storing the RLC SN or the PDCP SP of the received RLC PDUs and arranging it in order to record the lost RLC PDUs.

The NR MACs 8*d*-15 and 8*d*-30 may be connected to several NR RLC layer apparatus configured in one terminal, and the main functions of the NR MAC may include some of the following functions.

- Mapping function (Mapping between logical channels and transport channels)
- Multiplexing and demultiplexing function (Multiplexing/demultiplexing of MAC SDUs)
- Scheduling information reporting function (Scheduling information reporting)
- HARQ function (Error correction through HARQ)
- Priority handling function between logical channels (Priority handling between logical channels of one UE)
- Priority handling function between terminals (Priority handling between UEs by means of dynamic scheduling)
- MBMS service identification function (MBMS service identification)
- Transport format selection function (Transport format selection)
- Padding function (Padding)

The NR PHY layers 8*d*-20 and 8*d*-25 may perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Figure 8E:
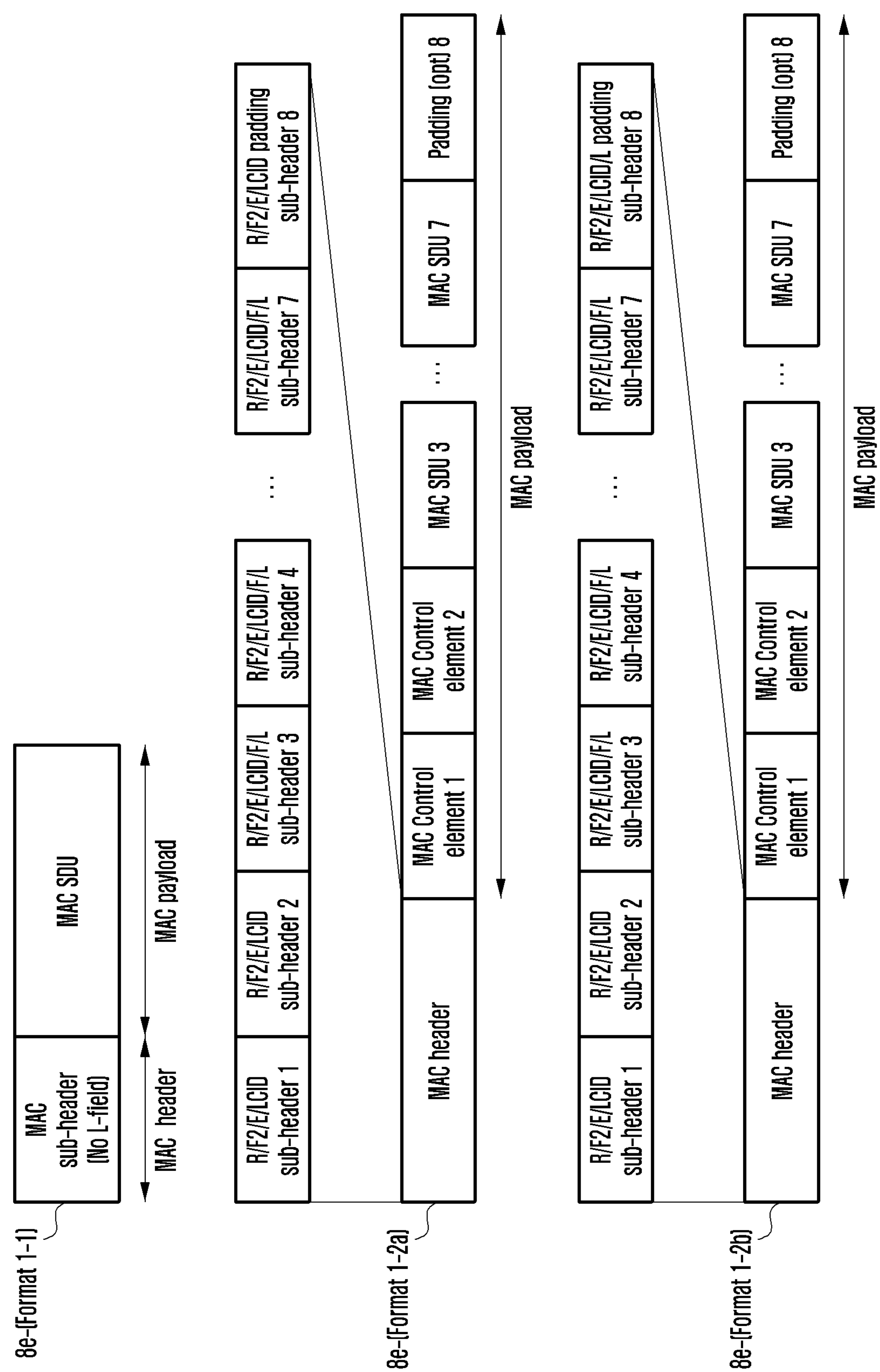
FIG. 8E is a diagram illustrating a first MAC PDU structure for a next generation mobile communication system according to an embodiment of the present disclosure.

FIG. 8E is a diagram illustrating a first MAC PDU structure for a next generation mobile communication system according to an embodiment of the present disclosure.

Referring to FIG. 8E, if the MAC transmitting side receives the RLC PDU (or MAC SDU) from the RLC layer, the MAC transmitting side inserts an identifier (local channel identity, hereinafter, referred to as LCID) of RLC entity generated by the RLC PDU (or MAC SDU) and a size (length, hereinafter, referred to as an L-field) of the RLC PDU into the MAC header. The LCID and the L-field are inserted one by one per RLC PDU, and therefore if the plurality of RLC PDUs are multiplexed into the MAC PDU, the LCID and the L-field may also be inserted by the number of RLC PDUs.

Since the information of the MAC header is usually located at the front part of the MAC PDU, the LCID and the L-fields are matched with the RLC PDU (or MAC SDU) within the header in order. In other words, MAC sub-header 1 indicates information on MAC SDU 1, and MAC sub-header 2 indicates information on MAC SDU 2.

For the operation of the physical layer, a total size of the MAC PDU is given to the receiving side as separate control information. Since the total size of the MAC PDU is a quantized value according to a predetermined criterion, padding may be used in some cases. The padding means certain bits (usually '0') that are filled in the remaining part of the packet so that when the packet is generated with data, the size of the packet is byte-aligned.

Since the total size of the MAC PDU is given, an L-field value indicating the size of the RLC PDU (or MAC SDU) may be unnecessary information in some cases. For example, if only one RLC PDU is stored in the MAC PDU, the size of the RLC PDU has the possibility that the size of the MAC header is equal to a limited value in the size of the MAC PDU.

Meanwhile, the VoIP packet consists of an IP/UDP/RTP header and a VoIP frame, and the IP/UDP/RTP header is compressed to about 1 to 15 bytes through a header compression protocol called a robust header compression (ROHC) and the size of the VoIP frame always has a constant value within a given code rate. Therefore, the size of the VoIP packet does not deviate from a certain range, and it is effective to use a predetermined value rather than informing a value each time like the L-field.

The following Table 8 describes the information that may be included in the MAC header.

TABLE 8

Variables in MAC Header

| Variable | Usage |
|---|---|
| LCID | The LCID may indicate the identifier of the RLC entity that generates the RLC PDU (or MAC SDU) received from the upper layer. Alternatively, the LCID may indicate the MAC control element (CE) or the padding. Further, the LCID may be defined differently depending on the channel to be transmitted. For example, the LCID may be defined differently according to DL-SCH, UL-SCH, and MCH. |
| L | The L may indicate a length of the MAC SDU, and may indicate a length of the MAC CE having a variable length. In the case of the MAC CE having a fixed length, the L-field may be omitted. The L-field may be omitted for predetermined reasons. The predetermined reasons are the case where the size of the MAC SDU is fixed, the size of the MAC PDU is informed from the transmitting side to the receiving side, or the length may be calculated by calculation at the receiving side. |

TABLE 8-continued

Variables in MAC Header

| Variable | Usage |
|---|---|
| F | The F indicates the size of the L-field. If there is no L-field, the F may be omitted, and if there is the F-field, the size of the L-field can be limited to a predetermined size. |
| F2 | The F2 indicates the size of the L-field. If there is no L-field, the F2 may be omitted, and if there is the F2-field, the size of the L-field may be limited to a predetermined size and the L-field may be limited to a size different from the F-field. For example, the F2-field may indicate a larger size than the F-field. |
| E | E indicates other headers in the MAC heater. For example, if the E has a value of 1, variables of another MAC header may be come. However, if the E has a value of 0, the MAC SDU, the MAC CE, or the Padding may be come. |
| R | Reserved bit. |

Meanwhile, the embodiment of the configuration and transmission of the MAC PDU of the terminal or the base station described below may be interpreted as an operation between the transmitting end and the receiving end. In other words, the process of transmitting the uplink MAC PDU configured by the terminal which is the transmitting end to the base station which is the receiving end may be applied to the process of transmitting the downlink MAC PDU configured by the base station which is the transmitting end to the terminal which is the receiving end.

Referring to FIG. 8E, 8*e*-(Format 1-1) may store one MAC SDU or MAC CE. In the above structure, the MAC header is located at a front part and the payload is located at a rear part. The header may include the variables described in Table 8 except for the L-field, and information other than the variables described in Table 8.

8*e*-(Format 1-2*a*) has a structure in which the MAC header is located at the front part of the MAC PDU, followed by the MAC CE, the MAC SDU, and the padding. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 8*e*-(Format 1-2*a*). The 8*e*-(Format 1-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

8*e*-(Format 1-2*b*) has a structure in which the MAC header is located at the front part of the MAC PDU, followed by the MAC CE, the MAC SDU, and the padding. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 8*e*-(Format 1-2*a*). In the 8*e*-(Format 1-2*a*) structure, the L-field may be included in all the sub-headers.

Figure 8F:
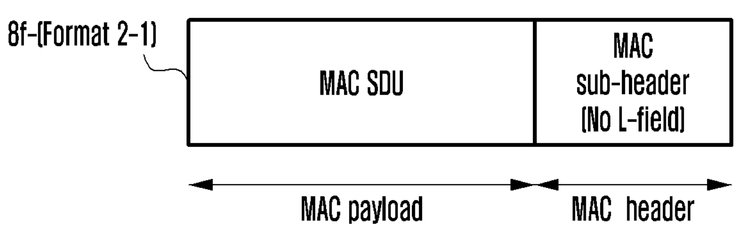
FIGS. 8FA, 8FB, 8FC, 8FD, 8FE, 8FF, 8FG, 8FH, and 8FI are diagrams of a second MAC PDU structure for a next generation mobile communication system according to embodiments of the present disclosure.
Figure 8F:
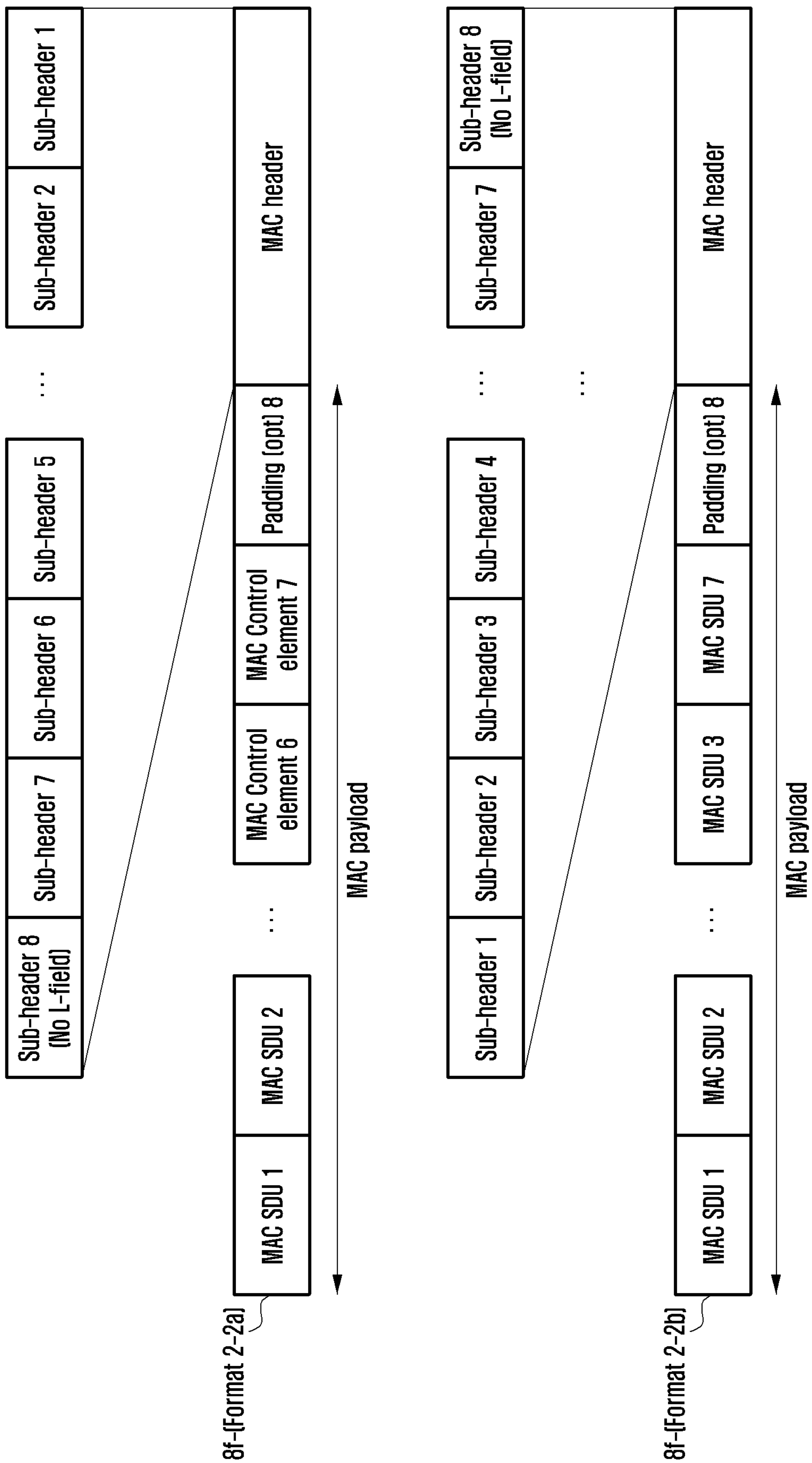
Figure 8F:
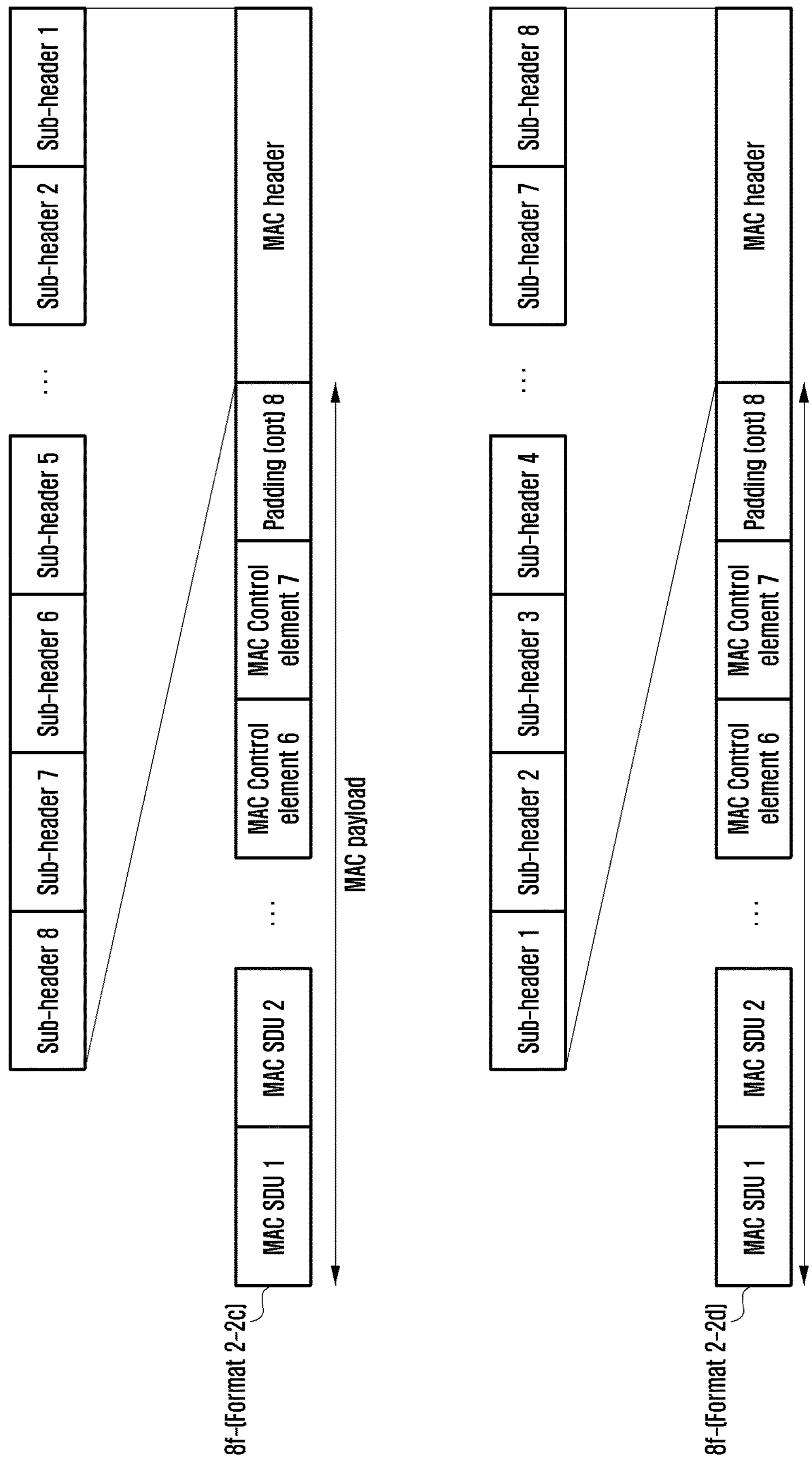
Figure 8F:
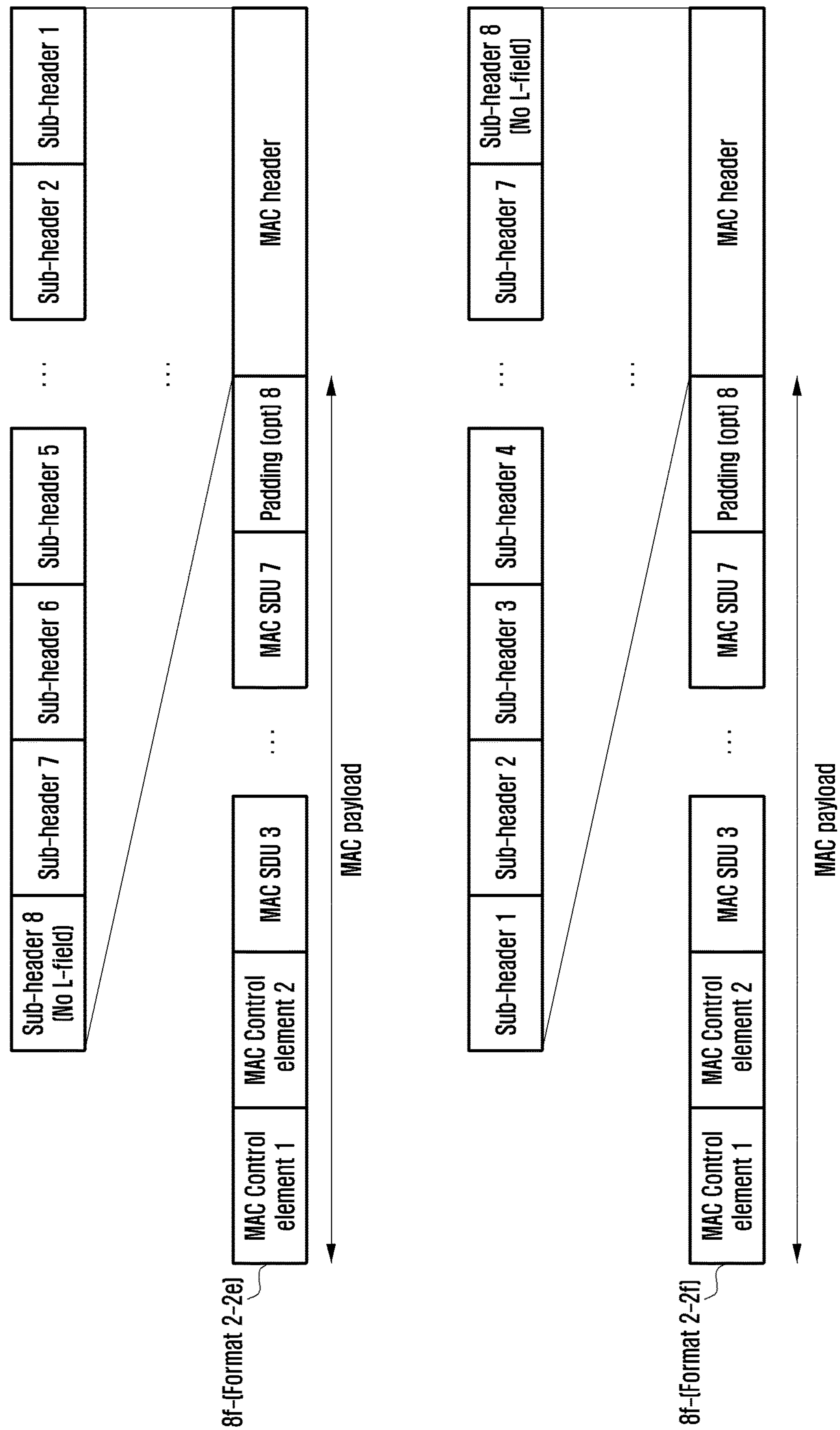
Figure 8F:
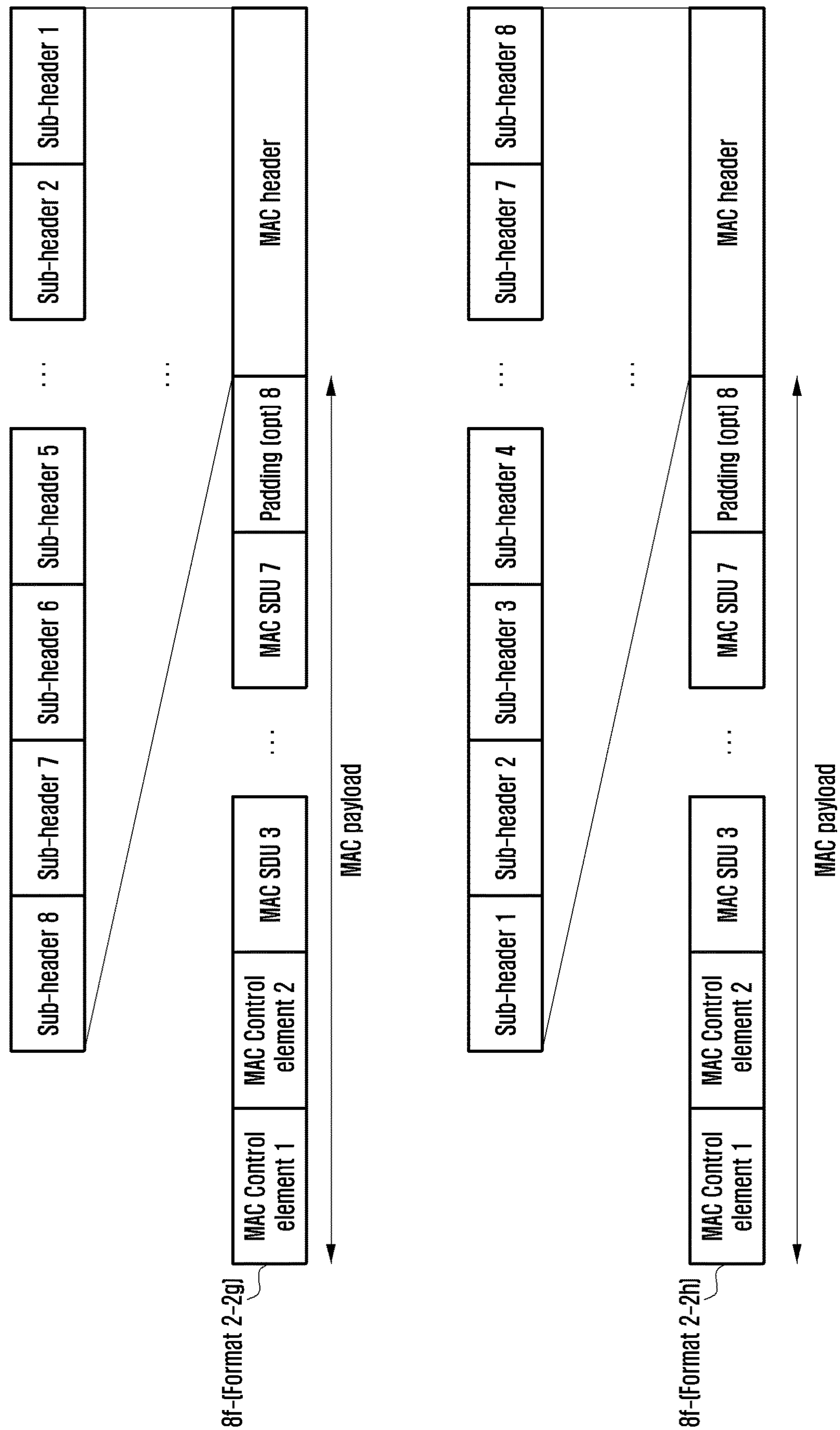
Figure 8F:
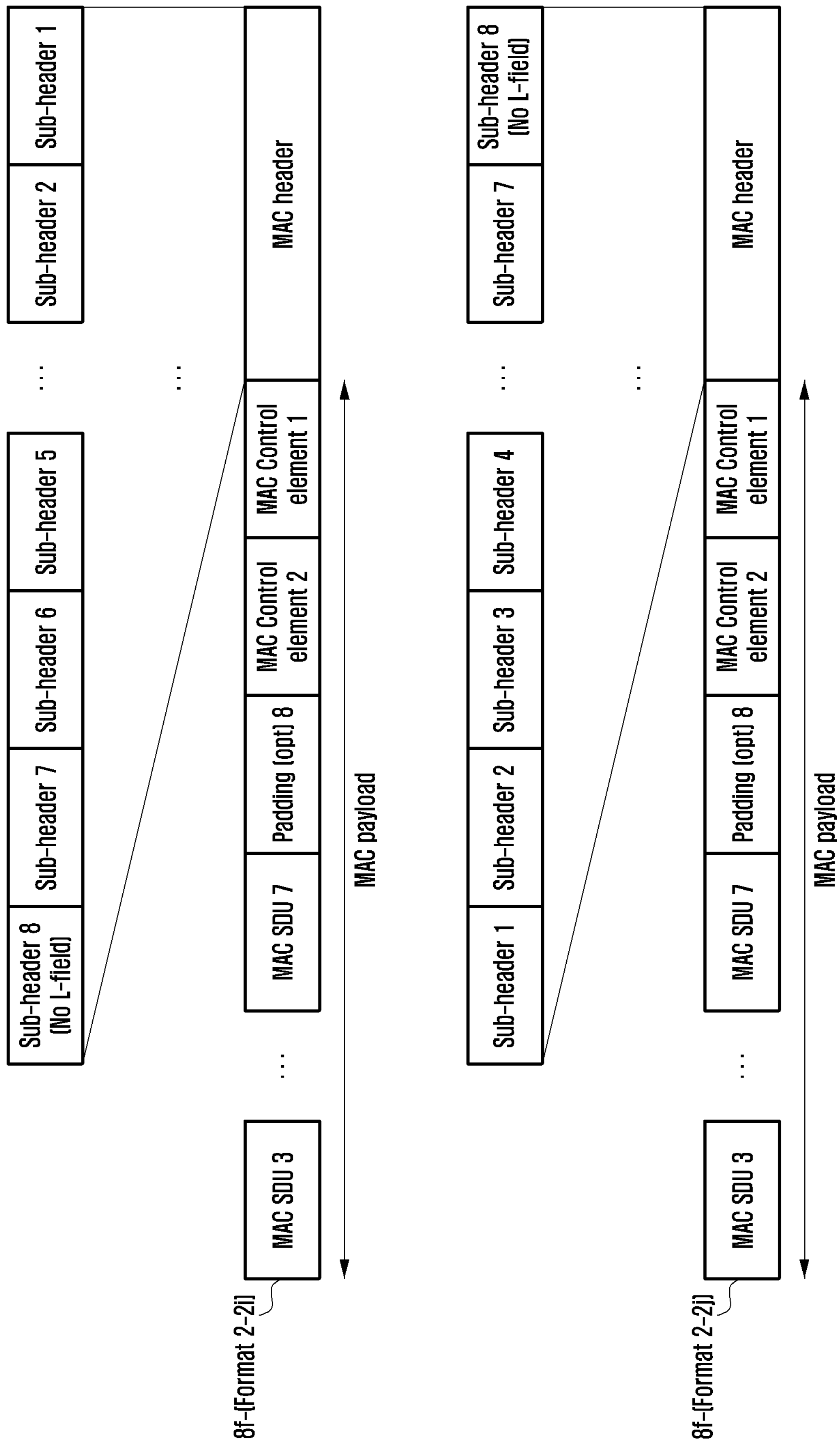
Figure 8F:
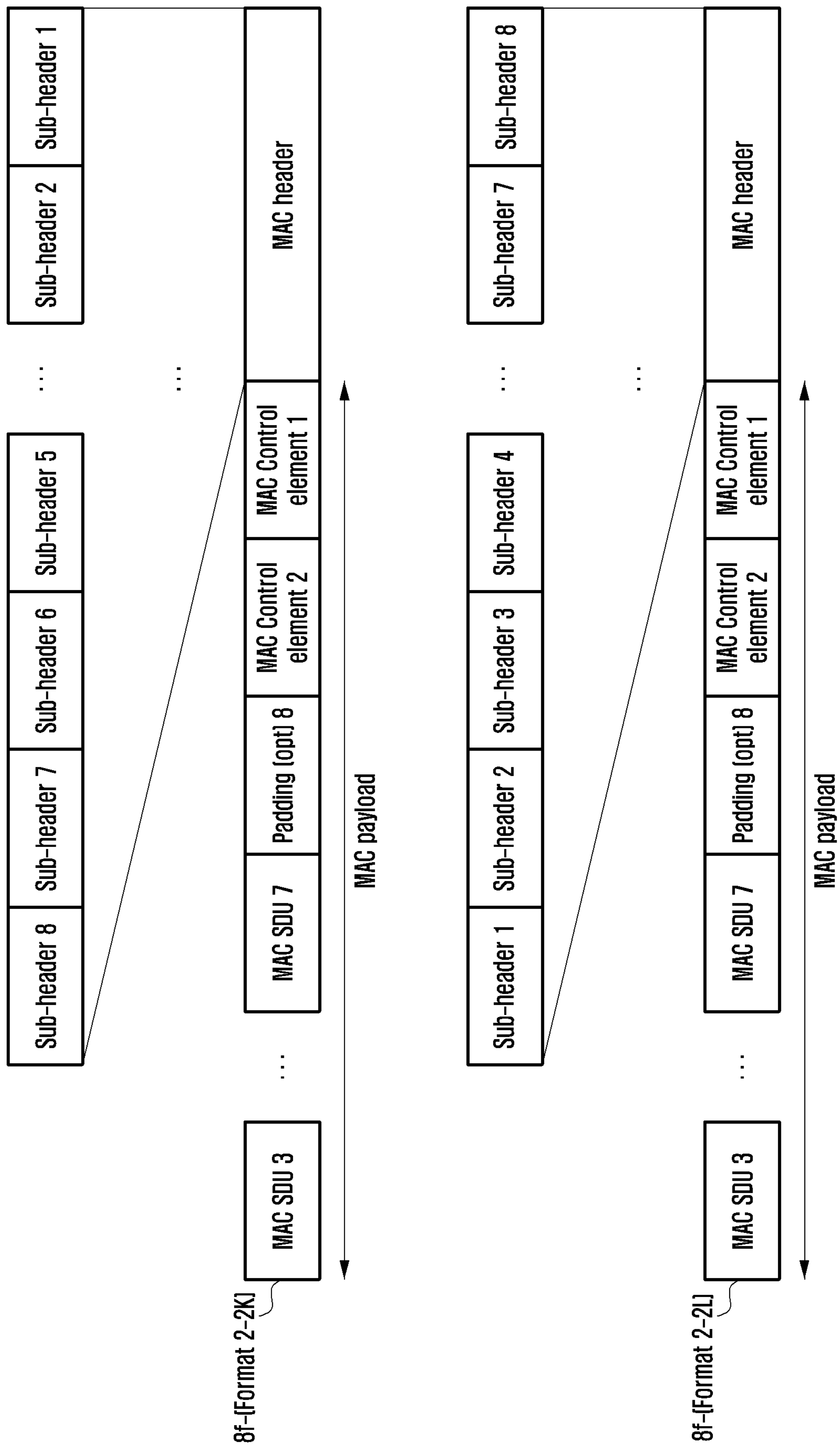
Figure 8F:
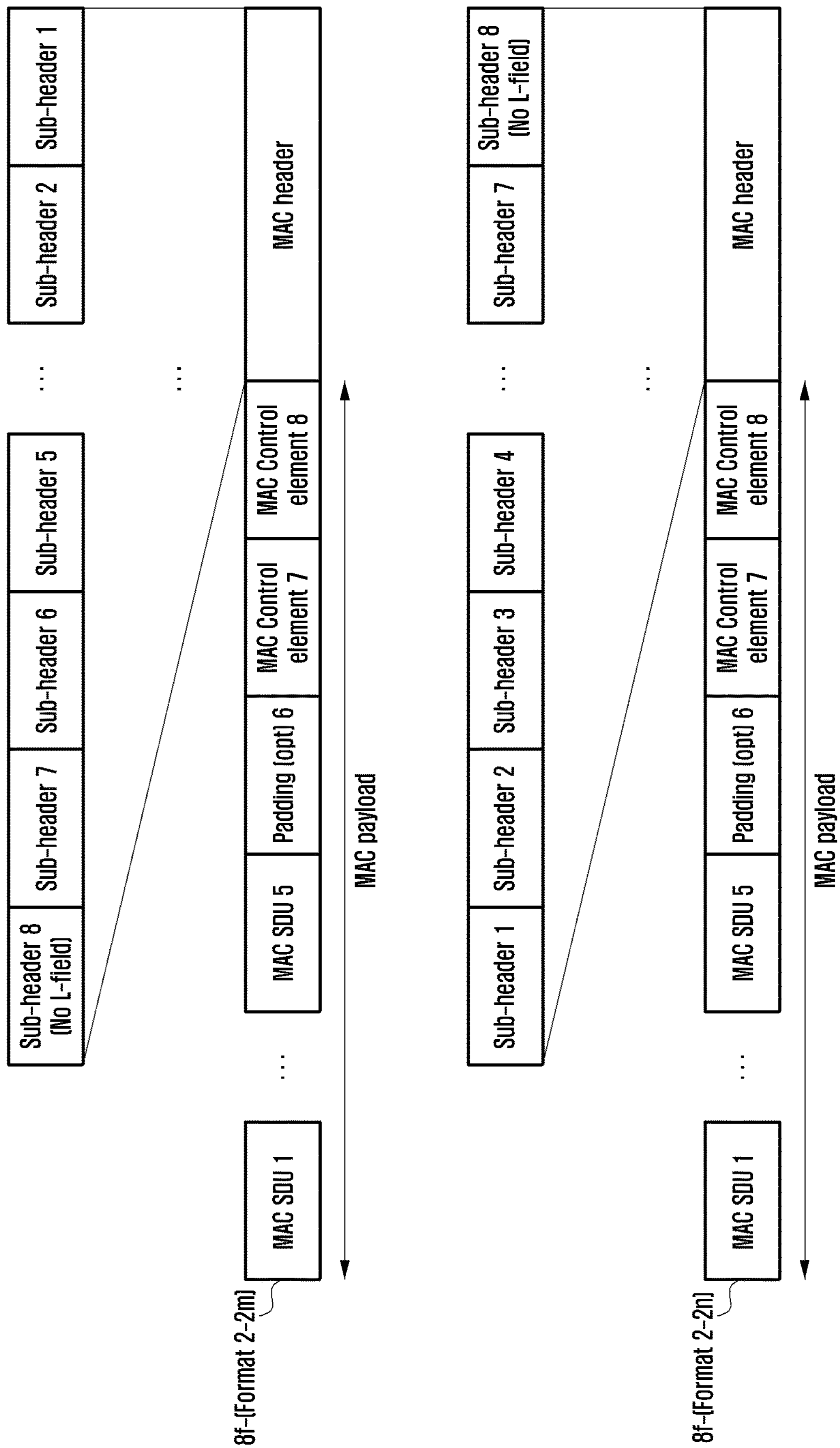
Figure 8F:
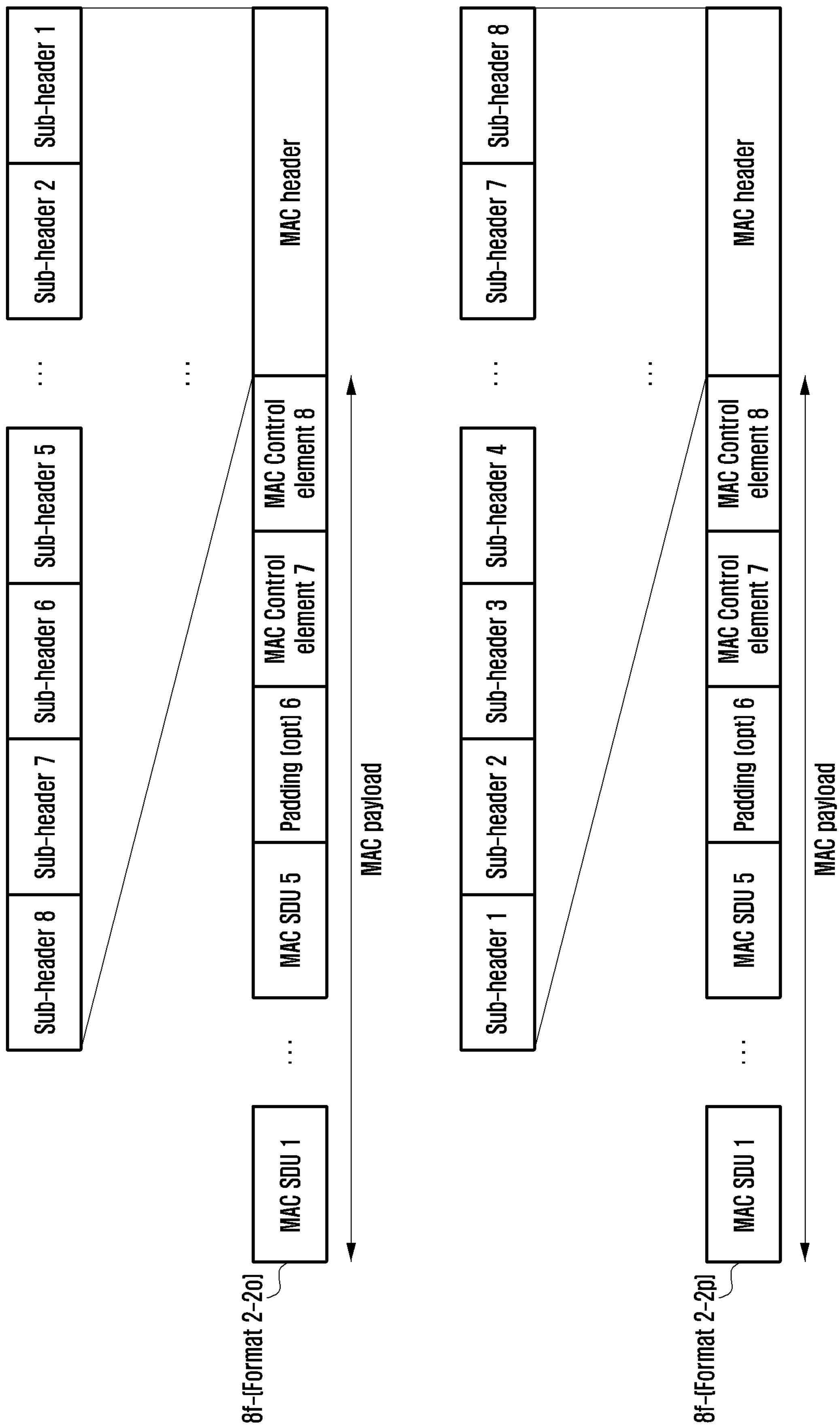

FIGS. 8FA to 8FI are diagrams illustrating a second MAC PDU structure for a next generation mobile communication system according to an embodiment of the present disclosure.

Referring to FIGS. 8FA to 8FF-(Format 2-1) may store one MAC SDU or MAC CE. In the above structure, the payload is located at a front part and the MAC header is located at a rear part. The header may include the variables described in Table 8 except for the L-field, and information other than the variables described in Table 8.

8*f*-(Format 2-2*a*) has a structure in which the MAC SDU, the MAC CE, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 2*f*-(Format 8-2*a*). The 8*f*-(Format 2-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*b*) has a structure in which the MAC SDU, the MAC CE, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8*f*-(Format 2-2*b*). The 8*f*-(Format 2-2*b*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*c*) has a structure in which the MAC SDU, the MAC CE, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8*f*-(Format 2-2*b*). In the 8*f*-(Format 2-2*c*) structure, the L-field may be included in all the sub-headers.

8*f*-(Format 2-2*d*) has a structure in which the MAC SDU, the MAC CE, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8*f*-(Format 2-2*d*). In the 8*f*-(Format 2-2*d*) structure, the L-field may be included in all the sub-headers.

8*f*-(Format 2-2*e*) has a structure in which the MAC CE, the MAC SDU, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 8*f*-(Format 2-2*e*). The 8*f*-(Format 2-2*e*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-20 has a structure in which the MAC CE, the MAC SDU, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 2*f*-(Format 8-20. The 8*f*-(Format 2-20 structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*g*) has a structure in which the MAC CE, the MAC SDU, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 8*f*-(Format 2-2*g*). In the 3*f*-(Format 2-2*g*) structure, the L-field may be included in all the sub-headers.

8*f*-(Format 2-2*h*) has a structure in which the MAC CE, the MAC SDU, and the padding are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC CE, MAC SDU, and padding, in the order numbered on the sub-headers and the payloads of the 8*f*-(Format 2-2*h*). In the 8*f*-(Format 2-2*h*) structure, the L-field may be included in all the sub-headers.

8*f*-(Format 2-2*i*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*i*). The 8*f*-(Format 2-2*i*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*j*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 8-2*i*). The 8*f*-(Format 2-2*j*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*k*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 2*f*-(Format 8-2*k*). In the 8*f*-(Format 2-2*k*) structure, the L-field may be included in all the sub-headers.

8*f*-(Format 2-2*l*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*l*). In the 8*f*-(Format 2-2*l*) structure, the L-field may be included in all the sub-headers.

8*f*-(Format 2-2*m*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*m*). The 8*f*-(Format 2-2*m*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*n*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*n*). The 8*f*-(Format 2-2*n*) structure is characterized in that an L-field is not included in the last sub-header. The receiving side may confirm the L-field value of the remaining sub-headers and subtract the L-field value from the entire length of the MAC PDU to estimate the length of the MAC SDU.

8*f*-(Format 2-2*o*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*o*). In the 8*f*-(Format 2-2*o*) structure, the L-field may be included in all the sub-headers.

8*f*-(Format 2-2*p*) has a structure in which the MAC SDU, the padding, and the MAC CE are located at the front part of the MAC PDU, followed by the MAC header. The MAC header consists of several sub-heads. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, padding, and MAC CE, in the order numbered on the sub-headers and the payloads of the 8*f*-(Format 2-2*p*). In the 8*f*-(Format 2-2*p*) structure, the L-field may be included in all the sub-headers.

Figure 8G:
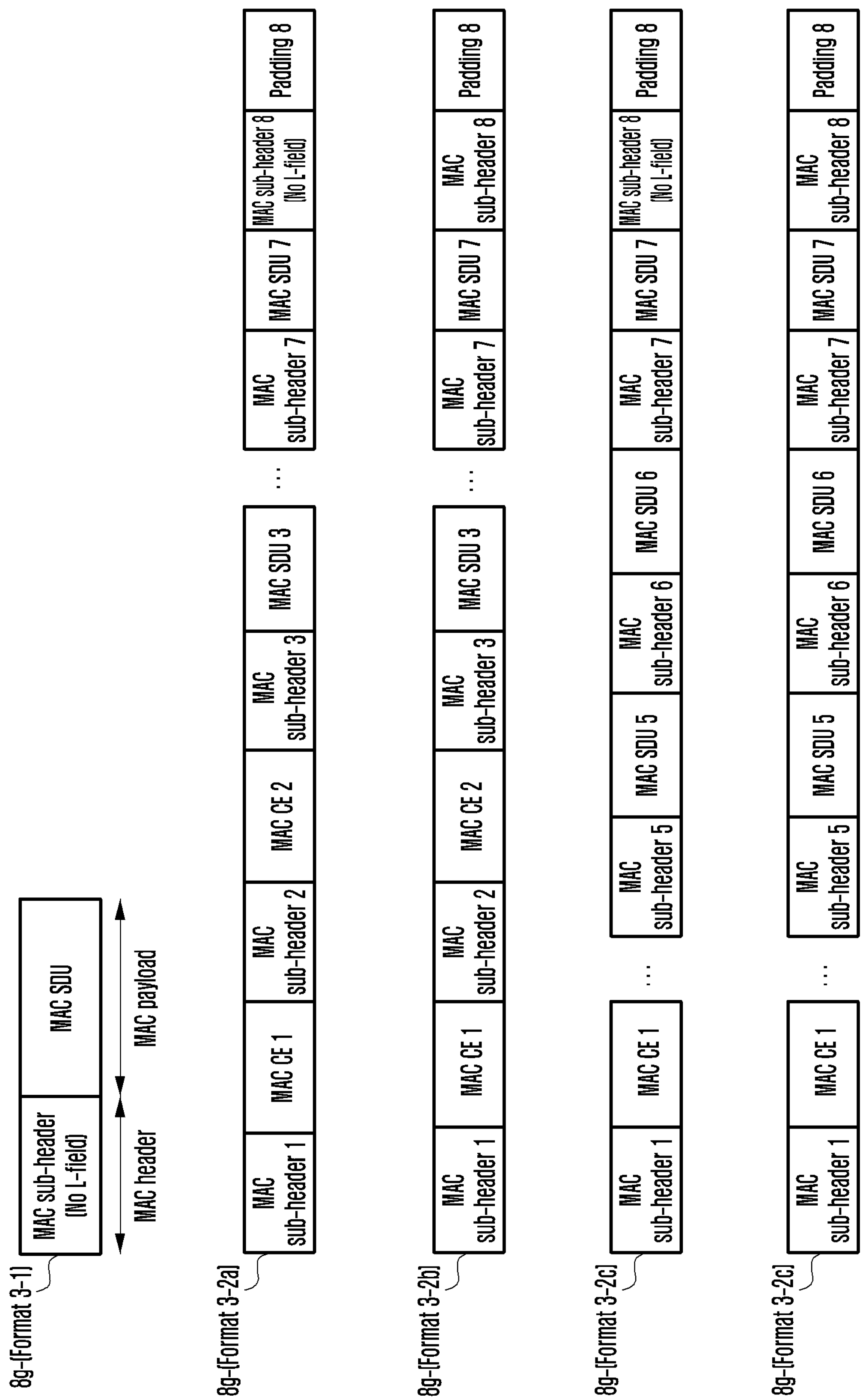
FIG. 8G is a diagram illustrating a third MAC PDU structure for a next generation mobile communication system according to an embodiment of the present disclosure.

FIG. 8G is a diagram illustrating a third MAC PDU structure for a next generation mobile communication system according to an embodiment of the present disclosure.

Referring to FIG. 8G, 8*g*-(Format 3-1) may store one MAC SDU or MAC CE. In the above structure, the MAC header is located at a front part and the payload is located at a rear part. The header may include the variables described in Table 8 except for the L-field, and information other than the variables described in Table 8.

8*g*-(Format 3-2*a*) has a structure, such as the sub-header, the MAC CE, the sub-header, the MAC SDU, the sub-header, and the padding, and in FIGS. 8FA to 2FI, the second MAC PDU structure has the structure in which the sub-headers are collected at one part and the payload part is located separately, whereas the second MAC PDU structure has the repeating structure, such as the sub-header, the payload, the sub-header, and the payload. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8*g*-(Format 3-2*a*). For example, the header of the front part becomes the information indicating the payload of the rear part. The 8*g*-(Format 3-2*a*) structure is characterized in that an L-field is not included in the last sub-header. The receiving side may confirm the L-field value of the remaining sub-headers and subtract the L-field value from the entire length of the MAC PDU to estimate the length of the MAC SDU.

8*g*-(Format 3-2*b*) has a structure, such as the sub-header, the MAC CE, the sub-header, the MAC SDU, the sub-header, and the padding, and in FIGS. 8FA to 8FI, the second MAC PDU structure has the structure in which the sub-headers are collected at one part and the payload part is located separately, whereas the second MAC PDU structure has the repeating structure, such as the sub-header, the payload, the sub-header, and the payload. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8*g*-(Format 3-2*b*). For example, the header of the front part becomes the information indicating the payload of the rear part. In the 8*g*-(Format 3-2*b*) structure, the L-field may be included in all the sub-headers.

8*g*-(Format 3-2*c*) has a structure, such as the sub-header, the MAC CE, the sub-header, the MAC SDU, the sub-header, and the padding, and in FIGS. 8FA to 8FI, the second MAC PDU structure has the structure in which the sub-headers are collected at one part and the payload part is located separately, whereas the second MAC PDU structure has the repeating structure, such as the sub-header, the payload, the sub-header, and the payload. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8g-(Format 3-2c). For example, the header of the front part becomes the information indicating the payload of the rear part. The 8g-(Format 3-2c) structure is characterized in that an L-field is not included in the last sub-header. The receiving side may confirm the L-field value of the remaining sub-headers and subtract the L-field value from the entire length of the MAC PDU to estimate the length of the MAC SDU.

8g-(Format 3-2c) has a structure, such as the sub-header, the MAC CE, the sub-header, the MAC SDU, the sub-header, and the padding, and in FIGS. 8FA to 8FI, the second MAC PDU structure has the structure in which the sub-headers are collected at one part and the payload part is located separately, whereas the second MAC PDU structure has the repeating structure, such as the sub-header, the payload, the sub-header, and the payload. The sub-header may include some of the variables described in Table 8, and information other than the variables described in Table 8. The padding is stored only when necessary for predetermined reasons. The predetermined reasons refer to a case where it is necessary to set the byte MAC PDU in byte units. In this case, each MAC sub-head indicates information corresponding to each MAC SDU, MAC CE, and padding, in the order numbered on the sub-headers and the payloads of the 8g-(Format 3-2d). For example, the header of the front part becomes the information indicating the payload of the rear part. In the 8g-(Format 3-2d) structure, the L-field may be included in all the sub-headers.

A preferred 8-1-th embodiment of the present disclosure for selecting a MAC PDU structure in the next generation mobile communication system is as follows.

The 8-1-th embodiment is a method for determining a MAC PDU format to be applied to an arbitrary MAC PDU by a terminal among a plurality of predefined MAC PDU formats.

If the MAC PDU is received from the base station and a 1-1-th condition is satisfied, a 1-1-th format is applied.

If the MAC PDU is received from the base station and a 1-2-th condition is satisfied, a 1-2-th format is applied.

If a 2-1-th condition is satisfied when the MAC PDU to be transmitted to the base station is generated, a 2-1-th format is applied.

If a 2-2-th condition is satisfied when the MAC PDU to be transmitted to the base station is generated, a 2-2-th format is applied.

The 1-1-th condition is the case where only one MAC SDU is stored in the MAC PDU and no padding or MAC CE is stored, The 1-2-th condition refers to the case where one or more MAC SDU is stored in the MAC PDU or the MAC SDU and the MAC CE are stored together, or the MAC SDU and the padding are stored together.

The 1-1-th format refers to the 8e-(Format 1-1) of FIG. 8E as a format in which the MAC sub-header is located before the associated MAC SDU and the information indicating the size of the MAC SDU is not included in the MAC sub-header.

The 1-2-th format refers to the 8e-(Format 1-2a) or the 8e-(Format 1-2b) of FIG. 8E as a format in which the MAC sub-header is located before the associated MAC SDU and the information indicating the size of the MAC SDU is not included in the MAC sub-header.

In the 2-1-th condition is the case where only one MAC SDU is stored in the MAC PDU and the padding or the MAC CE is not received or the case where the MAC PDU is transmitted during the random access process or the CCCH control message is stored in the MAC PDU.

The 2-2-th condition refers to the case where one or more MAC SDU is stored in the MAC PDU or the MAC SDU and the MAC CE are stored together, or the MAC SDU and the padding are stored together.

The 2-1-th format refers to the 8e-(Format 2-1) of FIG. 8E as a format in which the MAC sub-header is located before the associated MAC SDU and the information indicating the size of the MAC SDU is not included in the MAC sub-header.

The 2-2-th format refers to 8f-(Format 2-2a) or 8f-(Format 2-2b) or 8f-(Format 2-2c) or 8f-(Format 2-2d) or 8f (Format 2-2d), 8f-(Format 2-2e) or 8f-(Format 2-20 or 8f-(Format 2-2g) or 8f-(Format 2-2h) or 8f-(Format 2-2i) or 8f-(Format 2-2j) or 8f-(Format 2-2k) or 8f-(Format 2-2l) or 8f-(Format 2-2m) or 8f-(Format 2-2n) or 8f-(Format 2-2o) or 8f (Format 2-2p) of FIGS. 8FA to 8FI.

Figure 8H:
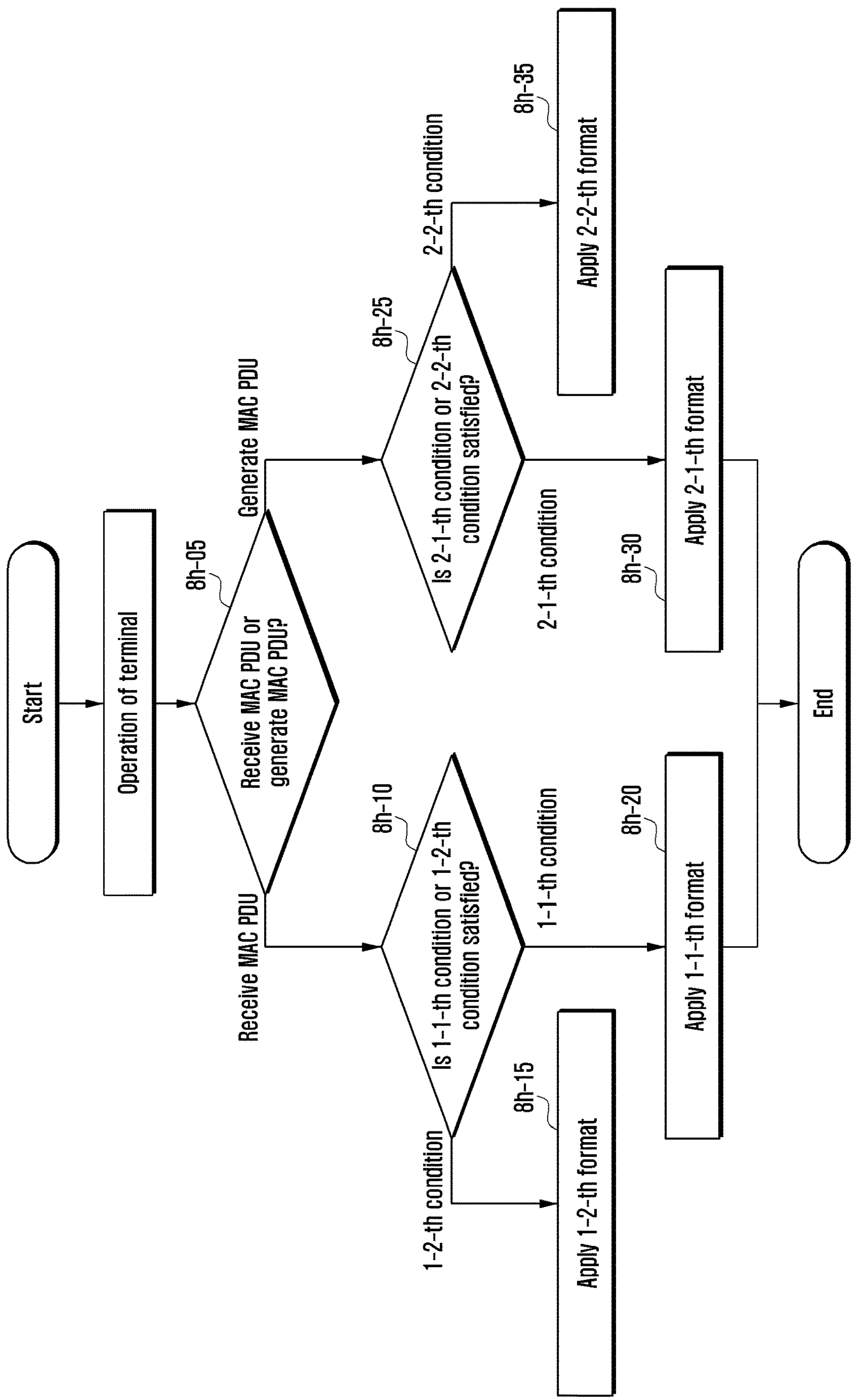
FIG. 8H is a diagram illustrating an operation of a terminal in a next generation mobile communication system according to 8-1-th and 8-2-th embodiments of the present disclosure.

FIG. 8H is a diagram illustrating an operation of a terminal in a next generation mobile communication system according to 8-1-th and 8-2-th embodiments of the present disclosure.

Referring to FIG. 8H, the terminal 8h-01 confirms whether the MAC PDU is received or not or the generation of the MAC PDU is instructed in operation 8h-05). If the MAC PDU is received, the 1-1-th and 1-2-th conditions are confirmed in operation 8h-10. If the 1-1-th condition is satisfied, the 1-1-th format is applied in operation 8h-20, and if the 1-2-th condition is satisfied, the 1-2-th format is applied in operation 8h-15. If the MAC PDU should be generated, the 2-1-th and 2-2-th conditions are confirmed in operation 8h-25. If the 2-1-th condition is satisfied, the 2-1-th format is applied in operation 8h-30, and if the 2-2-th condition is satisfied, the 2-2-th format is applied in operation 8h-35.

A preferred 8-2-th embodiment of the present disclosure for selecting a MAC PDU structure in the next generation mobile communication system is as follows.

The 8-2-th embodiment is a method for determining a MAC PDU format to be applied to an arbitrary MAC PDU by a terminal among a plurality of predefined MAC PDU formats.

If the MAC PDU is received from the base station and a 1-1-th condition is satisfied, a 1-1-th format is applied.

If the MAC PDU is received from the base station and a 1-2-th condition is satisfied, a 1-2-th format is applied.

If a 2-1-th condition is satisfied when the MAC PDU to be transmitted to the base station is generated, a 2-1-th format is applied.

If a 2-2-th condition is satisfied when the MAC PDU to be transmitted to the base station is generated, a 2-2-th format is applied.

The 1-1-th condition is the case where only one MAC SDU is stored in the MAC PDU and no padding or MAC CE is stored, The 1-2-th condition refers to the case where one or more MAC SDU is stored in the MAC PDU or the MAC SDU and the MAC CE are stored together, or the MAC SDU and the padding are stored together.

The 1-1-th format refers to the 8e-(Format 1-1) of FIG. 8E as a format in which the MAC sub-header is located before the associated MAC SDU and the information indicating the size of the MAC SDU is not included in the MAC sub-header.

The 1-2-th format refers to the 8e-(Format 1-2a) or the 8e-(Format 1-2b) of FIG. 8E as a format in which the MAC sub-header is located before the associated MAC SDU and the information indicating the size of the MAC SDU is not included in the MAC sub-header.

In the 2-1-th condition is the case where only one MAC SDU is stored in the MAC PDU and the padding or the MAC CE is not received or the case where the MAC PDU is transmitted during the random access process or the CCCH control message is stored in the MAC PDU.

The 2-2-th condition refers to the case where one or more MAC SDU is stored in the MAC PDU or the MAC SDU and the MAC CE are stored together, or the MAC SDU and the padding are stored together.

The 2-1-th format refers to the 8g-(Format 3-1) of FIG. 8G as a format in which the MAC SDU associated with the MAC sub-header is repeatedly located and the information indicating the size of the MAC SDU is not included in the MAC sub-header.

The 2-2-th format refers to 8G-(Format 3-2a) or 8g-(Format 3-2b) or 8g-Format 3-2c) of FIG. 8G as a format in which MAC SDU associated with the MAC sub-header are repeatedly located and the information indicating the size of the MAC SDU is included in the MAC sub-header.

The operation of the terminal of the 8-2-th embodiment is the same as FIG. 8H. The terminal 8h-01 confirms whether the MAC PDU is received or not or the generation of the MAC PDU is instructed (8h-05). If the MAC PDU is received, the 1-1-th and 1-2-th conditions are confirmed (8h-10). If the 1-1-th condition is satisfied, the 1-1-th format is applied (8h-20), and if the 1-2-th condition is satisfied, the 1-2-th format is applied (8h-15). If the MAC PDU should be generated, the 2-1-th and 2-2-th conditions are confirmed (8h-25). If the 2-1-th condition is satisfied, the 2-1-th format is applied (8h-30), and if the 2-2-th condition is satisfied, the 2-2-th format is applied (8h-35).

Figure 8I:
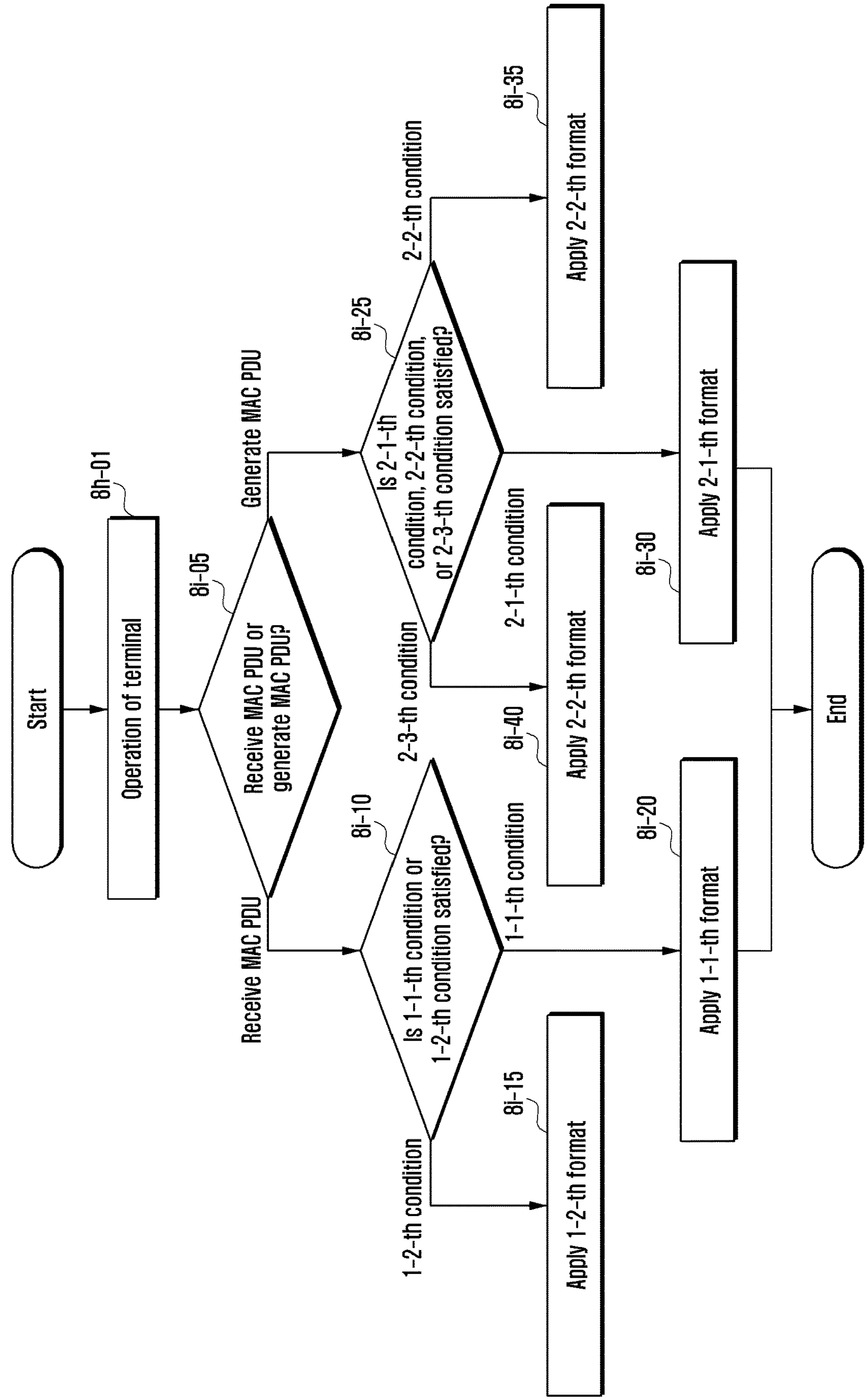
FIG. 8I is a diagram illustrating an operation of a terminal in a next generation mobile communication system according to 8-3-th and 8-4-th embodiments of the present disclosure.

FIG. 8I is a diagram illustrating an operation of a terminal in a next generation mobile communication system according to 8-3-th and 8-4-th embodiments of the present disclosure.

Referring to FIG. 8I, in an embodiment of the present disclosure, an essential parameter set (the set is referred to as numerology) is defined, and it is assumed that the essential parameter set is an efficient system that maintains compatibility between the transmitting end and the receiving end. The essential parameter set may include a subcarrier interval, a CP length, and the like. In the next generation mobile system, a plurality of numerologies may exist and may coexist in one cell. One cell may support at least one numerology, and the cell will need to efficiently notify terminals within a service area of the cell of the supportable numerology. One set of numerologies may be configured of several elements, that is, a combination of a frequency bandwidth, sub-carrier spacing, a cyclic prefix (CP) length, a subframe length, and the like. Accordingly, there will be many kinds of possible numerologies. In the 8-3-th embodiment, the numerology is defined to include subcarrier spacing among the above elements, and the subcarrier spacing may be 15 kHz, 30 kHz, 60 kHz, 120 kHz, 240 kHz, 480 kHz, and 960 kHz. Some of the assumed carrier spacings may be limited as having a small numerology, and the other may be limited having a large numerology.

The 8-3-th embodiment is a method for determining a MAC PDU format to be applied to an arbitrary MAC PDU by a terminal among a plurality of predefined MAC PDU formats.

If the MAC PDU is received from the base station and a 1-1-th condition is satisfied, a 1-1-th format is applied.

If the MAC PDU is received from the base station and a 1-2-th condition is satisfied, a 1-2-th format is applied.

If a 2-1-th condition is satisfied when the MAC PDU to be transmitted to the base station is generated, a 2-1-th format is applied.

If a 2-2-th condition is satisfied when the MAC PDU to be transmitted to the base station is generated, a 2-2-th format is applied.

If a 2-3-th condition is satisfied when the MAC PDU to be transmitted to the base station is generated, a 2-3-th format is applied.

The 1-1-th condition is the case where only one MAC SDU is stored in the MAC PDU and no padding or MAC CE is stored, The 1-2-th condition refers to the case where one or more MAC SDU is stored in the MAC PDU or the MAC SDU and the MAC CE are stored together, or the MAC SDU and the padding are stored together.

The 1-1-th format refers to the 8e-(Format 1-1) of FIG. 8E as a format in which the MAC sub-header is located before the associated MAC SDU and the information indicating the size of the MAC SDU is not included in the MAC sub-header.

The 1-2-th format refers to the 8e-(Format 1-2a) or the 8e-(Format 1-2b) of FIG. 8E as a format in which the MAC sub-header is located before the associated MAC SDU and the information indicating the size of the MAC SDU is not included in the MAC sub-header.

In the 2-1-th condition is the case where only one MAC SDU is stored in the MAC PDU and the padding or the MAC CE is not received or the case where the MAC PDU is transmitted during the random access process or the CCCH control message is stored in the MAC PDU.

The 2-2 condition refers to the case where one or more MAC SDU is included in the MAC PDU, the MAC SDU and the MAC CE are stored together, or the MAC SDU and the padding are stored together, and the numerology received on the PDCCH is small or the numerology of a resource allocated to an uplink grant is small.

The 2-3 condition refers to the case where one or more MAC SDU is included in the MAC PDU, the MAC SDU and the MAC CE are stored together, or the MAC SDU and the padding are stored together, and the numerology received on the PDCCH is large or the numerology of a resource allocated to an uplink grant is large.

The 2-1-th format refers to the 8e-(Format 2-1) of FIG. 8E as a format in which the MAC sub-header is located before the associated MAC SDU and the information indicating the size of the MAC SDU is not included in the MAC sub-header.

The 2-2-th format refers to the 8e-(Format 1-2a) or the 8e-(Format 1-2b) of FIG. 8E as a format in which the MAC sub-header is located before the associated MAC SDU and the information indicating the size of the MAC SDU is not included in the MAC sub-header.

The 2-3-th format refers to 8f-(Format 2-2a) or 8f-(Format 2-2b) or 8f-(Format 2-2c) or 8f-(Format 2-2d) or 8f (Format 2-2d), 8f-(Format 2-2e) or 8f-(Format 2-20 or 8f-(Format 2-2g) or 8f-(Format 2-2h) or 8f-(Format 2-2i) or 8f-(Format 2-2j) or 8f-(Format 2-2k) or 8f-(Format 2-2l) or 8f-(Format 2-2m) or 8f-(Format 2-2n) or 8f-(Format 2-2o) or 8f (Format 2-2p) of FIGS. 8FA to 8FI as a formation in which the MAC sub-header is located after the associated MAC SDU and the information indicating the size of the MAC SDU is included in the MAC sub-header.

The operation of the terminal of the 8-3-th embodiment is the same as FIG. 8H. The terminal 8h-01 confirms whether the MAC PDU is received or not or the generation of the MAC PDU is instructed in operation 8h-05. If the MAC PDU is received, the 1-1-th and 1-2-th conditions are confirmed in operation 8*i*-10. If the 1-1-th condition is satisfied, the 1-1-th format is applied in operation 8*h*-20, and if the 1-2-th condition is satisfied, the 1-2-th format is applied in operation 8*i*-15. If the MAC PDU should be generated, the 2-1-th condition, the 2-2-th condition, and the 2-3 condition are confirmed in operation 8*i*-25. If the 2-1-th condition is satisfied, the 2-1-th format is applied in operation 8*i*-30, and if the 2-2-th condition is satisfied, the 2-2-th format is applied in operation 8*i*-35. If the 2-3-th condition is satisfied, the 2-3-th formation is applied in operation 8*i*-40.

A preferred 8-4-th embodiment of the present disclosure for selecting a MAC PDU structure in the next generation mobile communication system is as follows.

In an embodiment of the present disclosure, an essential parameter set (the set is referred to as numerology) is defined, and it is assumed that the essential parameter set is an efficient system that maintains compatibility between the transmitting end and the receiving end. The essential parameter set may include a subcarrier interval, a CP length, and the like. In the next generation mobile system, a plurality of numerologies may exist and may coexist in one cell. One cell may support at least one numerology, and the cell will need to efficiently notify terminals within a service area of the cell of the supportable numerology. One set of numerologies may be configured of several elements, that is, a combination of a frequency bandwidth, sub-carrier spacing, a cyclic prefix (CP) length, a subframe length, and the like. Accordingly, there will be many kinds of possible numerologies. In the 8-3-th embodiment, the numerology is defined to include subcarrier spacing among the above elements, and the subcarrier spacing may be 15 kHz, 30 kHz, 60 kHz, 120 kHz, 240 kHz, 480 kHz, and 960 kHz. Some of the assumed carrier spacings may be limited as having a small numerology, and the other may be limited having a large numerology.

The 8-4-th embodiment is a method for determining a MAC PDU format to be applied to an arbitrary MAC PDU by a terminal among a plurality of predefined MAC PDU formats.

If the MAC PDU is received from the base station and a 1-1-th condition is satisfied, a 1-1-th format is applied.

If the MAC PDU is received from the base station and a 1-2-th condition is satisfied, a 1-2-th format is applied.

If a 2-1-th condition is satisfied when the MAC PDU to be transmitted to the base station is generated, a 2-1-th format is applied.

If a 2-2-th condition is satisfied when the MAC PDU to be transmitted to the base station is generated, a 2-2-th format is applied.

If a 2-3-th condition is satisfied when the MAC PDU to be transmitted to the base station is generated, a 2-3-th format is applied.

The 1-1-th condition is the case where only one MAC SDU is stored in the MAC PDU and no padding or MAC CE is stored, The 1-2-th condition refers to the case where one or more MAC SDU is stored in the MAC PDU or the MAC SDU and the MAC CE are stored together, or the MAC SDU and the padding are stored together.

The 1-1-th format refers to the 8*e*-(Format 1-1) of FIG. 8E as a format in which the MAC sub-header is located before the associated MAC SDU and the information indicating the size of the MAC SDU is not included in the MAC sub-header.

The 1-2-th format refers to the 8*e*-(Format 1-2*a*) or the 8*e*-(Format 1-2*b*) of FIG. 8E as a format in which the MAC sub-header is located before the associated MAC SDU and the information indicating the size of the MAC SDU is not included in the MAC sub-header.

In the 2-1-th condition is the case where only one MAC SDU is stored in the MAC PDU and the padding or the MAC CE is not received or the case where the MAC PDU is transmitted during the random access process or the CCCH control message is stored in the MAC PDU.

The 2-2 condition refers to the case where one or more MAC SDU is included in the MAC PDU, the MAC SDU and the MAC CE are stored together, or the MAC SDU and the padding are stored together, and the numerology received on the PDCCH is small or the numerology of a resource allocated to an uplink grant is small.

The 2-3 condition refers to the case where one or more MAC SDU is included in the MAC PDU, the MAC SDU and the MAC CE are stored together, or the MAC SDU and the padding are stored together, and the numerology received on the PDCCH is large or the numerology of a resource allocated to an uplink grant is large.

The 2-1-th format refers to the 8*e*-(Format 2-1) of FIG. 8E as a format in which the MAC sub-header is located before the associated MAC SDU and the information indicating the size of the MAC SDU is not included in the MAC sub-header.

The 2-2-th format refers to the 8*e*-(Format 1-2*a*) or the 8*e*-(Format 1-2*b*) of FIG. 8E as a format in which the MAC sub-header is located before the associated MAC SDU and the information indicating the size of the MAC SDU is not included in the MAC sub-header.

The 2-3-th format refers to 8G-(Format 3-2*a*) or 8*g*-(Format 3-2*b*) or 8*g*-Format 3-2*c*) of FIG. 8G as a format in which MAC SDU associated with the MAC sub-header are repeatedly located and the information indicating the size of the MAC SDU is included in the MAC sub-header.

The operation of the terminal of the 8-4-th embodiment is the same as FIG. 8H. The terminal 8*h*-01 confirms whether the MAC PDU is received or not or the generation of the MAC PDU is instructed in operation 8*h*-05. If the MAC PDU is received, the 1-1-th and 1-2-th conditions are confirmed in operation 8*i*-10. If the 1-1-th condition is satisfied, the 1-1-th format is applied in operation 8*h*-20, and if the 1-2-th condition is satisfied, the 1-2-th format is applied in operation 8*i*-15. If the MAC PDU should be generated, the 2-1-th condition, the 2-2-th condition, and the 2-3 condition are confirmed in operation 8*i*-25. If the 2-1-th condition is satisfied, the 2-1-th format is applied in operation 8*i*-30, and if the 2-2-th condition is satisfied, the 2-2-th format is applied in operation 8*i*-35. If the 2-3-th condition is satisfied, the 2-3-th formation is applied in operation 8*i*-40.

A preferred 8-5-th embodiment of the present disclosure for selecting a MAC PDU structure in the next generation mobile communication system is as follows.

The operation when the terminal receives the RRC control message (RRCConnectionSetup message or RRCConnectionReconfiguration message) indicating the predetermined MAC entity setting from the base station will be described.

The terminal applies the first format if the predetermined first condition is satisfied.

The terminal applies the first format if the predetermined first condition is satisfied.

The first condition refers to the case where the terminal is instructed the LTE MAC entity in the control message for setting the MAC entity.

The second condition refers to the case where the terminal is instructed the LTE MAC entity from the control message for setting the MAC entity.

The first format refers to 8*e*-(Format 1-1) of FIG. 8E as the format in which the MAC sub-header is located before the associated MAC SDU and the information indicating the size of the MAC SDU is not included in the MAC sub-header or 8*e*-(Format 1-2*a*) or 8*e*-(Format 1-2*b*) of FIG. 8E as a format in which the information indicating the size of the MAC SDU is included in the MAC sub-header.

The second format refers to 8*f*-(Format 2-2*a*) or 8*f*-(Format 2-2*b*) or 8*f*-(Format 2-2*c*) or 8*f*-(Format 2-2*d*) or 8*f* (Format 2-2*d*), 8*f*-(Format 2-2*e*) or 8*f*-(Format 2-20 or 8*f*-(Format 2-2*g*) or 8*f*-(Format 2-2*h*) or 8*f*-(Format 2-2*i*) or 8*f*-(Format 2-2*j*) or 8*f*-(Format 2-2*k*) or 8*f*-(Format 2-2*l*) or 8*f*-(Format 2-2*m*) or 8*f*-(Format 2-2*n*) or 8*f*-(Format 2-2*o*) or 8*f* (Format 2-2*p*) of FIGS. 8FA to 8FI as a format in which the MAC sub-header is located after the associated MAC SDU and the information indicating the size of the MAC SDU is included in the MAC sub-header or refers to 8*g*-(Format 3-2*a*) or 8*g*-(Format 3-2*b*) or 8*g*-(Format 3-2*c*) or 8*g*-(Format 3-2*d*) of FIG. 8G as a format in which the information indicating the size of the MAC SDU is included in the MAC sub-header.

Figure 8J:
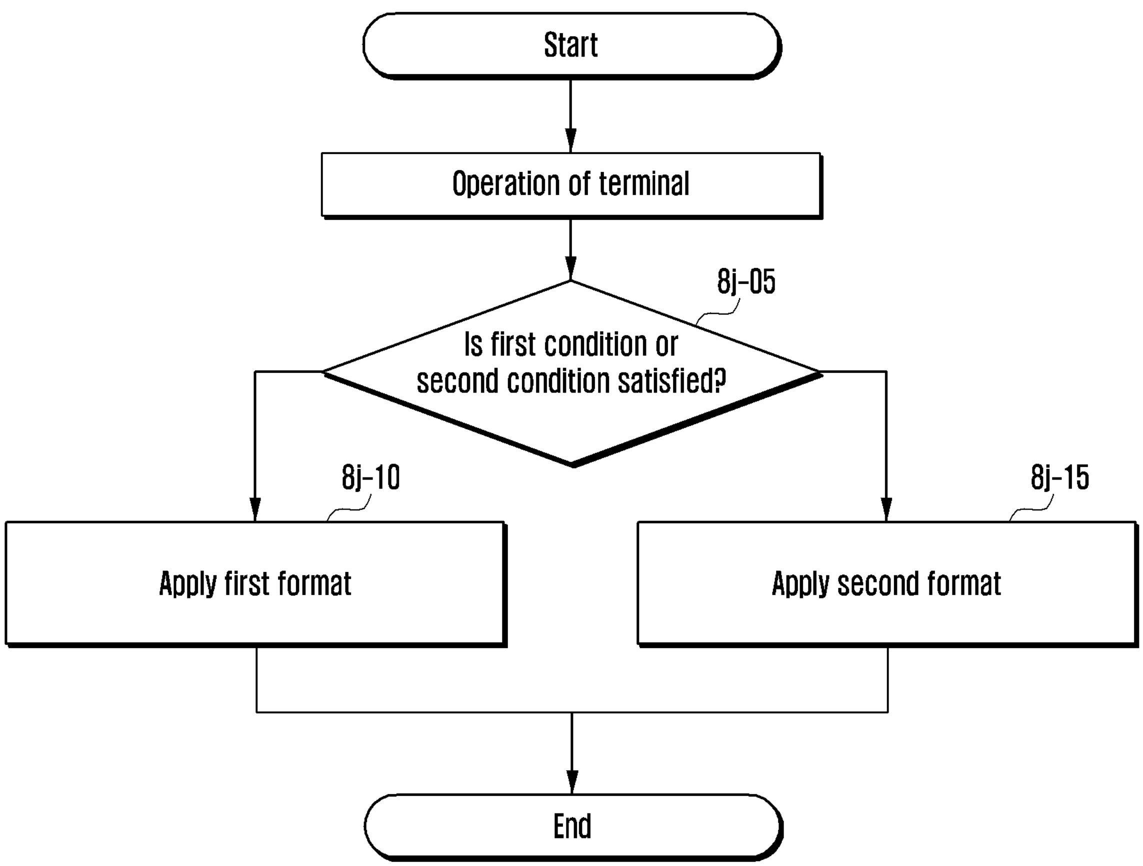
FIG. 8J is a diagram illustrating an operation of a terminal in a next generation mobile communication system according to a 8-5-th embodiment of the present disclosure.

FIG. 8J is a diagram illustrating an operation of a terminal in a next generation mobile communication system according to an 8-5-th embodiment of the present disclosure.

Referring to FIG. 8J, the terminal confirms the first condition or the second condition in operation 8*j*-05, and if the first condition is satisfied, proceeds to operation 8*j*-10 to apply the first format and if the second condition is satisfied, proceeds to operation 8*j*-15 to apply the second format.

Hereinafter, the present disclosure proposes an efficient RLC layer header structure and a segmentation operation.

In a 8-6-th embodiment of the present disclosure, a procedure for segmenting or concatenating packets received from the upper layer in the RLC layer is proposed.

Figure 8K:
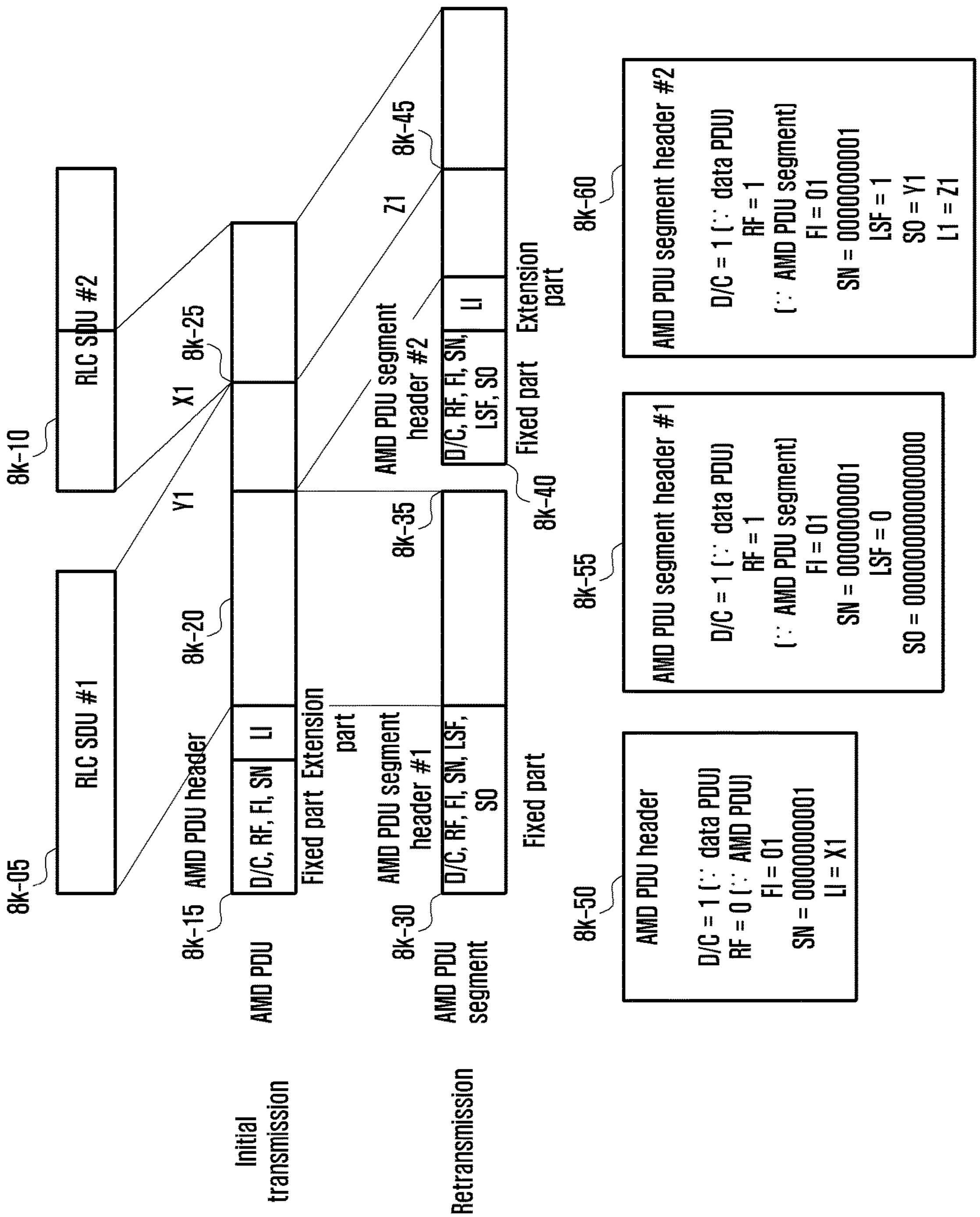
FIG. 8K is a diagram illustrating a process of performing, by an RLC layer, segmentation or concatenation according to a 8-6-th embodiment of the present disclosure.

FIG. 8K is a diagram illustrating a process of performing, by an RLC layer, segmentation or concatenation in a 8-6-th according to an embodiment of the present disclosure.

Referring to FIG. 8K, a process of performing segmentation or concatenation by the RLC layer in the 8th to 6th embodiments of the present disclosure is illustrated. The RLC SDU is processed to be a size indicated by the MAC layer. For this purpose, the RLC SDU is segmented or concatenated with segments of other RLC SDUs or other RLC SDUs. In this example, an AMD PDU to which ARQ is applied is considered. In the initial transmission, the segments of two RLC SDU #1 and RLC SDU #2 configure one RLC PDU. The RLC PDU includes an RLC header 8*k*-15 and an RLC payload 8*k*-20. The RLC header includes the character of the RLC PDU and segmentation or concatenation information. For example, an example thereof may include a D/C field, an RF field, the FI field, an SN field, an L1 field, and the like.

The D/C (Data/Control) field is 1 bit and is used to indicate whether the configured RLC PDU is a control PDU or a data PDU.

| Value | Description |
|---|---|
| 0 | Control PDU |
| 1 | Data PDU |

The re-segmentation flag (RF) field is 1 bit and is used to indicate whether the configured RLC PDU is an AMD PDU or an AMD PDU segment.

| Value | Description |
|---|---|
| 0 | AMD PDU |
| 1 | AMD PDU segment |

The framing info (FI) field is 2 bits and is used to indicate whether the start and end parts of the RLC PDU data field are the start and end part of the original RLC SDU, to indicate whether the RLC SDU is not segmented or the RLC SDU segment is the start or end or middle part of the original RLC SDU.

| Value | Description |
|---|---|
| 00 | First byte of the Data field corresponds to the first byte of a RLC SDU.<br>Last byte of the Data field corresponds to the last byte of a RLC SDU. |
| 01 | First byte of the Data field corresponds to the first byte of a RLC SDU.<br>Last byte of the Data field does not correspond to the last byte of a RLC SDU. |
| 10 | First byte of the Data field does not correspond to the first byte of a RLC SDU.<br>Last byte of the Data field corresponds to the last byte of a RLC SDU. |
| 11 | First byte of the Data field does not correspond to the first byte of a RLC SDU.<br>Last byte of the Data field does not correspond to the last byte of a RLC SDU. |

A sequence number (SN) field is a sequence number of the RLC PDU.

A length indicator (LI) field is 11 bits in the case of RLC UM and 15 bits in the case of RLC AM and is used to indicate the size of the configured RLC SDU or RLC SDU segment. Therefore, the L1 field should be included in proportion to the number of RLC SDU or RLC SDU segments included in one RLC PDU.

In FIG. 8K, the RLC payload consists of segments of RLC SDU #1 and RLC SDU #2, and a boundary of the two parts is indicated by X1 (8*k*-25). The RLC PDU thus configured is transferred to the MAC layer. However, the RLC PDU may not be successfully retransmitted and may be retransmitted according to the ARQ operation of the RLC layer. For the ARQ retransmission, the RLC PDU may be re-segmented again. In order to distinguish it from the existing AMD PDU, it is referred to as the AMD PDU segment. For example, the AMD PDU that is retransmitted after the transmission but failed can be retransmitted to two AMD PDU segments may be retransmitted into two AMD PDU segments while being segmented because the transmission resources that can be transmitted at the retransmission time are smaller than the transmission resources at the time of the first transmission. The first AMD PDU segment transmits a Y1-sized RLC payload part 8*k*-35 of a basic AMD PDU, and the second AMD PDU segment transmits the remaining RLC payload part excluding the Y1 size. The second AMD PDU segment includes a part (X1-Y1) 8*k*-25 and 8*k*-35 of the original RLC SDU #1 8*k*-05 and a part of the RLC SDU #2 8*k*-10. The ADM PDU segment includes RLC headers 8*k*-30 and 8*k*-40, and includes the D/C field, the RF field, the FI field, the SN field, the LSF field, the SO field, the L1 field, and the like, and Z1 **8*k*-45**. As compared with the AMD PDU, an LSF field, and an SO field may be further included.

A last segment flag (LSF) field is 1 bit and is used to indicate whether the last byte of the AMD PDU segment matches the last byte of the AMD PDU.

| Value | Description |
|---|---|
| 0 | Last byte of the AMD PDU segment does not correspond to the last byte of an AMD PDU. |
| 1 | Last byte of the AMD PDU segment corresponds to the last byte of an AMD PDU. |

A segment offset (SO) field is 15 or 16 fields and is used to indicate at which of the AMD PDU the AMD PDU segment is located. For example, the SO value in the first AMD PDU segment header of the example is 0 bytes, and the SO value in the second AMD PDU segment header is Y1. The values of the fields included in the headers of the AMD PDU, the first ADM PDU segment, and the second ADM PDU segment may refer to **8*k*-50, 8*k*-55, and 8*k*-60**.

Figure 8L:
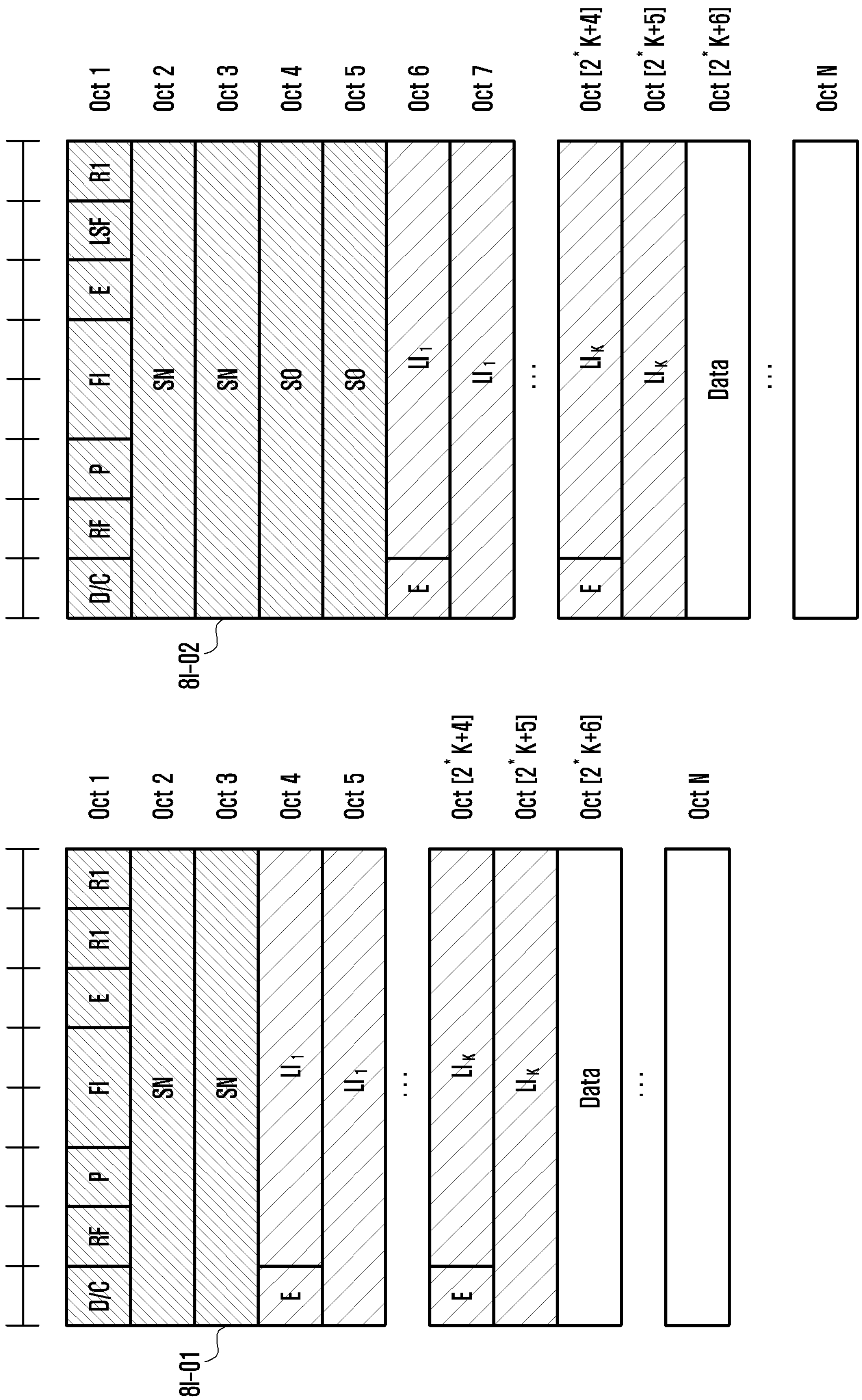
FIG. 8L is a diagram illustrating an RLC header structure according to a 8-6-th embodiment of the present disclosure.

FIG. 8L illustrates an RLC header structure according to an 8-6-th embodiment of the present disclosure.

Referring to FIG. 8L, an RLC header structure is illustrated assuming that the RLC SN is 16 bits and the L1 field is 15 bits in the 8-6-th embodiments of the present disclosure, and **8*l*-01 represents one example of the RLC header structure for the AMD PDU described in FIG. 8K and 8*l*-02 may be an example of the RLC header structure for the AMD PDU segment described above. The RLC header structure may include some of the fields described above with reference to FIG. 8**K or other new fields, and may have a different structure depending on the lengths of the respective fields, such as other RLC SN lengths and other L1 field lengths. R may be a reserved bit, and a P field may be a field for requesting a status report to a corresponding RLC entity of the receiving end. For example, if 0, the status report is not requested, and if 1, the status report may be requested. The status report may include information on data received so far. The E field may indicate whether the data field is located immediately after the fixed RLC header part of the header or the E field, or whether the E field or the L field is located. For example, if the E field is 0, it indicates whether a data field is located immediately after the fixed RLC header part or the E field, and if the E field is 1, it indicates whether another E field or L field is located immediately after the fixed RLC header part or the E field.

In an 8-7-th embodiment of the present disclosure, a procedure for segmenting packets received from the upper layer in the RLC layer without concatenation is proposed.

Figure 8M:
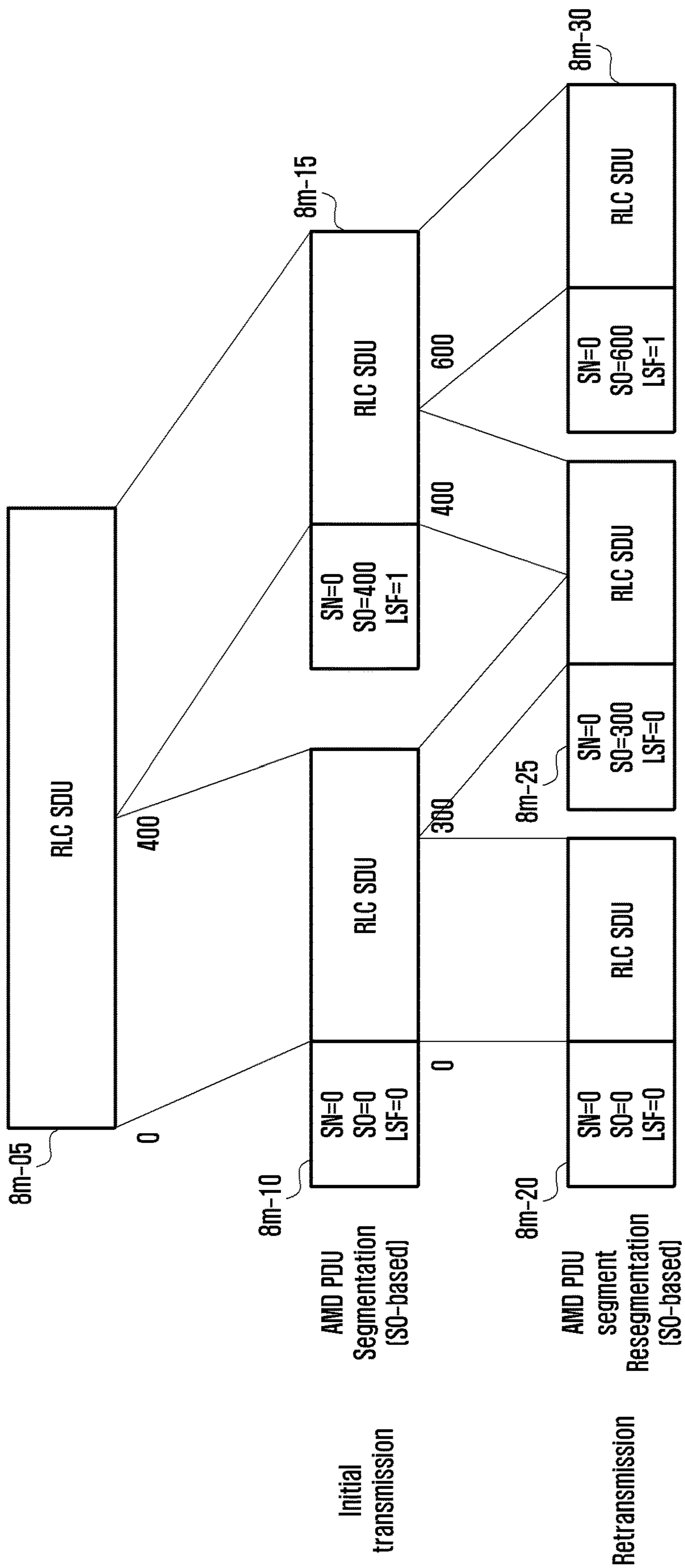
FIG. 8M is a diagram illustrating a segment offset (SO)-based segmentation procedure according to a 8-7-th embodiment of the present disclosure.

FIG. 8M is a diagram illustrating an SO-based segmentation procedure according to an 8-7-th embodiment of the present disclosure.

Referring to FIG. 8M, the SO-based segmentation procedure may be characterized in that there is no RF field and FI field unlike the procedure of FIG. 8K according to the 8-6-th embodiment of the present disclosure. In addition, the RLC header used for the first transmission and the RLC header used for the retransmission are not distinguished from each other and a combined header is used. In addition, the concatenation is not performed in the RLC layer. If the RLC layer receives the RLC SDU of **8*m*-05, the RLC layer directly inserts the RLC SN into the RLC SDU, generates the fixed RLC header, and forms the RLC PDU. If the segmentation is required for a predetermined reason, the RLC PDU may be generated by updating the SO field and the LSF field, such as 8*m*-10 or 8*m*-15**. The fixed RLC header may include an SN field, an SO field, an LSF field, or another field. The predetermined reason may be by way of example the case where the size of the RLC PDU or the size of the RLC PDU currently generated is larger than the size of the transmission resource allocated in the MAC layer. The sequence number (SN) field is a sequence number of the RLC PDU, or may reuse the PDCP SN if necessary or set. The SO field is a field having a predetermined length, and in the first transmission, the SO field may indicate how many bytes of the original RLC PDU data field (RLC SDU) the first byte of the RLC PDU data field (RLC SDU) is, and even in the retransmission, the SO field may indicate how many bytes of the original RLC PDU data field the first byte of the re-segmented RLC PDU data field is. The last segment flag (LSF) field is 1 bit and is used to indicate whether the last byte of the segmented or re-segmented RLC PDU data field matches the last byte of the original RLC PDU data field.

| Value | Description |
|---|---|
| 0 | Last byte of the AMD PDU segment does not correspond to the last byte of an AMD PDU. |
| 1 | Last byte of the AMD PDU segment corresponds to the last byte of an AMD PDU. |

If the RLC PDUs of **8*m*-10 and 8*m*-15 fail to be transmitted, the retransmission may be performed. At this time, if the transmission resource is insufficient, the re-segmentation may be performed like as 8*m*-20, 8*m*-25 and 8*m*-30. The SO field and the LSF field of the RLC PDUs 8*m*-20, 8*m*-25 and 8*m*-30** newly generated when the re-segmentation is performed.

Figure 8N:
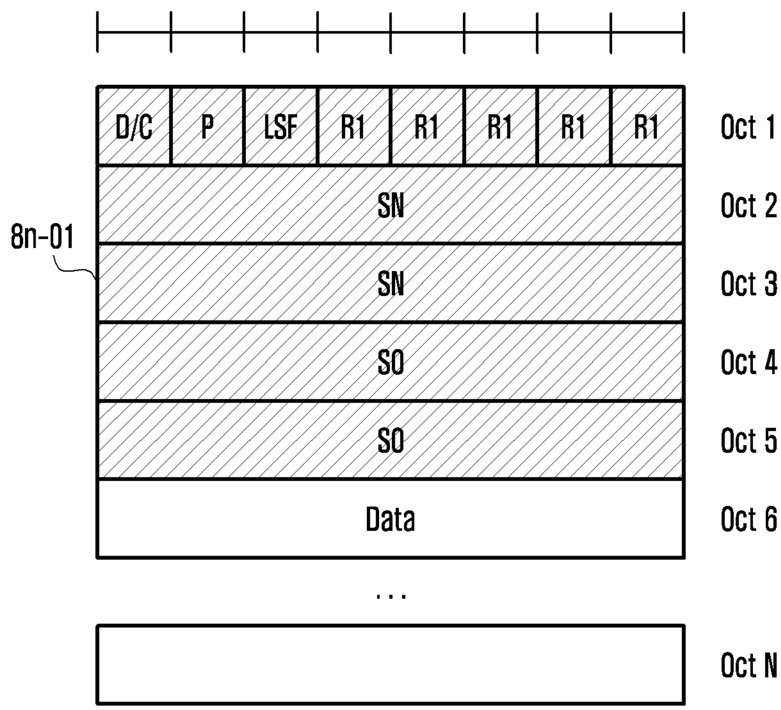
FIG. 8N is a diagram illustrating an RLC header structure according to a 8-7-th embodiment of the present disclosure.
Figure 80:
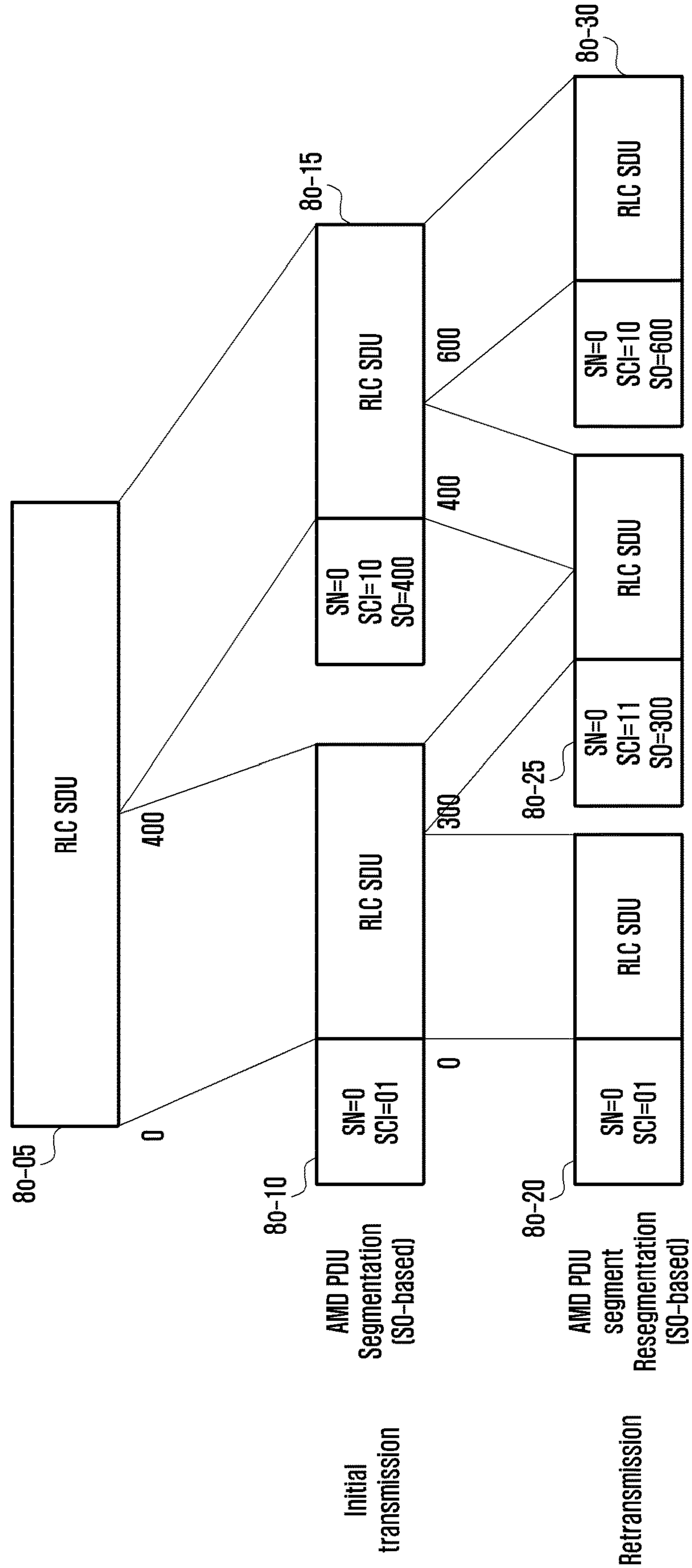

FIG. 8N illustrates an RLC header structure according to an 8-7-th embodiment of the present disclosure.

Referring to FIG. 8N illustrates an RLC header structure assuming the case where the RLC SN is 16 bits and the L1 field is 15 bits in the 8-7 embodiment of the present disclosure, in which **8*n*-01 may be an example of the RLC header structure for the SO-based segmentation described with reference to FIG. 8*m*. The RLC header structure may include some of the fields described above with reference to FIG. 8*m*** or other new fields, and may have a different structure depending on the lengths of the respective fields, such as other RLC SN lengths and an SO field length and the locations of the respective fields. R may be a reserved bit, and a P field may be a field for requesting a status report to a corresponding RLC entity of the receiving end. For example, if 0, the status report is not requested, and if 1, the status report may be requested. The status report may include information on data received so far. The RLC header structure may have no RF field, FI field, or E field. In addition, the RLC header used for the first transmission and the RLC header used for the retransmission are not distinguished from each other and a combined header is used.

In a 8-8-th embodiment of the present disclosure, another procedure for segmenting packets received from the upper layer in the RLC layer without concatenation is proposed.

FIG. 8O is a diagram illustrating a segmentation control information (SCI)-based segmentation procedure according to an 8-8-th embodiment of the present disclosure.

Referring to FIG. 8O, the SCI-based segmentation procedure may be characterized in that there is no RF field and FI field unlike the procedure of FIG. 8K according to the 8-6-th embodiment of the present disclosure and a new field called SCI is included. It has an advantage of being able to reduce the overhead of the RLC header with slightly more complexity compared to the procedure of the 8-7-th embodiment of the present disclosure. In addition, the RLC header used for the first transmission and the RLC header used for the retransmission are not distinguished from each other. In addition, the RLC header structure for the complete RLC SDU without segmentation and the segmented first RLC SDU segment and the RLC header structure for the segmented middle or last RLC SDU segment are differentiated from each other. In addition, the concatenation is not performed in the RLC layer. If the RLC layer receives the RLC SDU of 8*o*-05, the RLC layer directly inserts the RLC SN into the RLC SDU, generates the fixed RLC header, and forms the RLC PDU. If the segmentation is required for a predetermined reason, the RLC PDU may be generated by updating the SCI field and the SO field, such as 8*o*-10 or 8*o*-15. The fixed RLC header may include an SN field, an SCI field, an SO field, or another field. The predetermined reason may be by way of example the case where the size of the RLC PDU or the size of the RLC PDU currently generated is larger than the size of the transmission resource allocated in the MAC layer. The sequence number (SN) field is a sequence number of the RLC PDU, or may reuse the PDCP SN if necessary or set. The SO field is a field having a predetermined length, and in the first transmission, the SO field may indicate how many bytes of the original RLC PDU data field (RLC SDU) the first byte of the RLC PDU data field (RLC SDU) is, and even in the retransmission, the SO field may indicate how many bytes of the original RLC PDU data field the first byte of the re-segmented RLC PDU data field is. The length of the SO field may be set by an RRC message (e.g., RRCConnectionSetup or RRCConnectionReconfiguration message). For example, the length of the SO field may be set differently for each bearer. For example, in a service, such as VoLTE and VoIP, it is possible to set the SO field to 1 byte and set the SO field to 2 bytes in case of the eMBB service. In addition, a predetermined bit before the SO field is defined, and the predetermined bit may indicate the length of the SO field. For example, if it is assumed that a predetermined bit is 1 bit, 0 may indicate an SO field having a length of 1 byte, and 1 may indicate an SO field having 2 bytes. In the above description, the SCI field may be defined as follows, and the field name SCI may be named by another name, such as segmentation information (SI), framing Information (FI), or segmentation control (SC)

| Value | Description |
|---|---|
| 00 | A complete RLC PDU |
| 01 | First segment of a RLC PDU |
| 10 | Last segment of a RLC PDU |
| 11 | Middle segment of a RLC PDU |

If the SCI field is 00, it represents the complete RLC PDU without segmentation. In this case, the SO field is not required for the RLC header. If the SCI field is 01, it represents the segmented first RLC PDU segment. In this case, the SO field is not required for the RLC header. If the SCI field is 10, it represents the segmented last RLC PDU segment. In this case, the SO field is required for the RLC header. If the SCI field is 11, it represents the segmented middle RLC PDU segment. In this case, the SO field is required for the RLC header. The mapping relationship between the 2 bits and the 4 information (complete RLC PDU, first segment, last segment, middle segment) may be 4×3×2×1=24 in total, and one example of the total of mapping relationships is shown. The present disclosure includes all of 24 mapping relationships. If the RLC PDUs of 8*o*-10 and 8*o*-15 fail to be transmitted, the retransmission may be performed. At this time, if the transmission resource is insufficient, the re-segmentation may be performed like as 8*o*-20, 8*o*-25, and 8*o*-30. The SO field and the LSF field of the RLC PDUs 8*o*-20, 8*o*-25 and 8*o*-30 newly generated when the re-segmentation may be updated. 8*o*-20 is the first segment, and therefore the SCI is updated to 01 and no SO field is required.

Meanwhile, the above-mentioned SCI field (or, SI field, FI field, or SC field) may also be based on the RLC SDU. In other words, if the SCI field is 00, it represents the complete RLC SDU that is not segmented. In this case, the SO field is not required for the RLC header. If the SCI field is 01, it represents the segmented first RLC PDU segment. In this case, the SO field is not required for the RLC header. If the SCI field is 10, it represents the segmented last RLC PDU segment. In this case, the SO field is required for the RLC header. If the SCI field is 11, it represents the segmented middle RLC PDU segment. In this case, the SO field is required for the RLC header. 8*o*-25 is the middle segment, and therefore, the SCI is updated to 11, and the SO field is updated to 300 to indicate how many bytes of the original RLC PDU data field (RLC SDU) the first byte of the RLC PDU data field (RLC SDU). 8*o*-30 is the last segment, and therefore, the SCI is updated to 10, and the SO field is updated to 600 to indicate how many bytes of the original RLC PDU data field (RLC SDU) the first byte of the RLC PDU data field (RLC SDU).

Figure 8P:
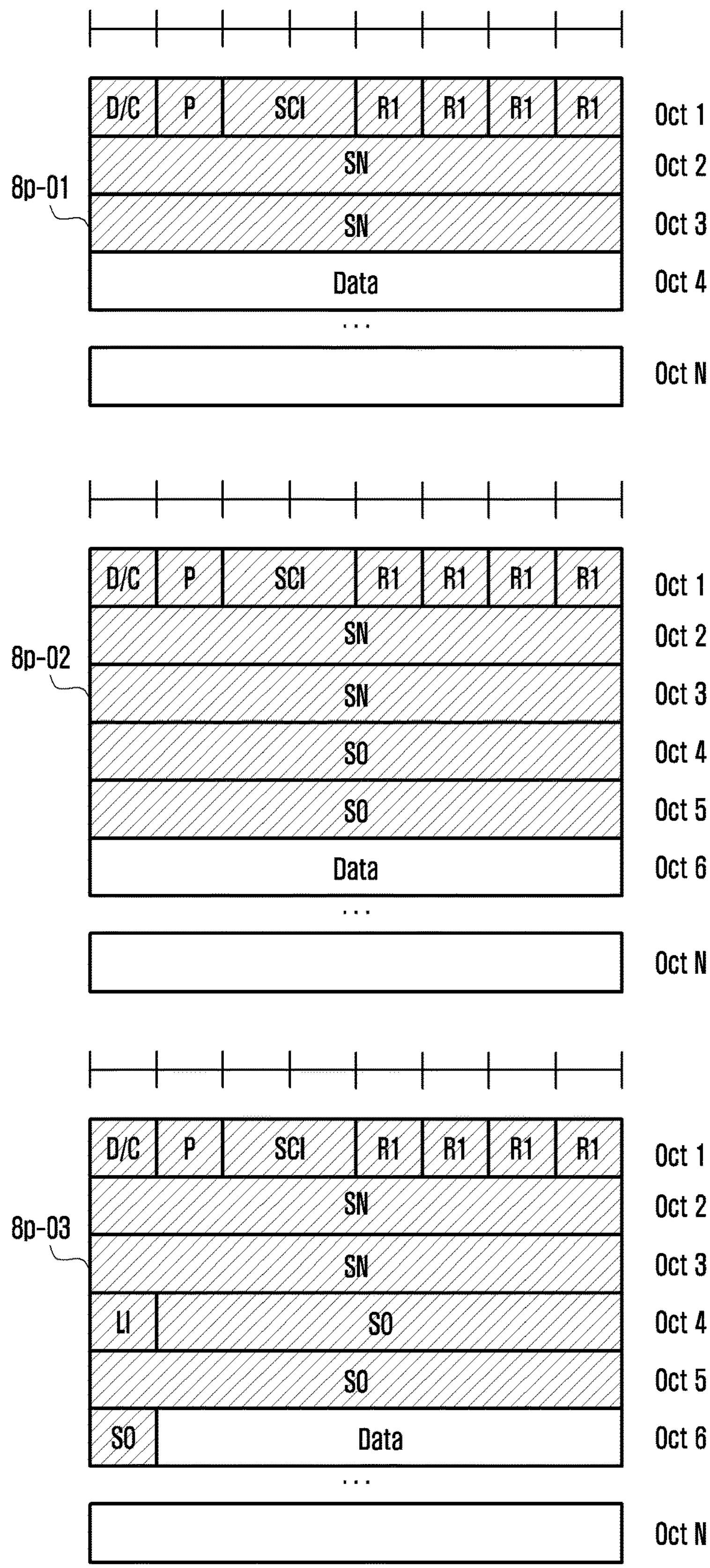
FIG. 8P is a diagram illustrating an RLC header structure according to an 8-8-th embodiment of the present disclosure.

FIG. 8P illustrates an RLC header structure according to an 8-8-th embodiment of the present disclosure.

Referring to FIG. 8P, an RLC header structure is illustrated assuming the case where the RLC SN is 16 bits and the L1 field is 15 bits in the 8-8-th embodiment of the present disclosure, in which 8*p*-01 may be an example of the RLC header structure for the SCI-based segmentation described with reference to FIG. 8P. The RLC header structure may include some of the fields described above with reference to FIG. 8O or other new fields, and may have a different structure depending on the lengths of the respective fields, such as other RLC SN lengths and an SO field length and the locations of the respective fields. R may be a reserved bit, and a P field may be a field for requesting a status report to a corresponding RLC entity of the receiving end. For example, if 0, the status report is not requested, and if 1, the status report may be requested. The status report may include information on data received so far. The RLC header structure may have no RF field, FI field, or E field. In addition, the RLC header used for the first transmission and the RLC header used for the retransmission are not distinguished from each other and a combined header is used.

If the information indicated by the SCI field indicates a complete RLC PDU (e.g., SCI=00) or the information indicated by the SCI field indicates the segmented first RLC PDU segment (e.g., SCI=01), like 8*p*-01, the RLC header structure without an SO field may be used. As one example, the RLC header structure of the 8*p*-01 may include some of the fields described with reference to FIG. 8O or other new fields, and may have a different structure depending on the lengths of the respective fields, such as other RLC SN lengths and the locations of the respective fields.

Under the assumption that the terminal and the network have promised to use a predetermined SO field length in the procedure of 8*o* or the terminal is instructed the length information on the SO field for each bearer as the RRC message, if the information indicated by the SCI field indicates the segmented middle or last RLC PDU segment (for example, SCI=10 or 11), like 8p-02, the RLC header structure with the SO field may be used. As one example, the RLC header structure of the 8p-02 may include some of the fields or other new fields, and may have a different structure depending on the lengths of the respective fields, such as other RLC SN lengths and the SO field length and the locations of the respective fields.

Under the assumption that the terminal and the network do not promise to use a predetermined SO field length in the procedure of 8o or the terminal does not instruct the length information on the SO field for each bearer as the RRC message, if the information indicated by the SCI field is newly defined and promised to be used, the information indicated by the SCI field indicates the segmented middle or last RLC PDU segment (for example, SCI=10 or 11), like 8p-03, the RLC header structure with the L1 field and the SO field may be used. As one example, the RLC header structure of the 8p-03 may include some of the fields or other new fields, and may have a different structure depending on the lengths of the respective fields, such as other RLC SN lengths and the L1 field length and the locations of the respective fields. The L1 field may indicate the length of the SO field. For example, if it is assumed that the LI field is 1 bit, 0 may indicate an SO field having a length of 1 byte, and 1 may indicate an SO field having 2 bytes. The L1 field may be preset as a predetermined length In a 8-9-th embodiment of the present disclosure, another procedure for segmenting packets received from the upper layer in the RLC layer without concatenation is proposed.

Figure 8Q:
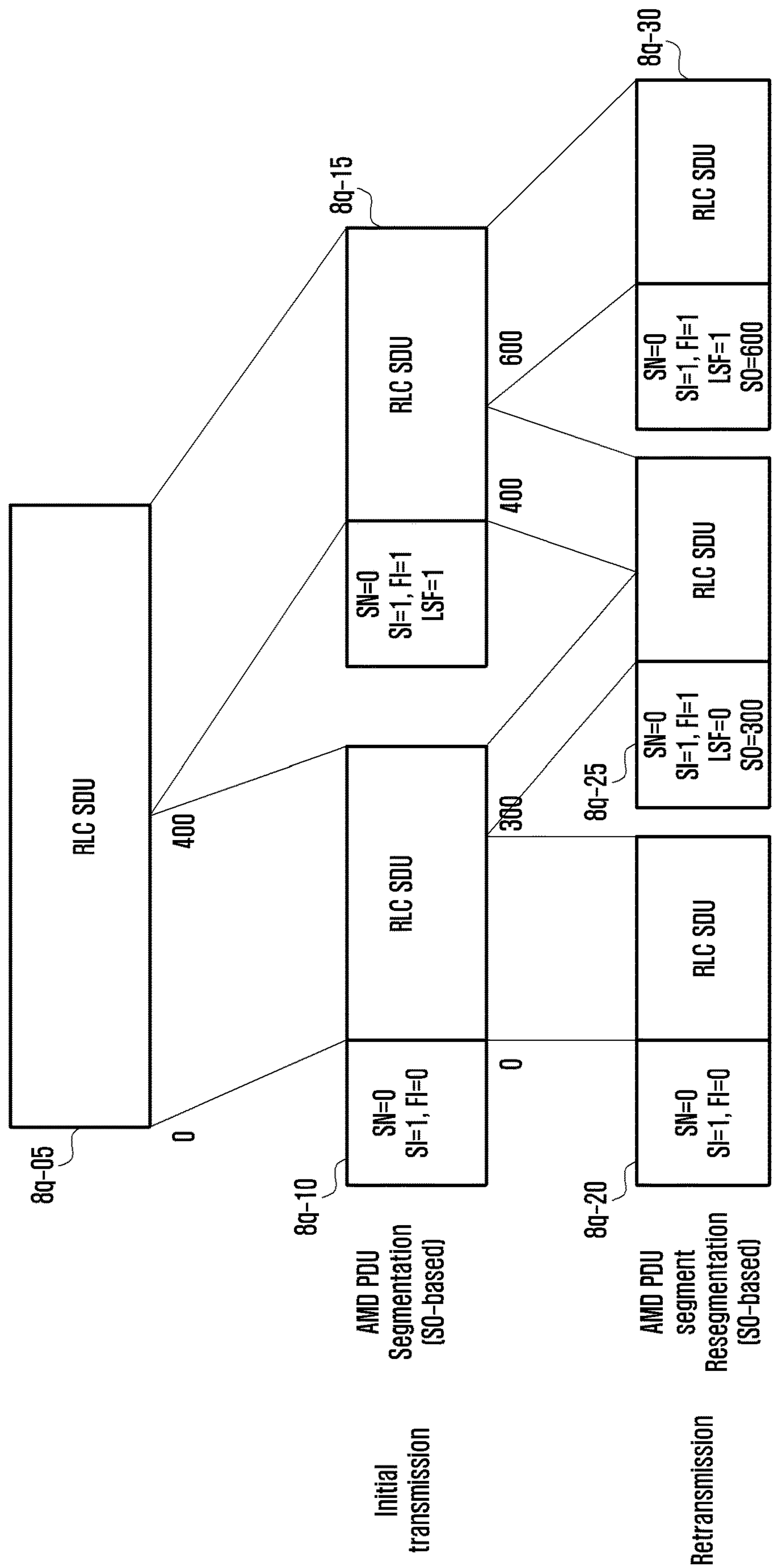
FIG. 8Q is a diagram illustrating a segmentation information (SI), framing information (FI), last segment field (LSF)-based segmentation procedure according to a 8-9-th embodiment of the present disclosure.

FIG. 8Q illustrates an SI, FI, LSF-based segmentation procedure according to an 8-9-th embodiment of the present disclosure.

Referring to FIG. 8Q, the SI, FI, and LSF-based segmentation procedure may be characterized in that there is no RF field and FI field unlike the procedure of FIG. 8K according to the 8-6-th embodiment of the present disclosure, and a new SI field and an FI field are defined and the fields are used. In addition, the RLC header used for the first transmission and the RLC header used for the retransmission are not distinguished from each other. In addition, the RLC header structure for the complete RLC SDU without segmentation and the segmented first RLC SDU segment and the RLC header structure for the segmented middle or last RLC SDU segment are differentiated from each other. In addition, the concatenation is not performed in the RLC layer. If the RLC layer receives the RLC SDU of 8q-05, the RLC layer directly inserts the RLC SN into the RLC SDU, generates the fixed RLC header, and forms the RLC PDU. If the segmentation is required for a predetermined reason, the RLC PDU may be generated by updating the SCI field and the FI field, such as 8q-10 or 8q-15. The middle or last segment of the RLC PDU may have the SO field and the LSF field. The fixed RLC header may include an SN field, an SI field, an FI field, an SO field, an LSF field, or another field. The predetermined reason may be by way of example the case where the size of the RLC PDU or the size of the RLC PDU currently generated is larger than the size of the transmission resource allocated in the MAC layer. The sequence number (SN) field is a sequence number of the RLC PDU, or may reuse the PDCP SN if necessary or set. The SO field is a field having a predetermined length, and in the first transmission, the SO field may indicate how many bytes of the original RLC PDU data field (RLC SDU) the first byte of the RLC PDU data field (RLC SDU) is, and even in the retransmission, the SO field may indicate how many bytes of the original RLC PDU data field the first byte of the re-segmented RLC PDU data field is. The length of the SO field may be set by an RRC message (e.g., RRCConnectionSetup or RRCConnectionReconfiguration message). For example, the length of the SO field may be set differently for each bearer. For example, in a service, such as VoLTE and VoIP, it is possible to set the SO field to 1 byte and set the SO field to 2 bytes in case of the eMBB service. In addition, a predetermined bit before the SO field is defined, and the predetermined bit may indicate the length of the SO field. For example, if it is assumed that a predetermined bit is 1 bit, 0 may indicate an SO field having a length of 1 byte, and 1 may indicate an SO field having 2 bytes. In the above description, the SI field may be defined as follows, and the field name SI may be named by any other name.

| Value | Description |
|---|---|
| 0 | No segmentation |
| 1 | Segmentation |

If the SI field is 0, it indicates that segmentation is not performed and indicates a complete RLC PDU. In this case, the SO field and the LSF field are not required for the RLC header. If the SI field is 1, it indicates that segmentation is performed, and may indicate the segmented first RLC PDU segment, middle RLC PDU segment, or last RLC PDU segment. The mapping relationship of 1 bit and 2 information (No Segmentation or Segmentation) may be 2×1=2 in total, and one example of the total of mapping relationships is shown. The present disclosure includes all of 2 mapping relationships.

In the above description, the FI field may be defined as follows, and the field name FI may be named by any other name.

| Value | Description |
|---|---|
| 0 | First segmentof a RLC PDU |
| 1 | Middle segment of a RLC PDU or Last segment of a RLC PDU |

If the FI field is 0, it represents the segmented first RLC PDU segment. In this case, the SO field and the LSF field are not required for the RLC header. If the FI field is 1, it represents the segmented middle or last RLC PDU segment. In this case, the LSF field and the SO field is required for the RLC header. If the FI field is 1 and the LSF field is 0, it indicates the segmented middle RLC PDU segment, if the FI field is 1 and the LSF field is 1, it indicates the segmented last RLC PDU segment, and the mapping relationship of 1 bit and two information (first segment or middle/last segment) may be 2×1=2 in total, and one example of the total of mapping relationships is shown. The present disclosure includes all of 2 mapping relationships. The mapping relationship of 1 bit and 2 information (middle segment or last segment) may be 2×1=2 in total, and one example of the total of mapping relationships is shown. The present disclosure includes all of 2 mapping relationships.

If the RLC PDUs of 8q-10 and 8q-15 fail to be transmitted, the retransmission may be performed. At this time, if the transmission resource is insufficient, the re-segmentation may be performed like as 8q-20, 8q-25, and 8q-30. The SI field, the FI field, the LSF field, and the SO field of the RLC PDUs 8q-20, 8q-25 and 8q-30 newly generated when the re-segmentation may be updated. 8q-20 is the segmented first segment, and therefore SI is updated to 1 and FI is updated to 0 and the SO field and the LSF field are not required. 8*o*-25 is the segmented middle segment, and therefore the SI is updated to 1, FI is updated to 1, and the LSF is updated to 0, and the SO field is updated to 300 to indicate how many bytes of the original RLC PDU data field (RLC SDU) the first byte of the RLC PDU data field (RLC SDU) is. 8*q*-30 is the segmented last segment, and therefore the SI is updated to 1, FI is updated to 1, and the LSF is updated to 1, and the SO field is updated to 600 to indicate how many bytes of the original RLC PDU data field (RLC SDU) the first byte of the RLC PDU data field (RLC SDU) is.

Figure 8R:
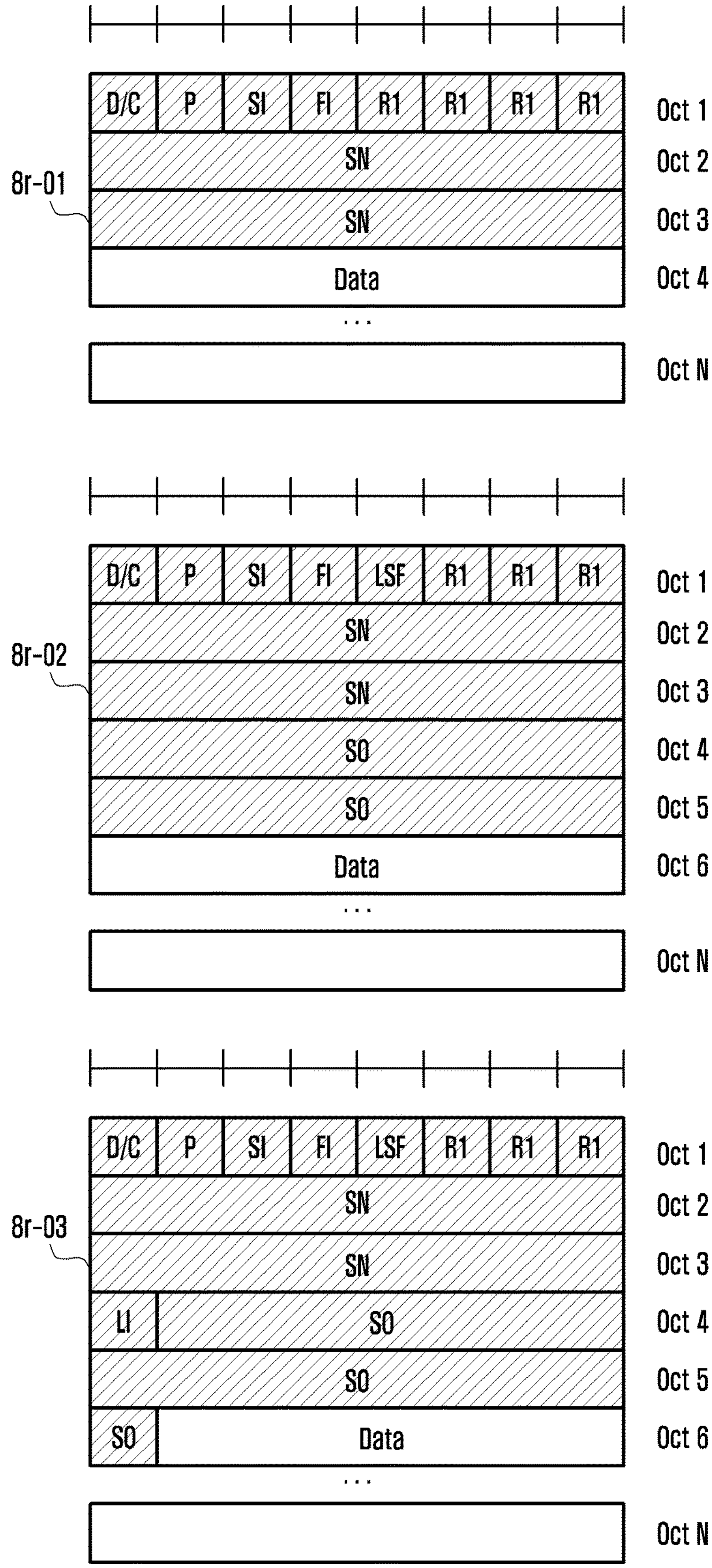
FIG. 8R is a diagram illustrating an RLC header structure according to a 8-9-th embodiment of the present disclosure.

FIG. 8R illustrates an RLC header structure according to an 8-9-th embodiment of the present disclosure.

Referring to FIG. 8R, an RLC header structure is illustrated assuming the case where the RLC SN is 16 bits and the L1 field is 15 bits in the 8-9-th embodiment of the present disclosure, in which 8*r*-01 may be an example of the RLC header structure for the SI, FI, and LSF-based segmentation described with reference to FIG. 8Q. The RLC header structure may include some of the fields described above with reference to FIG. 8Q or other new fields, and may have a different structure depending on the lengths of the respective fields, such as other RLC SN lengths and an SO field length and the locations of the respective fields. R may be a reserved bit, and a P field may be a field for requesting a status report to a corresponding RLC entity of the receiving end. For example, if 0, the status report is not requested, and if 1, the status report may be requested. The status report may include information on data received so far. The RLC header structure may have no RF field and FI field (meaning of 2-bit FI of FIG. 8L), or E field. In addition, the RLC header used for the first transmission and the RLC header used for the retransmission are not distinguished from each other and a combined header is used.

If the information indicated by the SCI field indicates a complete RLC PDU (e.g., SI=00) without being segmented or the information indicated by the FI field indicates the segmented last RLC PDU segment (e.g., FI=0), like 8*r*-01, the RLC header structure without the LSF field and the SO field may be used. As one example, the RLC header structure of the 8*r*-01 may include some of the fields described with reference to FIG. 8Q or other new fields, and may have a different structure depending on the lengths of the respective fields, such as other RLC SN lengths and the locations of the respective fields.

Under the assumption that the terminal and the network are promised to use a predetermined SO field length in the procedure of 8*q* or the terminal is instructed the length information on the SO field for each bearer as the RRC message, if the information indicated by the SCI field is segmented (for example, SI=1) and the information indicated by the FI field indicates the segmented middle or last RLC PDU segment (for example, FI=1), like 8*r*-02, the RLC header structure with the LSF field and the SO field may be used. As one example, the RLC header structure of the 8*r*-02 may include some of the fields described with reference to FIG. 8Q or other new fields, and may have a different structure depending on the lengths of the respective fields, such as other RLC SN lengths and the SO field length and the locations of the respective fields.

Under the assumption that the terminal and the network have promised to use a predetermined SO field length in the procedure of 8*q* or the terminal does not instruct the length information on the SO field for each bearer as the RRC message, if the L1 field indicating the length of the SO field is newly defined and promised to be used, it indicates that the information indicated by the SI field is segmented (e.g., SI=1), and if the information indicated by the FI field indicates the segmented middle or last RLC PDU segment (e.g., FI=1), like 8*p*-03, the RLC header structure with the LSF field and the SO field may be used. As one example, the RLC header structure of the 8*r*-03 may include some of the fields described with reference to FIG. 8Q or other new fields, and may have a different structure depending on the lengths of the respective fields, such as other RLC SN lengths and the L1 field length and the locations of the respective fields. The L1 field may indicate the length of the SO field. For example, if it is assumed that the L1 field is 1 bit, 0 may indicate an SO field having a length of 1 byte, and 1 may indicate an SO field having 2 bytes. The L1 field may be preset as a predetermined length.

As can be appreciated from the above embodiments, the apparatus for performing transmission (terminal in the uplink and base station in the downlink) determines whether or not the RLC SDU received in the RLC PDU is segmented according to the characteristics of the RLC PDU, and if segmented, determines whether the SO field is stored or not depending on the first segment. In other words, if the apparatus performing the transmission is not segmented, even though segmented, the SO field is not stored in the case of a first segment and an SO field is stored in the case of the middle segment or the last segment. The apparatus (base station in the uplink and terminal in the downlink) performing the reception checks the header field of the received packet, and if the RLC SDU stored in the received RLC PDU is an the RLC SDU which is not segmented or the first segment, it is determined that the RLC SDU or the segment is stored immediately after the RLC header without the SO field, so that the RLC SDU is reassembled or the received RLC SDU is transferred to the upper layer. It is determined that there is an SO field stored in the received RLC PDU, and the RLC SDU is reassembled according to the value of the stored SO field and transferred to the upper layer.

Figure 8S:
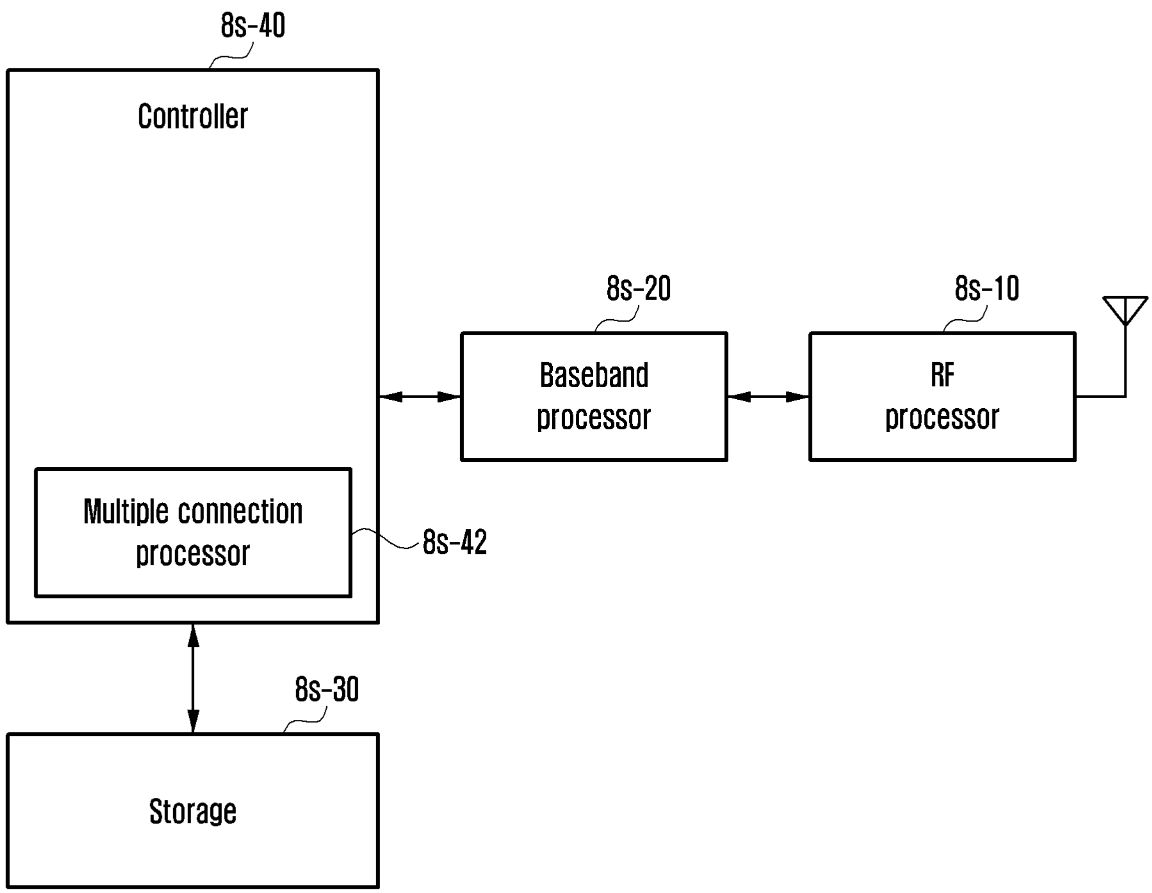
FIG. 8S is a block diagram illustrating an internal structure of a terminal according to an embodiment of the present disclosure.

FIG. 8S is a block diagram illustrating an internal structure of a terminal according to an embodiment of the present disclosure.

Referring to FIG. 8S, the terminal includes a radio frequency (RF) processor 8*s*-10, a baseband processor 8*s*-20, a storage 8*s*-30, and a controller 8*s*-40.

The RF processor 8*s*-10 serves to transmit and receive a signal through a radio channel, such as band conversion and amplification of a signal. For example, the RF processor 8*s*-10 up-converts a baseband signal provided from the baseband processor 8*s*-20 into an RF band signal and then transmits the RF band signal through an antenna and down-converts the RF band signal received through the antenna into the baseband signal. For example, the RF processor 8*s*-10 may include a transmitting filter, a receiving filter, an amplifier, a mixer, an oscillator, a digital to analog converter (DAC), an analog to digital converter (ADC), or the like. FIG. 8S illustrates only one antenna but the terminal may include a plurality of antennas. Further, the RF processor 8*s*-10 may include a plurality of RF chains. Further, the RF processor 8*s*-10 may perform beamforming. For the beamforming, the RF processor 8*s*-10 may adjust a phase and a size of each of the signals transmitted and received through a plurality of antennas or antenna elements. In addition, the RF processor may perform MIMO and may receive a plurality of layers when performing a MIMO operation. The RF processor 8*sj*-10 may perform reception beam sweeping by appropriately configuring a plurality of antennas or antenna elements under the control of the controller or adjust a direction and a beam width of the reception beam so that the reception beam is resonated with the transmission beam.

The baseband processor 8s-20 performs a conversion function between a baseband signal and a bit string according to a physical layer standard of a system. For example, when data are transmitted, the baseband processor 8s-20 generates complex symbols by coding and modulating a transmitted bit string. Further, when data are received, the baseband processor 8s-20 recovers the received bit string by demodulating and decoding the baseband signal provided from the RF processor 8s-10. For example, according to the OFDM scheme, when data are transmitted, the baseband processor 2i-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 8s-20 divides the baseband signal provided from the RF processor 8s-10 in an OFDM symbol unit and recovers the signals mapped to the sub-carriers by a fast Fourier transform (FFT) operation and then recovers the received bit string by the modulation and decoding.

The baseband processor 8s-20 and the RF processor 8s-10 transmit and receive a signal as described above. Therefore, the baseband processor 4h-20 and the RF processor 4h-10 may be called a transmitter, a receiver, a transceiver, or a communication unit. Further, at least one of the baseband processor 8s-20 and the RF processor 8s-10 may include a plurality of communication modules to support a plurality of different radio access technologies. Further, at least one of the baseband processor 8s-20 and the RF processor 8s-10 may include different communication modules to process signals in different frequency bands. For example, the different wireless access technologies may include an LTE network, an NR network, and the like. Further, different frequency bands may include a super high frequency (SHF) (for example: 2.5 GHz, 5 GHz) band, a millimeter wave (for example: 60 GHz) band.

The storage 8s-30 stores data, such as basic programs, application programs, and configuration information for the operation of the terminal. The storage 8s-30 provides the stored data according to the request of the controller 8s-40.

The controller 8s-40 includes a multiple connection processor 8s-42 and controls the overall operations of the terminal. For example, the controller 8s-40 transmits and receives a signal through the baseband processor 8s-20 and the RF processor 8s-10. Further, the controller 8s-40 records and reads data in and from the storage 8s-30. For this purpose, the controller 8s-40 may include at least one processor. For example, the controller 8s-40 may include a communication processor (CP) performing a control for communication and an application processor (AP) controlling an upper layer, such as the application programs.

Figure 8T:
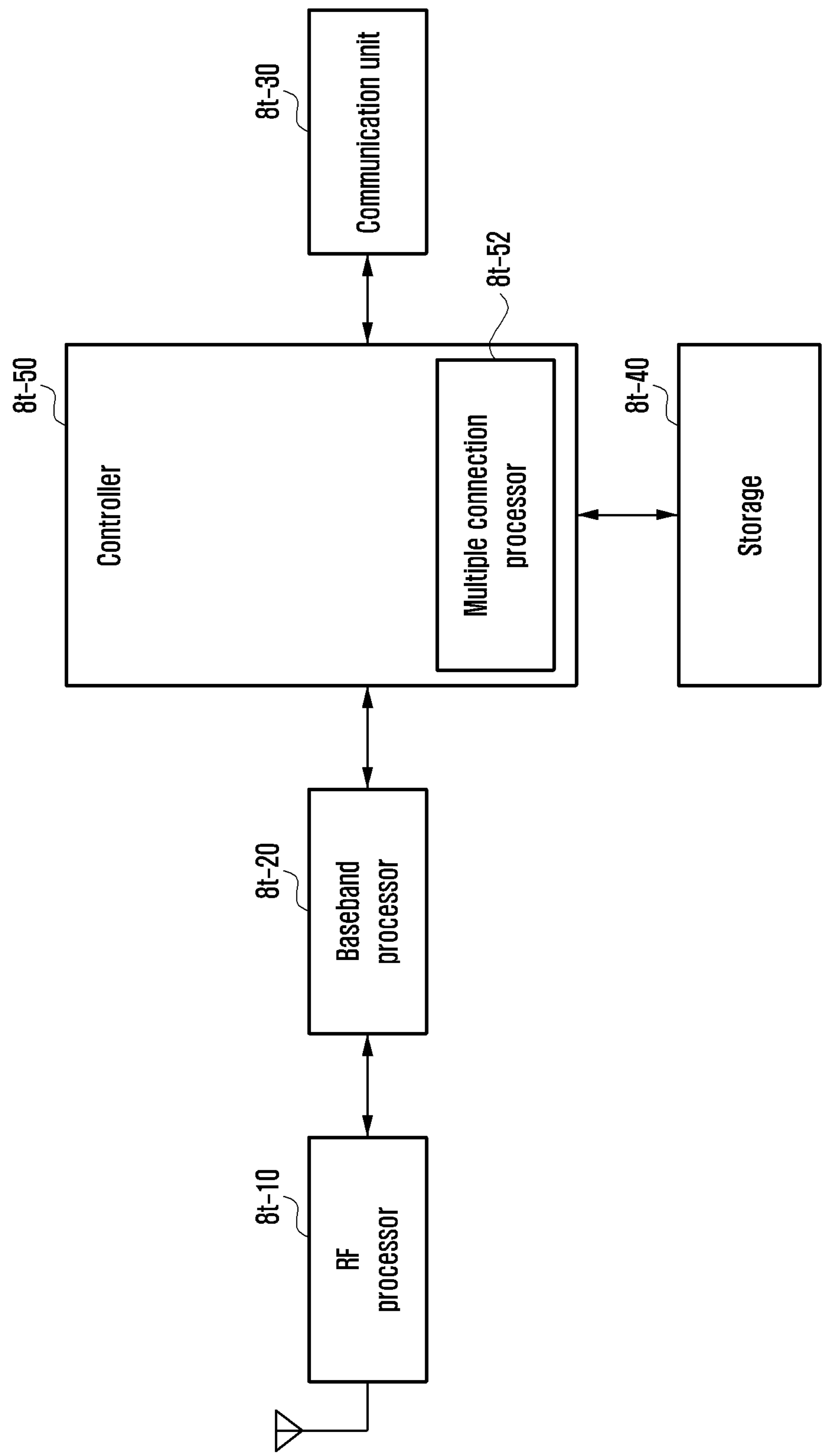
FIG. 8T is a block diagram illustrating a configuration of a base station transceiver according to an embodiment of the present disclosure.

FIG. 8T is a block diagram illustrating a configuration of a base station transceiver according to an embodiment of the present disclosure.

Referring to FIG. 8T, the base station is configured to include an RF processor 8t-10, a baseband processor 8t-20, a communication unit 8t-30, a storage 8t-40, and a controller 8t-50.

The RF processor 8t-10 serves to transmit/receive a signal through a radio channel, such as band conversion and amplification of a signal. For example, the RF processor 8t-10 up-converts a baseband signal provided from the baseband processor 8t-20 into an RF band signal and then transmits the baseband signal through an antenna and down-converts the RF band signal received through the antenna into the baseband signal. For example, the RF processor 8t-10 may include a transmitting filter, a receiving filter, an amplifier, a mixer, an oscillator, a DAC, an ADC, and the like. FIG. 8T illustrates only one antenna but the first access node may include a plurality of antennas. Further, the RF processor 5I-10 may include the plurality of RF chains. Further, the RF processor 8t-10 may perform the beamforming. For the beamforming, the RF processor 5I-10 may adjust a phase and a size of each of the signals transmitted and received through a plurality of antennas or antenna elements. The RF processor may perform a downward MIMO operation by transmitting one or more layers.

The baseband processor 8t-20 performs a conversion function between the baseband signal and the bit string according to the physical layer standard of the first radio access technology. For example, when data are transmitted, the baseband processor 8t-20 generates complex symbols by coding and modulating a transmitting bit string. Further, when data are received, the baseband processor 8t-20 recovers the receiving bit string by demodulating and decoding the baseband signal provided from the RF processor 8t-10. For example, according to the OFDM scheme, when data are transmitted, the baseband processor 8t-20 generates the complex symbols by coding and modulating the transmitting bit string, maps the complex symbols to the sub-carriers, and then performs the IFFT operation and the CP insertion to configure the OFDM symbols. Further, when data are received, the baseband processor 8t-20 divides the baseband signal provided from the RF processor 8t-10 in an OFDM symbol unit and recovers the signals mapped to the sub-carriers by an FFT operation and then recovers the receiving bit string by the modulation and decoding. The baseband processor 8t-20 and the RF processor 8t-10 transmit and receive a signal as described above. Therefore, the baseband processor 8t-20 and the RF processor 8t-10 may be called a transmitter, a receiver, a transceiver, a communication unit, or a wireless communication unit.

The communicator 8t-30 provides an interface for performing communication with other nodes within the network.

The storage 8t-40 stores data, such as basic programs, application programs, and configuration information for the operation of the main base station. More particularly, the storage 8t-40 may store the information on the bearer allocated to the accessed terminal, the measured results reported from the accessed terminal, and the like. Further, the storage 8t-40 may store information that is a determination criterion on whether to provide a multiple connection to the terminal or stop the multiple connection to the terminal. Further, the storage 8t-40 provides the stored data according to the request of the controller 8t-50.

The controller 8t-50 includes a multiple connection processor 8t-52 and controls the general operations of the main base station. For example, the controller 8t-50 transmits/receives a signal through the baseband processor 8t-20 and the RF processor 85-10 or the communicator 8t-30. Further, the controller 8t-50 records and reads data in and from the storage 8t-40. For this purpose, the controller 8t-50 may include at least one processor.

Ninth Embodiment

Hereinafter, an operation principle of the present disclosure will be described in detail with reference to the accompanying drawings. Hereinafter, when it is determined that the detailed description of the known art related to the present disclosure may obscure the gist of the present disclosure, the detailed description thereof will be omitted. Further, the following terminologies are defined based on the functions in an embodiment of the present disclosure and may be changed by intentions, practices or the like of users or operators. Therefore, the definitions thereof should be construed based on the contents throughout the specification. A term used for identifying a connection node used in the following description, a term referring to network entities, a term referring to messages, a term referring to an interface between network objects, a term referring to various identification information, or the like are illustrated for convenience of explanation. Accordingly, the present disclosure is not limited to terms to be described below and other terms indicating objects having the equivalent technical meaning may be used.

Hereafter, for convenience of explanation, the present disclosure uses terms and names defined in the 3GPP LTE or terms and names modified based on the terms and names. However, the present disclosure is not limited to the terms and names but may also be identically applied to the system according to other standards.

An embodiment of the present disclosure relates to a mobile communication system, and more particularly, to a method and apparatus for selecting, by a pedestrian terminal, a resource pool in an LTE terminal supporting communication (vehicle-to-pedestrian, hereinafter referred to as V2P) between a vehicle and a pedestrian terminal. However, the proposed contents may be applied to the vehicle-to-everything (V2X) communication technology as well as the V2P communication.

A vehicle-to-everything (V2X) refers to a communication technology through a vehicle and all interfaces and examples thereof may include a vehicle-to-vehicle (V2V), vehicle-to-infra-structure (V2I), a vehicle-to-pedestrian (V2P), and the like according to the form thereof and the component forming the communication. The V2P basically depends on a structure and an operation principle of Rel-12 device-to-device (D2D). Like the D2D, even the V2P transmits/receives data between a vehicle terminal and a pedestrian portable terminal (hereinafter, interchangeably used with a pedestrian UE (P-UE)), but in the cell supporting the V2P, more terminals receives a service compared to the D2D receives, thereby reducing a waste of radio resources. More particularly, in the case of mode 3 in which a base station assigns and manages resources for the V2P, if a RRC-connected terminal has data to be transmitted to another terminal, the data may be transmitted to the base station using the RRC message or the MAC control element (hereinafter, referred to as CE). Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The detailed format and content of the buffer status report used in the 3GPP refer to 3GPP standard TS36.321 “S-UTRA MAC Protocol Specification”. The base station receiving the V2P communication request signals additional configuration/setting information (V2V resource block assignment information, modulation and coding (MCS), and timing advance (TA)) or V2V communication permission indicator for the V2V communication to the terminal, such that the terminal may perform permission/control/management to perform the V2V communication. In addition, sidelink (SL) communication in the V2P, that is, the device-to-device communication is operated based on a transmission resource defined in the D2D. As described above, since more vehicle terminals will be serviced in the cell supporting the V2P than in the D2D, there is a need to efficiently manage transmission resources.

In addition, the most important consideration in V2P is reduction of power consumption of the pedestrian terminal. Unlike other terminals used in V2X communication, the pedestrian portable terminal is greatly restricted in power consumption. For this purpose, unlike other terminals of the V2X, a special power reducing technique for the pedestrian portable terminal is required. For this purpose, the use of a resource selection (a method for sensing scheduling assignment (SA) and data resources used by neighboring terminals and transmitting them through an empty resource) based on sensing used in an existing vehicle terminal is limited. The resource selection operation based on the existing sensing needs to detect the resource pool for a minimum of 1 second and decode the SA, resulting in consuming much power. Instead, a random resource selection technique that has been used in the existing Rel-12 D2D may be used. In addition, a resource selection may be applied through partial sensing, which is a modification of the sensing operation of the related art. The partial sensing operation is a method for reducing power consumption by sensing a resource pool for more than one second and reducing a procedure of decoding SA to a short interval of about 100 ms. For example, the pedestrian portable terminal may use either of operations of the random resource selection or the resource selection through the partial sensing, or both of them.

According to an embodiment of the present disclosure, for the pedestrian portable terminal having sidelink Rx capability, as the random resource selection and the resource selection through the partial sensing is efficiently selected, the conditions of reducing power consumption and increasing transmission stability for high priority packets are defined.

Figure 9A:
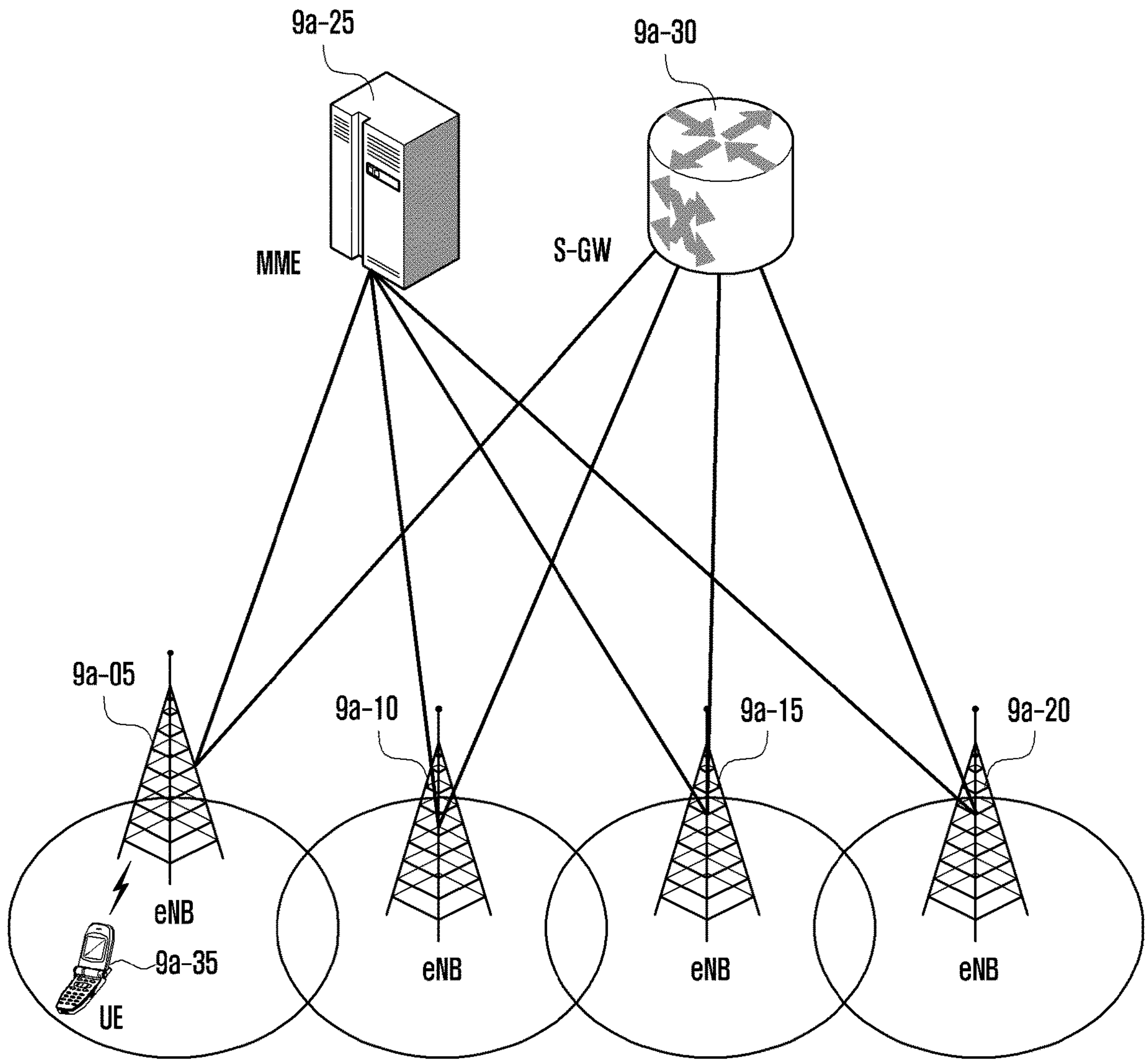
FIG. 9A is a diagram illustrating a structure of an LTE system according to an embodiment of the present disclosure.

FIG. 9A is a diagram illustrating a structure of an LTE system according to an embodiment of the present disclosure.

Referring to FIG. 9A, the wireless communication system is configured to include a plurality of base stations (eNB) 9a-05, 9a-10, 9a-15, and 9a-20, a mobility management entity (MME) 9a-25, and a serving-gateway (S-GW) 9a-30. A user equipment 9a-35 is connected to the external network through the base stations 9a-05 to 9a-20 and the S-GW 9a-30. The base stations 9a-05 to 9a-20 are access nodes of a cellular network and provides a radio access to the terminals that are connected to the network. For example, in order to serve traffic of users, the base stations 9a-05 to 9a-20 collect and schedule state information, such as a buffer state, an available transmit power state, and a channel state of the UEs to support the connection between the terminals and the core network (CN). The MME 9a-25 is an apparatus for performing various control functions as well as the mobility management function for the terminal and is connected to a plurality of base stations, and the S-GW 9a-30 is an apparatus for providing a data bearer. Further, the MME and the S-GWs 9a-25 and 9a-30 may further perform authentication, bearer management, and the like, on the terminal connected to the network and may process packets that are to be received from the base stations 9a-05 to 9a-20 and are to be transmitted to the base stations 9a-05 to 9a-20.

Figure 9B:
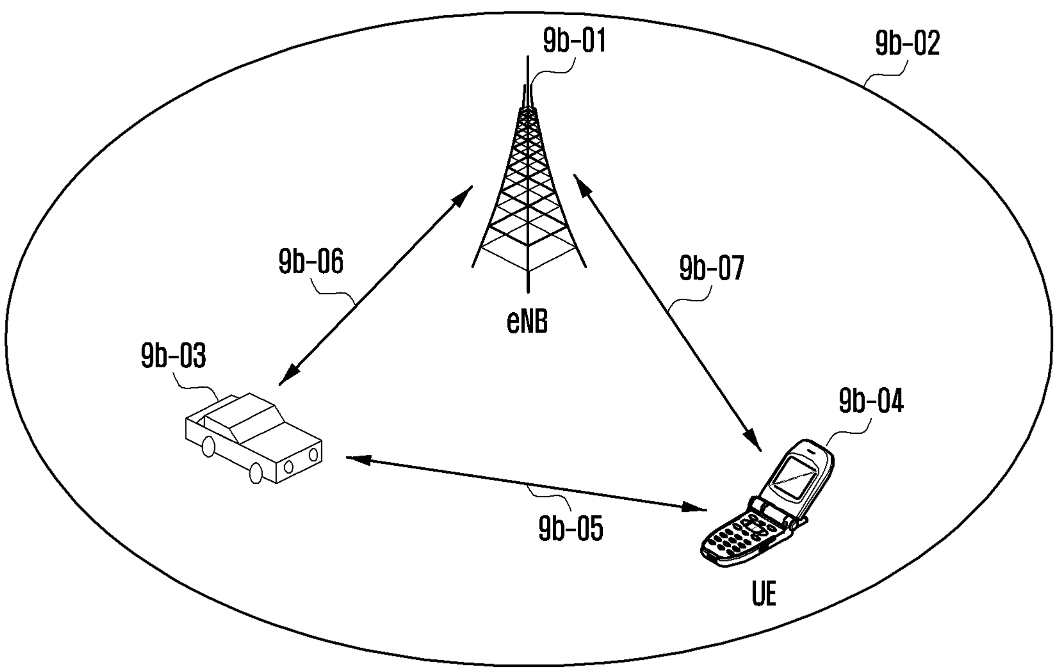
FIG. 9B is a diagram illustrating a vehicle-to-pedestrian (V2P) communication according to an embodiment of the present disclosure.

FIG. 9B is a diagram illustrating V2P communication according to an embodiment of the present disclosure.

Referring to FIG. 9B, an example of performing the V2P communication in the cellular system is illustrated.

Referring to FIG. 9B, the base station 9*b*-01 manages at least one vehicle terminal 9*b*-03 and the pedestrian portable terminal 9*b*-04 located in the cell 9*b*-02. For example, the vehicle terminal 9*b*-03 performs cellular communication using a link 9*b*-06 between the base station 9*b*-01 and the vehicle terminal-base station, and the pedestrian portable terminal 9*b*-04 uses the base station 9*b*-01 and a link 9*b*-07 between the pedestrian portable terminal and the base station to perform the cellular communication. If the vehicle terminal 9*b*-03 and the pedestrian portable terminal 9*b*-04 are capable of the V2P communication, the vehicle terminal 9*b*-03 and the pedestrian portable terminal 9*b*-04 may directly transmit and receive information using the link 9*b*-05 without passing through the base station 9*b*-01. The number of terminals receiving the V2P service in one cell may be many and the relationship between the base station 9*b*-01 and the terminals 9*b*-03 and 9*b*-04 as described above may be extended and applied.

Figure 9C:
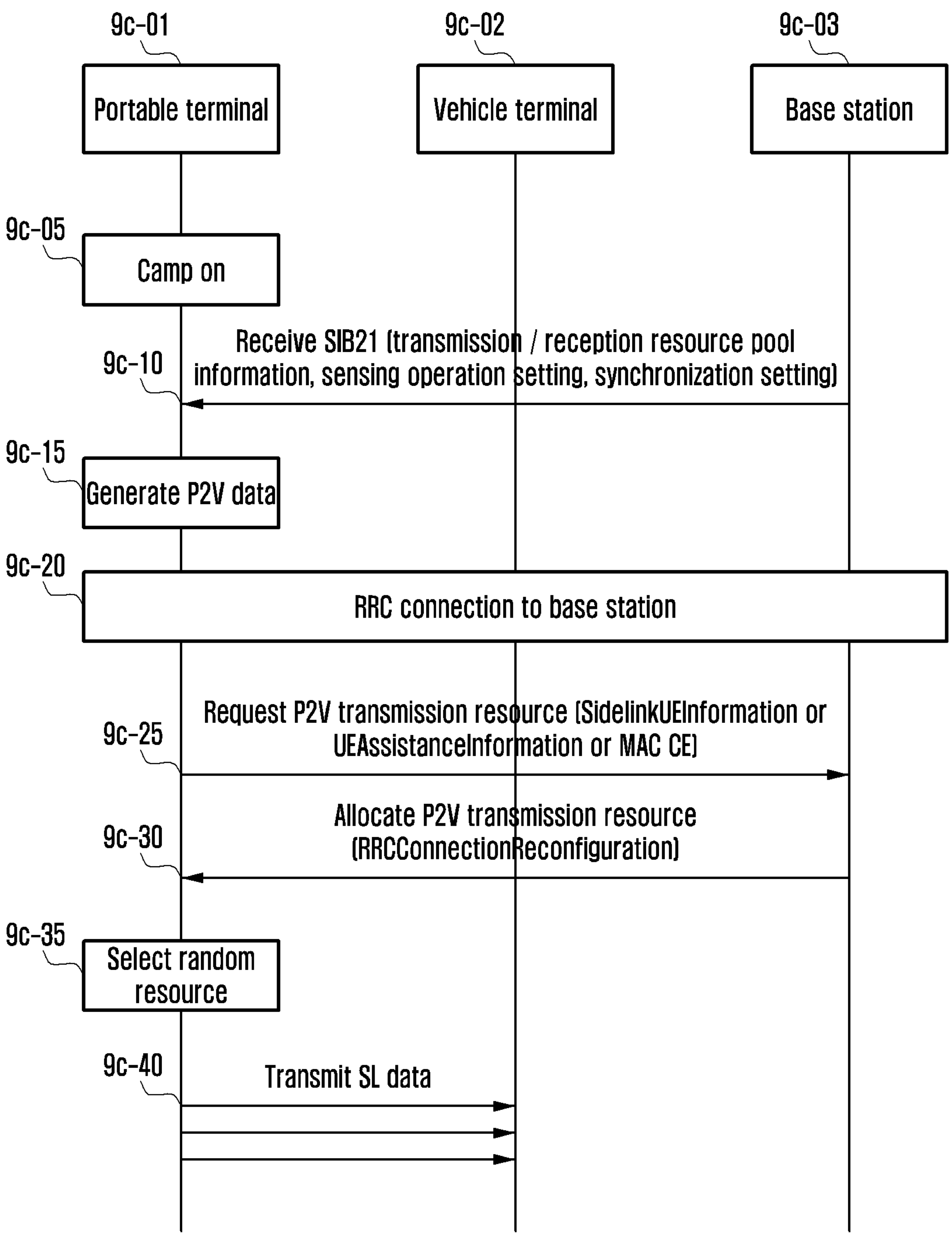
FIG. 9C is a diagram illustrating a procedure of a random resource selection of a V2P terminal operated in mode 3 according to an embodiment of the present disclosure.

FIG. 9C is a diagram illustrating a procedure of a random resource selection of a V2P terminal operated in mode 3 according to an embodiment of the present disclosure.

Referring to FIG. 9C, as described above, in the V2P communication, the base station 9*c*-03 allocates a resource pool for the random resource selection and a pool for resource selection based on the partial sensing for the pedestrian portable terminal 9*c*-01. However, in order for the portable terminal 9*c*-01 to perform the partial sensing operation, the side link reception capability is required. For example, since the portable terminal 9*c*-01 that does not have the side link reception capability exists in the cell, the base station will provide the resource pool for at least one random resource selection. The portable terminal 9*c*-01 that is camping on in operation 9*c*-05 receives the SIB 21 from the base station 9*c*-03 in operation 9*c*-10. The system information includes resource pool information for transmission and reception, configuration information for sensing operation, information for setting synchronization, and the like. If the portable terminal 9*c*-01 generates the data traffic for the P2V in operation 9*c*-15, it performs the RRC connection with the base station in operation 9*c*-20. The above RRC connection process may be performed before the data traffic is generated in operation 9*c*-15. The portable terminal 9*c*-01 requests a transmission resource capable of P2V communication with other vehicle terminals 9*c*-02 to the base station in operation 9*c*-25. At this time, the portable terminal 9*c*-01 may request the base station using the RRC message or the MAC CE. Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The base station 9*c*-03 allocates a P2V transmission resource to the portable terminal 9*c*-01 through a dedicated RRC message in operation 9*c*-30. The message may be included in the RRCConnectionReconfiguration message. The portable terminal 9*c*-01 randomly selects the resource in operation 9*c*-35 in the time/frequency domain from the resources indicated by the base station 9*c*-03 and transmits the data to the vehicle terminal 9*c*-02 in operation 9*c*-40.

Figure 9D:
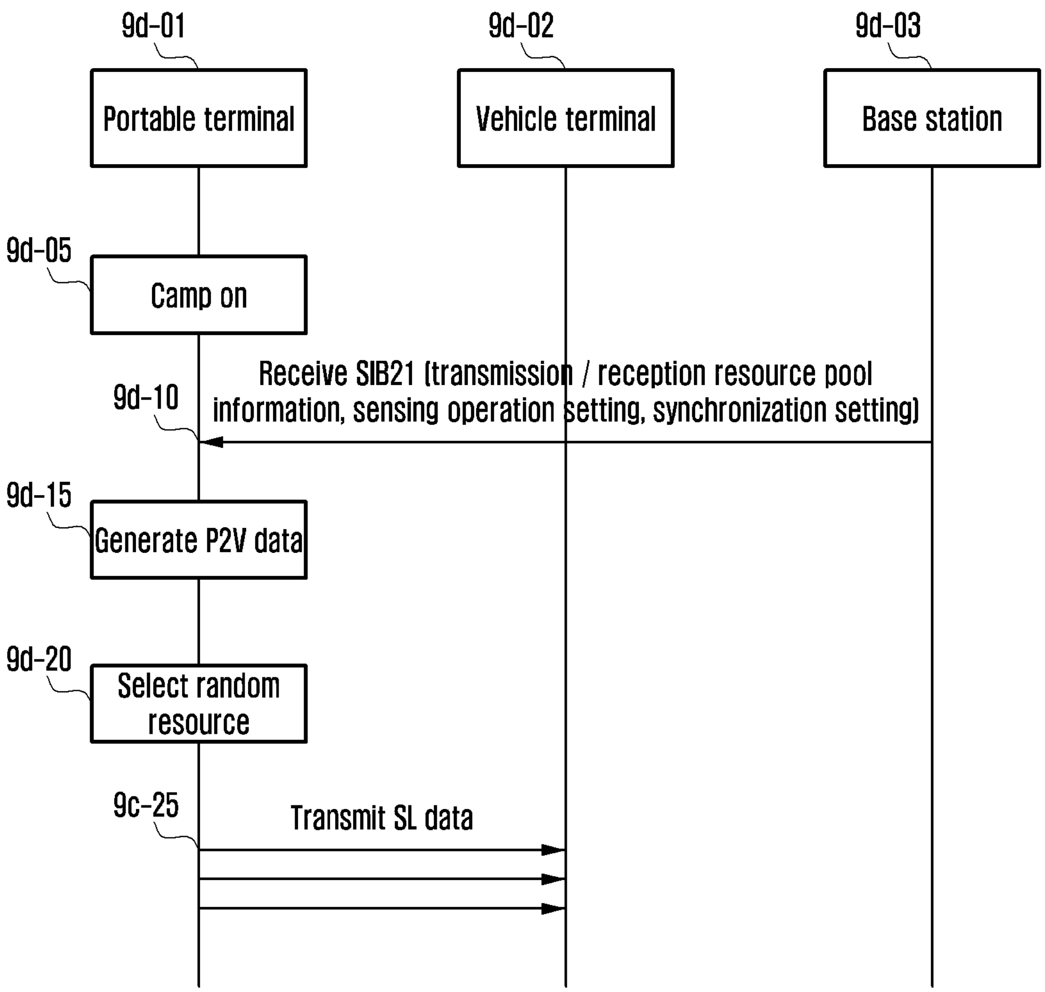
FIG. 9D is a diagram illustrating a procedure of a random resource selection of a V2P terminal operated in mode 4 according to an embodiment of the present disclosure.

FIG. 9D is a diagram illustrating a procedure of a random resource selection of a V2P terminal operated in mode 4 according to an embodiment of the present disclosure.

Referring to FIG. 9D, a mode 4 operation is different from mode 3 in which the base station 9*d*-03 is directly involved in the resource allocation in that the portable terminal 9*d*-01 autonomously selects a resource based on the resource pool of system information received in advance and transmits data. In the V2P communication, the base station 9*d*-03 allocates a resource pool for the random resource selection and a pool for resource selection based on the partial sensing for the pedestrian portable terminal 9*d*-01. However, in order for the portable terminal 9*d*-01 to perform the partial sensing operation, the side link reception capability is required. For example, since the portable terminal 9*d*-01 that does not have the side link reception capability exists in the cell, the base station will provide the resource pool for at least one random resource selection. The portable terminal 9*d*-01 that is camping on in operation 9*c*-05 receives the SIB 21 from the base station 9*d*-03 in operation 9*d*-10. The system information includes resource pool information for transmission and reception, configuration information for sensing operation, information for setting synchronization, and the like. If the portable terminal 9*d*-01 generates the data traffic for the P2V in operation 9*d*-15, the portable terminal 9*d*-01 selects the pool from which the random resource can be selected among the resource pools received from the base station 9*d*-03 through the system information and randomly selects the resource in the time/frequency domain in operation 9*d*-20 and transmits the data to the vehicle terminal 9*d*-02 at random in operation 9*d*-25.

Figure 9E:
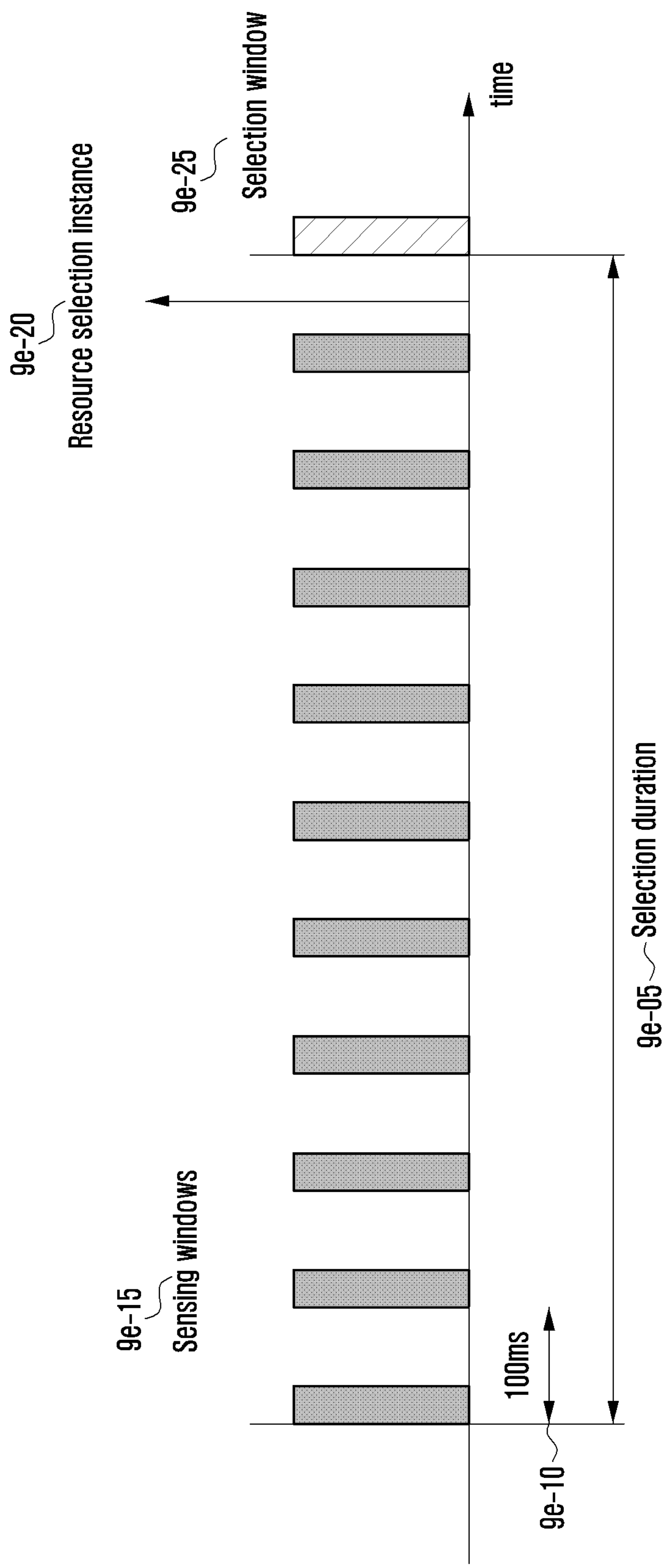
FIG. 9E is a diagram illustrating a partial sensing operation in V2P according to an embodiment of the present disclosure.

FIG. 9E is a diagram illustrating a partial sensing operation in V2P according to an embodiment of the present disclosure.

Referring to FIG. 9E, as described above, when operated in mode 4 of V2V, the resource selection based on the sensing may be performed. First, all the resources are considered to be usable, and the mode 4 terminal excludes resources already in use through the sensing and SA decoding for the resource pool. Finally, after the sensing operation ends, the terminal selects the remaining resources and transmits the data through the selected resources. However, in the case of a pedestrian portable terminal, since there is a great concern about power consumption of the operation, the random resource selection is used and the simplified sensing operation, that is, the partial sensing operation may be further performed. The P2V portable terminal repeats the operation of sensing the surrounding resources only for a while at a period of 100 ms during a corresponding sensing period (9*e*-05) without using a sensing window of 1 second used in the existing sensing operation. Here, the sensing window 9*e*-15 may have a small size of about 100 ms (9*e*-10). The resource is selected in operation 9*e*-20 in order to reflect the sensing result measured ten times during the sensing period (9*e*-05). For example, as a result of the sensing, an empty resource is selected except the resources occupied by other terminals. In addition, in operation 9*e*-25, the SA and the related data are transmitted through the resources determined through the selection window. The partial sensing operation may be performed only for the P2V portable terminal having the sidelink Rx capability.

Figure 9F:
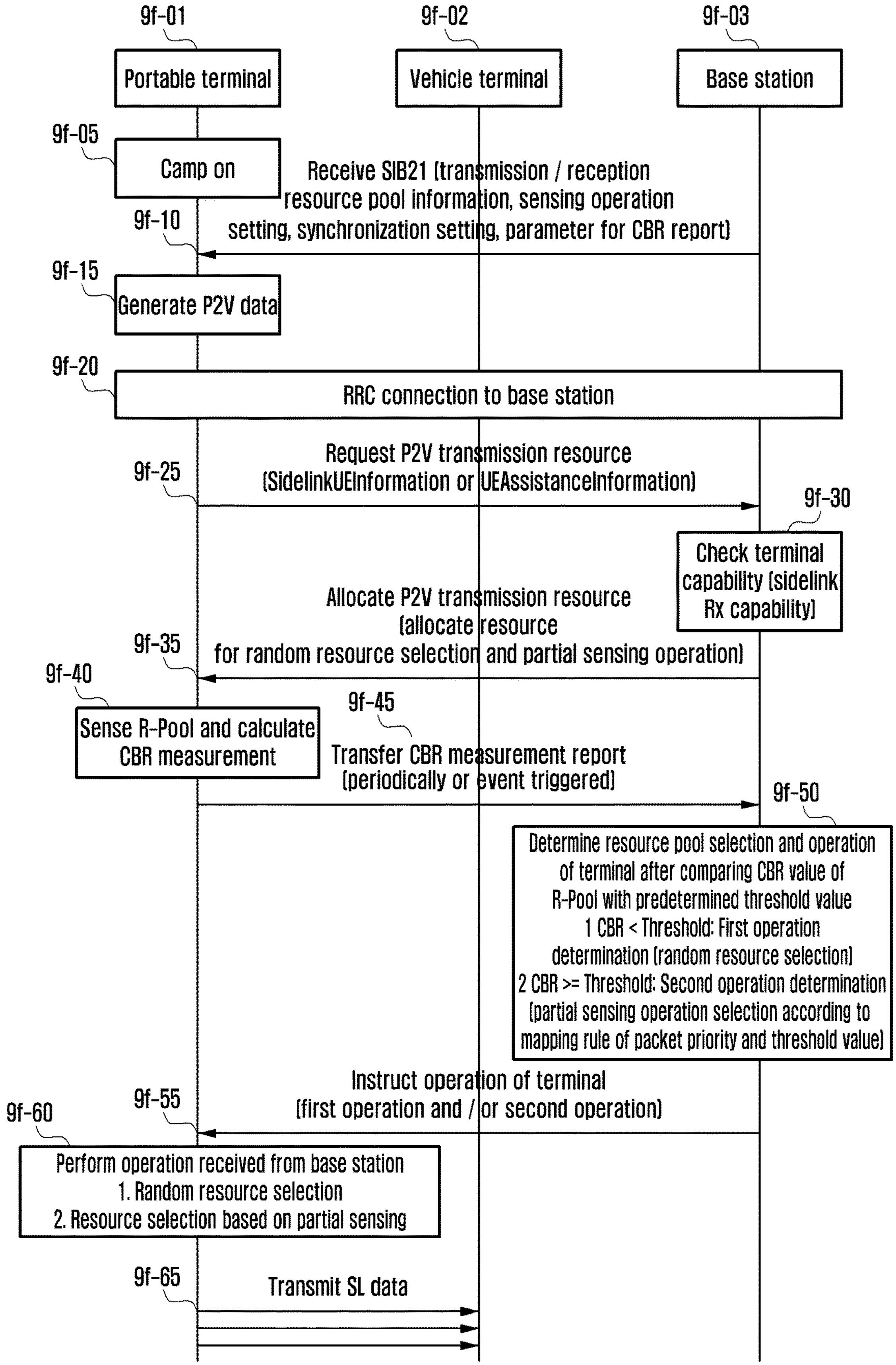
FIG. 9F is a diagram illustrating a method for determining a resource pool of a V2P terminal operated in mode 3 according to a 9-1-th embodiment of the present disclosure.

FIG. 9F is a diagram illustrating a method of determining a resource pool of a V2P terminal in a base station control mode according to a 9-1-th embodiment of the present disclosure.

Referring to FIG. 9F, as described above, the portable terminal for the P2V may use the random resource selection and the partial sensing based on the partial sensor, which depends on the side link reception capability of the terminal and the configuration of the network. For example, if the terminal supports both operations, whether or not the resource pool is set in the network affects the operation. In addition, for the P2V mobile terminal, the base station may provide the pool for the random resource selection (hereinafter referred to as R-Pool) and the resource pool (hereinafter referred to as PS-Pool) for the partial sensing for the specific portable terminal. Here, the R-Pool may overlap with the PS-Pool, which is an implementation issue of the network. In the 9-1-th embodiment, the resource selection operation of the P2V portable terminal when the CBR measurement and report can be performed in the R-Pool, and the operation of the base station control mode will be described in detail below. Herein, the base station control mode reports a CBR measurement value related to the congestion control to the base station, and determines the operation of the terminal (resource pool selection method of the terminal) by comparing the reported CBR measurement value with a predetermined threshold value of the base station. On the other hand, the terminal autonomous mode is a method (a resource pool selection method of the terminal) for determining, a terminal, an operation by comparing the CBR measurement value with the predetermined threshold without reporting the CBR measurement value to the base station. More particularly, the base station control mode is applicable to the V2X terminal of mode 3 and the mode 4 terminal of RRC connection state.

Meanwhile, the PS-Pool related contents described below may be similarly applied to the sensing based operation process of the V2X communication.

The portable terminal **9*f*-01 that is camping on in operation 9*f*-05 receives the SIB 21 from the base station 9*f*-03 in operation 9*f*-10. The system information includes resource pool information for transmission and reception, configuration information for sensing operation, information for setting synchronization, parameters (indicator indicating a periodic report and an event generation report, a threshold value indicating a congestion degree, a threshold value for classification depending on PPPP), and the like. If the portable terminal 9*f*-01 generates the data traffic for the P2V in operation 9*f*-15, it performs the RRC connection with the base station in operation 9*f*-20. The above RRC connection process may be performed before the data traffic is generated in operation 9*f*-15. The portable terminal 9*f*-01 requests a transmission resource capable of P2V communication with other vehicle terminals 9*f*-02 to the base station in operation 9*f*-25. At this time, the portable terminal may request a resource to the base station 9*f*-03 using the RRC message or the MAC CE. Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The base station 9*f*-03 checks the side link reception capability of the portable terminal 9*f*-01 in operation 9*f*-30 and allocates the transmission resources to the P2V portable terminal 9*f*-01 through the dedicated RRC message. The message is included in the RRCConnectionReconfiguration message, and may instruct the R-Pool and the PS-Pool to the P2V mobile terminal 9*f*-01. For example, in the message, the base station 9*f*-03 may instruct the resource allocation for the random resource selection and the partial sensing operation according to the capability of the P2V portable terminal 9*f*-01 in operation 9*f*-35. In the operation the base station may indicate one of the random resource selection and the partial sensing operation and may indicate both. In operation 9*f*-40, the P2V portable terminal 9*f*-01 detects the R-Pool and then measures the CBR. In operation 9*f*-45, the measurement result is transmitted to the base station 9*f*-03, and the periodic report or the event generation report is based on the method set by the base station. In operation 9*f*-50, the base station 9*f*-03 compares the CBR measurement value reported by the portable terminal 9*f*-01 with the predetermined threshold value, and then determines the congestion of the R-Pool. In addition, the use of the conditional PS-Pool is defined based on mapping with a plurality of thresholds associated with the packet priority (Prose per-packet priority (PPPP)) of the portable terminal 9*f*-01**

In the following Table 9-1, an example in which four threshold values corresponding to eight PPPPs are set will be described.

TABLE 9-1

| Condition | Action |
|---|---|
| CBR value < Thres_CBR | R-Pool is used |
| Thres1 < = CBR value < Thres2 | PS-Pool is used for higher 2 PPPP of P-UE's packet,<br>R-Pool is used for the rest of P-UE's packet |
| Thres2 < = CBRvalue < Thres3 | PS-Pool is used for higher 4 PPPP of P-UE's packet,<br>R-Pool is used for the rest of P-UE's packet |
| Thres3 < = CBR value < Thres4 | PS-Pool is used for higher 6 PPPP of P-UE's packet,<br>R-Pool is used for the rest of P-UE's packet |
| Thres4 < = CBR value | PS-Pool is used for all P-UE's packet |

Here, Thres1<Thres2<Thres3<Thres4, and Thres_CBR may be equal to or less than Thres1. The operation is applied when the P2V portable terminal **9*f*-01** may be operated in both modes (random resource selection and partial sensing operation), and the operation may be performed in both of the case where the R-Pool overlaps with the PS-Pool and is defined as a different pool. For example, both of the change from the R-Pool to the PS-Pool or the change in the use method may be considered. Here, the threshold value mapped to the PPPP may have a value from 1 to 8.

In operation **9*f*-55, the base station 9*f*-03 instructs the operation of the portable terminal 9*f*-01 determined based on the mapping rule described in Table 9-1. In operation 9*f*-60, the portable terminal 9*f*-01 performs the random resource selection and the partial sensing operation according to the instruction received from the base station. The data is transmitted to the vehicle terminal 9*f*-02 through the selected resource in operation 9*f*-65**.

Figure 9G:
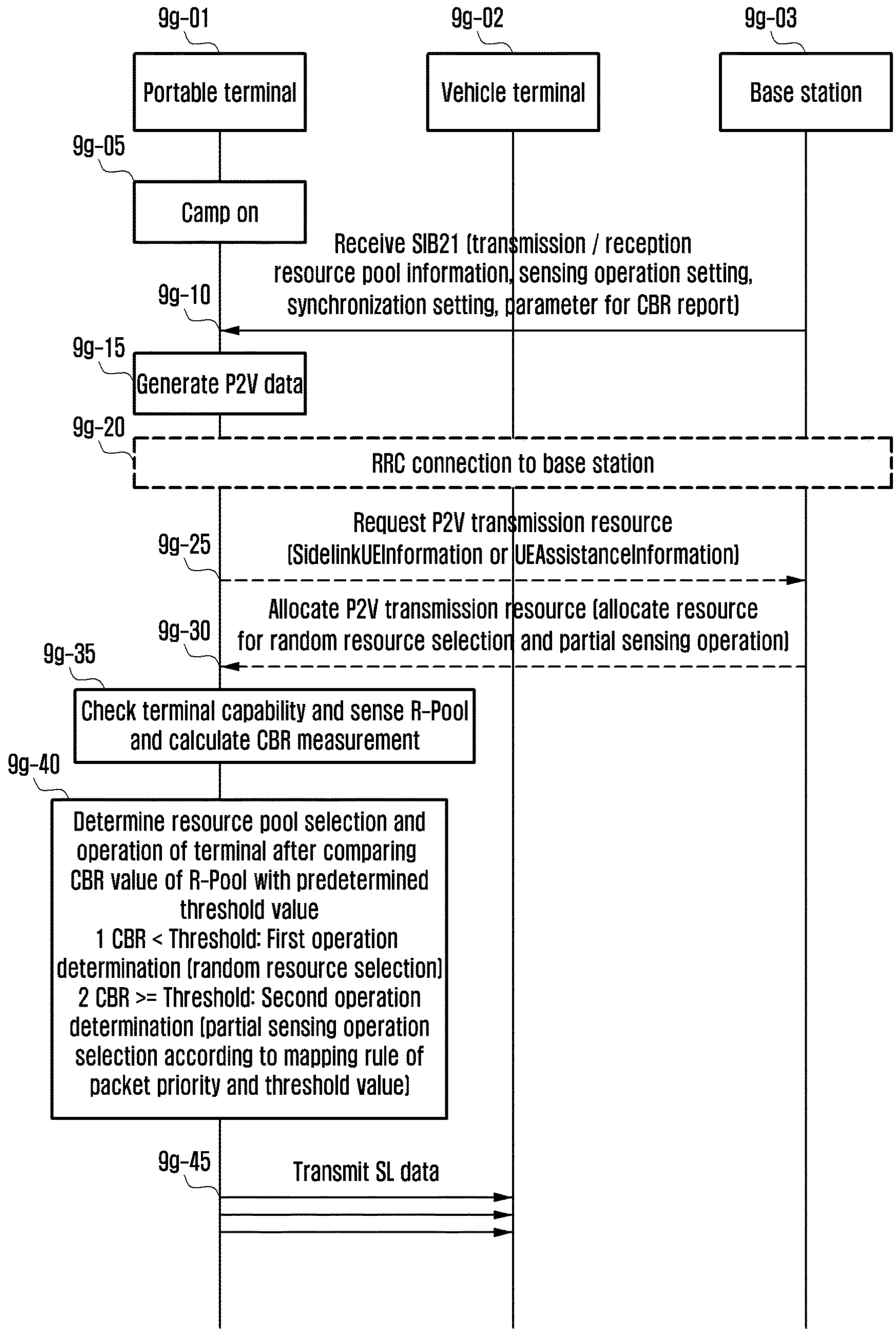
FIG. 9G is a diagram illustrating a method for determining a resource pool of a V2P terminal operated in a terminal-autonomous mode according to a 9-1-th embodiment of the present disclosure.

FIG. 9G is a diagram illustrating a method of determining a resource pool of a V2P terminal operated in a terminal-autonomous mode according to a 9-1-th embodiment of the present disclosure.

Referring to FIG. 9G, the base station control mode reports a CBR measurement value related to the congestion control to the base station, and determines the operation of the terminal (resource pool selection method of the terminal) by comparing the reported CBR measurement value with a predetermined threshold value of the base station. On the other hand, the terminal autonomous mode is a method (a resource pool selection method of the terminal) for determining, a terminal, an operation by comparing the CBR measurement value with the predetermined threshold without reporting the CBR measurement value to the base station. More particularly, the terminal autonomous mode can be applied to the mode 4 in V2X communication, and may also be applied to the case where the mode 3 terminal is in the IDLE state or out-of-coverage (OOC).

The portable terminal 9g-01 which is camping on in operation 9g-05 receives the SIB 21 from the base station 9g-03 in operation 9g-10. The system information includes resource pool information for transmission and reception, configuration information for sensing operation, information for setting synchronization, parameters (indicator indicating a periodic report and an event generation report, a threshold value indicating a congestion degree, a threshold value for classification depending on PPPP), and the like If the portable terminal 9g-01 generates the data traffic for the P2V in operation 9g-15, it performs the RRC connection with the base station in operation 9g-20. The above RRC connection process may be performed before the data traffic is generated in operation 9g-15. The portable terminal 9g-01 requests a transmission resource capable of P2V communication with other vehicle terminals 9g-02 to the base station 9g-03 in operation 9g-25. At this time, the portable terminal may request a resource to the base station 9g-03 using the RRC message or the MAC CE. Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The base station 9g-03 checks the side link reception capability of the portable terminal 9g-01 and allocates the transmission resources to the P2V portable terminal 9g-01 through the dedicated RRC message in operation 9g-30. The message is included in the RRCConnectionReconfiguration message, and may instruct the R-Pool and the PS-Pool to the P2V mobile terminal 9g-01. The operations 9g-20 to 9g-30 may not be performed for the mode 4 terminal.

In operation 9g-35, the P2V mobile terminal 9g-01 measures the CBR for checking the congestion degree in the P-Pool after checking the side link reception capability by itself. In operation 9g-40, the portable terminal 9g-01 compares the measured CBR measurement value with the system information or the predetermined threshold value from the base station 9g-01, and then determines the congestion of the R-Pool. In addition, the use of the conditional PS-Pool is defined based on mapping with a plurality of thresholds associated with the packet priority (PPPP) of the portable terminal 9g-01

In the following Table 9-2, an example in which four threshold values corresponding to eight PPPPs are set will be described.

TABLE 9-2

| Condition | Action |
|---|---|
| CBR value < Thres_CBR | R-Pool is used |
| Thres1 < = CBR value < Thres2 | PS-Pool is used for higher 2 PPPP of P-UE's packet, R-Pool is used for the rest of P-UE's packet |
| Thres2 < = CBRvalue < Thres3 | PS-Pool is used for higher 4 PPPP of P-UE's packet, R-Pool is used for the rest of P-UE's packet |
| Thres3 < = CBR value < Thres4 | PS-Pool is used for higher 6 PPPP of P-UE's packet, R-Pool is used for the rest of P-UE's packet |
| Thres4 < = CBR value | PS-Pool is used for all P-UE's packet |

Here, Thres1<Thres2<Thres3<Thres4, and Thres_CBR may be equal to or less than Thres1. The operation is applied when the P2V portable terminal 9f-01 may be operated in both modes (random resource selection and partial sensing operation), and the operation may be performed in both of the case where the R-Pool overlaps with the PS-Pool and is defined as different pools. For example, both of the change from the R-Pool to the PS-Pool or the change in the use method may be considered. Here, the threshold value mapped to the PPPP may have a value from 1 to 8.

In operation 9g-45, the portable terminal 9g-01 transmits data to the vehicle terminal 9g-02 through the selected resource.

Figure 9H:
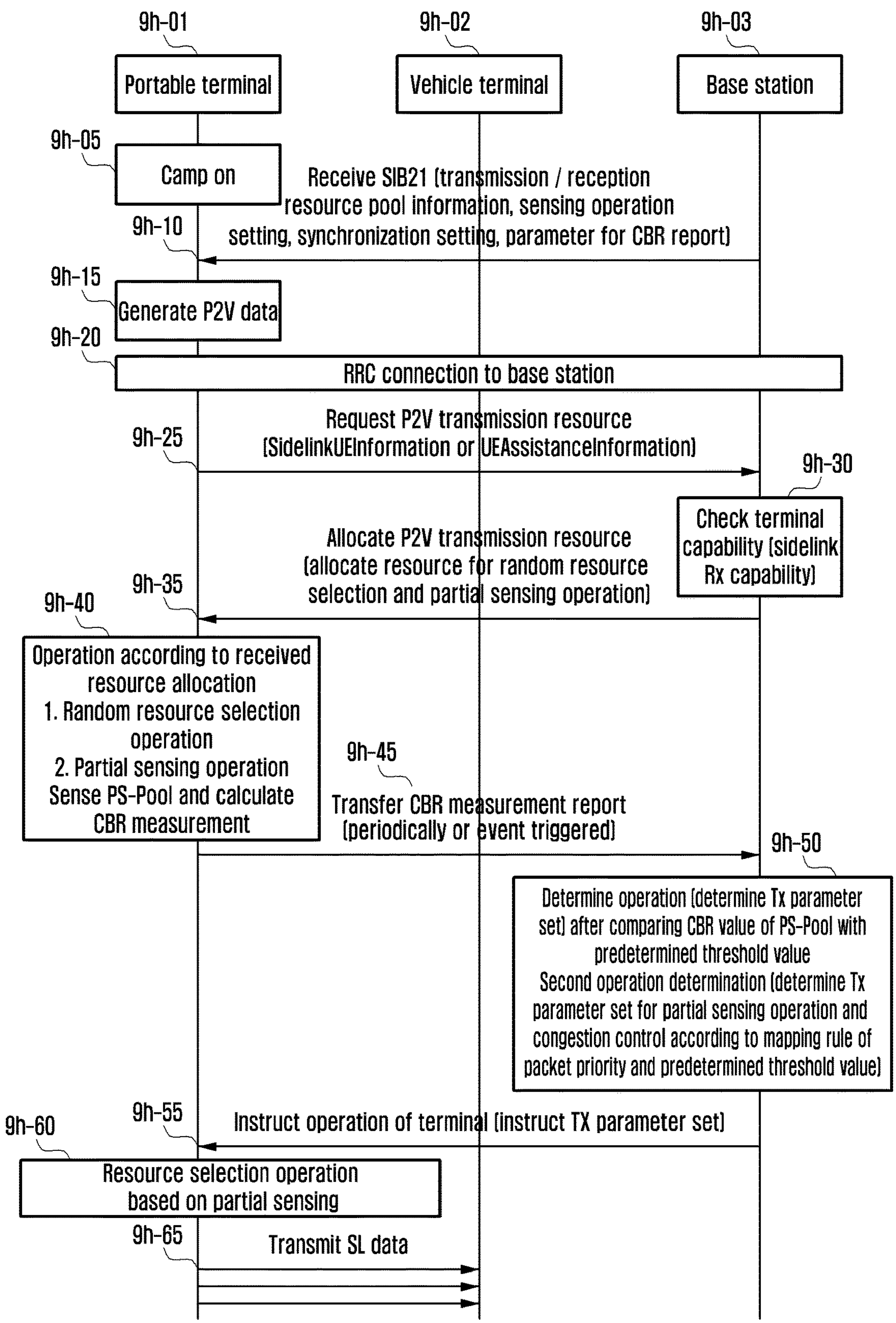
FIG. 9H is a diagram illustrating a method for determining a resource pool of a V2P terminal operated in a base station control mode according to a 9-2-th embodiment of the present disclosure.

FIG. 9H is a diagram illustrating a method of determining a resource pool of a V2P terminal operated in a base station control mode according to a 9-2-th embodiment of the present disclosure.

Referring to FIG. 9H, in the 9-2-th embodiment, the resource selection operation of the P2V portable terminal when the CBR measurement and report cannot be performed in the R-Pool, and the operation of the base station control mode will be described in detail below. Herein, the base station control mode reports a CBR measurement value related to the congestion control to the base station, and determines the operation of the terminal (resource pool selection method of the terminal) by comparing the reported CBR measurement value with a predetermined threshold value of the base station. On the other hand, the terminal autonomous mode is a method (a resource pool selection method of the terminal) for determining, a terminal, an operation by comparing the CBR measurement value with the predetermined threshold without reporting the CBR measurement value to the base station. More particularly, the base station control mode is applicable to the V2X terminal of mode 3 and the mode 4 terminal of RRC connection state.

The portable terminal 9h-01 that is camping on in operation 9h-05 receives the SIB 21 from the base station 9h-03 in operation 9h-10. The system information includes resource pool information for transmission and reception, configuration information for sensing operation, information for setting synchronization, parameters (indicator indicating a periodic report and an event generation report, a threshold value indicating a congestion degree, a threshold value for classification depending on PPPP), and the like In addition, a set of parameters (MCS, PRB count, power control, and the like) in a physical area depending on the congestion degree may also be included in plural. For example, it may be used to adjust the parameter values of the physical area according to the congestion degree of the PS-Pool. For example, it is used in the same method as Table 9-3 below

TABLE 9-3

| Condition | Action |
|---|---|
| Non-congestion in PS-Pool | Set A of transmission parameter |
| Congestion in PS-Pool | Multiple sets (B, C, . . .) of transmission parameter |

If the portable terminal 9h-01 generates the data traffic for the P2V in operation 9h-15, it performs the RRC connection with the base station in operation 9h-20. The above RRC connection process may be performed before the data traffic is generated in operation 9h-15. The portable terminal 9h-01 requests a transmission resource capable of P2V communication with other vehicle terminals 9h-02 to the base station 9h-03 in operation 9h-25. At this time, the portable terminal may request a resource to the base station 9h-03 using the RRC message or the MAC CE. Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The base station 9*h*-03 checks the side link reception capability of the portable terminal 9*h*-01 in operation 9*h*-30 and allocates the transmission resources to the P2V portable terminal 9*h*-01 through the dedicated RRC message in operation 9*h*-35. The message is included in the RRCConnectionReconfiguration message, and may instruct the R-Pool and the PS-Pool to the P2V mobile terminal 9*h*-01. For example, in the message, the base station 9*h*-03 may instruct the resource allocation for the random resource selection and the partial sensing operation according to the capability of the P2V portable terminal 9*h*-01 in operation 9*h*-35. The base station 9*h*-03 may indicate one of the random resource selection and the partial sensing operation and may indicate both. In the present embodiment, since it is assumed that the sensing of the R-Pool and the CBR measurement is impossible, only the case where the base station 9*h*-03 explicitly specifies the resource selection operation of the portable terminal 9*h*-01 is handled. For example, if the base station 9*h*-03 instructs the random resource selection, the portable terminal 9*h*-01 performs the random resource selection, and performs the following operation if instructing the partial sensing operation. As the method for determining, by a base station 9H-03, an operation of a portable terminal 9*h*-01 may be performed according to the implementation or the satisfaction of the predetermined event.

In operation 9*h*-40, the P2V portable terminal 9*h*-01 detects the PS-Pool and then measures the CBR. In operation 9*h*-45, the measurement result is transmitted to the base station 9*h*-03, and the periodic report or the event generation report is based on the method set by the base station. In operation 9*h*-50, the base station 9*h*-03 compares the CBR measurement value reported by the portable terminal 9*h*-01 with the predetermined threshold value, and then determines the congestion of the PS-Pool. In addition, the use of the conditional PS-Pool is defined based on mapping with a plurality of thresholds associated with the packet priority (PPPP) of the portable terminal 9*h*-01 For example, a Tx parameter set for the partial sensing operation and the congestion control is determined based on the mapping rule of the packet priority and the predetermined threshold values, and the terminal is instructed in operation 9*h*-55.

In the following Table 9-4, an example in which four threshold values corresponding to eight PPPPs are set will be described. In this example, the case where three parameter sets (Set A, B, C) for transmission of the physical layer are set to be three (set A, B, and C) is shown.

TABLE 9-4

| Steps | Condition | Action |
|---|---|---|
| Step 1 | CBR value > Thres_CBR | Change the Parameter set (From Parameter set A to Parameter set B) Change R-Pool to PS-Pool |
| Step 2 | Thres1 < = CBR value < Thres2 | Parameter set C for higher 2 PPPP of P-UE's packet, Parameter set B used for the rest of P-UE's packet |
| | Thres2 < = CBR value < Thres3 | Parameter set C for higher 4 PPPP of P-UE's packet, Parameter set B used for the rest of P-UE's packet |
| | Thres3 < = CBR value < Thres4 | Parameter set C for higher 6 PPPP of P-UE's packet, Parameter set B used for the rest of P-UE's packet |
| | Thres4 <= CBR value | Parameter set C for all P-UE's packet |

Here, Thres1<Thres2<Thres3<Thres4, and Thres_CBR may be equal to or less than Thres1. In addition, a parameter set A is provided as a default and parameter sets B and C may be used depending on the congestion degree. The transmission-related parameters of the physical layer included in the parameter set B are set to be a smaller value so as to reduce the congestion, as compared with those belonging to the parameter A. For example, MCS_A, No_PRB_A, and Power_A of the parameter set A are determined to be larger than MCS_B, No_PRB_B, and Power_B of the parameter set B. This applies similarly to the relationship between parameter sets B and C. In addition, even if the number of parameter sets increases, the transmission parameter values configured from the viewpoint may be set. In addition, the base station may instruct the portable terminal using the R-Pool in operation 1 to be changed to the PS-pool while changing the parameter set.

This operation is applied when the P2V mobile terminal 9*h*-01 is operated as the partial sensing operation, and may be applied to both when the PS-Pool overlaps with the R-Pool and when the PS-Pool is defined as different pools. For example, both of the change from the R-Pool to the PS-Pool or the change in the use method may be considered. Here, the threshold value mapped to the PPPP may have a value from 1 to 8.

In operation 9*h*-60, the portable terminal 9*h*-01 determines the transmission parameter set and performs the partial sensing operation, depending on the packet priority according to the instruction received from the base station. The data is transmitted to the vehicle terminal 9*f*-02 through the selected resource in operation 9*h*-65.

Figure 9I:
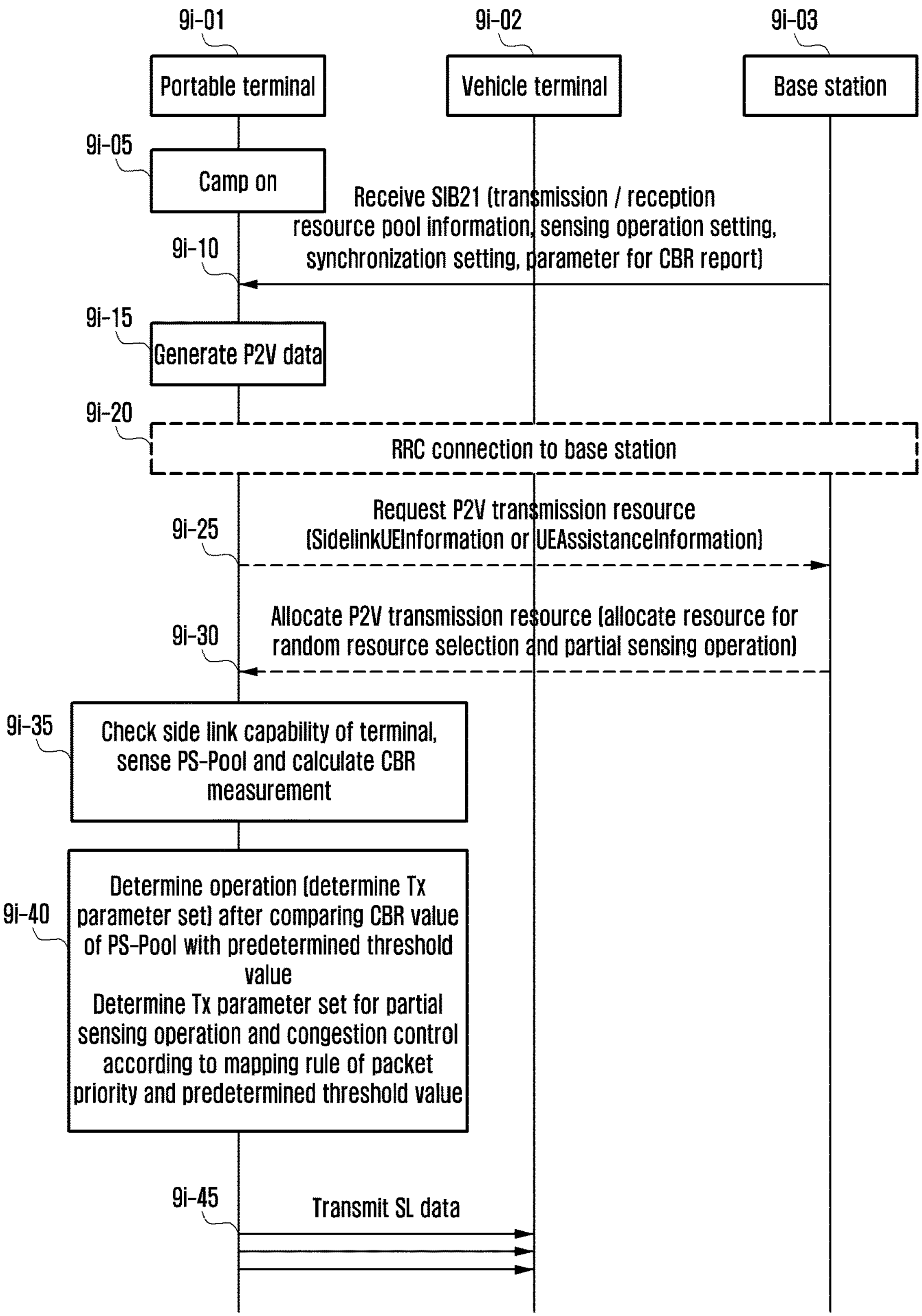
FIG. 9I is a diagram illustrating a method for determining a resource pool of a V2P terminal operated in a terminal autonomous mode according to a 9-2-th embodiment of the present disclosure.

FIG. 9I is a diagram illustrating a method of determining a resource pool of a V2P terminal operated in a terminal autonomous mode according to a 9-2-th embodiment of the present disclosure.

Referring to FIG. 9I, the base station control mode reports a CBR measurement value related to the congestion control to the base station, and determines the operation of the terminal (resource pool selection method of the terminal) by comparing the reported CBR measurement value with a predetermined threshold value of the base station. On the other hand, the terminal autonomous mode is a method (a resource pool selection method of the terminal) for determining, a terminal, an operation by comparing the CBR measurement value with the predetermined threshold without reporting the CBR measurement value to the base station. More particularly, the terminal autonomous mode can be applied to the mode 4 in V2X communication, and may also be applied to the case where the mode 3 terminal is in the IDLE state or the out-of-coverage (OOC).

The portable terminal 9*i*-01 that is camping on in operation 9*i*-05 receives the SIB 21 from the base station 9*i*-03 in operation 9*i*-10. The system information includes resource pool information for transmission and reception, configuration information for sensing operation, information for setting synchronization, parameters (indicator indicating a periodic report and an event generation report, a threshold value indicating a congestion degree, a threshold value for classification depending on PPPP), and the like In addition, a set of parameters (MCS, PRB count, power control, and the like) in a physical area depending on the congestion degree may also be included in plural. For example, it may be used to adjust the parameter values of the physical area according to the congestion degree of the PS-Pool. For example, it is used in the same method as Table 9-5 below

TABLE 9-5

| Condition | Action |
|---|---|
| Non-congestion in PS-Pool | Set A of transmission parameter |
| Congestion in PS-Pool | Multiple sets(B, C, . . .) of transmission parameter |

If the portable terminal **9*i*-01 generates the data traffic for the P2V (9*i*-15), it performs the RRC connection with the base station in operation 9*i*-20. The above RRC connection process may be performed before the data traffic is generated in operation 9*i*-15. The portable terminal 9*i*-01 requests a transmission resource capable of P2V communication with other vehicle terminals 9*i*-02 to the base station 9*i*-03 in operation 9*i*-25. At this time, the portable terminal may request a resource to the base station 9*i*-03 using the RRC message or the MAC CE. Here, as the RRC message, SidelinkUEInformation, UEAssistanceInformation message may be used. Meanwhile, the MAC CE may be, for example, a buffer status report MAC CE in a new format (including indicator that notifies at least a buffer status report for at least V2P communication and information on a size of data that are buffered for D2D communication). The base station 9*i*-03 checks the side link reception capability of the portable terminal 9*i*-01 and allocates the transmission resources to the P2V portable terminal 9*i*-01 through the dedicated RRC message in operation 9*i*-30. The message is included in the RRCConnectionReconfiguration message, and may instruct the R-Pool and the PS-Pool to the P2V mobile terminal 9*i*-01. The operations 9*i*-20 to 9*i*-30 may not be performed for the mode 4** terminal.

In operation **9*i*-35, the P2V mobile terminal 9*i*-01** measures the CBR for checking the congestion degree in the PS-Pool after checking the side link reception capability by itself. The portable terminal determines the resource pool and the operation according to the setting in the base station included in the system information. If only the R-Pool exists, the random resource selection is performed. In addition, when the R-Pool and the PS-Pool are simultaneously instructed, the random resource selection is performed when the capability of the terminal is not able to be partially detected, and the PS-Pool is used when the partial sensing is possible.

In operation **9*i*-40, the portable terminal 9*i*-01 compares the measured CBR measurement value with the system information or the predetermined threshold value from the base station 9*i*-01, and then determines the congestion of the PS-Pool. In addition, the use of the conditional PS-Pool is defined based on mapping with a plurality of thresholds associated with the packet priority (PPPP) of the portable terminal 9*i*-01 For example, the portable terminal determines the Tx parameter set for the partial sensing operation and the congestion control based on the mapping rule of the packet priority and the predetermined threshold values in operation 9*i*-45**.

In the following Table 9-6, an example in which four threshold values corresponding to eight PPPPs are set will be described. In this example, the case where three parameter sets (Set A, B, C) for transmission of the physical layer are set to be three (set A, B, and C) is shown.

TABLE 9-6

| Steps | Condition | Action |
|---|---|---|
| Step 1 | CBR value > Thres_CBR | Change the Parameter set (From Parameter set A to Parameter set B) Change R-Pool to PS-Pool |
| Step 2 | Thres1 < = CBR value < Thres2 | Parameter set C for higher 2 PPPP of P-UE's packet, Parameter set B used for the rest of P-UE's packet |
| | Thres2 < = CBR value < Thres3 | Parameter set C for higher 4 PPPP of P-UE's packet, Parameter set B used for the rest of P-UE's packet |
| | Thres3 < = CBR value < Thres4 | Parameter set C for higher 6 PPPP of P-UE's packet, Parameter set B used for the rest of P-UE's packet |
| | Thres4 <= CBR value | Parameter set C for all P-UE's packet |

Here, Thres1<Thres2<Thres3<Thres4, and Thres_CBR may be equal to or less than Thres1. In addition, a parameter set A is provided as a default and parameter sets B and C may be used depending on the congestion degree. The transmission-related parameters of the physical layer included in the parameter set B are set to be a smaller value so as to reduce the congestion, as compared with those belonging to the parameter A. For example, MCS_A, No_PRB_A, and Power_A of the parameter set A are determined to be larger than MCS_B, No_PRB_B, and Power_B of the parameter set B. This applies similarly to the relationship between parameter sets B and C. In addition, even if the number of parameter sets increases, the transmission parameter values configured from the viewpoint may be set. In addition, the base station may instruct the portable terminal using the R-Pool in operation 1 to be changed to the PS-pool while changing the parameter set.

This operation is applied when the P2V mobile terminal **9*i*-01** is operated as the partial sensing operation, and may be applied to both when the PS-Pool overlaps with the R-Pool and when the PS-Pool is defined as different pools. For example, both of the change from the R-Pool to the PS-Pool or the change in the use method may be considered. Here, the threshold value mapped to the PPPP may have a value from 1 to 8.

In operation **9*i*-40, the portable terminal 9*i*-01 determines the transmission parameter set and performs the partial sensing operation, depending on the packet priority according to the instruction received from the base station. The data is transmitted to the vehicle terminal 9*i*-02 through the selected resource in operation 9*i*-45**.

Figure 9J:
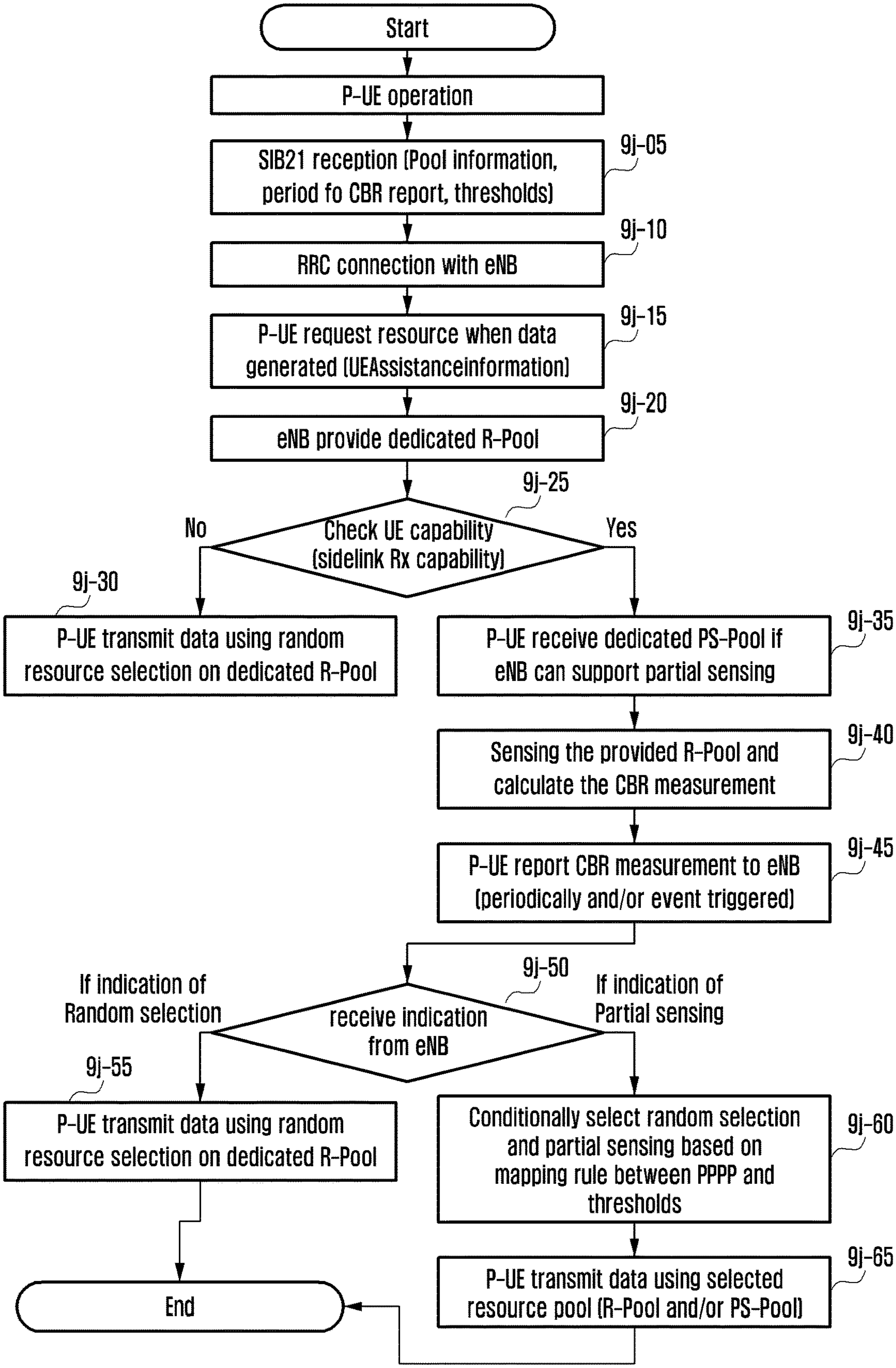
FIG. 9J is a diagram illustrating an operation of a terminal according to a 9-1-th embodiment of the present disclosure.

FIG. 9J is a diagram illustrating an operation of a terminal according to a 9-1-th embodiment of the present disclosure.

Referring to FIG. 9J, in the 9-1-th embodiment, the operation of the terminal that is operated in the base station control mode is as follows.

In operation **9*j*-05**, the P2V portable terminal receives the system information.

The system information includes the R-Pool for the random resource selection and the PS-Pool information for the partial sensing, the configuration information for the sensing operation, the information for setting synchronization, the information for the CBR measurement and the reporting (period, threshold value, threshold for classification according to PPPP, and the like), and a set of parameters (MCS, the number of PRBs, power control, and the like) of a plurality of physical areas.

Determining the operation according to the mode of the terminal

The mode 3 portable terminal and the mode 4 portable terminal in the RRC-connected state is operated in the base station control mode in operations 9*j*-10 to 9*j*-20.

For the mode 4 and the mode 3 in the IDLE state, the terminal is operated in the autonomous mode. In this case, instead of the operations 9*j*-10 to 9*j*-20, the resource pool provided from the received system information is used.

Determining a method for using, by a terminal, a resource pool and transmitting data according to side link reception capability in operation 9*j*-25.

If the side link reception capability of the UE is not determined in operation 9*j*-25, data is transmitted using random resource selection on dedicated R-Pool in operation 9*j*-30. In the case of the base station control mode, it is possible to determine the resource pool and the operation of the portable terminal by receiving the side link reception capability of the terminal and instruct, by the base station, the resource pool in advance in operation 9*j*-35 and determine, by the terminal itself, the operation of the portable terminal. When the terminal is operated in the autonomous mode, the terminal itself determines the operation according to the side link reception capability of the portable terminal.

Measuring the CBR for the R-Pool for the terminal performing the resource selection operation through the partial sensing in operation 9*j*-40.

In the base station control mode, the terminal may transmit the CBR measurement value to the base station in operation 9*j*-45. If the terminal operates in autonomous mode, the terminal does not transmit the CBR measurement value to the base station.

Determining the method for using a resource pool and transmitting data based on a comparison between the CBR value and the preset threshold value In the base station control mode, the base station compares the CBR measurement value received from the terminal with the predetermined threshold value and determines the transmission method according to the predetermined mapping rule in operation 9*j*-50. On the other hand, if the terminal is operated in an autonomous mode, the terminal compares the calculated CBR measurement value with the threshold value received as the system information and determines the transmission method according to the predetermined mapping rule. The mapping rule may be associated with the selection and operation of resource pools according to the packet priority in operation 9*j*-60.

Transmitting the side link data after the random resource selection in operation 9*j*-55.

Transmitting the side link data after the resource selection based on the partial sensing in operation 9*j*-65.

Figure 9K:
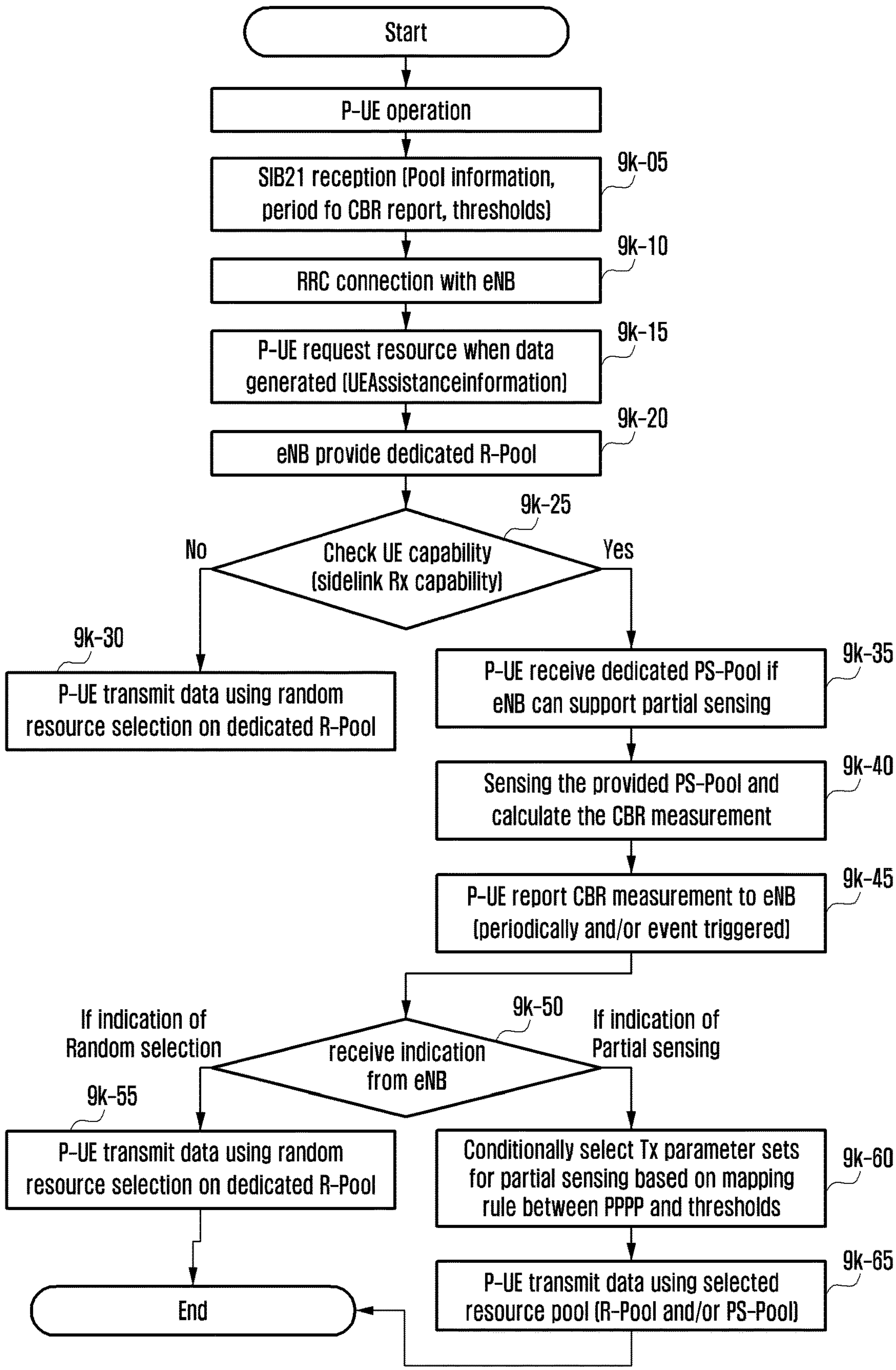
FIG. 9K is a diagram illustrating an operation of a terminal according to a 9-2-th embodiment of the present disclosure.

FIG. 9K is a diagram illustrating an operation of a terminal according to a 9-2-th embodiment of the present disclosure.

Referring to FIG. 9K, in the 9-2-th embodiment, the operation of the terminal that is operated in the base station control mode is as follows.

In operation 9*j*-05, the P2V portable terminal receives the system information.

The system information includes the R-Pool for the random resource selection and the PS-Pool information for the partial sensing, the configuration information for the sensing operation, the information for setting synchronization, the information for the CBR measurement and the reporting (period, threshold value, threshold for classification according to PPPP, and the like), and a set of parameters (MCS, the number of PRBs, power control, and the like) of a plurality of physical areas.

Determining the operation according to the mode of the terminal

The mode 3 and mode 4 portable terminals in the RRC-connected state are operated in the base station control mode in operations 9*j*-10 to 9*j*-20.

For the mode 4 and the mode 3 in the IDLE state, the terminal is operated in the autonomous mode. In this case, instead of the operations 9*k*-10 to 9*k*-20, the resource pool provided from the received system information is used.

Determining a method for using, by a terminal, a resource pool and transmitting data according to side link reception capability in operation 9*k*-25.

If the side link reception capability of the UE is not determined in operation 9*k*-25, data is transmitted using random resource selection on dedicated R-Pool in operation 9*k*-30. In the case of the base station control mode, it is possible to determine the resource pool and the operation of the portable terminal by receiving the side link reception capability of the terminal and instruct, by the base station, the resource pool in advance in operation 9*k*-35 and determine, by the terminal itself, the operation of the portable terminal. When the terminal is operated in the autonomous mode, the terminal itself determines the operation according to the side link reception capability of the portable terminal.

Measuring the CBR for the PS-Pool for the terminal performing the resource selection operation through the partial sensing in operation 9*k*-40.

In the base station control mode, the terminal may transmit the CBR measurement value to the base station in operation 9*k*-45. If the terminal operates in autonomous mode, the terminal does not transmit the CBR measurement value to the base station.

Determining the method for using a resource pool and transmitting data based on a comparison between the CBR value and the preset threshold value In the base station control mode, the base station compares the CBR measurement value received from the terminal with the predetermined threshold value and determines the transmission method according to the predetermined mapping rule in operation 9*k*-50. On the other hand, if the terminal is operated in an autonomous mode, the terminal compares the calculated CBR measurement value with the threshold value received as the system information and determines the transmission method according to the predetermined mapping rule. Here, the mapping rule may be associated with the selection and operation of resource pools according to the packet priority. In addition, the mapping between the CBR measurement value and the transmission parameter set according to the packet priority of the terminal is performed in operation 9*k*-60.

Transmitting the side link data after the random resource selection in operation 9*k*-55.

Transmitting the side link data after the resource selection based on the partial sensing in operation 9*k*-65.

Figure 9L:
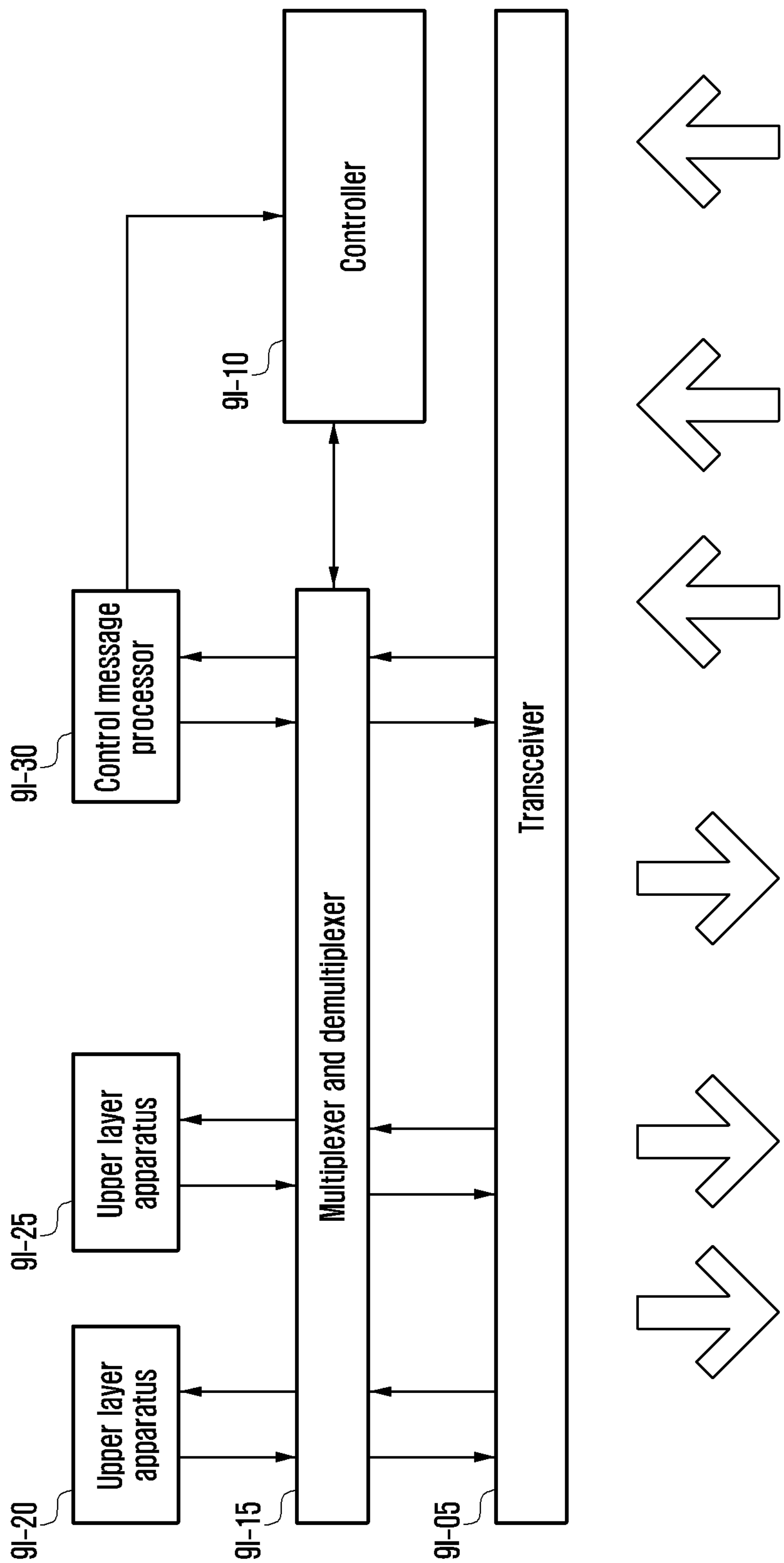
FIG. 9L is a block configuration diagram illustrating a terminal according to an embodiment of the present disclosure.

FIG. 9L is a block configuration diagram illustrating a terminal according to an embodiment of the present disclosure.

Referring to FIG. 9L, the terminal according to the embodiment of the present disclosure includes a transceiver 9*l*-05, a controller 9*l*-10, a multiplexer and demultiplexer 9*l*-15, various upper layer processors 9*l*-20 and 9*l*-25, and a control message processor 9*l*-30.

The transceiver 9*l*-05 receives data and a predetermined control signal through a forward channel of the serving cell and transmits the data and the predetermined control signal through a the reverse channel. When a plurality of serving cells are configured, the transceiver 9*l*-05 transmits and receives data and a control signal through the plurality of carriers. The multiplexer and demultiplexer 9*l*-15 serves to multiplex data generated from the upper layer processors 9*l*-20 and 9*l*-25 or the control message processor 9*l*-30 or demultiplex data received by the transceiver 9*l*-05 and transmit the data to the appropriate upper layer processors 9*l*-20 and 9*l*-25 or the control message processor 9*l*-30. The control message processor 9*l*-30 transmits and receives a control message from the base station and takes necessary actions. This includes the function of processing the RRC message and the control messages, such as the MAC CE, and includes reporting of the CBR measurement value and receiving the RRC messages for the resource pool and the operation of the terminal. The upper layer processors 9*l*-20 and 9*l*-25 mean the DRB apparatus and may be configured for each service. The higher layer processors 9*l*-20 and 9*l*-25 process data generated from user services, such as a file transfer protocol (FTP) or a voice over internet protocol (VoIP) and transfer the processed data to the multiplexer and demultiplexer 9*l*-15 or process the data transferred from the multiplexer and demultiplexer 9*l*-15 and transfer the processed data to service application of the higher layer. The controller 9*l*-10 confirms scheduling commands, for example, reverse grants controls received through the transceiver 9*l*-05 to control the transceiver 9*l*-05 and the multiplexer and demultiplexer 9*l*-15 to perform the reverse transmission by an appropriate transmission resource at an appropriate time. Meanwhile, it is described above that the terminal is configured of a plurality of blocks and each block performs different functions, which is only embodiment and therefore is not necessarily limited thereto. For example, the controller 9*l*-10 itself may also perform the function performed by the demultiplexer 9*l*-15.

Figure 9M:
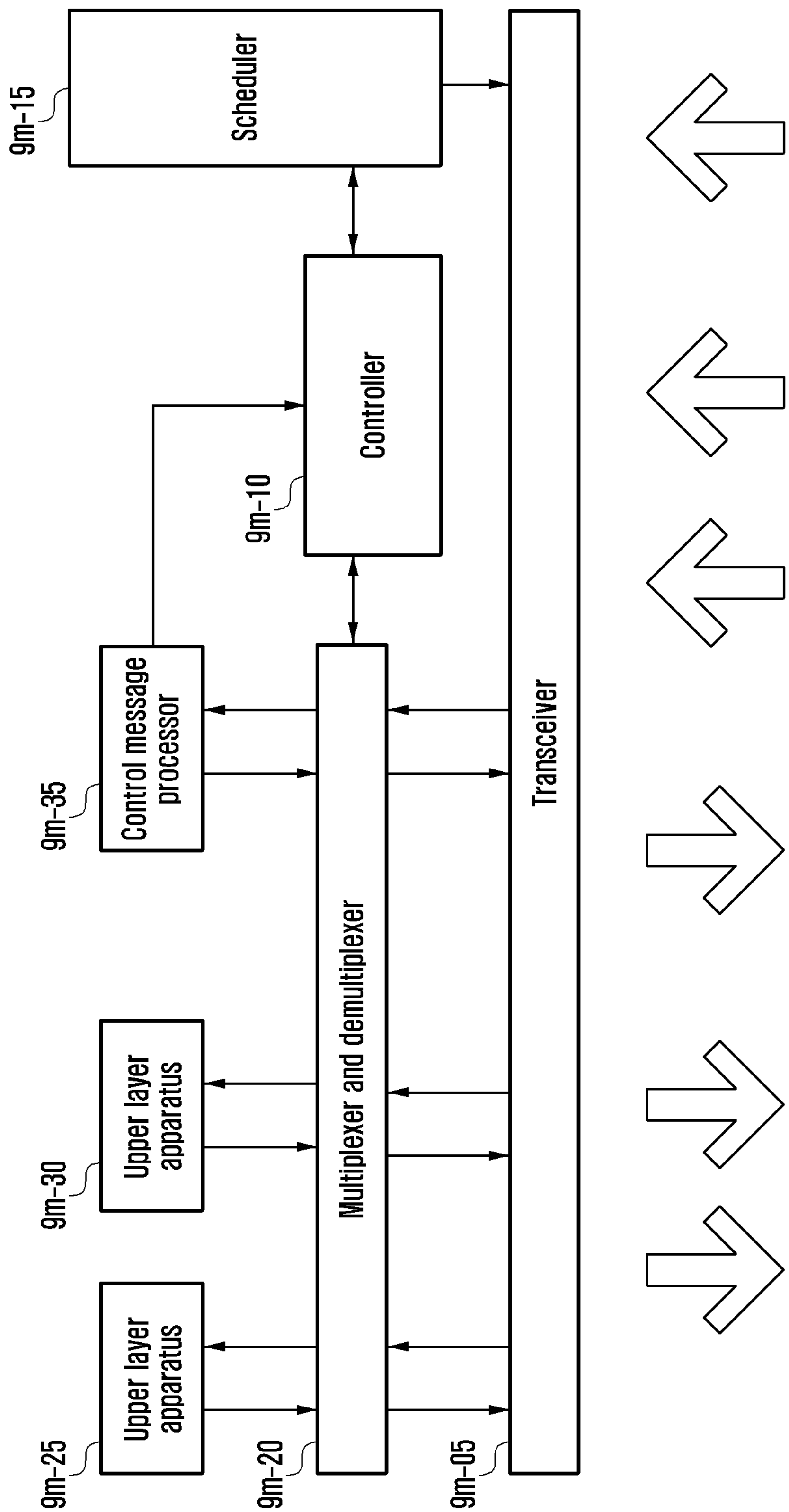
FIG. 9M is a block configuration diagram of a base station according to an embodiment of the present disclosure.

FIG. 9M is a block configuration diagram of a base station according to an embodiment of the present disclosure.

Referring to FIG. 9M, the base station apparatus includes a transceiver 9*m*-05, a controller 9*m*-10, a multiplexer and demultiplexer 9*m*-20, a control message processor 9*m*-35, various upper layer processors 9*m*-25 and 9*m*-30, and a scheduler 9*m*-15.

The transceiver 9*m*-05 transmits data and a predetermined control signal through a forward carrier and receives the data and the predetermined control signal through a reverse carrier. When a plurality of carriers are configured, the transceiver 9*m*-05 transmits and receives the data and the control signal through the plurality of carriers. The multiplexer and demultiplexer 9*m*-20 serves to multiplex data generated from the upper layer processors 9*m*-25 and 9*m*-30 or the control message processor-35 or demultiplex data received by the transceiver 9*m*-25 and transmit the data to the appropriate upper layer processors 9*m*-30 and 9*m*-30 the control message processor 9*m*-35, or the controller 9*m*-10. The controller 9*m*-10 determines which of the resource pools received from the base station is used, and determines the random resource selection operation based on the configuration information and the resource selection operation based on the partial sensing. The control message processor 9*m*-35 receives the instruction of the controller, generates a message to be transmitted to the terminal, and transmits the generated message to the lower layer. The upper layer processors 9*m*-25 and 9*m*-30 may be configured for each terminal and each service and processes data generated from user services, such as FTP and VoIP and transmits the processed data to the multiplexer and demultiplexer 9*m*-20 or processes data transmitted from the multiplexer and demultiplexer 9*m*-20 and transmits the processed data to service applications of the upper layer. The scheduler 9*m*-15 allocates a transmission resource to the terminal at appropriate timing based on the buffer status and the channel status of the terminal, the active time of the terminal, and the like, and allows the transceiver to process a signal transmitted from the terminal or performs a process to transmit a signal to the terminal.

The embodiments of the present disclosure and the accompanying drawings have proposed specific examples in order to easily describe the contents of the present disclosure and assist in understanding the present disclosure and do not limit the scope of the present disclosure. It is obvious to those skilled in the art to which the present disclosure pertains that various modifications may be made without departing from the scope of the present disclosure, in addition to the embodiments disclosed herein.

In embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. A method of delivering data by a terminal in a wireless communication system, the method comprising:

generating a medium access control (MAC) subheader for a padding;

generating a MAC protocol data unit (PDU) including the MAC subheader which is placed immediately in front of the padding, wherein the MAC subheader with the padding is placed at an end of the MAC PDU; and delivering the MAC PDU to a lower layer.

2. The method of claim 1, wherein a size of the padding is zero.

3. The method of claim 1, further comprising transmitting the MAC PDU to a base station via the lower layer.

4. The method of claim 1, wherein the MAC PDU further includes a MAC service data unit (SDU) and a MAC control element (CE), and wherein the MAC CE is placed after the MAC SDU and before the MAC subheader with the padding.

5. A method of receiving data by a base station in a wireless communication system, the method comprising:

receiving a medium access control (MAC) protocol data unit (PDU) from a lower layer; and identifying a MAC subheader for a padding from the MAC PDU, the MAC subheader being placed immediately in front of the padding, wherein the MAC subheader with the padding is placed at an end of the MAC PDU.

6. The method of claim 5, wherein a size of the padding is zero.

7. The method of claim 5, wherein the MAC PDU is received from a terminal via the lower layer.

8. The method of claim 5, wherein the MAC PDU further includes a MAC service data unit (SDU) and a MAC control element (CE), and wherein the MAC CE is placed after the MAC SDU and before the MAC subheader with the padding.

9. A terminal of delivering data in a wireless communication system, the terminal comprising:

a transceiver; and a controller coupled with the transceiver and configured to:

generate a medium access control (MAC) subheader for a padding, generate a MAC protocol data unit (PDU) including the MAC subheader which is placed immediately in front of the padding, wherein the MAC subheader with the padding is placed at an end of the MAC PDU, and deliver the MAC PDU to a lower layer.

10. The terminal of claim 9, wherein a size of the padding is zero.

11. The terminal of claim 9, wherein the controller is further configured to transmit the MAC PDU to a base station via the lower layer.

12. The terminal of claim 9, wherein the MAC PDU further includes a MAC service data unit (SDU) and a MAC control element (CE), and wherein the MAC CE is placed after the MAC SDU and before the MAC subheader with the padding.

13. A base station of receiving data in a wireless communication system, the base station comprising:

a transceiver; and a controller coupled with the transceiver and configured to:

receive a medium access control (MAC) protocol data unit (PDU) from a lower layer, and identify a MAC subheader for a padding from the MAC PDU, the MAC subheader being placed immediately in front of the padding, wherein the MAC subheader with the padding is placed at an end of the MAC PDU.

14. The base station of claim 13, wherein a size of the padding is zero.

15. The base station of claim 13, wherein the MAC PDU is received from a terminal via the lower layer.

16. The base station of claim 13, wherein the MAC PDU further includes a MAC service data unit (SDU) and a MAC control element (CE), and wherein the MAC CE is placed after the MAC SDU and before the MAC subheader with the padding.

* * * * *